US012588011B2

(12) United States Patent
Murakami et al.

(10) Patent No.: US 12,588,011 B2
(45) Date of Patent: Mar. 24, 2026

(54) COMMUNICATION APPARATUS AND COMMUNICATION METHOD

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 195 days.

(21) Appl. No.: 17/682,481

(22) Filed: Feb. 28, 2022

(65) Prior Publication Data

US 2022/0183010 A1     Jun. 9, 2022

Related U.S. Application Data

(63) Continuation of application No. PCT/JP2020/033555, filed on Sep. 4, 2020.

(60) Provisional application No. 62/895,673, filed on Sep. 4, 2019.

(30) Foreign Application Priority Data

Nov. 11, 2019   (JP) ................................. 2019-204317
Feb. 14, 2020   (JP) ................................. 2020-023816
Jun. 18, 2020   (JP) ................................. 2020-105635

(51) Int. Cl.
*H04W 72/0453*          (2023.01)

(52) U.S. Cl.
CPC .............................. *H04W 72/0453* (2013.01)

(58) Field of Classification Search
CPC ................................................. H04W 72/0453
See application file for complete search history.

(56) References Cited

U.S. PATENT DOCUMENTS

| | | | | |
|---|---|---|---|---|
| 5,247,327 | A | 9/1993 | Suzuka et al. | |
| 9,696,421 | B2 * | 7/2017 | DiStasio | G01S 13/888 |
| 10,698,081 | B2 * | 6/2020 | Wallstedt | H04K 3/822 |

(Continued)

FOREIGN PATENT DOCUMENTS

| | | |
|---|---|---|
| JP | 5-93844 | 4/1993 |
| JP | 10-3109 | 1/1998 |

(Continued)

OTHER PUBLICATIONS

International Search Report (ISR) issued on Oct. 6, 2020 in International (PCT) Application No. PCT/JP2020/033555.

(Continued)

*Primary Examiner* — Blake J Rubin
(74) *Attorney, Agent, or Firm* — Wenderoth, Lind & Ponack, L.L.P.

(57)          ABSTRACT

A first apparatus that performs sensing to sense a second apparatus via radio waves includes: a communication unit that receives a frame transmitted by the second apparatus via radio waves and senses the second apparatus using the received frame; and a controller that selects, from among predetermined frequencies, a frequency for the second apparatus to transmit the radio waves at, notifies the second apparatus of the selected frequency, and controls the communication unit perform the sensing using the frequency.

7 Claims, 181 Drawing Sheets

(56) References Cited

U.S. PATENT DOCUMENTS

| | | | |
|---|---|---|---|
| 10,795,009 B2 * | 10/2020 | Lien | G01S 13/42 |
| 11,102,750 B2 * | 8/2021 | Gabay | G01S 13/003 |
| 11,105,912 B2 * | 8/2021 | Yokev | H04W 56/0045 |
| 2002/0024422 A1 | 2/2002 | Turner et al. | |
| 2006/0180363 A1 | 8/2006 | Uchisasai et al. | |
| 2007/0060079 A1 | 3/2007 | Nakagawa et al. | |
| 2008/0018521 A1 | 1/2008 | Sahinoglu et al. | |
| 2009/0081923 A1 * | 3/2009 | Dooley | A63F 9/143 |
| | | | 463/6 |
| 2013/0316730 A1 | 11/2013 | Ding | |
| 2016/0259041 A1 * | 9/2016 | Tan | G01S 13/003 |
| 2017/0299696 A1 * | 10/2017 | Fuller | G01S 7/003 |
| 2018/0081048 A1 * | 3/2018 | Saitou | G01S 13/46 |
| 2018/0095161 A1 | 4/2018 | Kellum et al. | |
| 2018/0231653 A1 * | 8/2018 | Pradeep | G10L 15/26 |
| 2019/0028215 A1 * | 1/2019 | Kitsunezuka | H04B 7/0634 |
| 2019/0059012 A1 | 2/2019 | Nam et al. | |
| 2019/0162817 A1 | 5/2019 | Priyanto et al. | |
| 2020/0036487 A1 * | 1/2020 | Hammond | H04L 5/0012 |
| 2020/0084369 A1 | 3/2020 | Kimishima | |
| 2020/0107249 A1 * | 4/2020 | Stauffer | H04W 48/14 |
| 2020/0150263 A1 * | 5/2020 | Eitan | G01S 13/003 |
| 2020/0213970 A1 * | 7/2020 | Gabay | H04W 64/003 |
| 2020/0371220 A1 * | 11/2020 | Eitan | G01S 13/46 |
| 2021/0239831 A1 * | 8/2021 | Shin | G10L 25/51 |
| 2022/0066018 A1 * | 3/2022 | Han | G01S 7/0232 |
| 2022/0146625 A1 * | 5/2022 | Nishikido | G01S 7/4091 |
| 2022/0330116 A1 * | 10/2022 | Abeysekera | H04W 16/14 |

FOREIGN PATENT DOCUMENTS

| | | |
|---|---|---|
| JP | 10-232338 | 9/1998 |
| JP | 2002-64404 | 2/2002 |
| JP | 2004-322809 | 11/2004 |
| JP | 2006-230101 | 8/2006 |
| JP | 2007-71819 | 3/2007 |
| JP | 2008-26310 | 2/2008 |
| JP | 2010-78527 | 4/2010 |
| JP | 2011-80799 | 4/2011 |
| JP | 2013-72732 | 4/2013 |
| JP | 2014-138290 | 7/2014 |
| JP | 2018-522306 | 8/2018 |
| KR | 10-1615319 | 4/2016 |
| WO | 2016/200508 | 12/2016 |
| WO | 2018/056819 | 3/2018 |
| WO | 2018/179695 | 10/2018 |

OTHER PUBLICATIONS

S. Schuster, S. Scheiblhofer, R. Feger, and A. Stelzer, "Signal Model and Statistical Analysis for the Sequential Sampling Pulse Radar Technique," in Proc. IEEE Radar Conf, 2008, pp. 1-6, 2008.

D. Cao, T. Li, P. Kang, H. Liu, S. Zhou, H. Su, "Single-Pulse Multi-Beams Operation of Phased Array Radar," 2016 CIE International Conference on Radar (Radar), pp. 1-4, 2016.

A. Bourdoux, K. Parashar, and M. Bauduin, "Phenomenology of Mutual Interference of FMCW and PMCW Automotive Radars," in 2017 IEEE Radar Conference (Radar Conf.), pp. 1709-1714, 2017.

J. Fink, F. K. Jondral, "Comparison of OFDM Radar and Chirp Sequence Radar," in 2015 16th International Radar Symposium (IRS), pp. 315-320, 2015.

Hadizadehmoghaddam, Sepehr et al., "Simultaneous Execution of Multiple Radar Tasks using OFDMA", 2017 IEEE Radar Conference, IEEE, May 2017, pp. 0622-0626.

Extended European Search Report issued Aug. 23, 2022 in corresponding European Patent Application No. 20861447.9.

* cited by examiner

REFERENCE SYMBOL FOR COMMUNI-CATION

Y1302

MODULATED SIGNAL FOR OBJECT DETECTION OR MODULATED SIGNAL FOR ESTIMATING DISTANCE TO OBJECT

TIME

FIG. 19

TIME

FREQUENCY

PREAMBLE

CONTROL INFOR-MATION SYMBOL

DATA SYMBOL

FIG. 21

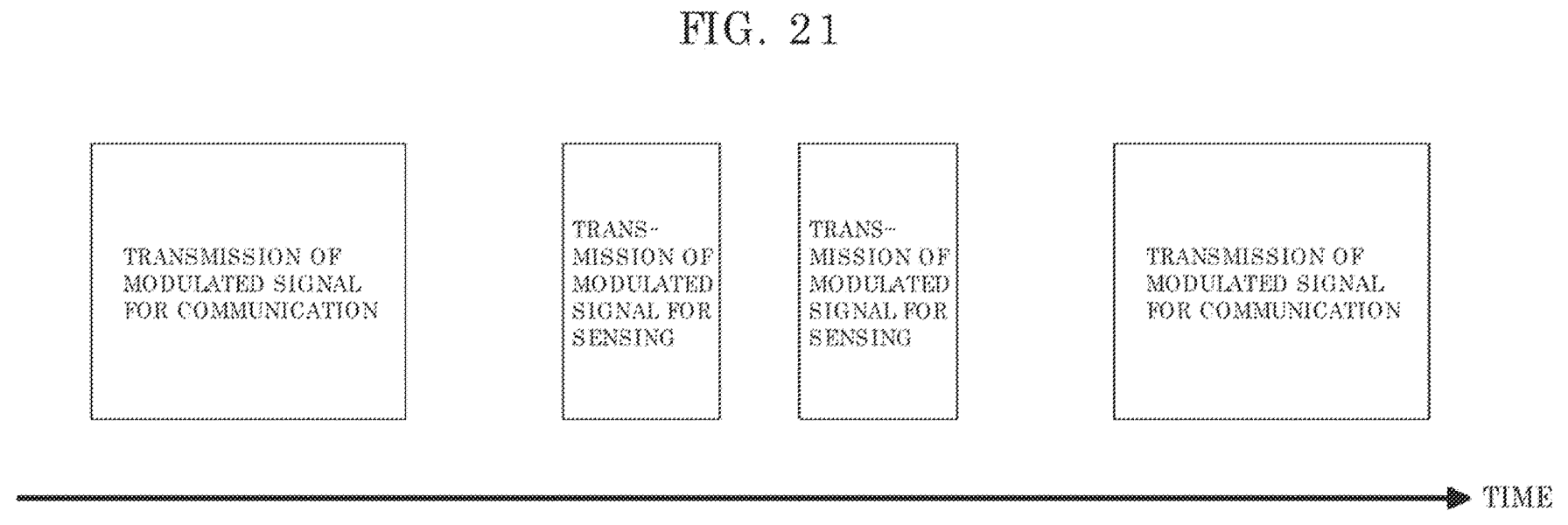

TRANSMISSION OF MODULATED SIGNAL FOR COMMUNICATION

TRANSMISSION OF MODULATED SIGNAL FOR SENSING

TRANSMISSION OF MODULATED SIGNAL FOR SENSING

TRANSMISSION OF MODULATED SIGNAL FOR COMMUNICATION

TIME

FIG. 22

| PREAMBLE | CONTROL INFOR- MATION SYMBOL | DATA SYMBOL | MID- AMBLE | DATA SYMBOL |

FREQUENCY

TIME

FIG. 23

PREAMBLE

CONTROL INFOR-MATION SYMBOL

DATA SYMBOL

MID-AMBLE

DATA SYMBOL

GUARD INTERVAL

FREQUENCY

TIME

Figure 28:
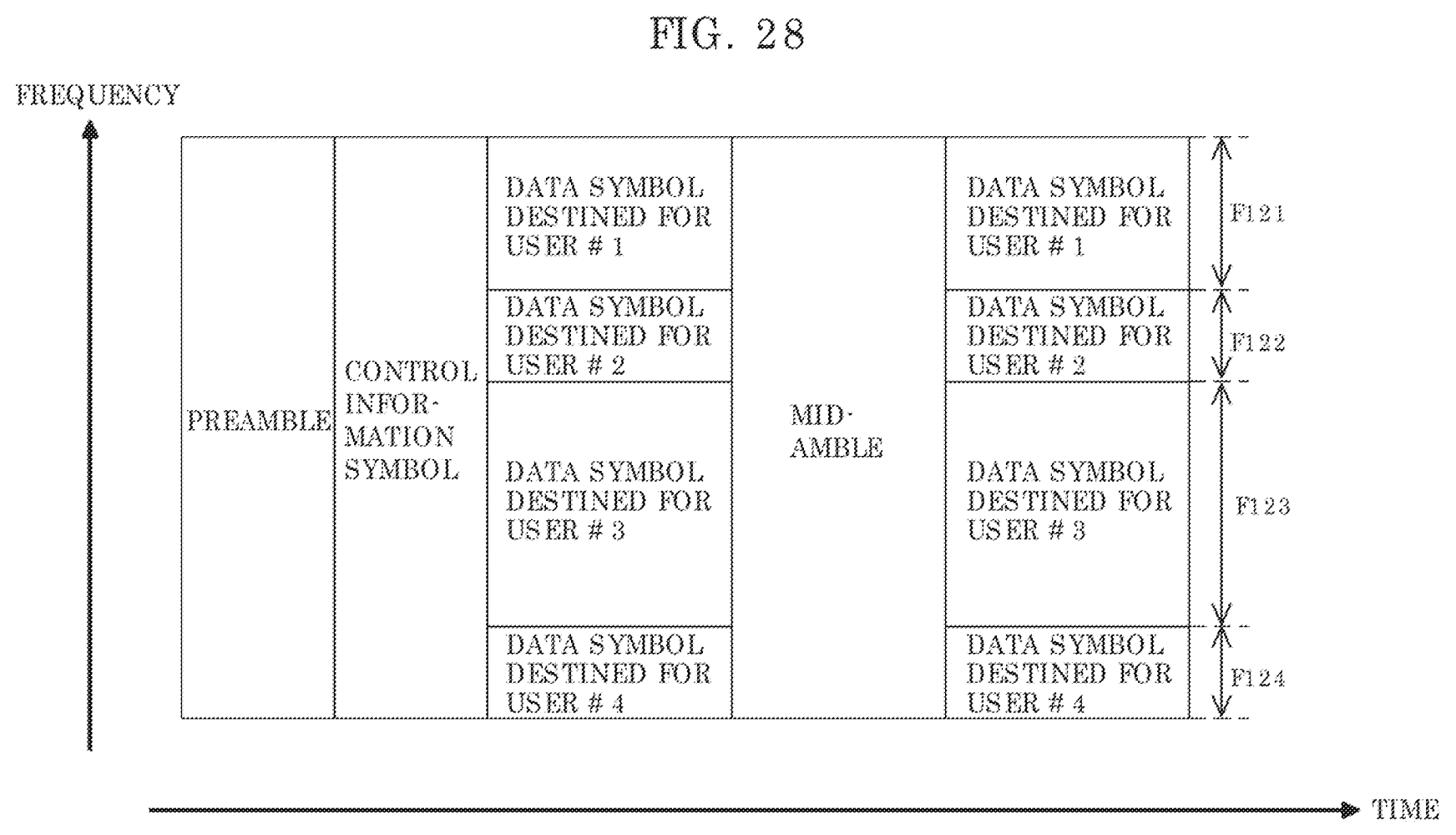

FREQUENCY

| | | | F121 |
| PREAMBLE | CONTROL INFOR- MATION SYMBOL | DATA SYMBOL DESTINED FOR USER # 1 | | DATA SYMBOL DESTINED FOR USER # 1 |

DATA SYMBOL DESTINED FOR USER # 2 — F122

MID- AMBLE

DATA SYMBOL DESTINED FOR USER # 3 — F123

DATA SYMBOL DESTINED FOR USER # 4 — F124

TIME

Figure 33:
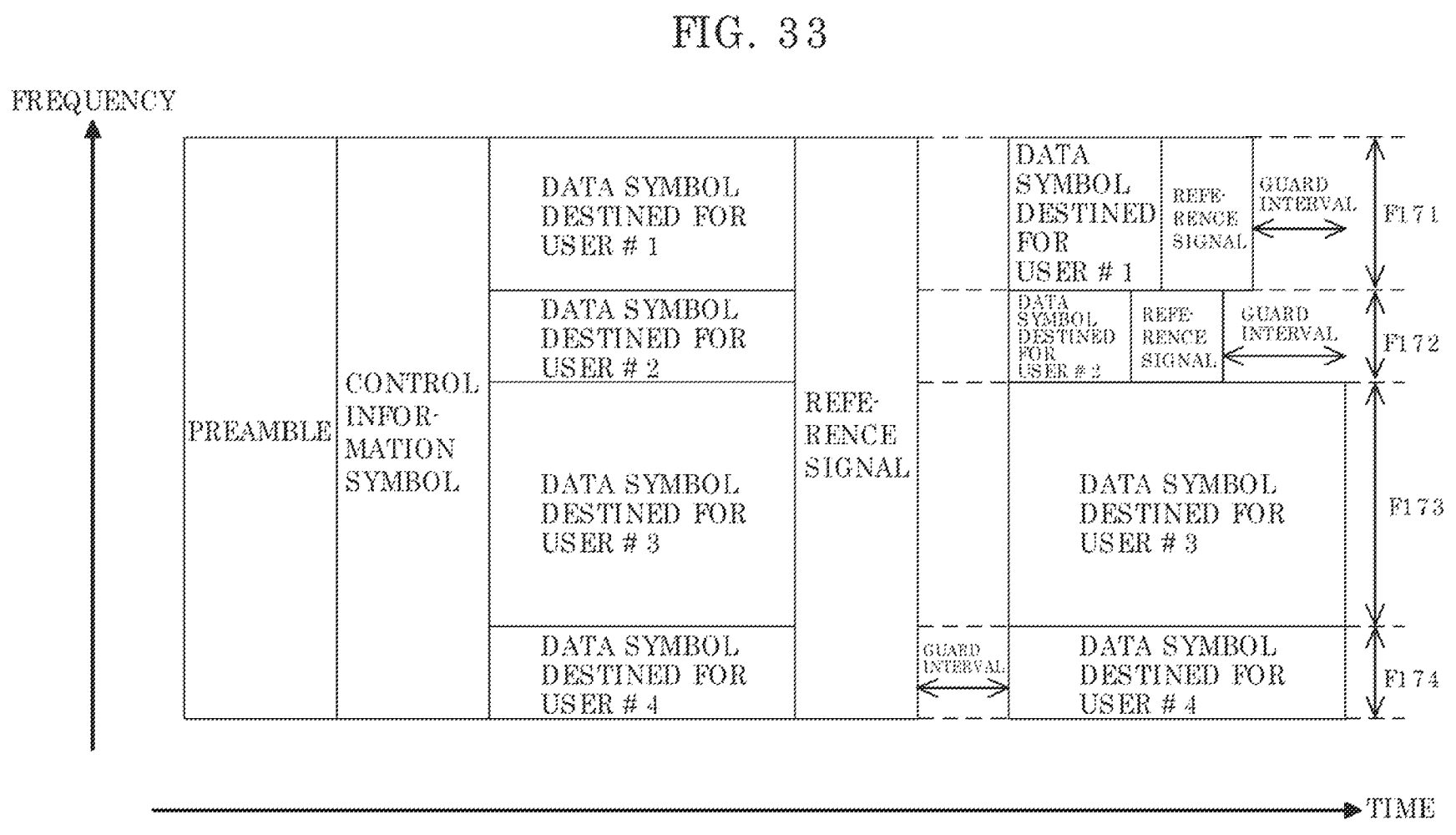

FREQUENCY

TIME

F171    F172    F173    F174

DATA SYMBOL DESTINED FOR USER # 1

GUARD INTERVAL

REFE-RENCE SIGNAL

DATA SYMBOL DESTINED FOR USER # 2

GUARD INTERVAL

REFE-RENCE SIGNAL

DATA SYMBOL DESTINED FOR USER # 3

DATA SYMBOL DESTINED FOR USER # 4

GUARD INTERVAL

REFE-RENCE SIGNAL

DATA SYMBOL DESTINED FOR USER # 1

DATA SYMBOL DESTINED FOR USER # 2

DATA SYMBOL DESTINED FOR USER # 3

DATA SYMBOL DESTINED FOR USER # 4

CONTROL INFOR-MATION SYMBOL

PREAMBLE

FIG. 39

DEVICE A11

DETECTING APPARATUS A12

AP A21

NETWORK A22

BASE STATION A23

APPARATUS A24

START

UPLOAD INFORMATION ABOUT IN-HOME DEVICE TO CLOUD SERVER — N901

UPLOAD INFORMATION RELATED TO PAIRING OF IN-HOME DEVICE OPERATION AND SENSING TO CLOUD SERVER — N902

END INITIAL REGISTRATION — N903

START

N1101

PERFORM SENSING

N1102

UPLOAD INFORMATION RELATED TO IN-HOME STATUS TO CLOUD SERVER

N1103

NEW STATE DETECTED?

NO

YES

N1104

UPDATE INFORMATION RELATED TO IN-HOME STATUS IN CLOUD SERVER

START

IN-HOME STATUS SENSING — Q201

UPLOAD INFORMATION RELATED
TO IN-HOME STATUS TO SERVER — Q202

END INITIAL SENSING
(OR SENSING FOR UPDATING) — Q203

FIG. 62

THIRD APPARATUS

WIRELESS SENSING UNIT

CAMERA

THREE-DIMENSIONAL SPACE ESTIMATOR

MONITOR

FIG. 63

THIRD APPARATUS

CAMERA

WIRELESS SENSING UNIT

THREE-DIMENSIONAL SPACE ESTIMATOR

MONITOR

Figure 66:
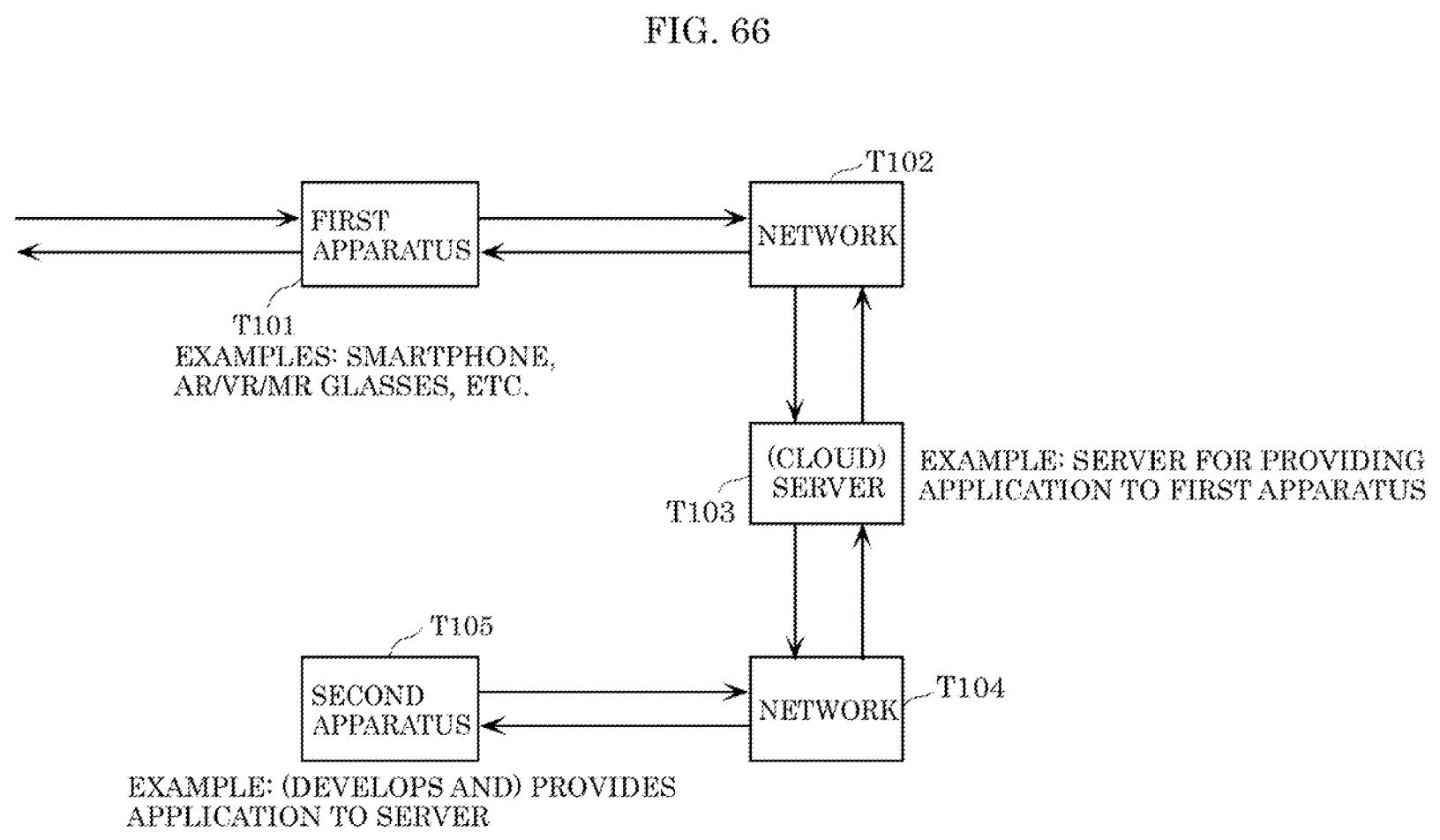

T102   NETWORK

T103   (CLOUD) SERVER

EXAMPLE: SERVER FOR PROVIDING APPLICATION TO FIRST APPARATUS

T104   NETWORK

T101   FIRST APPARATUS

EXAMPLES: SMARTPHONE, AR/VR/MR GLASSES, ETC.

T105   SECOND APPARATUS

EXAMPLE: (DEVELOPS AND) PROVIDES APPLICATION TO SERVER

Figure 70:
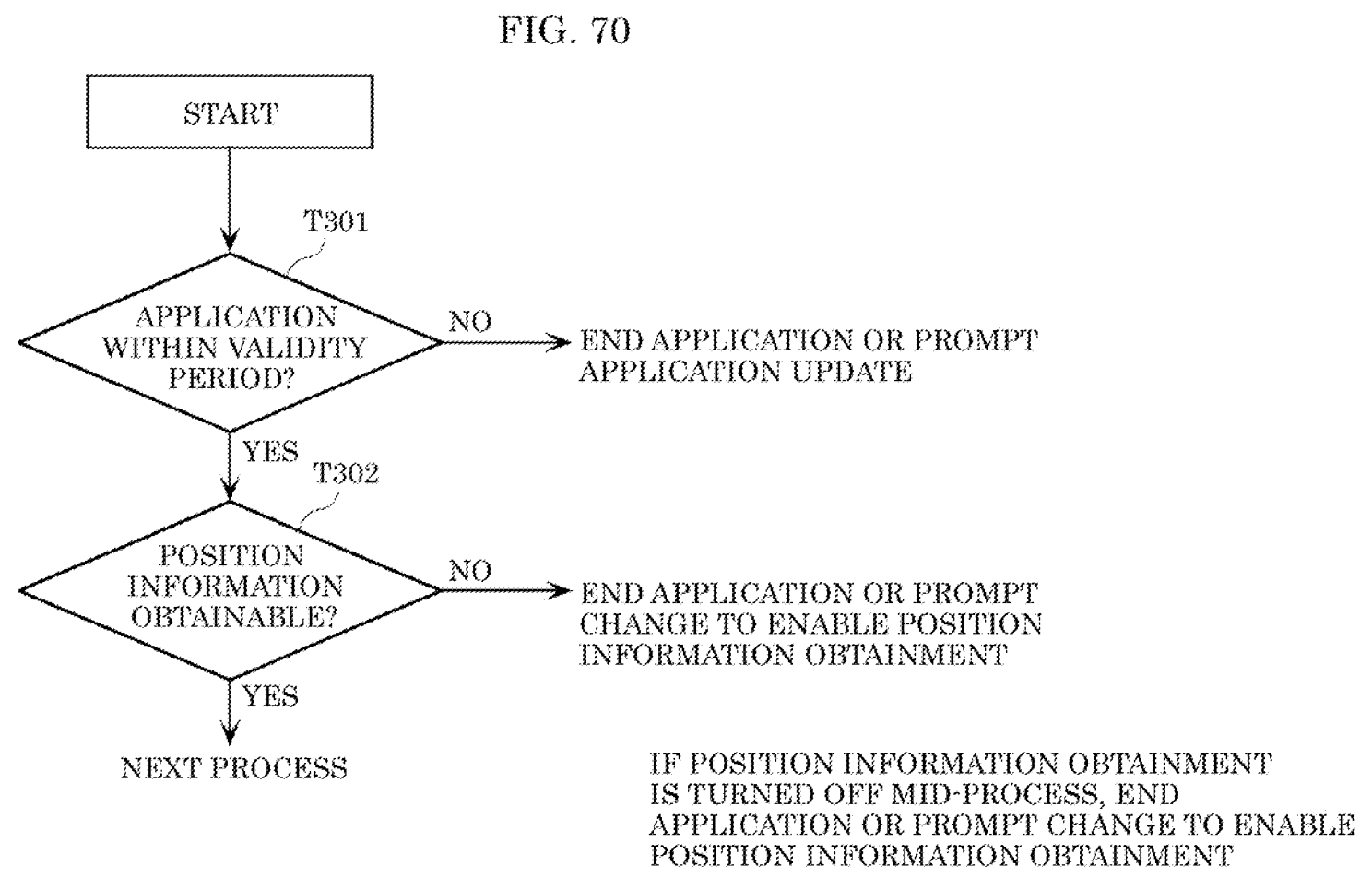

START

T301

APPLICATION WITHIN VALIDITY PERIOD?

NO → END APPLICATION OR PROMPT APPLICATION UPDATE

YES

T302

POSITION INFORMATION OBTAINABLE?

NO → END APPLICATION OR PROMPT CHANGE TO ENABLE POSITION INFORMATION OBTAINMENT

YES

NEXT PROCESS

IF POSITION INFORMATION OBTAINMENT IS TURNED OFF MID-PROCESS, END APPLICATION OR PROMPT CHANGE TO ENABLE POSITION INFORMATION OBTAINMENT

POSITION ESTIMATOR:
RECOGNIZES POSITION
TO BE IN VICINITY OF
4-2-8 SHIBAKOUEN,
MINATO-KU, TOKYO

T501

SIGNAL PROCESSOR:

RECOGNIZE VICINITY OF TOKYO TOWER

OBTAIN IMAGE

T603

MONITOR:

(A) SHOP
SELLS ELECTRONICS
LOW PRICES (B) GAME
IMPLEMENTABLE

CHARACTER GROUP

FIG. 78
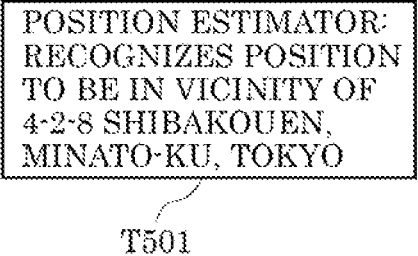
POSITION ESTIMATOR:
RECOGNIZES POSITION
TO BE IN VICINITY OF
4-2-8 SHIBAKOUEN,
MINATO-KU, TOKYO
T501
SIGNAL PROCESSOR:
RECOGNIZE VICINITY OF TOKYO TOWER
OBTAIN IMAGE
T613
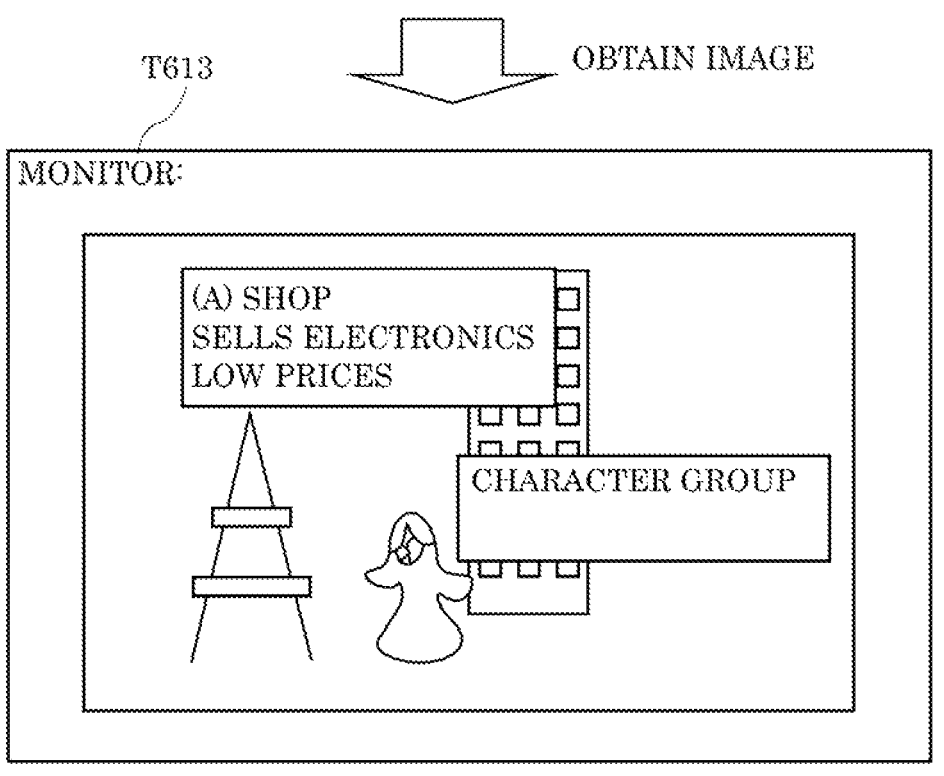
MONITOR:
(A) SHOP
SELLS ELECTRONICS
LOW PRICES
CHARACTER GROUP FIG. 79
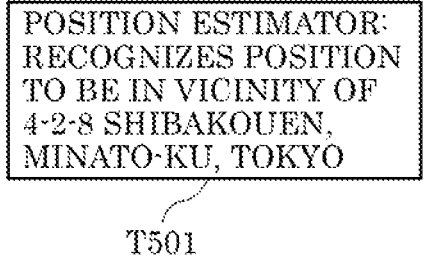
POSITION ESTIMATOR:
RECOGNIZES POSITION
TO BE IN VICINITY OF
4-2-8 SHIBAKOUEN,
MINATO-KU, TOKYO
T501
SIGNAL PROCESSOR:
RECOGNIZE VICINITY OF TOKYO TOWER
OBTAIN IMAGE
T623
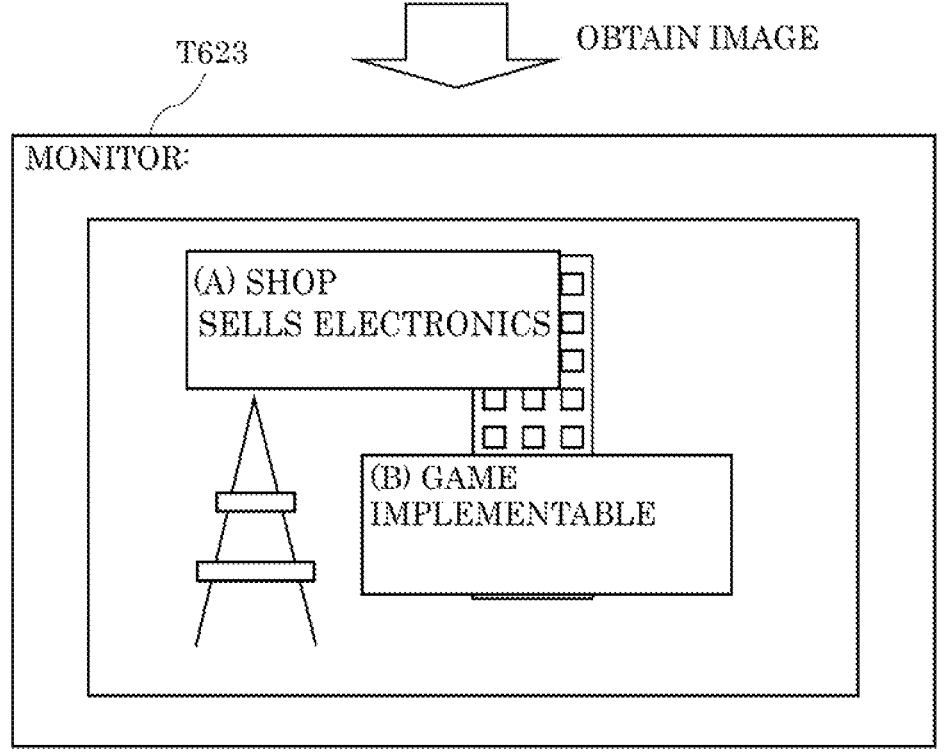
MONITOR:
(A) SHOP
SELLS ELECTRONICS
(B) GAME
IMPLEMENTABLE FIG. 80
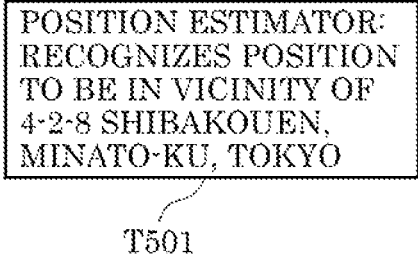
T501
SIGNAL PROCESSOR:
RECOGNIZE VICINITY OF TOKYO TOWER
OBTAIN IMAGE
T633
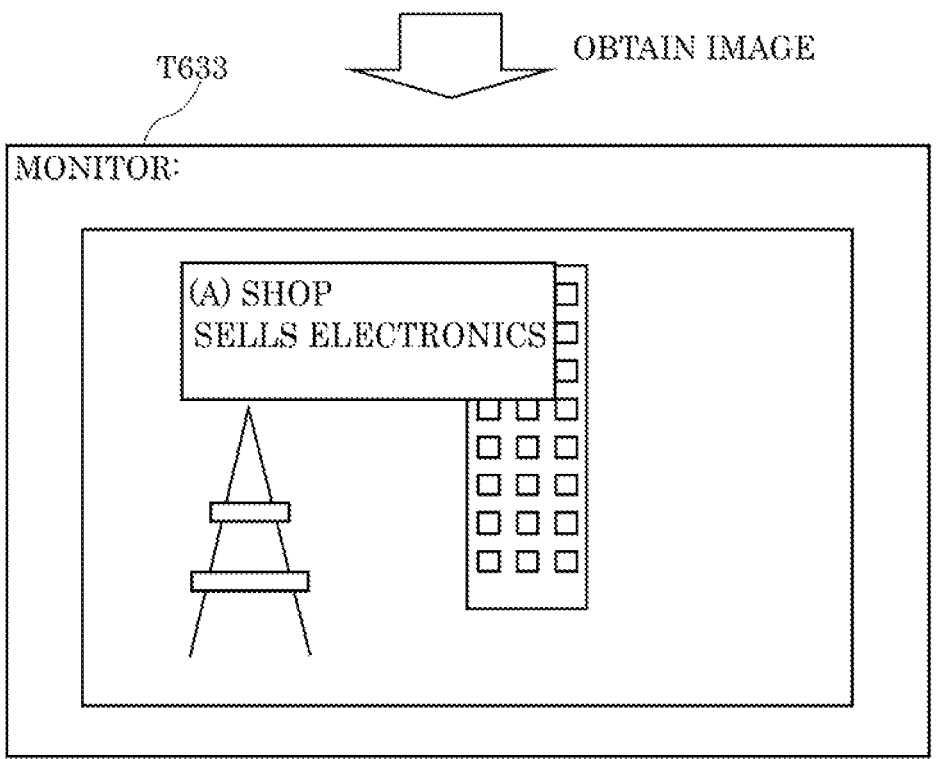

POSITION ESTIMATOR:
RECOGNIZES POSITION
TO BE IN VICINITY OF
4-2-8 SHIBAKOUEN,
MINATO-KU, TOKYO

T501

SIGNAL PROCESSOR:

RECOGNIZE VICINITY OF TOKYO TOWER

OBTAIN IMAGE

T903

FIG. 88
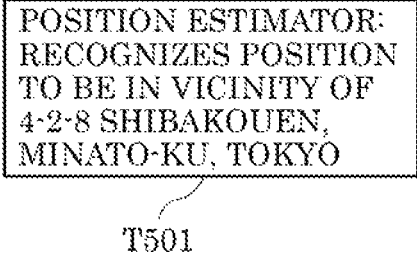
T501
SIGNAL PROCESSOR:
    RECOGNIZE VICINITY OF TOKYO TOWER
OBTAIN IMAGE
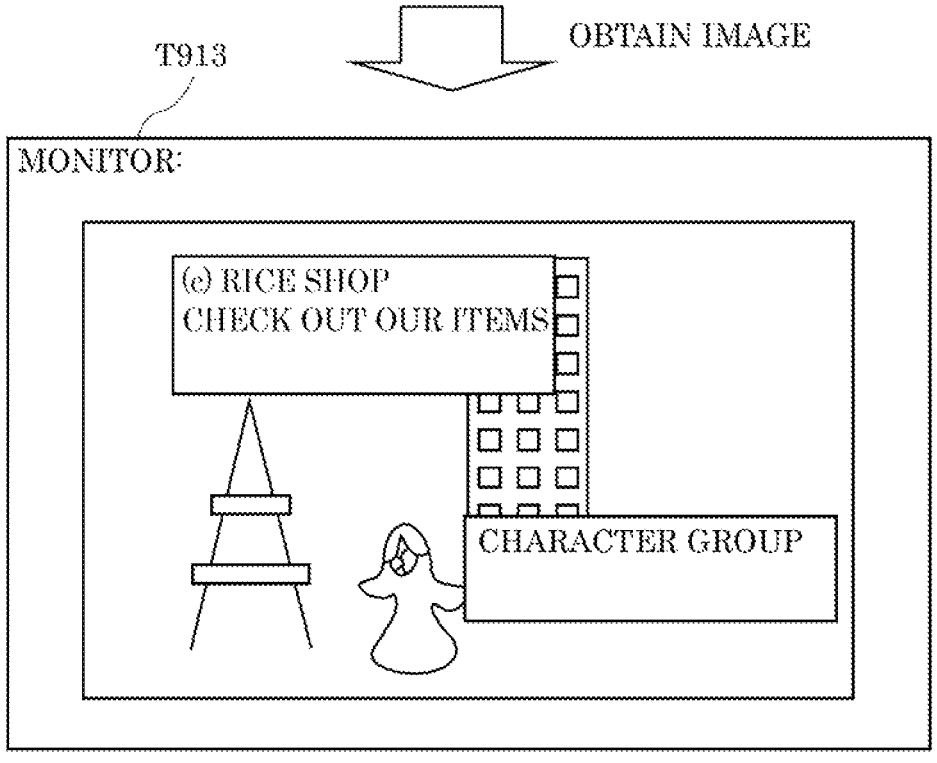

POSITION ESTIMATOR:
RECOGNIZES POSITION
TO BE IN VICINITY OF
4-2-8 SHIBAKOUEN,
MINATO-KU, TOKYO

T501

SIGNAL PROCESSOR:

RECOGNIZE VICINITY OF TOKYO TOWER

OBTAIN IMAGE

T923

FIG. 90
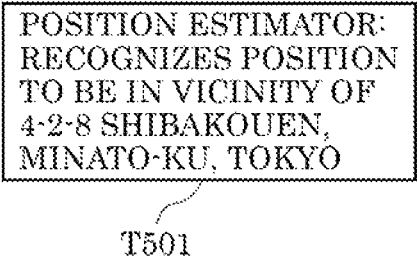
POSITION ESTIMATOR:
RECOGNIZES POSITION
TO BE IN VICINITY OF
4-2-8 SHIBAKOUEN,
MINATO-KU, TOKYO
T501
SIGNAL PROCESSOR:
RECOGNIZE VICINITY OF TOKYO TOWER
OBTAIN IMAGE
T933
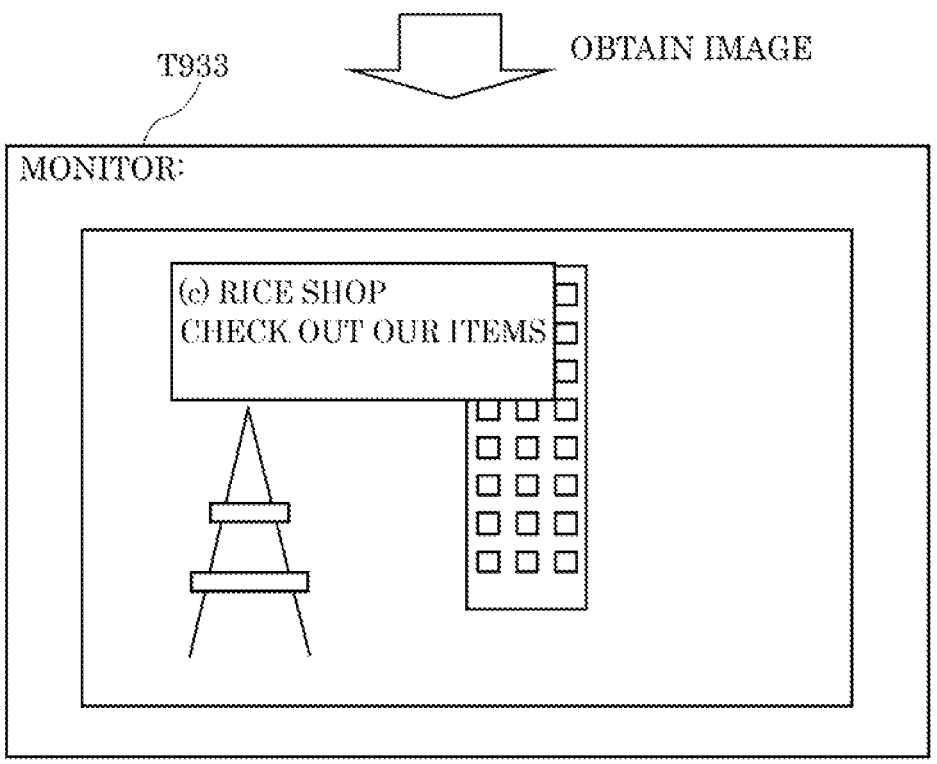
MONITOR:
(c) RICE SHOP
CHECK OUT OUR ITEMS FIG. 95
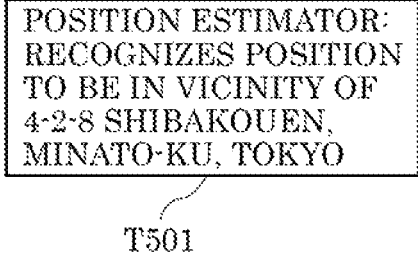
T501
SIGNAL PROCESSOR:
RECOGNIZE VICINITY OF TOKYO TOWER
OBTAIN IMAGE
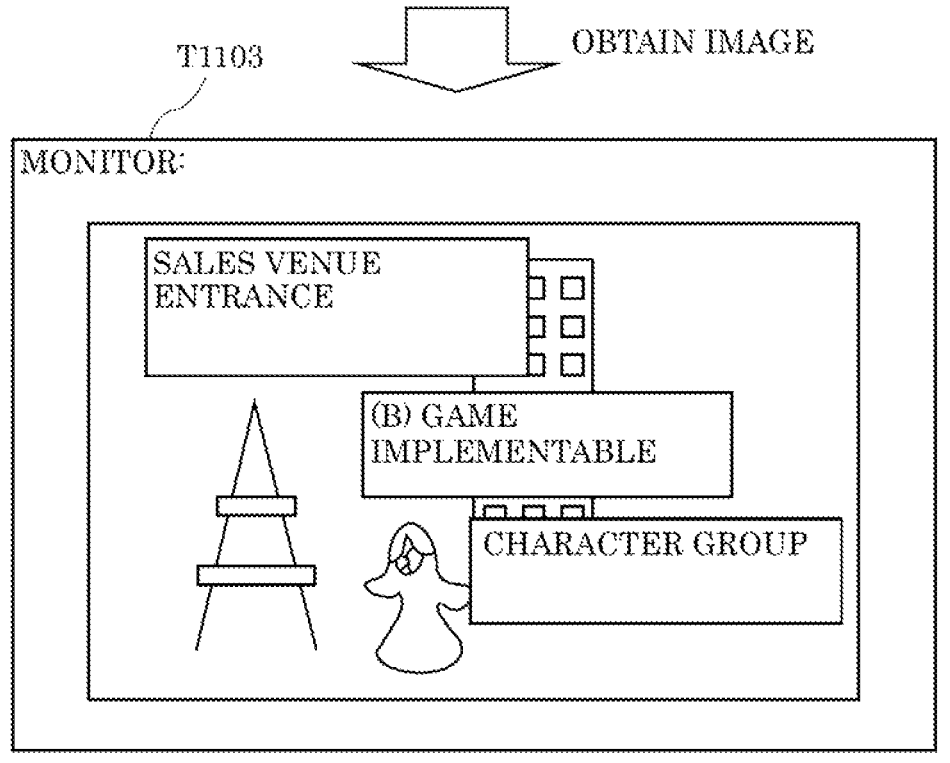

FIG. 96
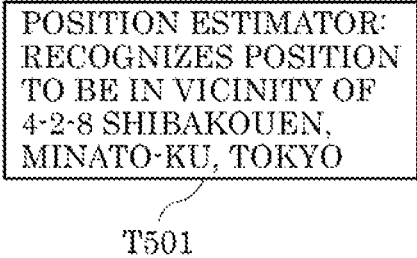
POSITION ESTIMATOR:
RECOGNIZES POSITION
TO BE IN VICINITY OF
4-2-8 SHIBAKOUEN,
MINATO-KU, TOKYO
T501
SIGNAL PROCESSOR:
RECOGNIZE VICINITY OF TOKYO TOWER
OBTAIN IMAGE
T1113
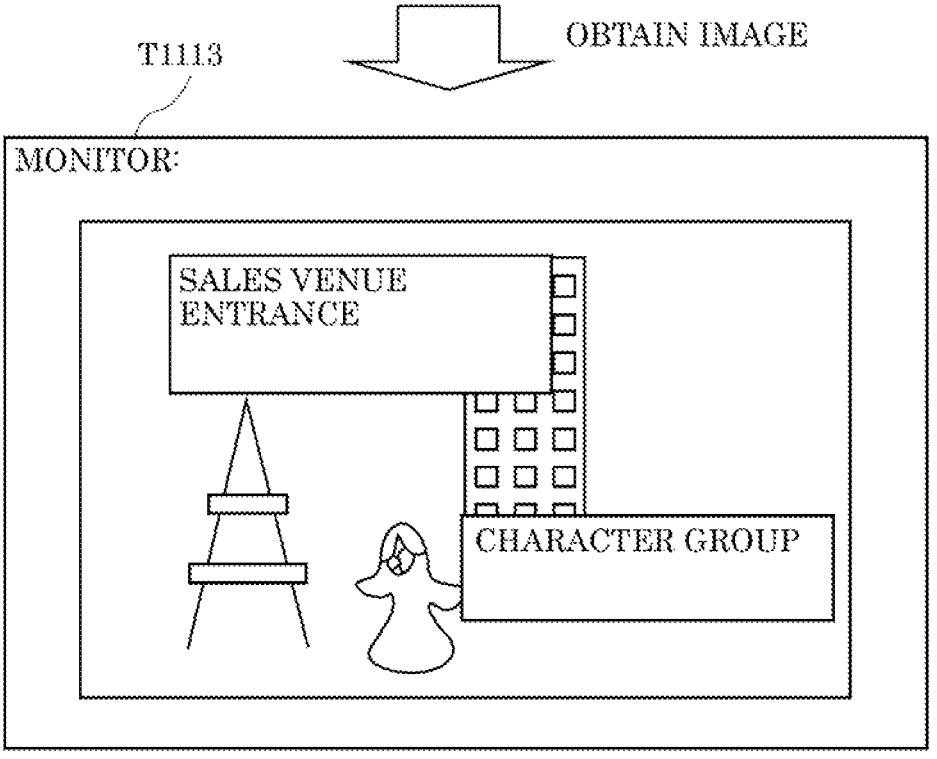

FIG. 97
POSITION ESTIMATOR:
RECOGNIZES POSITION
TO BE IN VICINITY OF
4-2-8 SHIBAKOUEN,
MINATO-KU, TOKYO
T501
SIGNAL PROCESSOR:
RECOGNIZE VICINITY OF TOKYO TOWER
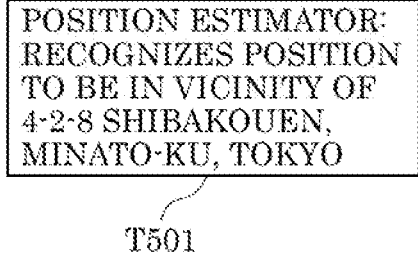
OBTAIN IMAGE
T1123
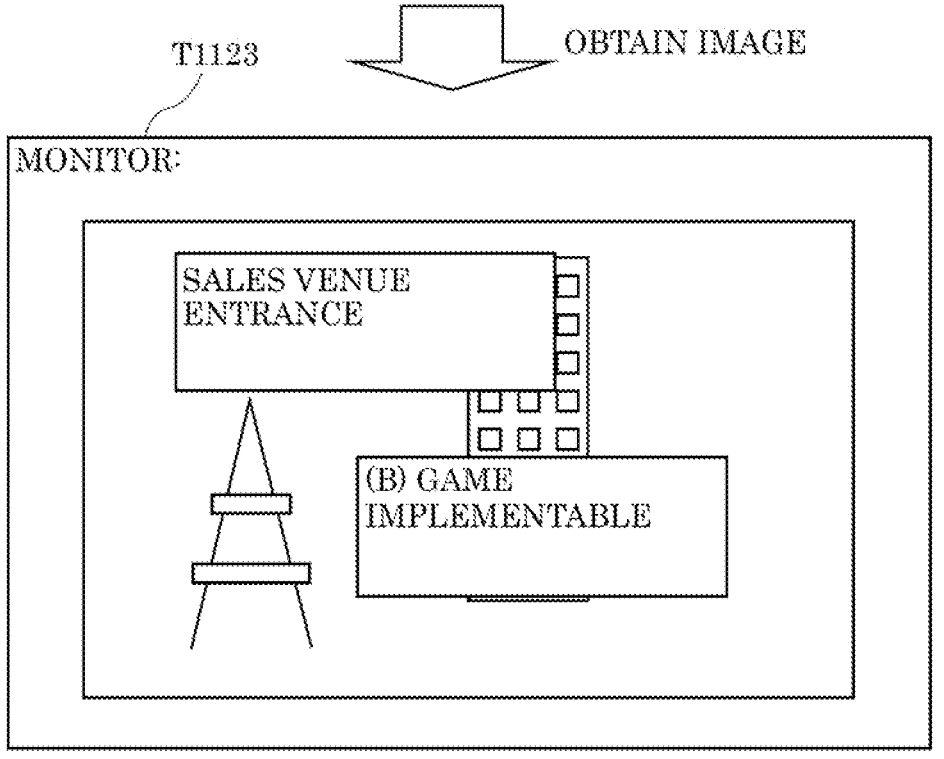
MONITOR:
SALES VENUE
ENTRANCE
(B) GAME
IMPLEMENTABLE FIG. 98
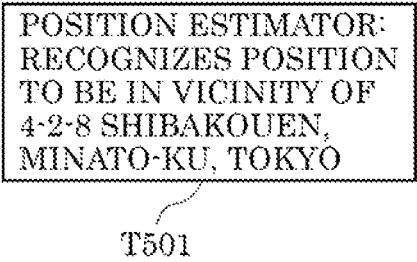
POSITION ESTIMATOR:
RECOGNIZES POSITION
TO BE IN VICINITY OF
4-2-8 SHIBAKOUEN,
MINATO-KU, TOKYO
T501
SIGNAL PROCESSOR:
RECOGNIZE VICINITY OF TOKYO TOWER
OBTAIN IMAGE
T1133
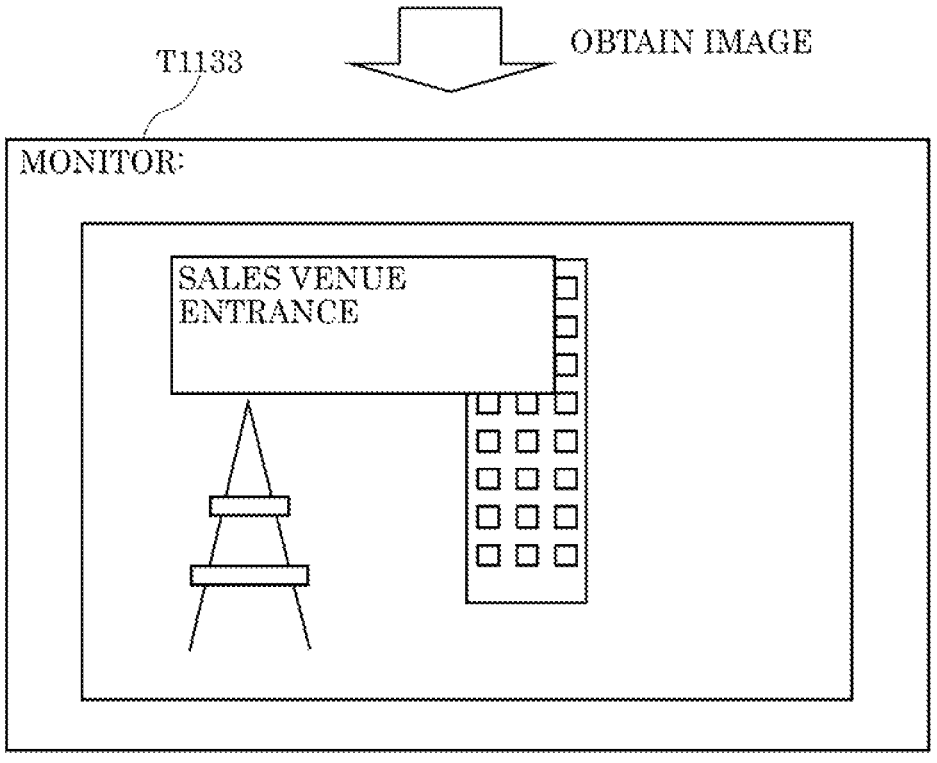
MONITOR:
SALES VENUE
ENTRANCE

FIG. 100

```
MONITOR:
  ALL ITEMS  ¥6,000
  KOSHIHIKARI #1 ¥6,000
  KOSHIHIKARI #2 ¥6,000
  KOSHIHIKARI #3 ¥6,000
  SASANISHIKI  #A ¥6,000
  SASANISHIKI  #B ¥6,000
```

FIG. 101

MONITOR:

KOSHIHIKARI #3　¥6,000

TOTAL: ¥6,000

SHIPPING ADDRESS:

1 CHIYODA, CHIYODA-KU, TOKYO
TARO SMITH
(TEL) 0123-456-7890

FIG. 107

11:00-11:15    DISPLAY FIRST DISPLAY GROUP

11:15-11:30    DISPLAY SECOND DISPLAY GROUP

11:30-11:45    DISPLAY THIRD DISPLAY GROUP

FIG. 108

| | |
|---|---|
| 11:00-11:15 | DISPLAY FIRST DISPLAY GROUP |
| 11:30-11:45 | DISPLAY SECOND DISPLAY GROUP |
| 12:00-12:15 | DISPLAY THIRD DISPLAY GROUP |
| • • • | • • • |

FIG. 109

11:00-11:15     DISPLAY FIRST DISPLAY GROUP

11:30-11:45     DISPLAY FIRST DISPLAY GROUP

12:00-12:15     DISPLAY FIRST DISPLAY GROUP

OTHER FRAME

FRAME TO TERMINAL #1

OTHER FRAME

FREQUENCY

TIME

OTHER FRAME

FRAME FROM TERMINAL #1

OTHER FRAME

FREQUENCY

TIME

FIG. 116

1_1TH APPARATUS

SECOND APPARATUS

TRANSMIT SENSING REQUEST INFORMATION W301

TRANSMIT RESPONSE W311

RECEIVE RESPONSE W302

TRANSMIT SIGNAL FOR SENSING W312

ESTIMATE TARGET (OBJECT) POSITION W313

TRANSMIT TARGET (OBJECT) ESTIMATION RESULT INFORMATION W314

RECEIVE ESTIMATION RESULT INFORMATION W303

FIG. 124A

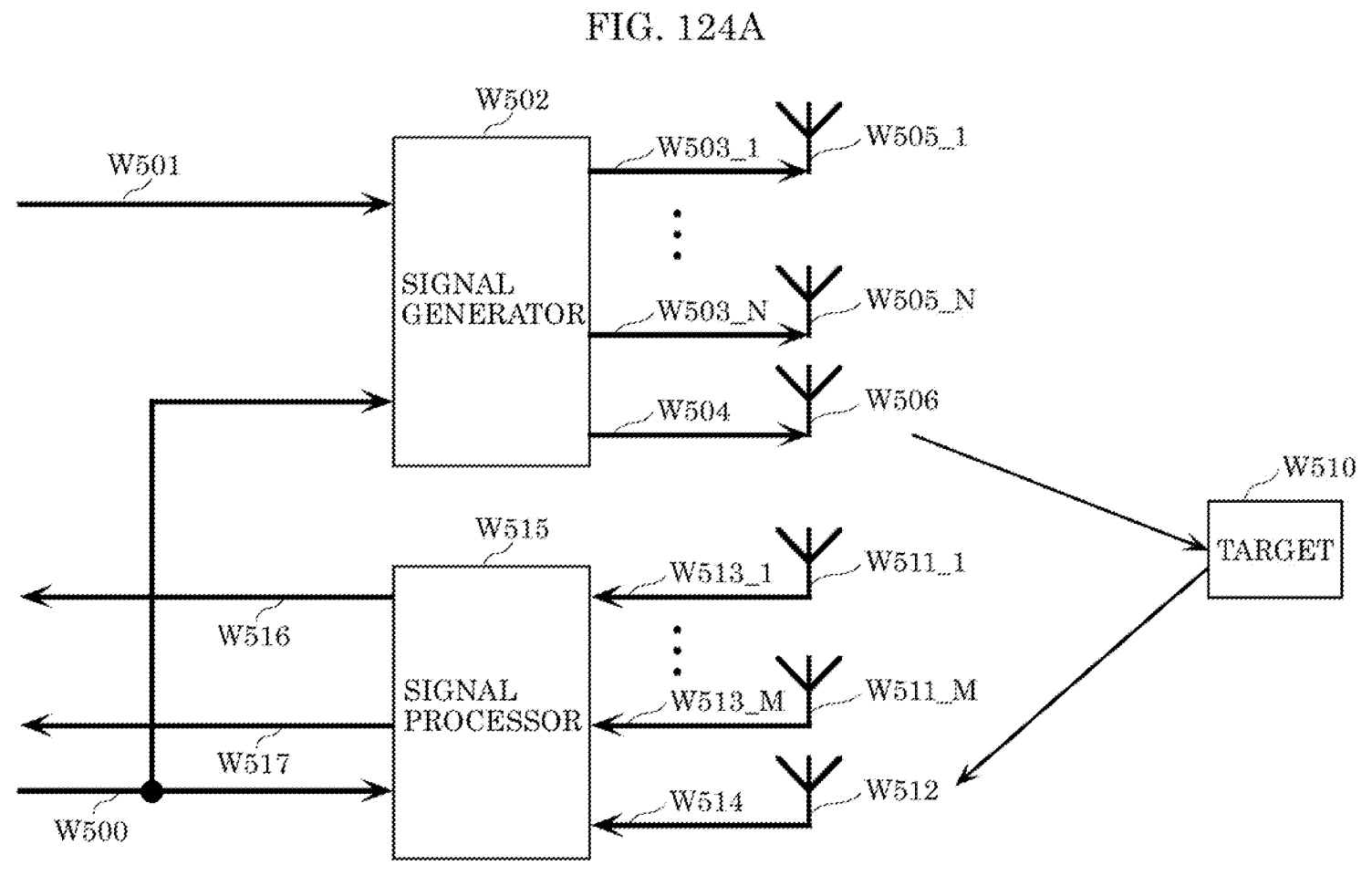

W510 TARGET

W505_1
W505_N
W506
W511_1
W511_M
W512

W503_1
W503_N
W504
W513_1
W513_M
W514

W502 SIGNAL GENERATOR

W515 SIGNAL PROCESSOR

SIGNAL TRANSMISSION INTERVAL

TIME v1

TIME v2

TIME

TARGET
(OBJECT)

W701_1

3_1TH
APPARATUS

W701_2

3_2TH
APPARATUS

W701_3

3_3TH
APPARATUS

Figure 130:
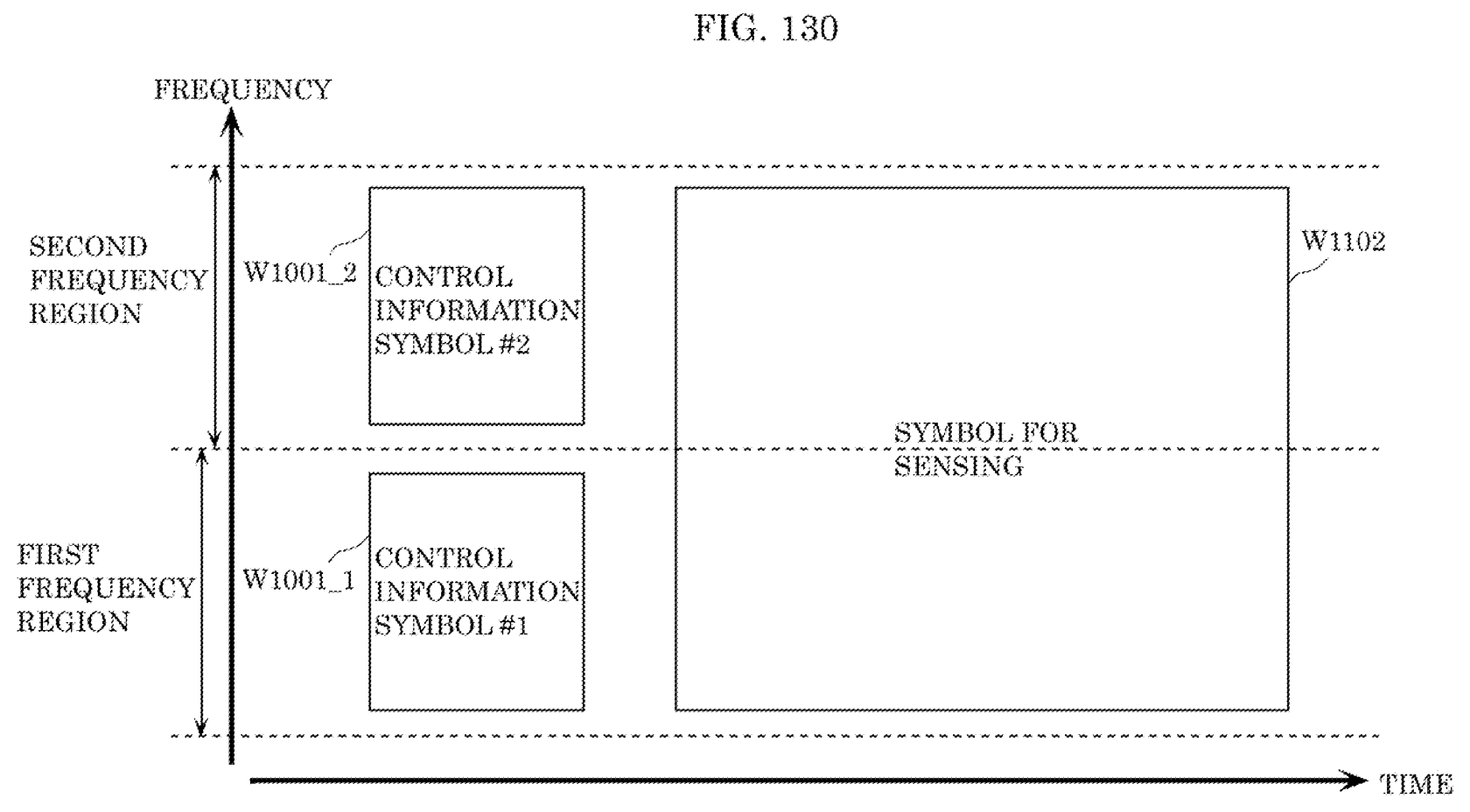

FREQUENCY

W1102

SYMBOL FOR SENSING

SECOND FREQUENCY REGION

W1001_2  CONTROL INFORMATION SYMBOL #2

FIRST FREQUENCY REGION

W1001_1  CONTROL INFORMATION SYMBOL #1

TIME

Figure 134:
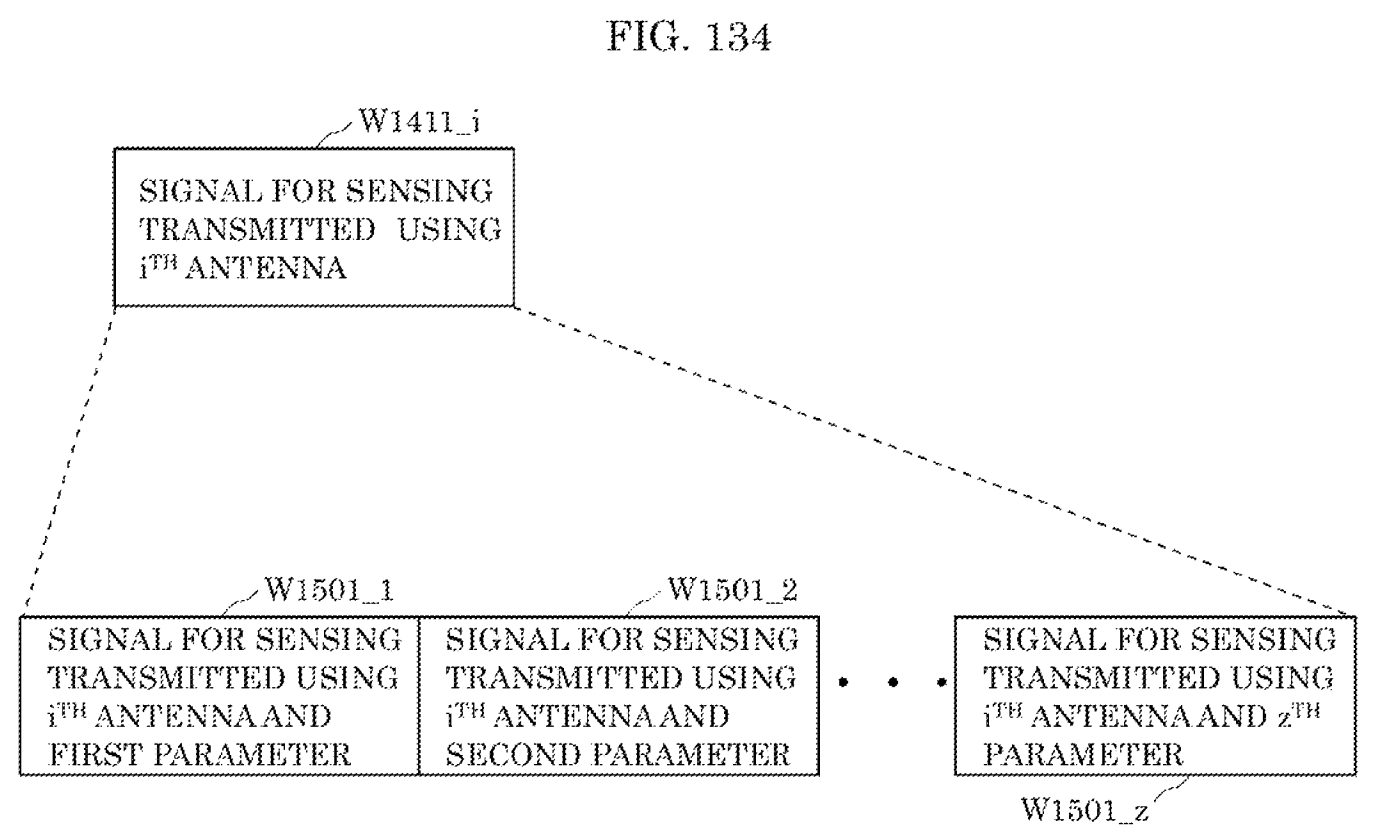

SIGNAL FOR SENSING TRANSMITTED USING $i^{TH}$ ANTENNA

W1501_1

SIGNAL FOR SENSING TRANSMITTED USING $i^{TH}$ ANTENNA AND FIRST PARAMETER

W1501_2

SIGNAL FOR SENSING TRANSMITTED USING $i^{TH}$ ANTENNA AND SECOND PARAMETER

W1501_z

SIGNAL FOR SENSING TRANSMITTED USING $i^{TH}$ ANTENNA AND $z^{TH}$ PARAMETER

Figure 135:
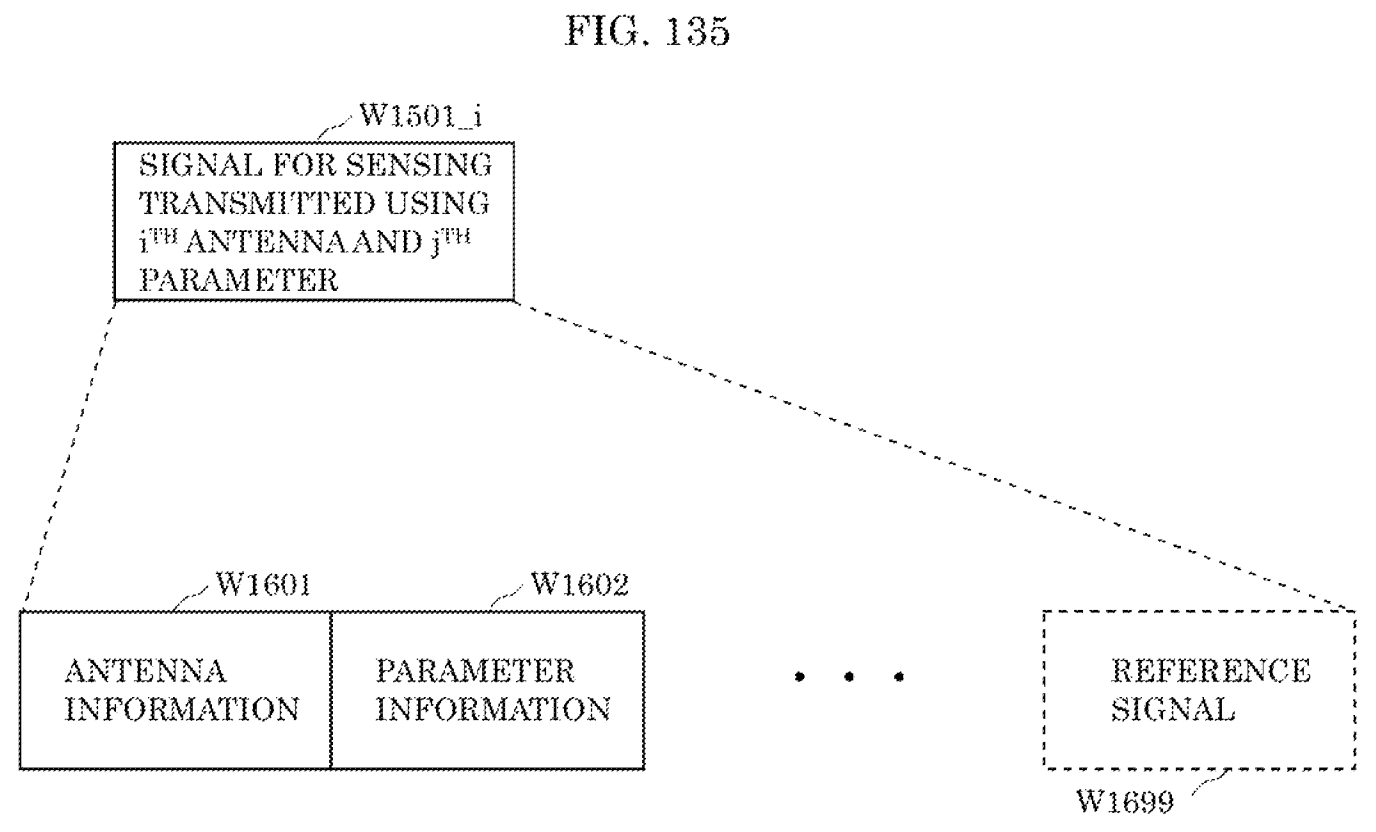

SIGNAL FOR SENSING TRANSMITTED USING i$^{TH}$ ANTENNA AND j$^{TH}$ PARAMETER

W1601 — ANTENNA INFORMATION

W1602 — PARAMETER INFORMATION

REFERENCE SIGNAL

Figure 147:
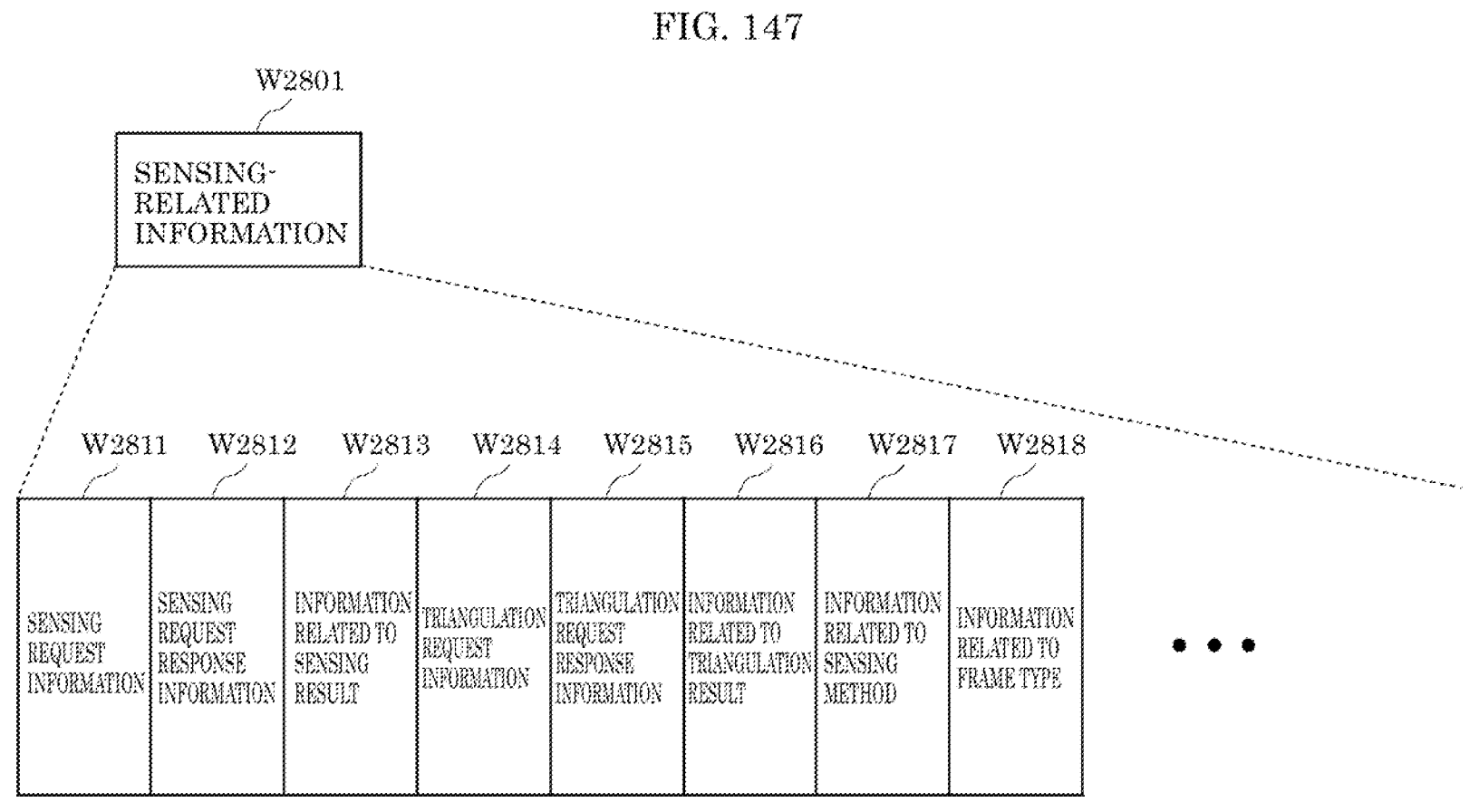

SENSING-RELATED INFORMATION

| W2811 | W2812 | W2813 | W2814 | W2815 | W2816 | W2817 | W2818 |
|---|---|---|---|---|---|---|---|
| SENSING REQUEST INFORMATION | SENSING REQUEST RESPONSE INFORMATION | INFORMATION RELATED TO SENSING RESULT | TRIANGULATION REQUEST INFORMATION | TRIANGULATION REQUEST RESPONSE INFORMATION | INFORMATION RELATED TO TRIANGULATION RESULT | INFORMATION RELATED TO SENSING METHOD | INFORMATION RELATED TO FRAME TYPE |

| W2901 | W2902 | W2913 |
|---|---|---|
| PREAMBLE | CONTROL INFORMATION SYMBOL | SYMBOL FOR SENSING |

TIME

FIG. 156A

| | | |
|---|---|---|
| ay801 | ay802 | ay803 |
| ay804 | ay805 | ay806 |
| ay807 | ay808 | ay809 |

FIG. 158A

| | | | |
|---|---|---|---|
| ay1001 | ay1002 | ay1003 | ay1004 |
| ay1005 | ay1006 | ay1007 | ay1008 |
| ay1009 | ay1010 | ay1011 | ay1012 |
| ay1013 | ay1014 | ay1015 | ay1016 |

COMMUNICATION APPARATUS AND COMMUNICATION METHOD

CROSS REFERENCE TO RELATED APPLICATIONS

This application is a U.S. continuation application of PCT International Patent Application Number PCT/JP2020/033555 filed on Sep. 4, 2020, claiming the benefit of priority of U.S. Provisional Patent Application No. 62/895,673 filed on Sep. 4, 2019, Japanese Patent Application No. 2019-204317 filed on Nov. 11, 2019, Japanese Patent Application No. 2020-023816 filed on Feb. 14, 2020, and Japanese Patent Application No. 2020-105635 filed on Jun. 18, 2020, the entire contents of which are hereby incorporated by reference.

BACKGROUND

1. Technical Field

The present disclosure relates to a communication apparatus and a communication method.

2. Description of the Related Art

One method of sensing the situation in the surrounding area includes a method of detecting light in the surrounding area using, for example, a camera, and a method of detecting light, infrared light, ultrasound waves that have reflected off something in the surrounding area. In recent years, a method of sensing the situation in the surrounding area using radio waves has also been proposed.

SUMMARY

There are various purposes for using spatial sensing, applications of spatial sensing, and environments in which spatial sensing is used.

In view of this, one aspect of the present disclosure provides a communication and transmitting apparatus and a communication and transmitting method capable of performing sensing in the surrounding area using radio waves. Another aspect of the present disclosure provides a communication apparatus and a communication method that operate according to a communication protocol for controlling the time and frequency at which to performing sensing in the surrounding area using radio waves. Another aspect of the present disclosure provides an apparatus, a system, and a method for presenting information to a user in accordance with a result of sensing the surrounding area using radio waves, light, infrared light, and/or ultrasound waves and the like. Another aspect of the present disclosure provides an apparatus, a system, and a method for controlling an operation of a device in accordance with a result of sensing the surrounding area using one or a combination of two or more of radio waves, light, infrared light, and ultrasound waves and the like. Another aspect of the present disclosure provides an apparatus, a system, and a method for generating data based on a result of sensing the surrounding area using one or a combination of two or more of radio waves, light, infrared light, and ultrasound waves and the like. Another aspect of the present disclosure provides an apparatus, a system, and a method for transmitting, to another device or a server or the like, a result of sensing the surrounding area using one or a combination of two or more of radio waves, light, infrared light, and ultrasound waves and the like, or data generated based on the result of the sensing. Another aspect of the present disclosure provides an apparatus, a system, and a method for obtaining, for the purpose of implementing processing for, e.g., controlling one device, a result of sensing the surrounding area using one or a combination of two or more of radio waves, light, infrared light, and ultrasound waves and the like, or data generated based on the result of the sensing, from another device or a server or the like.

A communication apparatus according to one aspect of the present disclosure is a first apparatus that performs sensing via radio waves to sense a second apparatus, include: a communication unit configured to receive a frame transmitted via radio waves by the second apparatus and sense the second apparatus using the frame received; and a controller that selects, from among predetermined frequencies, a frequency for the second apparatus to transmit the radio waves at, notifies the second apparatus of the frequency selected, and controls the communication unit to perform the sensing using the frequency.

General or specific aspects of these may be realized as a system, method, integrated circuit, computer program, computer-readable recording medium such as a CD-ROM, or any given combination thereof.

One or more aspects of the present disclosure can facilitate the realization and widespread use of sensing of surroundings using radio waves.

The present disclosure includes an aspect that can facilitate the realization and widespread use of new services that utilize sensing of surroundings using one or a combination of two or more of radio waves, light, infrared light, and ultrasound waves and the like. This makes it possible to provide any one or more of, for example, control of device operations, control of information presented to a user, and the generation of data, based on, for example, a state, shape, or action of a person or object in a real-world space. As a result, it is expected to contribute to any one or more of, for example, improvement of user convenience, simplification of input operations made by users, automation of processing, provision of new services, and detection of events occurring in the real-world space that have been difficult to detect so far.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 illustrates one example of a configuration of the detecting apparatus according to Embodiment 1;

3

4

Figure 9:
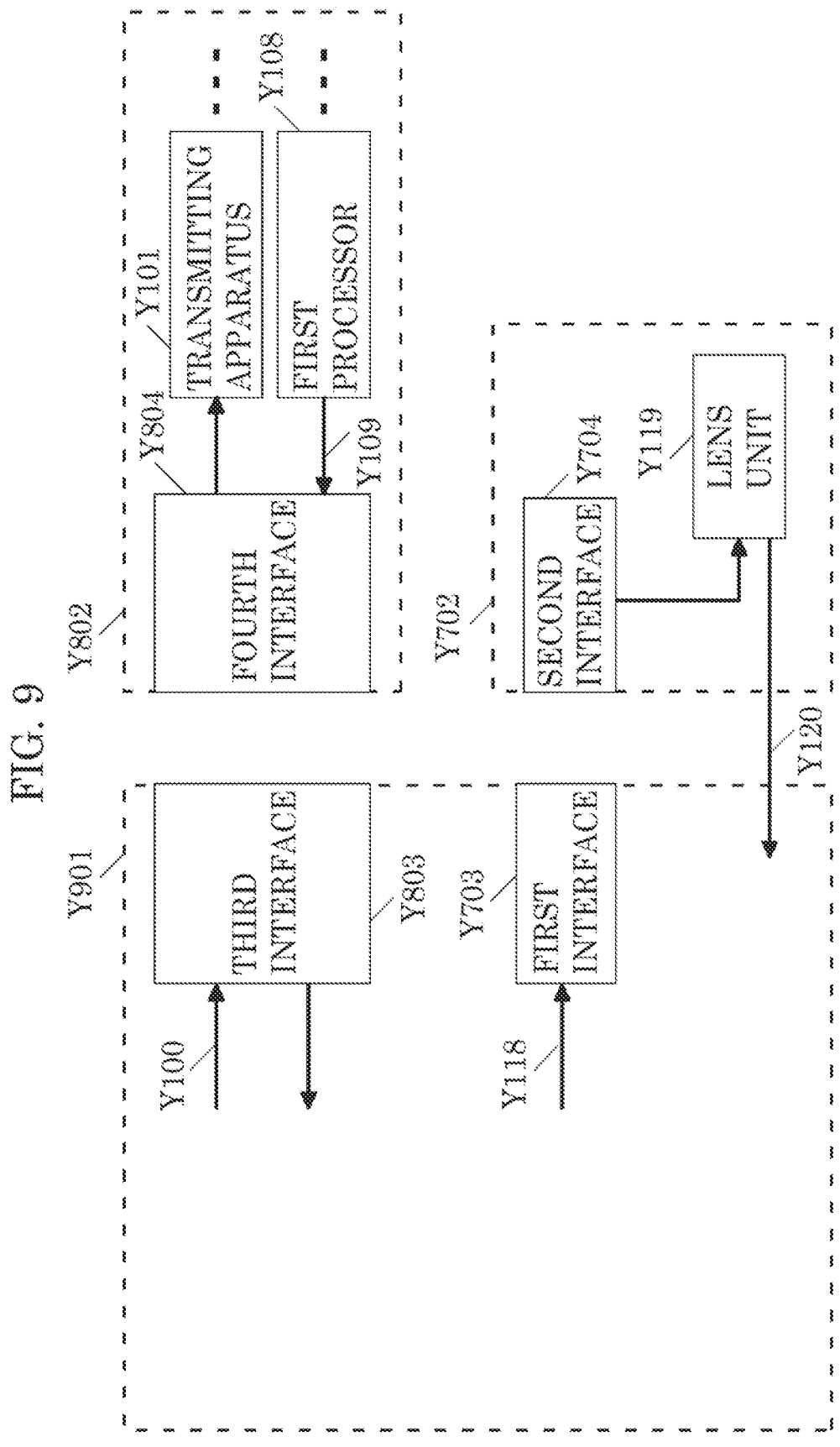
Figure 10:
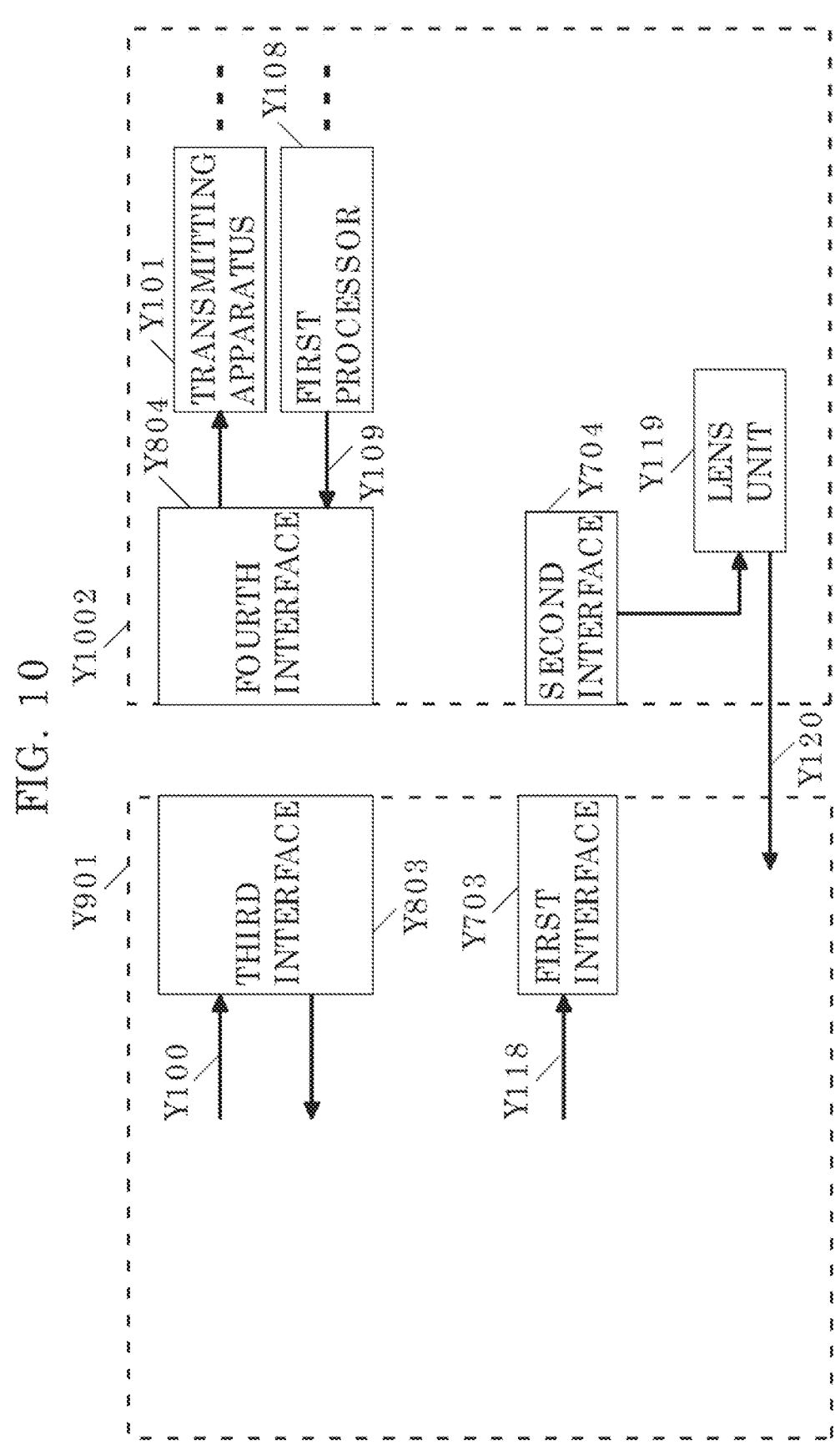
Figure 11:
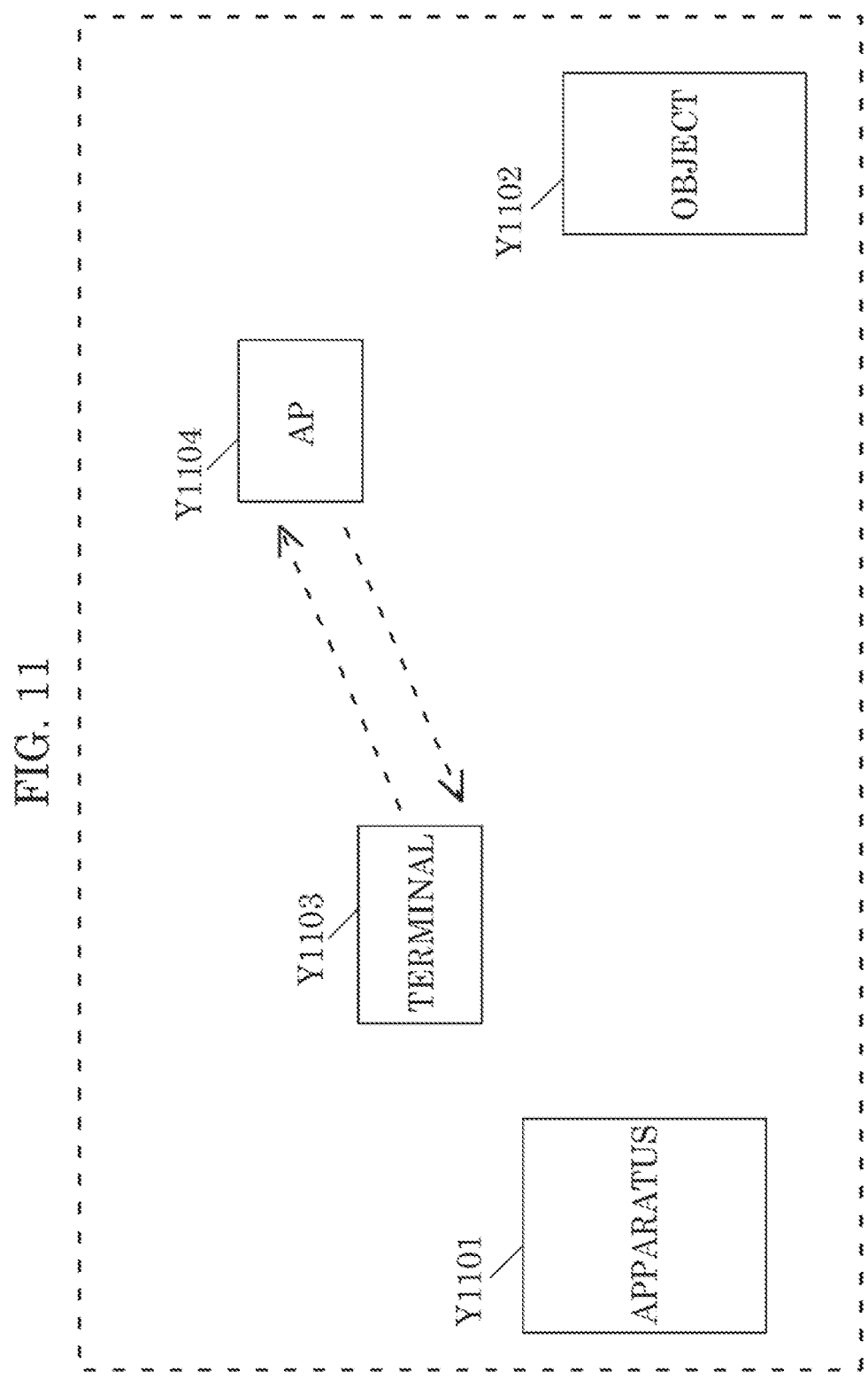
Figure 12:
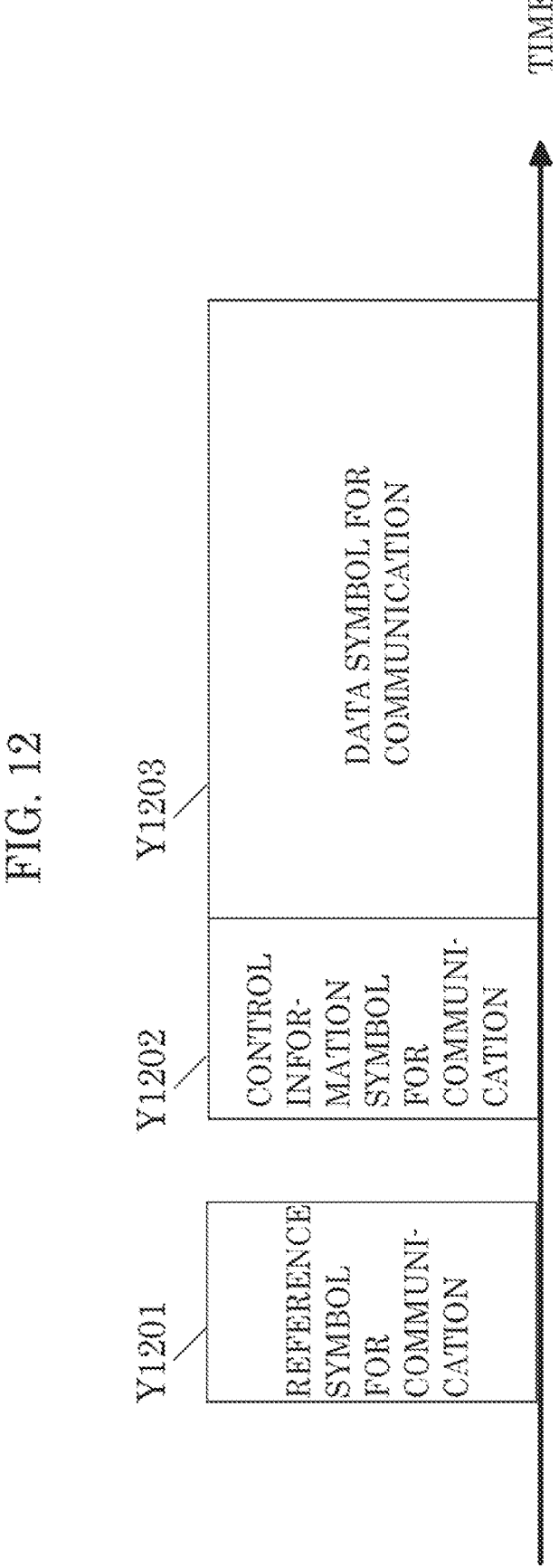
Figure 13:
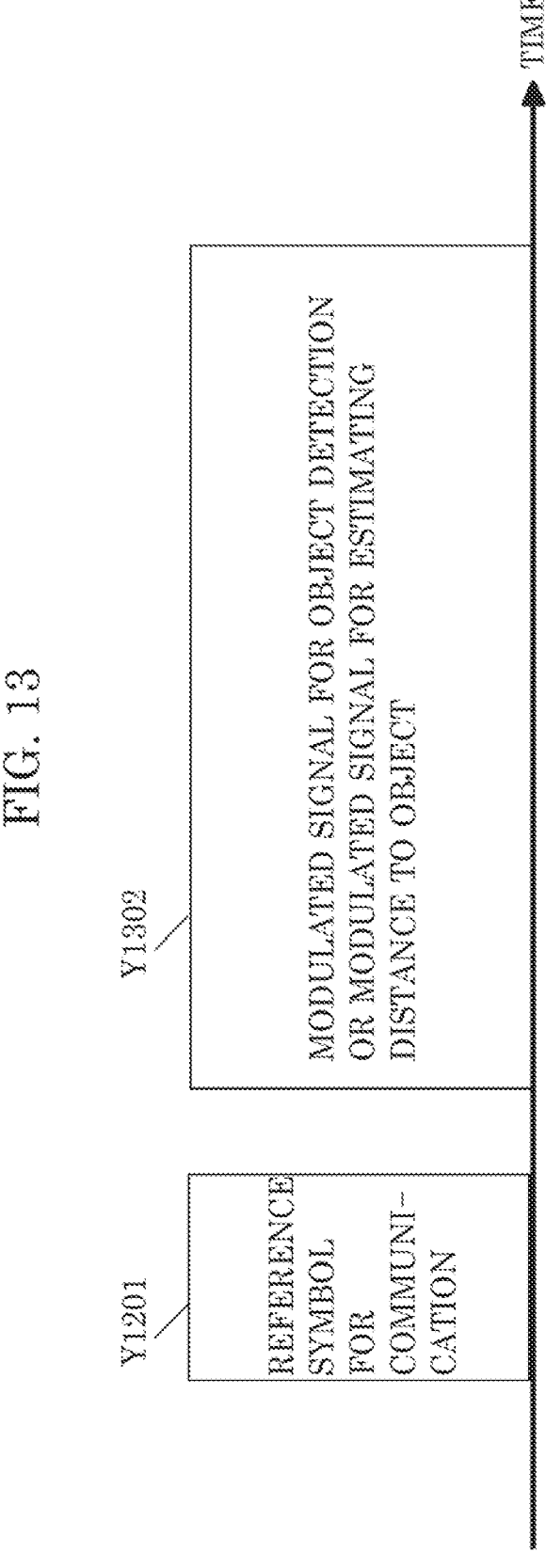
Figure 14:
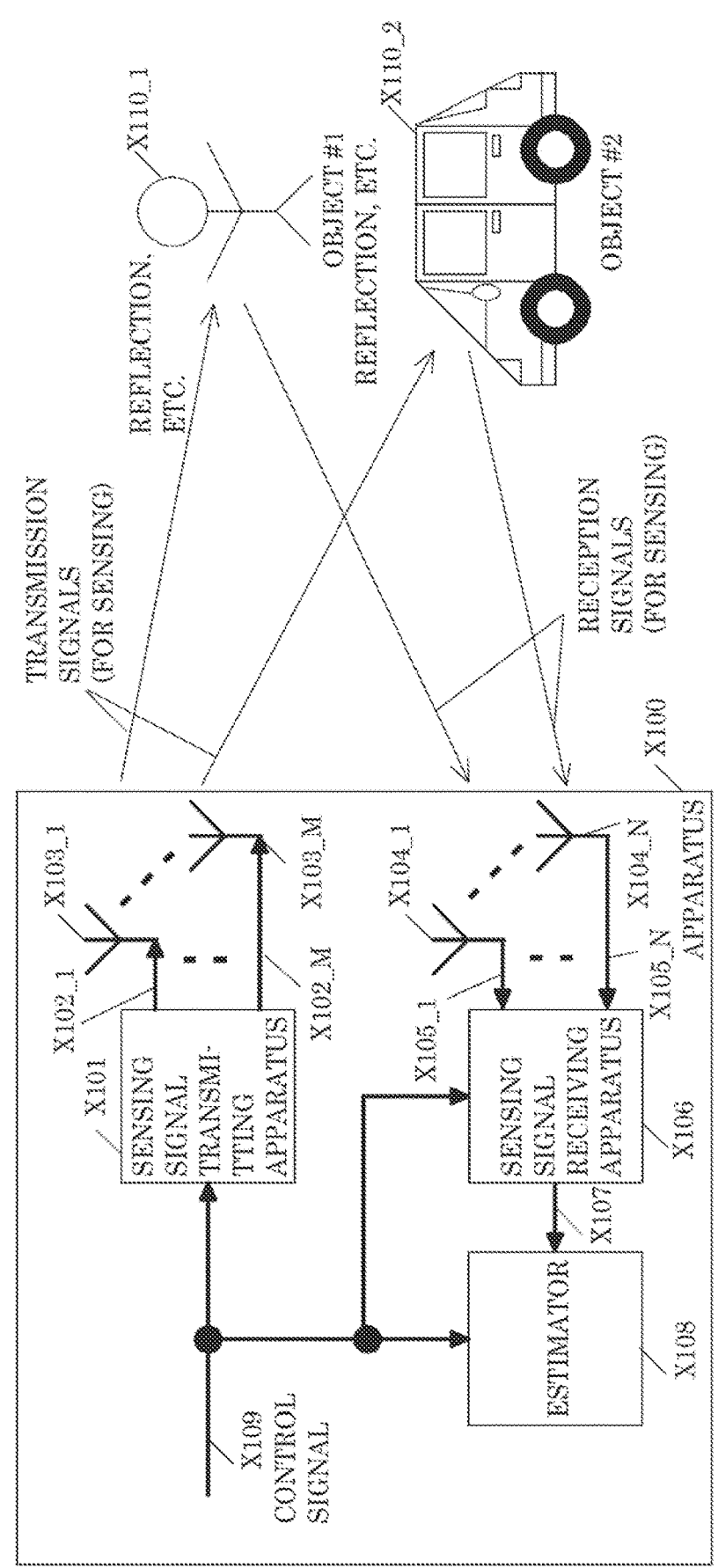
Figure 15:
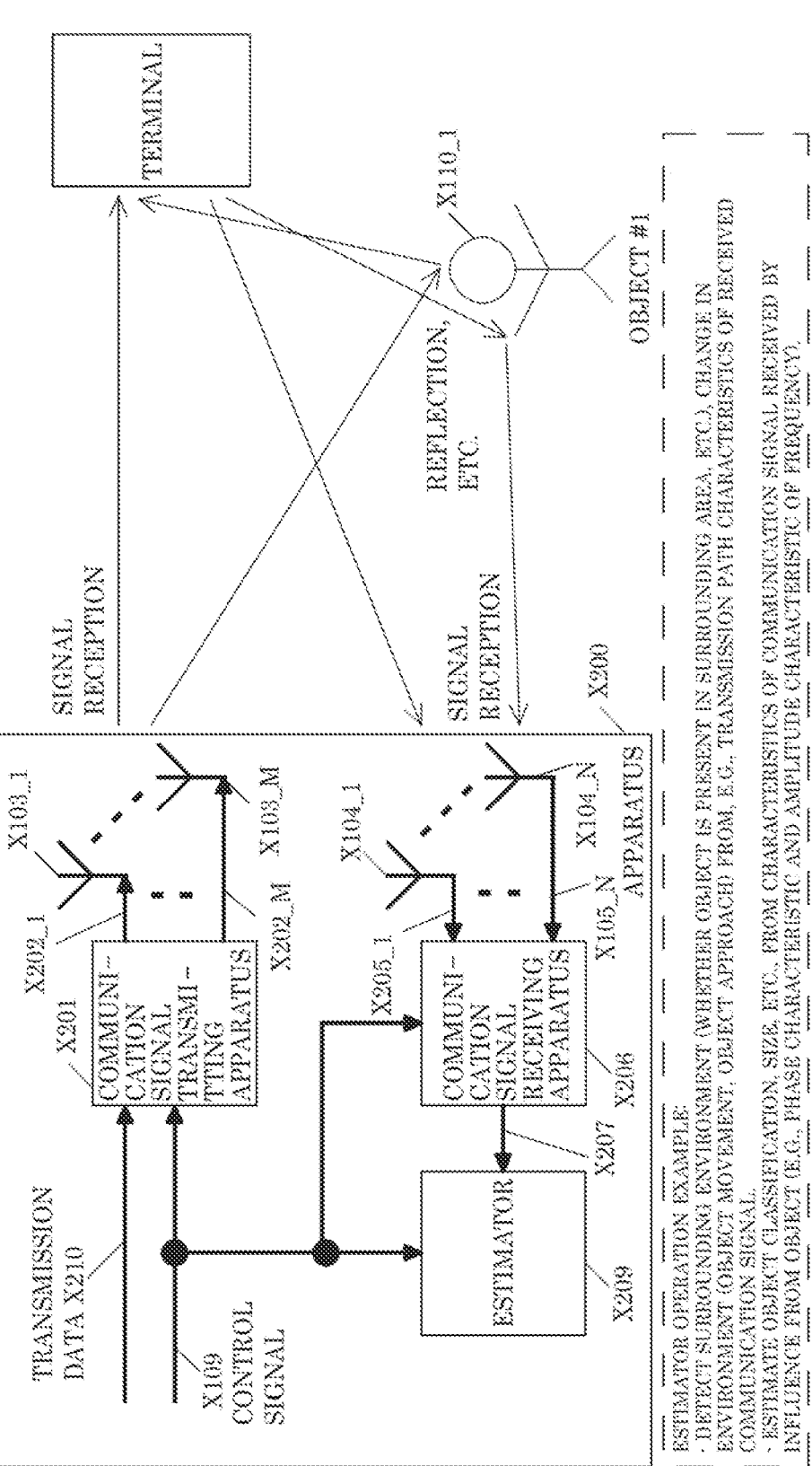
Figure 16:
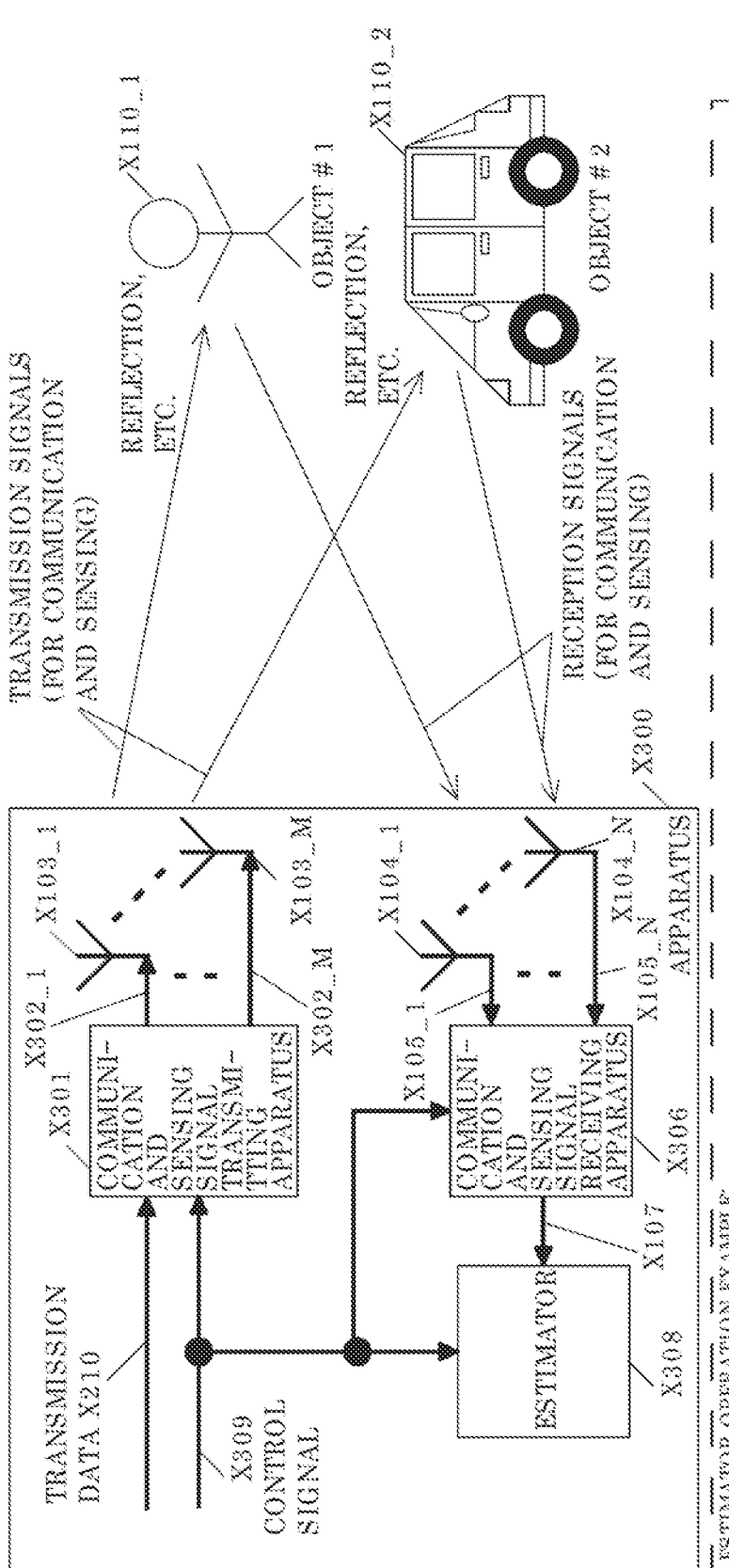
Figure 17:
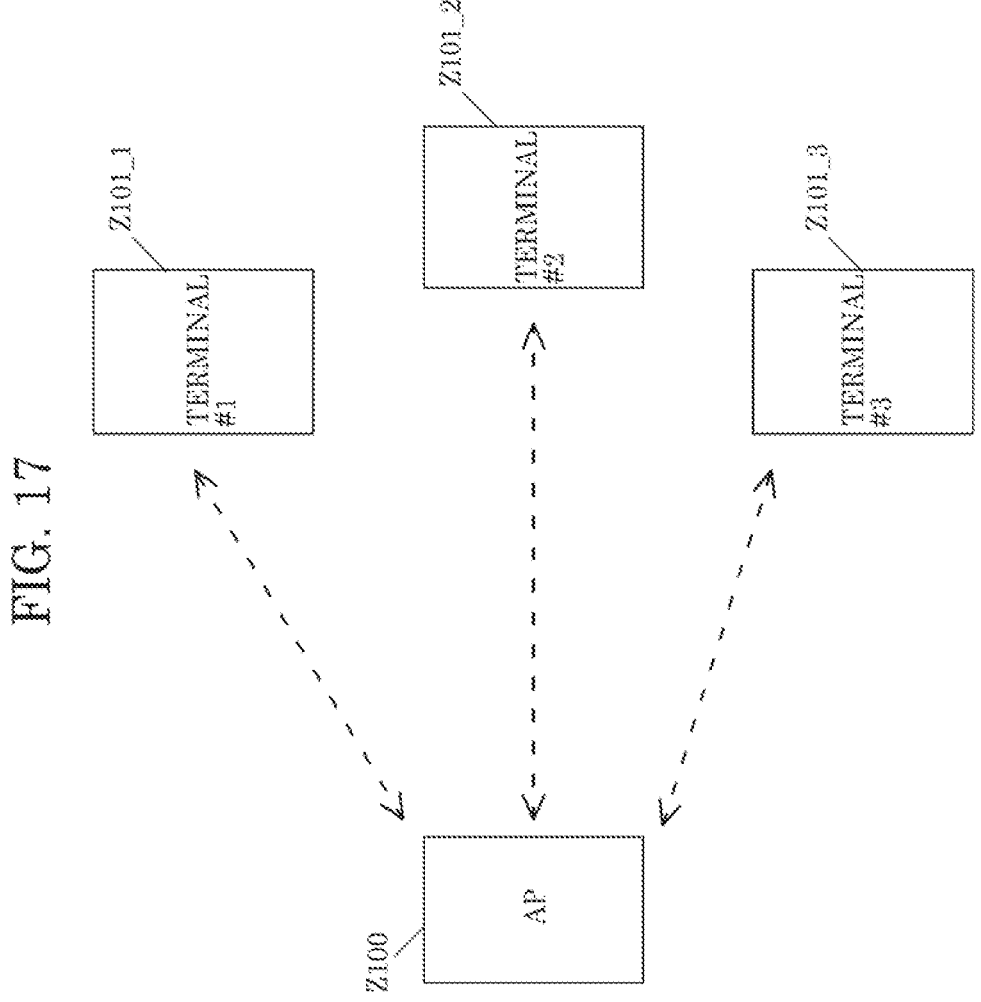
Figure 18:
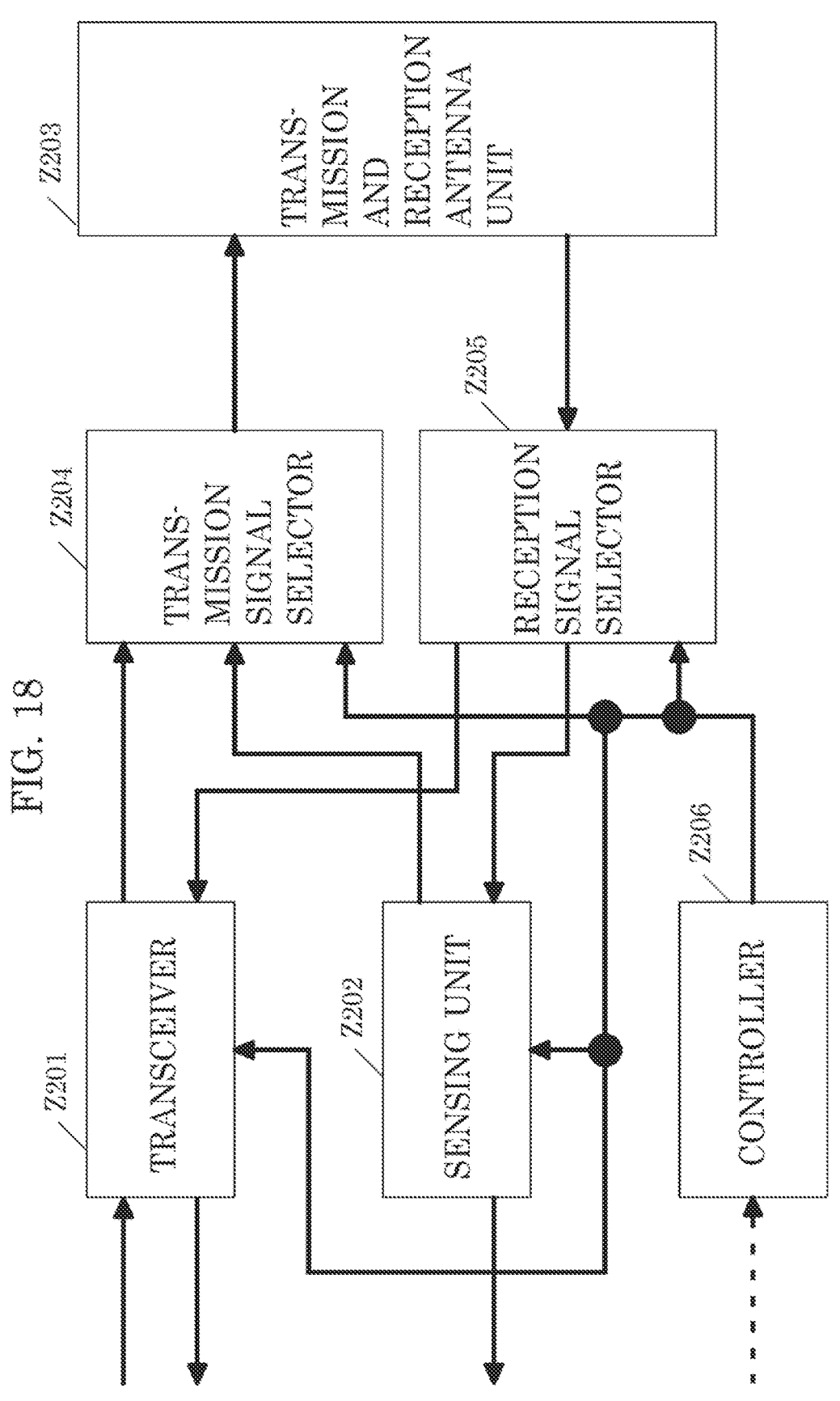
Figure 20:
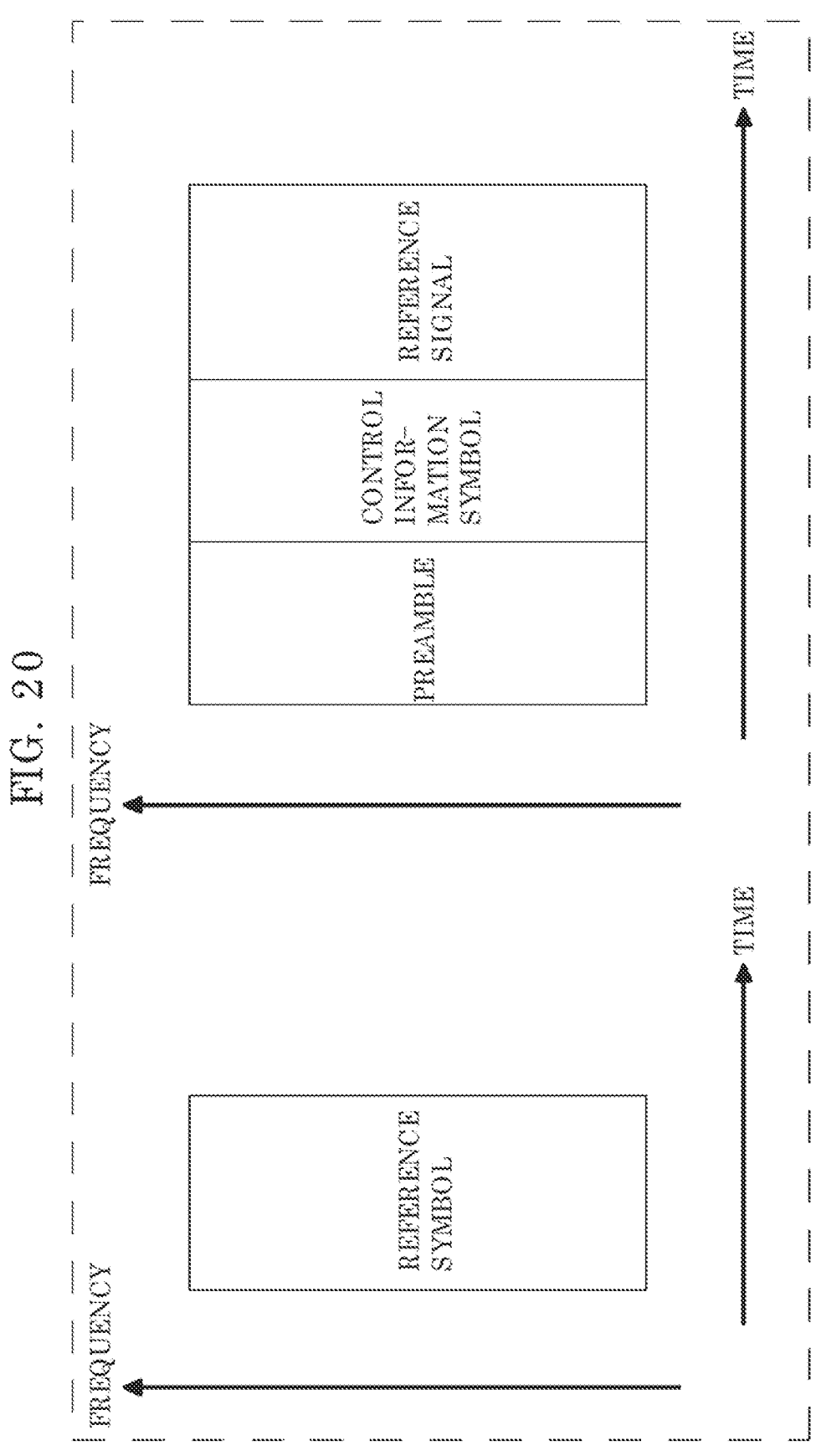
Figure 25:
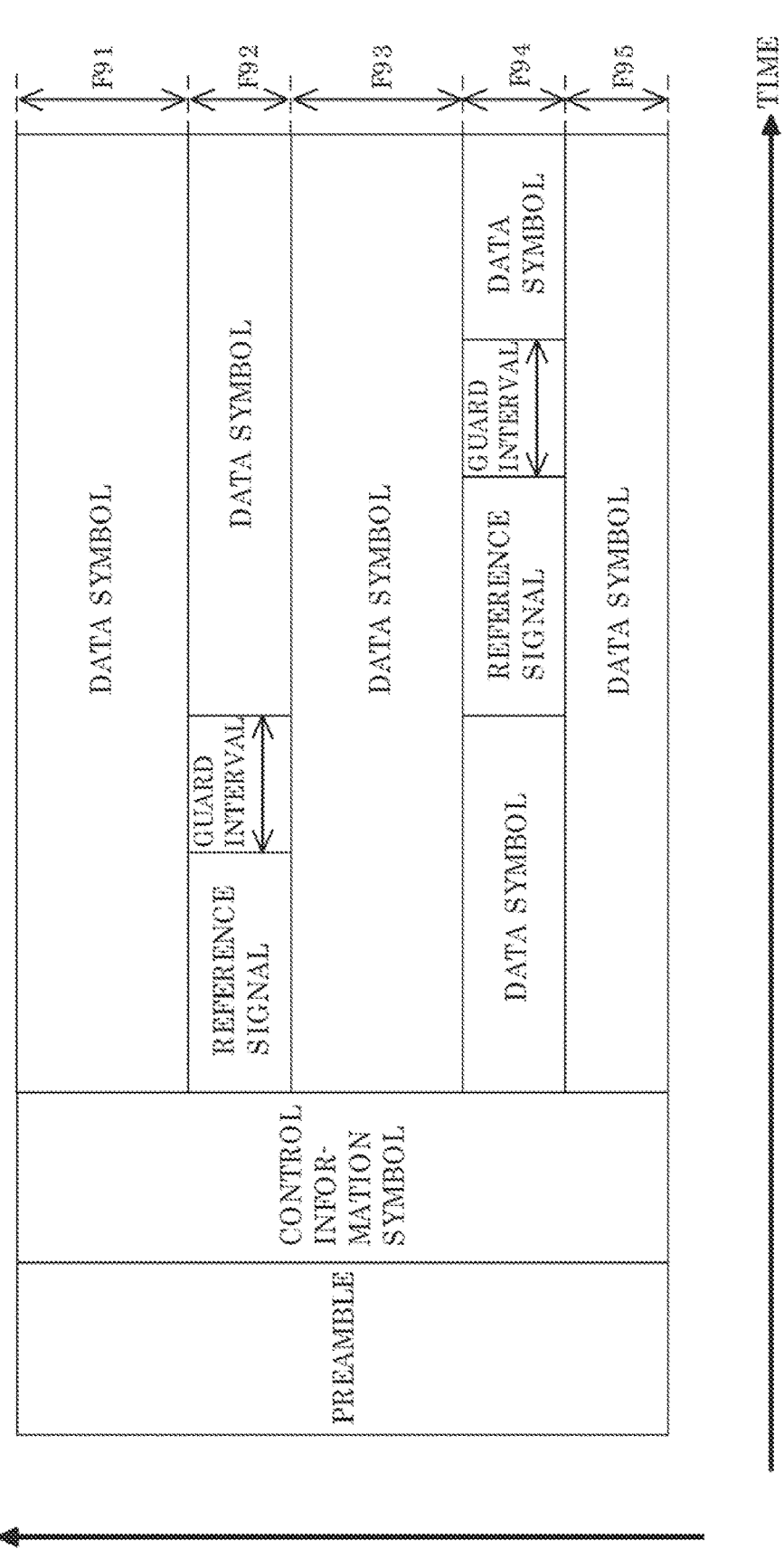
Figure 26:
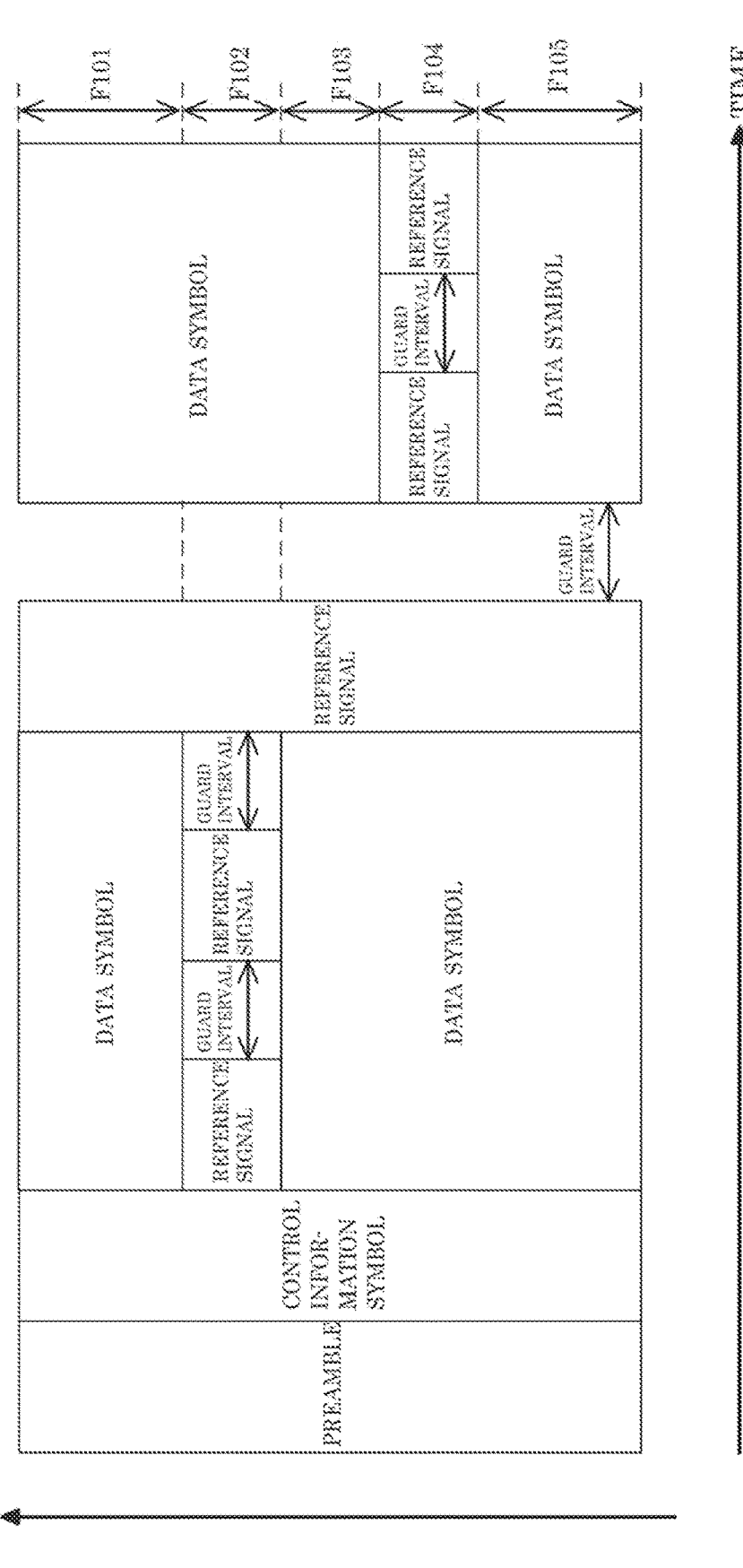
Figure 27:
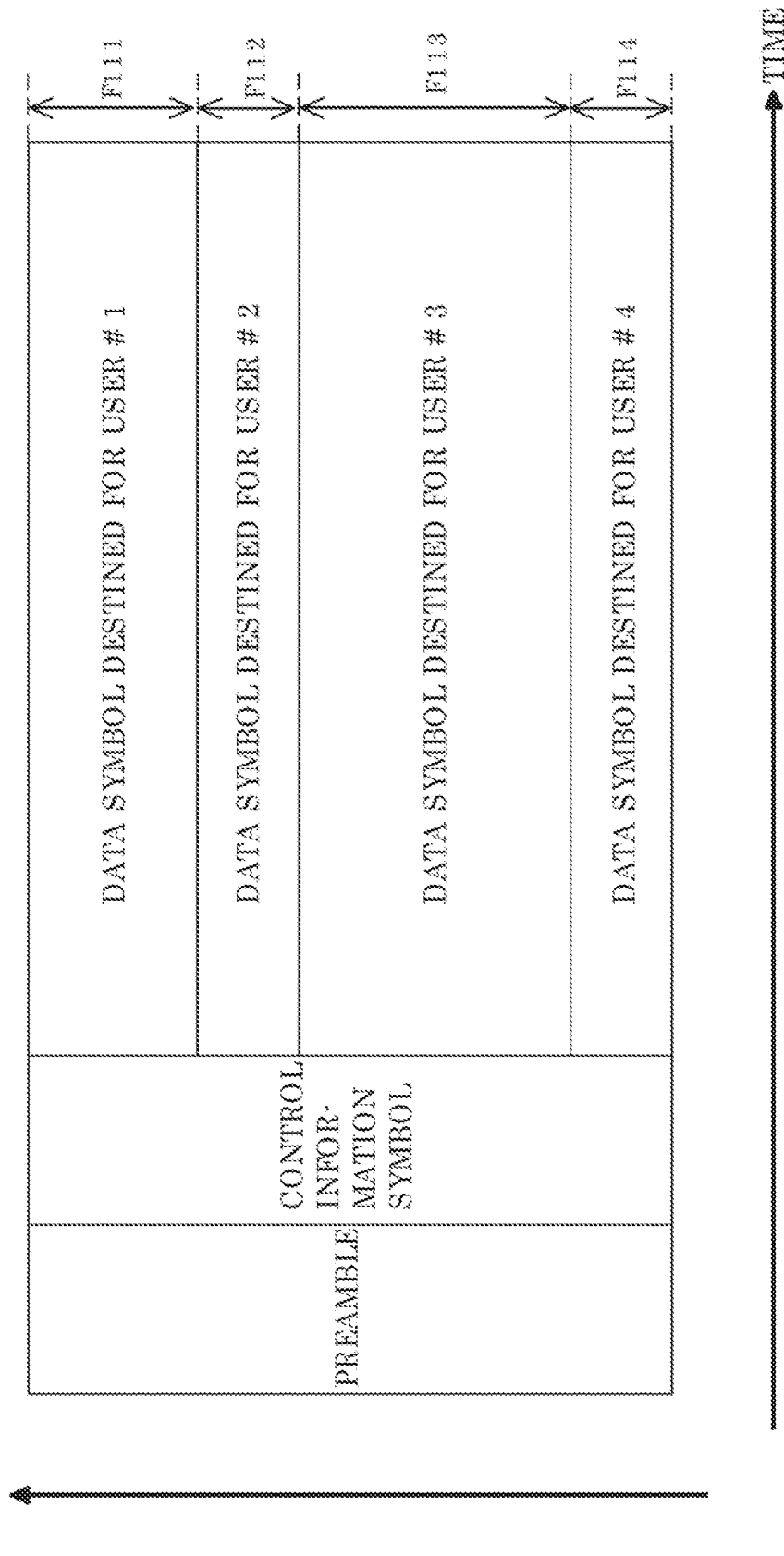
Figure 30:
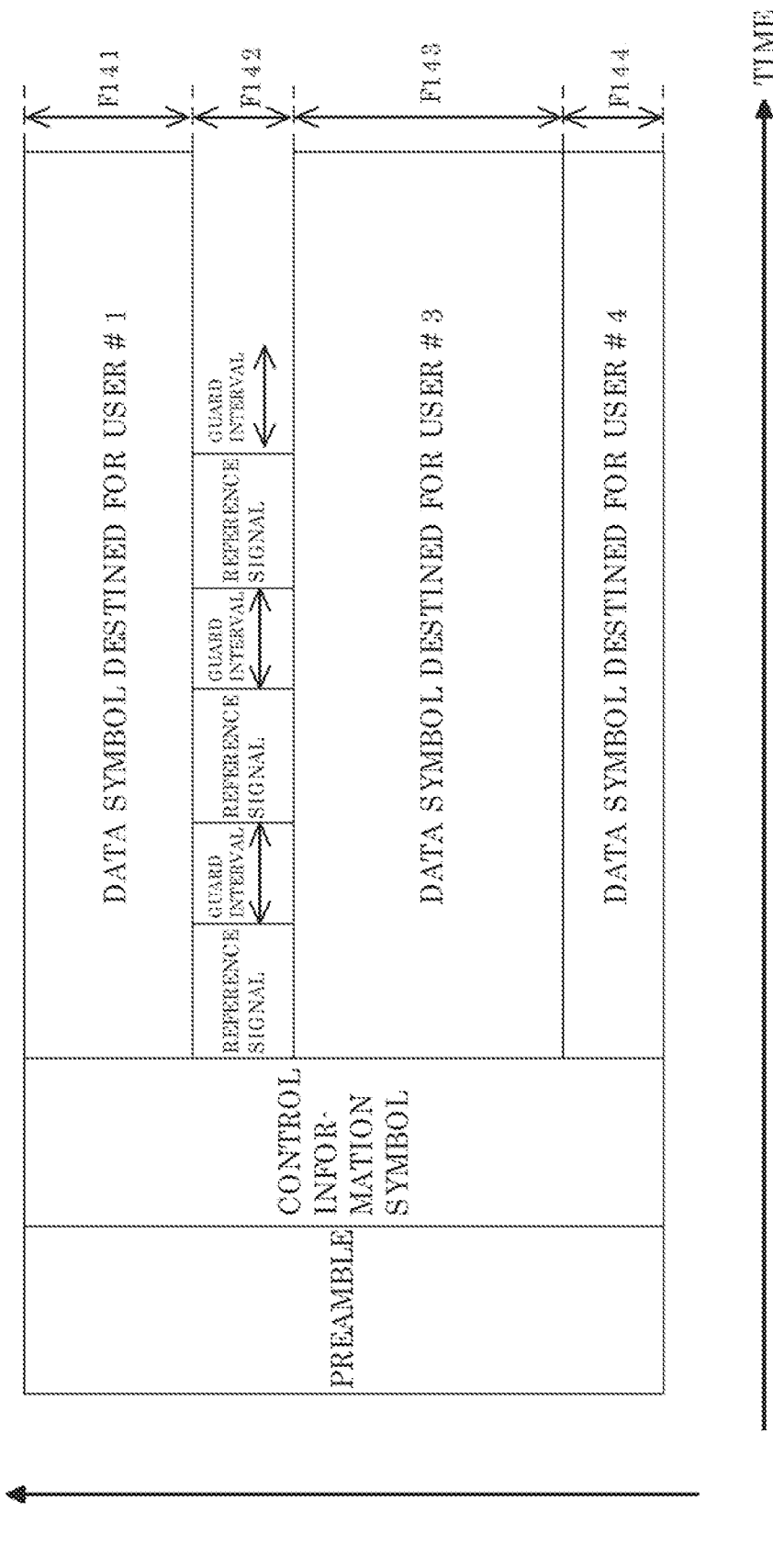
Figure 31:
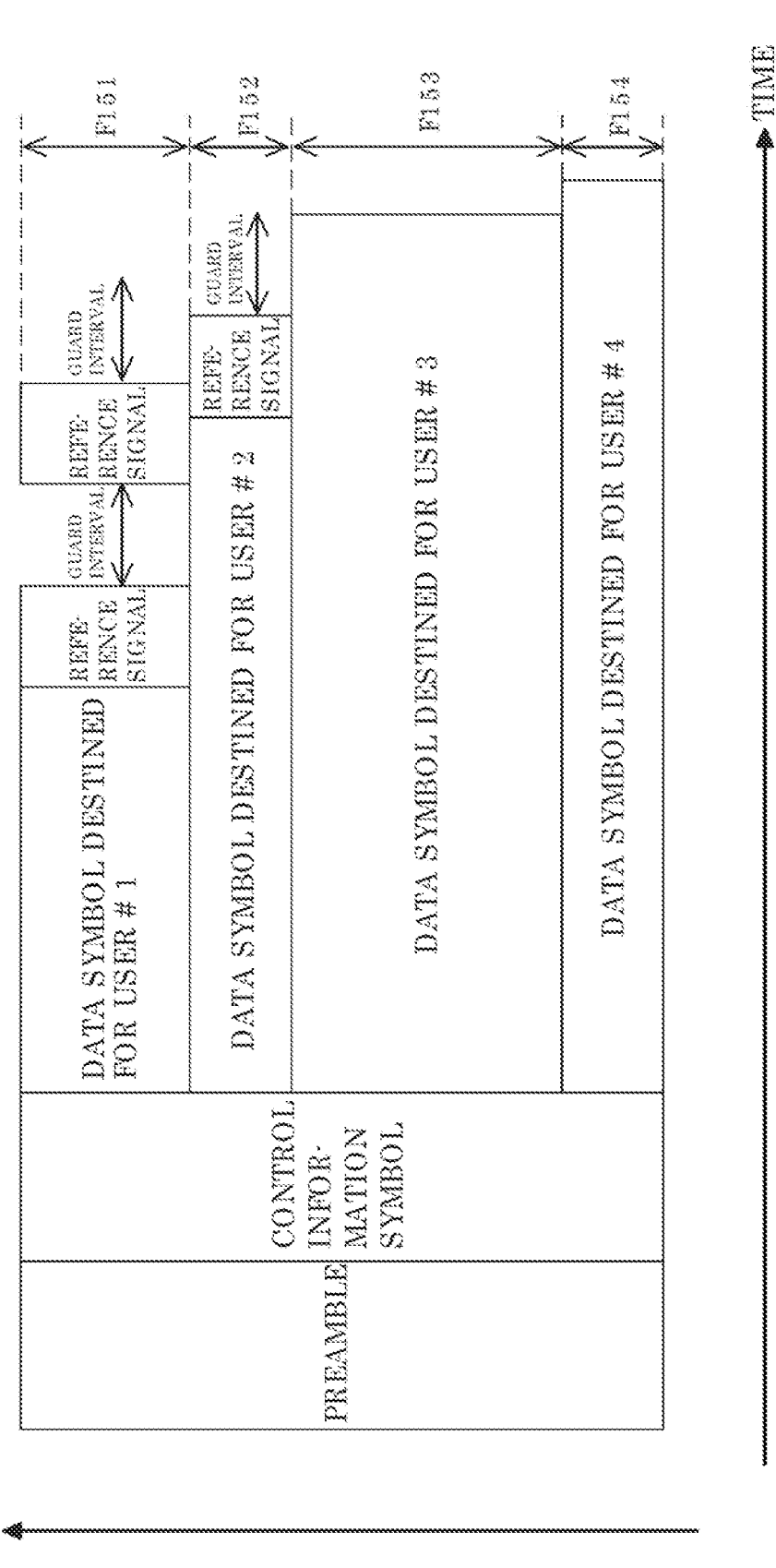
Figure 32:
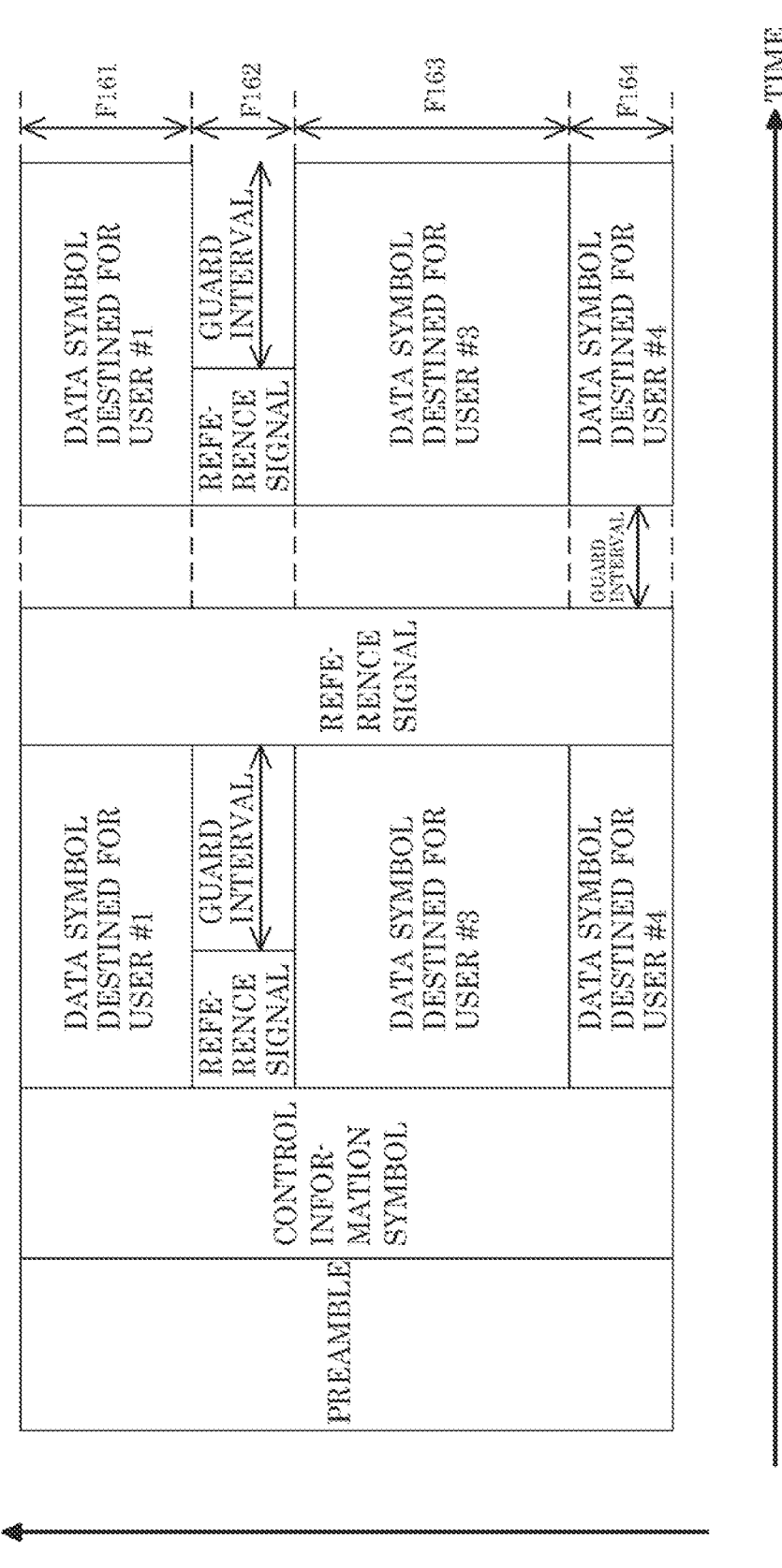
Figure 34:
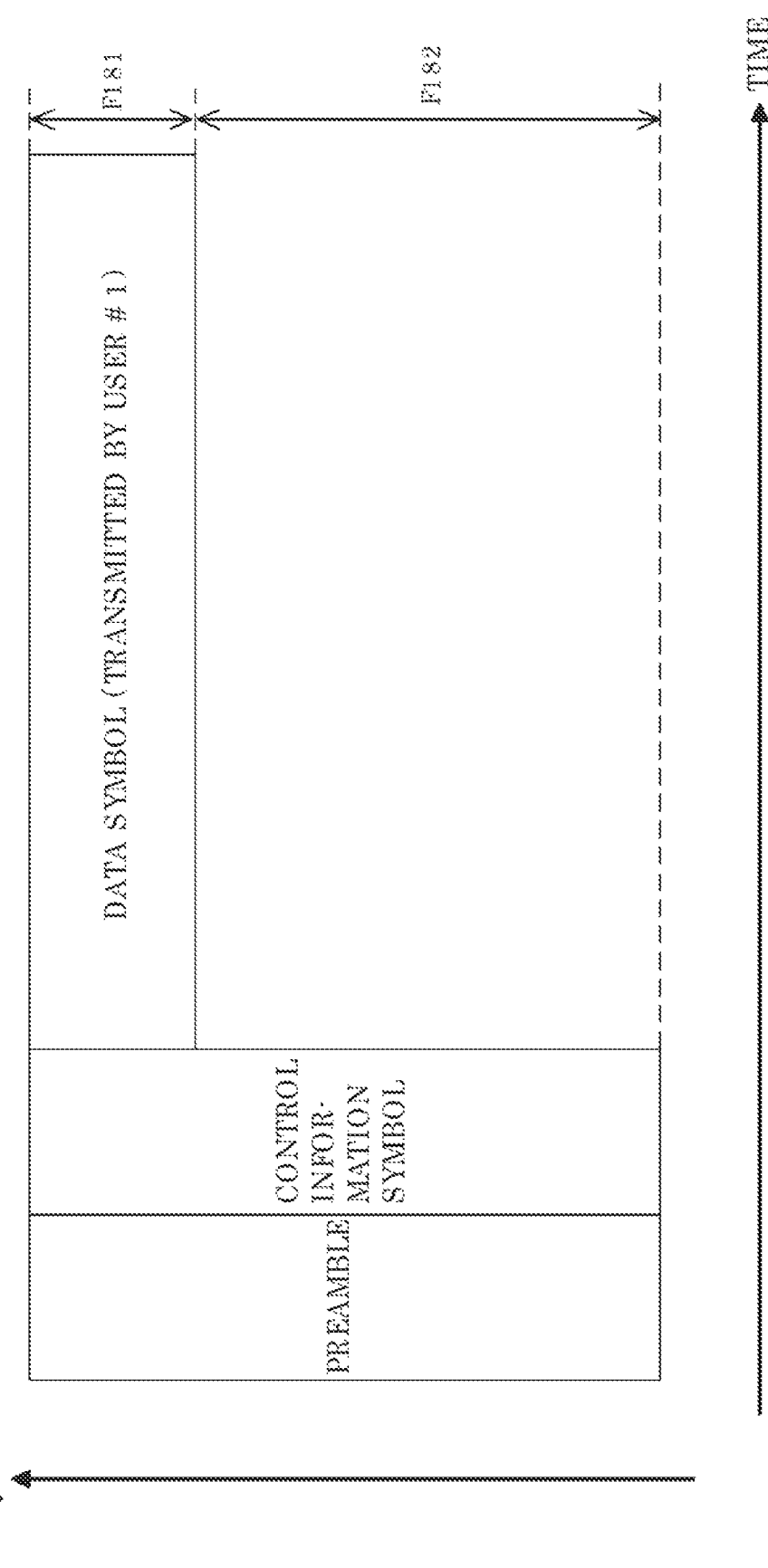
Figure 35:
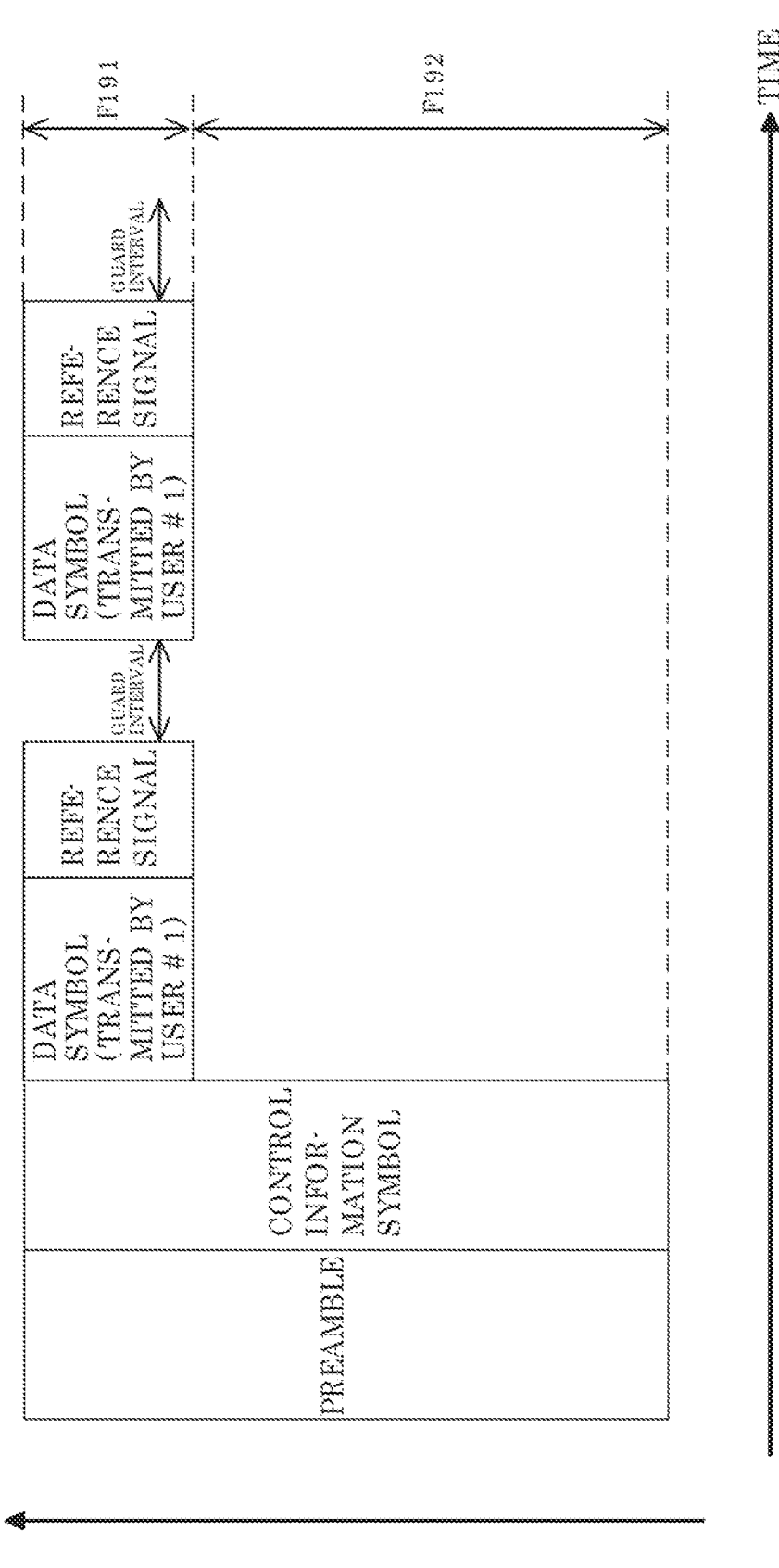
Figure 36:
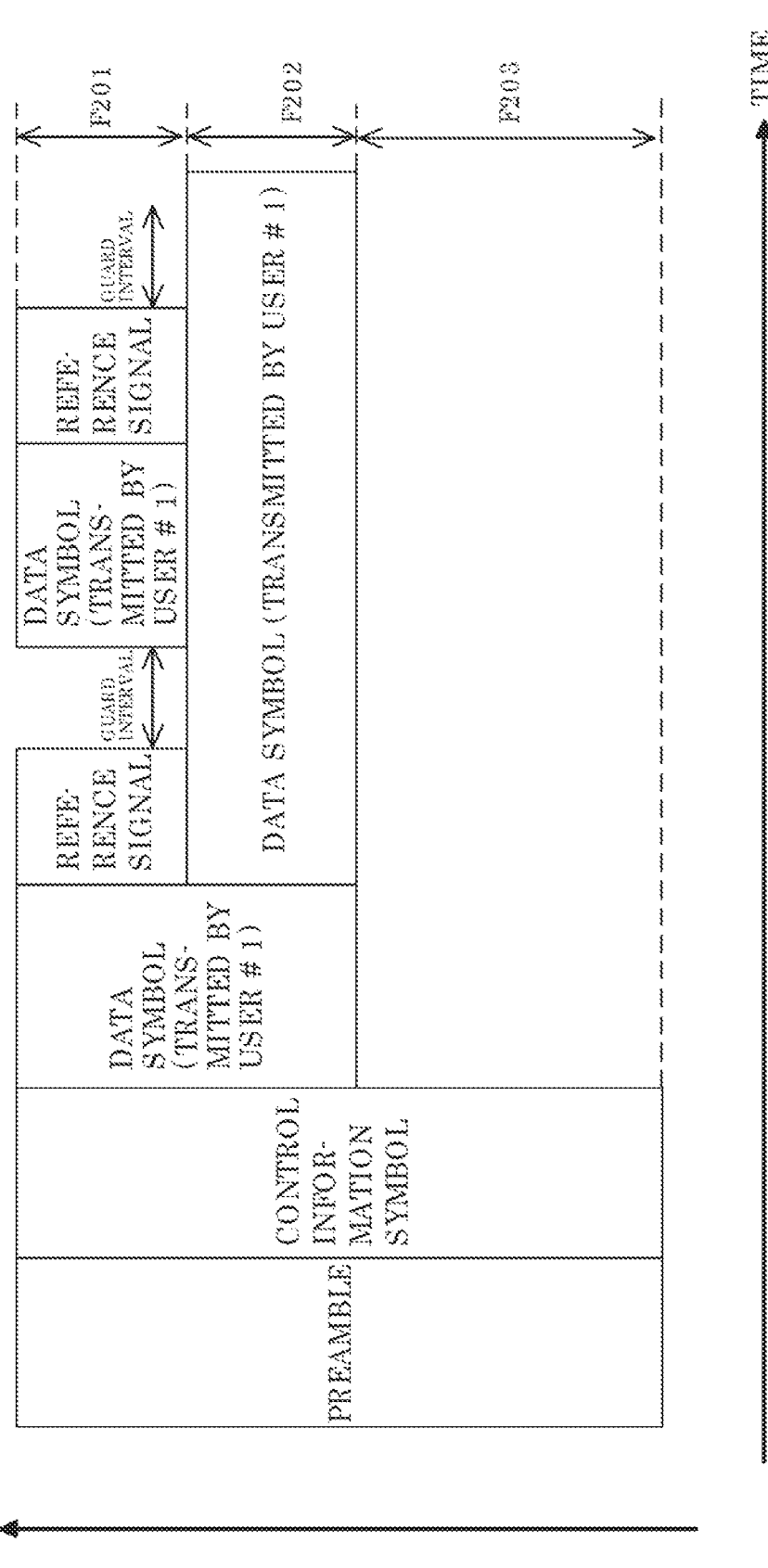
Figure 37:
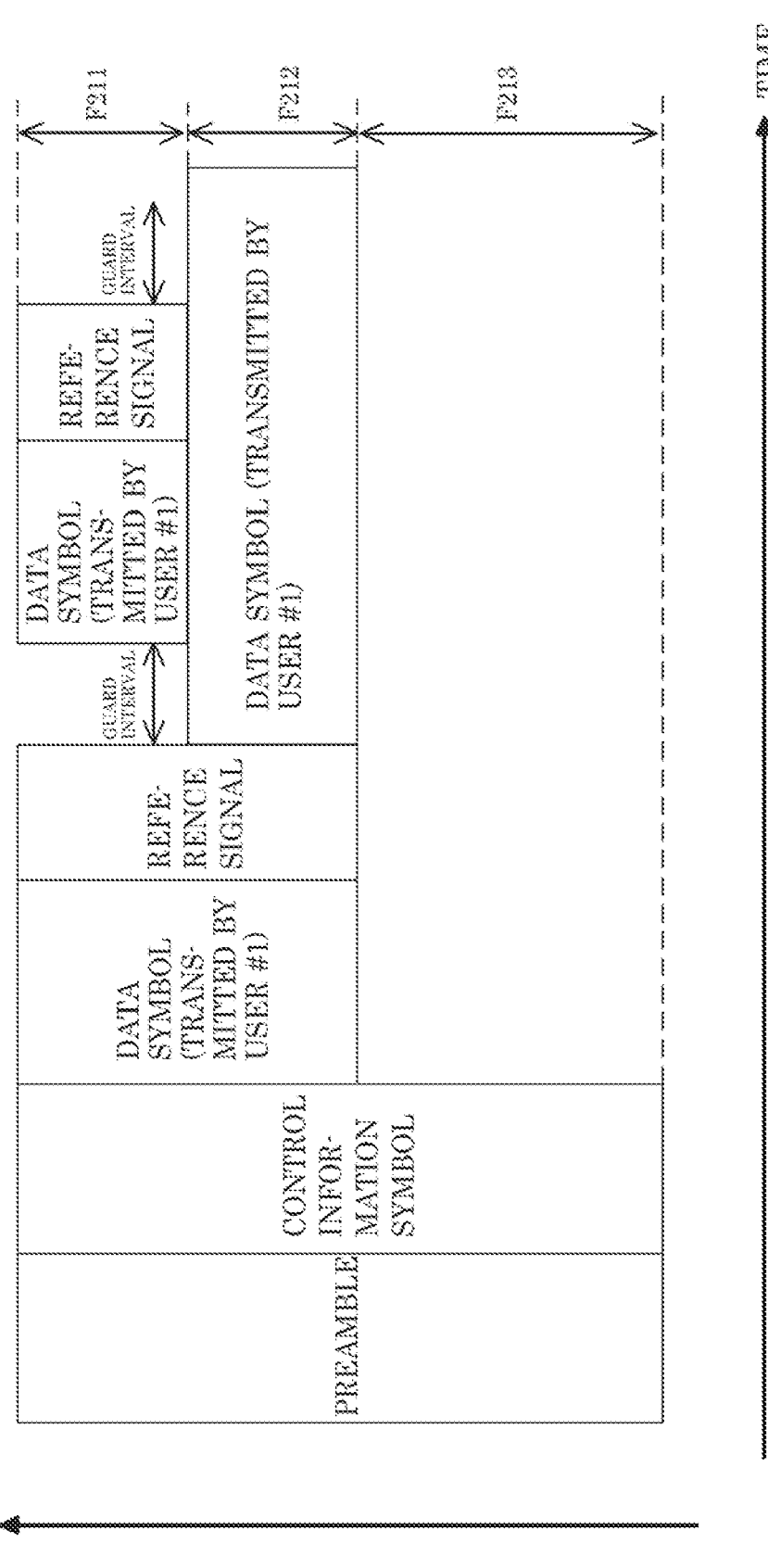
Figure 38:
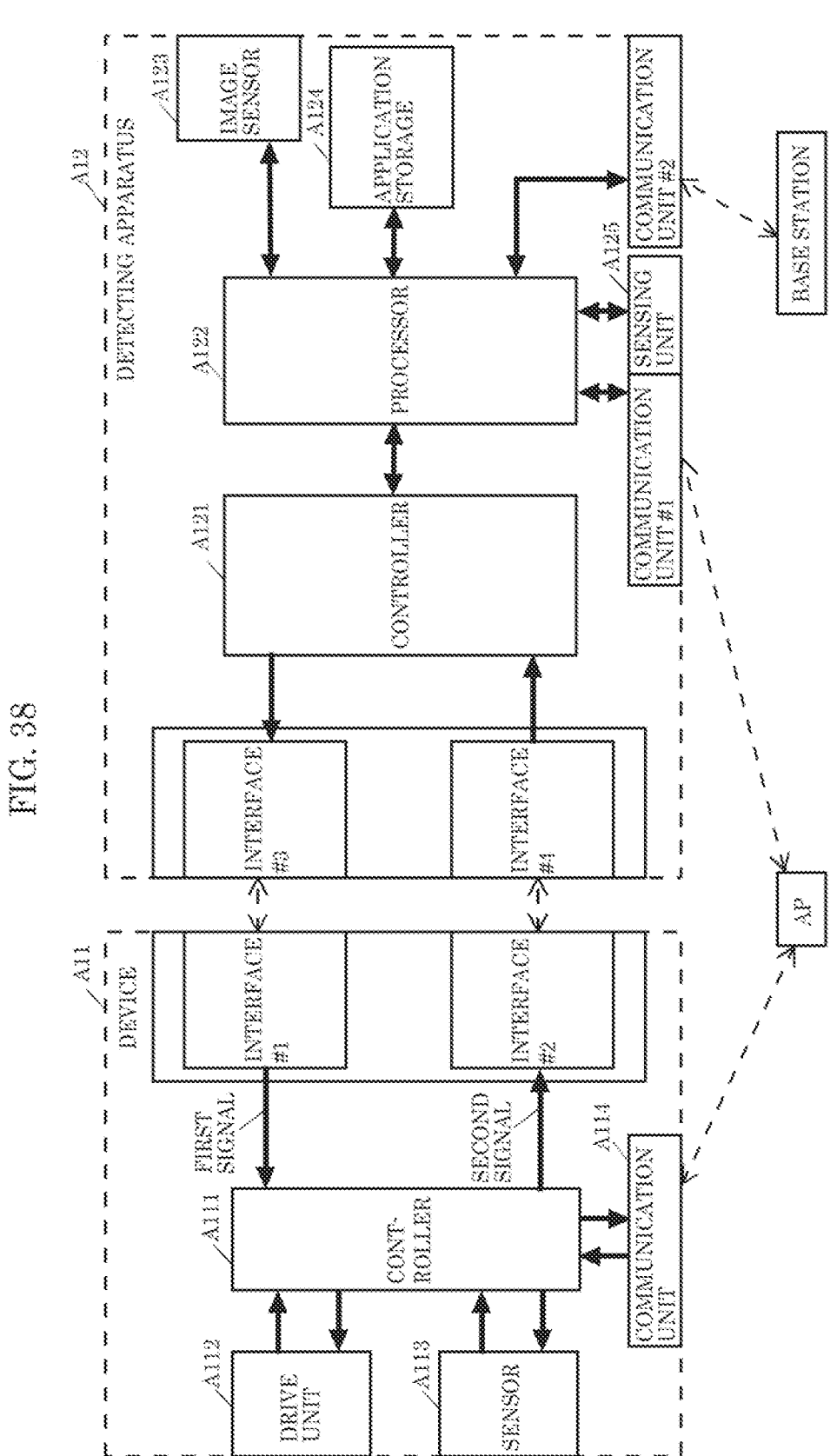
Figure 40:
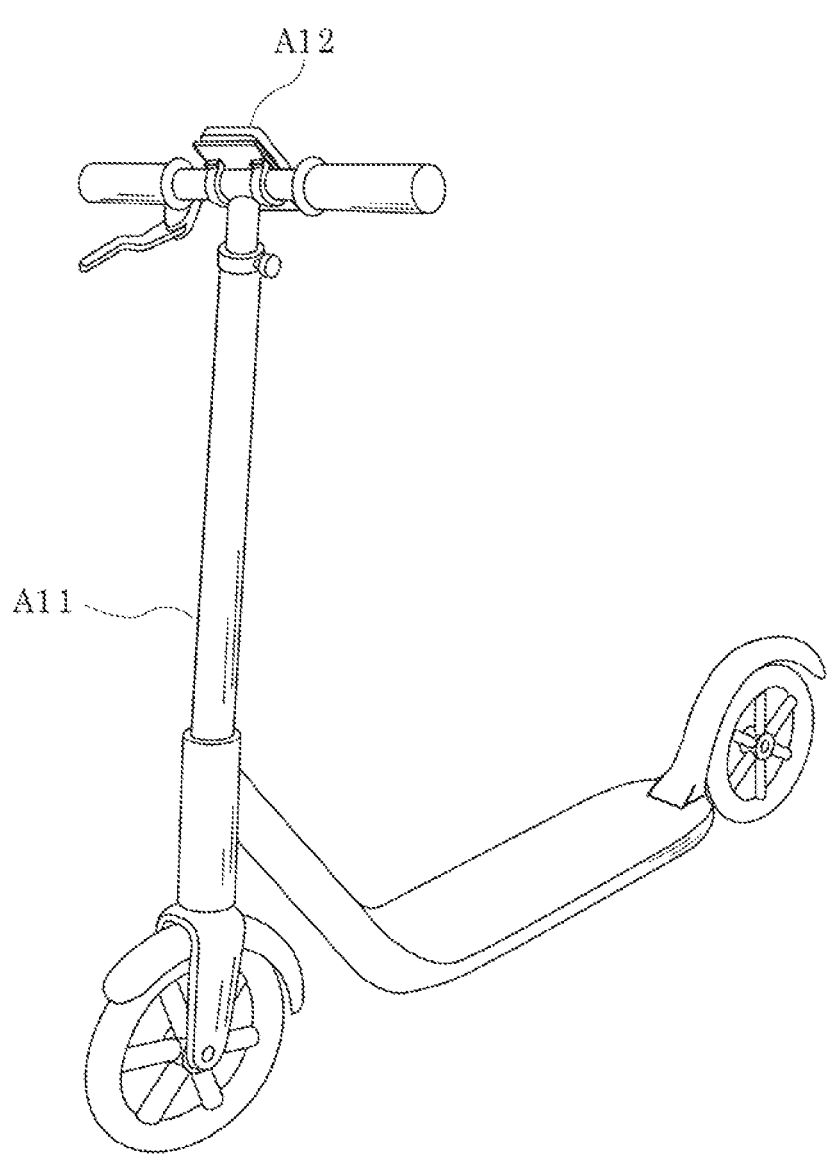
Figure 41:
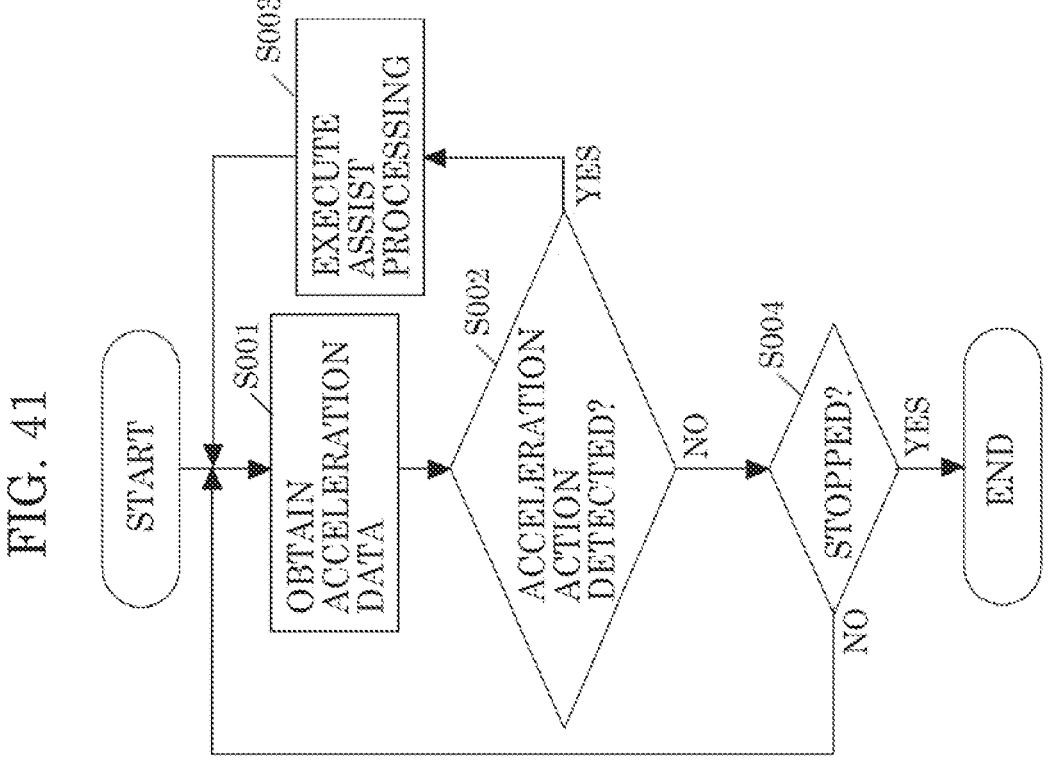
Figure 42:
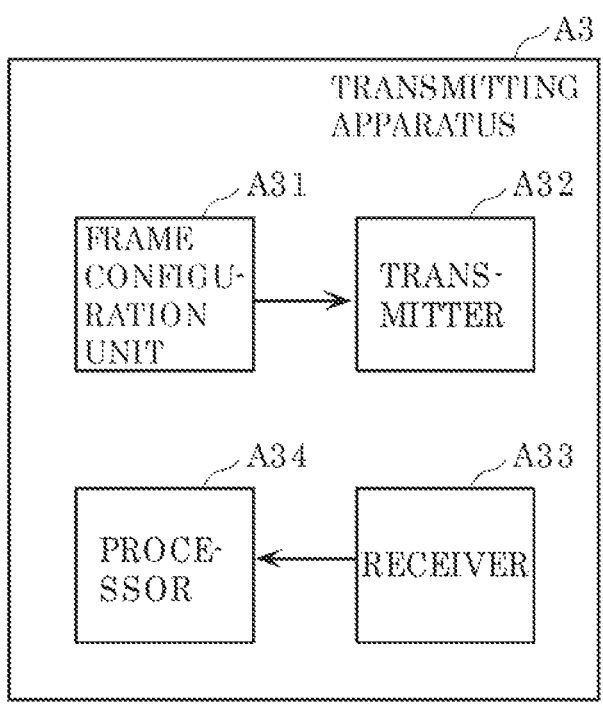
Figure 43:
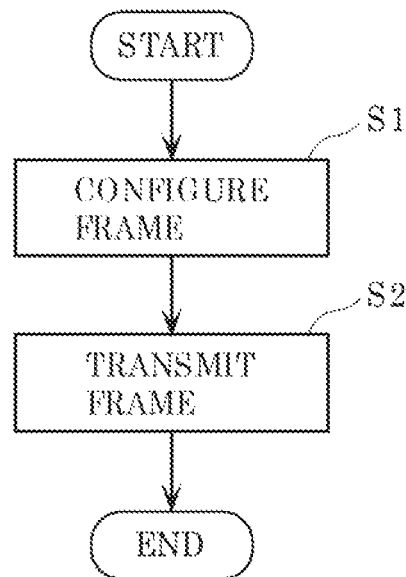
Figure 44:
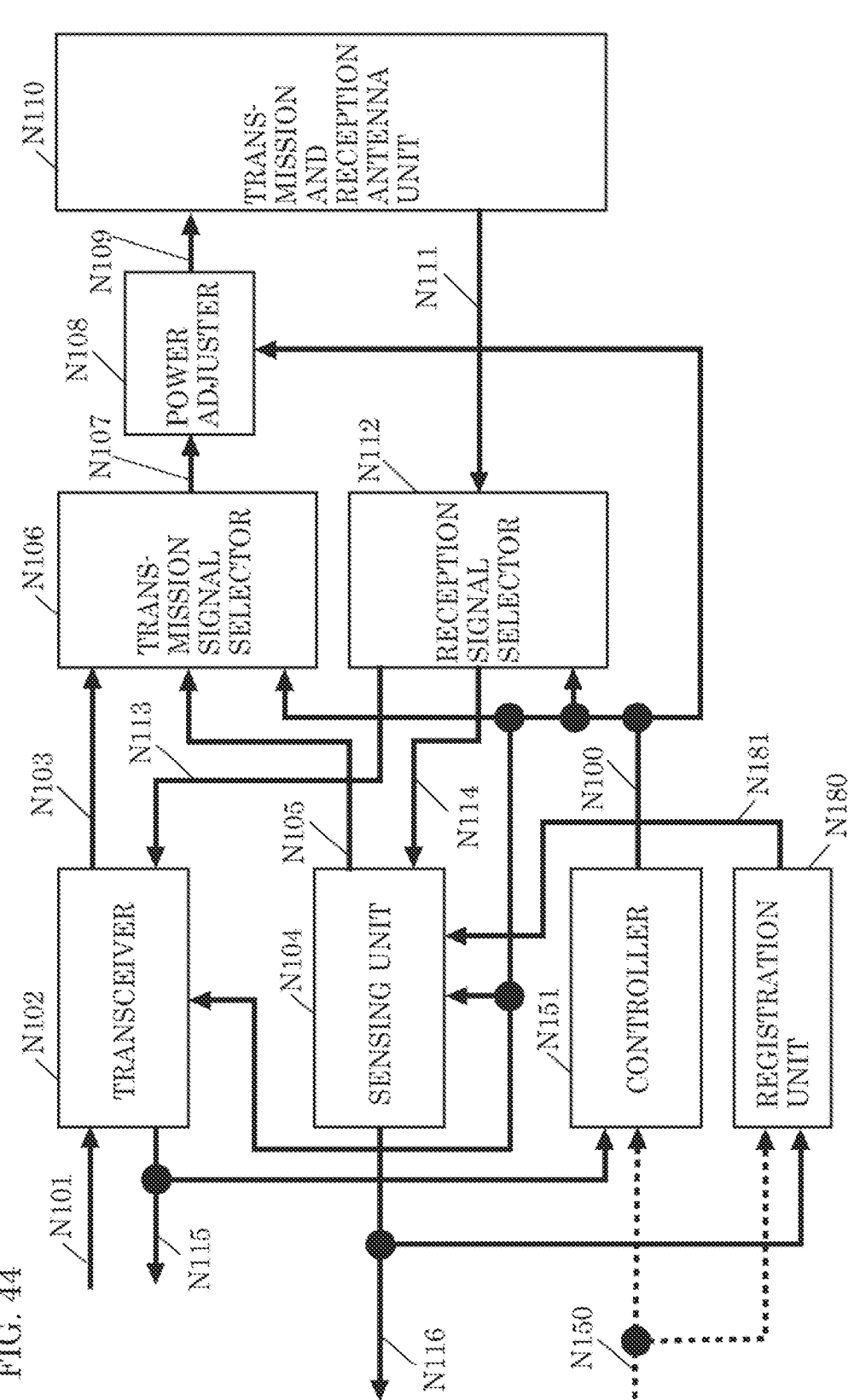
Figure 45:
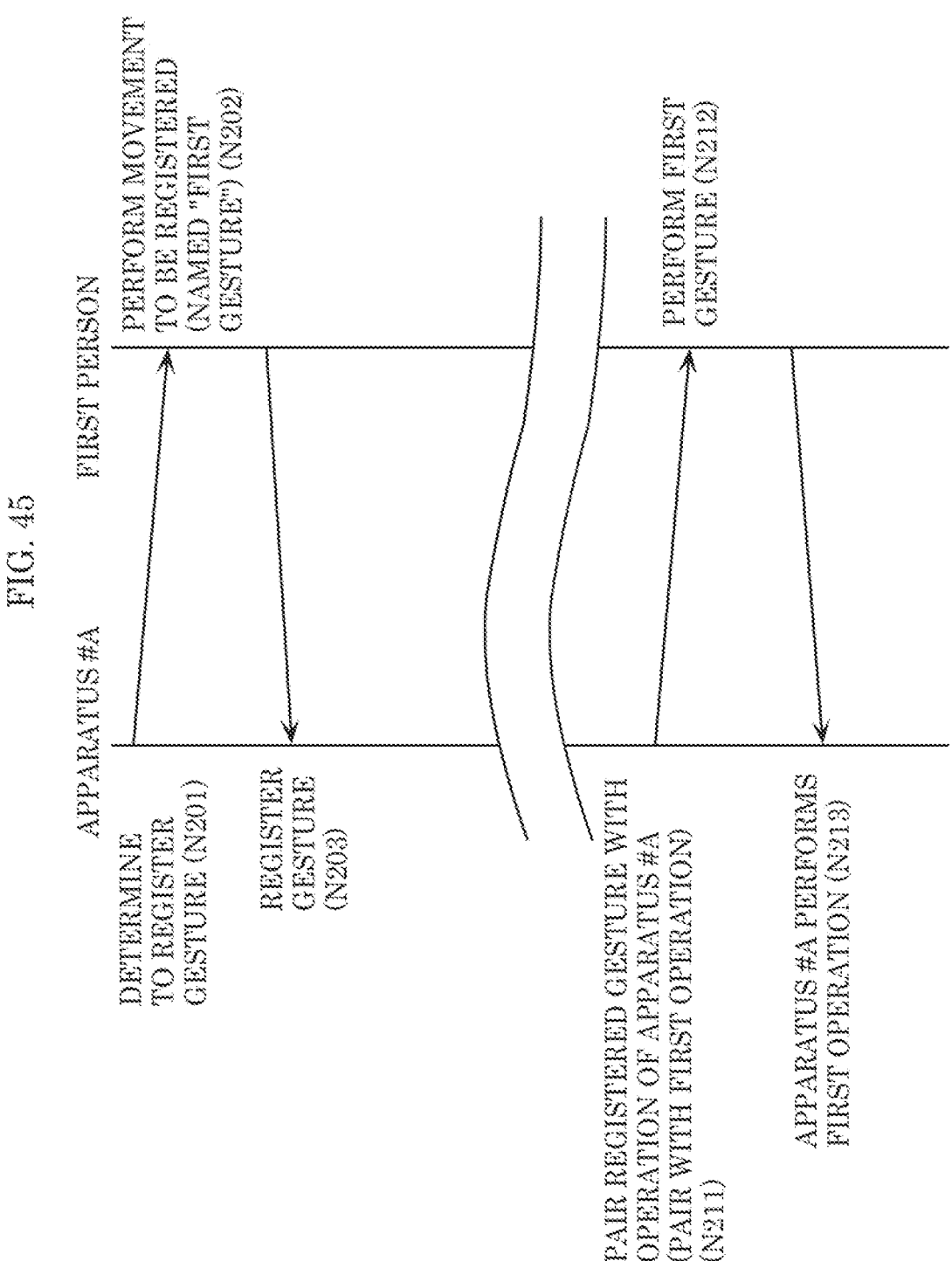
Figure 46:
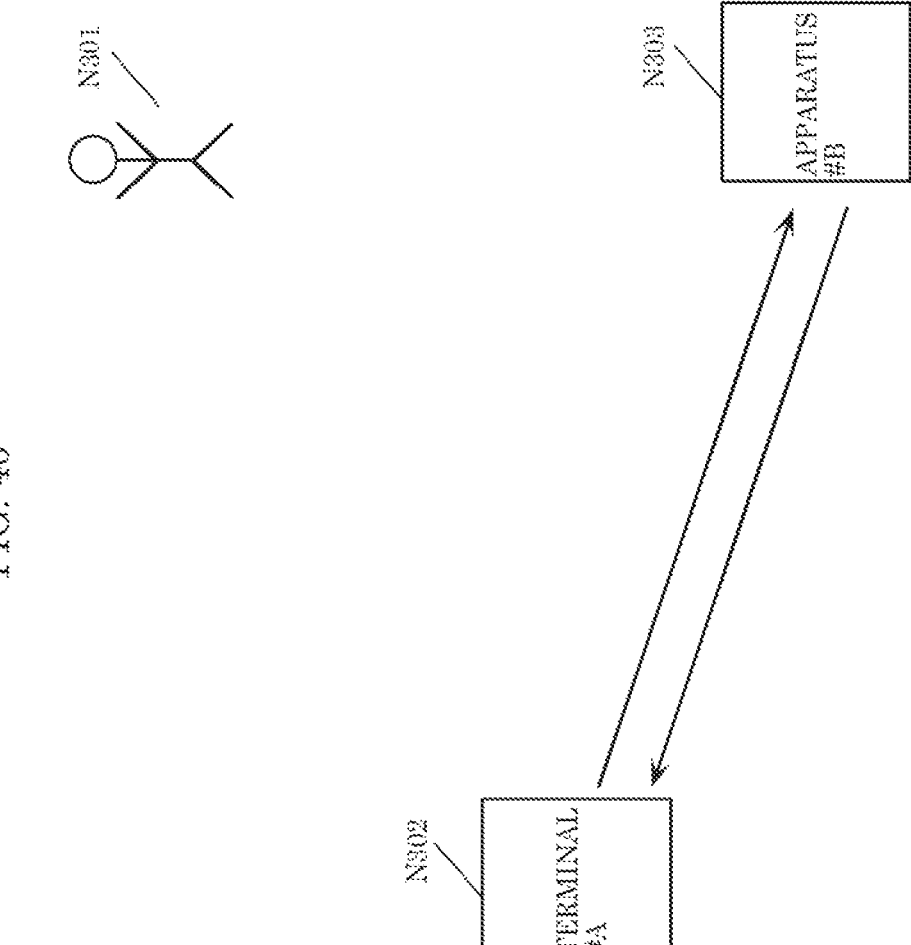
Figure 47:
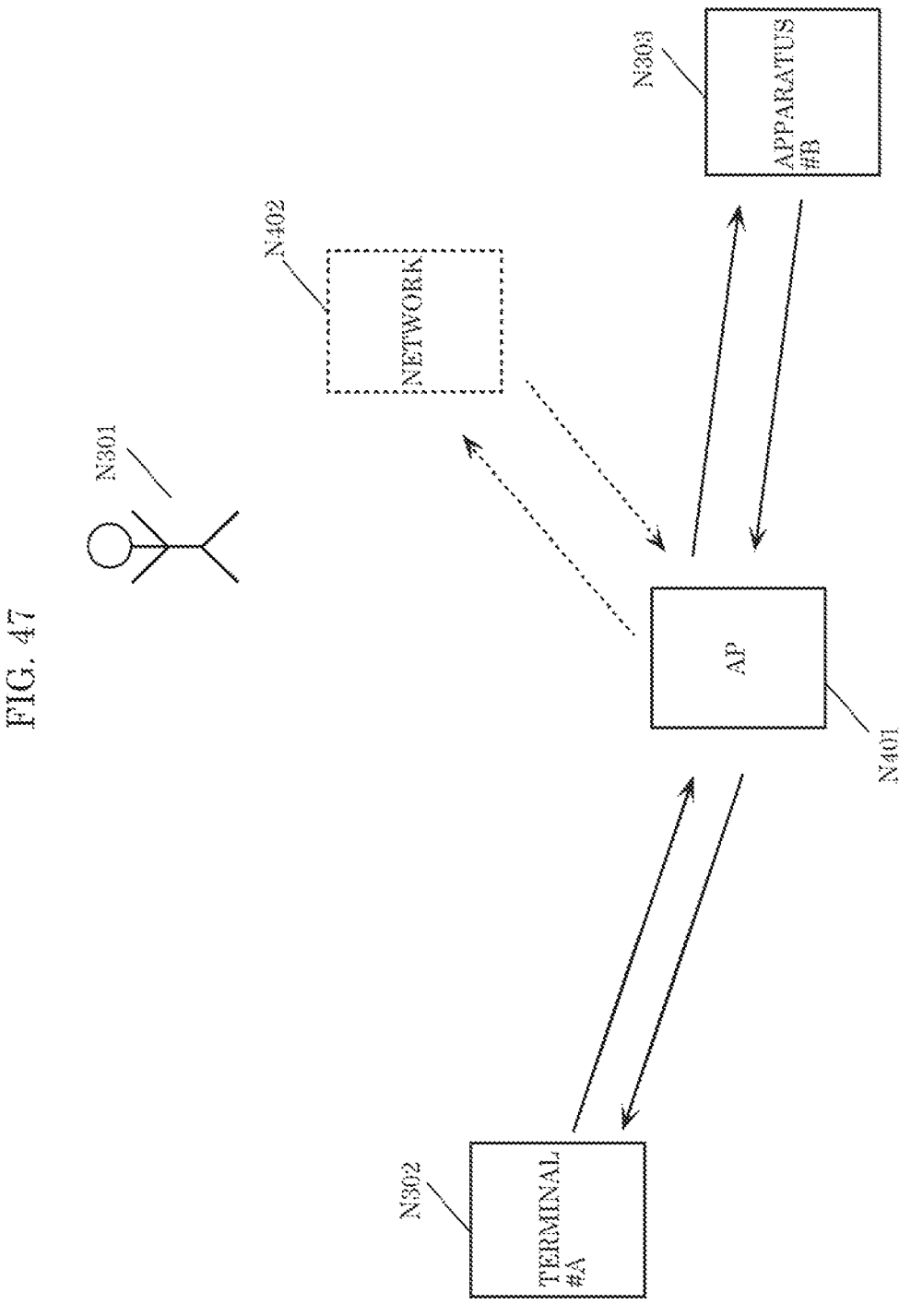
Figure 48:
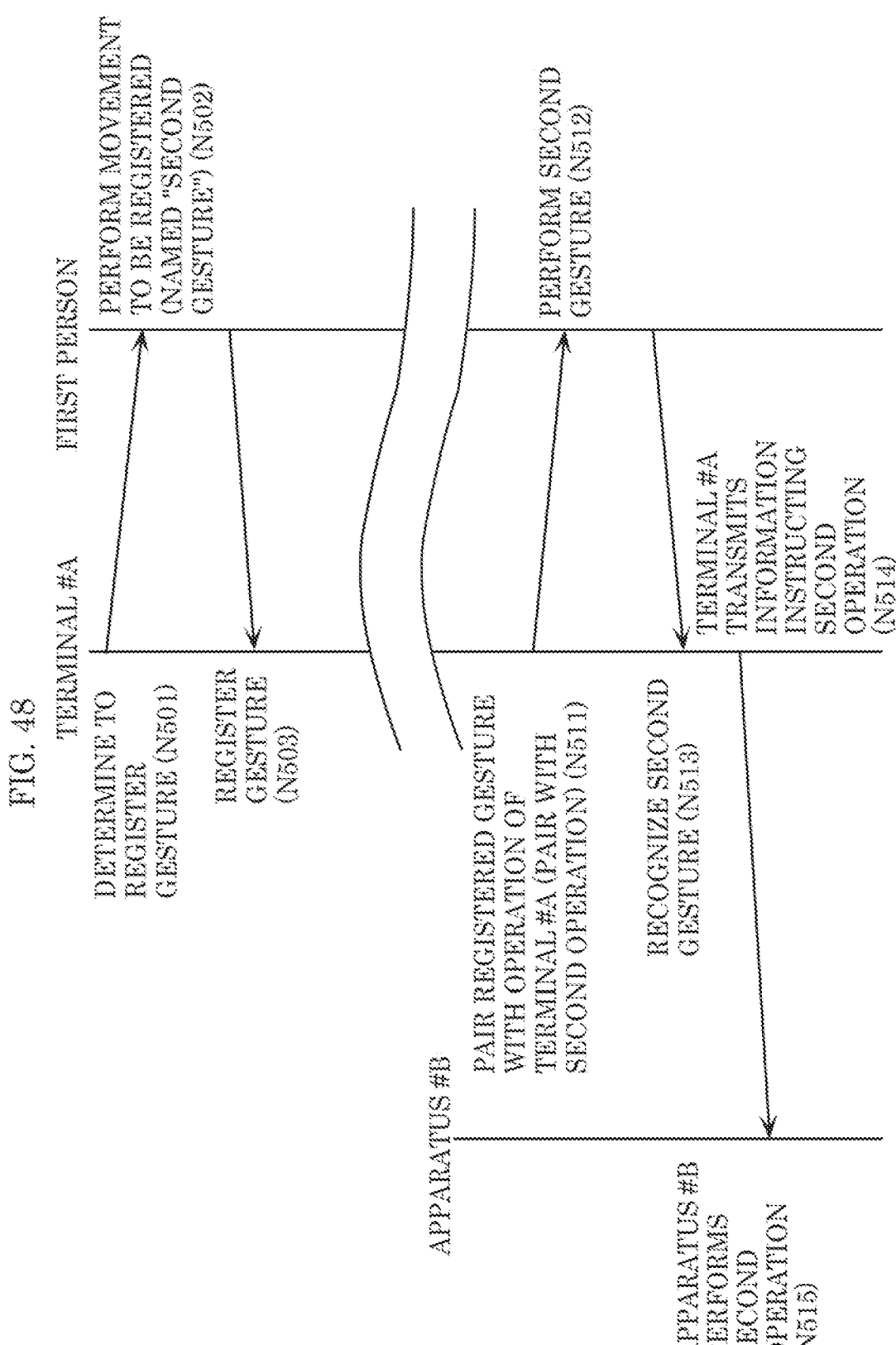
Figure 49:
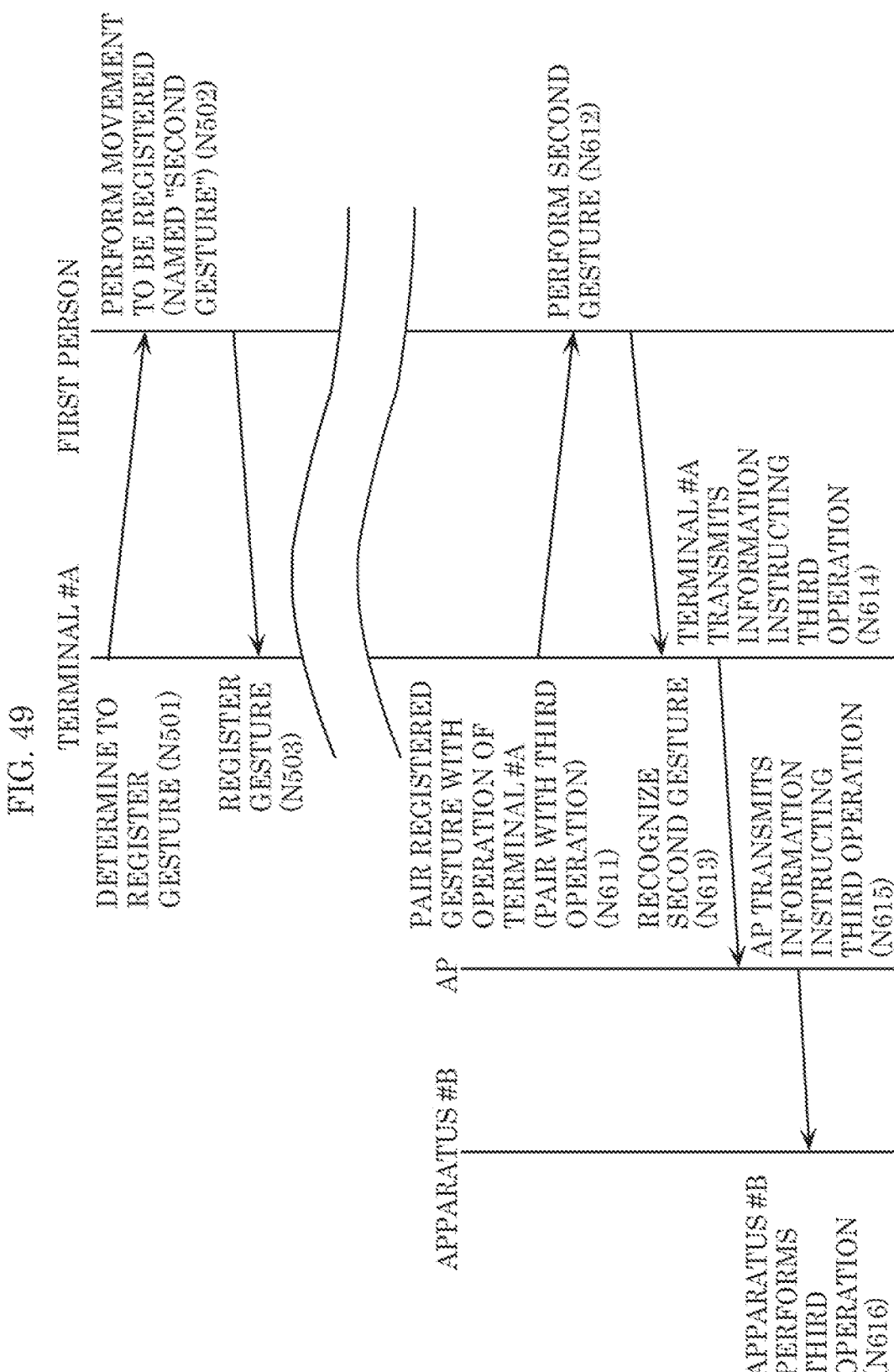
Figure 50:
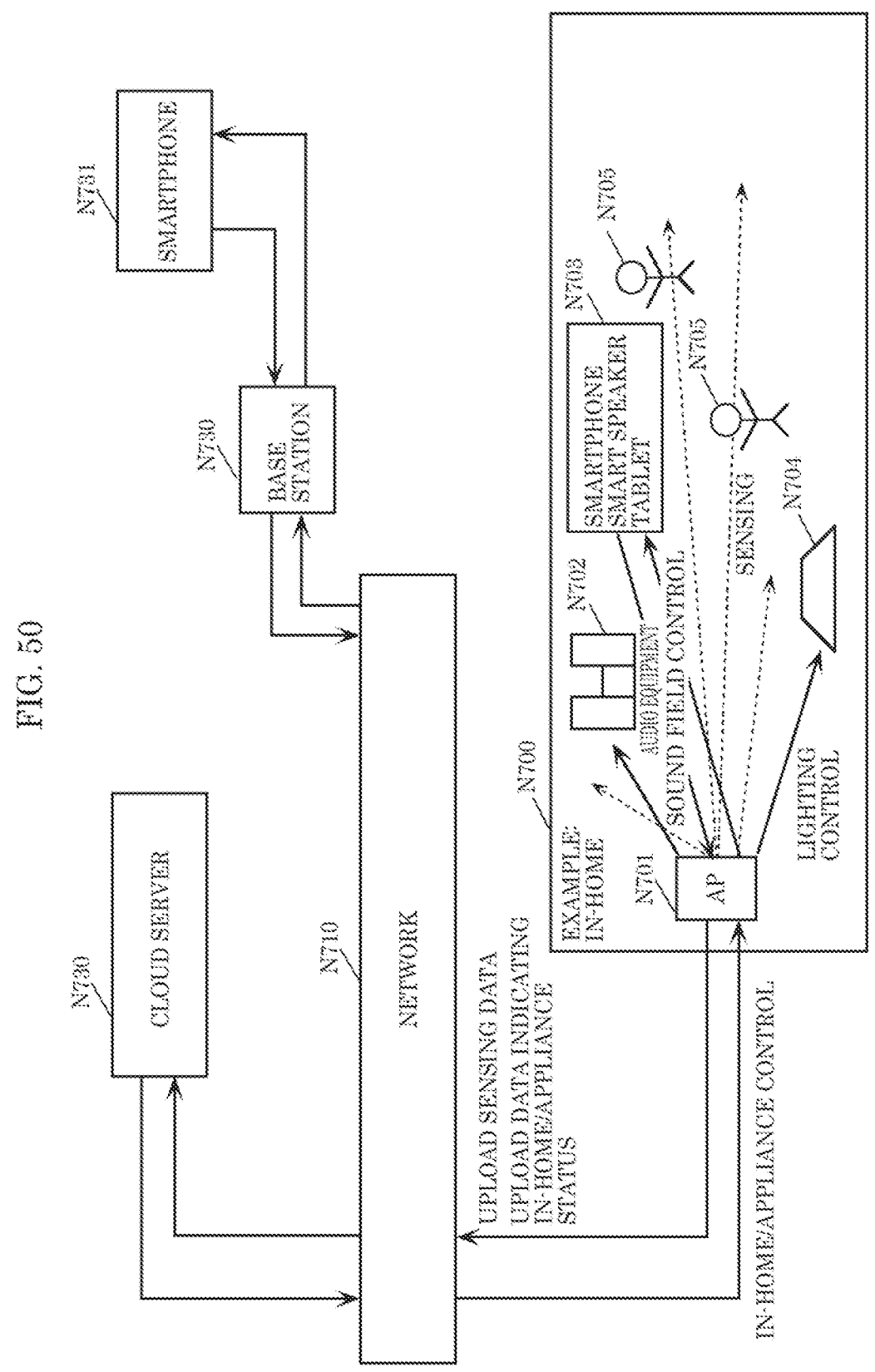
Figure 51:
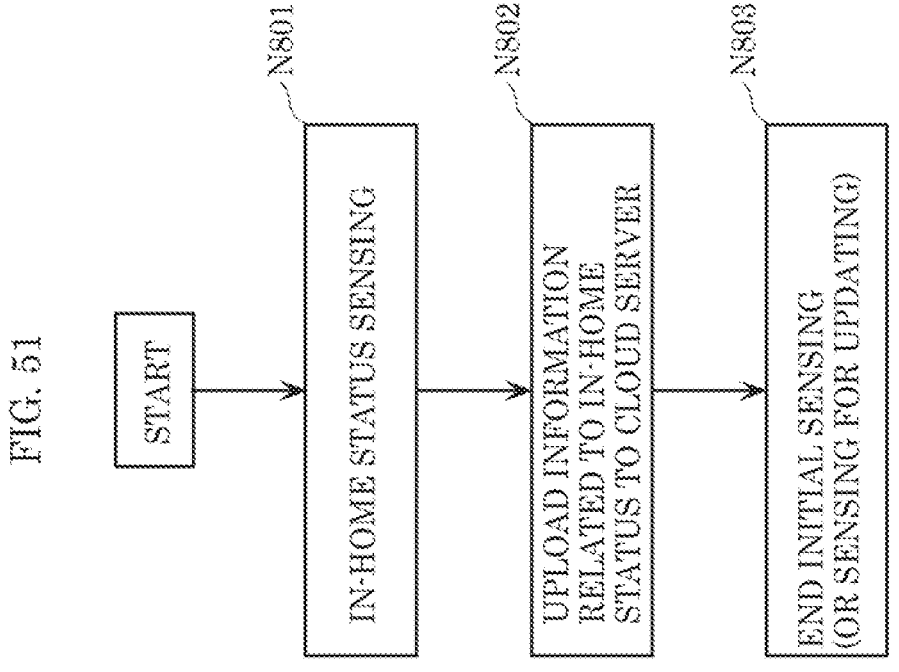
Figure 52:
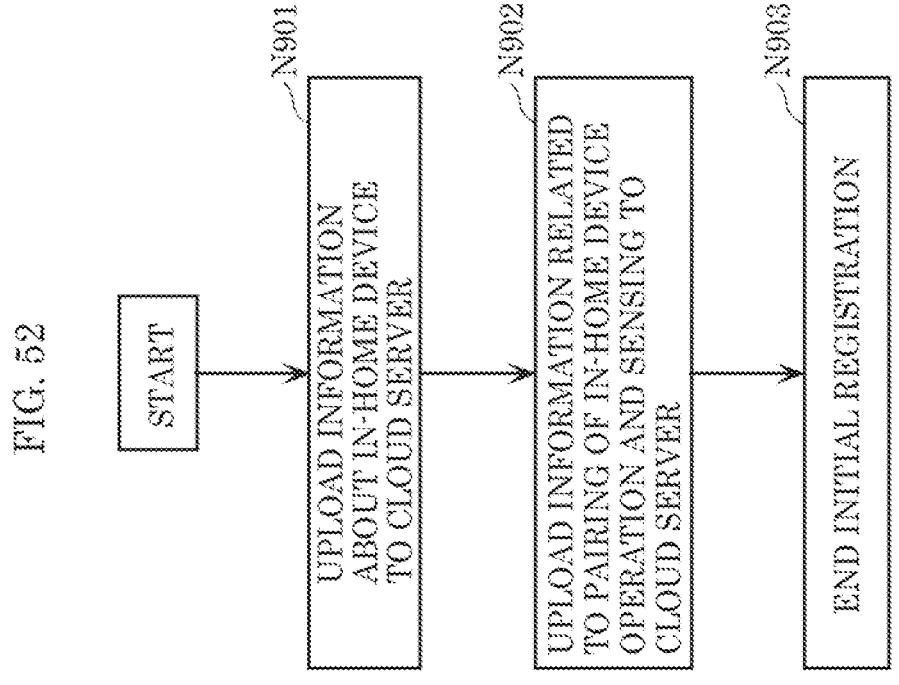
Figure 53:
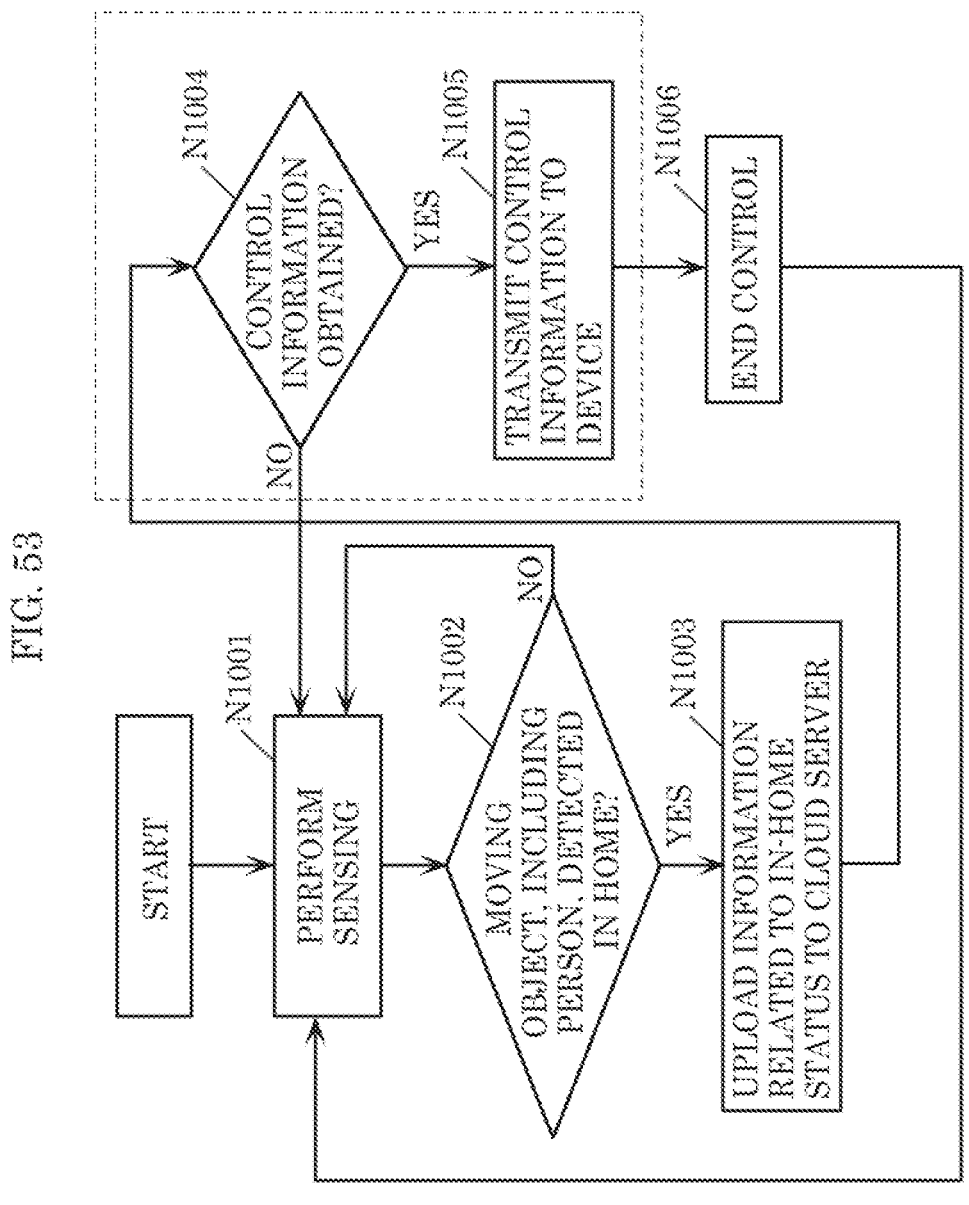
Figure 54:
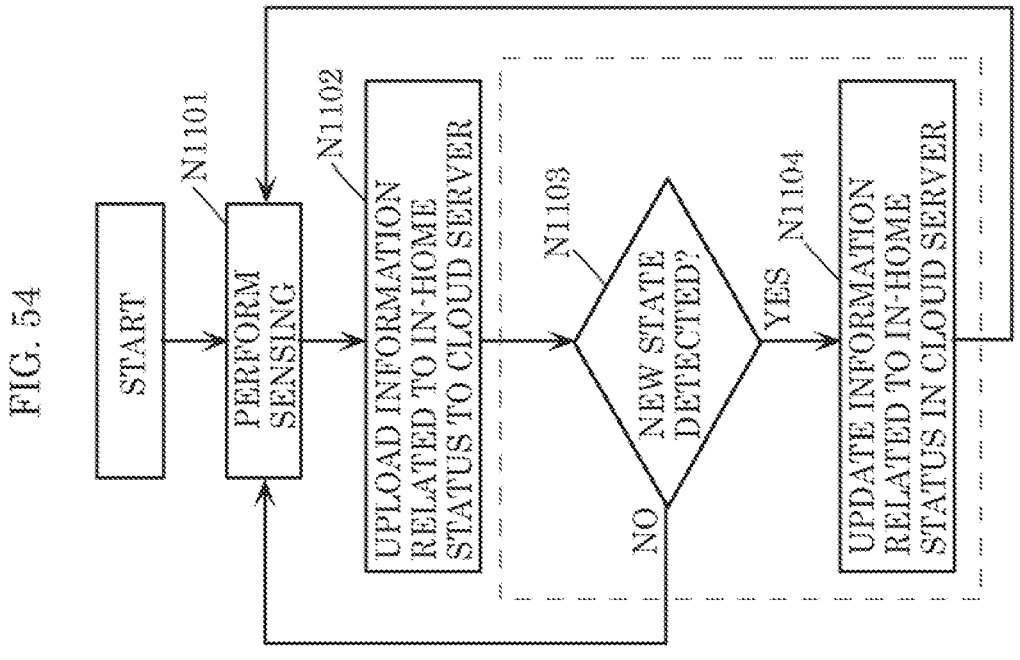
Figure 55:
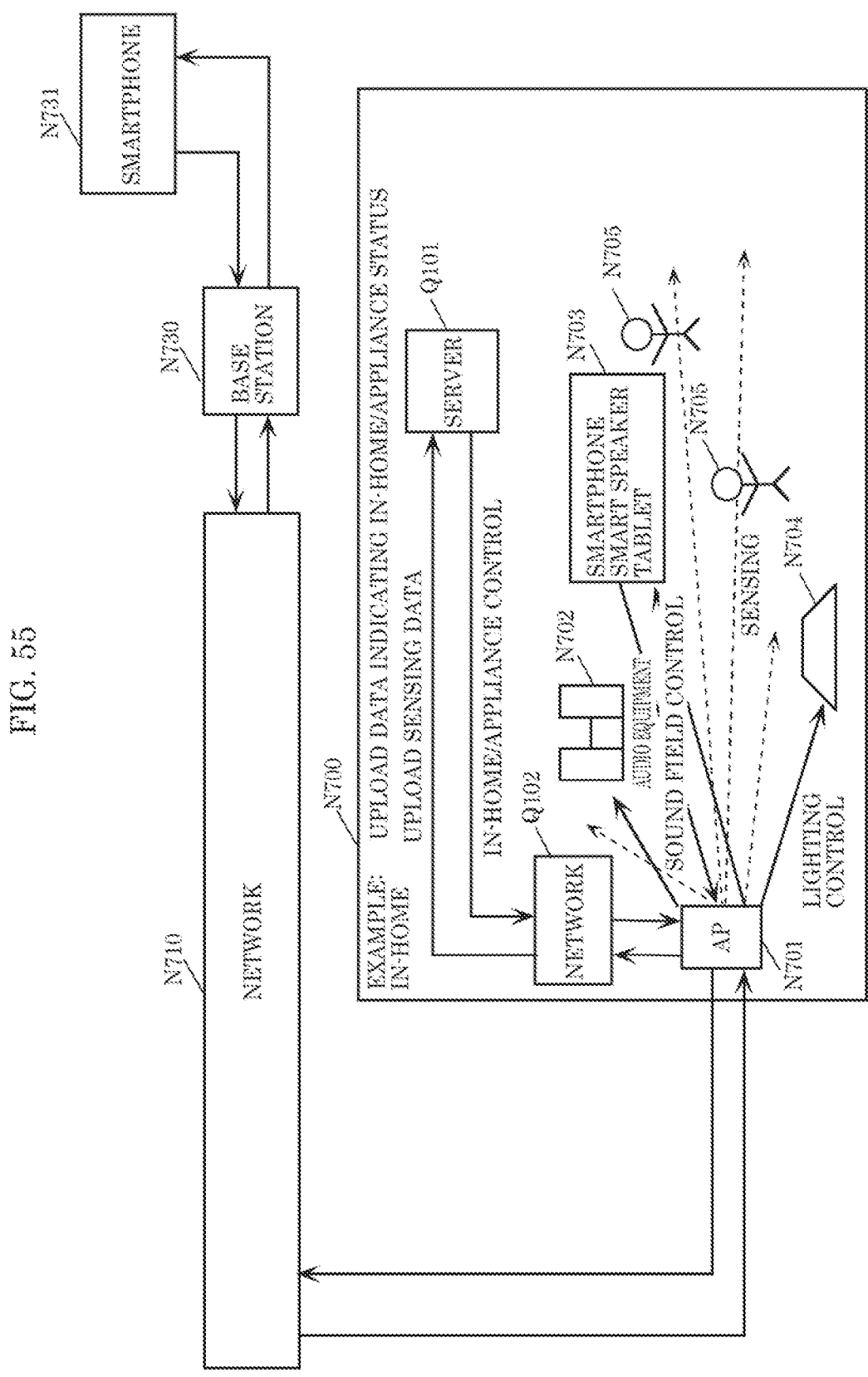
Figure 56:
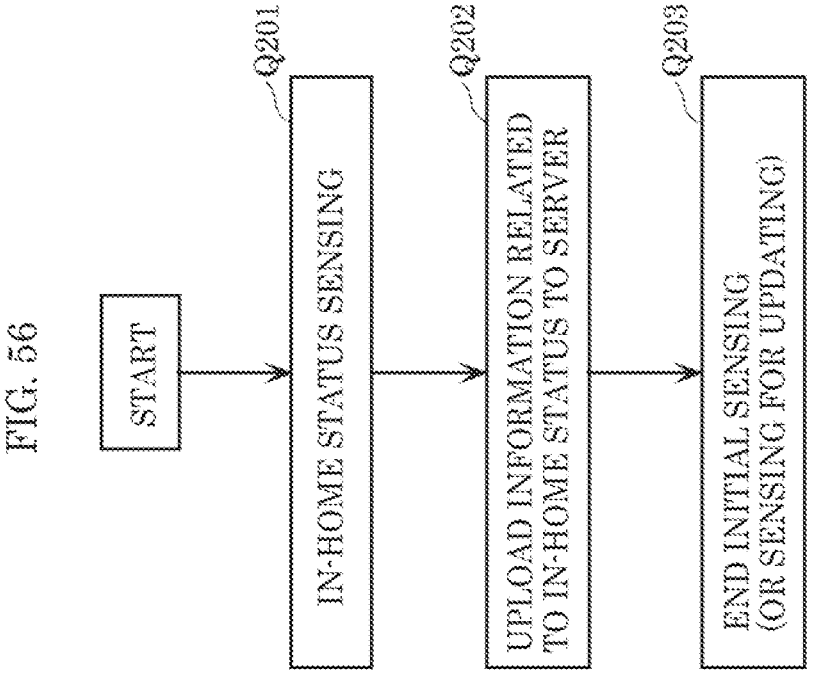
Figure 57:
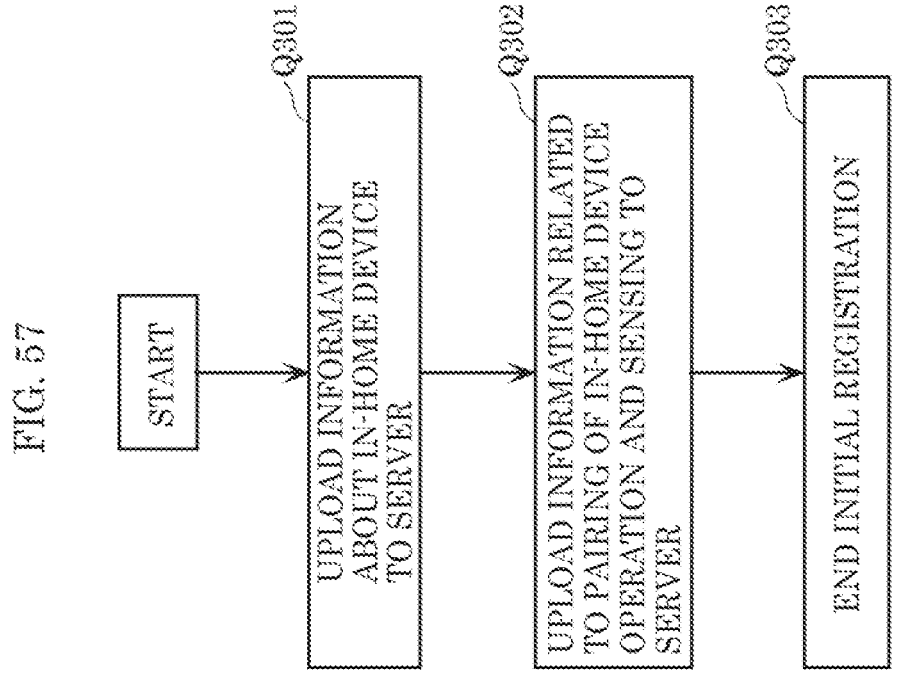
Figure 58:
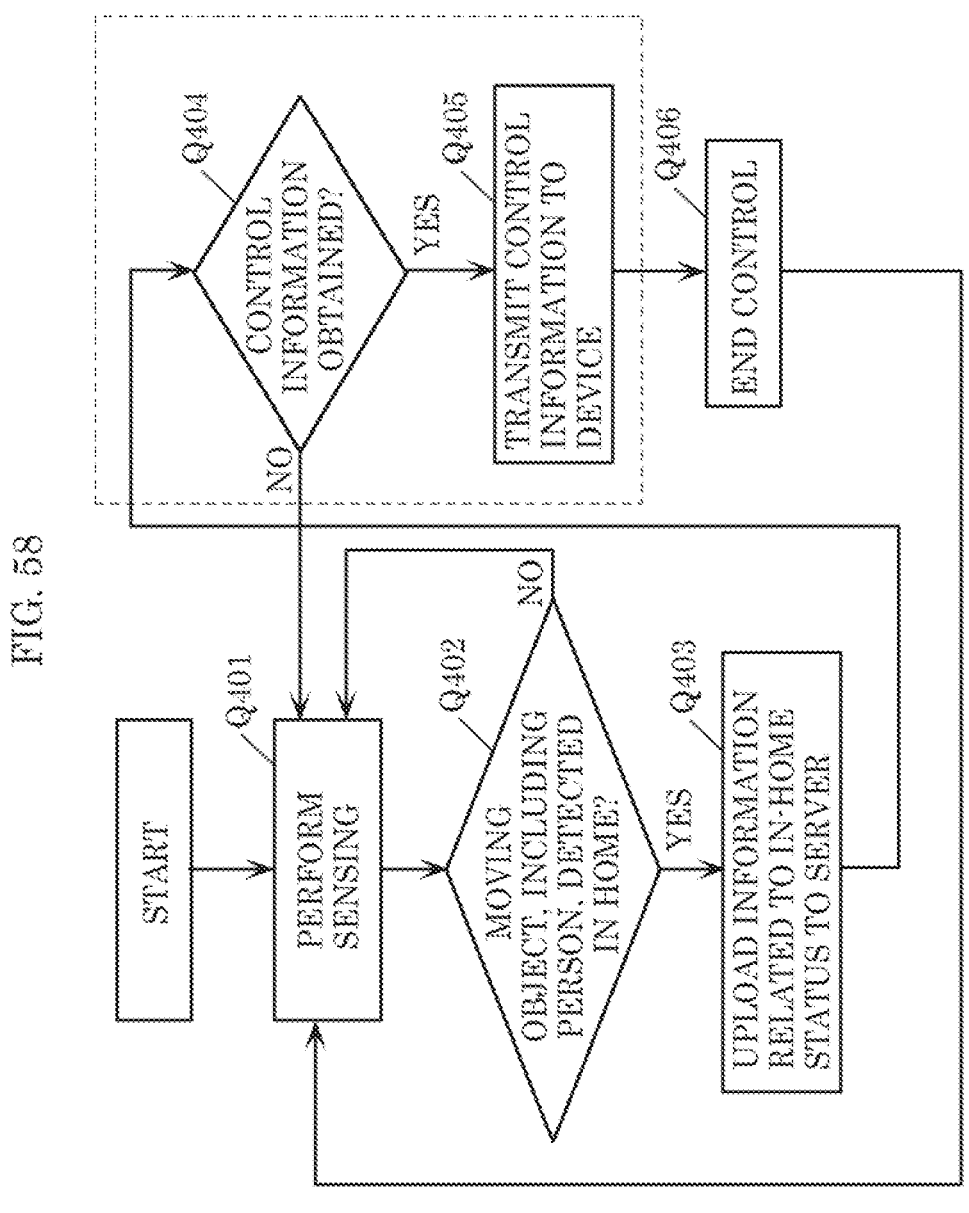
Figure 59:
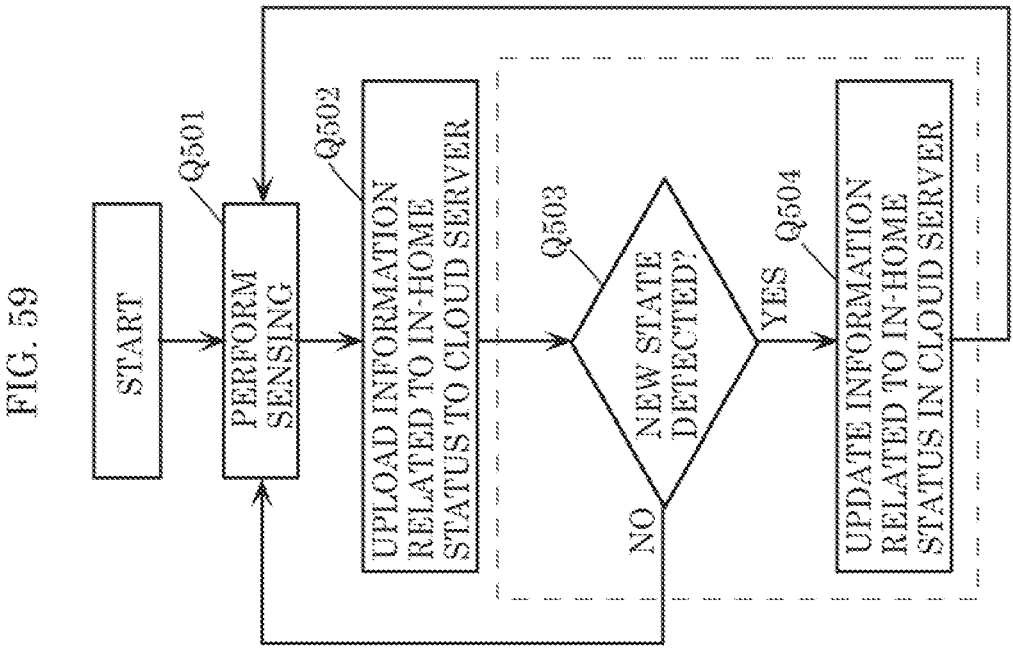
Figure 60:
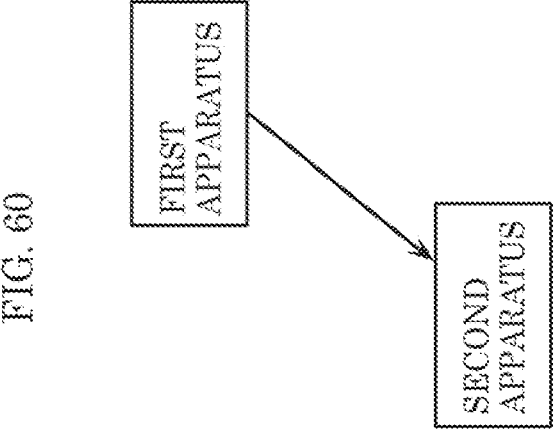
Figure 61:
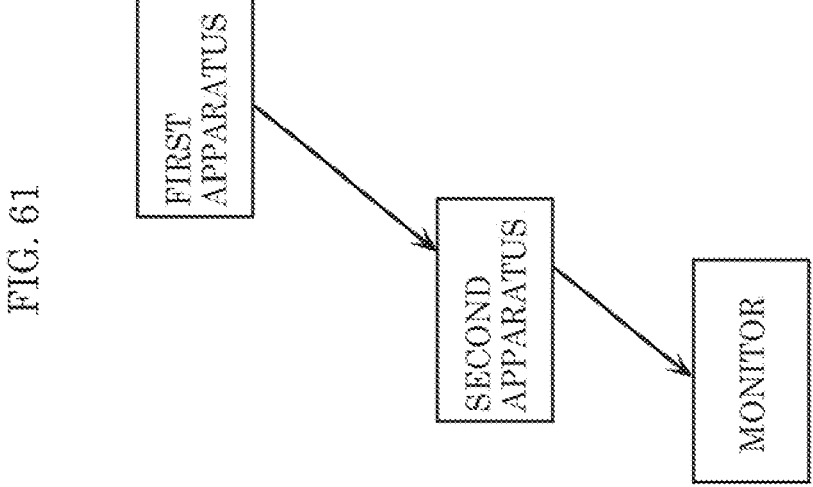
Figure 64:
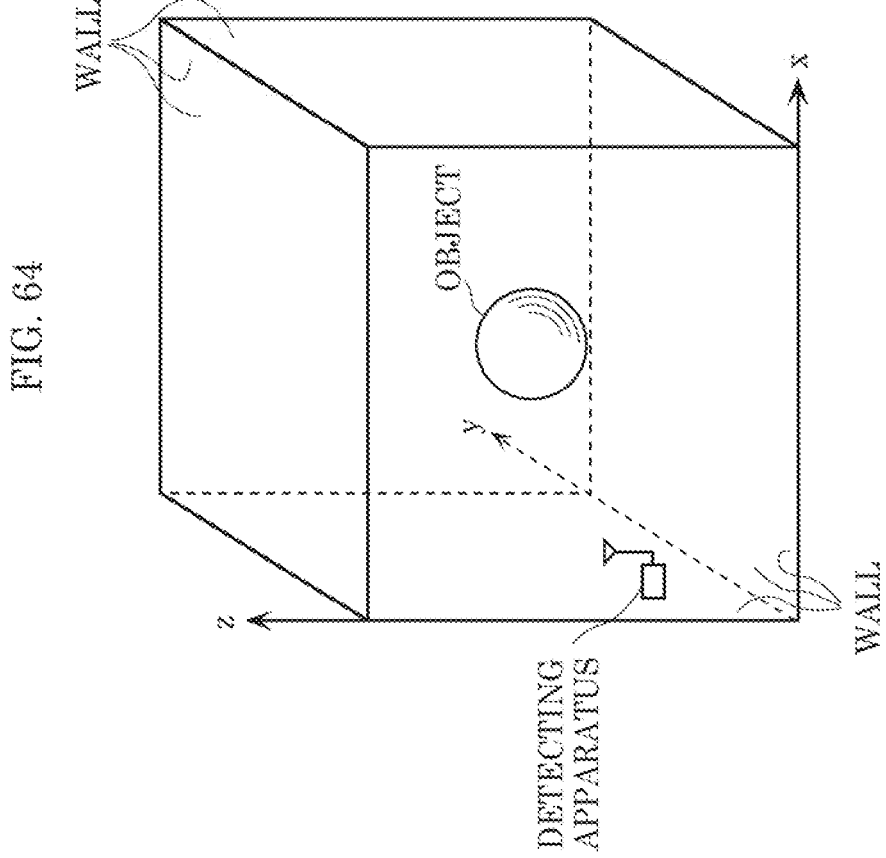
Figure 67:
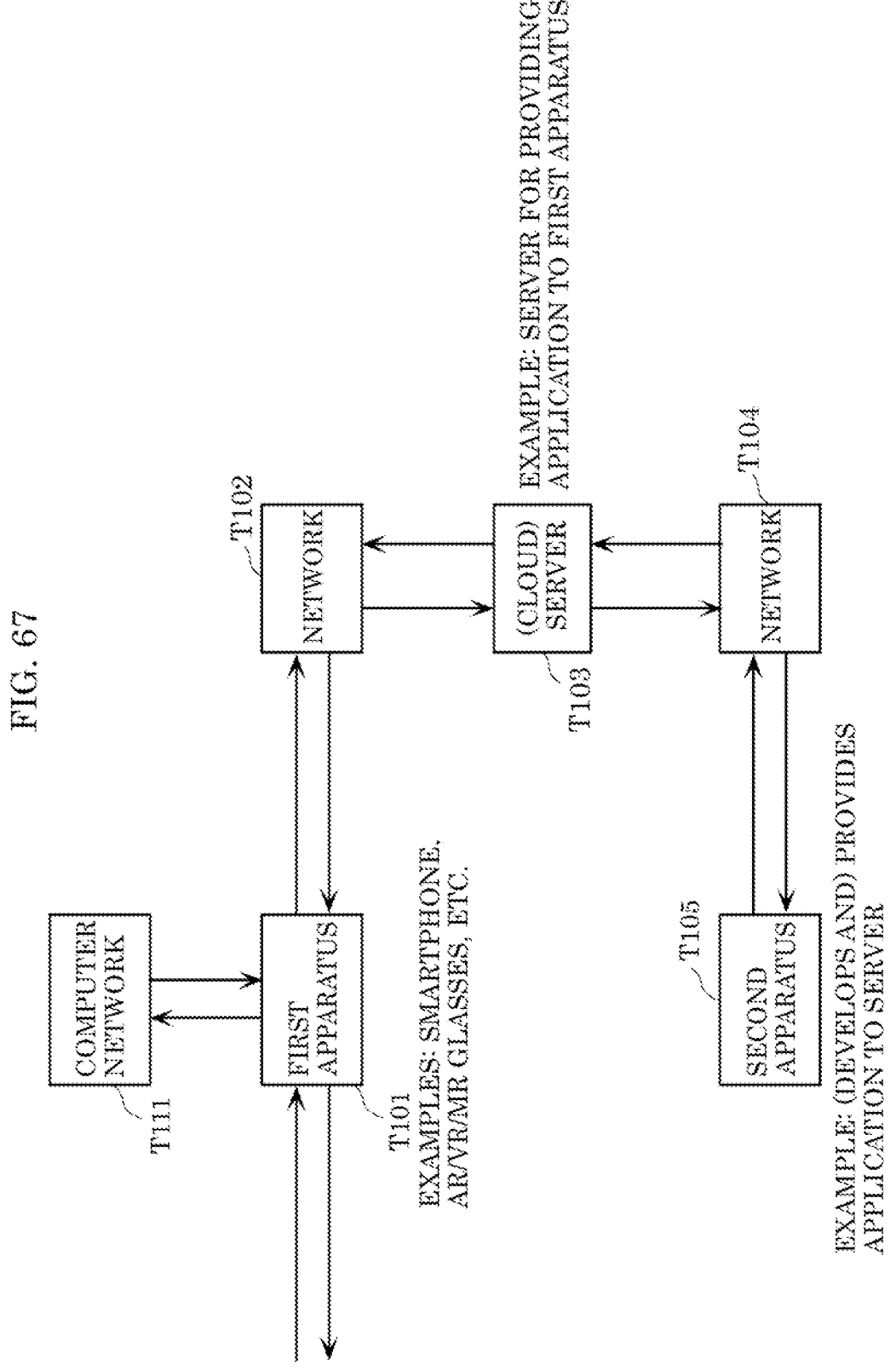
Figure 68:
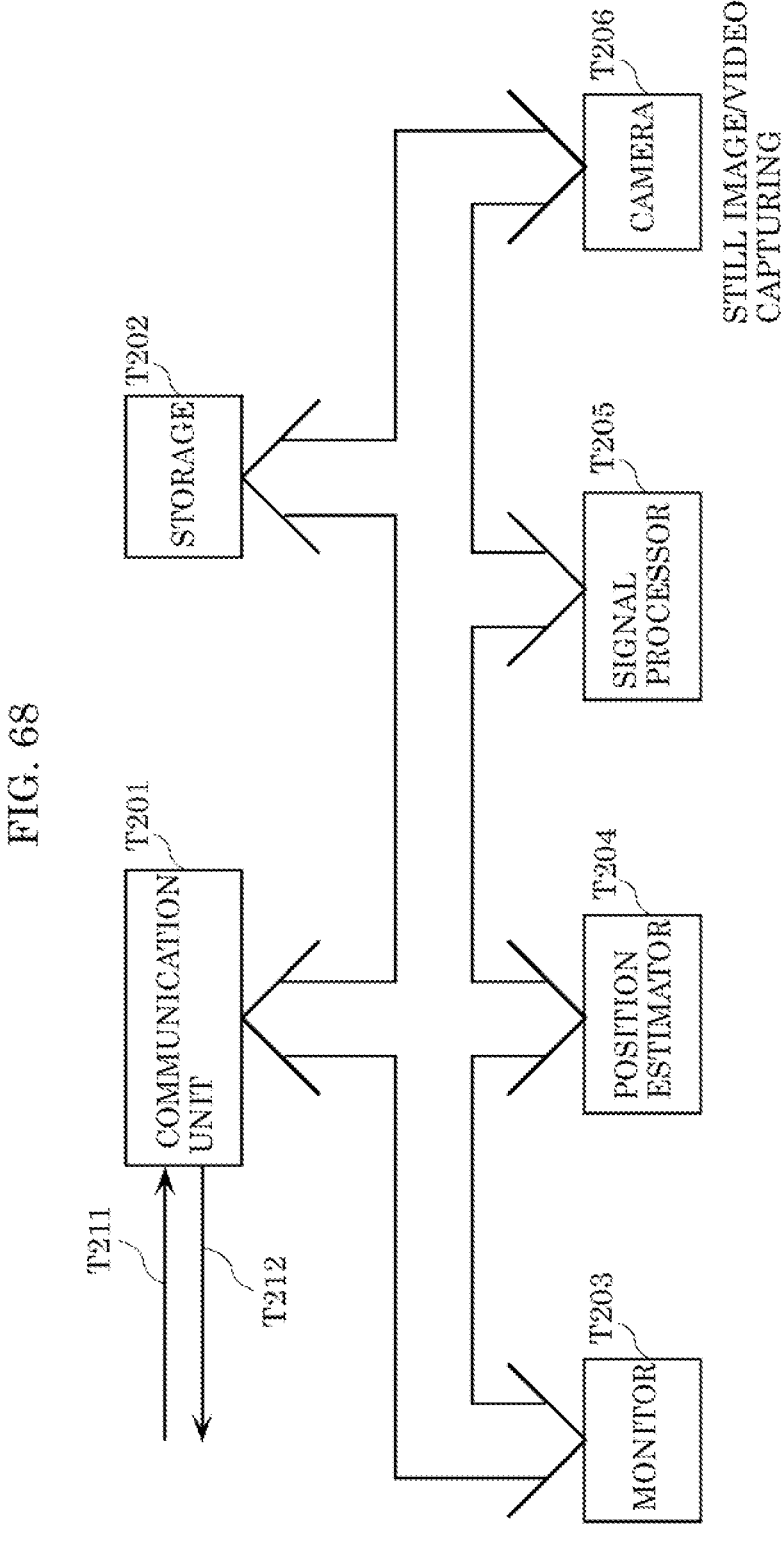
Figure 71:
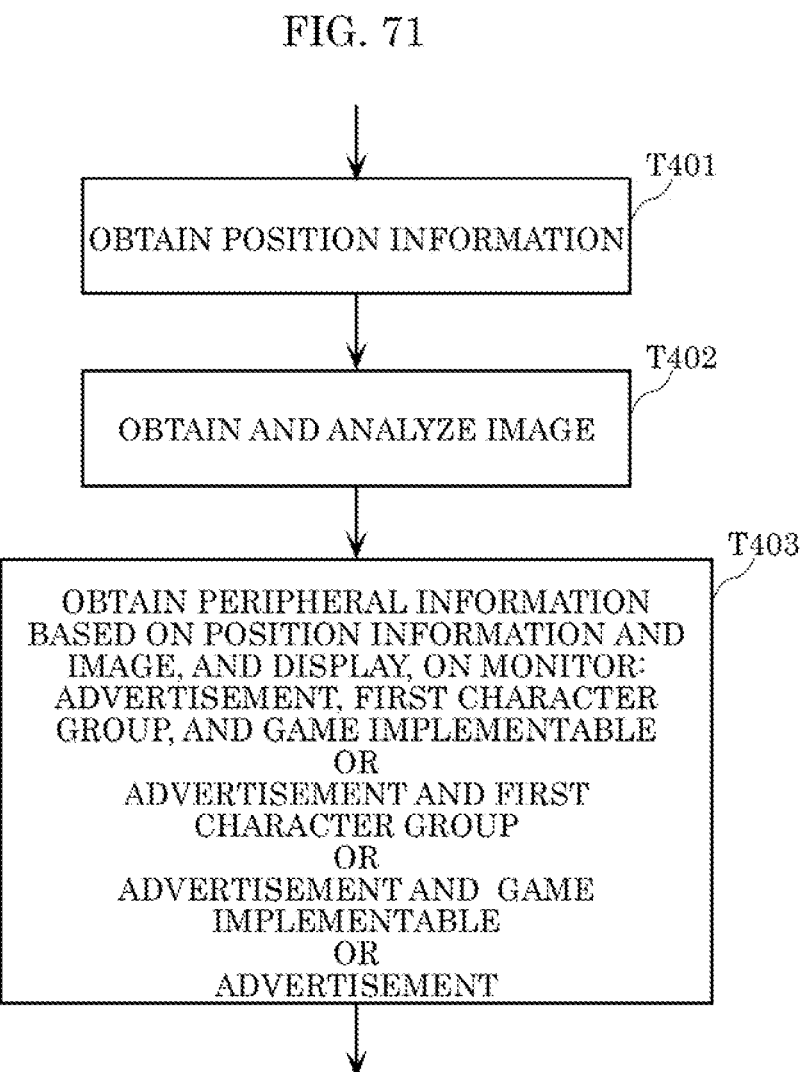
Figure 72:
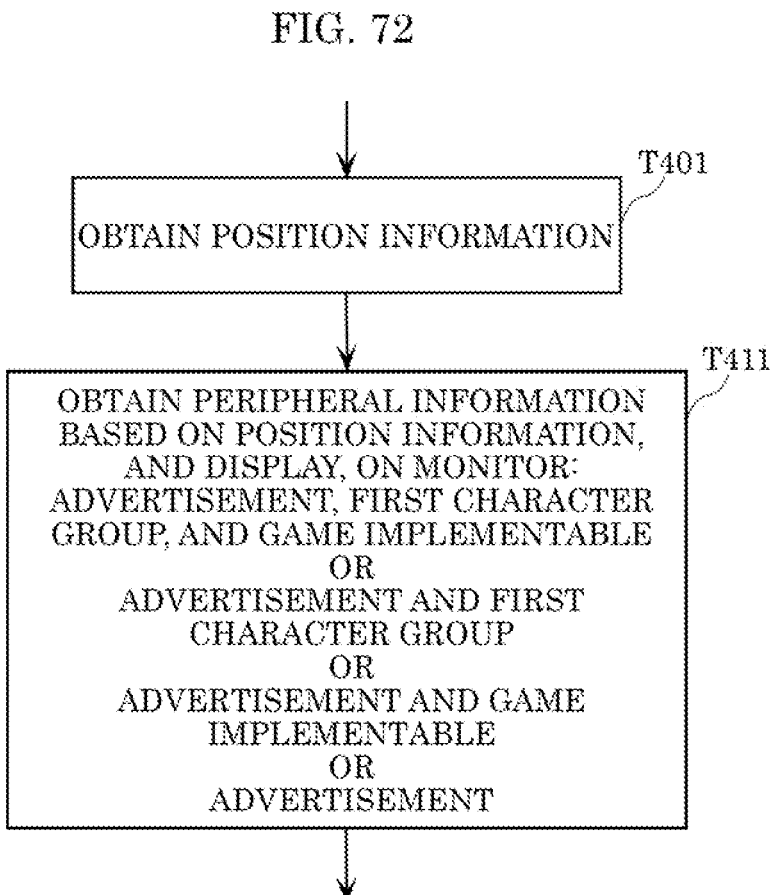
Figure 73:
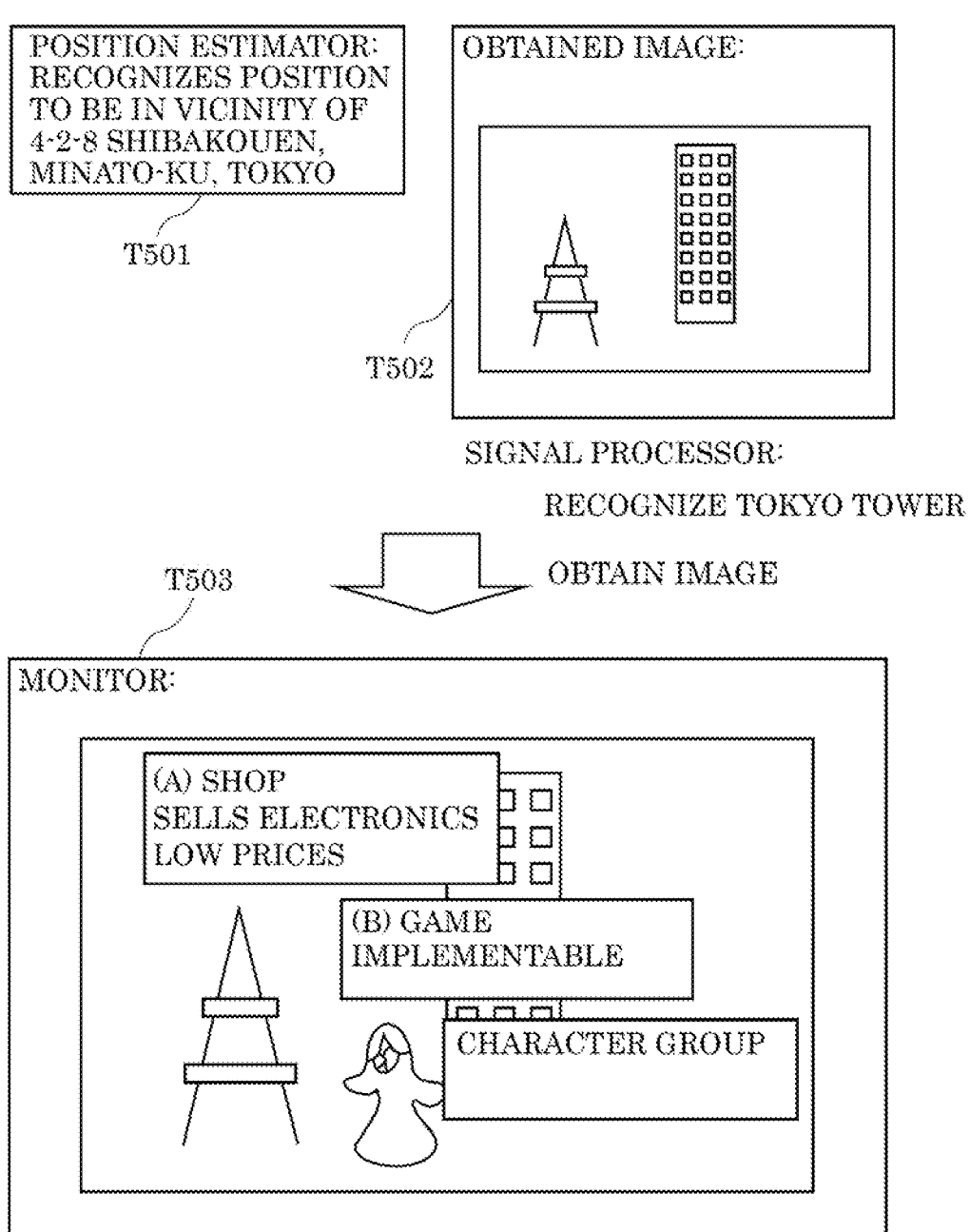
Figure 74:
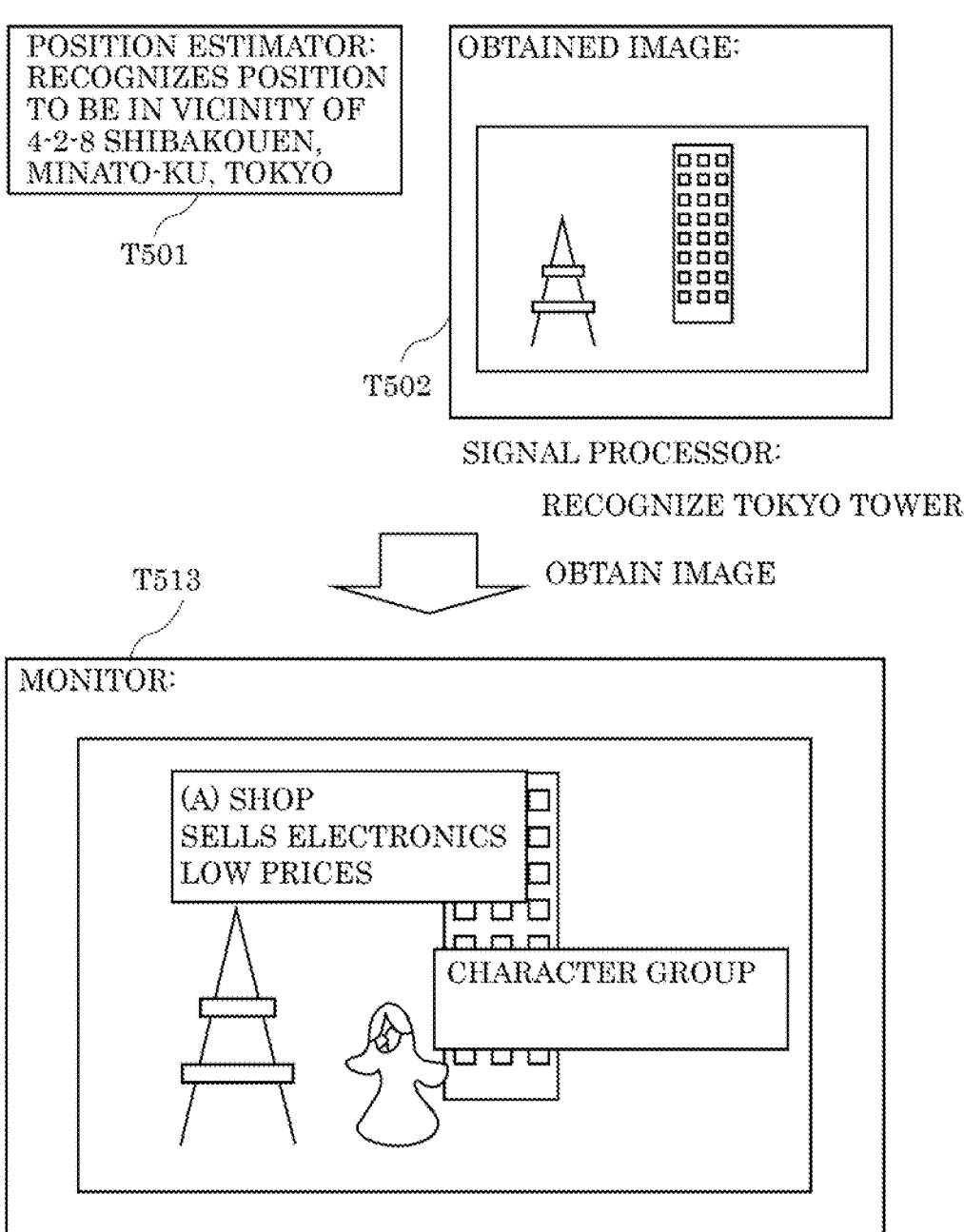
Figure 75:
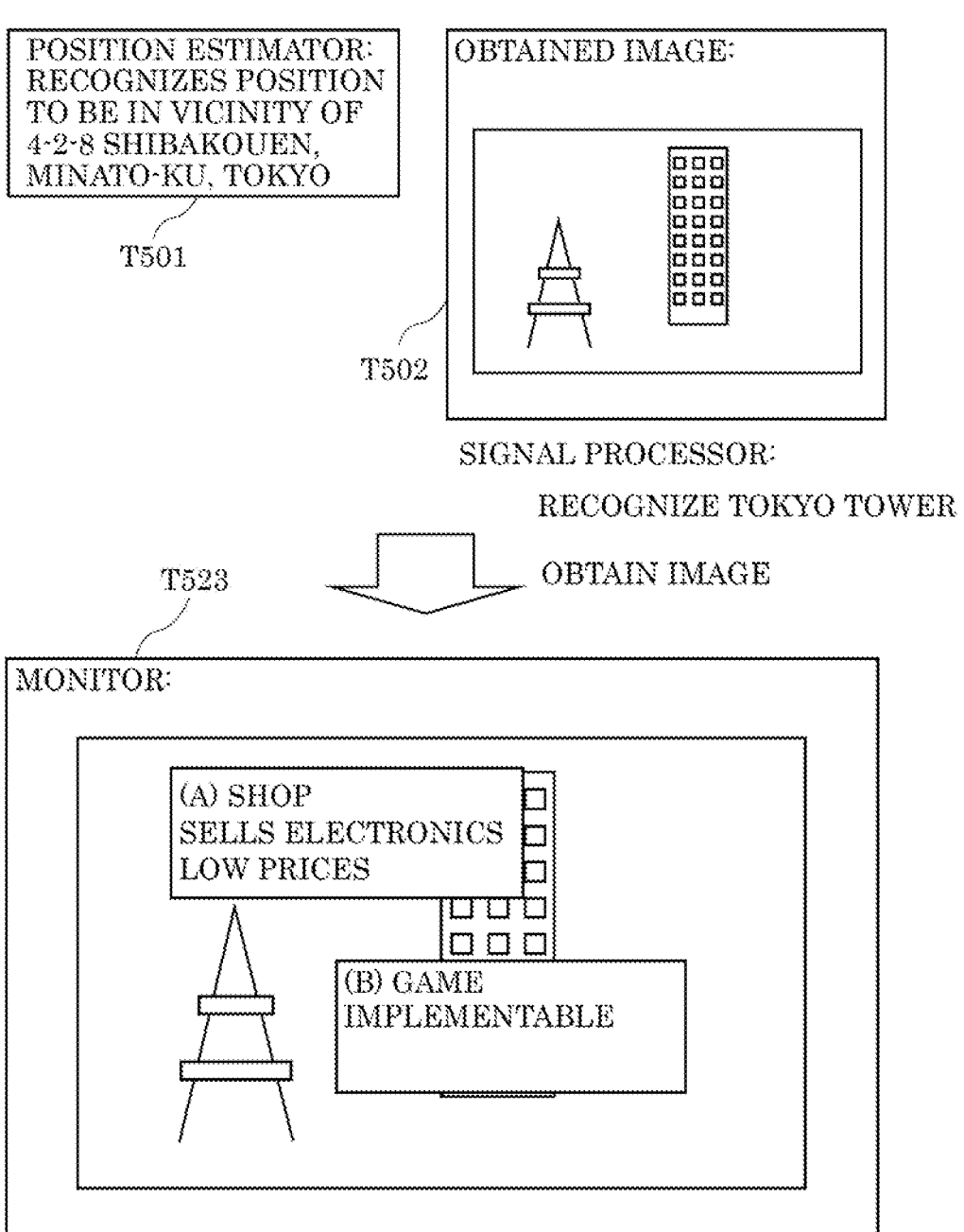
Figure 76:
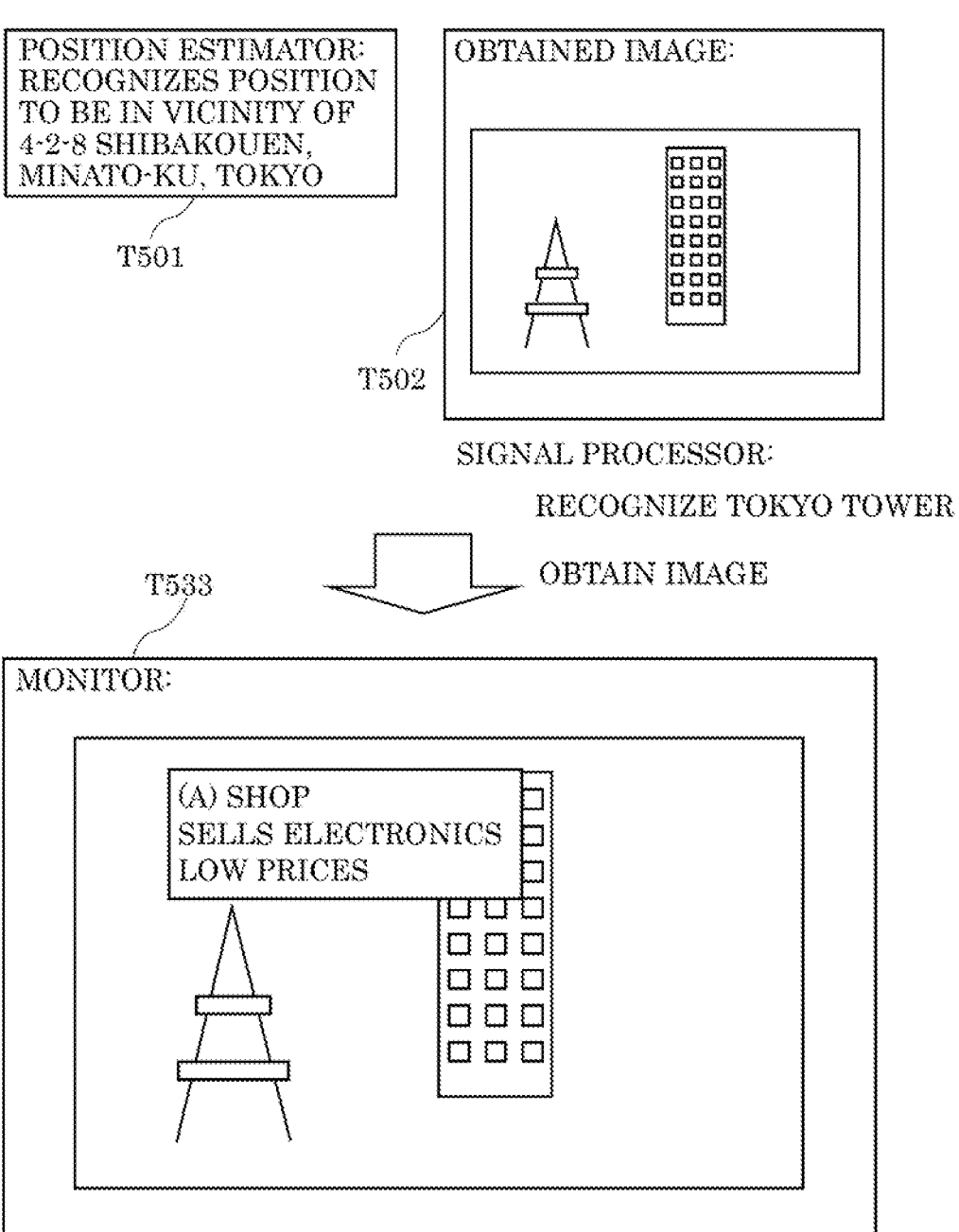
Figure 77:
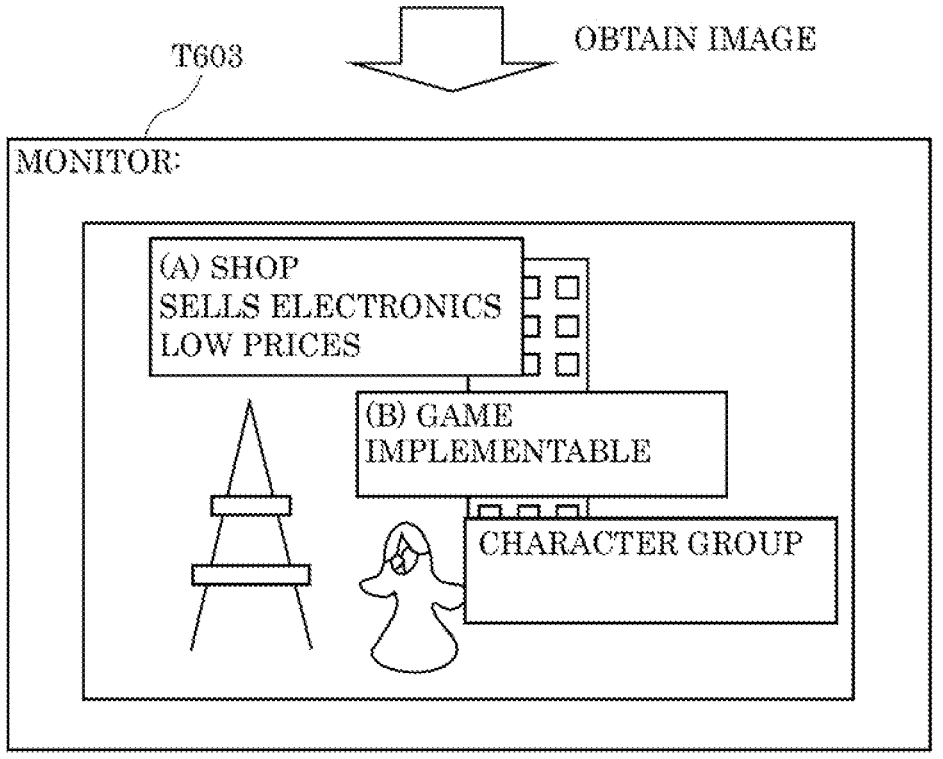
Figure 81:
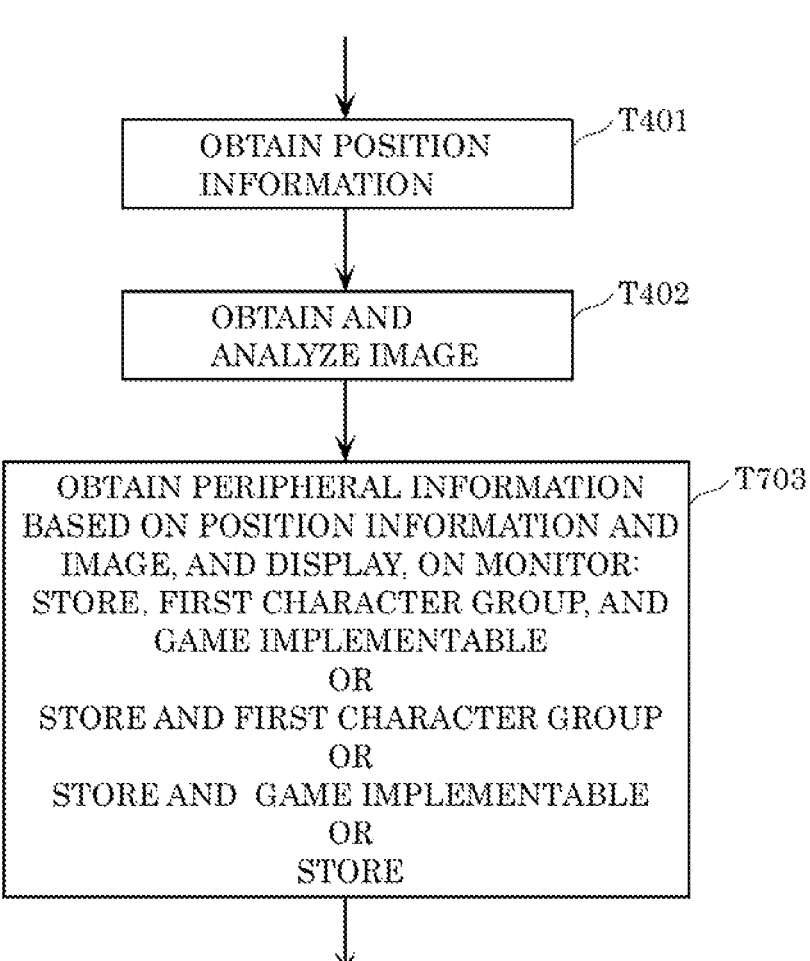
Figure 82:
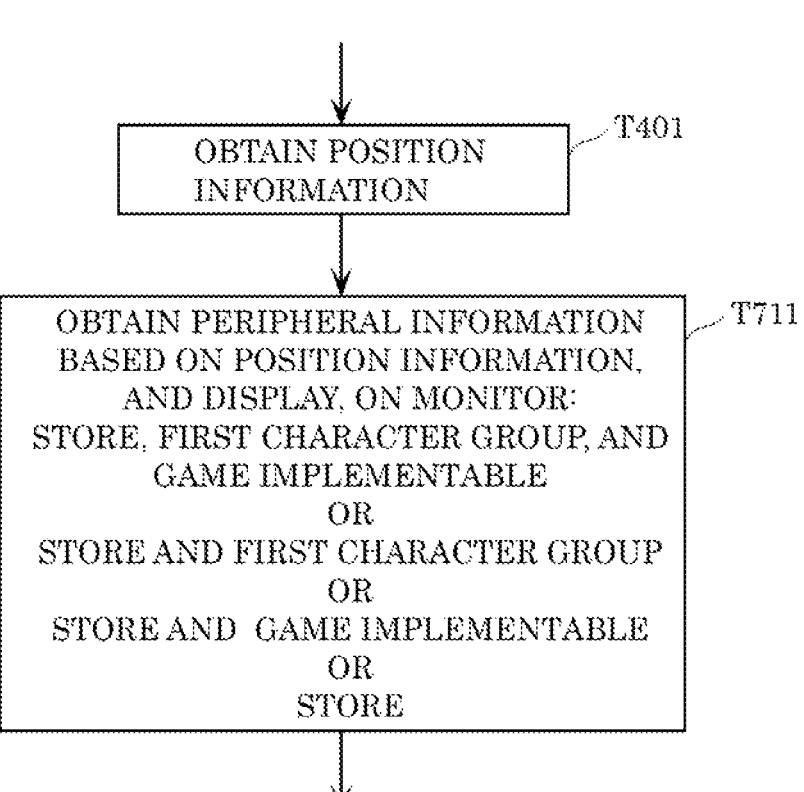
Figure 83:
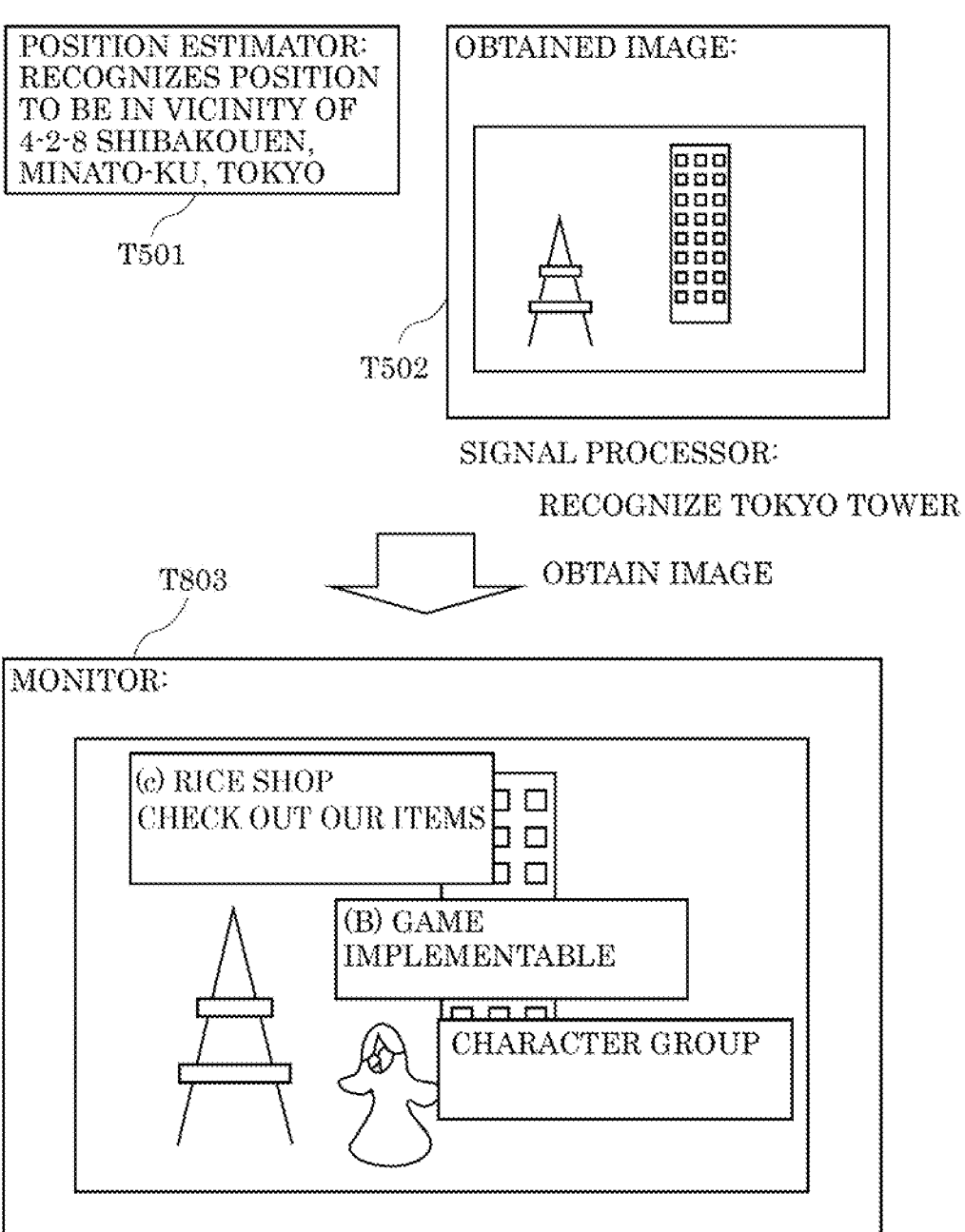
Figure 84:
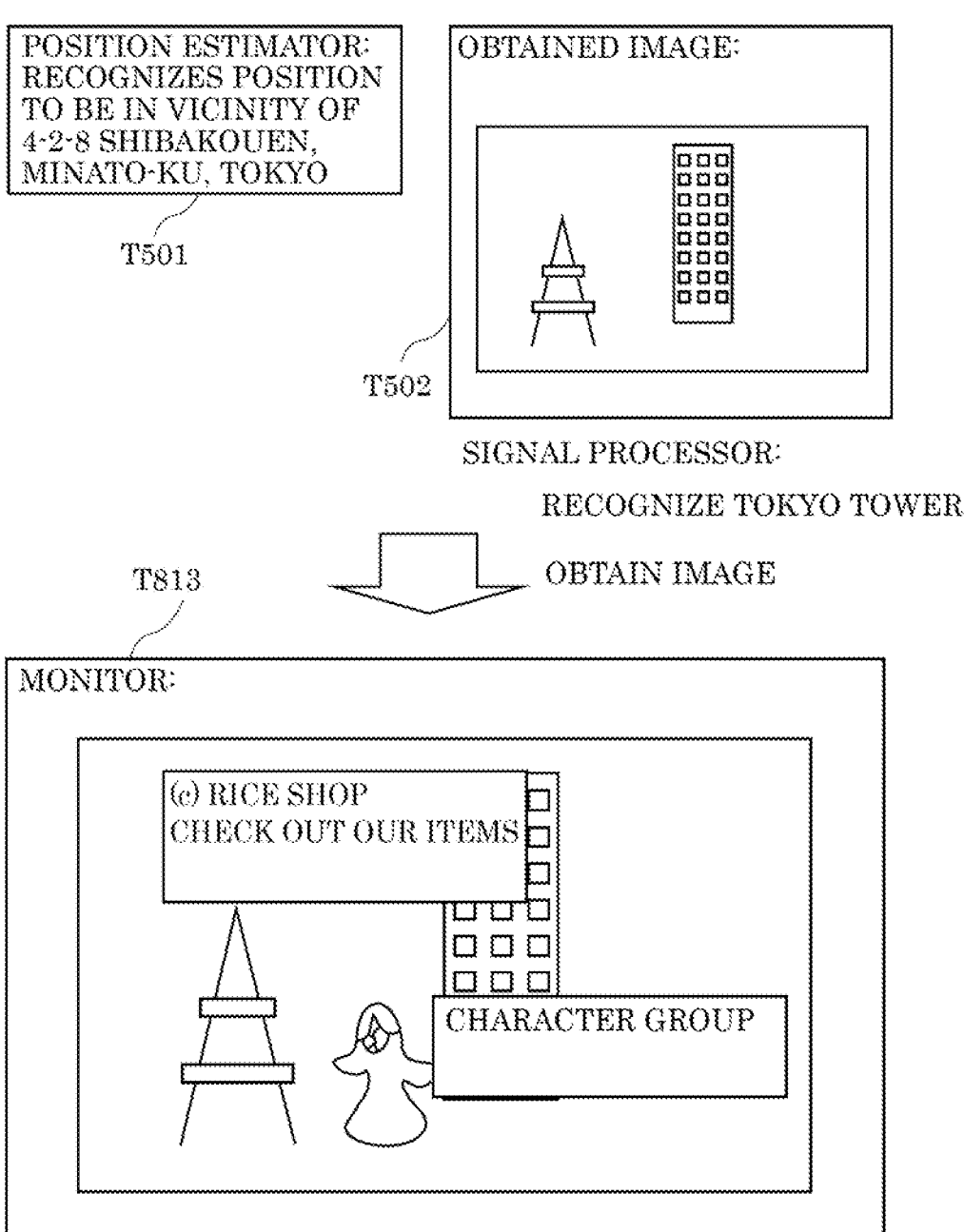
Figure 85:
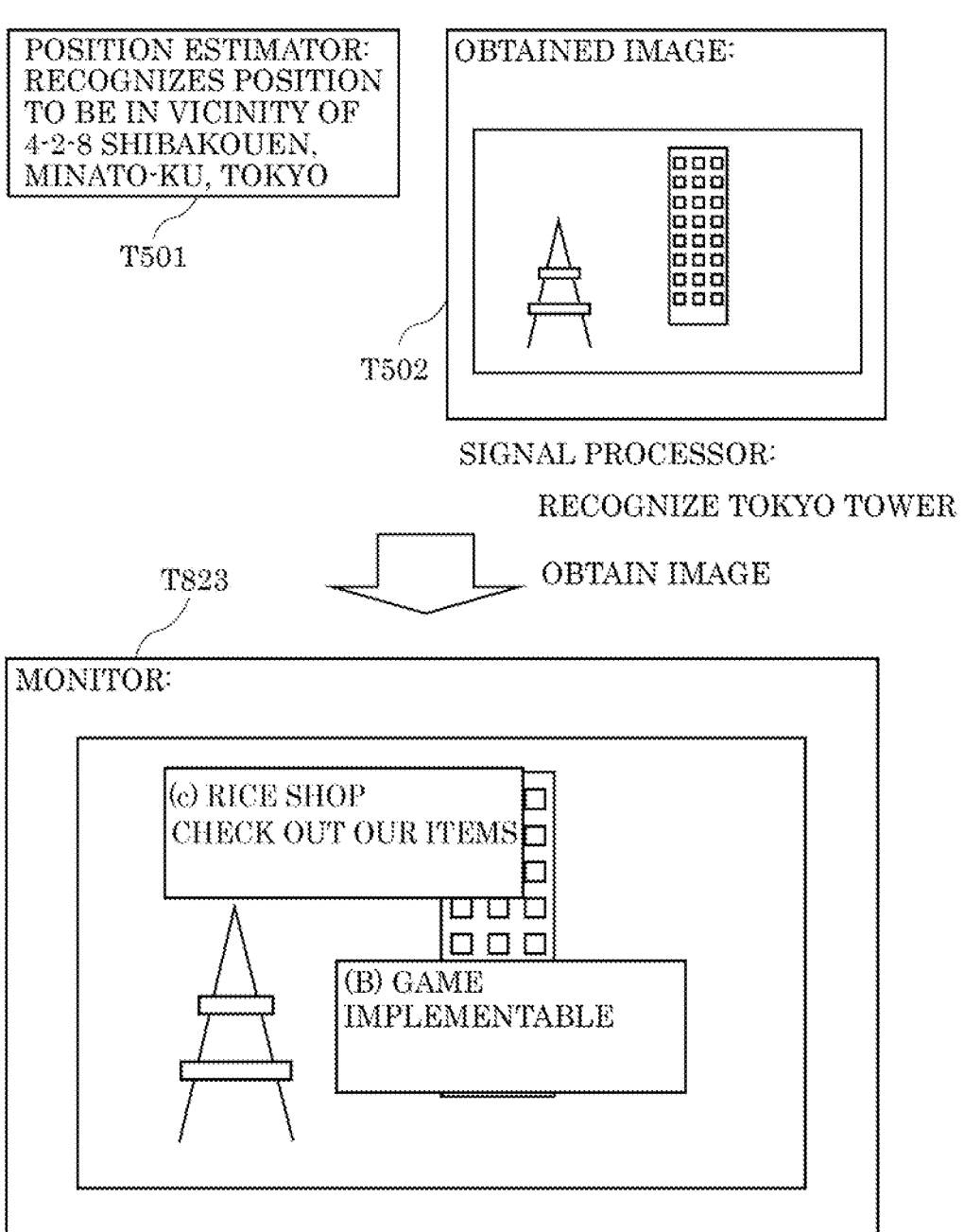
Figure 86:
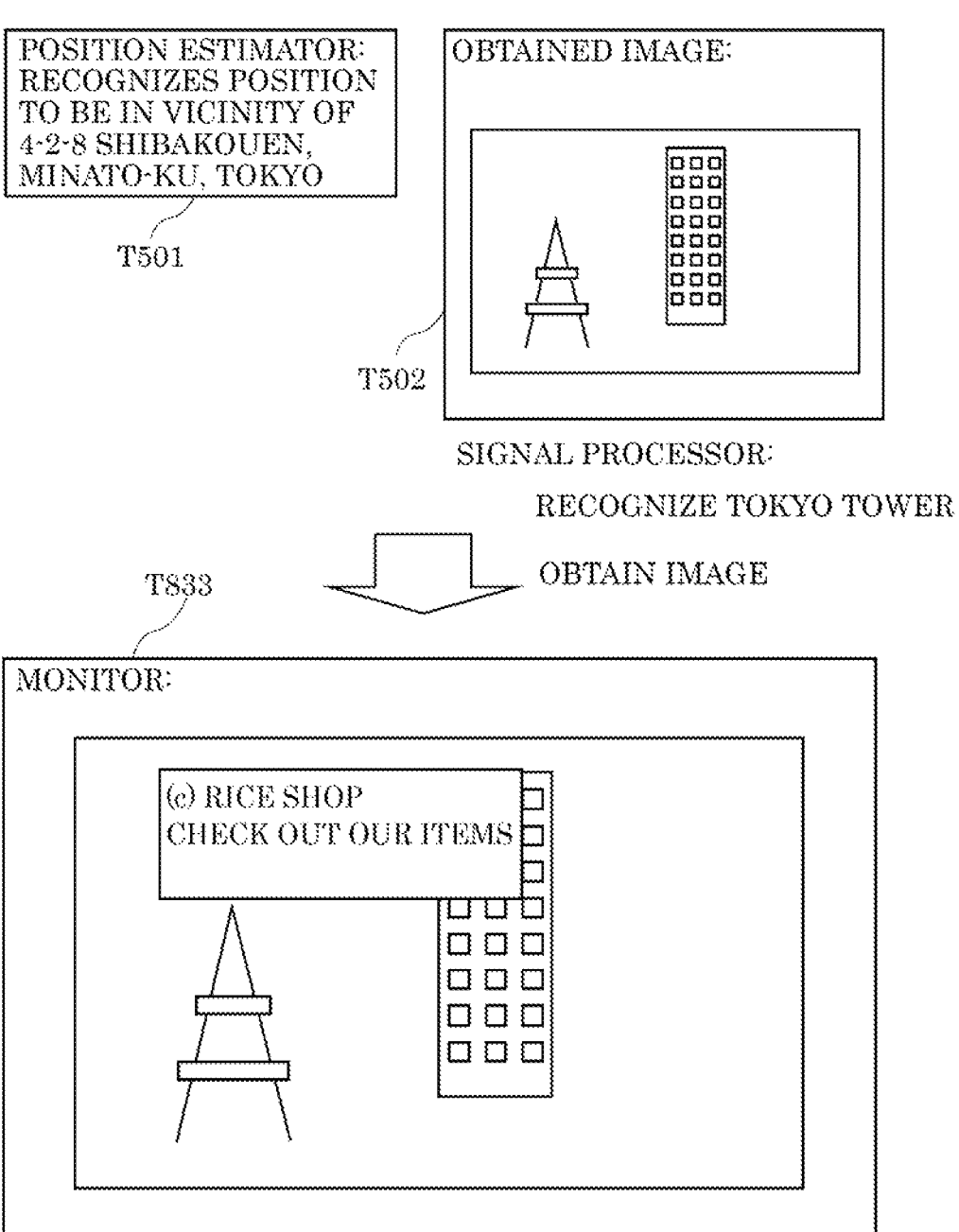
Figure 87:
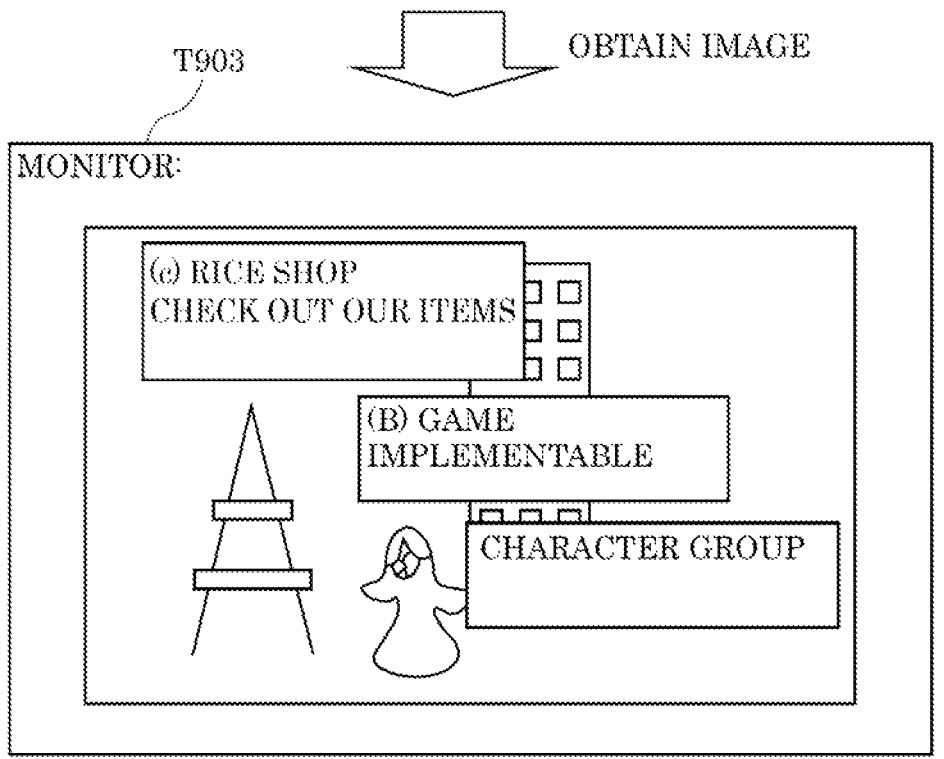
Figure 89:
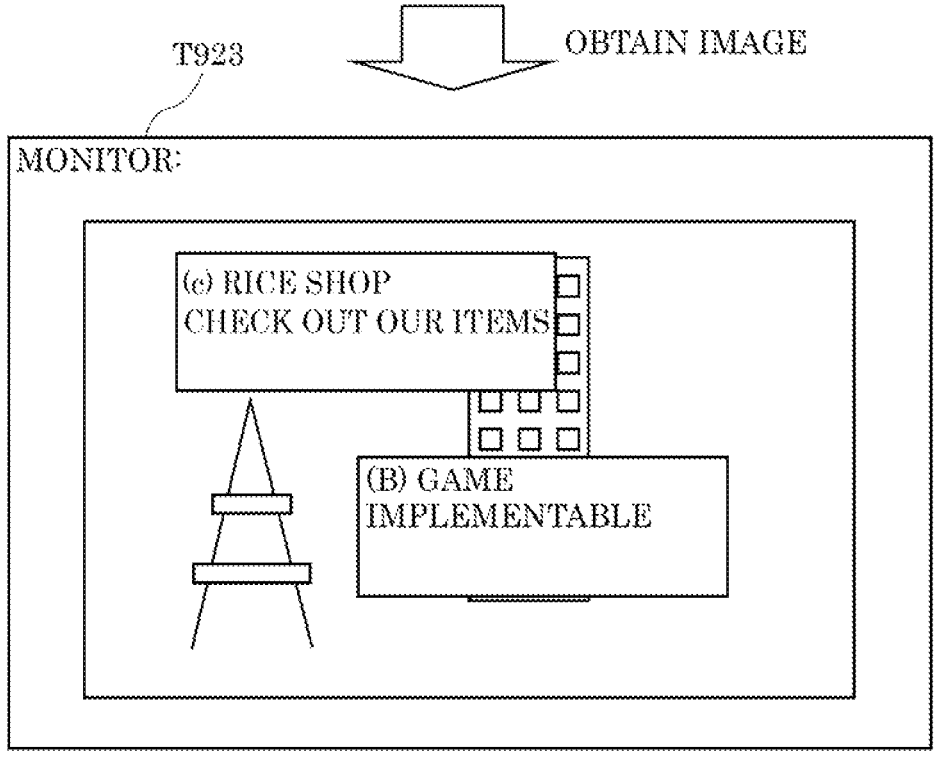
Figure 91:
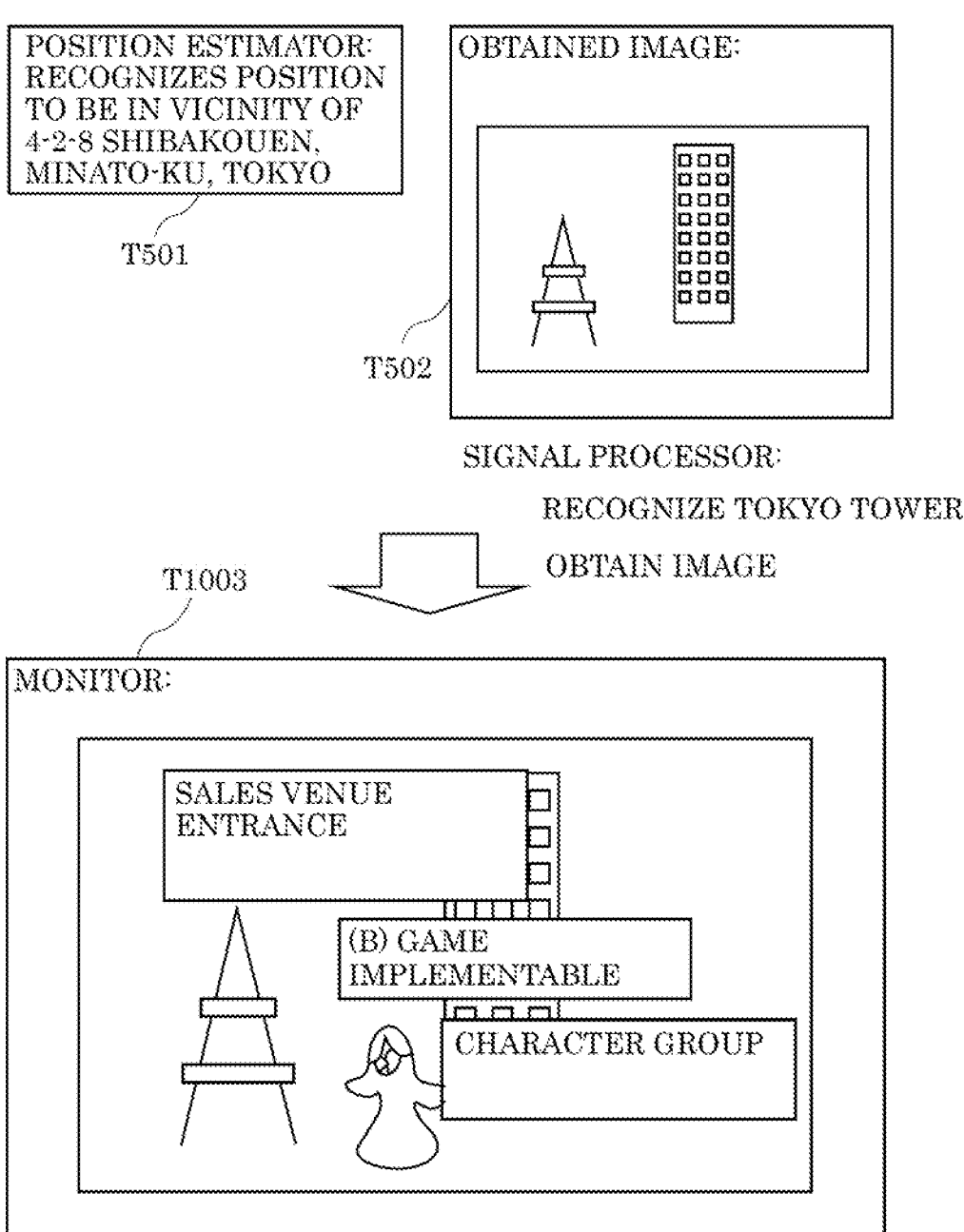
Figure 92:
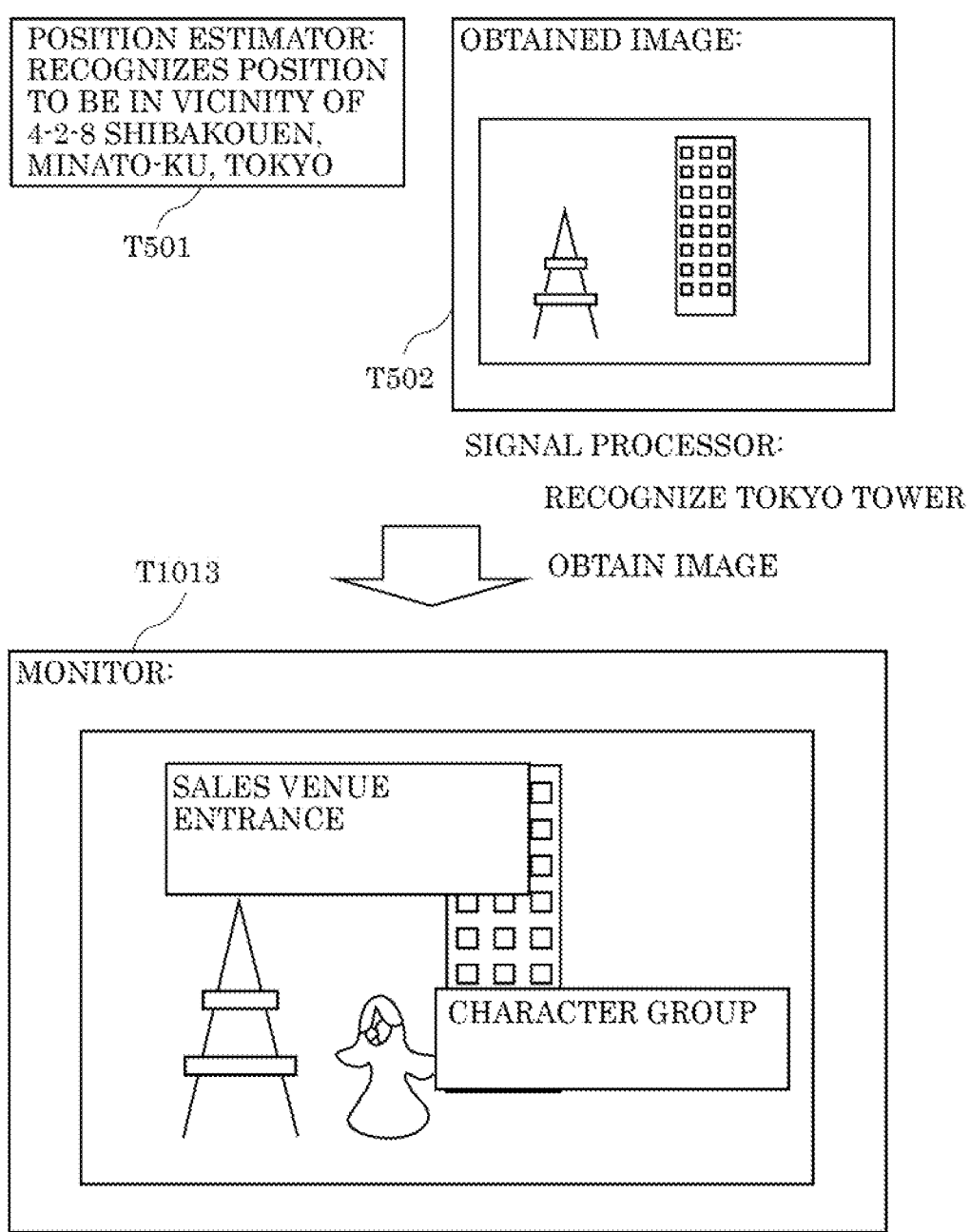
Figure 93:
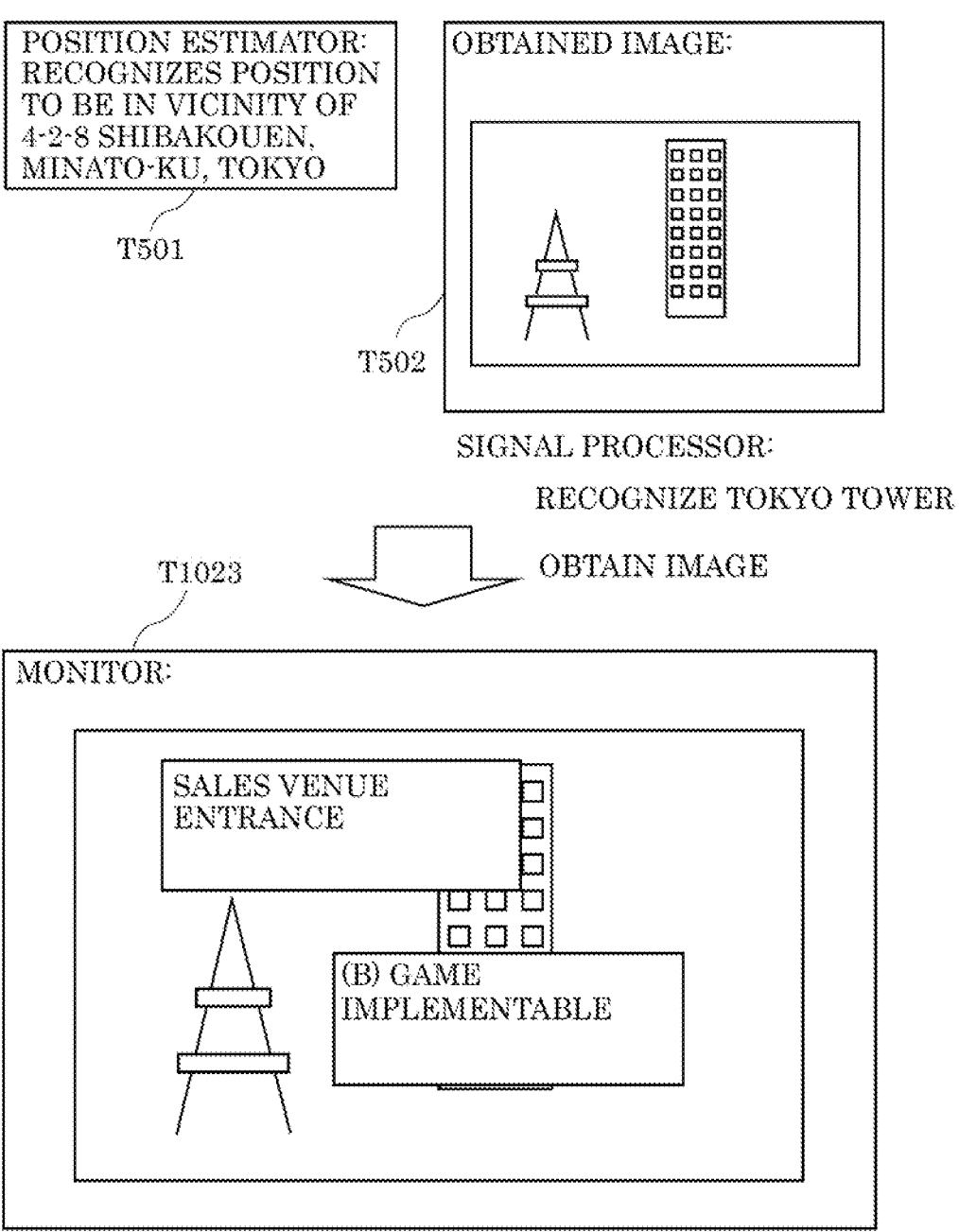
Figure 94:
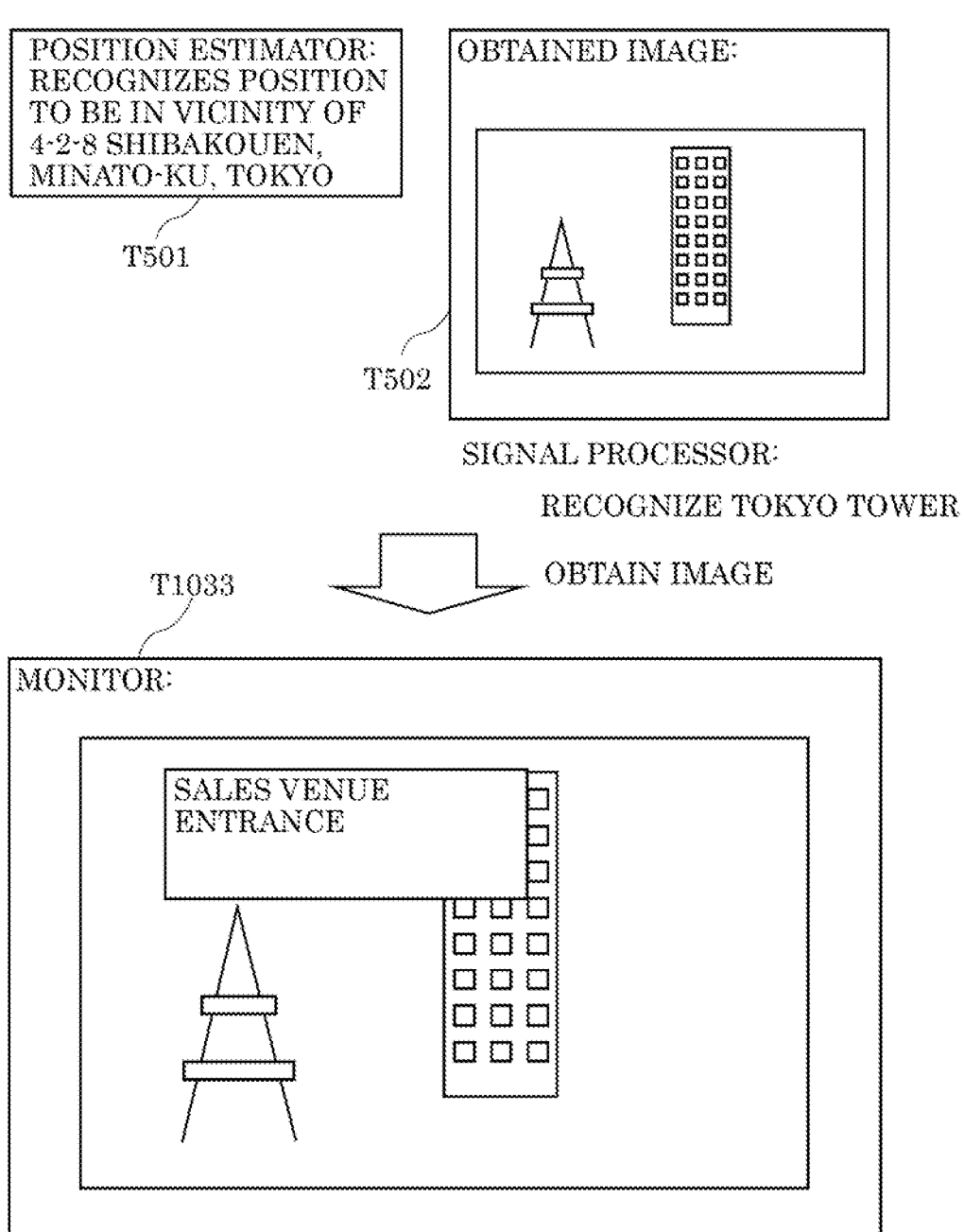
Figure 99:
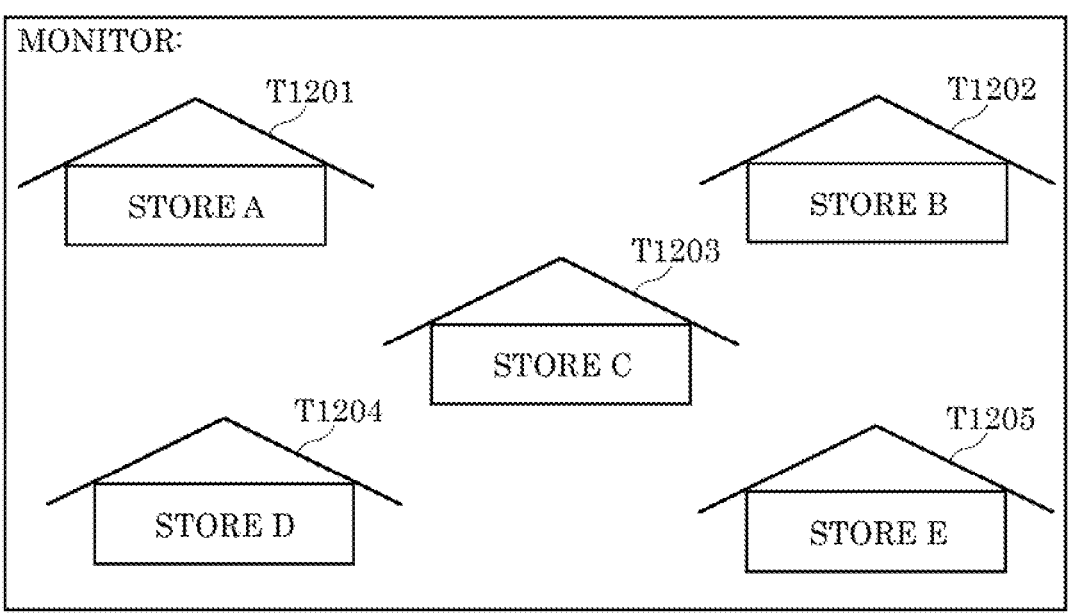
Figure 102:
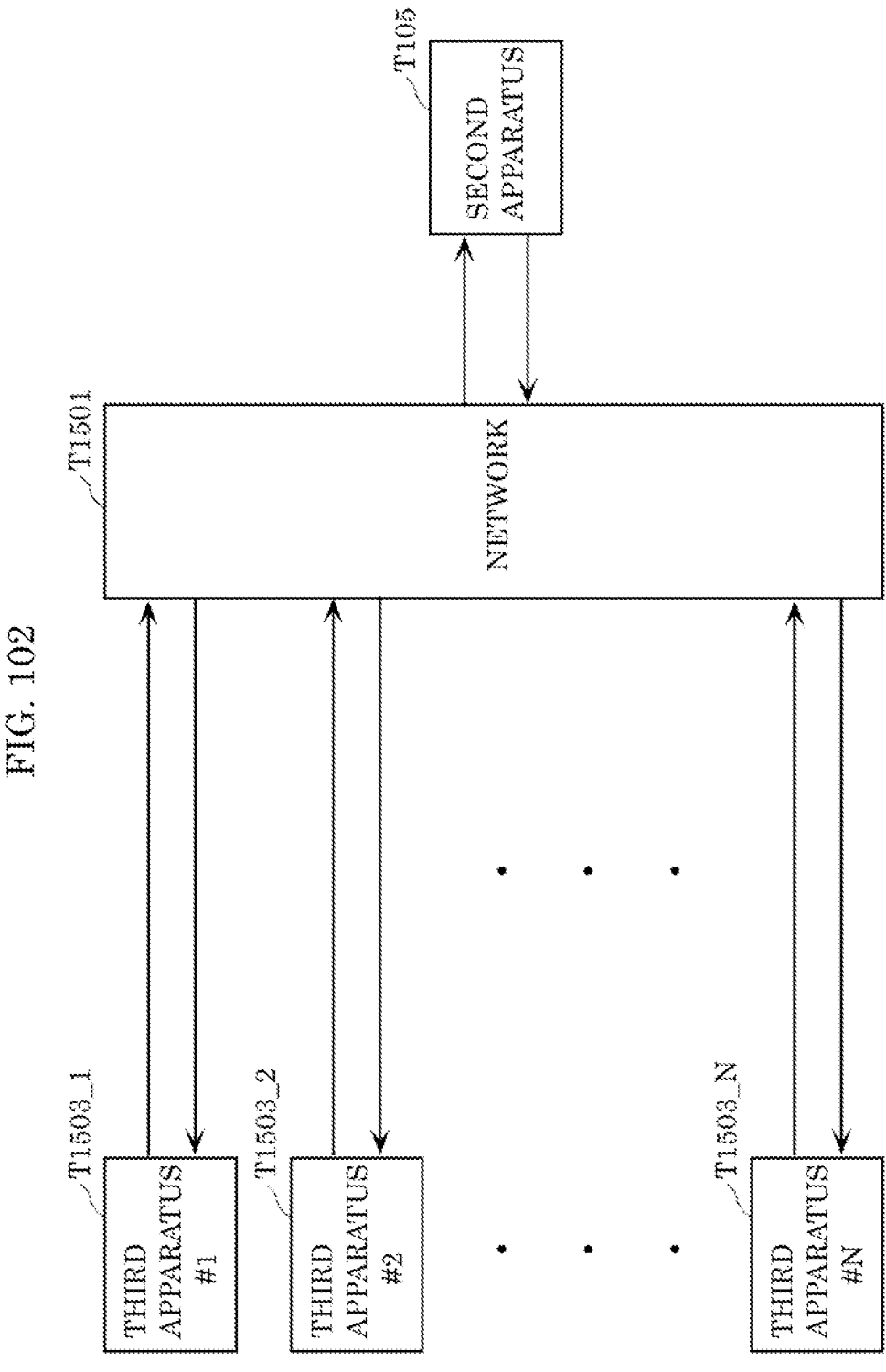
Figure 103:
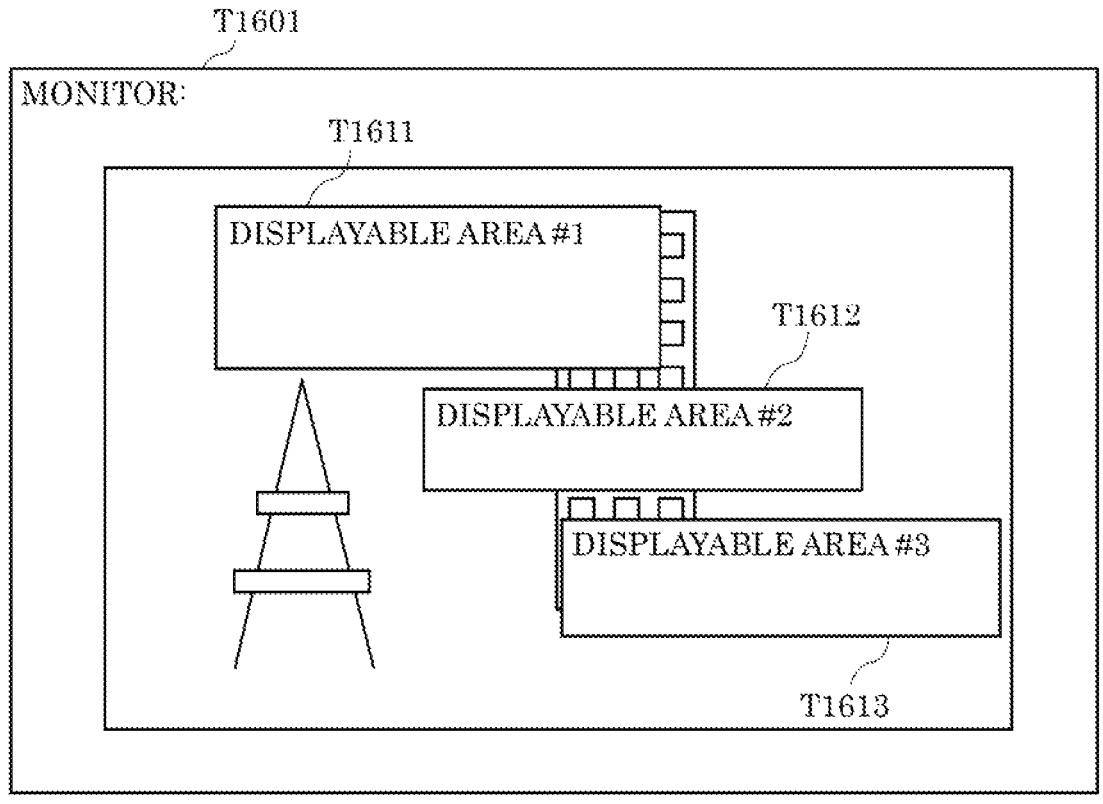
Figure 104:
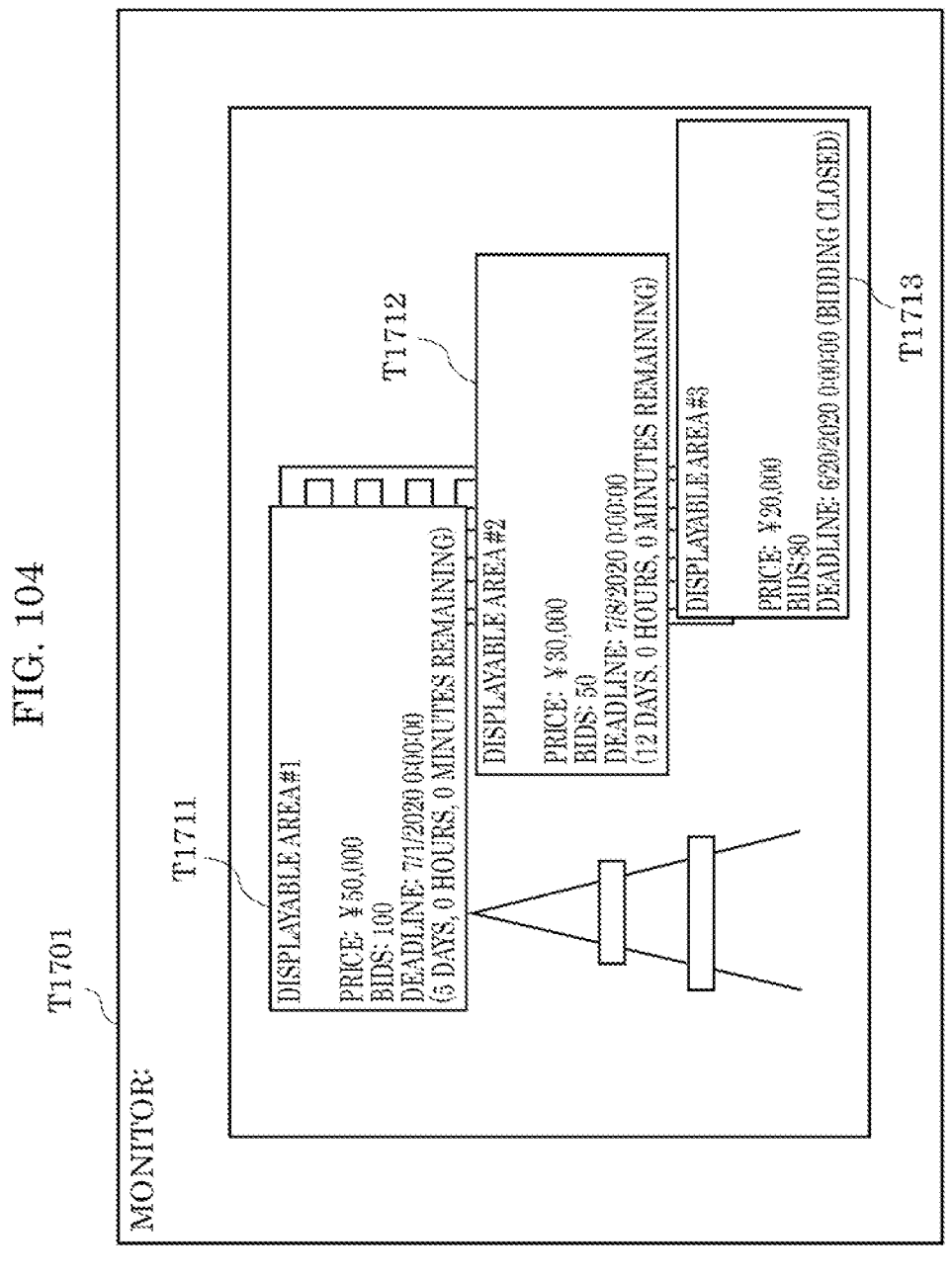
Figure 105:
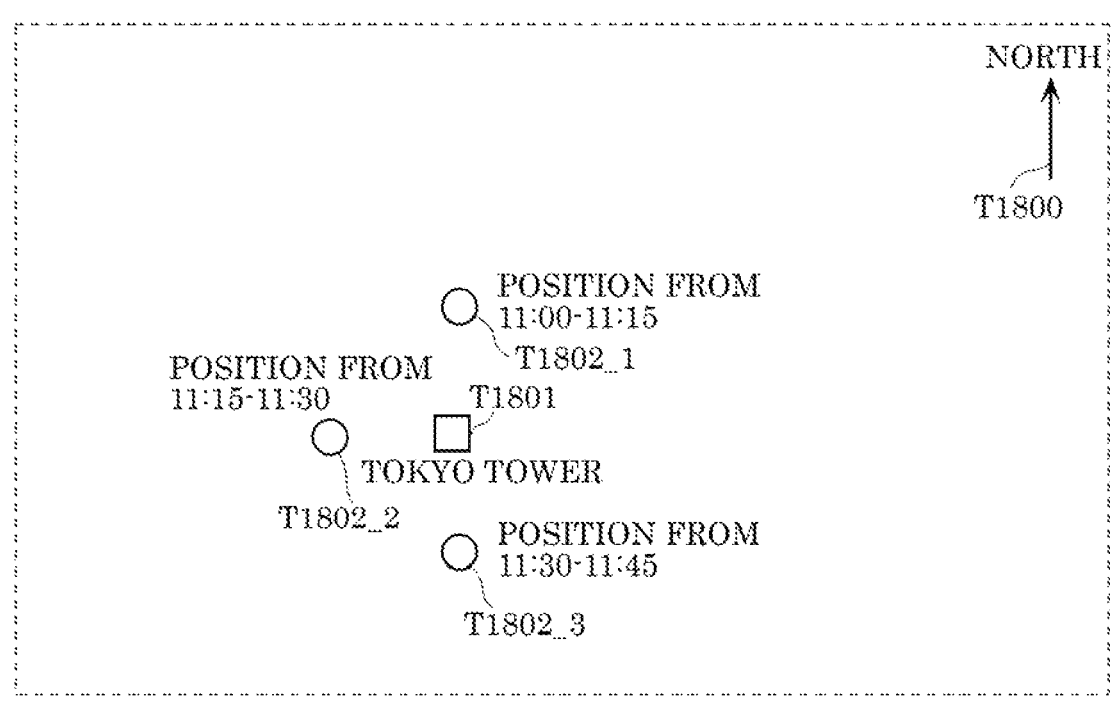
Figure 106:
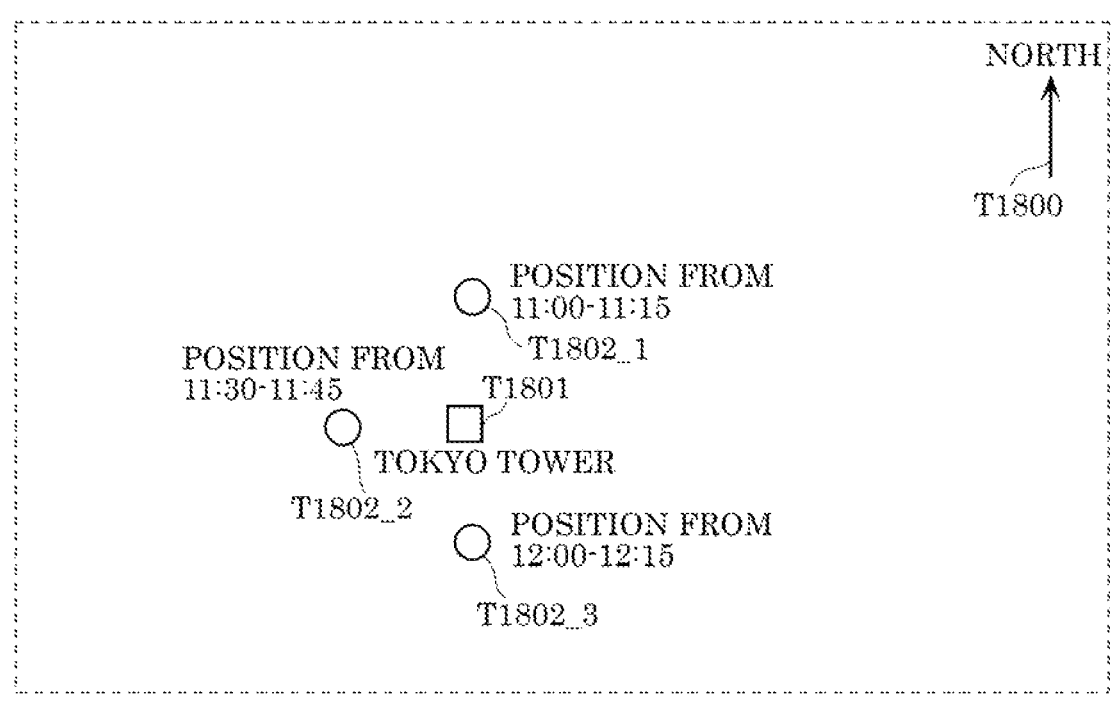
Figure 111:
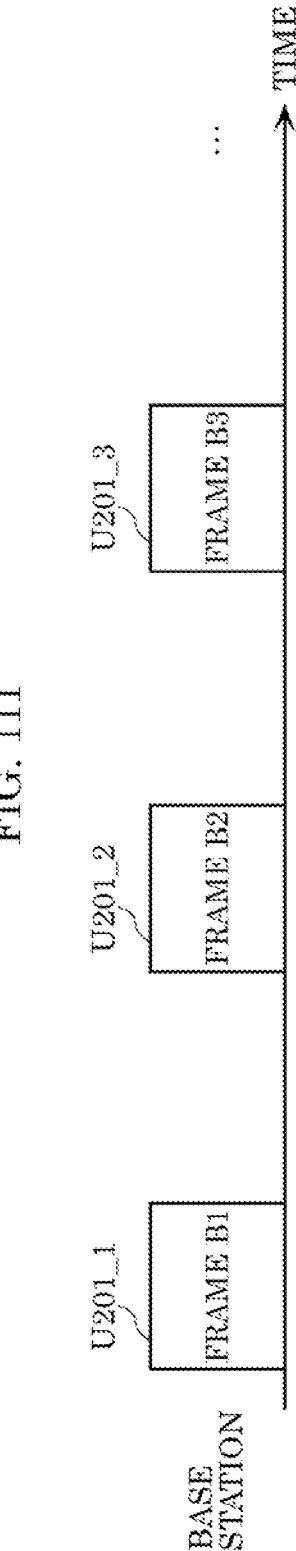
Figure 115:
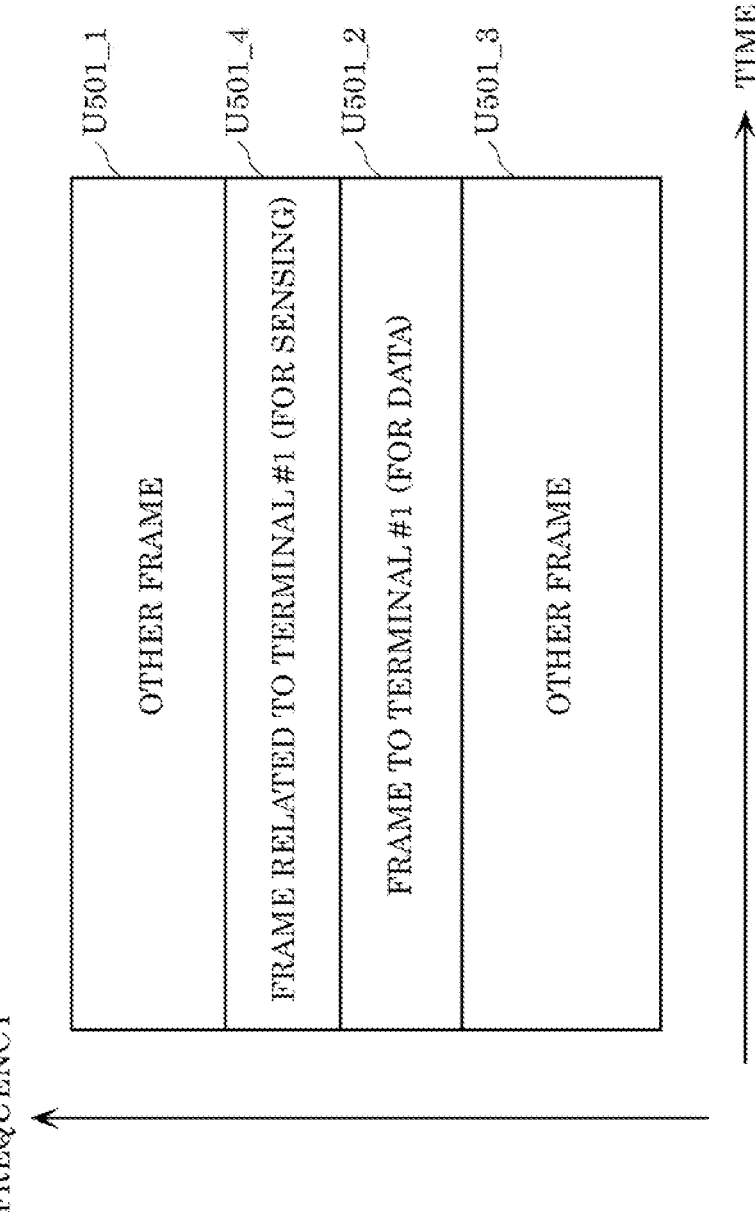
Figure 117:
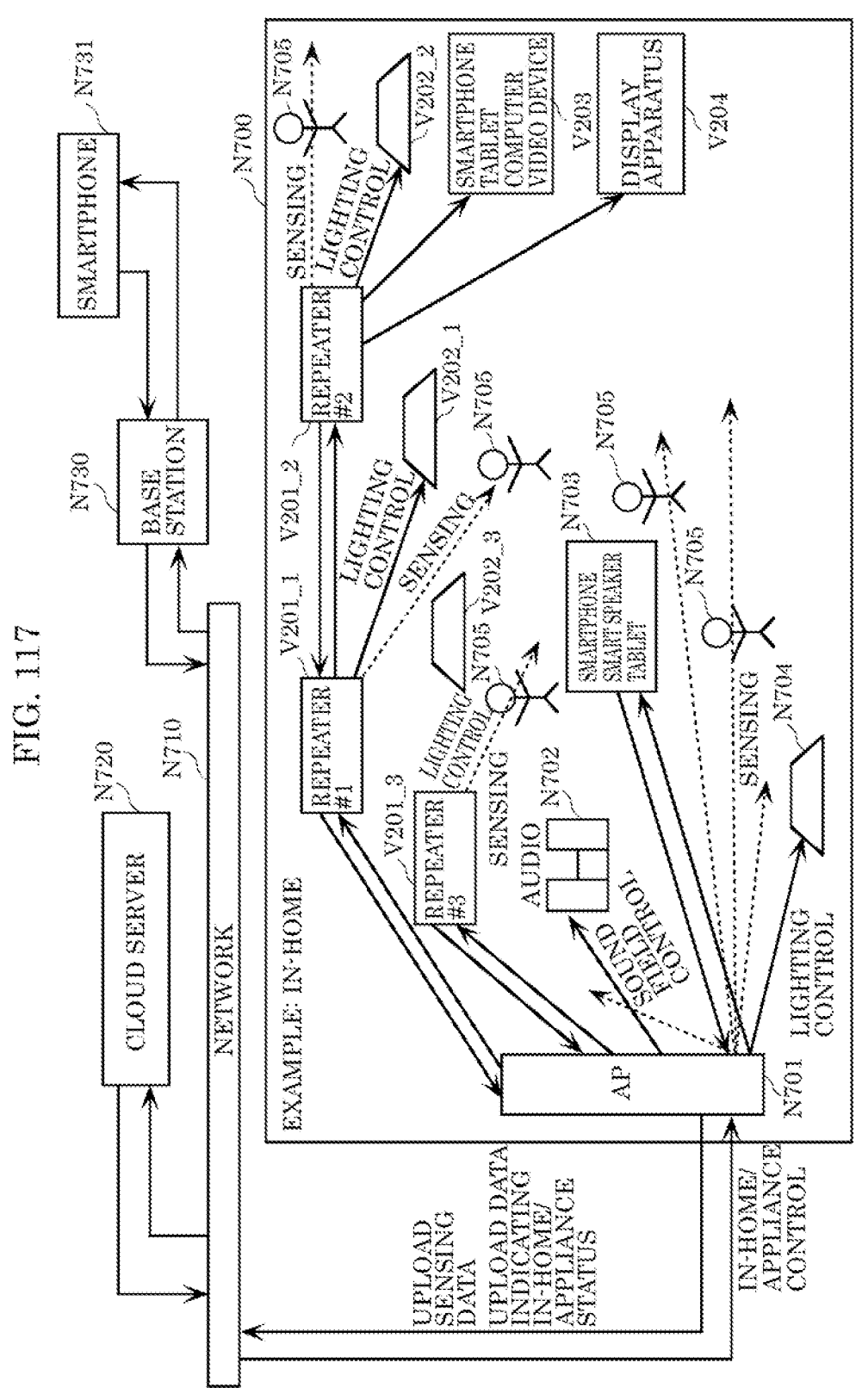
Figure 118:
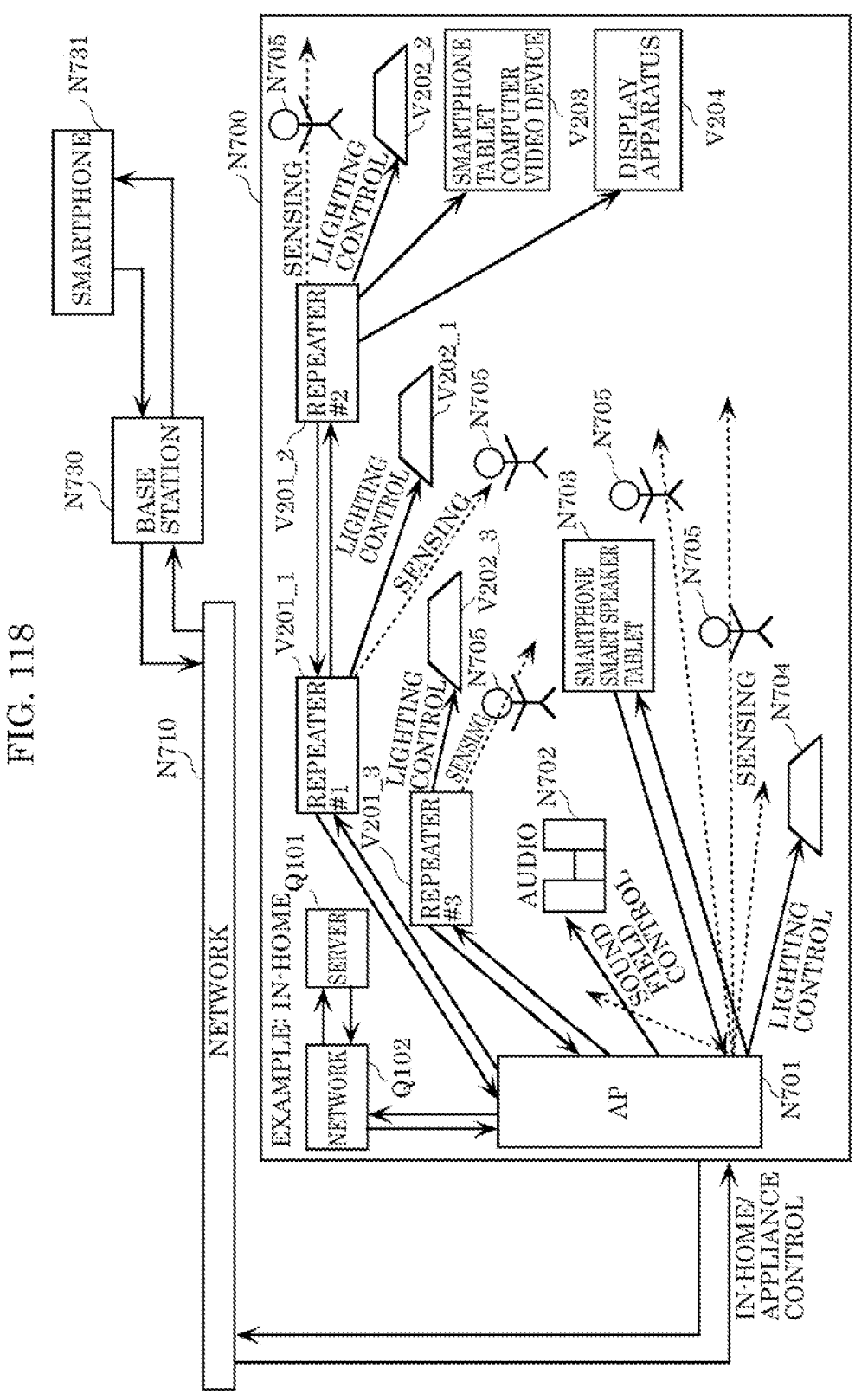
Figure 119:
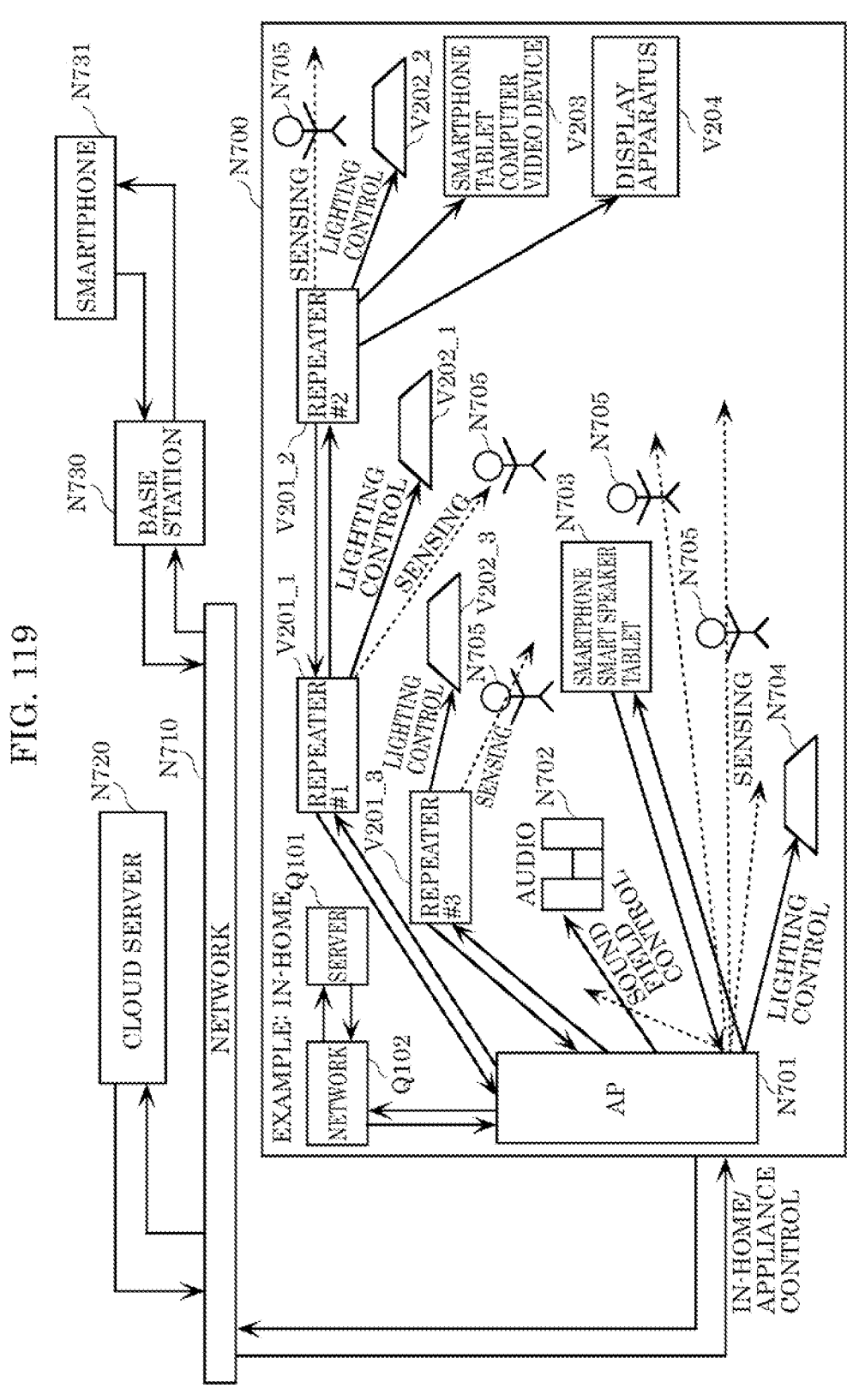
Figure 120:
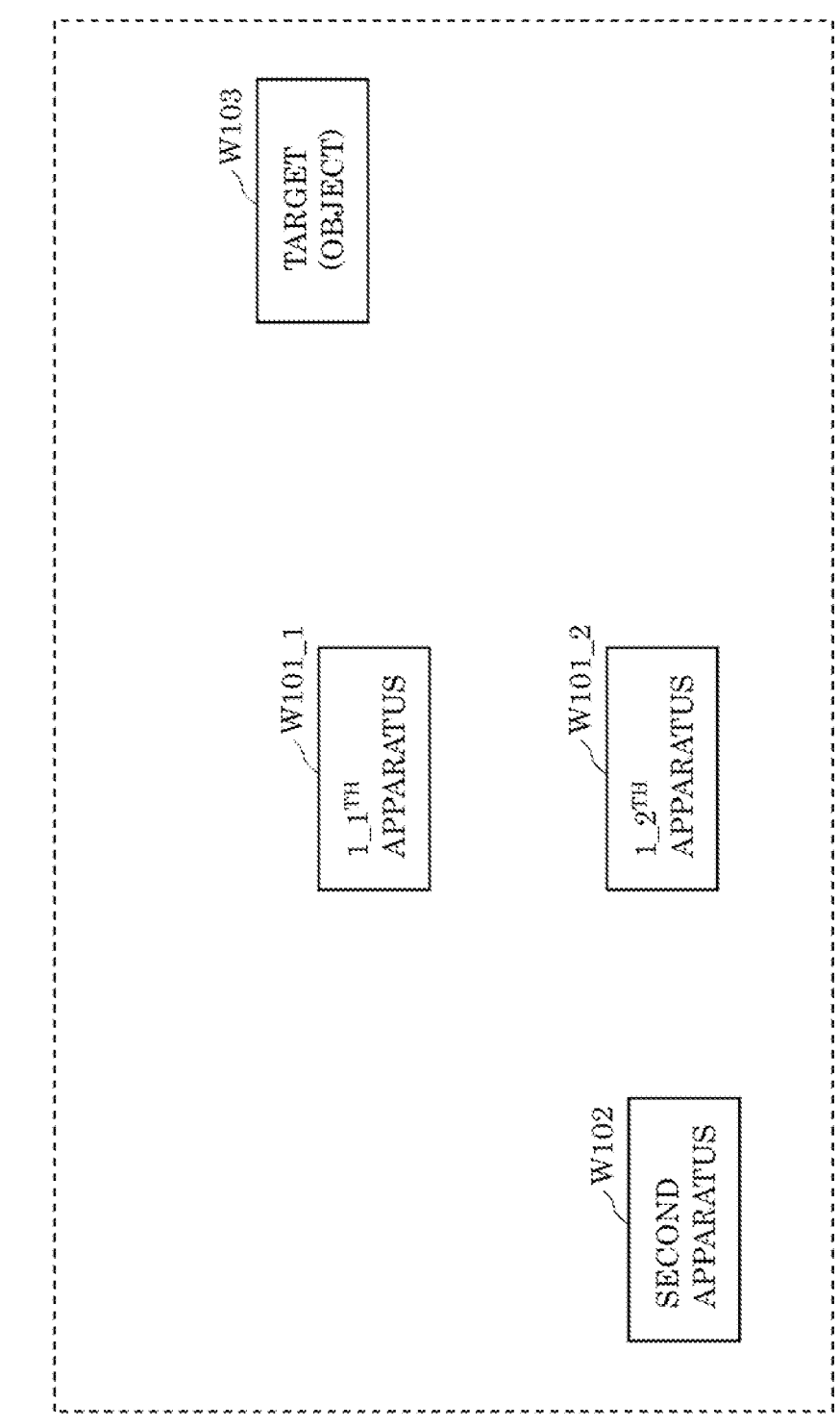
Figure 121:
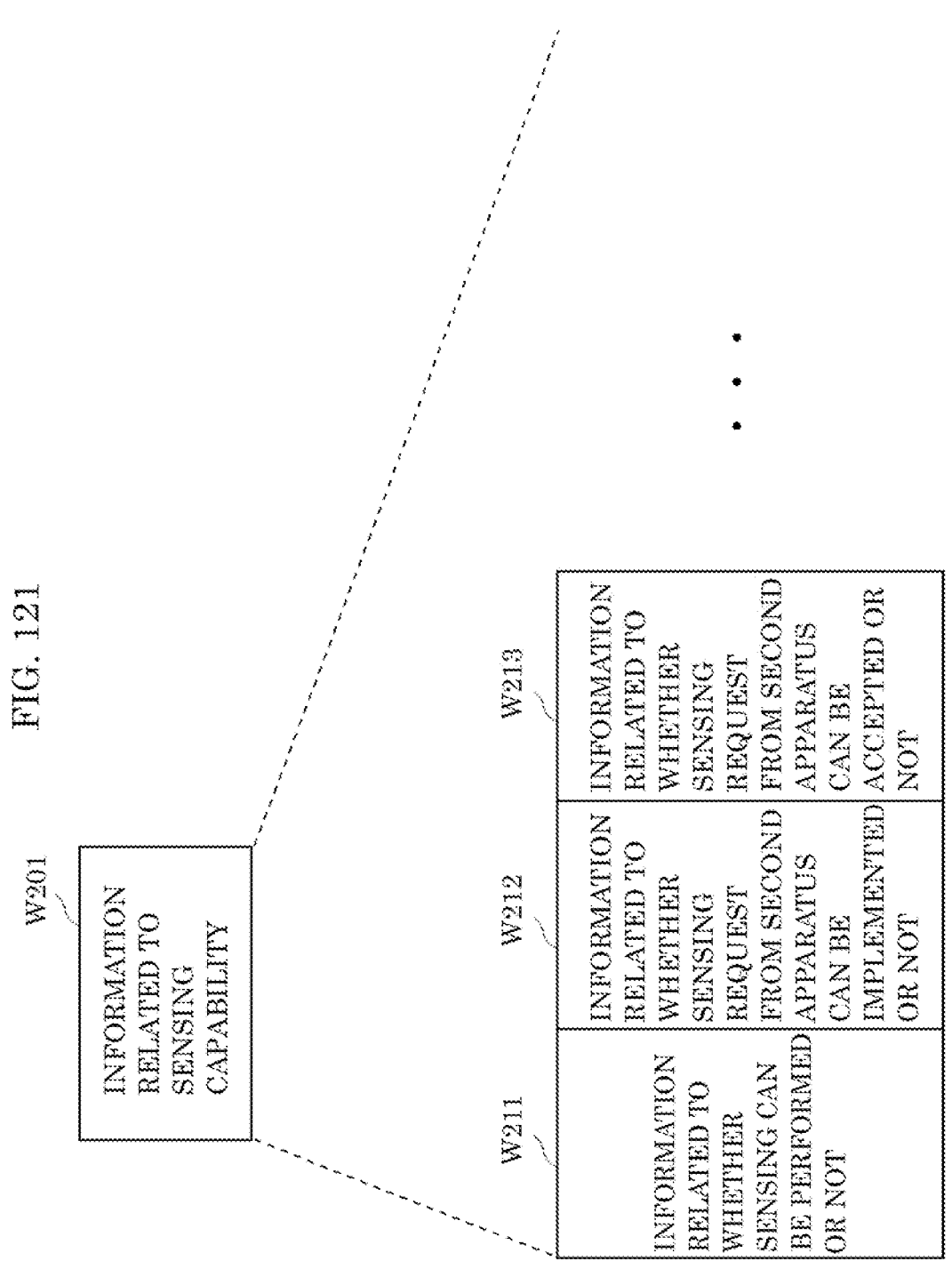
Figure 122:
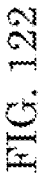
Figure 123:
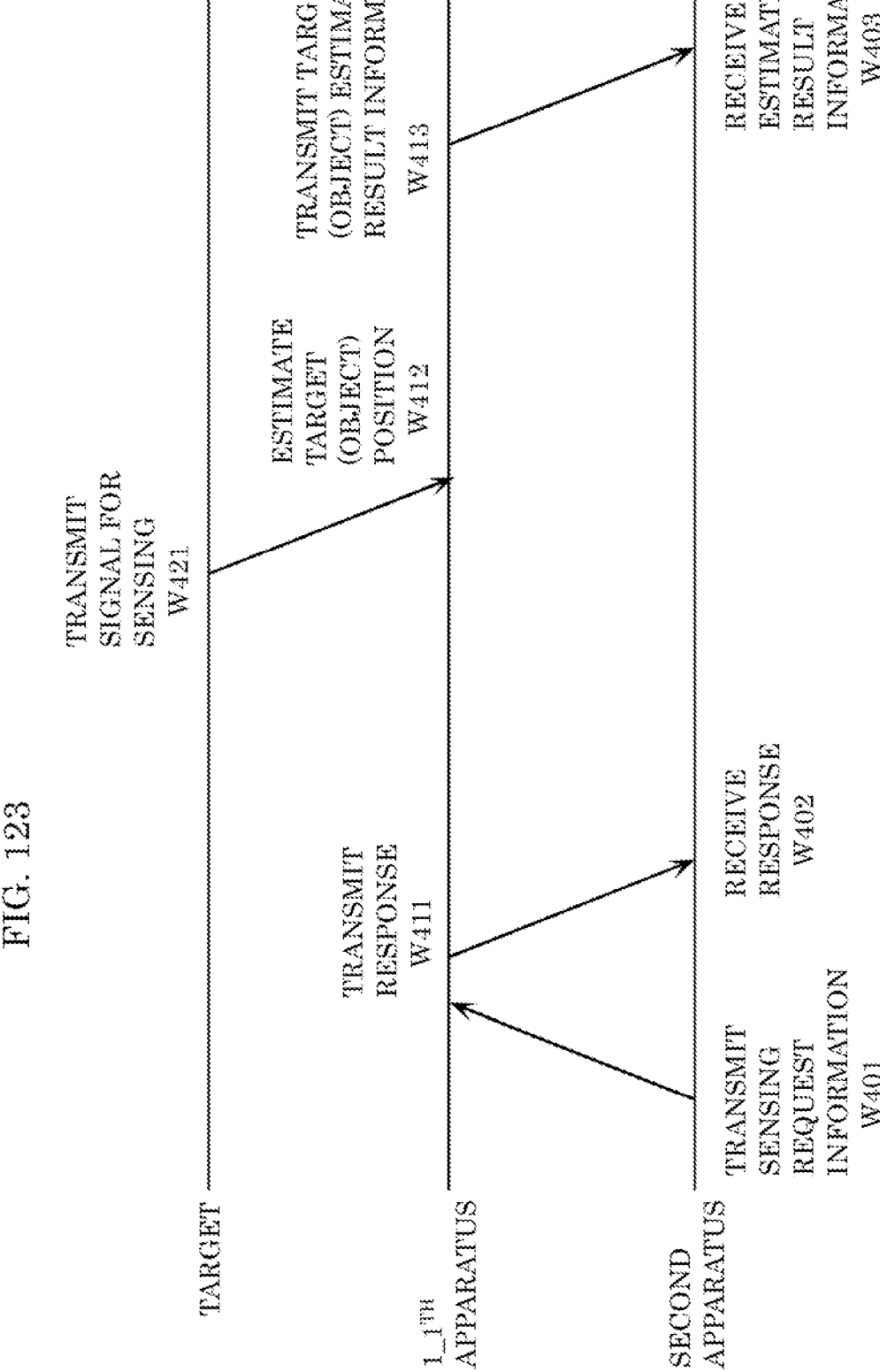
Figure 125B:
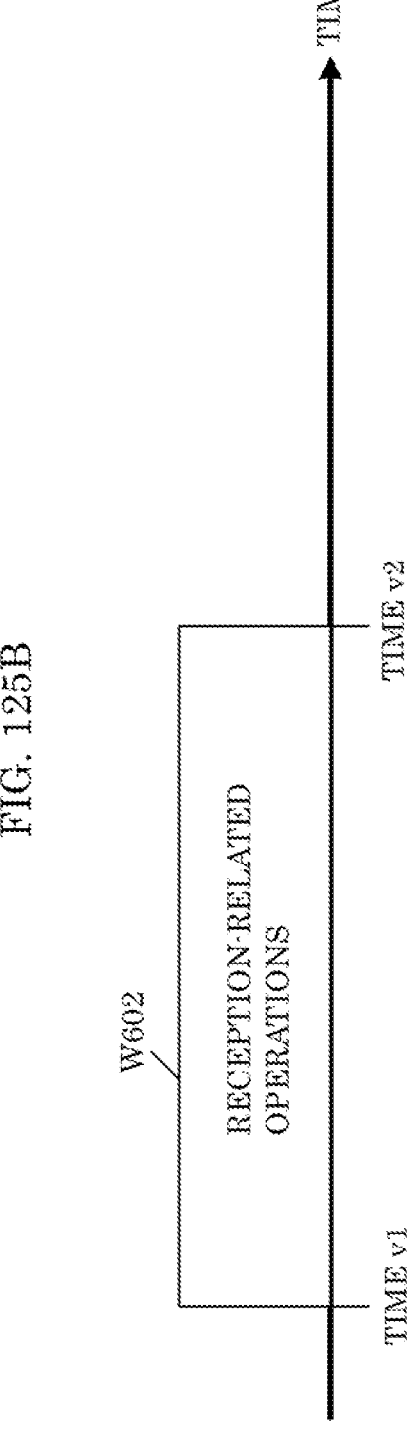
Figure 127:
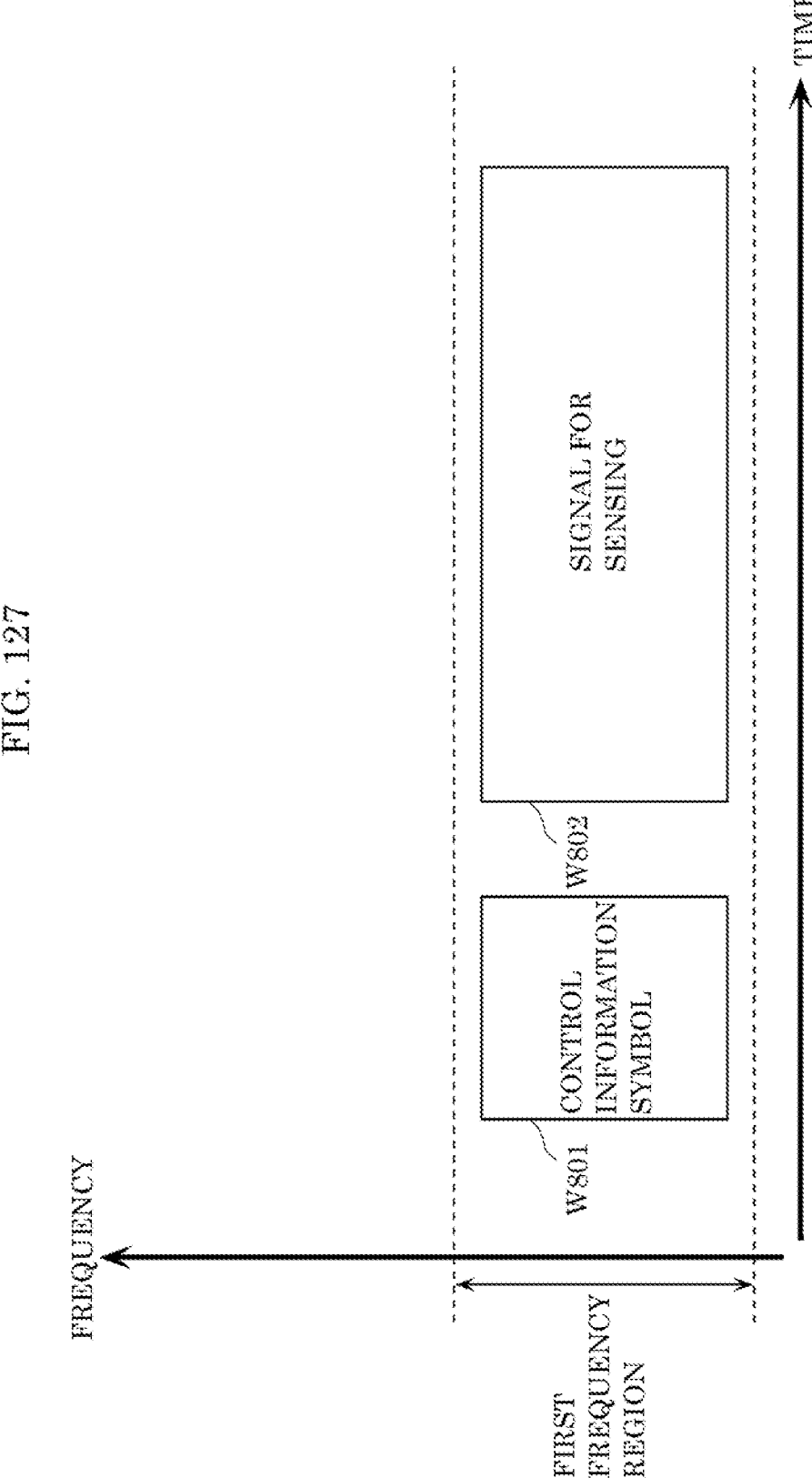
Figure 128A:
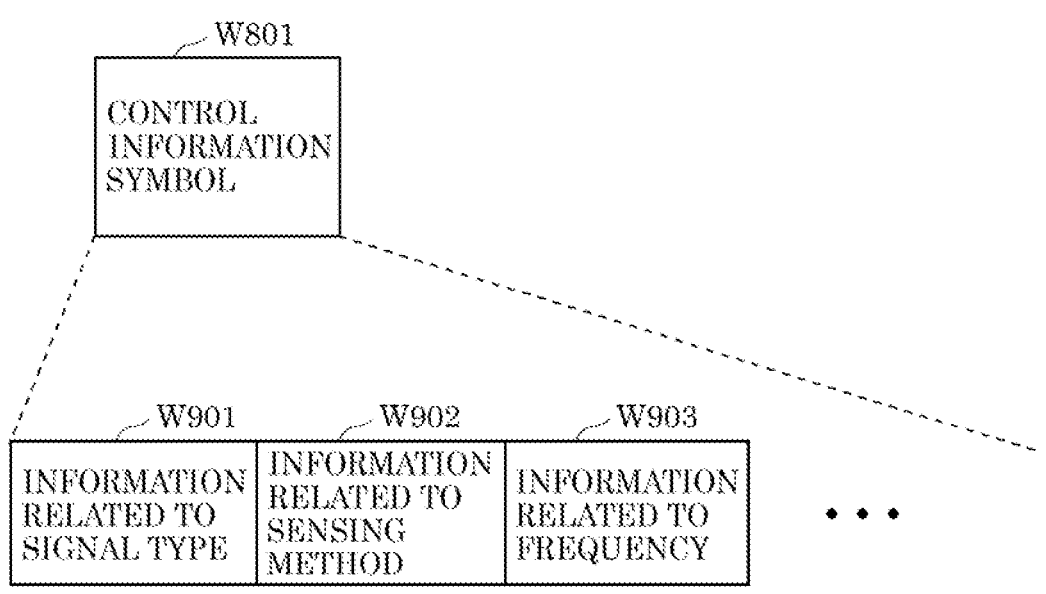
Figure 128B:
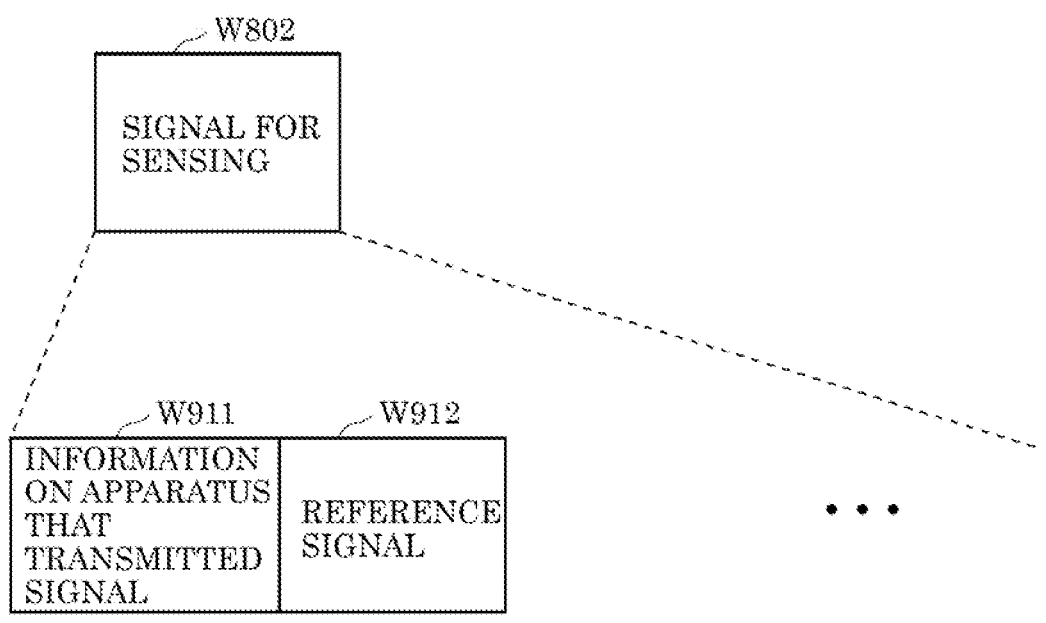
Figure 131:
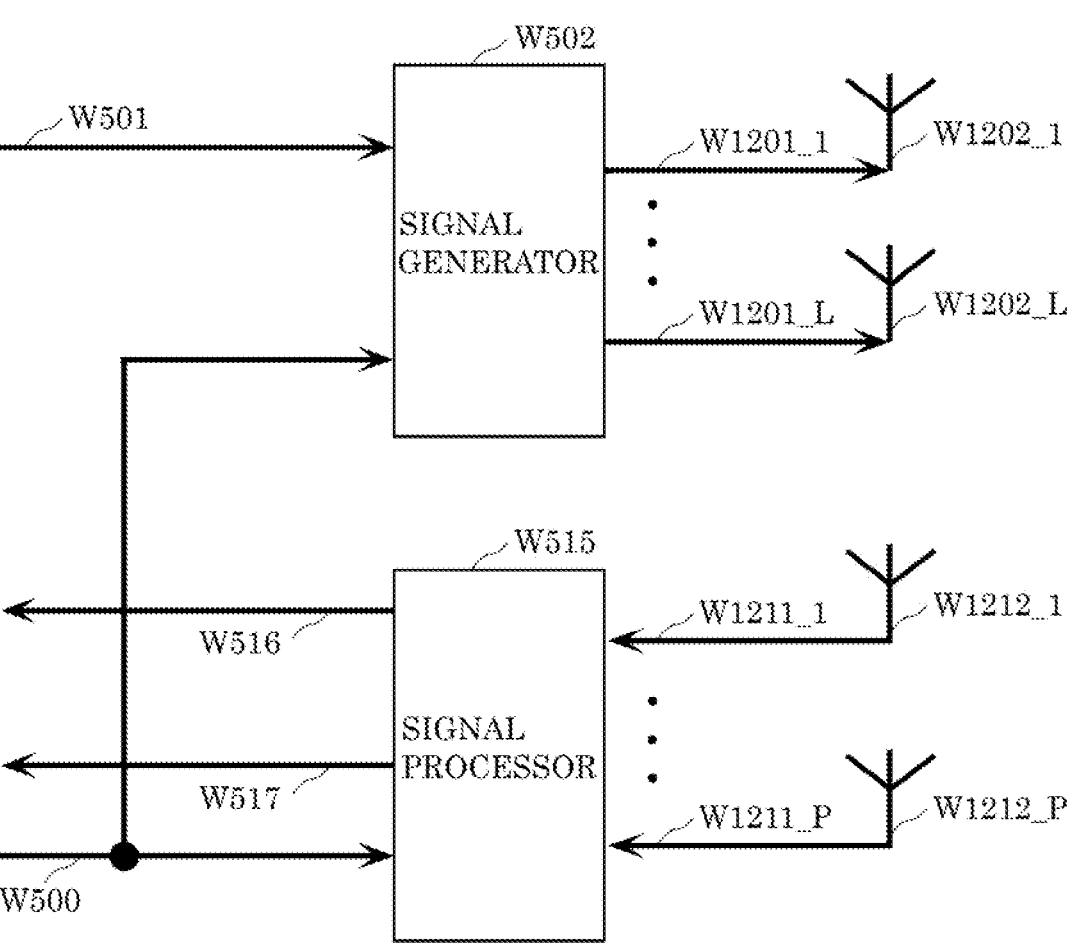
Figure 132:
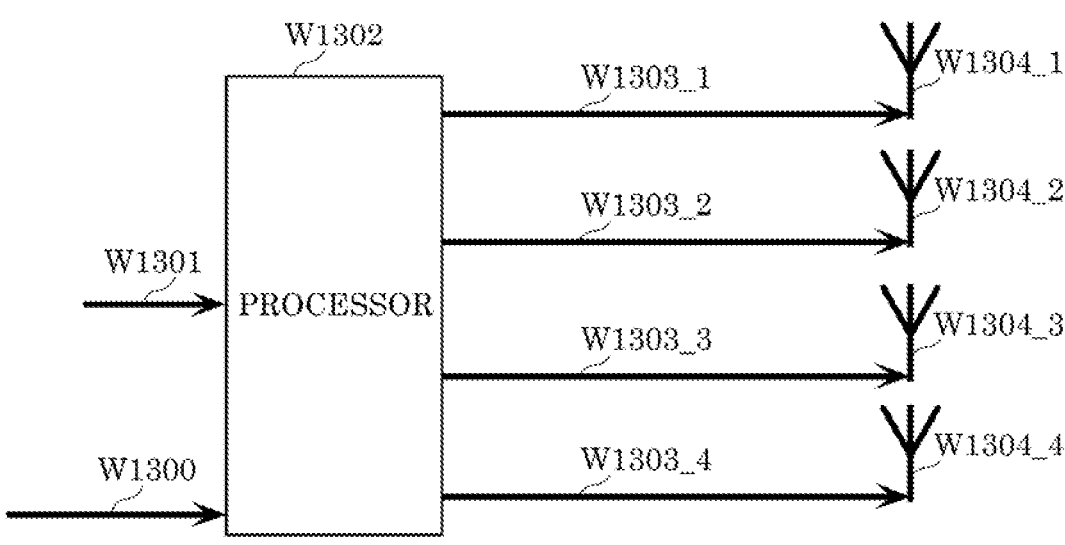
Figure 133:
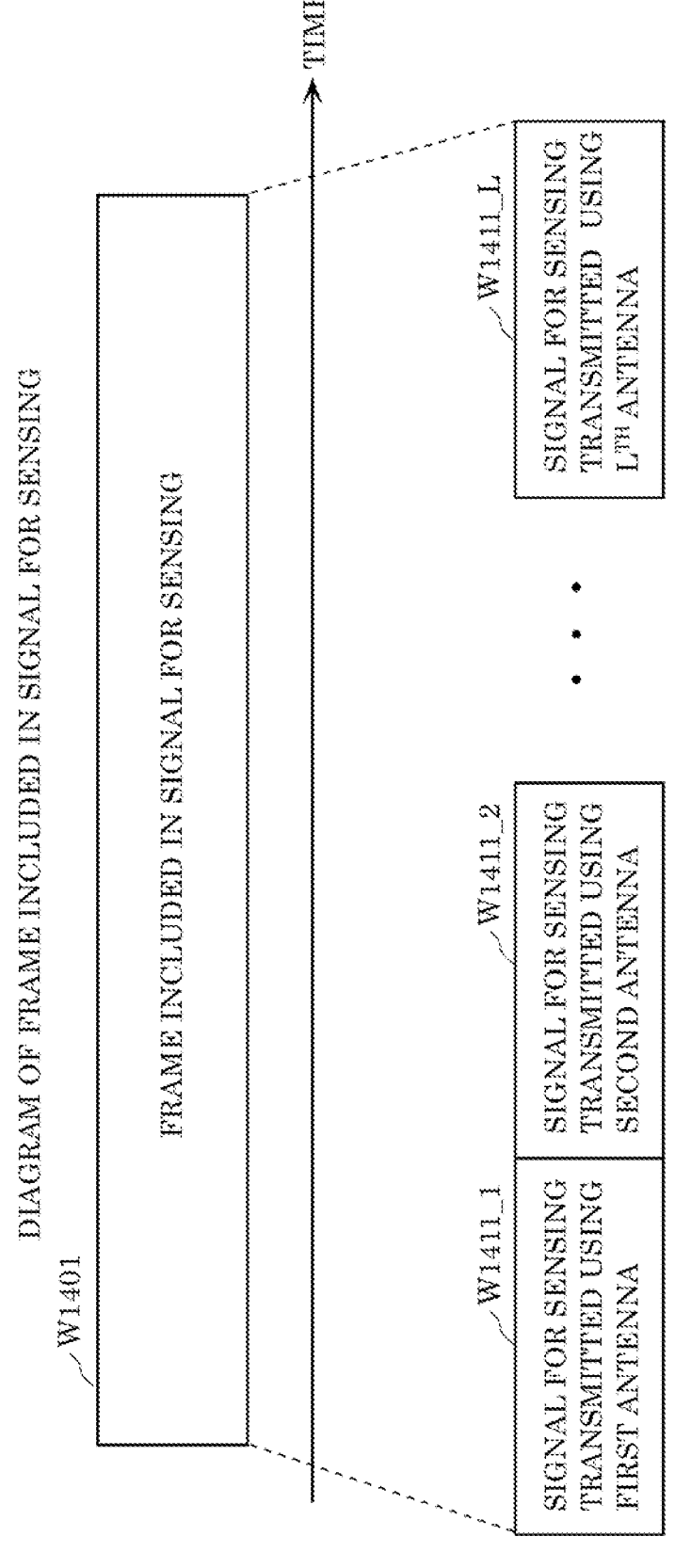
Figure 136:
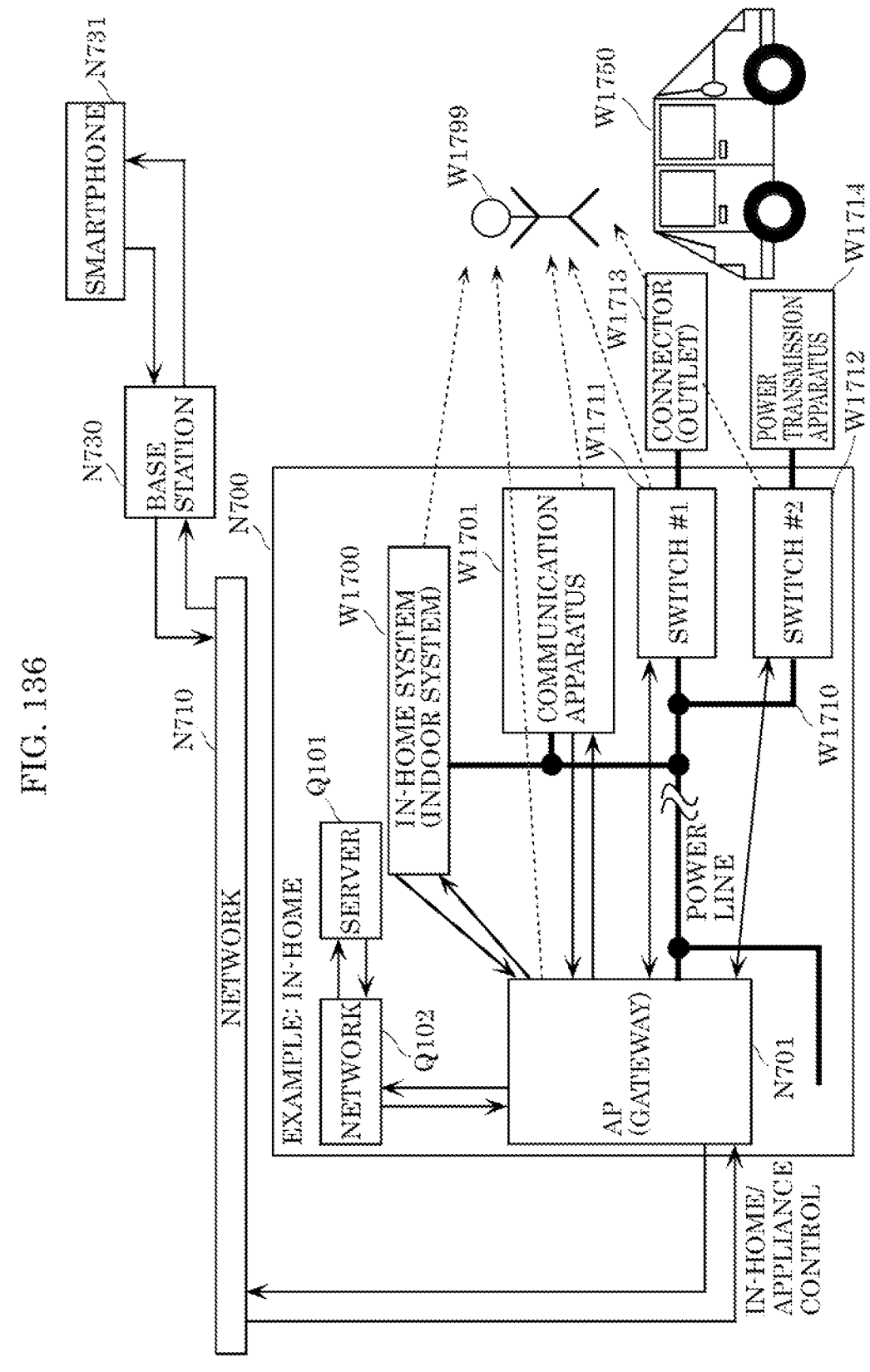
Figure 137A:
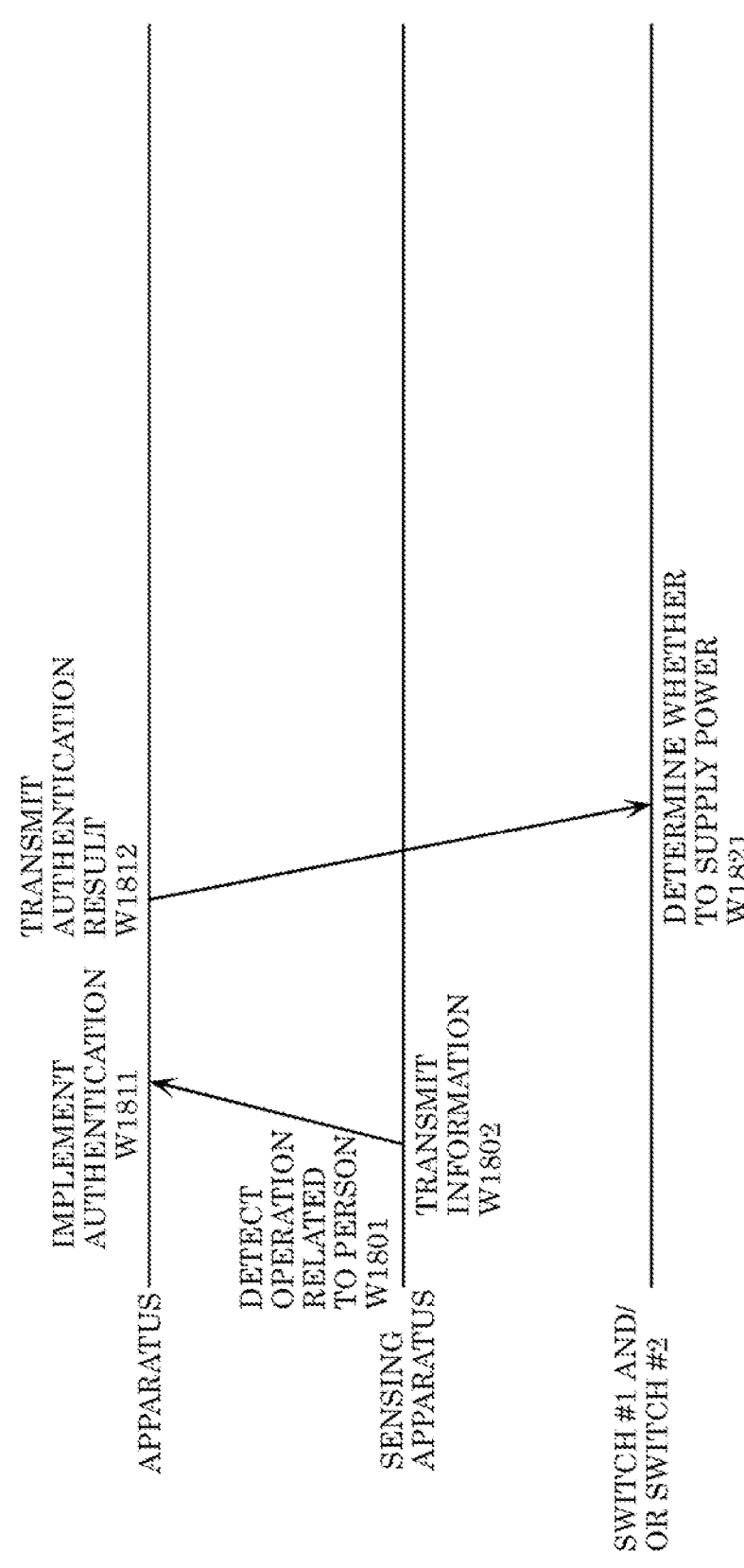
Figure 137B:
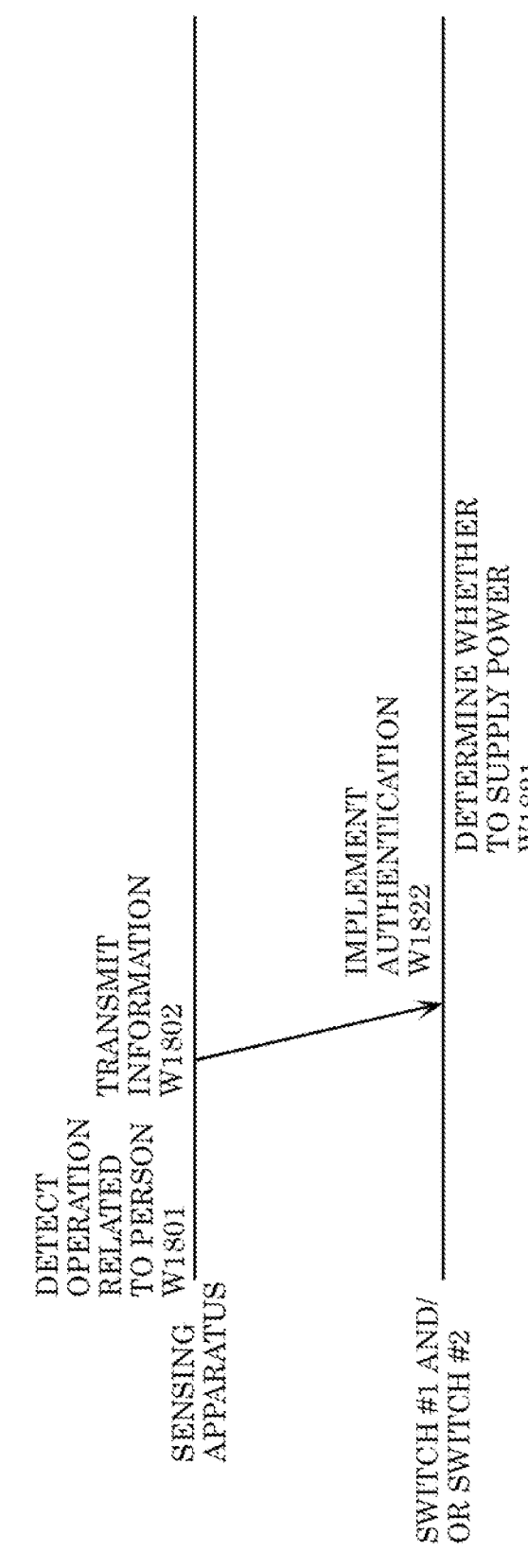
Figure 137C:
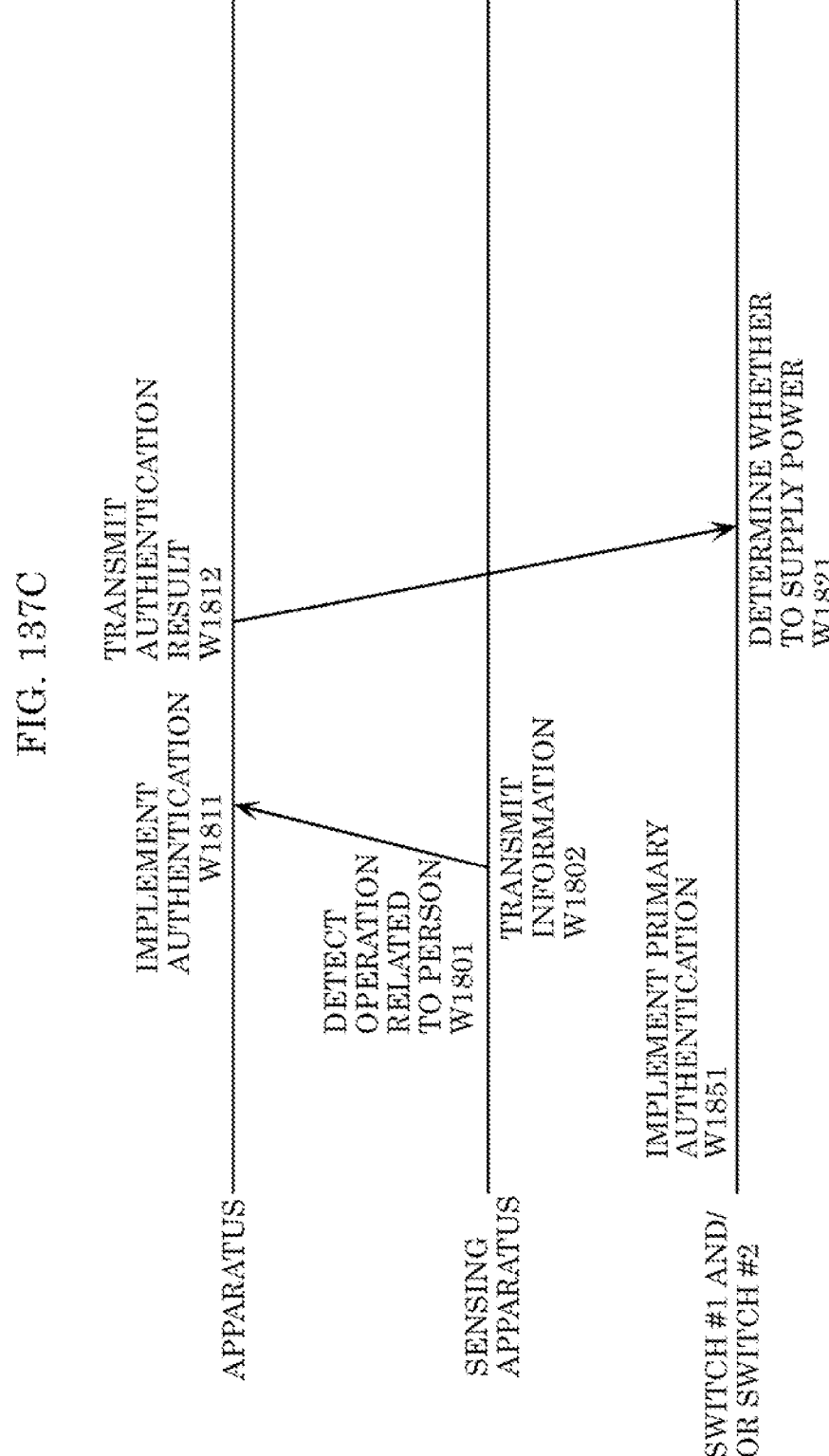
Figure 137D:
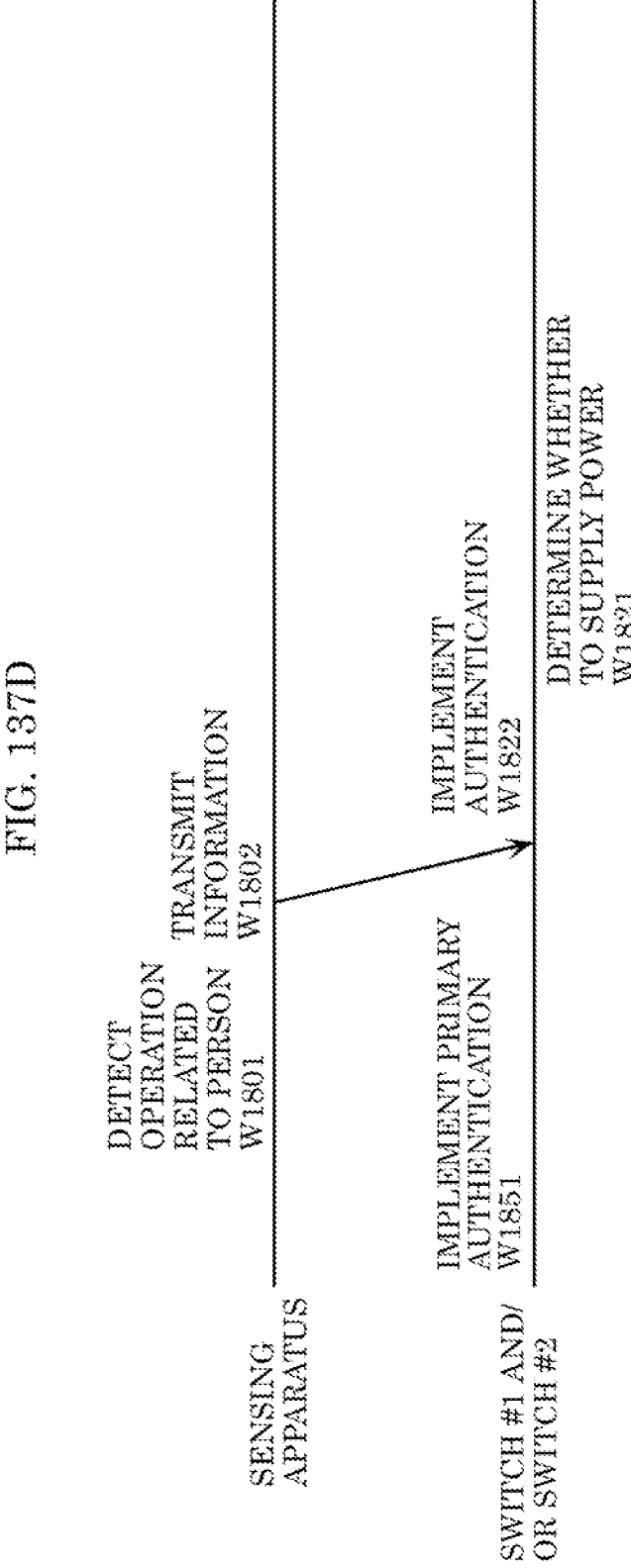
Figure 138A:
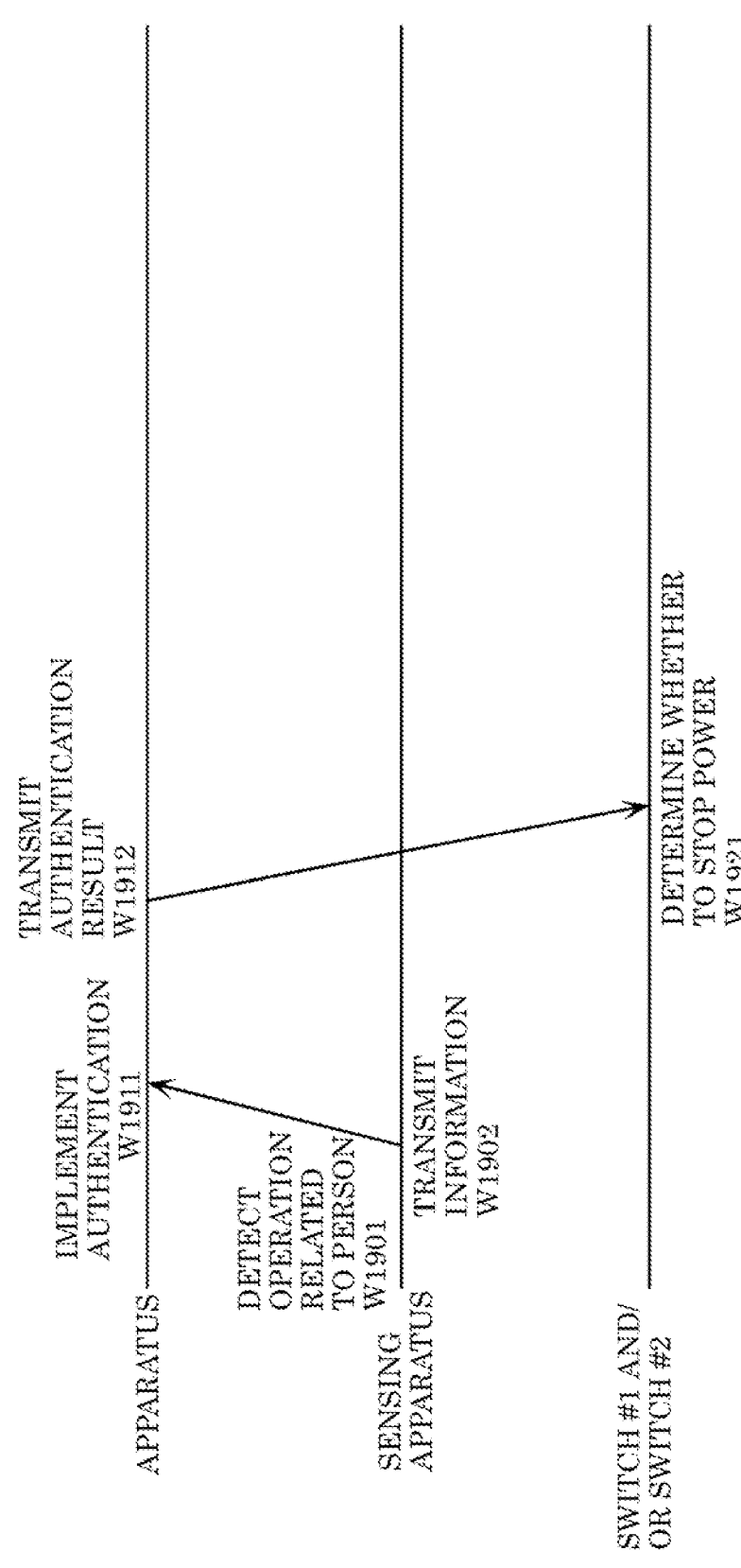
Figure 138B:
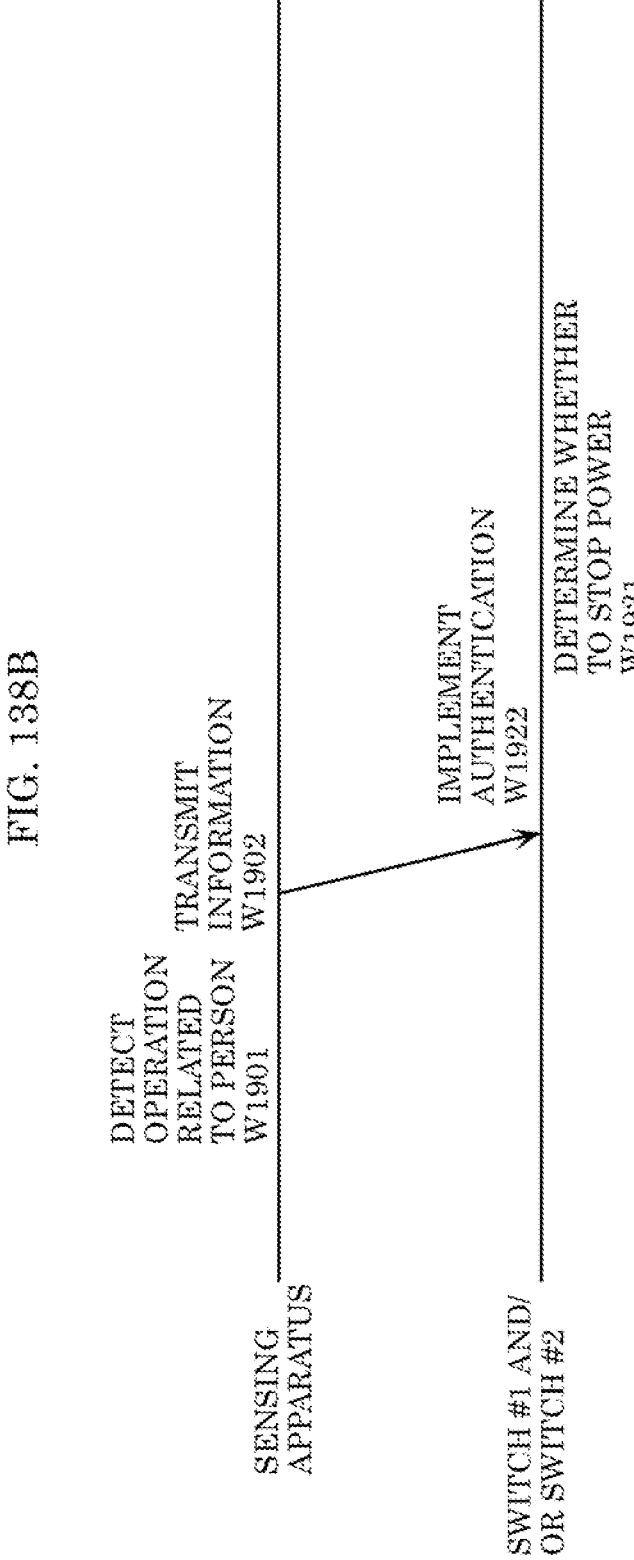
Figure 139:
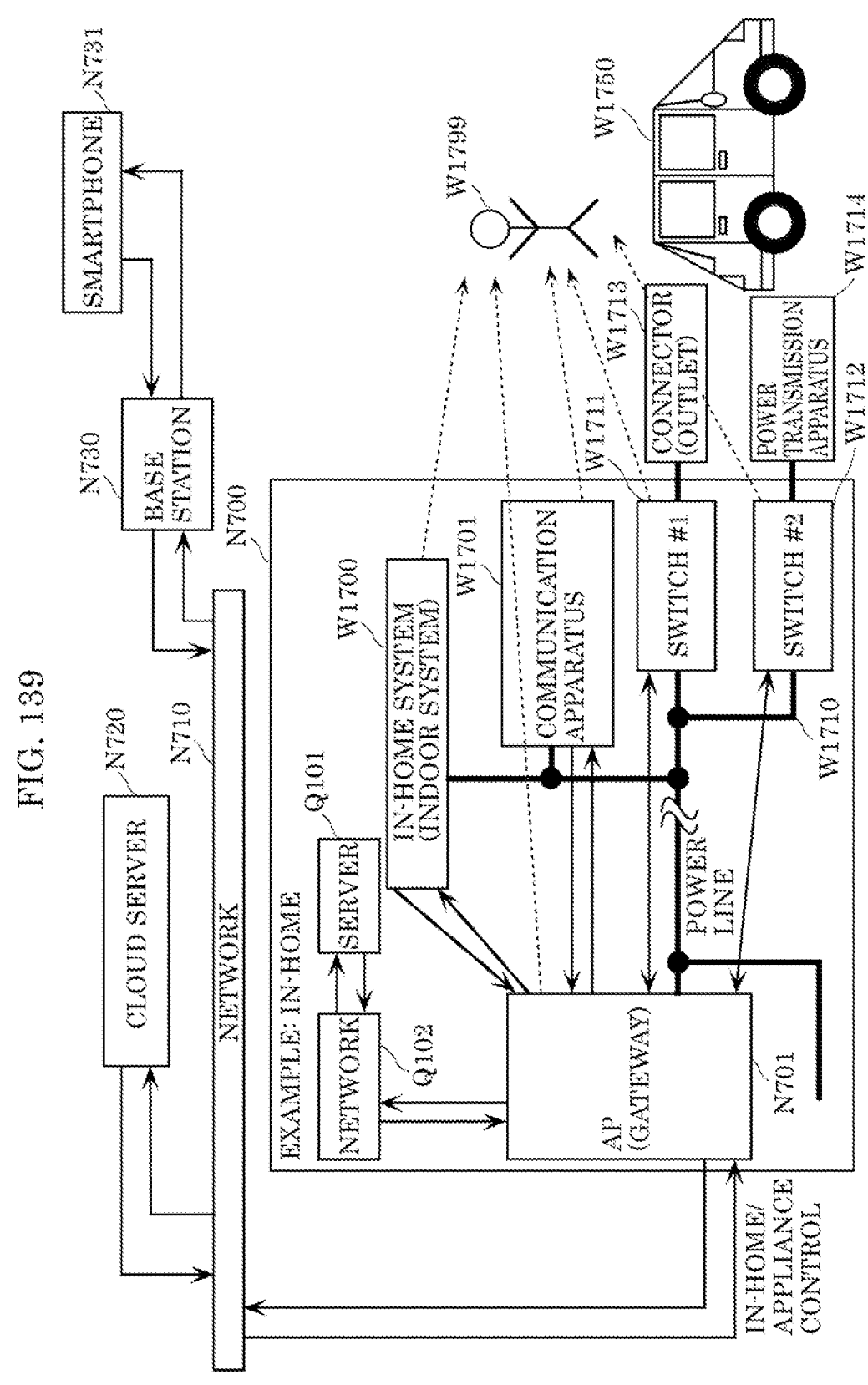
Figure 141A:
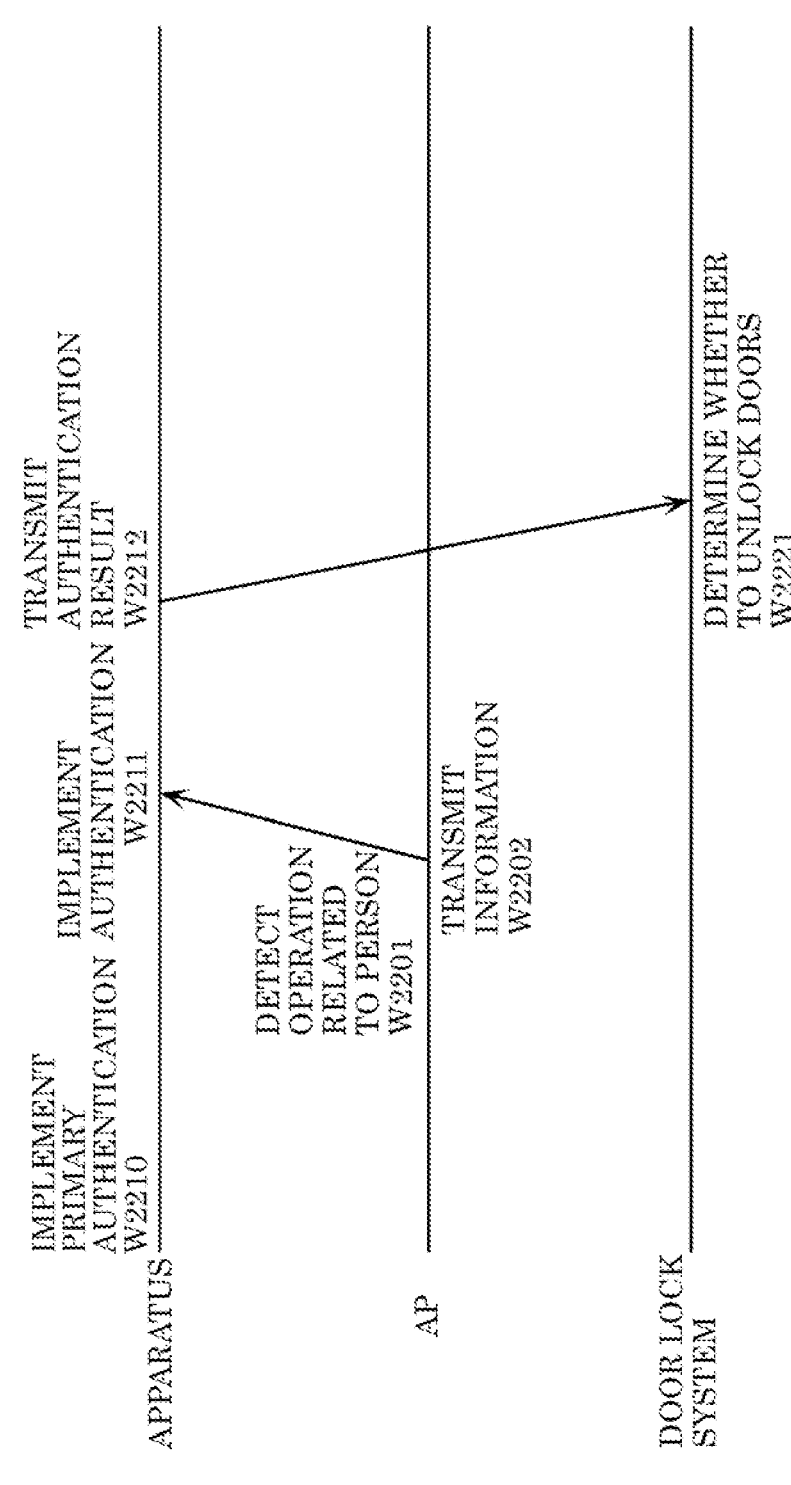
Figure 141B:
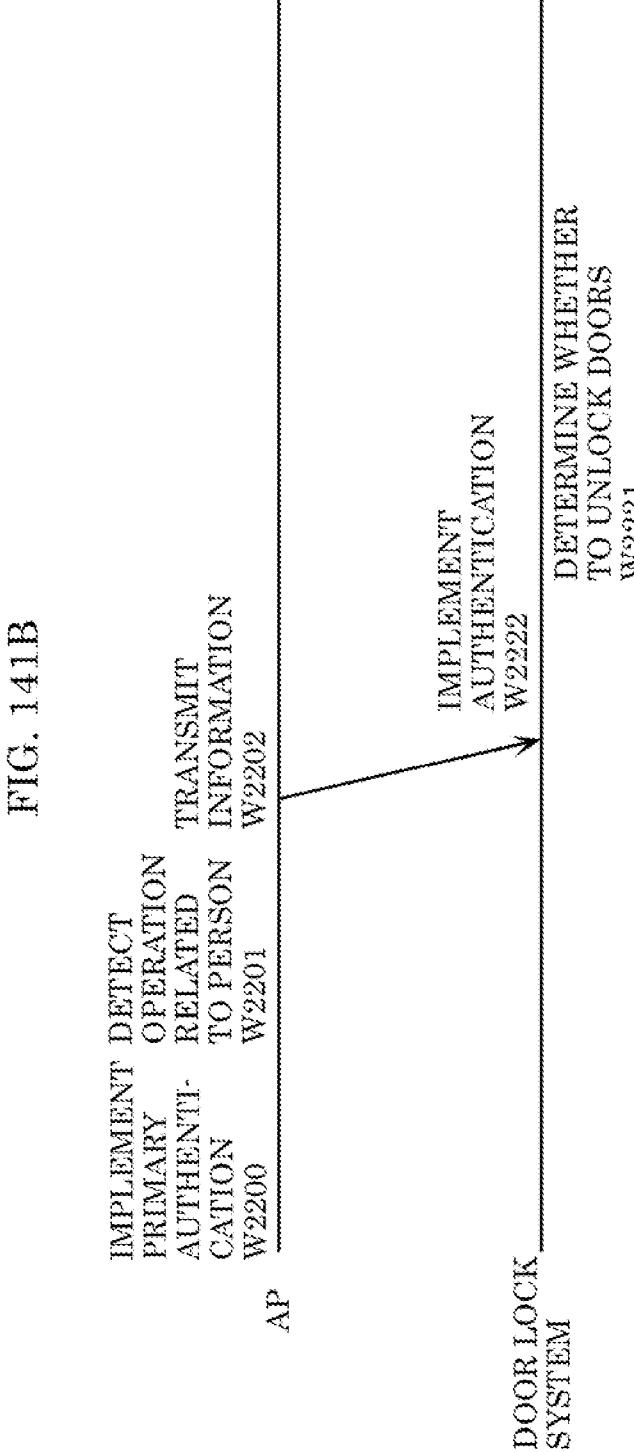
Figure 143A:
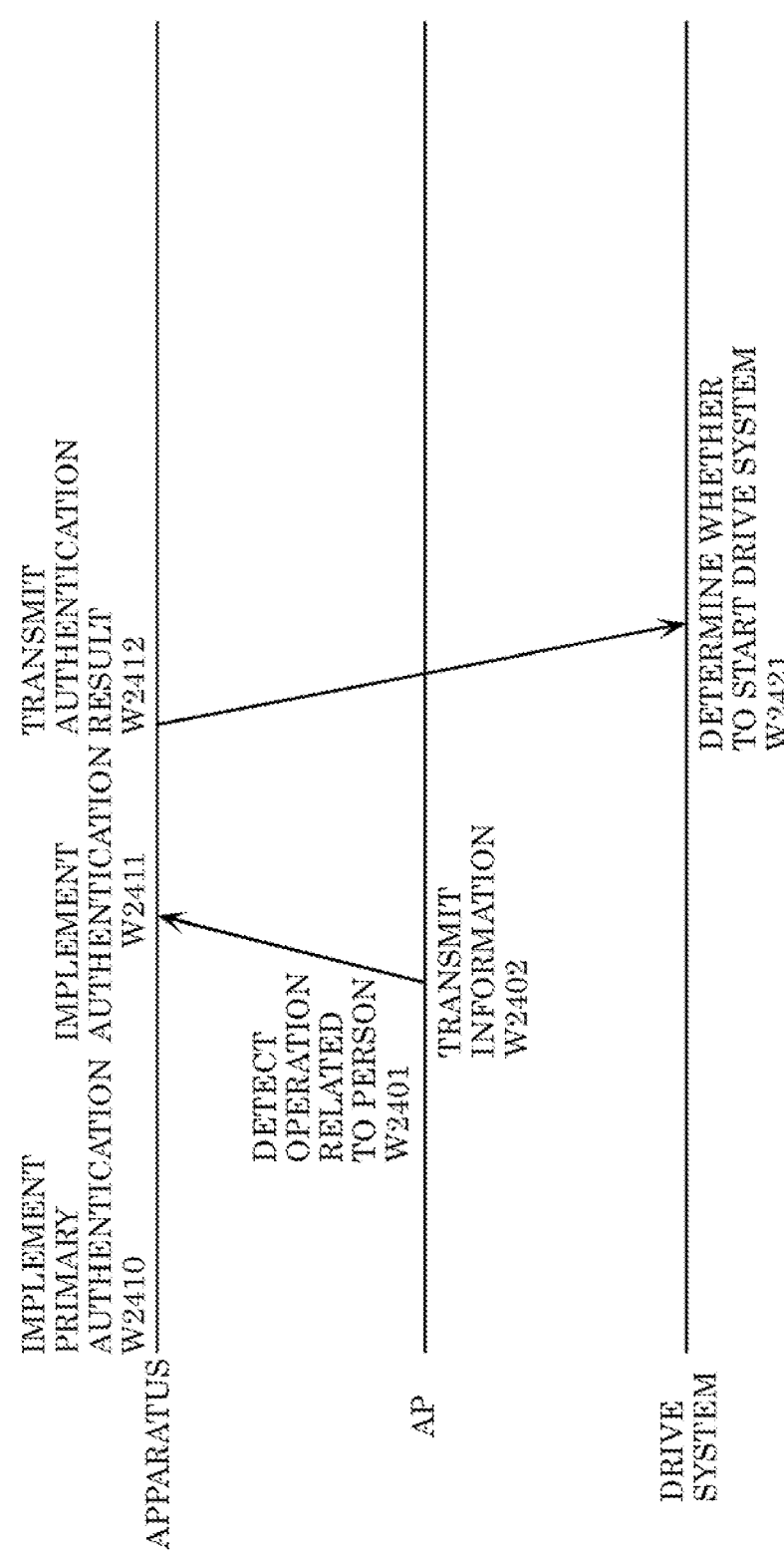
Figure 143B:
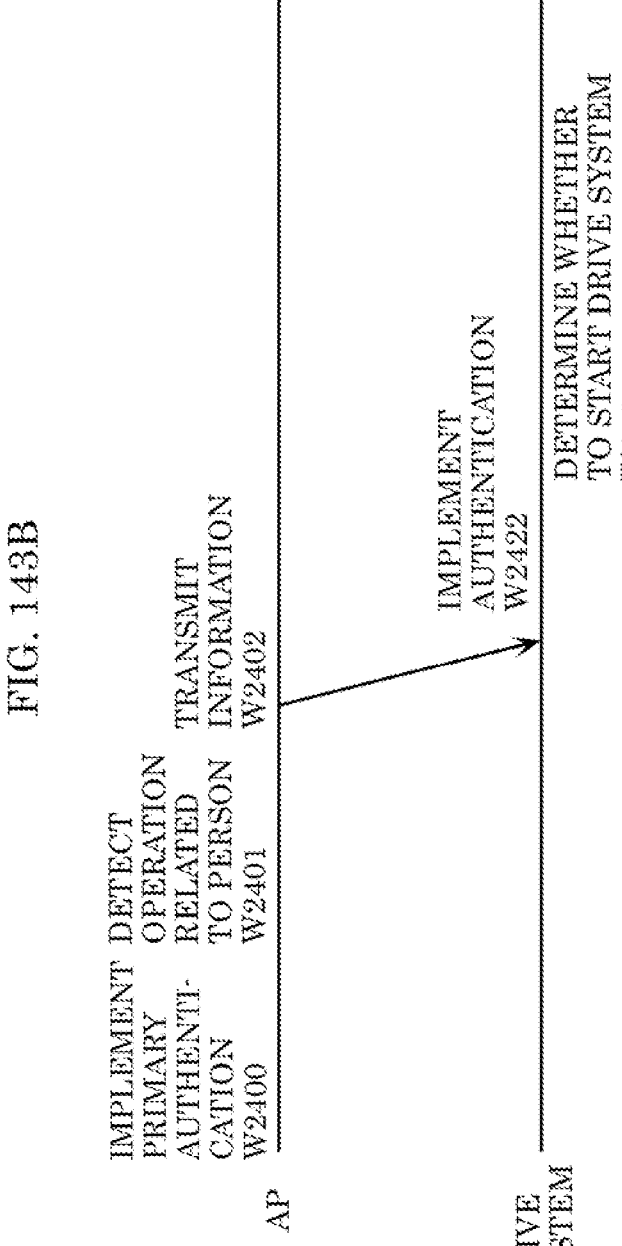
Figure 144:
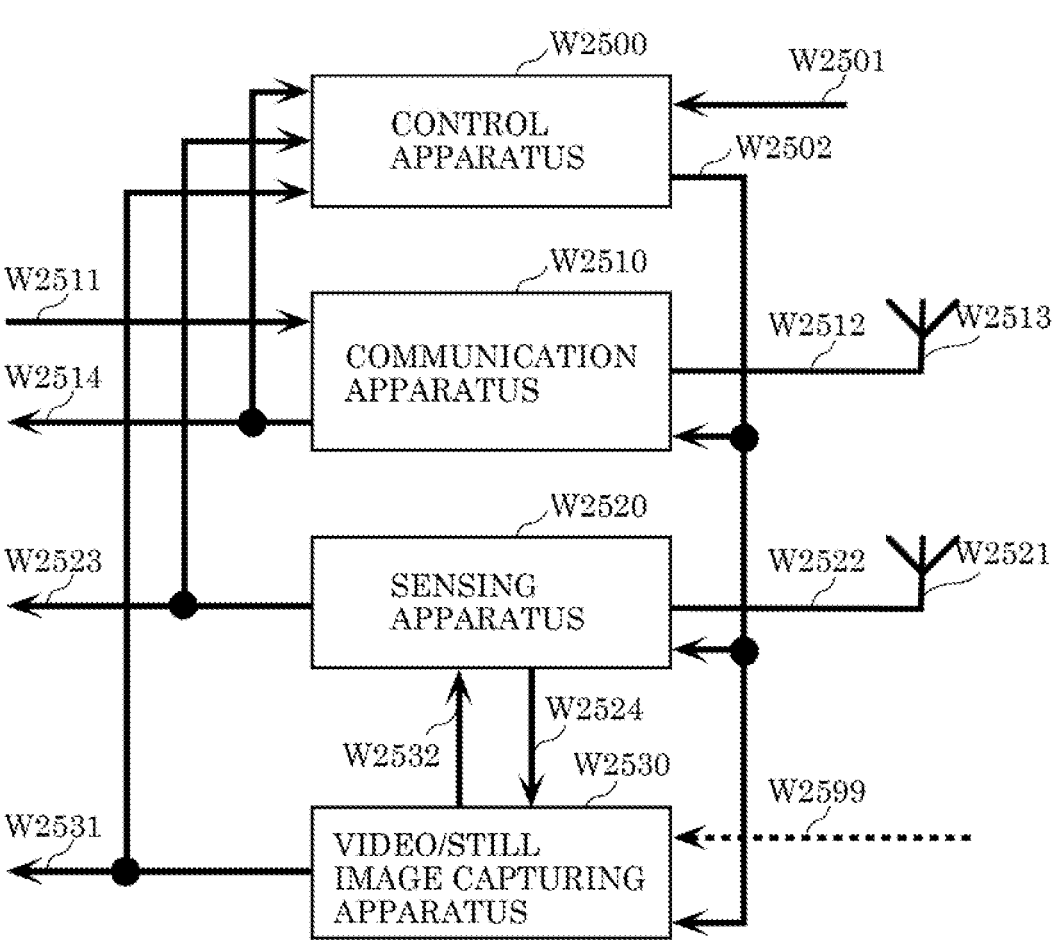
Figure 145A:
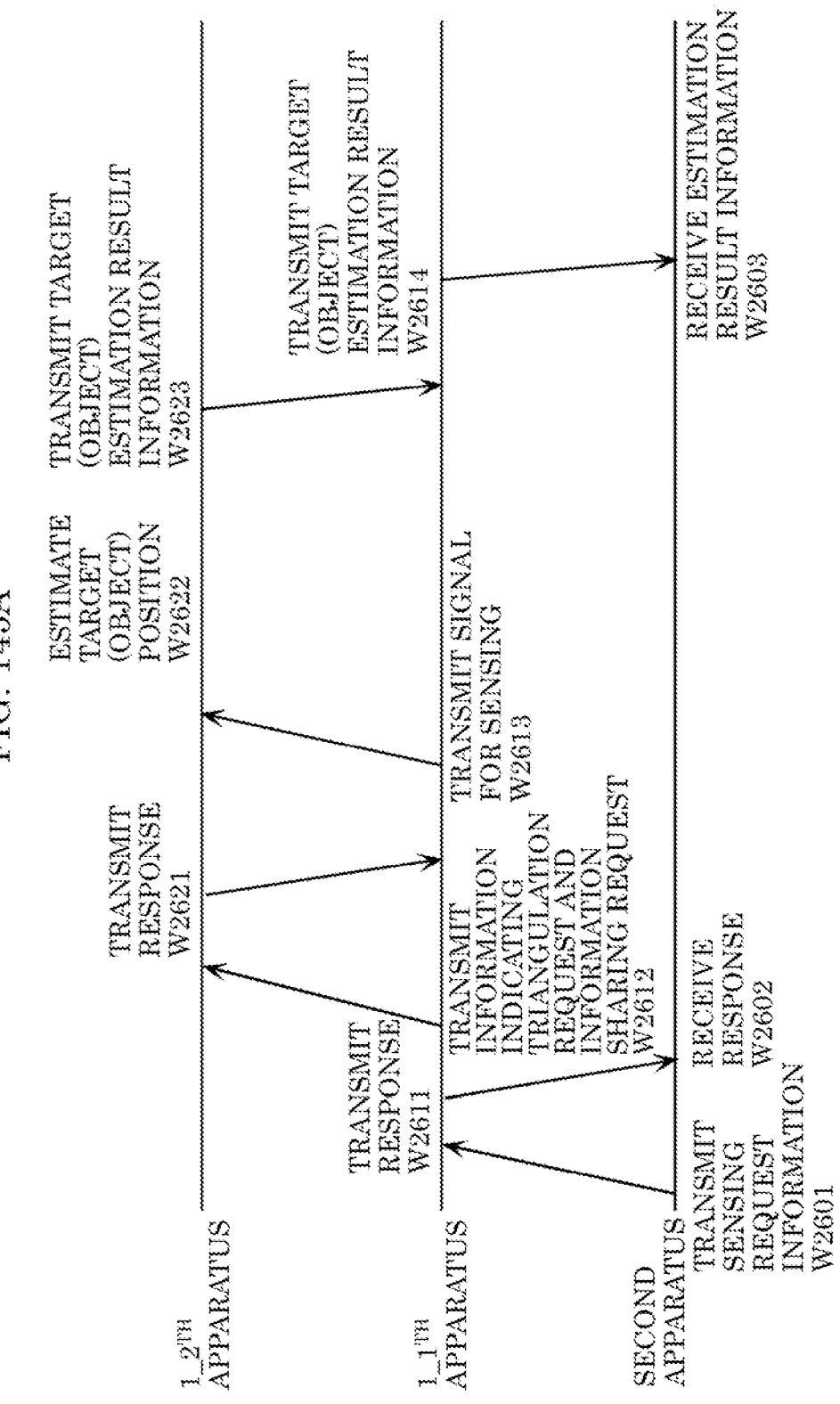
Figure 145B:
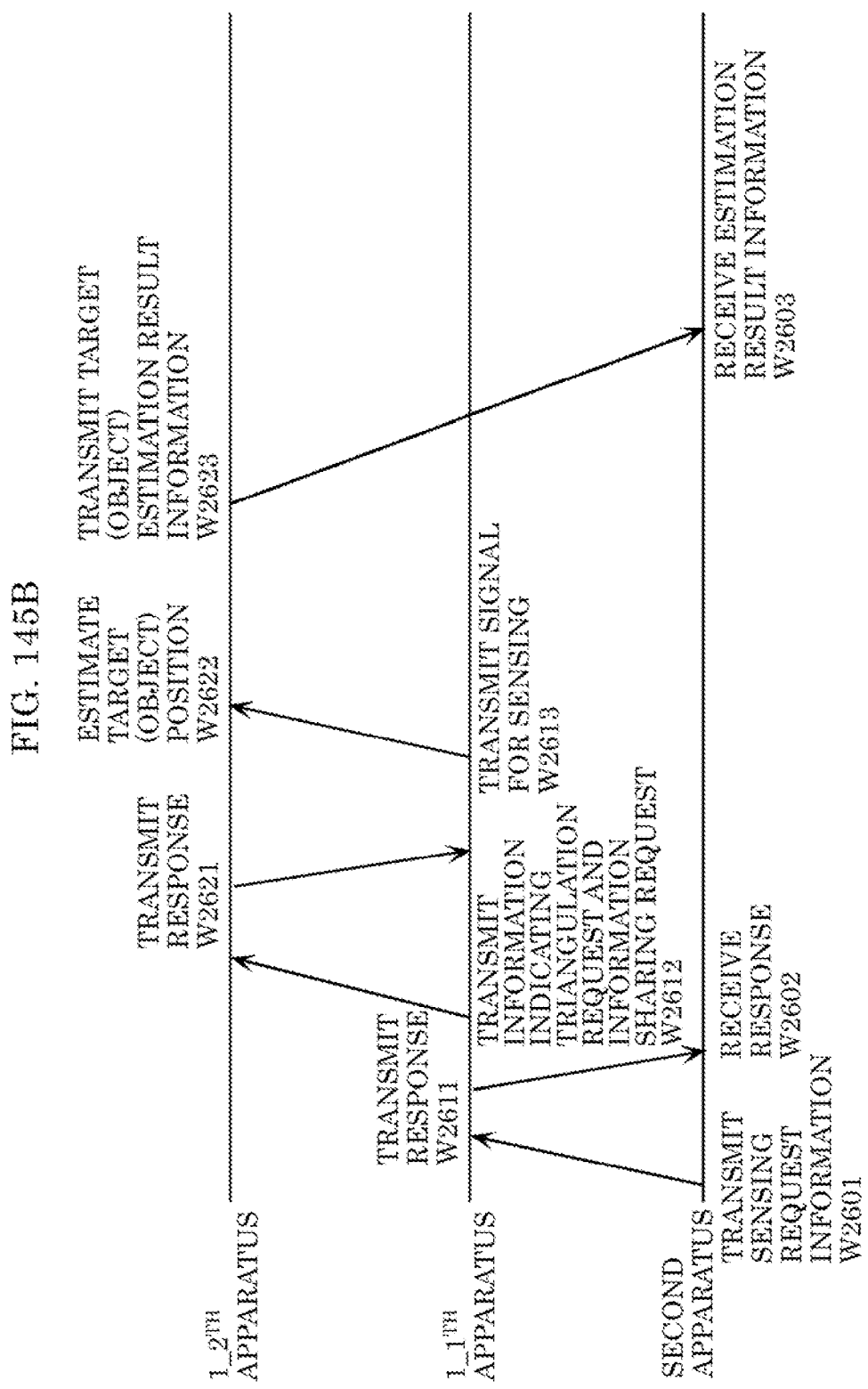
Figure 146:
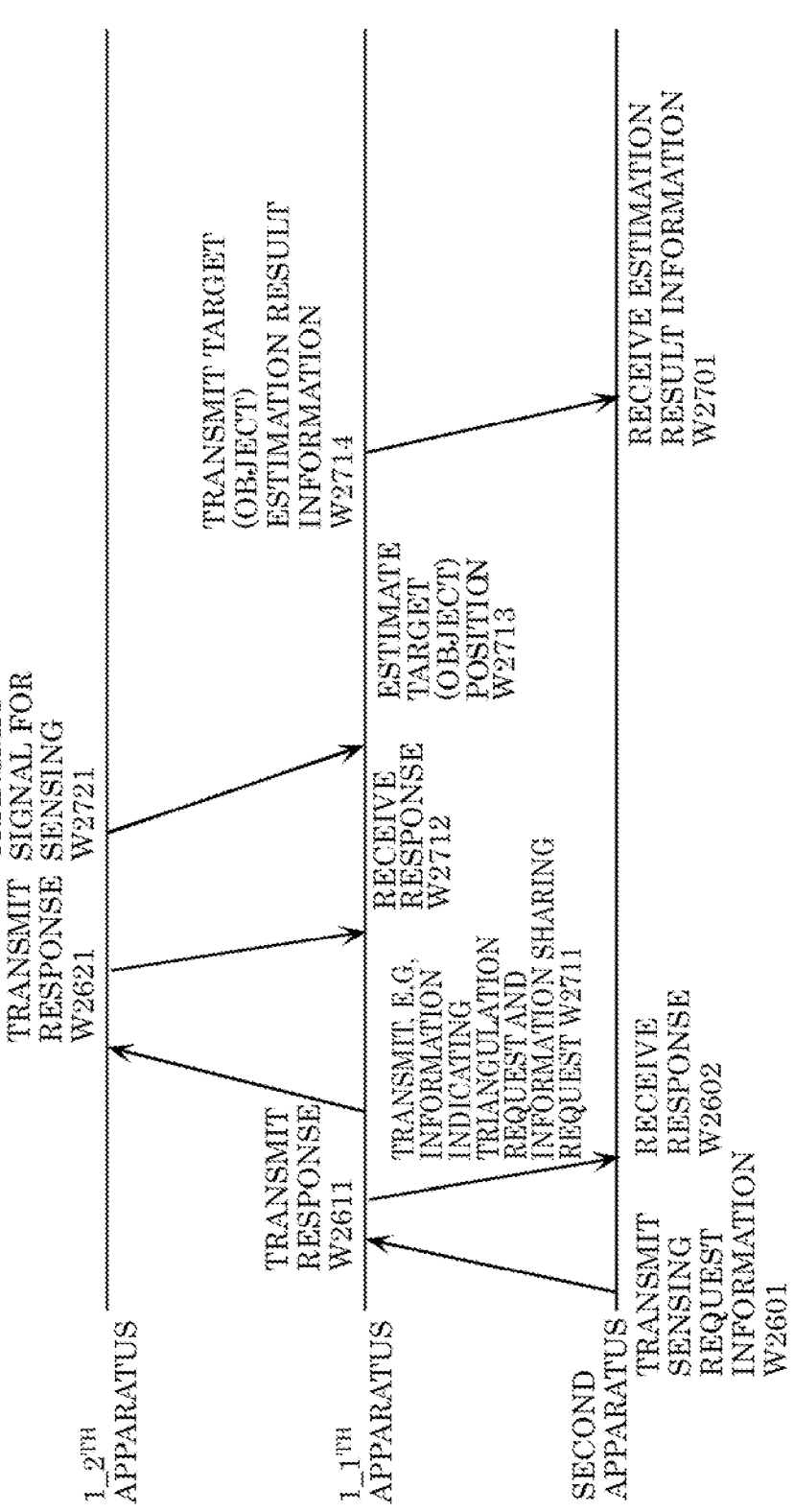
Figure 148A:
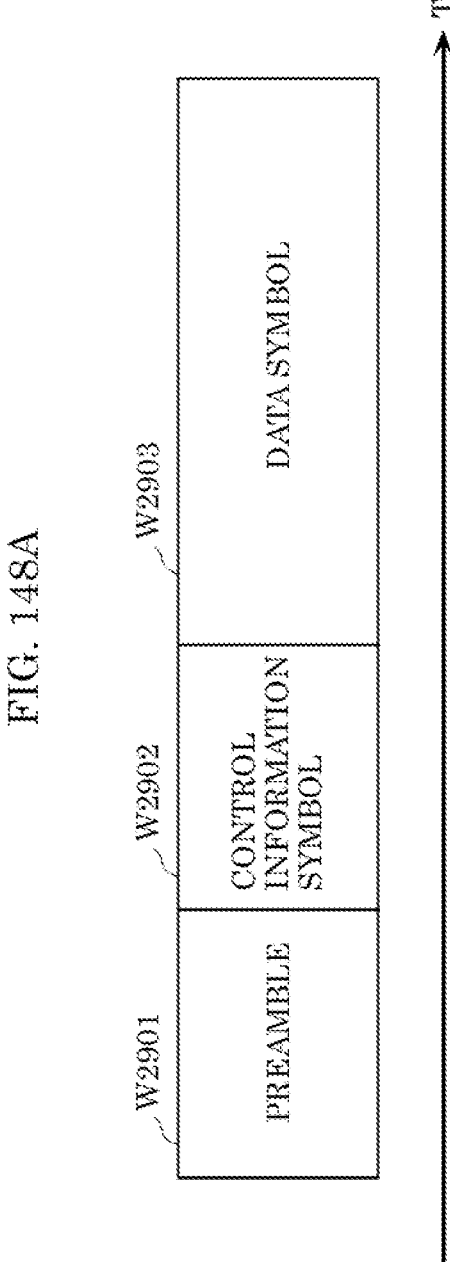
Figure 149:
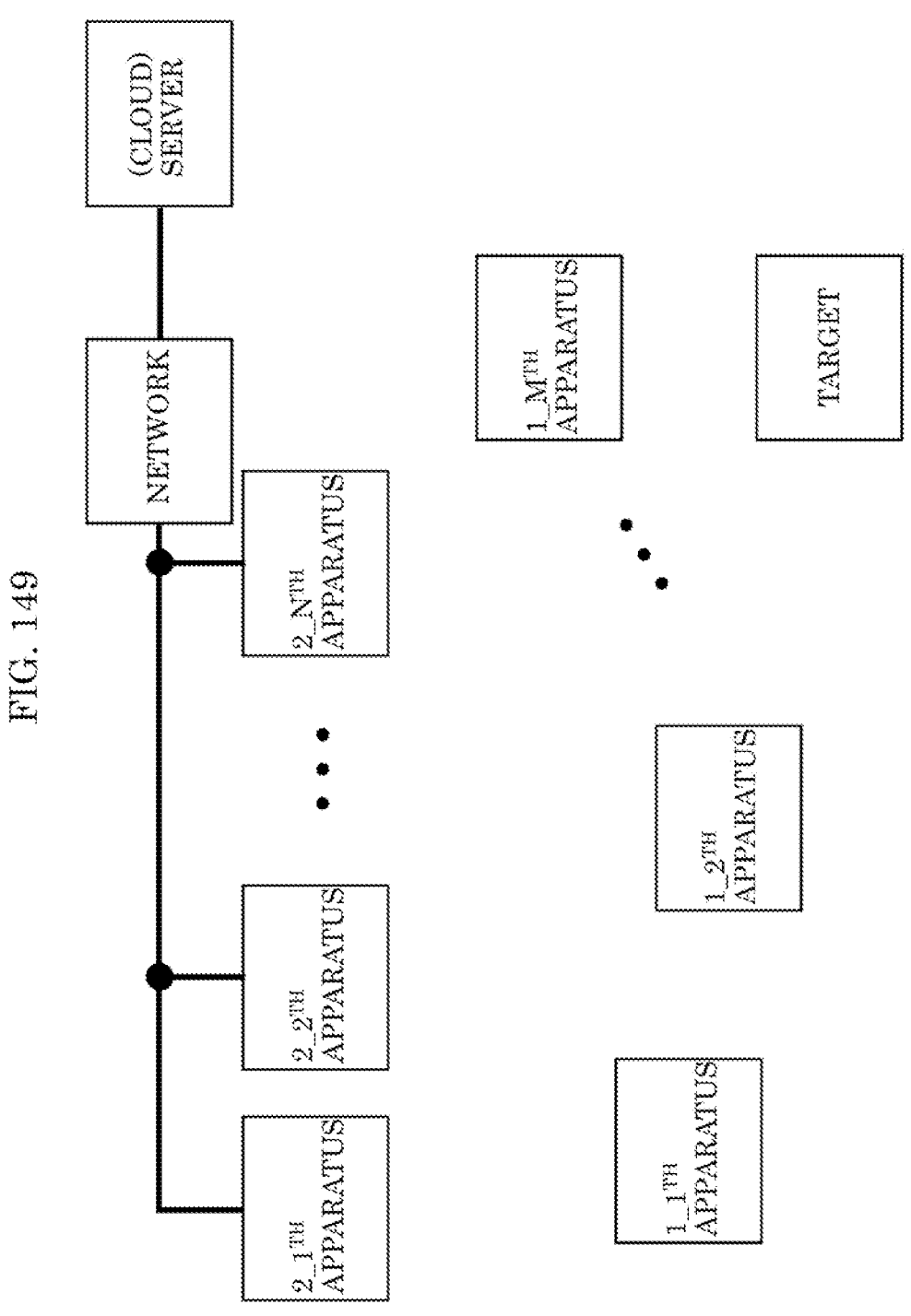
Figure 150:
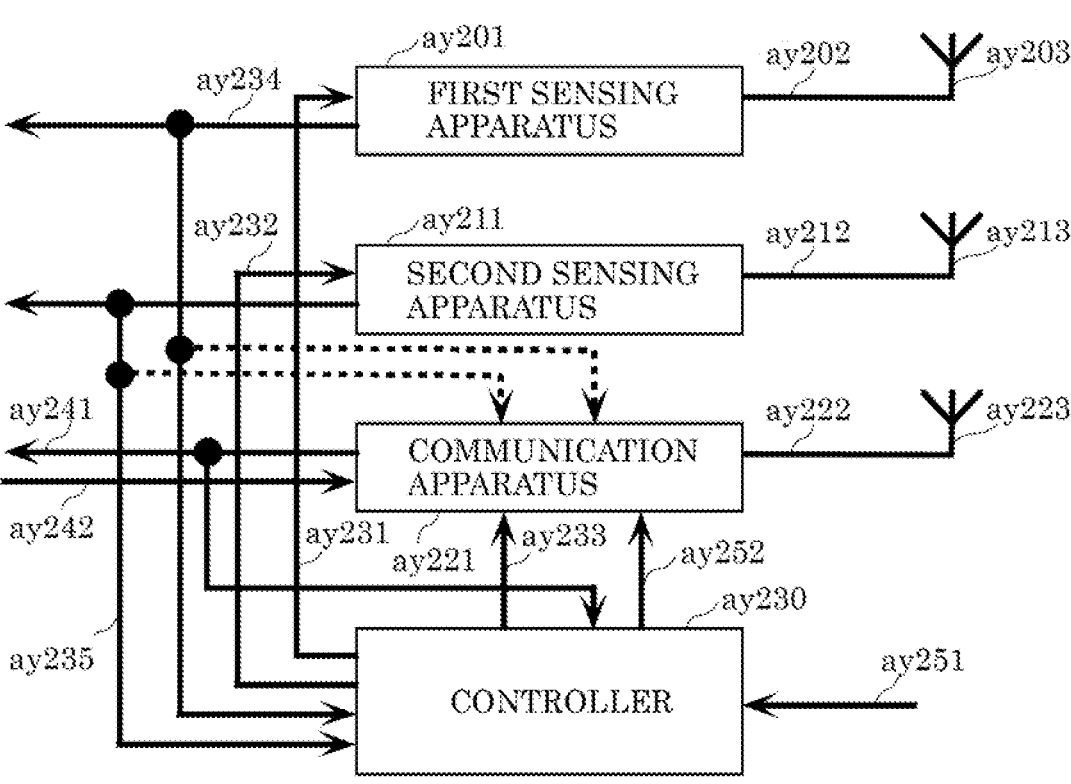
Figure 151A:
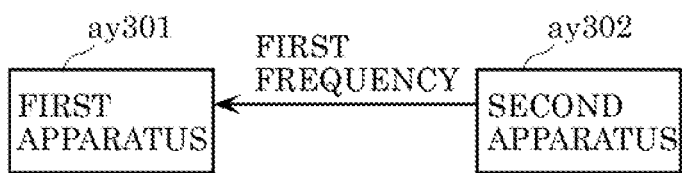
Figure 151B:
Figure 151C:
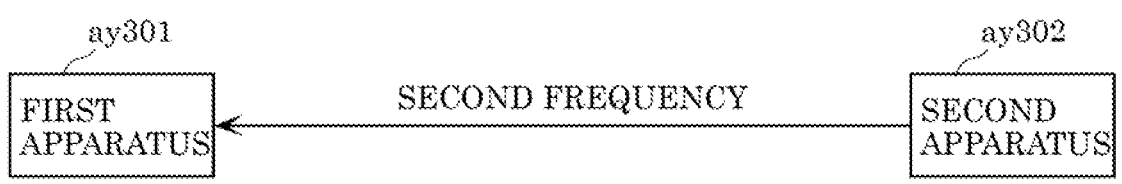
Figure 151D:
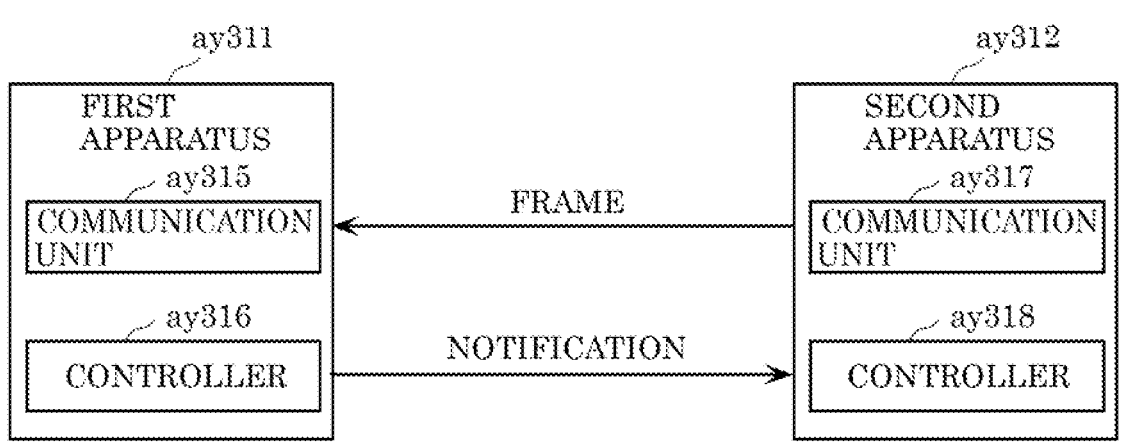
Figure 152A:
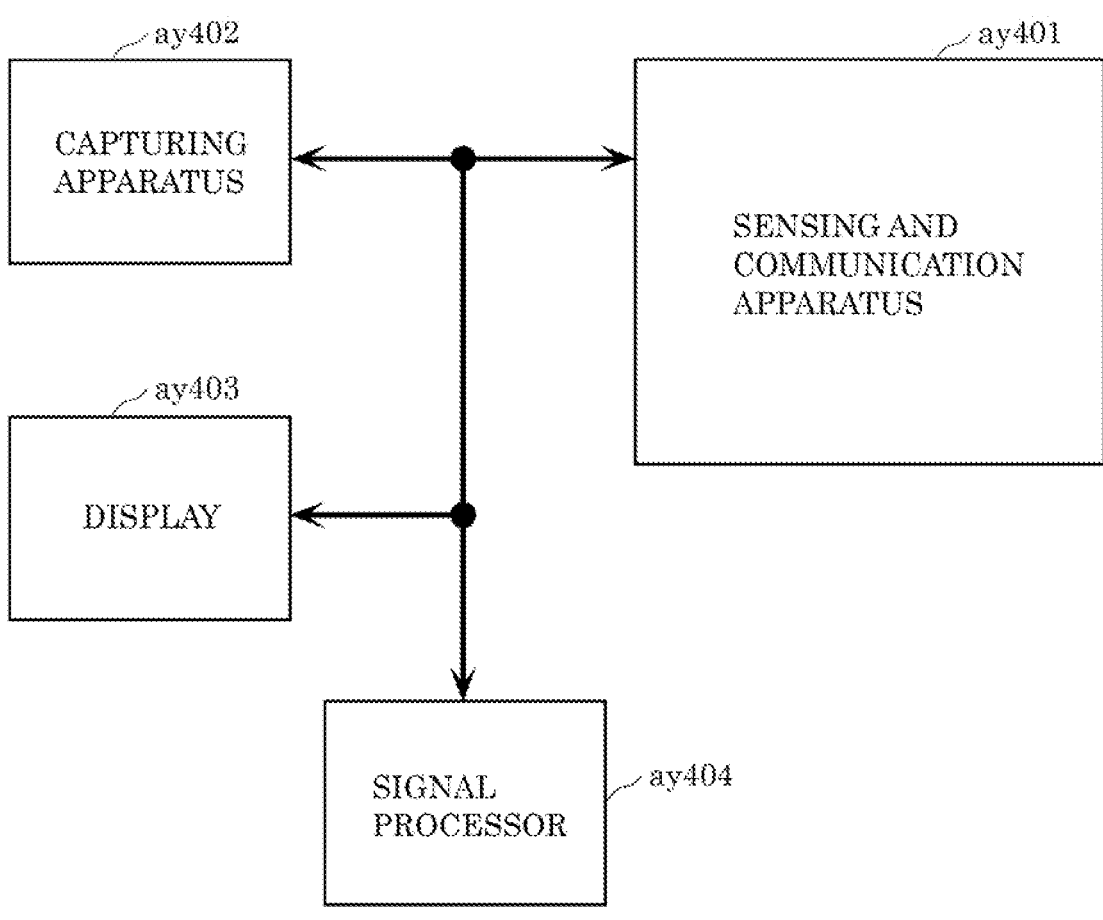
Figure 152B:
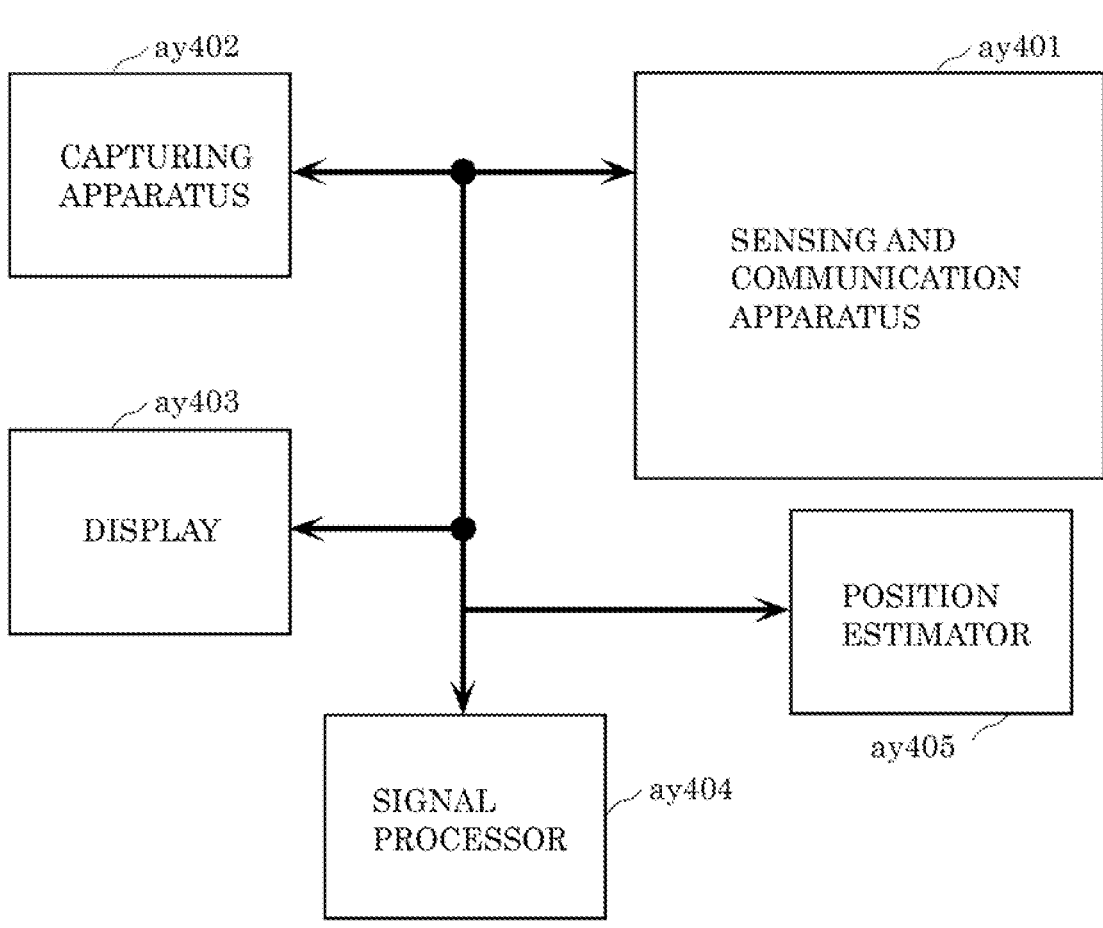
Figure 153A:
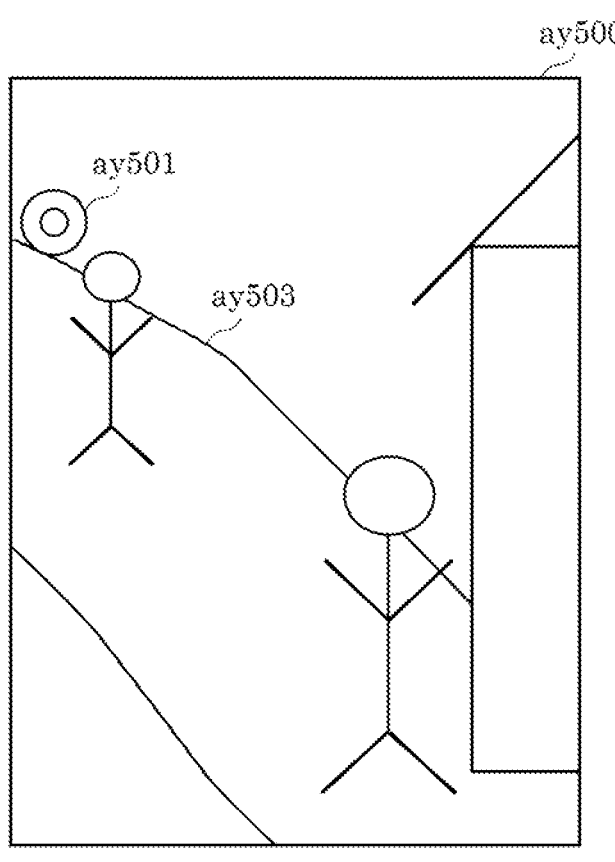
Figure 153B:
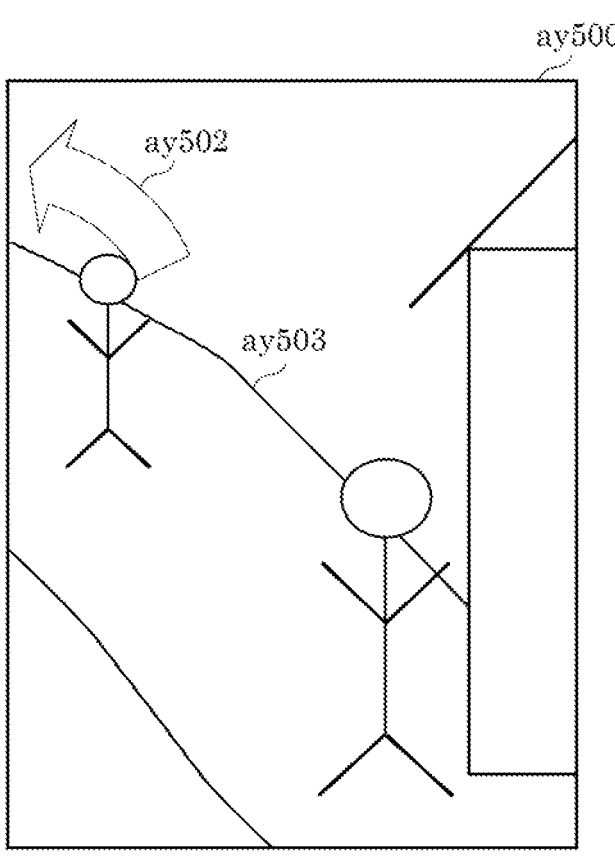
Figure 154A:
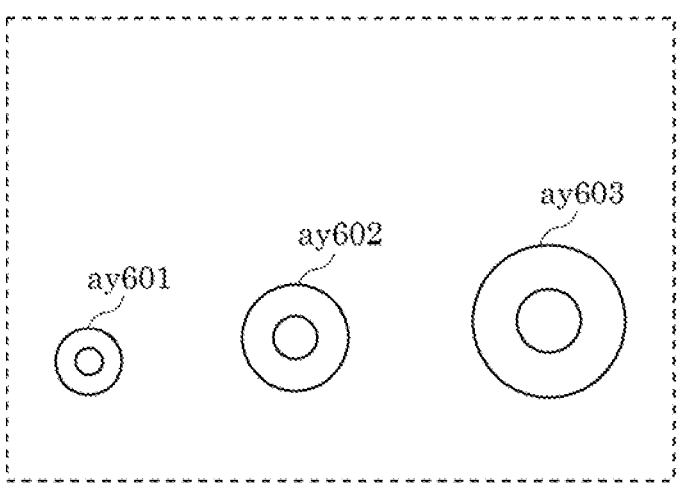
Figure 154B:
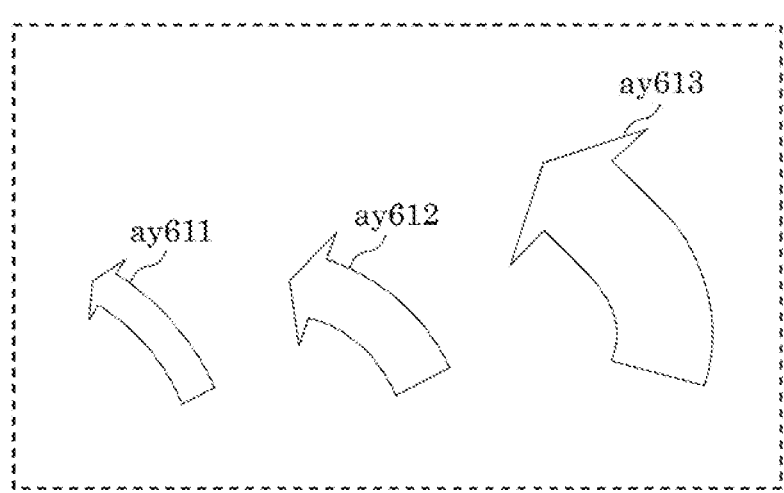
Figure 155:
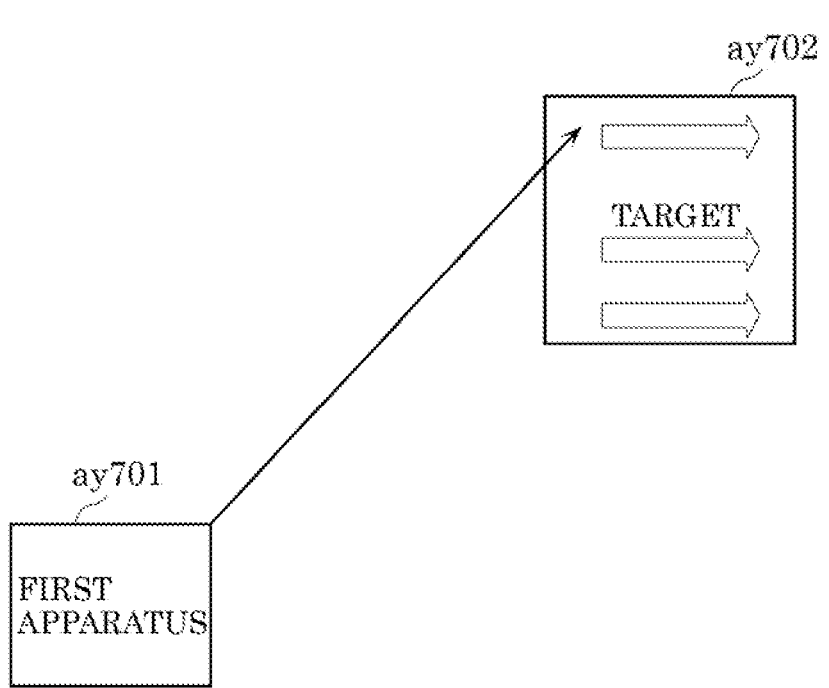
Figure 156B:
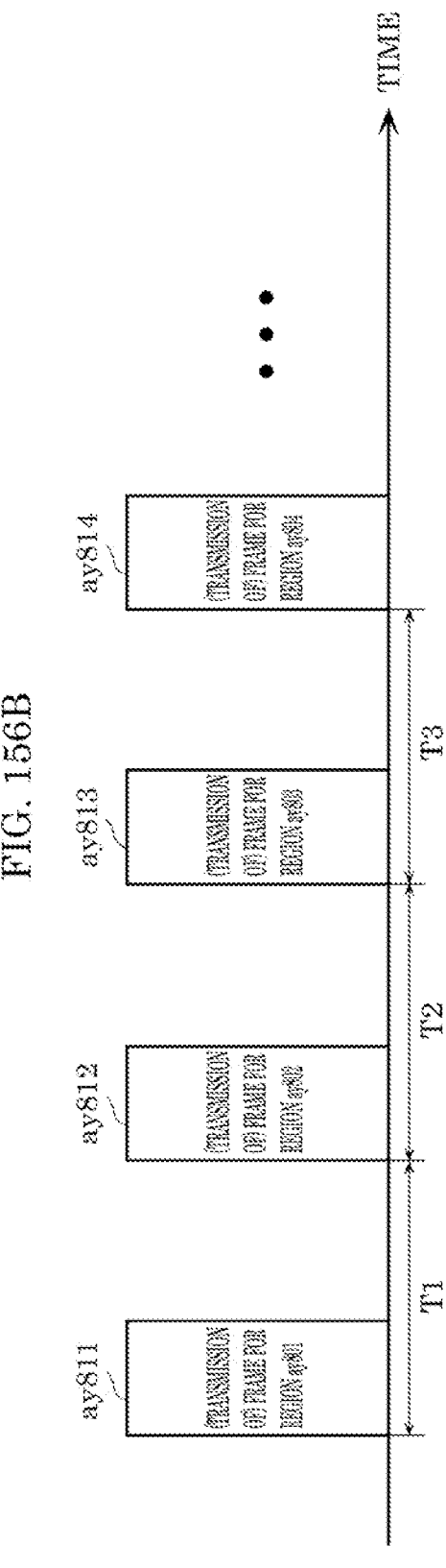
Figure 156C:
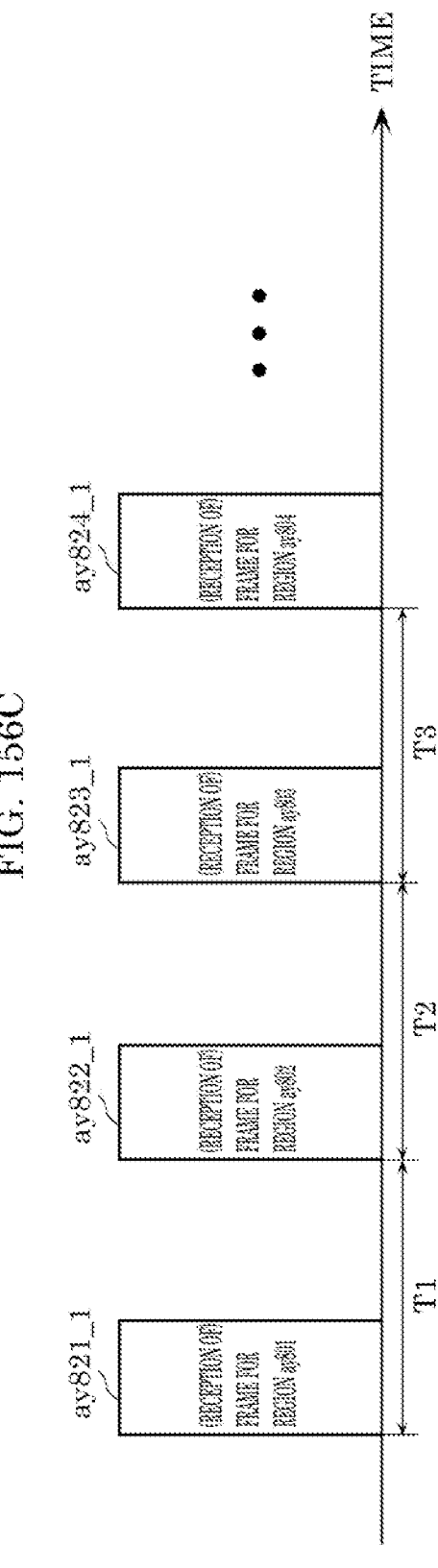
Figure 156D:
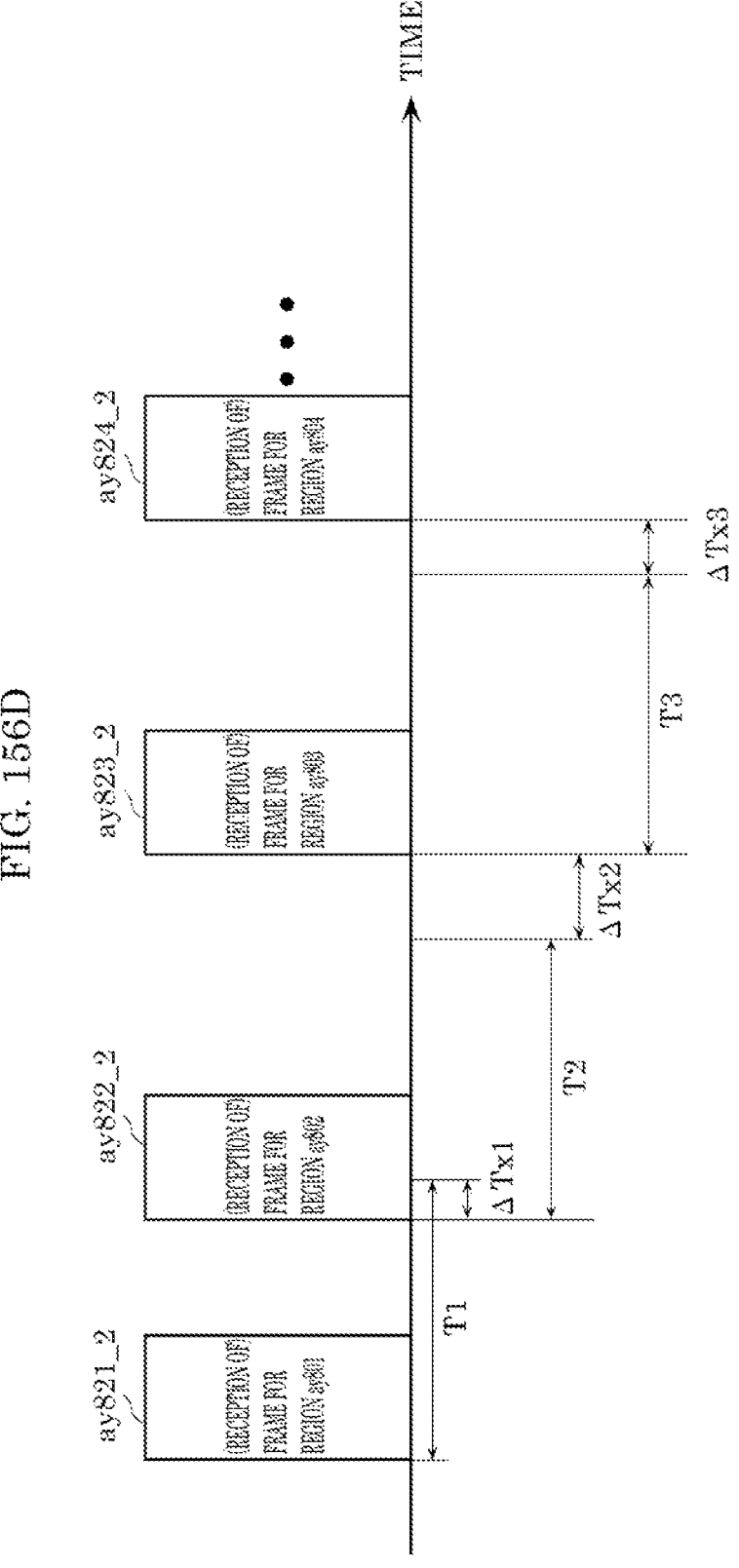
Figure 157A:
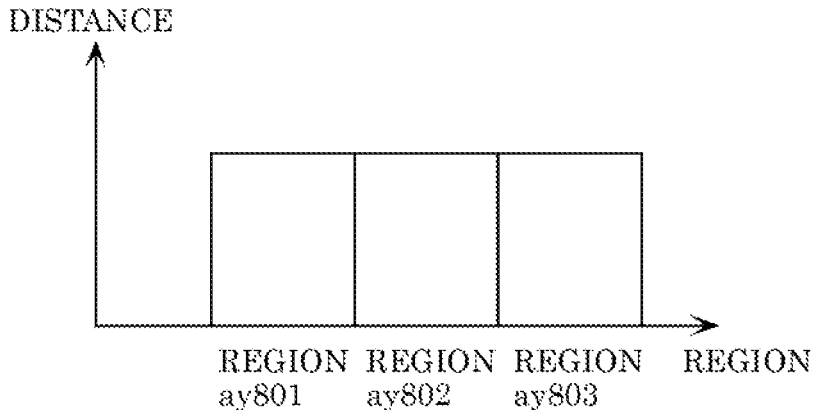
Figure 157B:
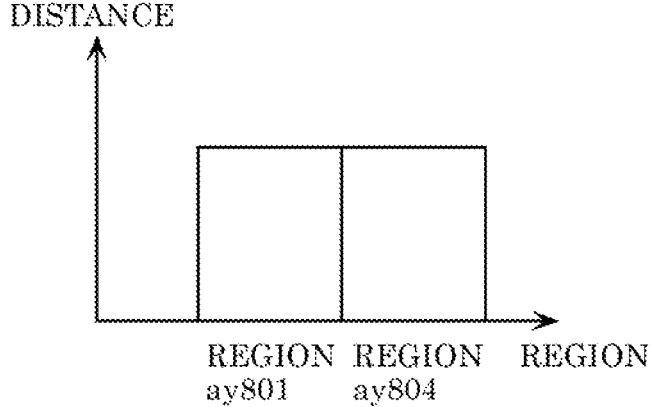
Figure 157C:
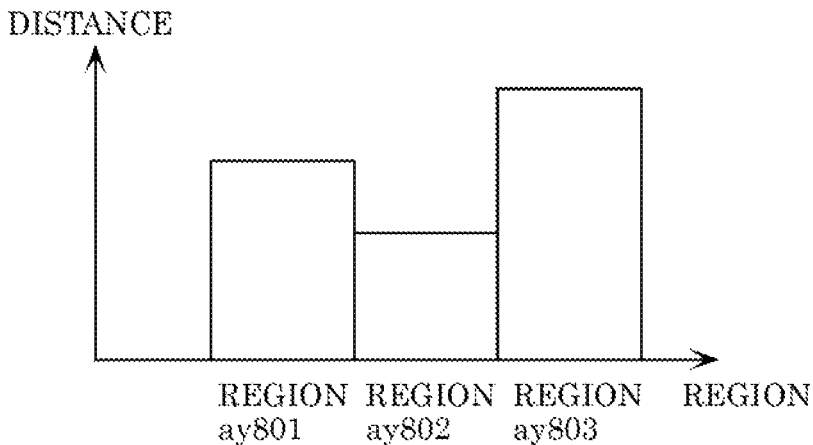
Figure 157D:
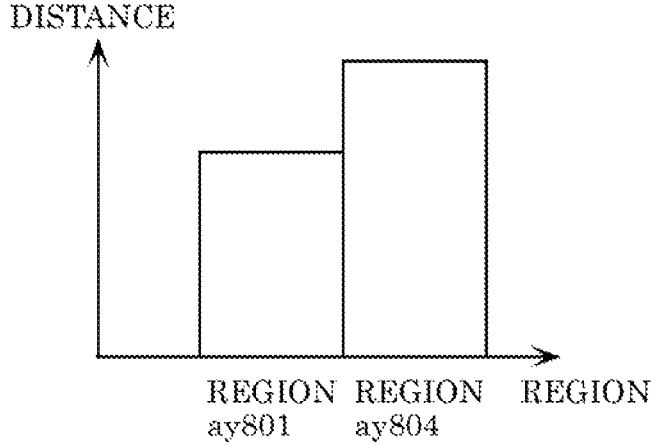
Figure 158B:
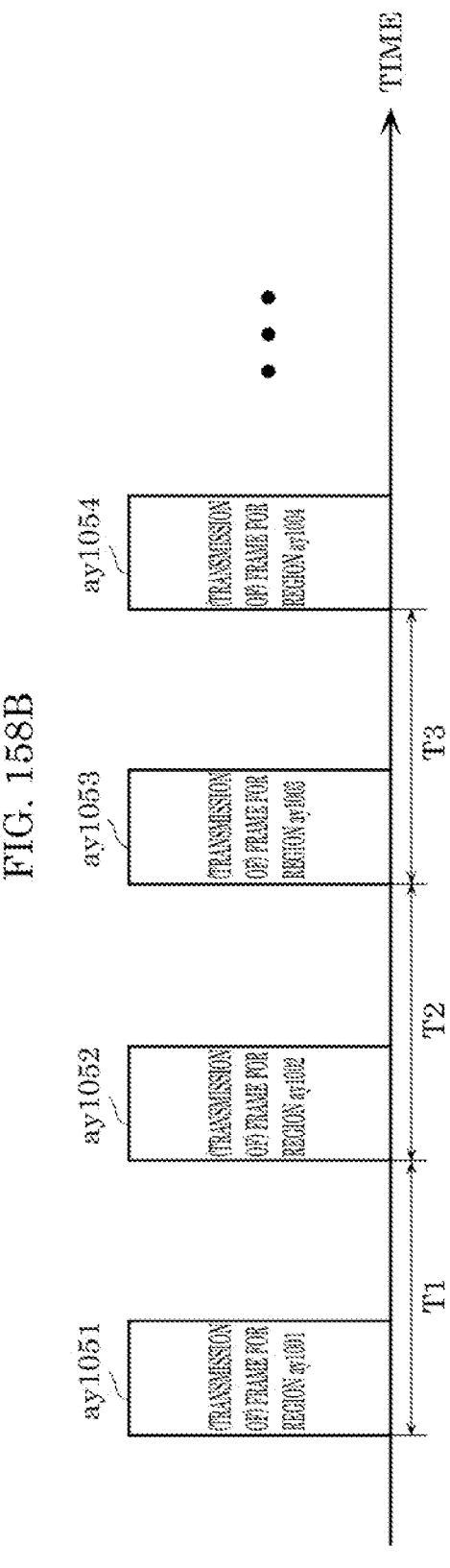
Figure 158C:
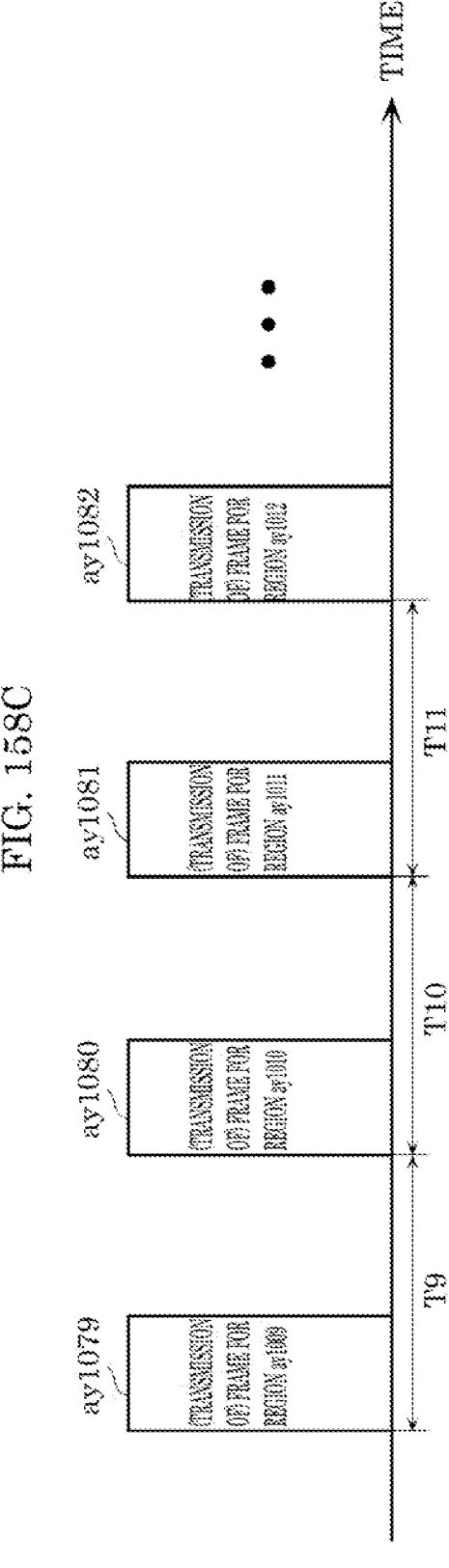
Figure 161:
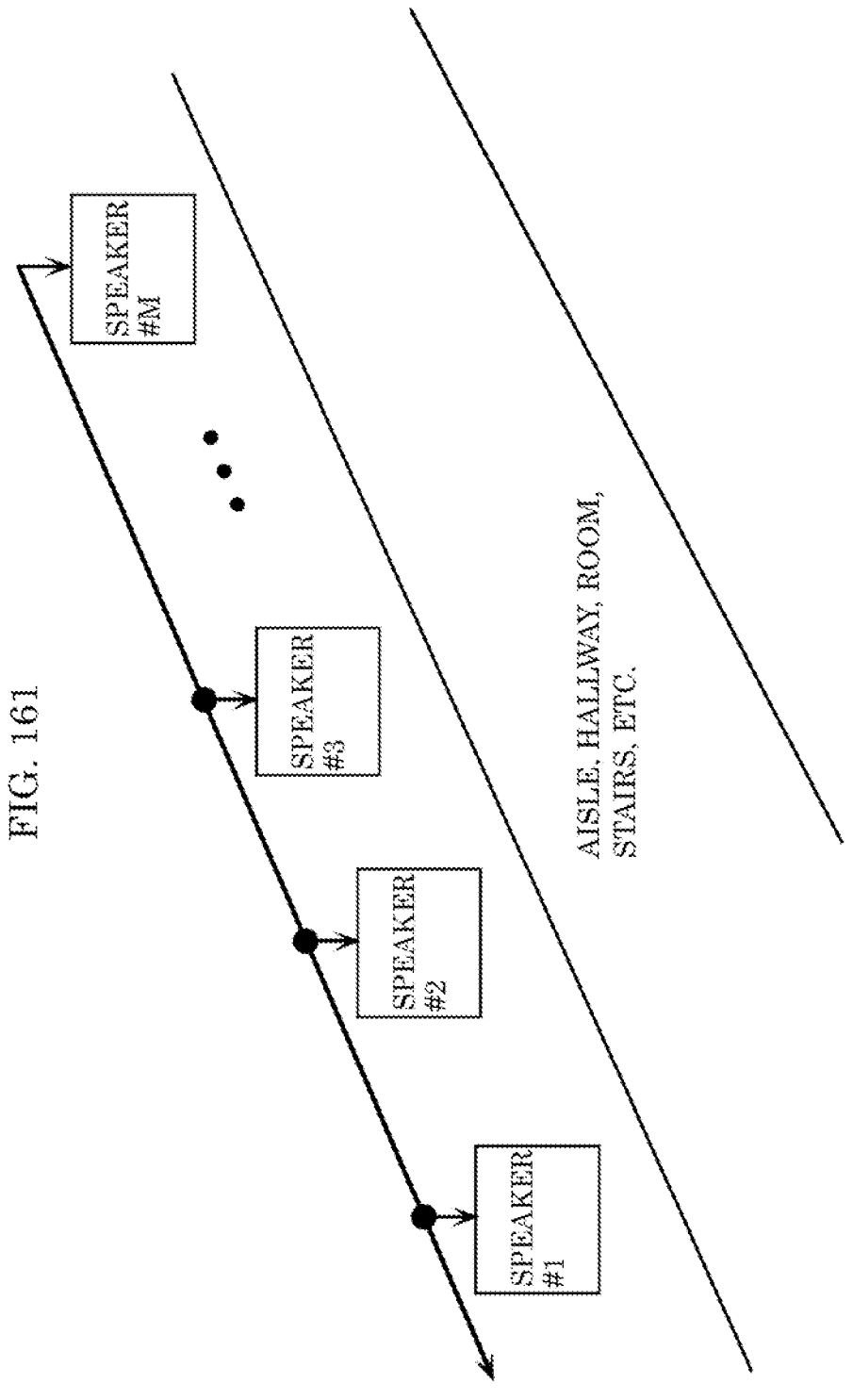
Figure 162:
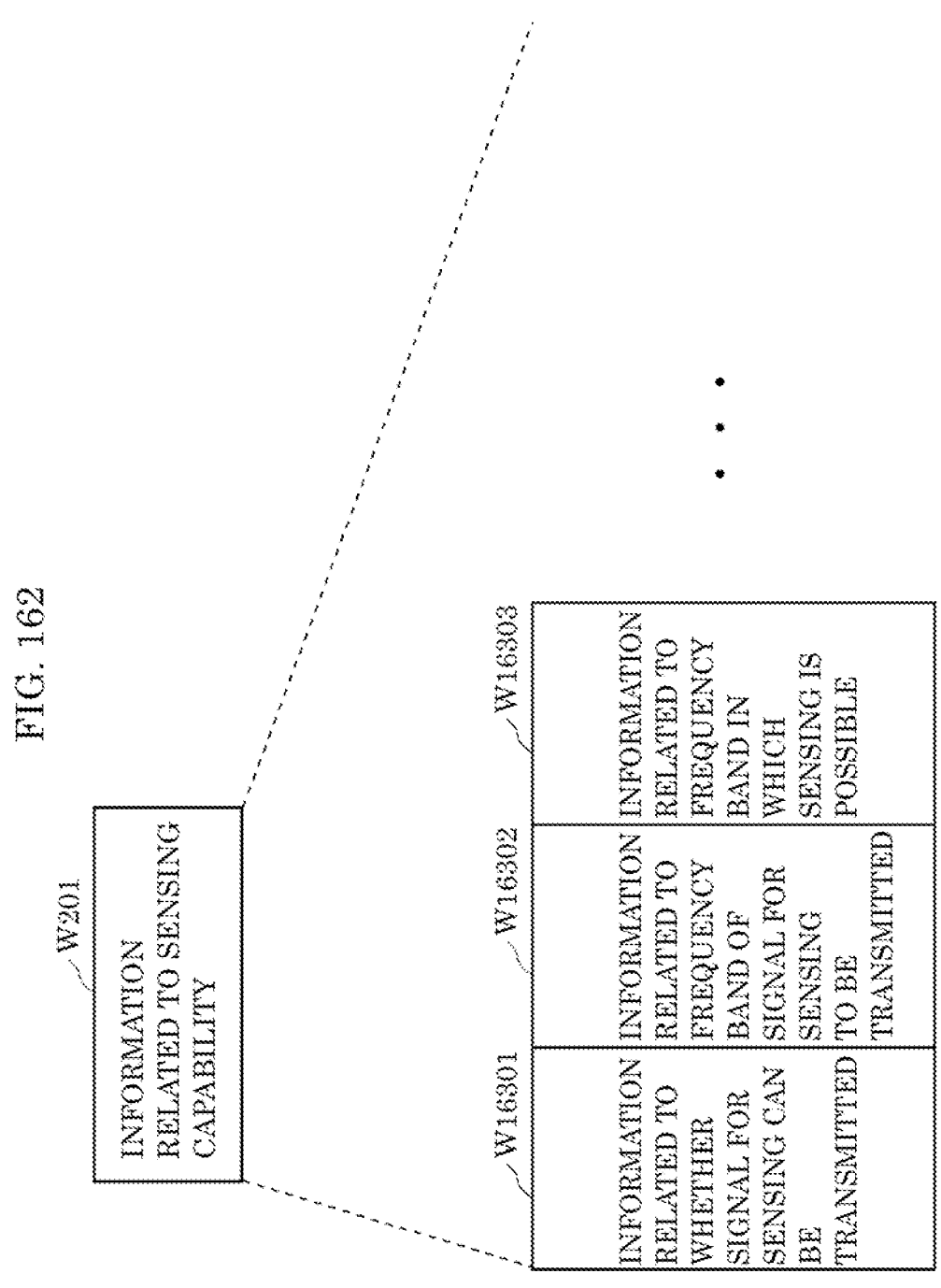
Figure 163:
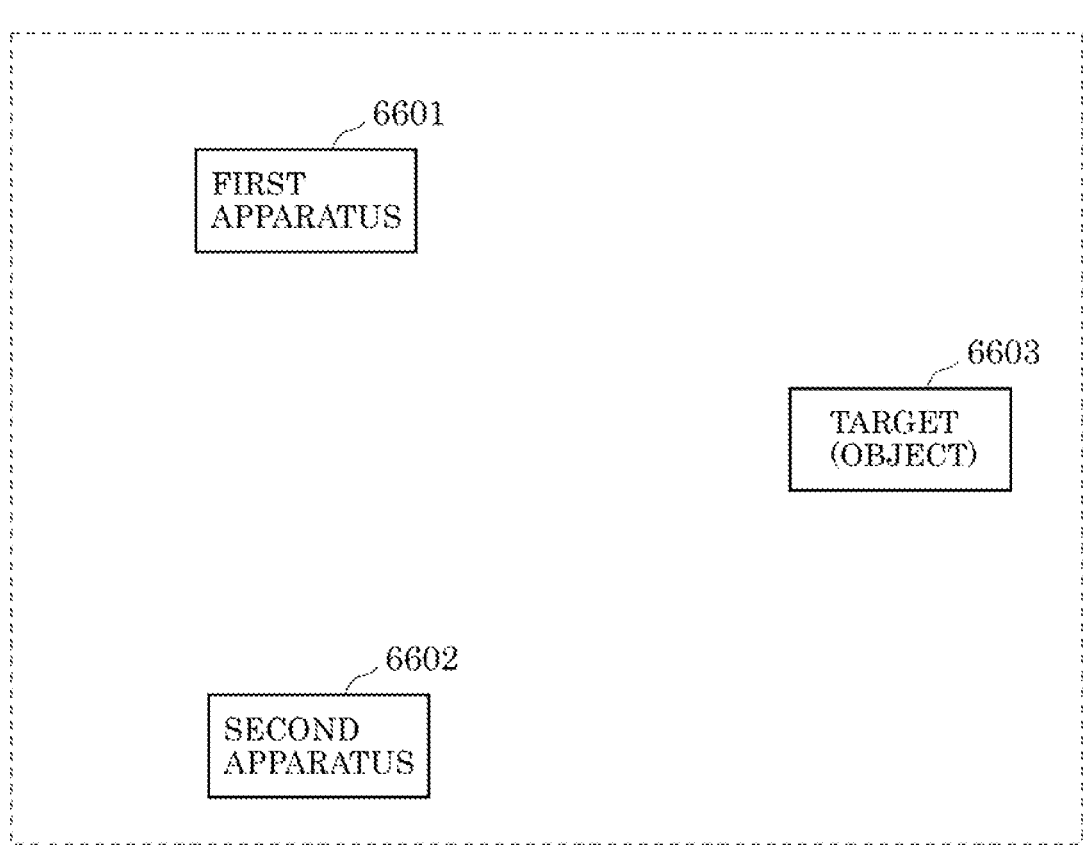

FIG. 9 illustrates one example of a separated configuration of the detecting apparatus according to Embodiment 1;

FIG. 10 illustrates one example of a separated configuration of the detecting apparatus according to Embodiment 1;

FIG. 11 illustrates one example of a state of an apparatus according to Embodiment 2;

FIG. 12 illustrates one example of a configuration of a frame according to Embodiment 2;

FIG. 13 illustrates one example of a configuration of a frame according to Embodiment 2;

FIG. 14 illustrates one example of a configuration of an apparatus according to Embodiment 3;

FIG. 15 illustrates one example of a configuration of the apparatus according to Embodiment 3;

FIG. 16 illustrates one example of a configuration of the apparatus according to Embodiment 3;

FIG. 17 illustrates one example of a system configuration according to Embodiment 4;

FIG. 18 illustrates one example of a configuration of an apparatus according to Embodiment 4;

Figure 19:
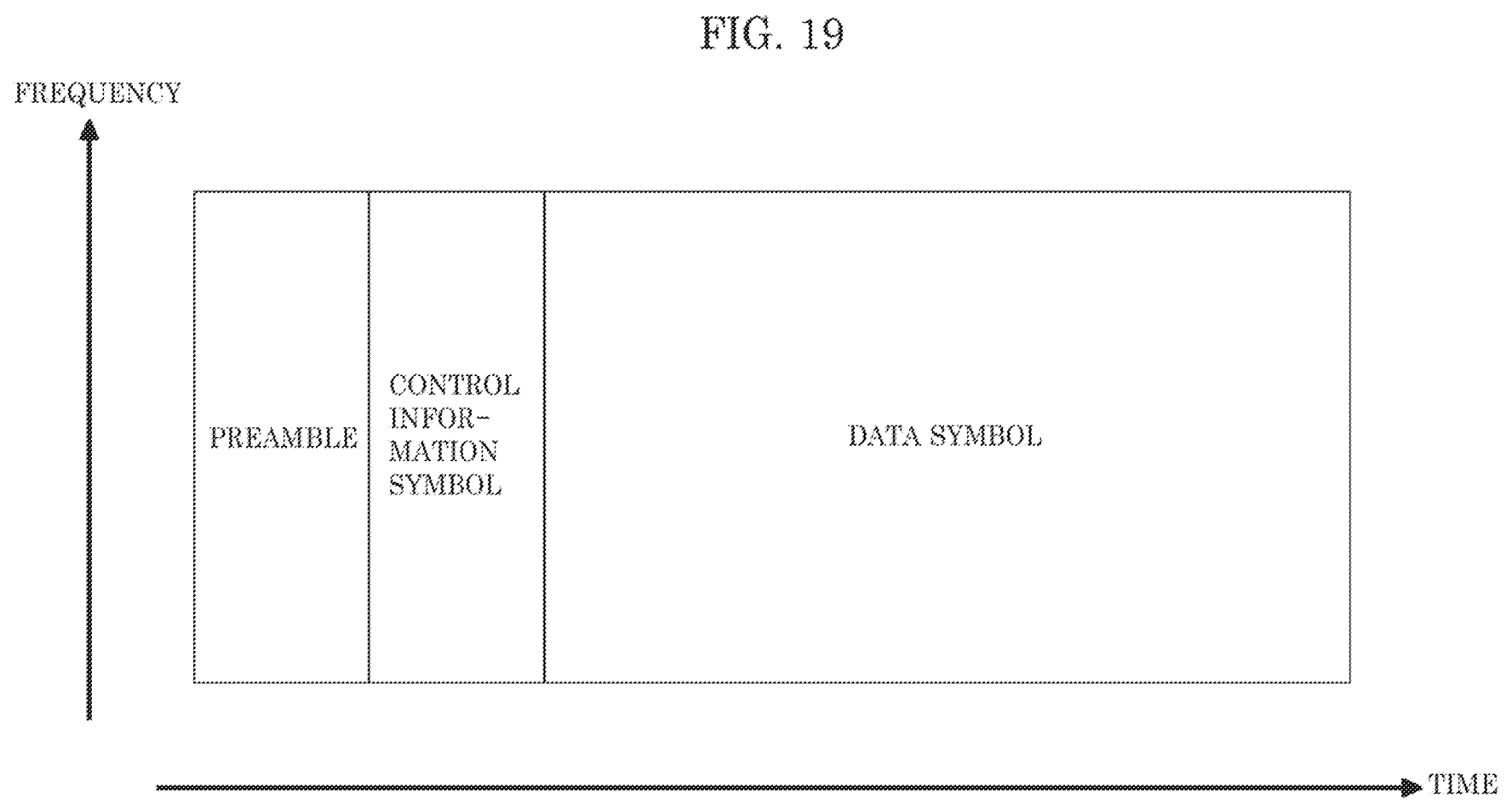

FIG. 19 illustrates one example of a configuration of a frame according to Embodiment 4;

FIG. 20 illustrates one example of a configuration of a frame according to Embodiment 4;

FIG. 21 illustrates one example of a configuration of a frame according to Embodiment 4;

Figure 22:
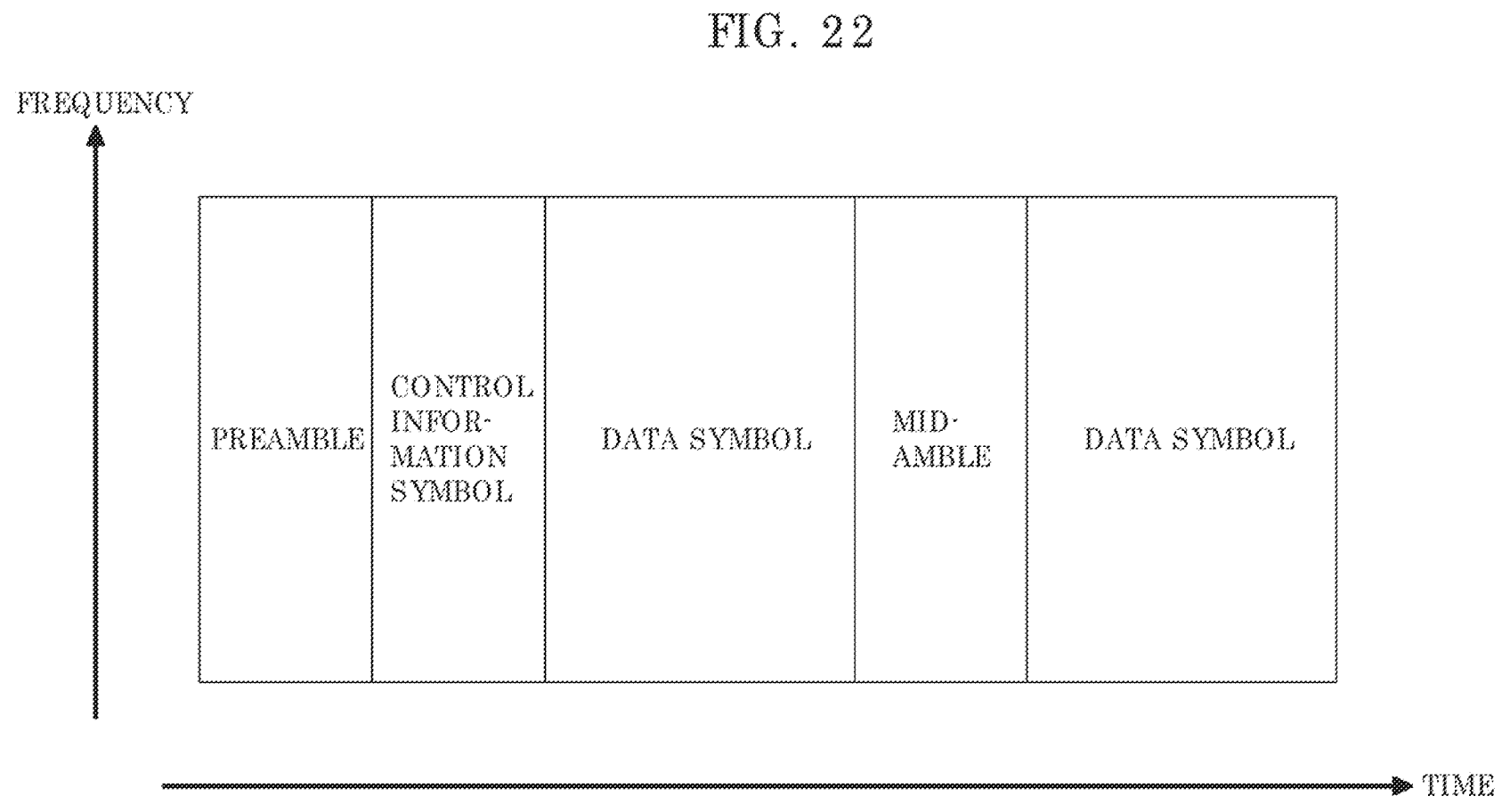

FIG. 22 illustrates one example of a configuration of a frame according to Embodiment 4;

Figure 23:
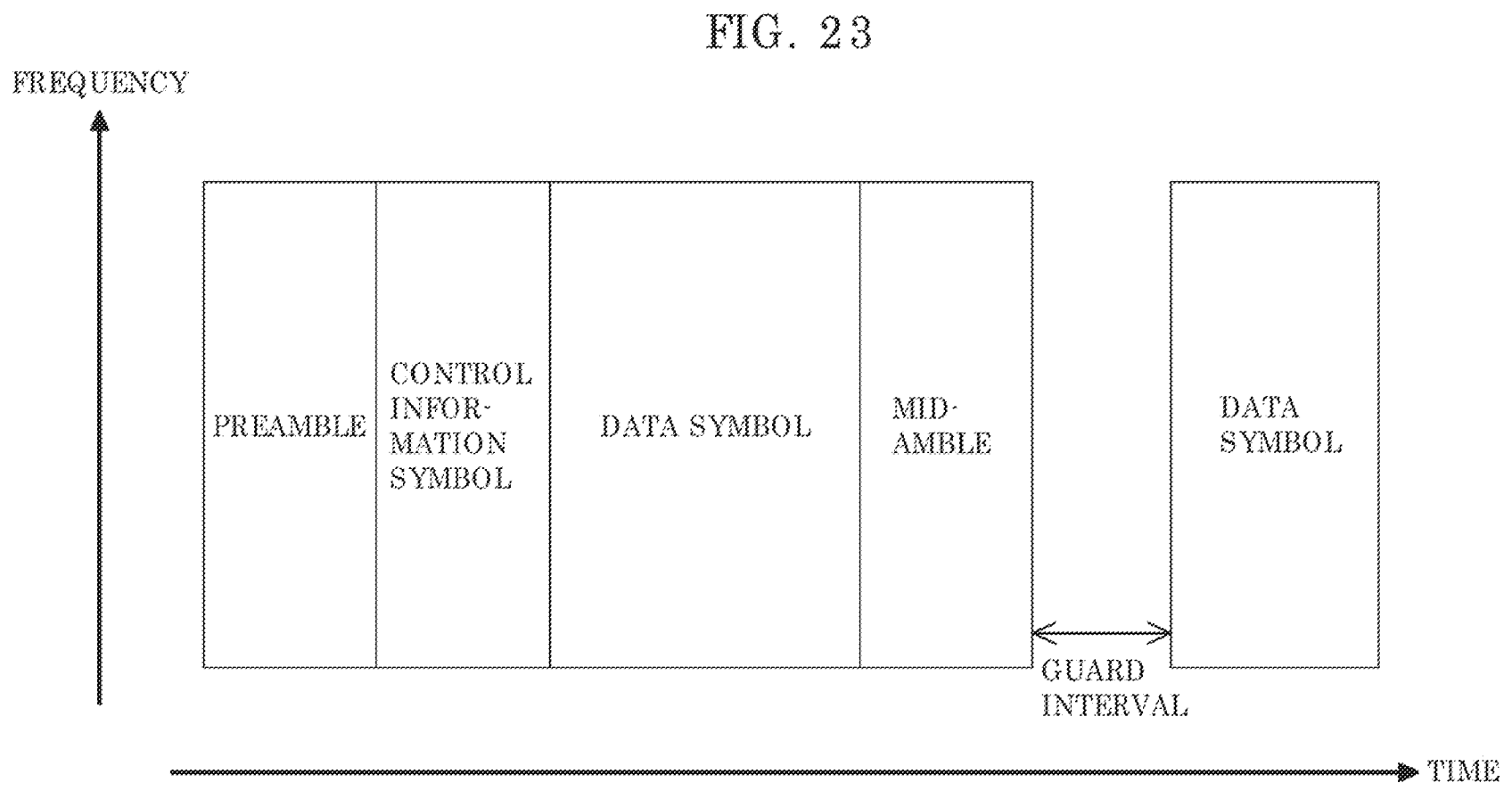

FIG. 23 illustrates one example of a configuration of a frame according to Embodiment 4;

Figure 24:
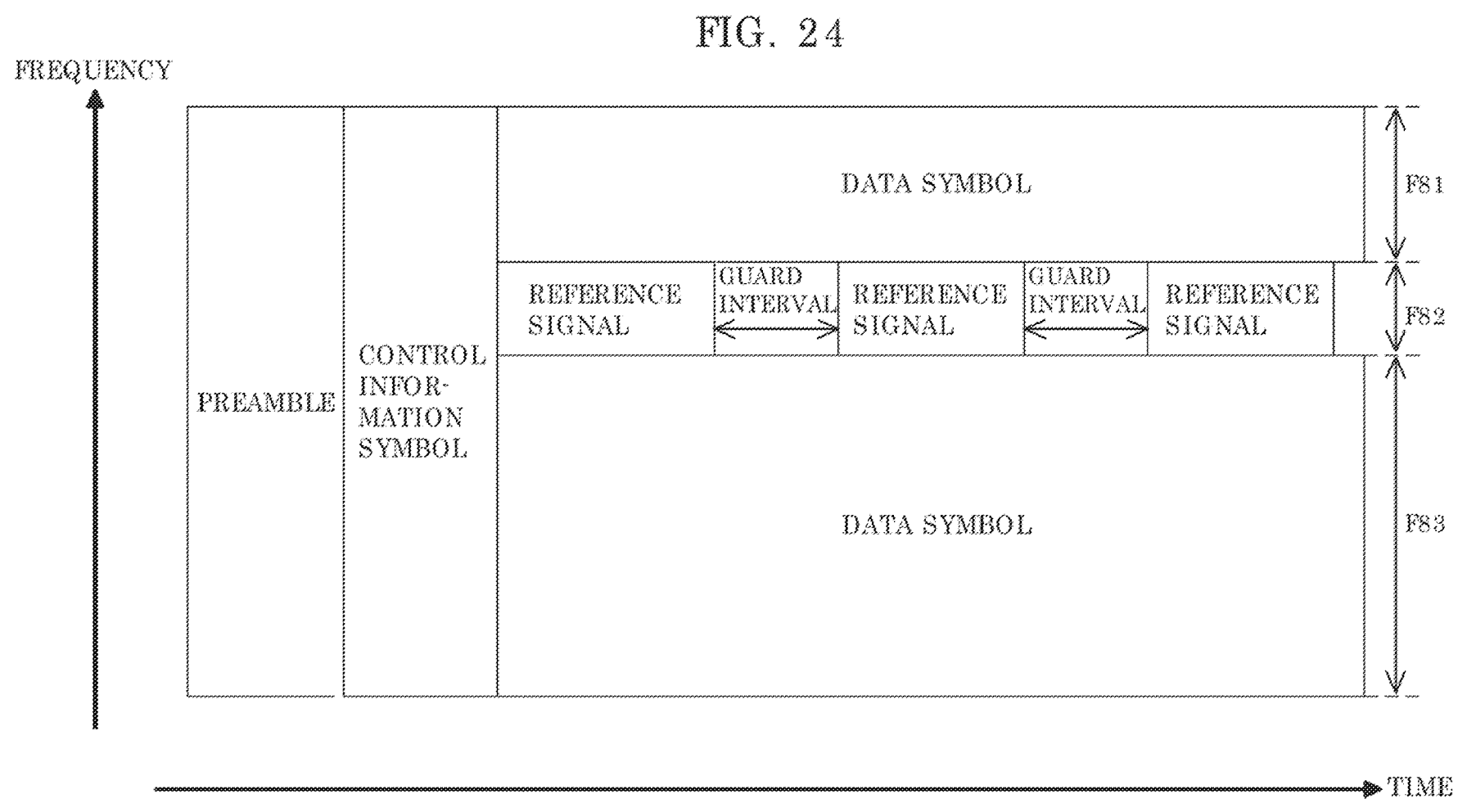

FIG. 24 illustrates one example of a configuration of a frame according to Embodiment 4;

FIG. 25 illustrates one example of a configuration of a frame according to Embodiment 4;

FIG. 26 illustrates one example of a configuration of a frame according to Embodiment 4;

FIG. 27 illustrates one example of a configuration of a frame according to Embodiment 4;

FIG. 28 illustrates one example of a configuration of a frame according to Embodiment 4;

Figure 29:
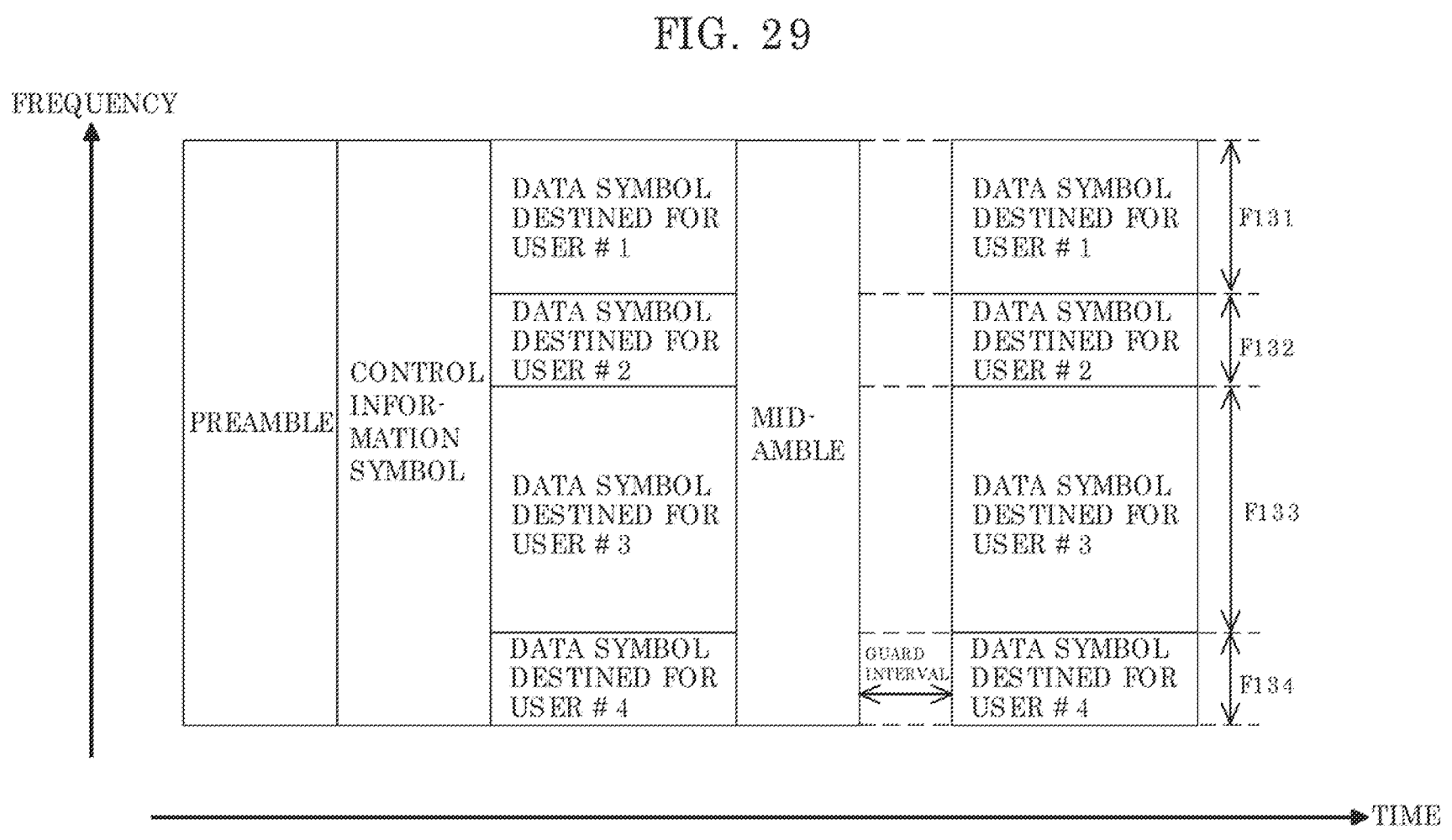

FIG. 29 illustrates one example of a configuration of a frame according to Embodiment 4;

FIG. 30 illustrates one example of a configuration of a frame according to Embodiment 4;

FIG. 31 illustrates one example of a configuration of a frame according to Embodiment 4;

FIG. 32 illustrates one example of a configuration of a frame according to Embodiment 4;

FIG. 33 illustrates one example of a configuration of a frame according to Embodiment 4;

FIG. 34 illustrates one example of a configuration of a frame according to Embodiment 4;

FIG. 35 illustrates one example of a configuration of a frame according to Embodiment 4;

FIG. 36 illustrates one example of a configuration of a frame according to Embodiment 4;

FIG. 37 illustrates one example of a configuration of a frame according to Embodiment 4;

FIG. 38 illustrates one example of a configuration of a control system according to Embodiment 5;

Figure 39:
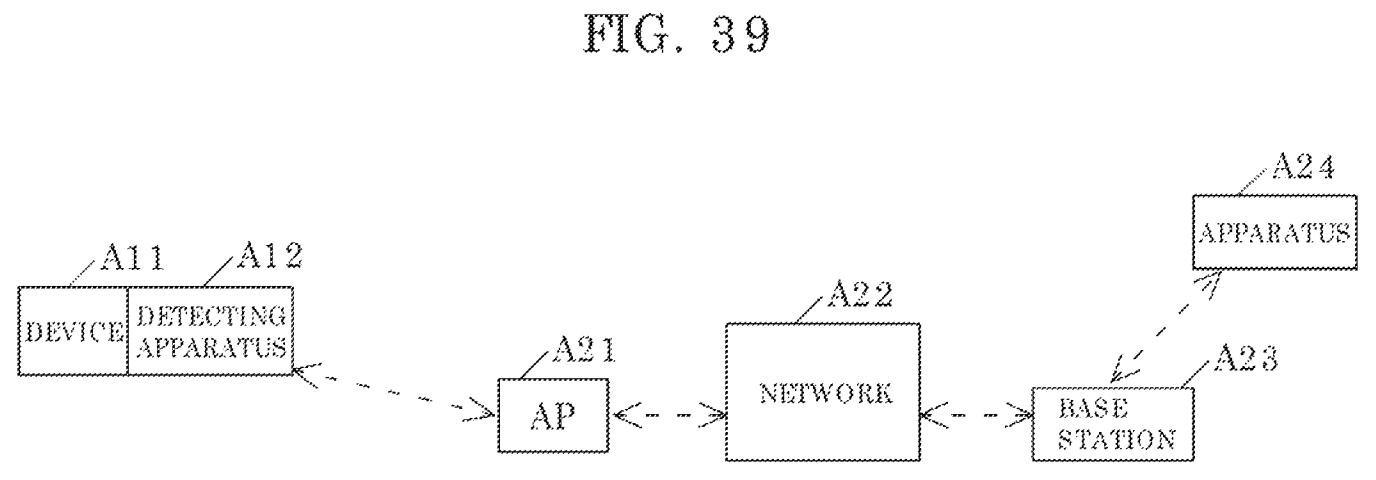

FIG. 39 illustrates one example of a configuration of the control system according to Embodiment 5;

FIG. 40 illustrates one example of an external appearance of the control system according to Embodiment 5;

FIG. 41 illustrates one example of processes performed by of the control system according to Embodiment 5;

FIG. 42 illustrates one example of a configuration of a transmitting apparatus according to Embodiment 6;

FIG. 43 illustrates one example of processes performed by the transmitting apparatus according to Embodiment 6;

FIG. 44 illustrates one example of a configuration of an apparatus according to Embodiment 7;

FIG. 45 illustrates one example of a relation between an apparatus and a person according to Embodiment 7;

FIG. 46 illustrates one example of a state between a person, a terminal, and an apparatus according to Embodiment 7;

FIG. 47 illustrates one example of a state between a person, a terminal, and an apparatus according to Embodiment 7;

FIG. 48 illustrates one example of a relation between an apparatus, a terminal, and a person according to Embodiment 7;

FIG. 49 illustrates one example of a relation between an apparatus, a terminal, and a person according to Embodiment 7;

FIG. 50 illustrates one example of a state of apparatuses according to Embodiment 8;

FIG. 51 illustrates a flow chart of an example of operations performed when an AP is first set up inside home according to Embodiment 8;

FIG. 52 illustrates a flow chart of an example of operations performed by the AP according to Embodiment 8;

FIG. 53 illustrates a flow chart of an example of operations performed by a system according to Embodiment 8;

FIG. 54 illustrates a flow chart of an example of operations performed by the AP and a cloud server according to Embodiment 8;

FIG. 55 illustrates one example of a state of apparatuses according to Embodiment 9;

FIG. 56 illustrates a flow chart of an example of operations performed when an AP is first set up inside home according to Embodiment 9;

FIG. 57 illustrates a flow chart of an example of operations performed by the AP according to Embodiment 9;

FIG. 58 illustrates a flow chart of an example of operations performed by a system according to Embodiment 9;

FIG. 59 illustrates a flow chart of an example of operations performed by the AP and a cloud server according to Embodiment 9;

FIG. 60 illustrates one example of a system configuration according to Embodiment 10;

FIG. 61 illustrates one example of a system configuration according to Embodiment 10;

Figure 62:
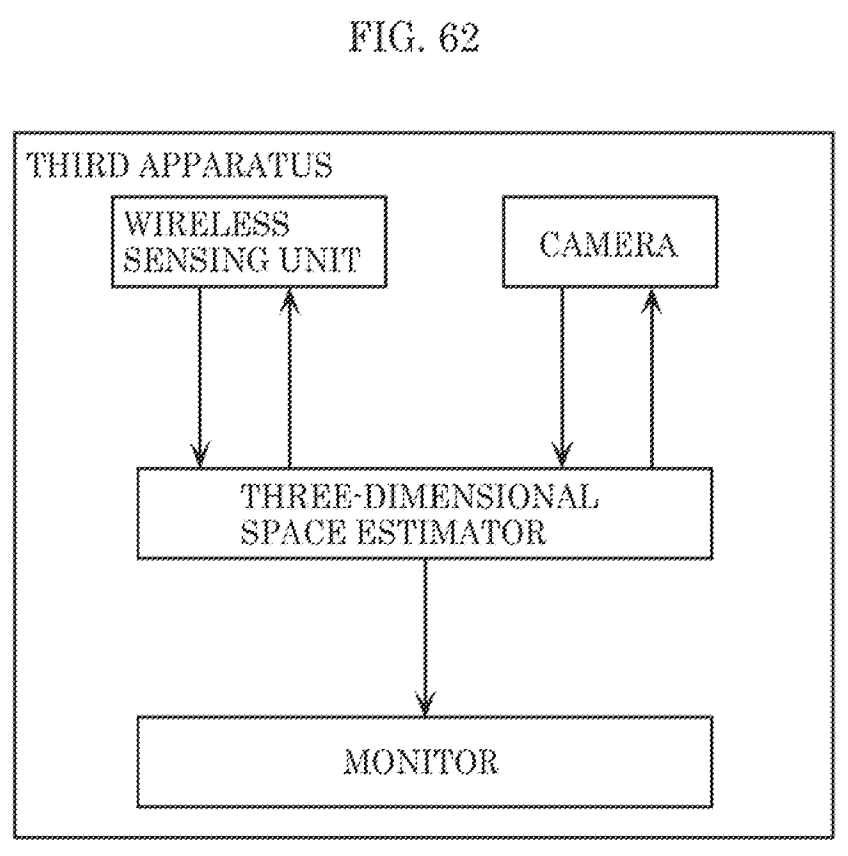

FIG. 62 illustrates one example of a system configuration according to Embodiment 10;

Figure 63:
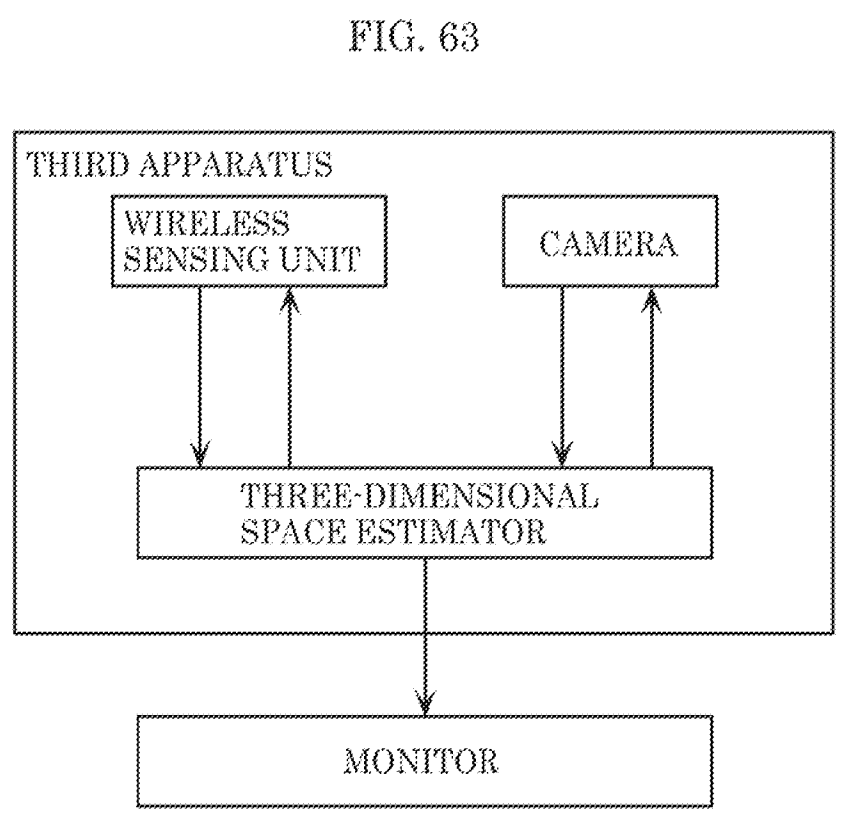

FIG. 63 illustrates one example of a system configuration according to Embodiment 10;

FIG. 64 illustrates a sensing method described in the embodiments;

Figure 65:
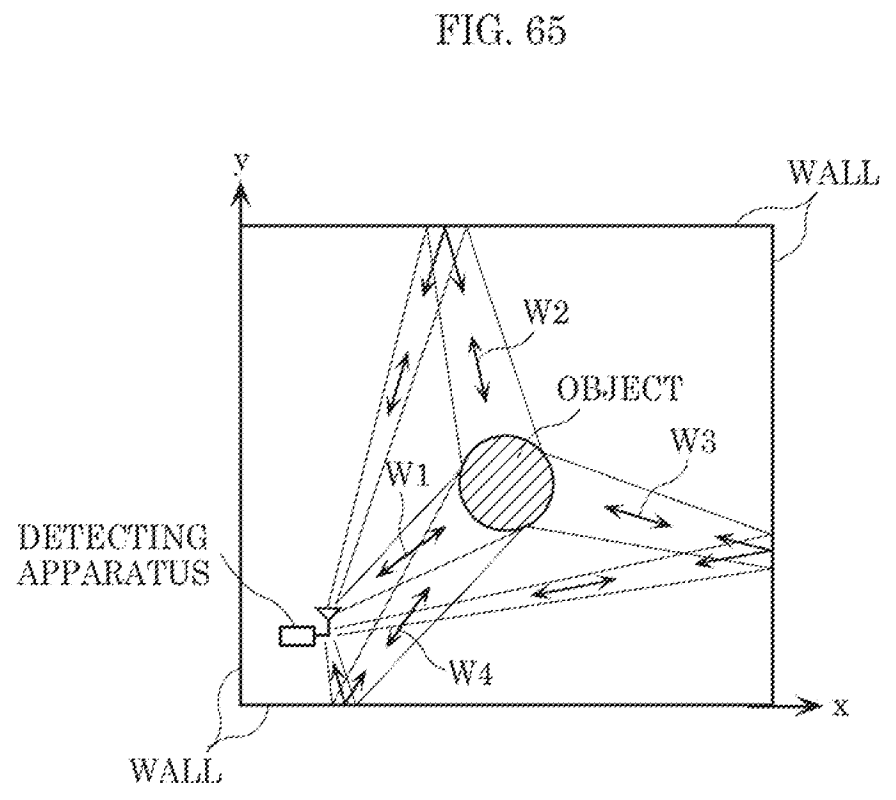

FIG. 65 illustrates a sensing method described in the embodiments;

FIG. 66 illustrates one example of a system configuration according to Embodiment 11;

FIG. 67 illustrates one example of a system configuration according to Embodiment 11;

FIG. 68 illustrates one example of a configuration of a first apparatus according to Embodiment 11;

Figure 69:
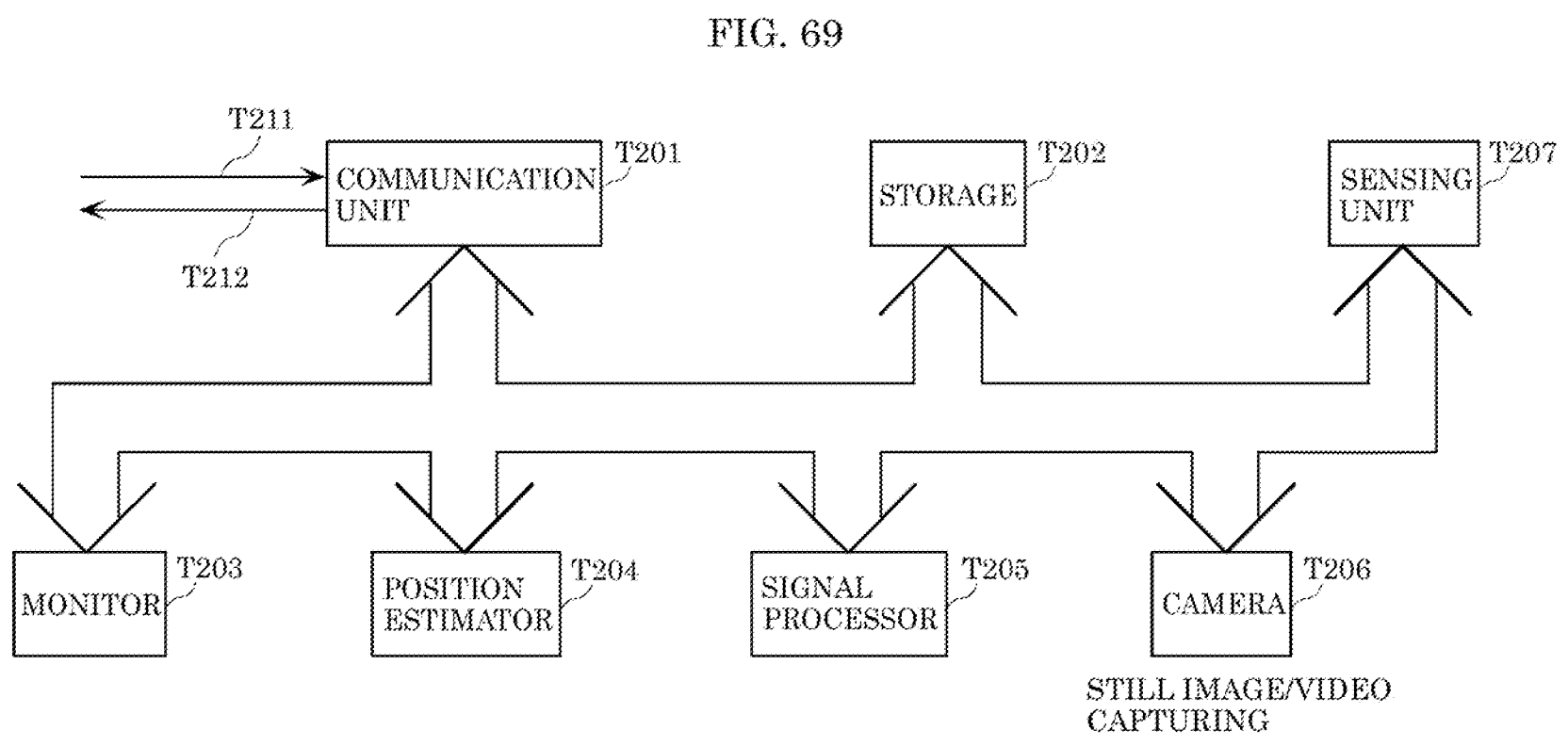

FIG. 69 illustrates one example of a configuration of a first apparatus according to Embodiment 11;

FIG. 70 illustrates a flow chart of one example of an operations performed by a first apparatus according to Embodiment 11;

FIG. 71 illustrates a flow chart of one example of an operations performed by a first apparatus according to Embodiment 11;

FIG. 72 illustrates a flow chart of one example of an operations performed by a first apparatus according to Embodiment 11;

FIG. 73 illustrates an example of a display displayed by a monitor according to Embodiment 11;

FIG. 74 illustrates an example of a display displayed by a monitor according to Embodiment 11;

FIG. 75 illustrates an example of a display displayed by a monitor according to Embodiment 11;

FIG. 76 illustrates an example of a display displayed by a monitor according to Embodiment 11;

FIG. 77 illustrates an example of a display displayed by a monitor according to Embodiment 11;

FIG. 78 illustrates an example of a display displayed by a monitor according to Embodiment 11;

FIG. 79 illustrates an example of a display displayed by a monitor according to Embodiment 11;

FIG. 80 illustrates an example of a display displayed by a monitor according to Embodiment 11;

FIG. 81 illustrates a flow chart of one example of an operations performed by a first apparatus according to Embodiment 11;

FIG. 82 illustrates a flow chart of one example of an operations performed by a first apparatus according to Embodiment 11;

FIG. 83 illustrates an example of a display displayed by a monitor according to Embodiment 11;

FIG. 84 illustrates an example of a display displayed by a monitor according to Embodiment 11;

FIG. 85 illustrates an example of a display displayed by a monitor according to Embodiment 11;

FIG. 86 illustrates an example of a display displayed by a monitor according to Embodiment 11;

FIG. 87 illustrates an example of a display displayed by a monitor according to Embodiment 11;

FIG. 88 illustrates an example of a display displayed by a monitor according to Embodiment 11;

FIG. 89 illustrates an example of a display displayed by a monitor according to Embodiment 11;

FIG. 90 illustrates an example of a display displayed by a monitor according to Embodiment 11;

FIG. 91 illustrates an example of a display displayed by a monitor according to Embodiment 11;

FIG. 92 illustrates an example of a display displayed by a monitor according to Embodiment 11;

FIG. 93 illustrates an example of a display displayed by a monitor according to Embodiment 11;

FIG. 94 illustrates an example of a display displayed by a monitor according to Embodiment 11;

FIG. 95 illustrates an example of a display displayed by a monitor according to Embodiment 11;

FIG. 96 illustrates an example of a display displayed by a monitor according to Embodiment 11;

FIG. 97 illustrates an example of a display displayed by a monitor according to Embodiment 11;

FIG. 98 illustrates an example of a display displayed by a monitor according to Embodiment 11;

FIG. 99 illustrates an example of a display displayed by a monitor according to Embodiment 11;

FIG. 100 illustrates an example of a display displayed by a monitor according to Embodiment 11;

Figure 101:
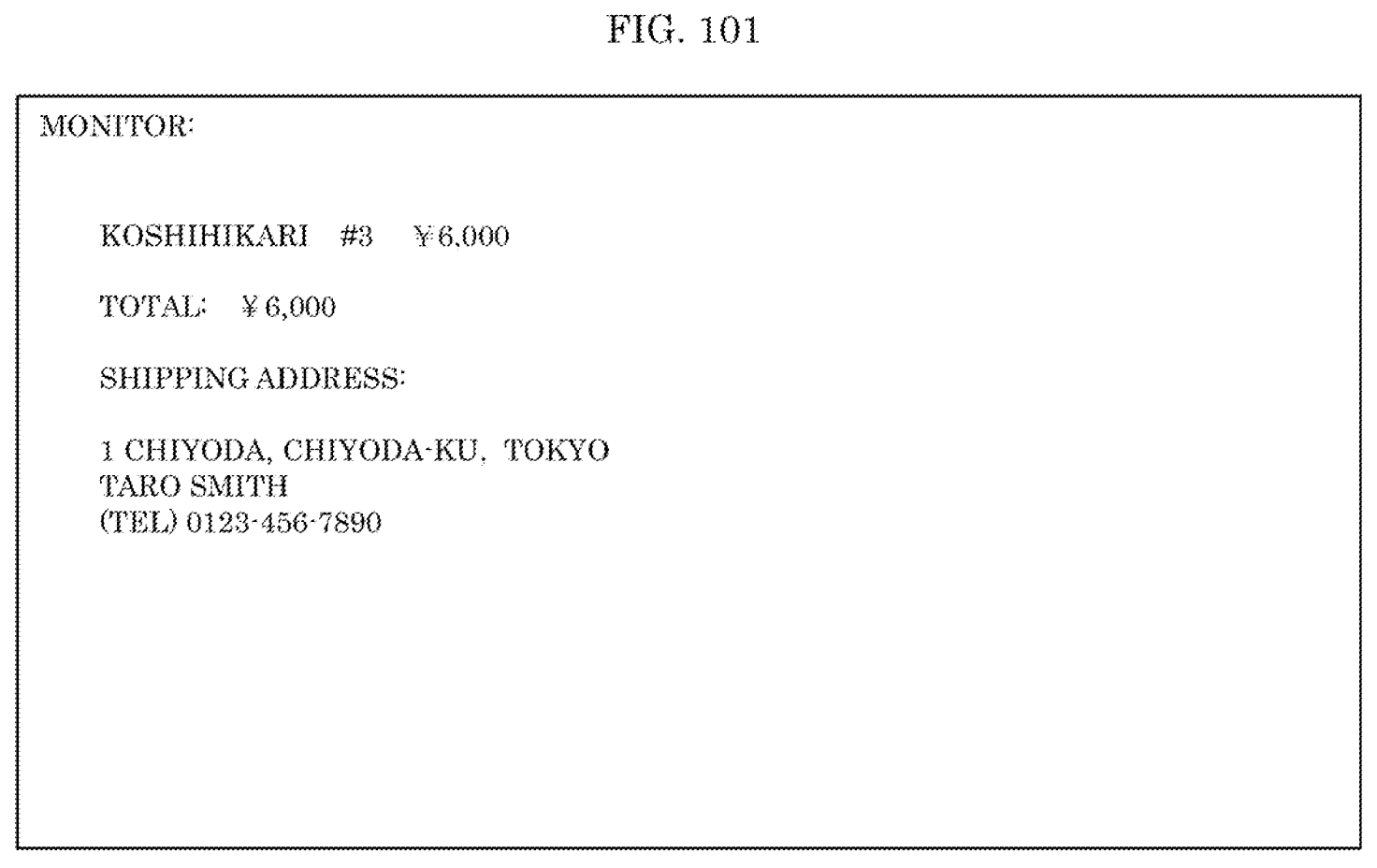

FIG. 101 illustrates an example of a display displayed by a monitor according to Embodiment 11;

FIG. 102 illustrates an apparatus that performs communication with a second apparatus according to Embodiment 12;

FIG. 103 illustrates an example of a display displayed by a monitor according to Embodiment 12;

FIG. 104 illustrates an example of a display displayed by a monitor according to Embodiment 12;

FIG. 105 illustrates an example of a map according to Embodiment 13;

FIG. 106 illustrates an example of a map according to Embodiment 13;

Figure 107:
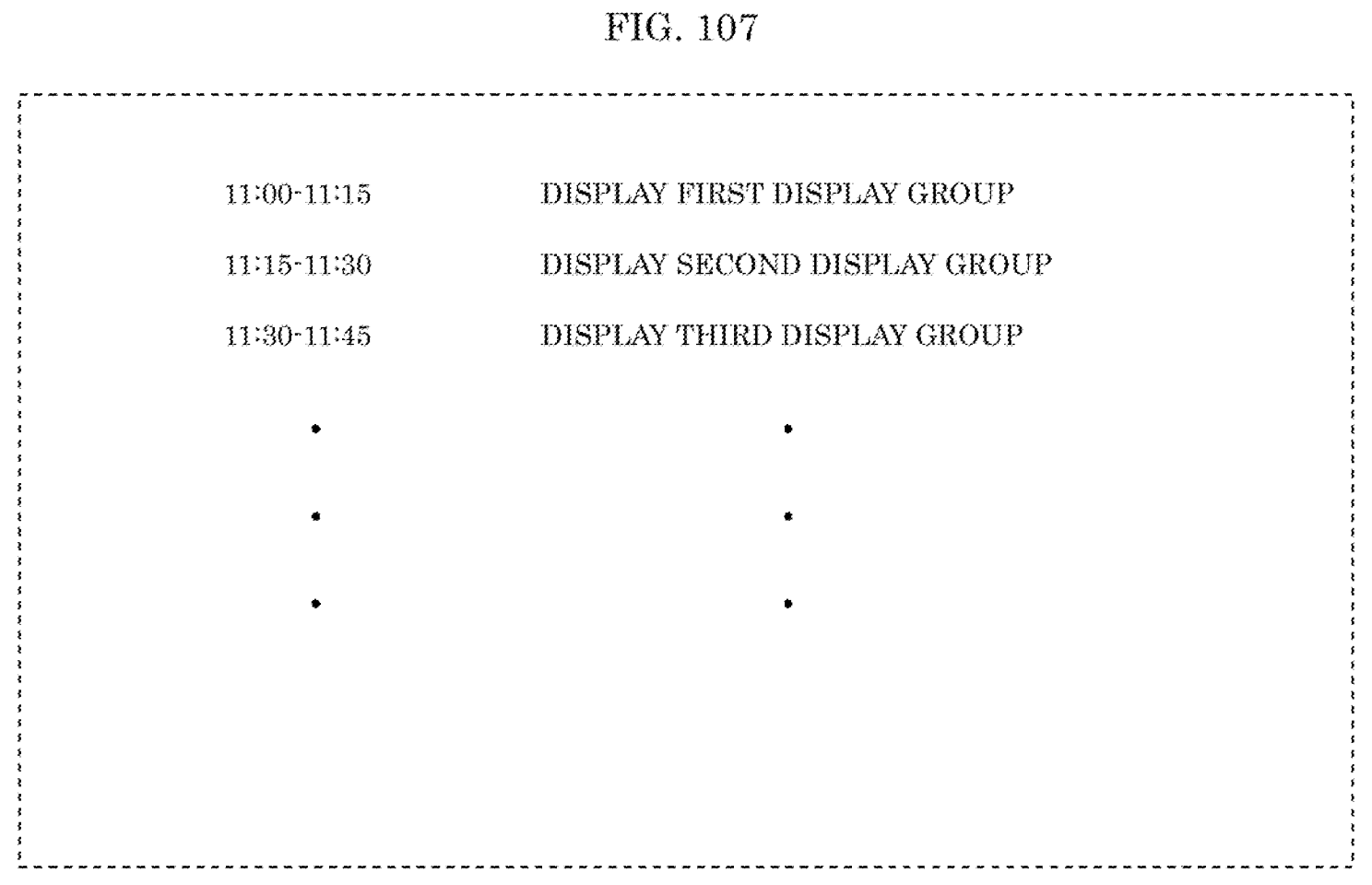

FIG. 107 illustrates an example of how the display is switched according to Embodiment 13;

FIG. 108 illustrates an example of how the display is switched according to Embodiment 13;

Figure 109:
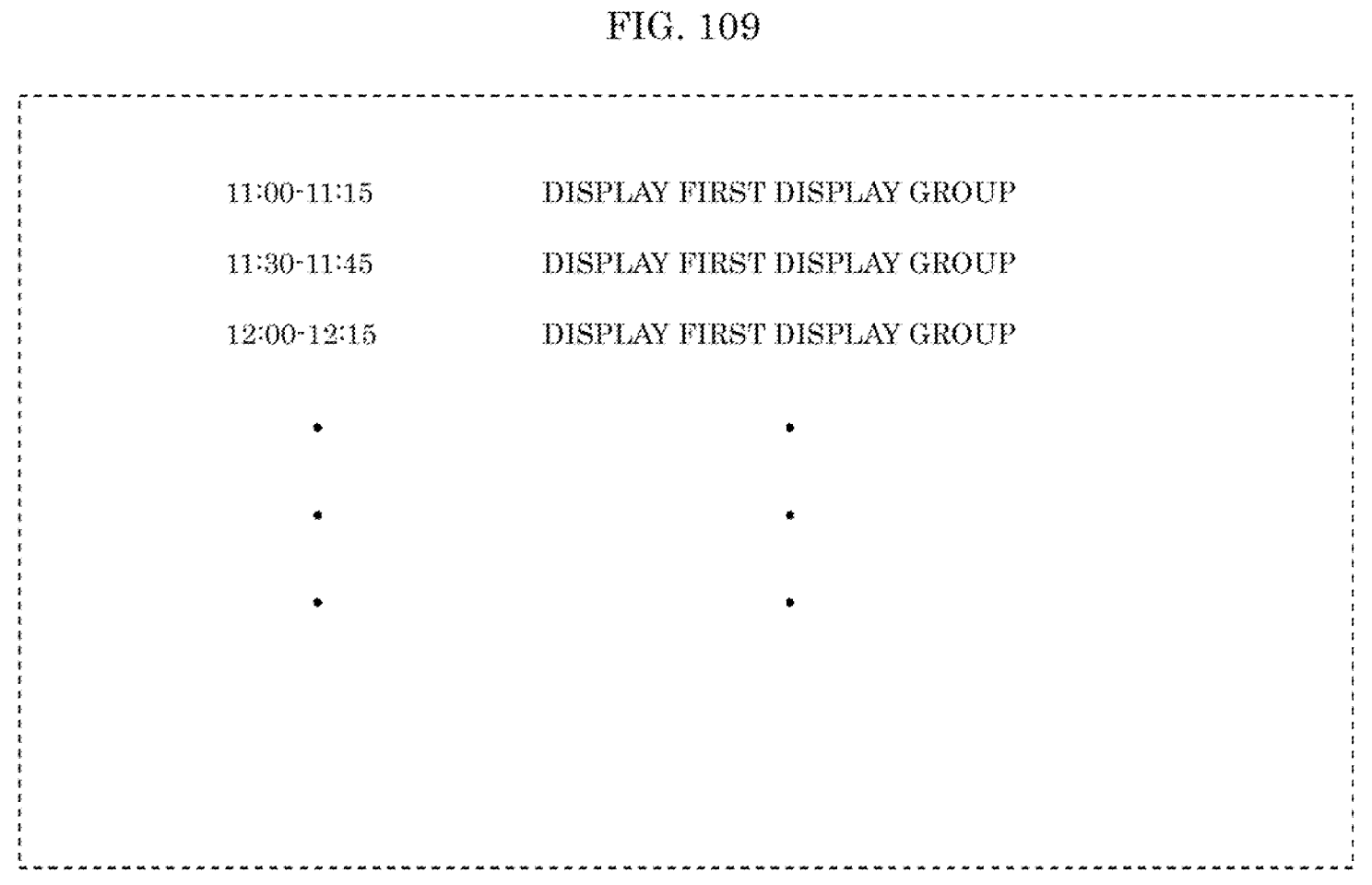

FIG. 109 illustrates an example of how the display is switched according to Embodiment 13;

Figure 110:
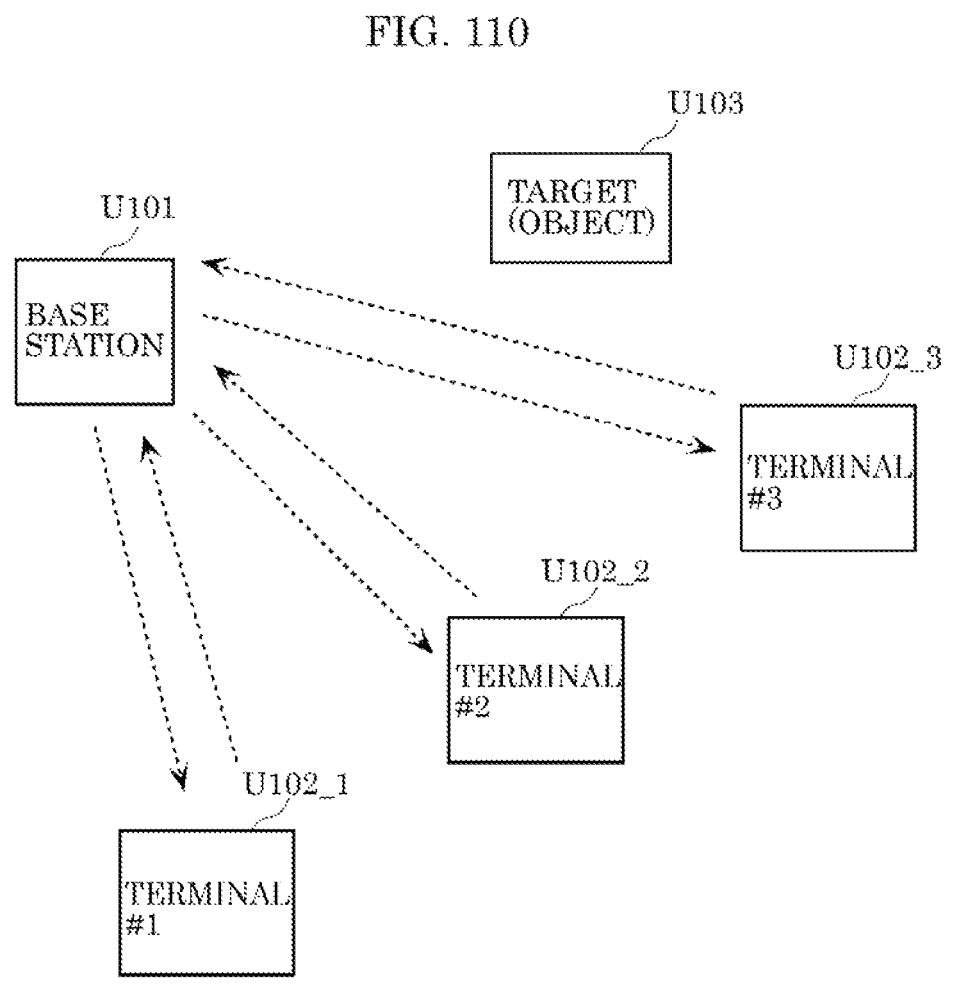

FIG. 110 illustrates one example of a system configuration according to Embodiment 14;

FIG. 111 illustrates an example of a transmission state according to Embodiment 14;

Figure 112:
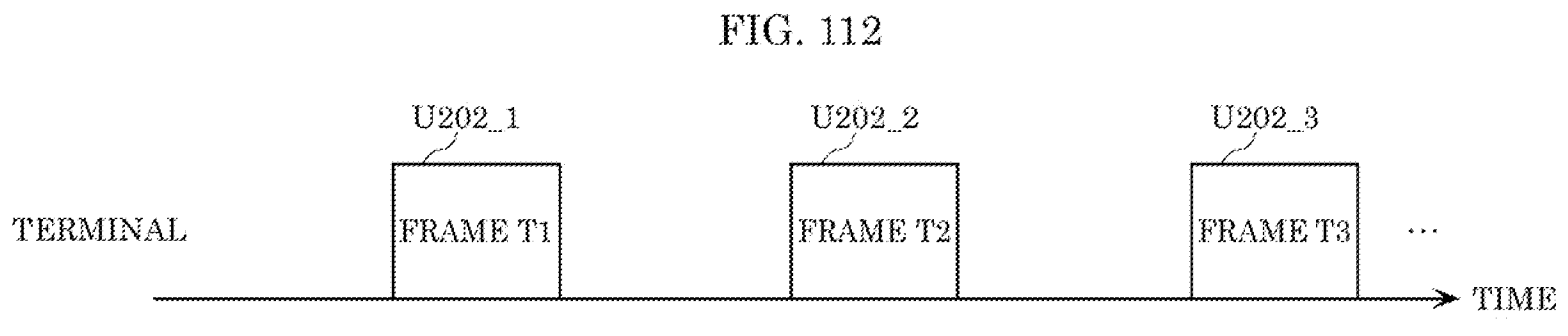

FIG. 112 illustrates an example of a transmission state according to Embodiment 14;

Figure 113:
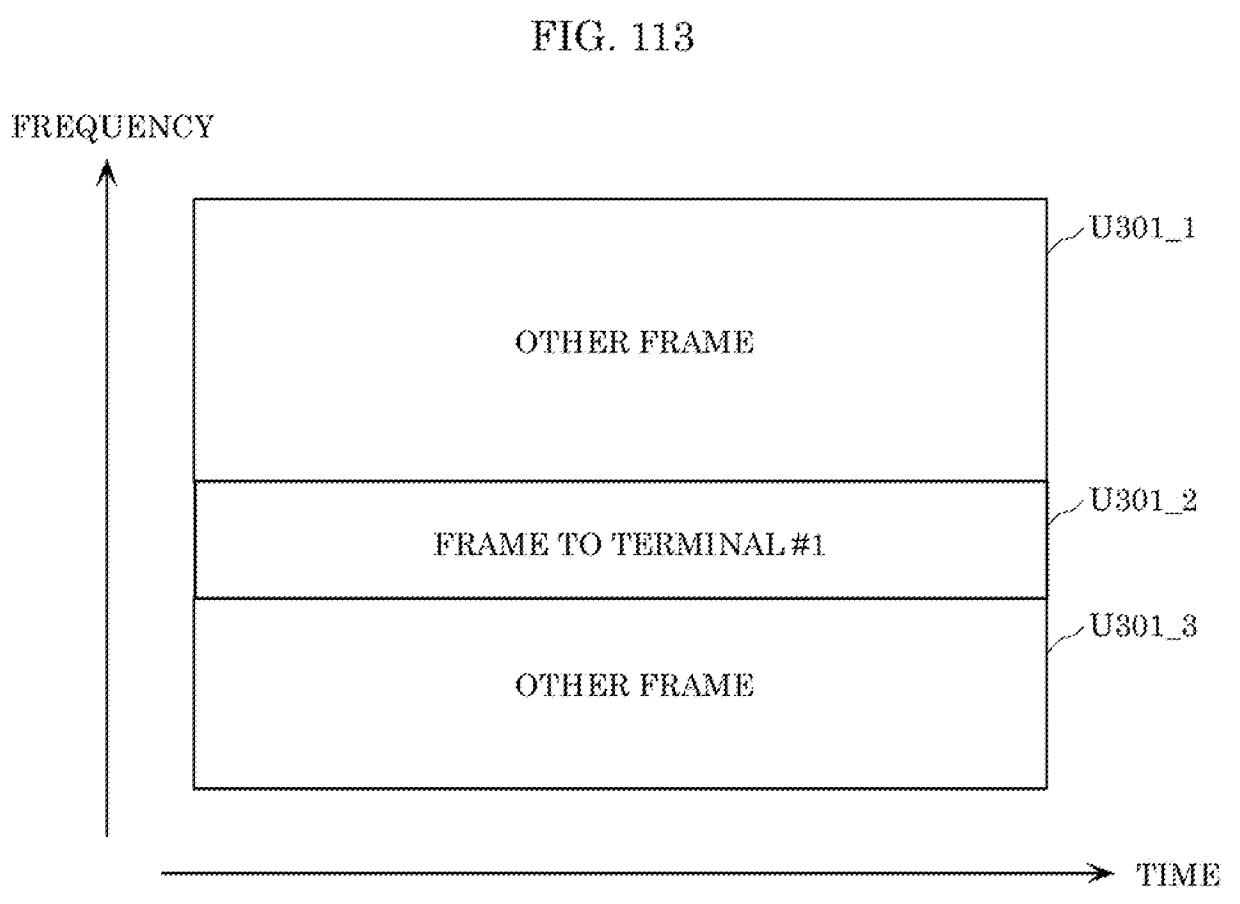

FIG. 113 illustrates an example of a configuration of a frame according to Embodiment 14;

Figure 114:
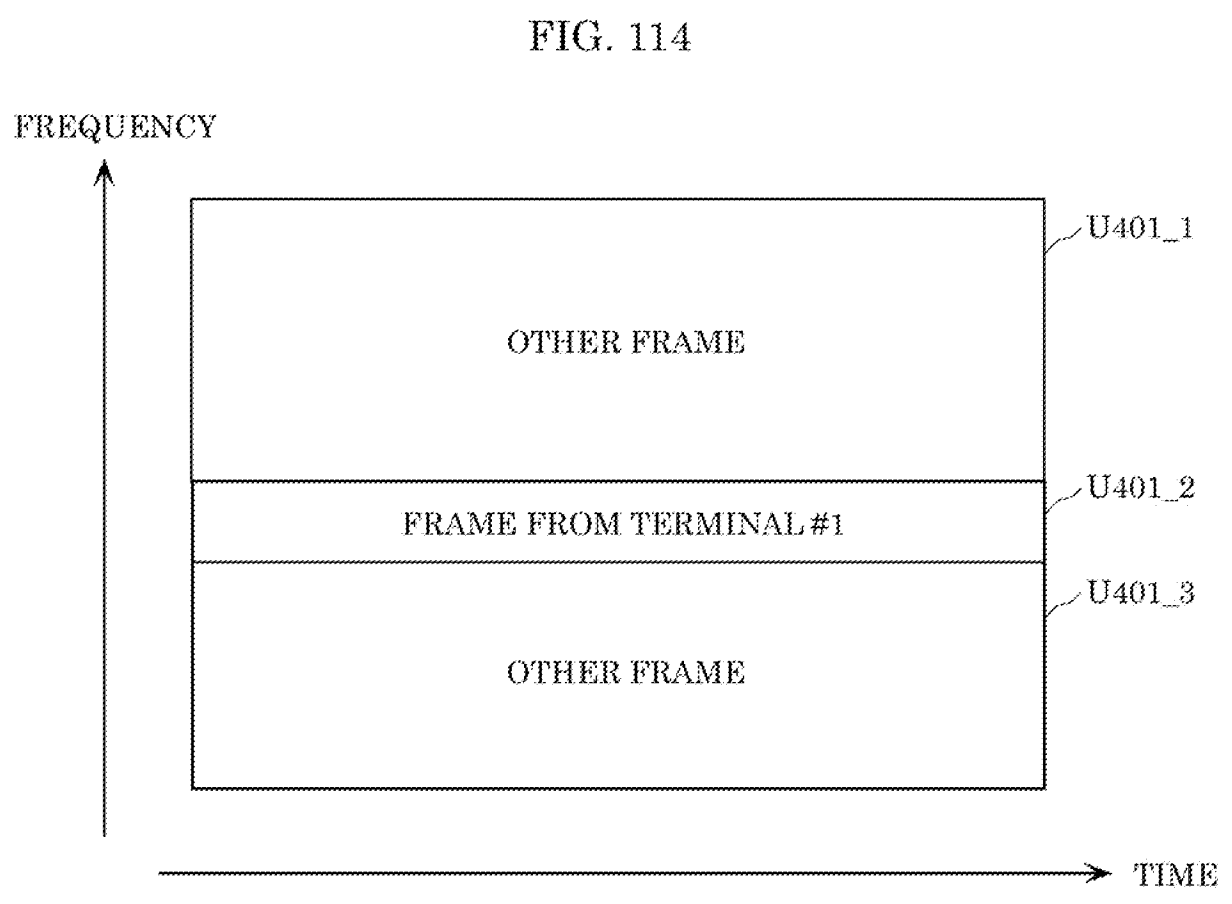

FIG. 114 illustrates an example of a configuration of a frame according to Embodiment 14;

FIG. 115 illustrates an example of a configuration of a frame according to Embodiment 14;

Figure 116:
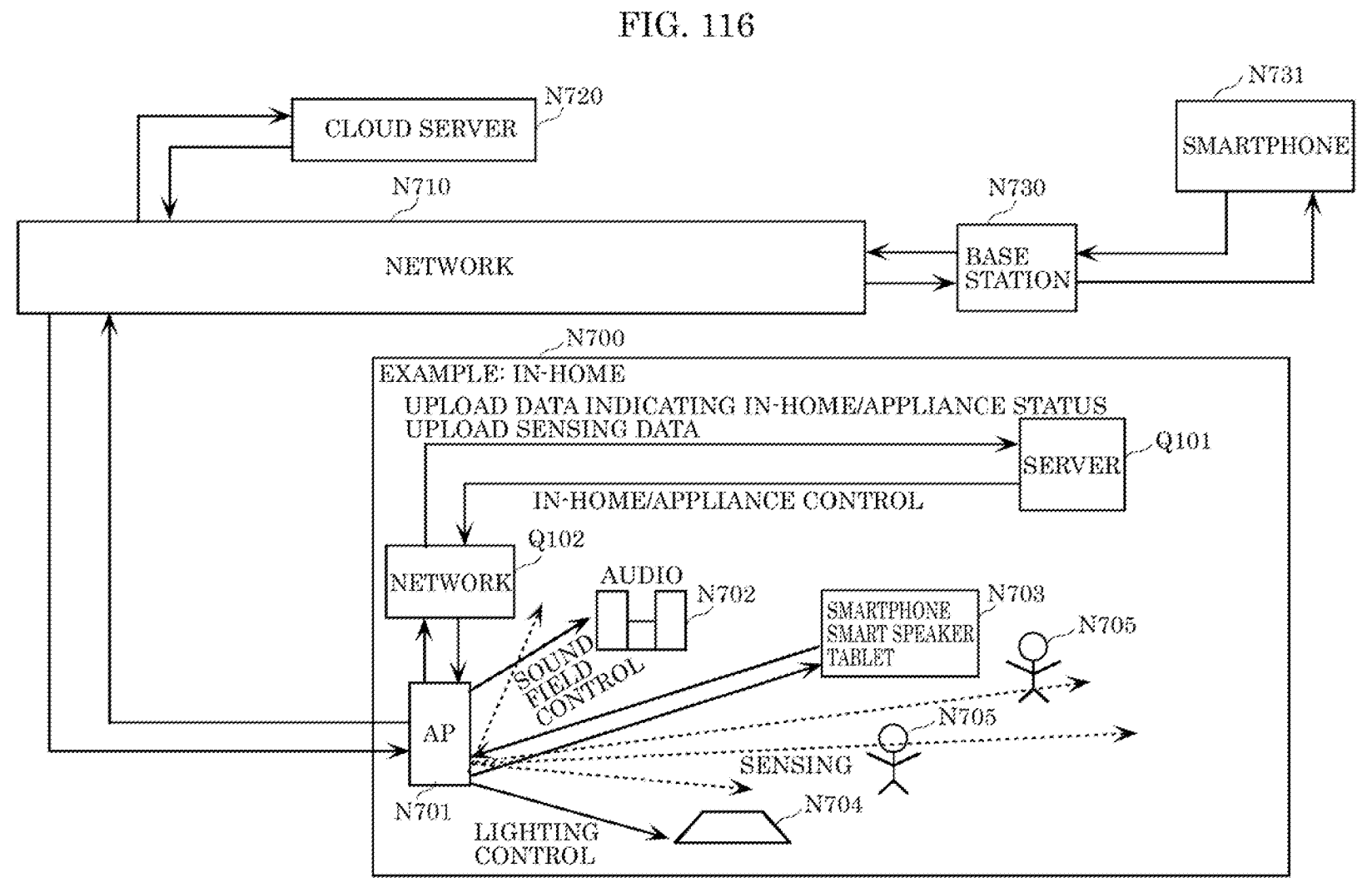

FIG. 116 illustrates an example of a state of an apparatus according to Embodiment 15;

FIG. 117 illustrates an example of a state of an apparatus according to Embodiment 17;

FIG. 118 illustrates an example of a state of an apparatus according to Embodiment 18;

FIG. 119 illustrates an example of a state of an apparatus according to Embodiment 19;

FIG. 120 illustrates an example of a sensing system or a sensing and communication system according to Embodiment 20;

FIG. 121 illustrates an example of a configuration of information related to sensing capability according to Embodiment 20;

FIG. 122 illustrates an example of operations performed by an apparatus and a target according to Embodiment 20;

FIG. 123 illustrates an example of operations performed by an apparatus and a target according to Embodiment 20;

Figure 124B:
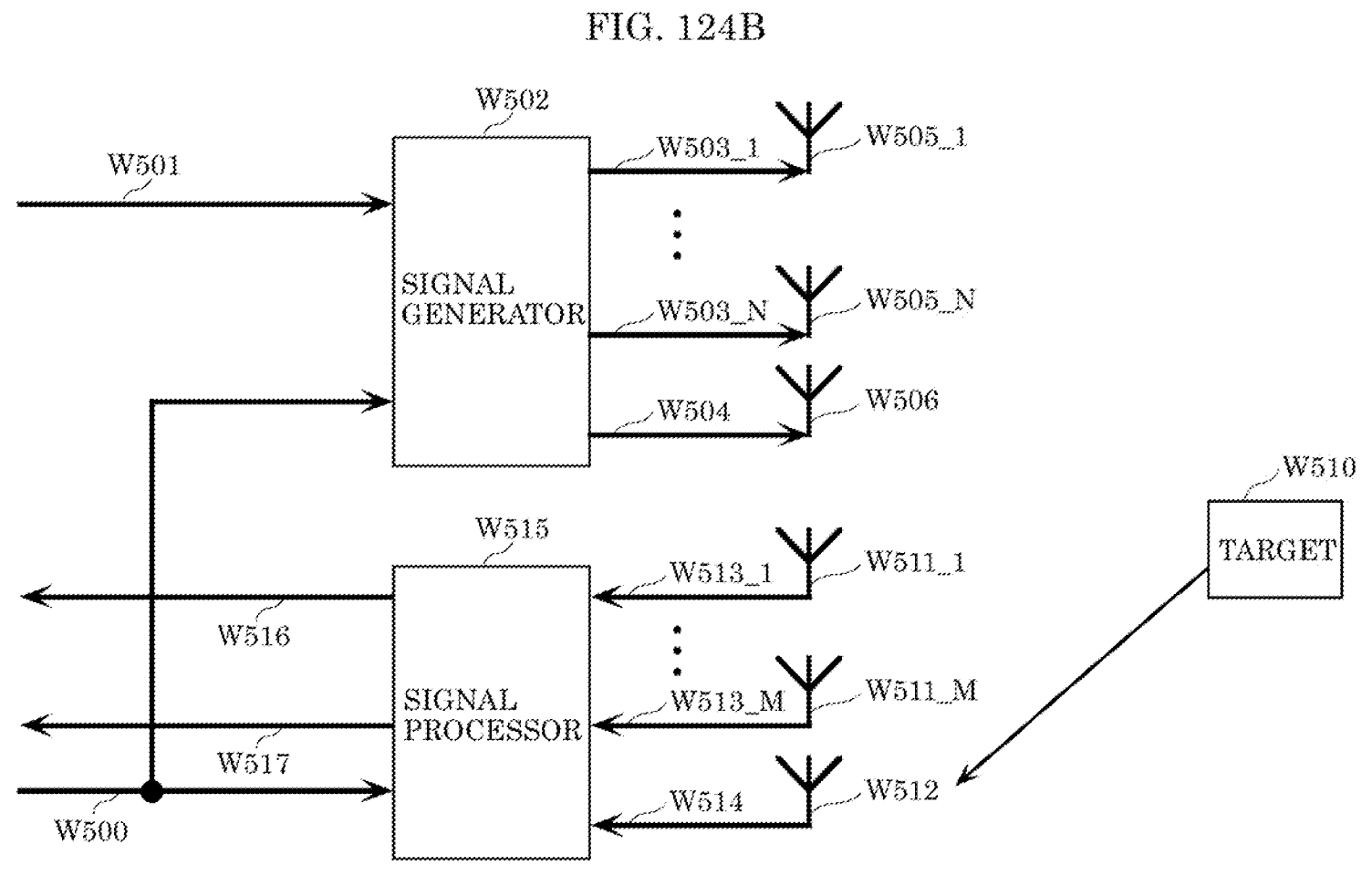

FIG. 124A illustrates an example of operations performed by an apparatus and a target according to Embodiment 20;

FIG. 124B illustrates an example of operations performed by an apparatus and a target according to Embodiment 20;

Figure 125A:
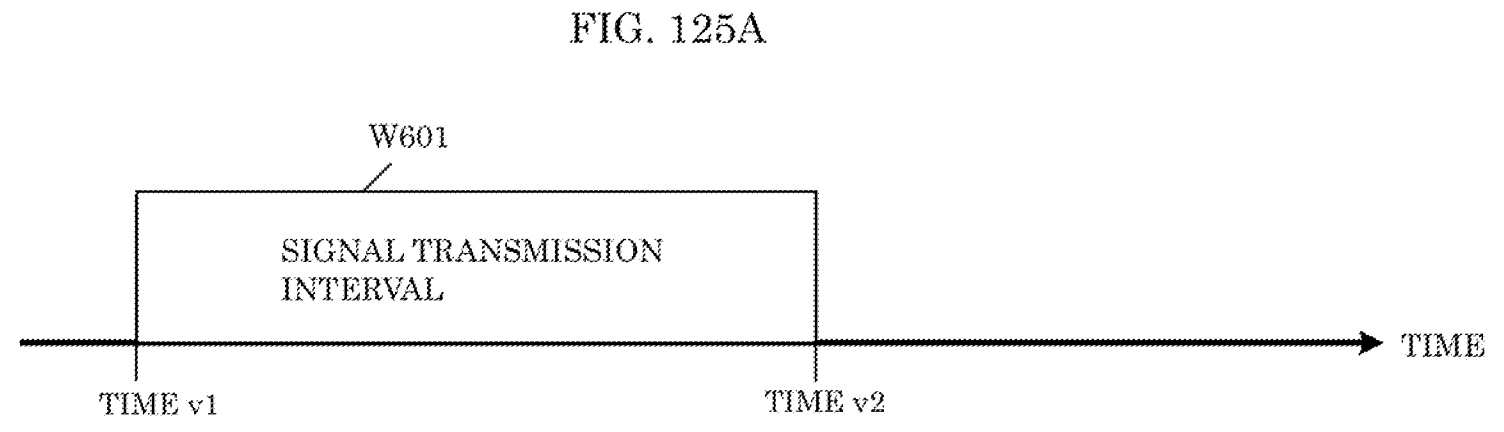

FIG. 125A illustrates an example of a state when an apparatus is performing operations for sensing according to Embodiment 20;

FIG. 125B illustrates an example of a state when an apparatus is performing operations for sensing according to Embodiment 20;

Figure 126:
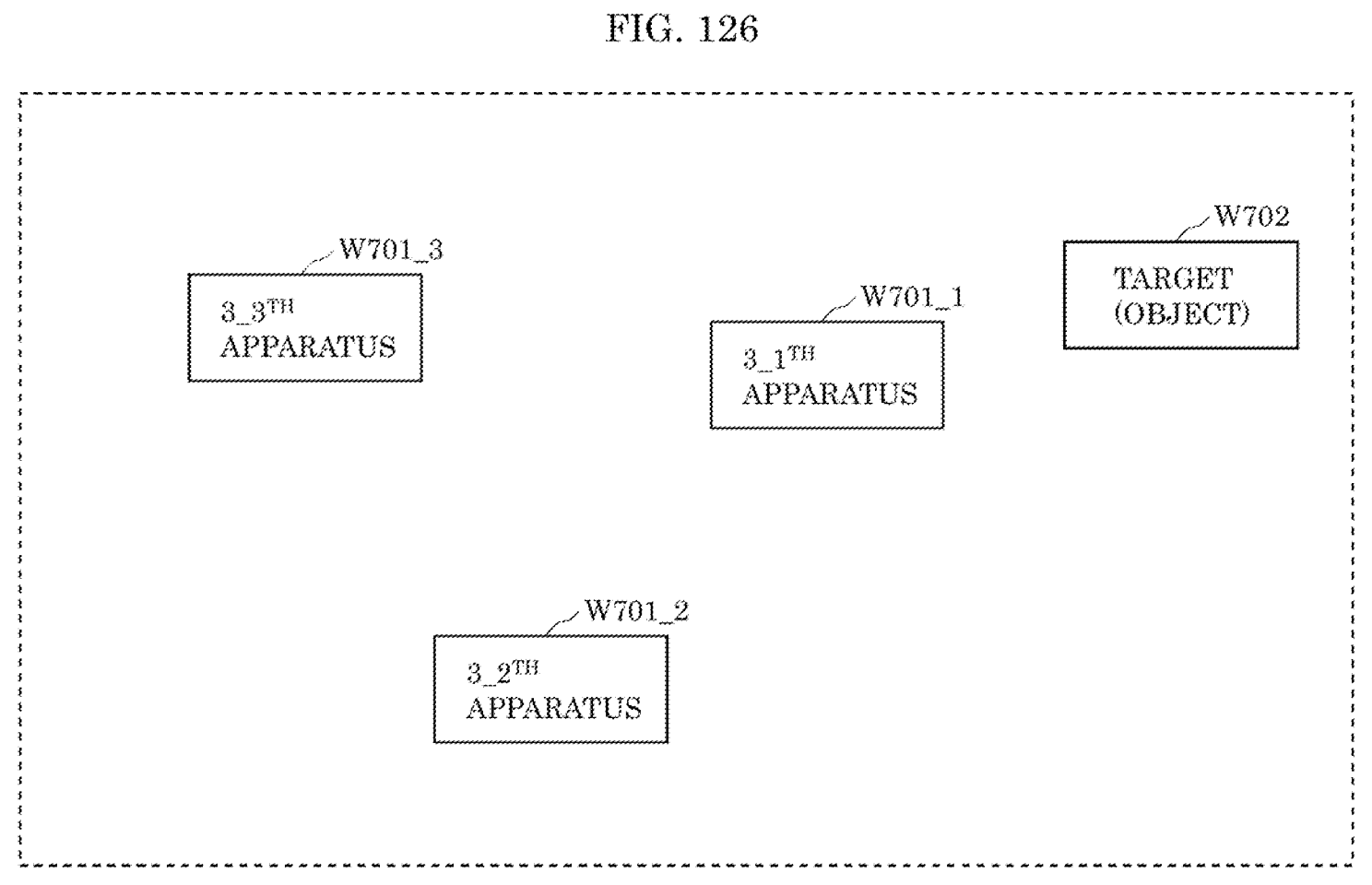

FIG. 126 illustrates one example of the status of sensing and a communication system according to Embodiment 21;

FIG. 127 illustrates an example of a configuration of a signal transmitted by an apparatus according to Embodiment 21;

FIG. 128A illustrates one example of a configuration of a control information symbol according to Embodiment 21;

FIG. 128B illustrates one example of a configuration of a symbol for sensing according to Embodiment 21;

Figure 129:
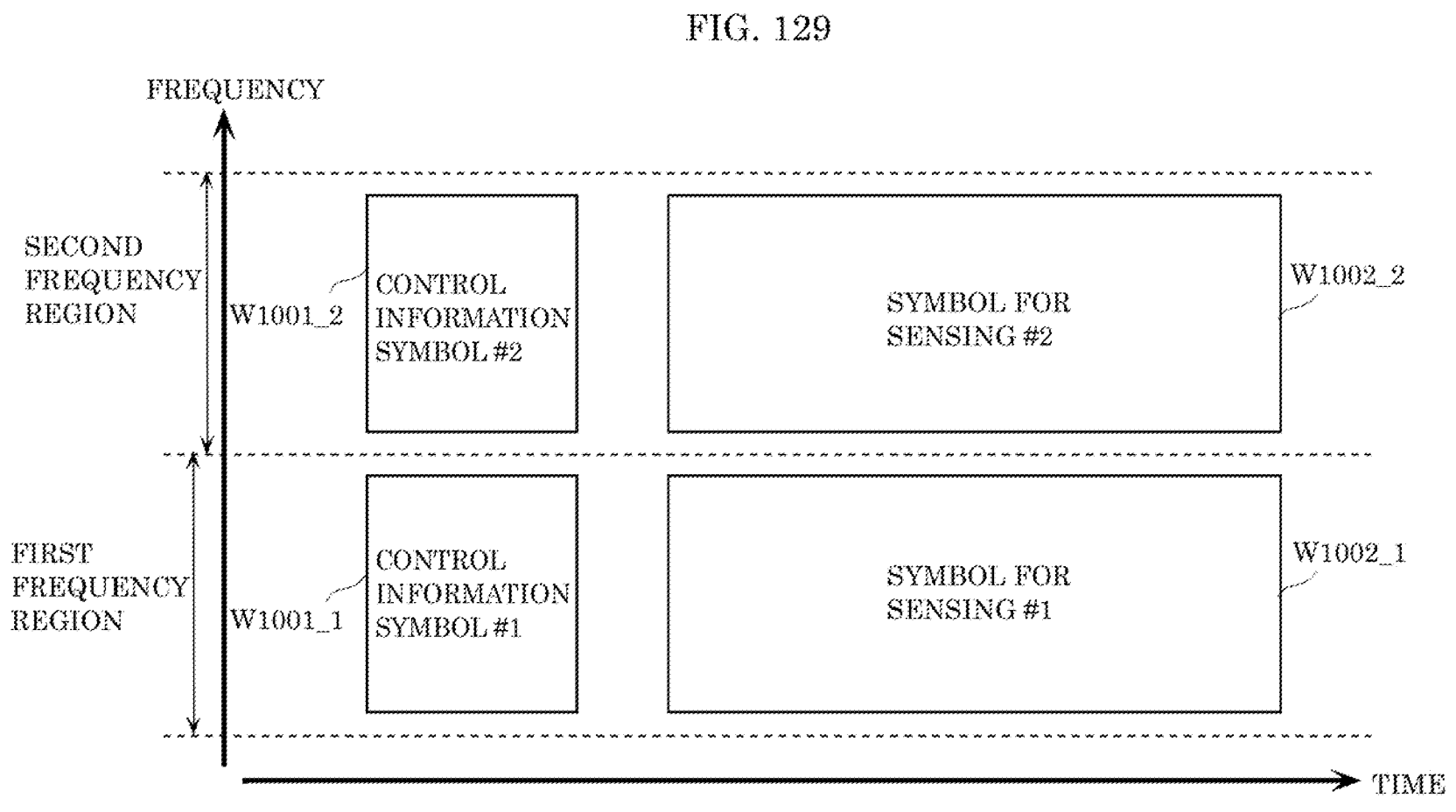

FIG. 129 illustrates an example of a configuration of a signal transmitted by an apparatus according to Embodiment 21;

FIG. 130 illustrates an example of a configuration of a signal transmitted by an apparatus according to Embodiment 21;

FIG. 131 illustrates one example of a configuration of an apparatus and a target according to Embodiment 21;

FIG. 132 illustrates an example of a configuration related to a transmit antenna according to Embodiment 21;

FIG. 133 illustrates a specific example of a frame included in a signal for sensing transmitted by an apparatus according to Embodiment 21;

FIG. 134 illustrates one example of a configuration of a signal for sensing transmitted using an antenna according to Embodiment 21;

FIG. 135 illustrates an example of a configuration of a signal for sensing transmitted using an antenna and a parameter according to Embodiment 21;

FIG. 136 illustrates one example of a system configuration according to Embodiment 22;

FIG. 137A illustrates one example of operations performed when charging a vehicle according to Embodiment 22;

FIG. 137B illustrates one example of operations performed when charging a vehicle according to Embodiment 22;

FIG. 137C illustrates one example of operations performed when charging a vehicle according to Embodiment 22;

FIG. 137D illustrates one example of operations performed when charging a vehicle according to Embodiment 22;

FIG. 138A illustrates one example of operations for ending charging of a vehicle according to Embodiment 22;

FIG. 138B illustrates one example of operations for ending charging of a vehicle according to Embodiment 22;

FIG. 139 illustrates one example of a system configuration according to Embodiment 22;

Figure 140:
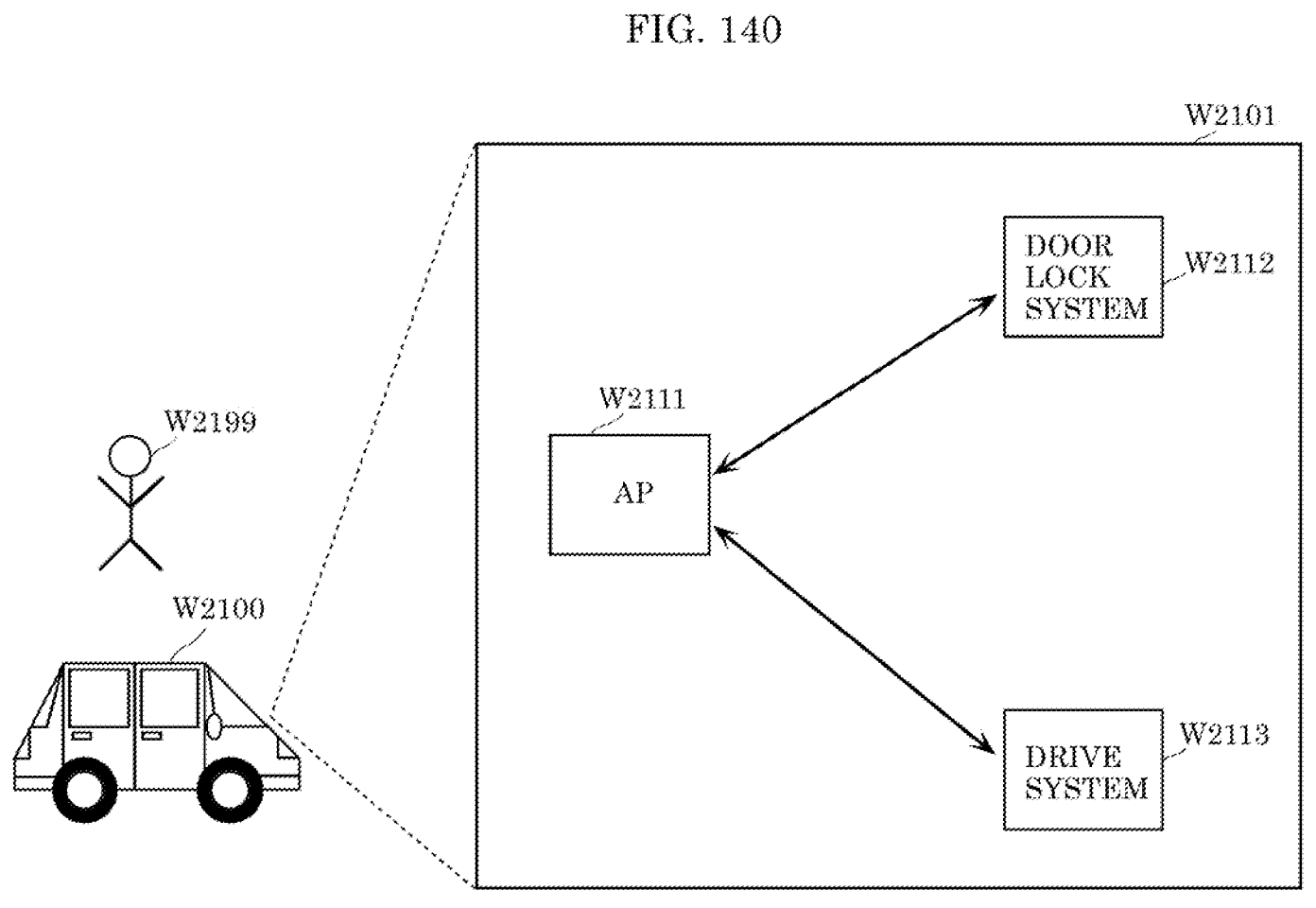

FIG. 140 illustrates one example of a system configuration according to Embodiment 23;

FIG. 141A illustrates one example of operations for unlocking the doors of a vehicle according to Embodiment 23;

FIG. 141B illustrates one example of operations for unlocking the doors of a vehicle according to Embodiment 23;

Figure 142:
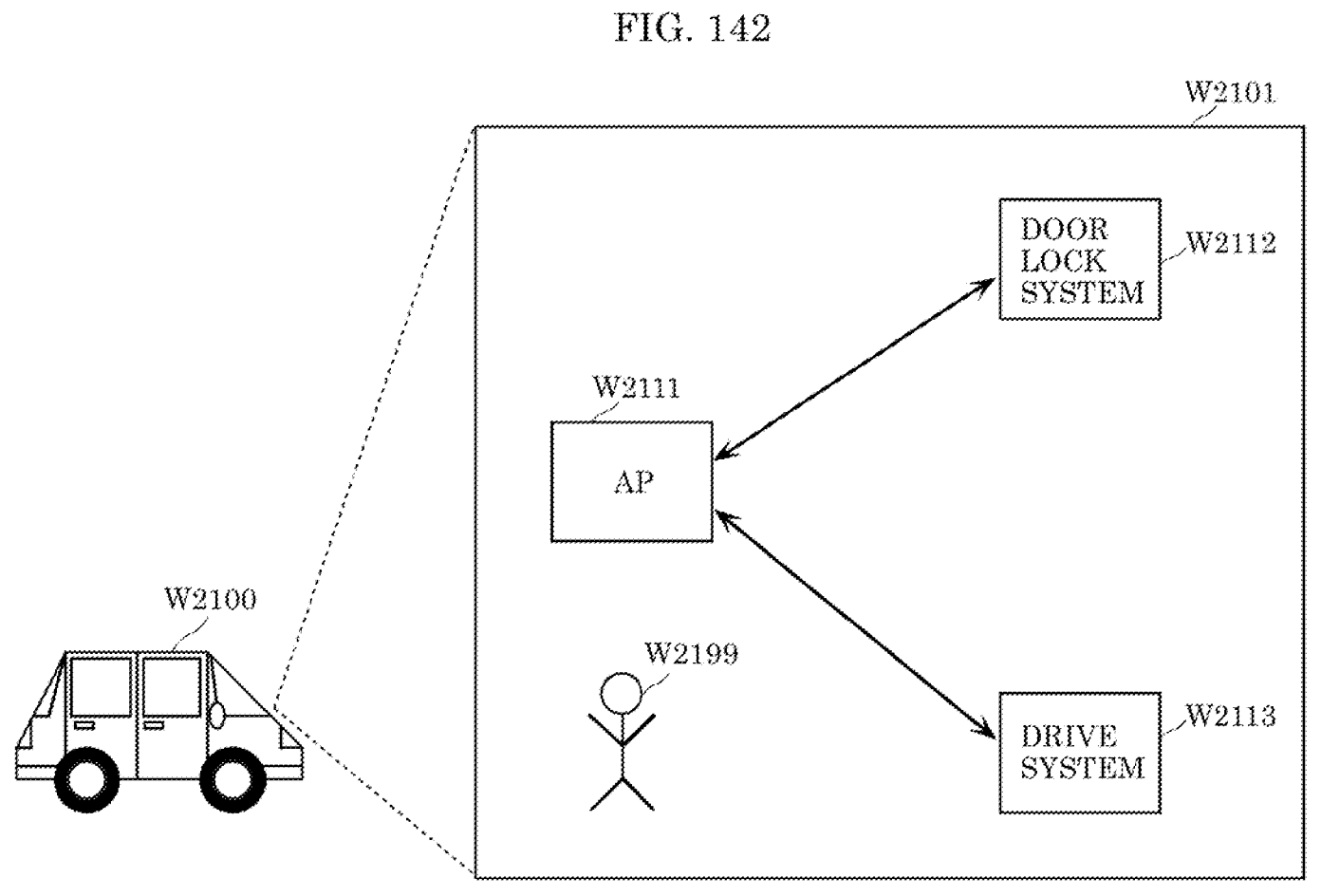

FIG. 142 illustrates one example of a system configuration according to Embodiment 23;

FIG. 143A illustrates one example for operating a drive system in a vehicle according to Embodiment 23;

FIG. 143B illustrates one example for operating a drive system in a vehicle according to Embodiment 23;

FIG. 144 illustrates an example of a configuration of a system according to Embodiment 24;

FIG. 145A illustrates an example of operations performed by apparatuses according to Embodiment 25;

FIG. 145B illustrates an example of operations performed by apparatuses according to Embodiment 25;

FIG. 146 illustrates an example of operations performed by apparatuses according to Embodiment 25;

FIG. 147 illustrates an example of a configuration of sensing-related information according to Embodiment 25;

Figure 148B:
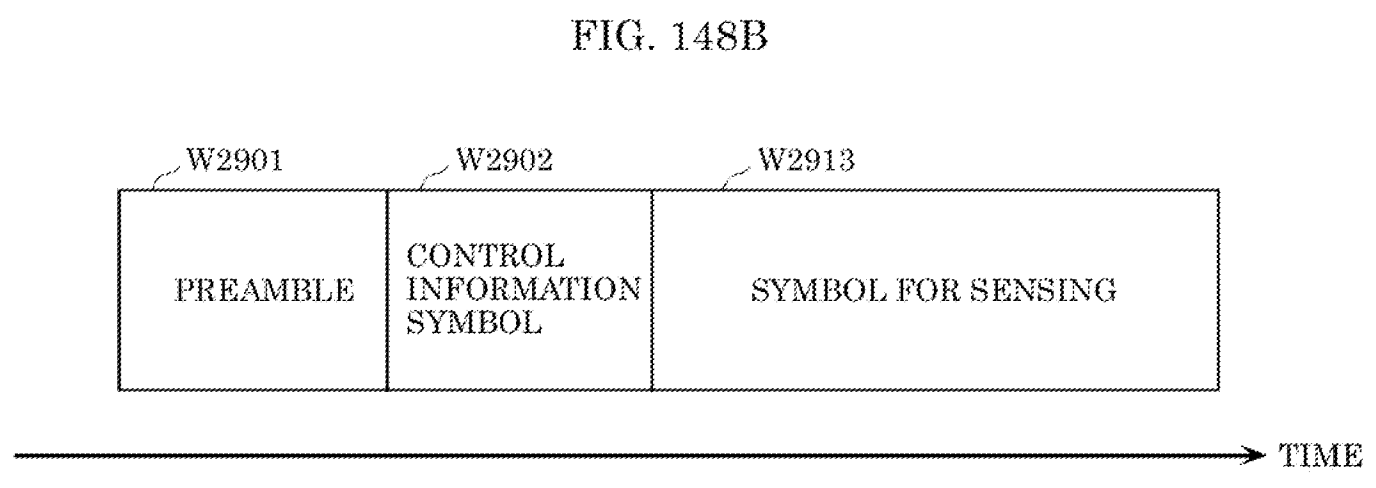

FIG. 148A illustrates an example of a frame according to Embodiment 25;

FIG. 148B illustrates an example of a frame according to Embodiment 25;

FIG. 149 illustrates an example of a system configuration according to Embodiment 26;

FIG. 150 illustrates an example of a configuration of an apparatus according to Embodiment 27;

FIG. 151A illustrates an example of a configuration of apparatuses according to Embodiment 27;

FIG. 151B illustrates an example of a configuration of apparatuses according to Embodiment 27;

FIG. 151C illustrates an example of a configuration of apparatuses according to Embodiment 27;

FIG. 151D illustrates an example of a configuration of apparatuses according to Embodiment 27;

FIG. 152A illustrates an example of a configuration of an apparatus according to Embodiment 27;

FIG. 152B illustrates an example of a configuration of an apparatus according to Embodiment 27;

FIG. 153A illustrates an example of a display according to Embodiment 27;

FIG. 153B illustrates an example of a display according to Embodiment 27;

FIG. 154A illustrates an example of a display according to Embodiment 27;

FIG. 154B illustrates an example of a display according to Embodiment 27;

FIG. 155 illustrates an example of a system configuration according to Embodiment 28;

FIG. 156A illustrates an example of regions of a target according to Embodiment 28;

FIG. 156B illustrates an example of transmission of signals for sensing according to Embodiment 28;

FIG. 156C illustrates an example of reception of signals for sensing according to Embodiment 28;

FIG. 156D illustrates an example of reception of signals for sensing according to Embodiment 28;

FIG. 157A illustrates an example of distances to regions according to Embodiment 28;

FIG. 157B illustrates an example of distances to regions according to Embodiment 28;

FIG. 157C illustrates an example of distances to regions according to Embodiment 28;

FIG. 157D illustrates an example of distances to regions according to Embodiment 28;

FIG. 158A illustrates an example regions of a target according to Embodiment 28;

FIG. 158B illustrates an example of transmission of signals for sensing according to Embodiment 28;

FIG. 158C illustrates an example of transmission of signals for sensing according to Embodiment 28;

Figure 159:
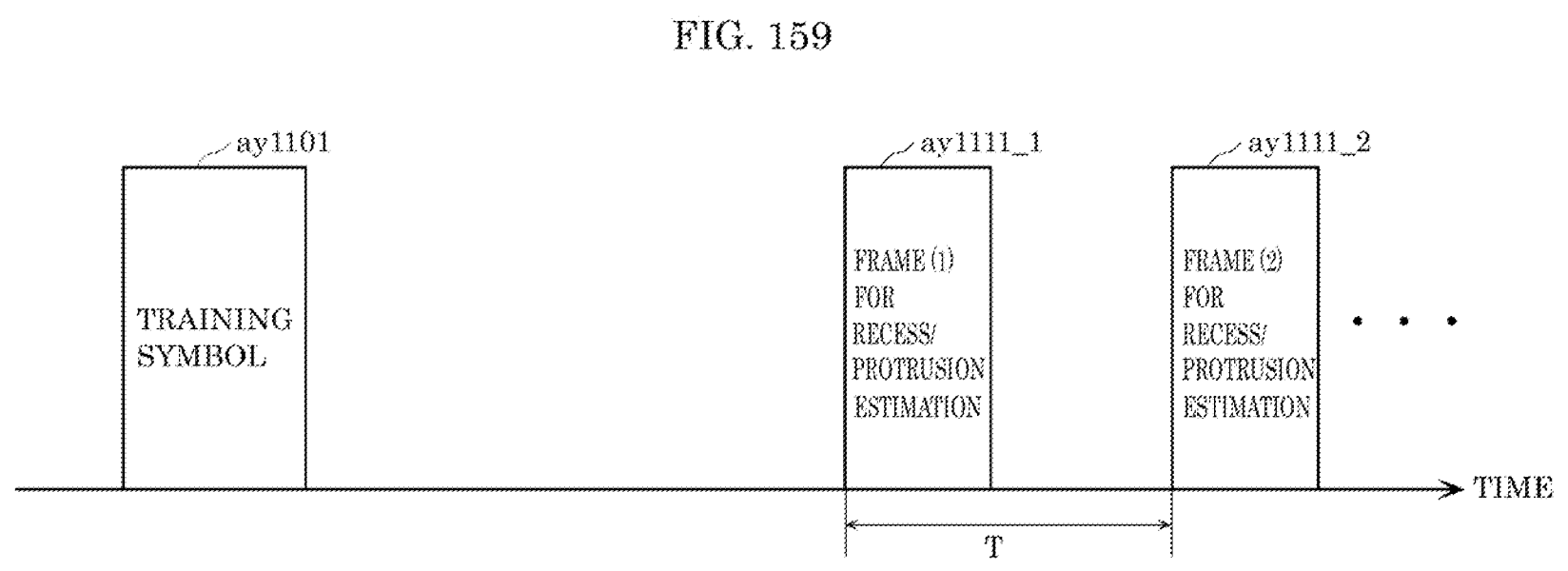

FIG. 159 illustrates an example of a signal transmitted by an apparatus according to Embodiment 28;

Figure 160A:
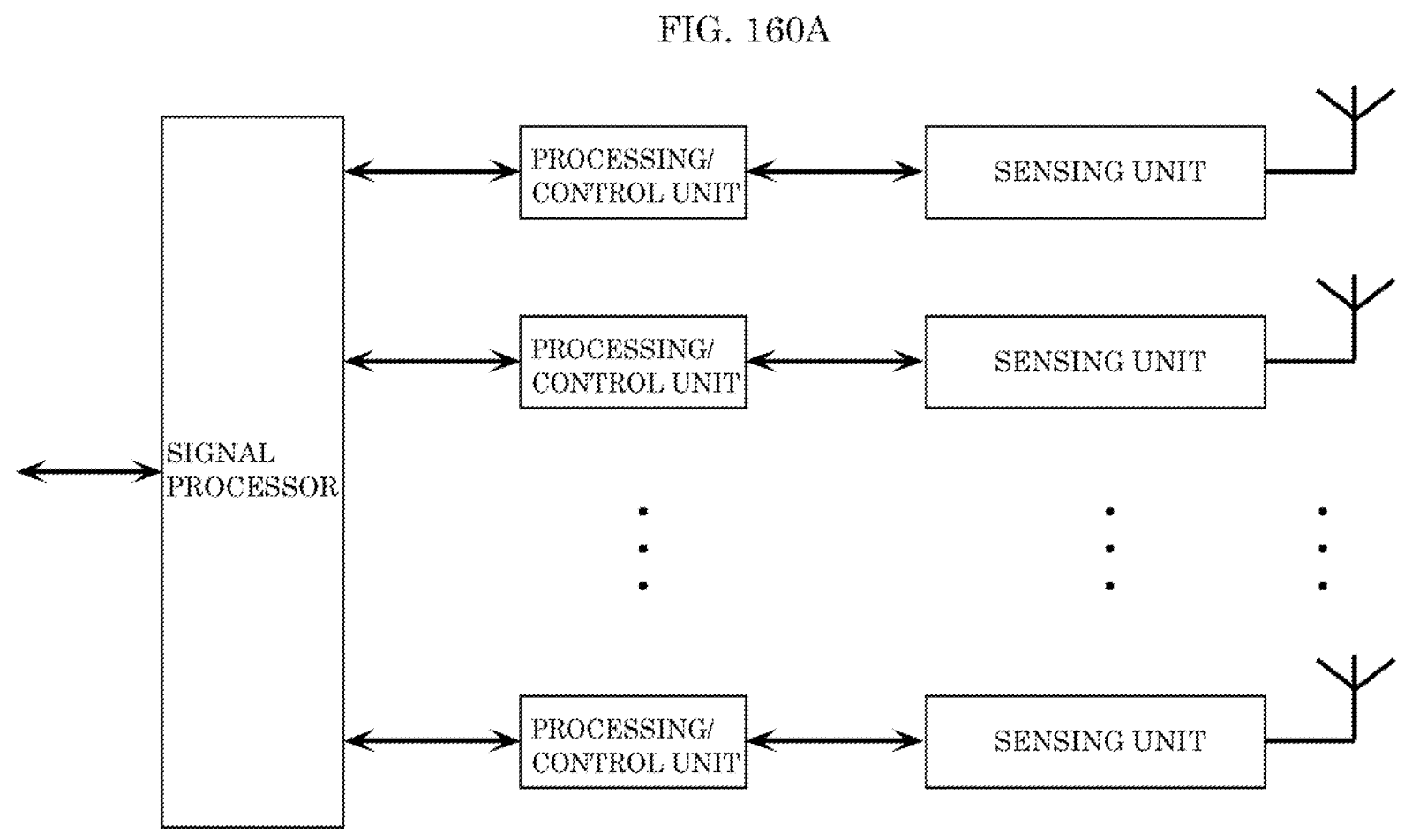
Figure 160B:
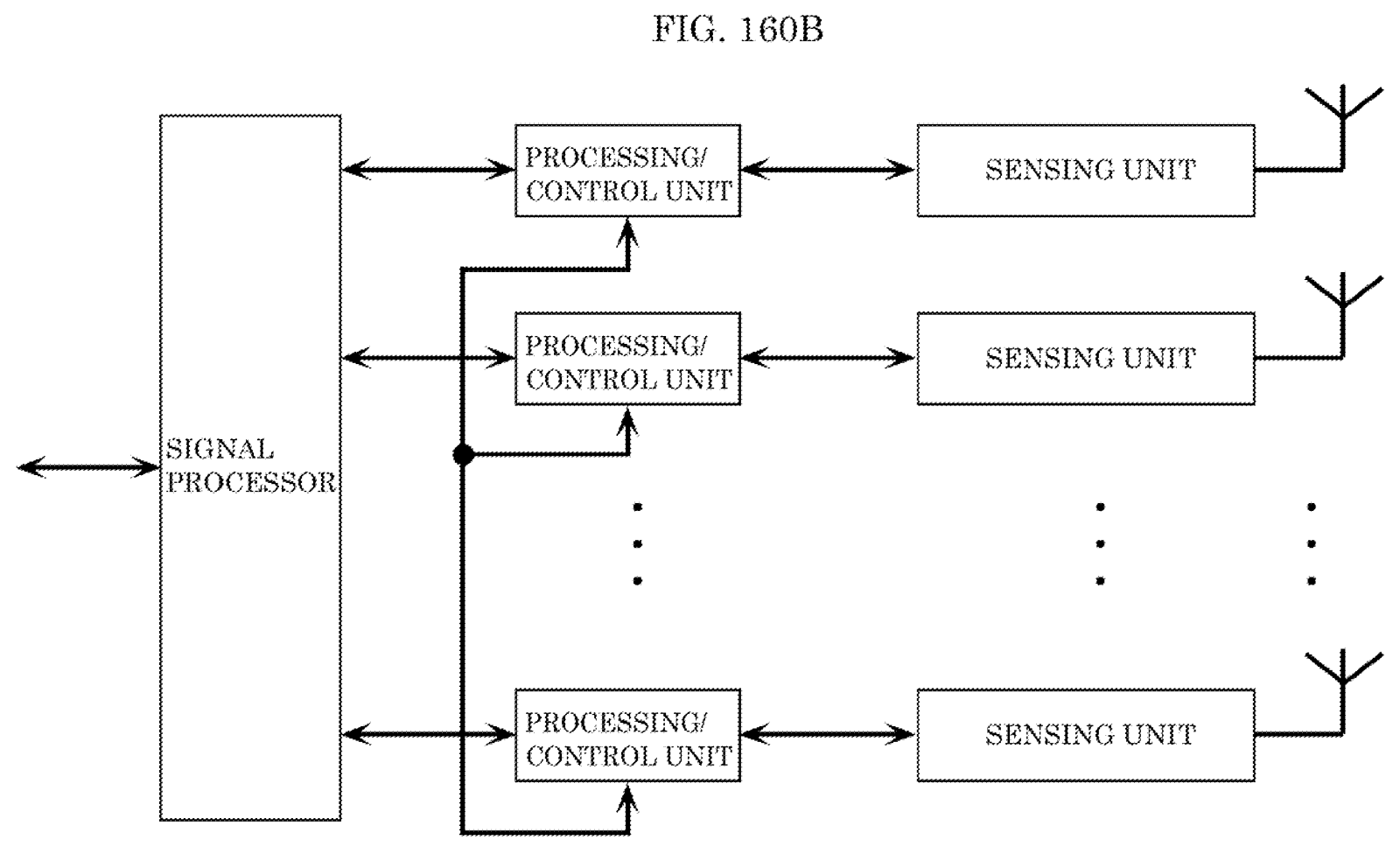

FIG. 160A illustrates an example of a configuration of an apparatus according to Embodiment 29;

FIG. 160B illustrates an example of a configuration of an apparatus according to Embodiment 29;

FIG. 161 illustrates an example of an arrangement of speakers according to Embodiment 30;

FIG. 162 illustrates an example of a configuration of information related to sensing capability according to the embodiments; and FIG. 163 illustrates measurement or estimation of a position using triangulation described in the embodiments.

DETAILED DESCRIPTION OF THE EMBODIMENTS

A communication apparatus according to one aspect of the present invention is a first apparatus that performs sensing via radio waves to sense a second apparatus, include: a communication unit configured to receive a frame transmitted via radio waves by the second apparatus and sense the second apparatus using the frame received; and a controller that selects, from among predetermined frequencies, a frequency for the second apparatus to transmit the radio waves at, notifies the second apparatus of the frequency selected, and controls the communication unit to perform the sensing using the frequency.

According to this aspect, a communication apparatus (i.e., the first apparatus) notifies the second apparatus, which is the target to be sensed, of the frequency at which to transmit radio waves, and senses the second apparatus using the notified frequency. Typically, what radio wave frequency is suitable for sensing depends on the distance between the first apparatus and the second apparatus, or the radio wave environment around one or both of the first apparatus and the second apparatus. Accordingly, employing a configuration in which the frequency to be used for sensing is selectable from among a plurality of frequencies makes it possible for the first apparatus to adequately sense the second apparatus. The first apparatus can thus sense the surrounding area.

For example, when selecting the frequency, the controller may select the frequency independently of a frequency used for communication by the communication unit.

According to this aspect, a communication apparatus (i.e., the first apparatus) selects the frequency independently of the frequency used for communication. Accordingly, a frequency suitable for sensing the second apparatus can be selected, regardless of the frequency that the first apparatus uses for communication. This allows the first apparatus to even more adequately sense the surrounding area.

For example, the sensing may include at least one of detecting a position of an object, detecting presence or absence of an object, or detecting a shape of an object, by analyzing the radio waves received by the communication unit.

This aspect enables a communication apparatus (i.e., the first apparatus) to more easily obtain a sensing result of the surrounding area of the transmitting apparatus by performing processing of detecting the position of an object, processing of detecting the presence or absence of an object, and/or processing of detecting the shape of an object.

A communication apparatus according to one aspect of the present invention is a second apparatus that is sensed via radio waves by sensing performed by a first apparatus, and may include: a communication unit configured to transmit, via radio waves, a frame for the sensing; and a controller that receives a notification of a frequency from the first apparatus, and controls the communication unit to transmit the frame via radio waves using the frequency indicated in the notification.

According to this aspect, a communication apparatus (i.e., the second apparatus) receives, from the first apparatus that has targeted the second apparatus for sensing, a notification of a frequency at which to transmit radio waves, and transmits radio waves at the frequency indicated in the received notification in order to be sensed by the first apparatus. Typically, what radio wave frequency is suitable for sensing depends on the distance between the first apparatus and the second apparatus, or the radio wave environment around one or both of the first apparatus and the second apparatus. Accordingly, by the second apparatus being configured to be capable of transmission at the frequency notified by the first apparatus, the second apparatus can be a target of sensing by the first apparatus. The second apparatus can thus be sensed by first apparatus.

For example, the communication unit may be configured to transmit, as the frame, a frame that includes a preamble and does not include a data field.

According to this aspect, a communication apparatus (i.e., the second apparatus) can reduce radio wave transmission time because the frame it transmits to be sensed by the first apparatus does not include a data field.

A communication method according to one aspect of the present invention is executed by a communication apparatus which is a first apparatus that performs sensing via radio waves to sense a second apparatus, and includes: receiving a frame transmitted via radio waves by the second apparatus and sensing the second apparatus using the frame received; and selecting, from among predetermined frequencies, a frequency for the second apparatus to transmit the radio waves at, notifying the second apparatus of the frequency selected, and controlling the sensing to perform the sensing using the frequency.

This aspect achieves the same advantageous effects as the communication apparatus described above.

A communication method according to one aspect of the present invention is executed by a communication apparatus which is a second apparatus that is sensed via radio waves by sensing performed by a first apparatus, and includes: transmitting, via radio waves, a frame for the sensing; and receiving a notification of a frequency from the first apparatus, and controlling the transmitting to transmit the frame via radio waves using the frequency indicated in the notification.

This aspect achieves the same advantageous effects as the communication apparatus described above.

General or specific aspects of these may be realized as a system, method, integrated circuit, computer program, computer-readable recording medium such as a CD-ROM, or any given combination thereof.

Hereinafter, the transmitting apparatus according to the present disclosure will be described in greater detail with reference to the drawings.

Each of the following embodiments describes a general or specific example. The numerical values, shapes, materials, elements, the arrangement and connection of the elements, the steps, the order of the steps, etc., shown in the following embodiments are mere examples, and therefore do not limit the scope of the present disclosure. Therefore, among elements in the following embodiments, those not recited in any of the independent claims indicating the broadest scope are described as optional elements.

Embodiment 1

In the present embodiment, a detecting apparatus capable of detecting a position of an object in the surrounding area, positional relationships between objects, and distance to an object will be described. Note that the detecting apparatus is also herein referred to as a transmitting apparatus.

Figure 1:
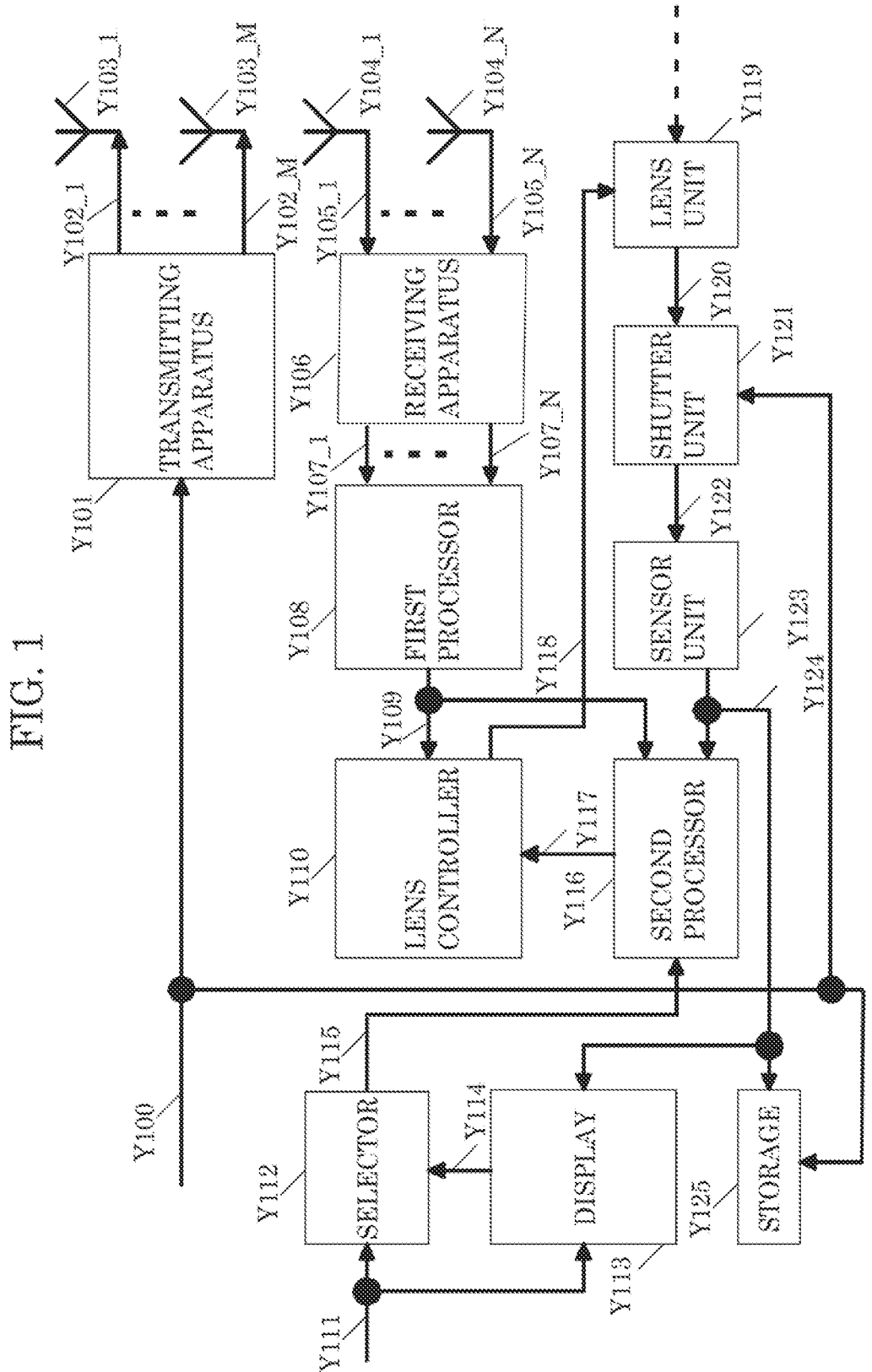
FIG. 1 illustrates one example of a configuration of a detecting apparatus according to Embodiment 1.

FIG. 1 illustrates one example of a configuration of the detecting apparatus according to the present embodiment.

Transmitting apparatus Y101 receives an input of control signal Y100. In this example, control signal Y100 includes information for controlling operations of one or more element included in detecting apparatus, such as information indicating to start operations for object detection, information indicating to end operations for object detection, information indicating to start recording a still image or video, and information indicating to end recording a still image or video.

When control signal Y100 includes information indicating to start operations for object detection, for example, transmitting apparatus Y101 generates, in receiving apparatus Y106, M modulated signals to be used for radio wave direction of arrival estimation, and outputs M transmission signals. In other words, transmitting apparatus Y101 outputs transmission signals Y102_1 through Y102_M. Note that M is an integer that is greater than or equal to 1. Transmission signal Y102_i is output as radio waves from antenna Y103_i. Note that i is an integer that is greater than or equal to 1 and less than or equal to M. Antenna Y103_i may be configured as a single antenna, and may be configured as a plurality of antennas. When antenna Y103_i is configured as a plurality of antennas, antenna Y103_i may include directionality control functionality.

A modulated signal transmitted from transmitting apparatus Y101 is reflected by an object present in the direction in which the modulated signal is radiated or in the surrounding area of the radiated modulation signal. Receiving apparatus Y106 receives the reflected waves. Accordingly, receiving apparatus Y106 receives reception signal group Y105_1 received by antenna Y104_1 through reception signal group Y105_N received by antenna Y104_N. Note that N is an integer that is greater than or equal to 1.

Hereinafter, a case in which antenna Y104_i is configured of a plurality of antennas will be described. As such, in the following description, the signals received by antenna Y104_i will be referred to as reception signal group Y105_i. For example, when antenna Y104_i is configured of 16 antennas, reception signal group Y105_i includes 16 reception signals.

Receiving apparatus Y106 performs direction of arrival estimation on reception signal group Y105_1 and estimates the distance to an object based on the timing of the transmission of modulated signals by transmitting apparatus Y101 and the timing of obtainment of reception signal group Y105_1. Receiving apparatus Y106 thus outputs object estimation information Y107_1. The phrase "distance to an object" used above means, for example, the distance between the object and the detecting apparatus. Here, the value calculated as the distance is, for example, the distance between the object and an antenna, the distance between the object and a central position of a plurality of antennas, or the distance between the object and a sensor unit (to be described later). The "distance to an object" may be, for example, the distance between a point or region of reflection of the modulated signal on the object and the detecting apparatus. When, for example, a plurality of modulated signals are transmitted simultaneously, a plurality of distances to an object may be measured, one for each of a plurality of points or regions on the object.

Similarly, receiving apparatus Y106 performs direction of arrival estimation on reception signal group Y105_i and estimates the distance to an object based on the timing of the transmission of modulated signals by transmitting apparatus Y101 and the timing of obtainment of reception signal group Y105_i. Receiving apparatus Y106 thus outputs object estimation information Y107_i. Note that i is an integer that is greater than or equal to 1 and less than or equal to N.

First processor Y108 receives an input of object estimation information Y107_1 through object estimation information Y107_N. For example, first processor Y108 performs detailed object estimation using object estimation information Y107_1 through object estimation information Y107_N, and outputs object estimation signal Y109.

Display Y113 receives inputs of image information Y124 and area information Y111 for restricting the area in which to perform object recognition, associates an image with the area in which to perform object recognition, and outputs area signal Y114. Note that the association of an image with the area in which to perform object recognition is, for example, specifying the area in which to perform object recognition in an image obtained in display Y113. The association of an image with the area in which to perform object recognition may be, for example, specifying an area in which first processor Y108 is to perform object recognition in accordance with a specified area of an image obtained in display Y113.

Selector Y112 receives inputs of area information Y111 and area signal Y114, for restricting the area in which to perform object recognition. Selector Y112 determines an area to detect an object in based on area information Y111 and area signal Y114, and outputs selected area signal Y115. Note that selector Y112 need not restrict the area to detect an object in. In such cases, selector Y112 need not output selected area signal Y115; selected area signal Y115 may include information indicating that the area to detect an object in is not restricted.

Although this configuration includes display Y113 and display Y113 is configured to output area signal Y114, the detecting apparatus is not limited to this configuration. Moreover, display Y113 may restrict the area of object detection based on instruction from the user made on a panel such as a liquid crystal panel via a touch panel function (e.g., an apparatus including a display apparatus such as a liquid crystal panel and a positional input apparatus such as a touch pad).

Second processor Y116 receives inputs of object estimation signal Y109, selected area signal Y115, and image information Y124. In this example, second processor Y116 performs first and second processing methods. However, second processor Y116 may perform only one of the first and second processing methods, and, alternatively, may switch between the first and second processing methods depending on the situation. Second processor Y116 may generate auxiliary information for storing distance information for a plurality of positions using object estimation signal Y109. For example, the auxiliary information is a plurality of items of position information corresponding to an object that is a candidate to be captured, and second processor Y116 may select position information corresponding to an object that is a candidate to be captured from the plurality of items of position information corresponding to an object that is a candidate to be captured.

First Processing Method:

Second processor Y116 performs object recognition from image information Y124. Second processor Y116 estimates the distance between each object recognized and the detecting apparatus based on recognition information for the object and object estimation signal Y109, and outputs estimated distance information Y117. Note that second processor Y116 may restrict the area in which object recognition is to be performed, using selected area signal Y115. Second processor Y116 may restrict which objects to perform distance estimation on, using selected area signal Y115.

Second Processing Method:

Second processor Y116 estimates the distance between each object and the detecting apparatus from object estimation signal Y109 and image information Y124, and outputs estimated distance information Y117. Note that second processor Y116 may restrict the area in which object recognition is to be performed, using selected area signal Y115.

Second processor Y116 may restrict which objects to perform distance estimation on, using selected area signal Y115.

Lens controller Y110 receives inputs of object estimation signal Y109 and estimated distance information Y117. Lens controller Y110 determines control of operations related to the lens using object estimation signal Y109 and/or estimated distance information Y117, such as focal distance control for a target object, lens focus control for a target object, and controlling the direction in which to capture a target object, and outputs operation control signal Y118.

Lens unit Y119 receives an input of operation control signal Y118, and based on operation control signal Y118, controls operations related to the lens, such as focal distance control for a target object, lens focus control for a target object, and/or controlling the direction in which to capture a target object, and outputs object signal Y120. Note that object signal Y120 is an optical signal.

Shutter unit Y121 receives inputs of control signal Y100 and object signal Y120, controls operation of the shutter based on control signal Y100, and outputs post-control object signal Y122.

Sensor unit Y123 receives an input of post-control object signal Y122, performs optical to electric signal conversion, for example, and outputs image information Y124. For example, a charge-coupled device (CCD) image sensor, a complementary metal oxide semiconductor (CMOS) image sensor, or an organic CMOS image sensor may be used as sensor unit Y123.

Storage Y125 receives inputs of control signal Y100 and image information Y124, and stores image information, such as a video or a still image, based on control signal Y100. Storage Y125 may store the image information obtained by sensor unit Y123 as-is, and may store encoded data encoded using an image encoding technique.

In addition to or instead of image information, storage Y125 may store analytical data obtained as a result of signal processing the image. The analytical data is, for example, information indicating whether a detection target, which is set in advance and examples of which include a person, animal, vehicle, or drone, is captured or not, that is to say, whether or not a detection target is present in the region of capture or not. The analytical data may include information related to an attribute of the detection target such as color or size, the orientation of the detection target, and information related to an activity, such as the path of movement, the speed of the detection target, time of stay of the detection target, what the detection target is doing, or what the detection target is looking at. For example, the information related to an attribute may include, in the case of a person, the estimated gender and/or age of the person, and in the case of a vehicle, the model of the vehicle, the number of passengers, and/or the amount of cargo loaded in the vehicle.

As described above, with the detecting apparatus according to the present embodiment, it is possible to estimate the distance to an object using radio waves. Moreover, with the detecting apparatus according to the present embodiment, by controlling a lens used to capture the object based on the estimated distance to the object, it is possible to control the lens according to purpose, such as clearly capturing the target object to be captured. Moreover, with the detecting apparatus according to the present embodiment, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Next, the configuration of a detecting apparatus that differs from FIG. 1 and is capable of detecting an object with high accuracy will be described.

Figure 2:
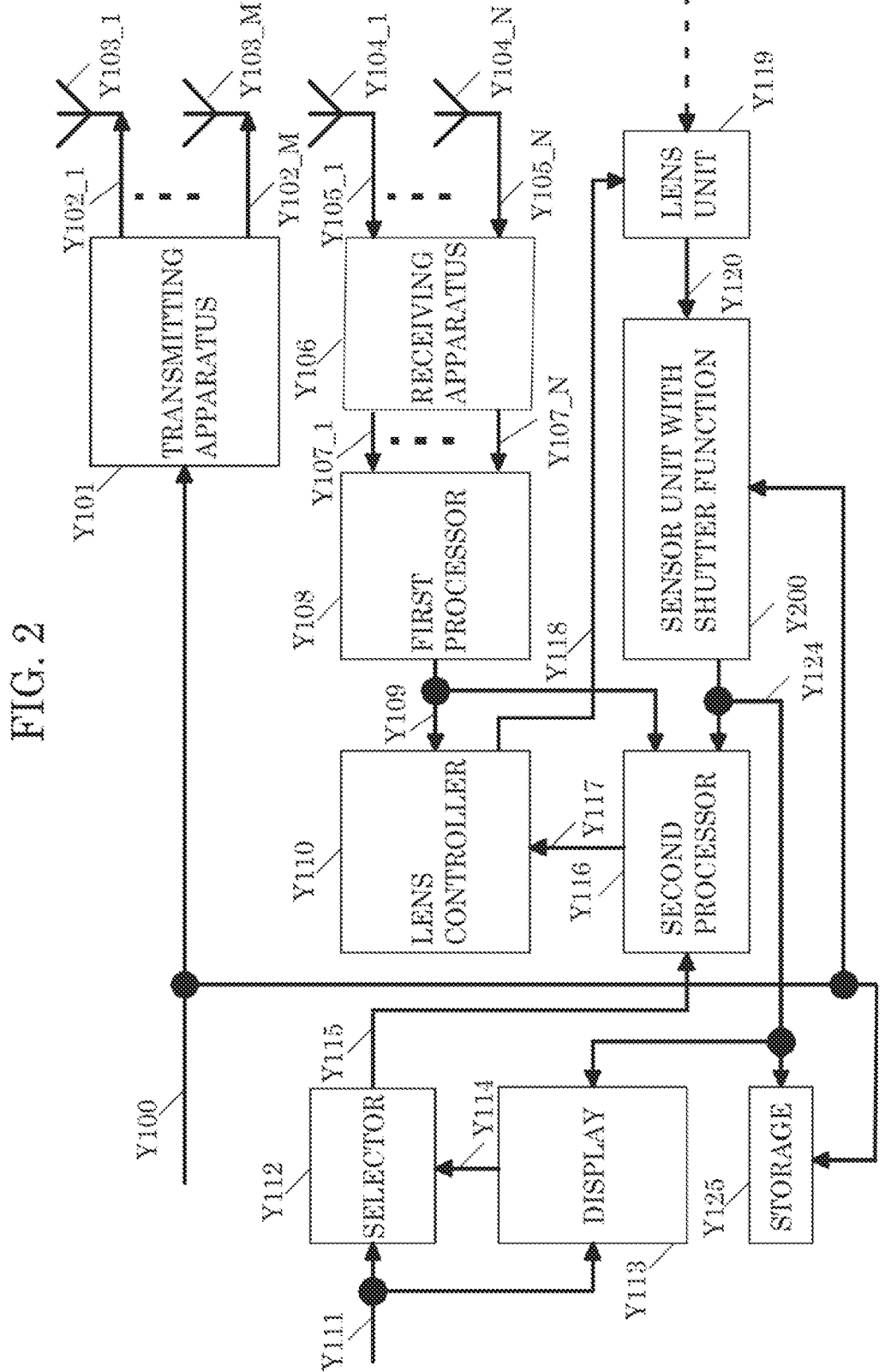
FIG. 2 illustrates one example of a configuration of the detecting apparatus according to Embodiment 1.

FIG. 2 illustrates an example of a configuration of a detecting apparatus that differs from FIG. 1. In FIG. 2, elements that operate the same as in FIG. 1 have the same reference signs, and repeated description will be omitted.

Sensor unit with shutter function Y200 receives inputs of control signal Y100 and object signal Y120. Sensor unit with shutter function Y200 receives an input of control signal Y100, controls shutter operation based on control signal Y100, and generates and outputs image information Y124 by performing optical to electric signal conversion, for example. The shutter of sensor unit with shutter function Y200 may be, for example, an electronic shutter or a global shutter.

In FIG. 2, operations performed by elements other than sensor unit with shutter function Y200 are the same as described with reference to FIG. 1.

With the detecting apparatus configured as described above, it is possible to estimate distance to an object using radio waves. Moreover, with the detecting apparatus configured as described above, by controlling a lens used to capture the object based on the estimated distance to the object, it is possible to control the lens according to purpose, such as clearly capturing the target object to be captured. Moreover, with the detecting apparatus configured as described above, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Next, the configuration of a detecting apparatus that differs from FIG. 1 and FIG. 2 and is capable of detecting an object with high accuracy will be described.

Figure 3:
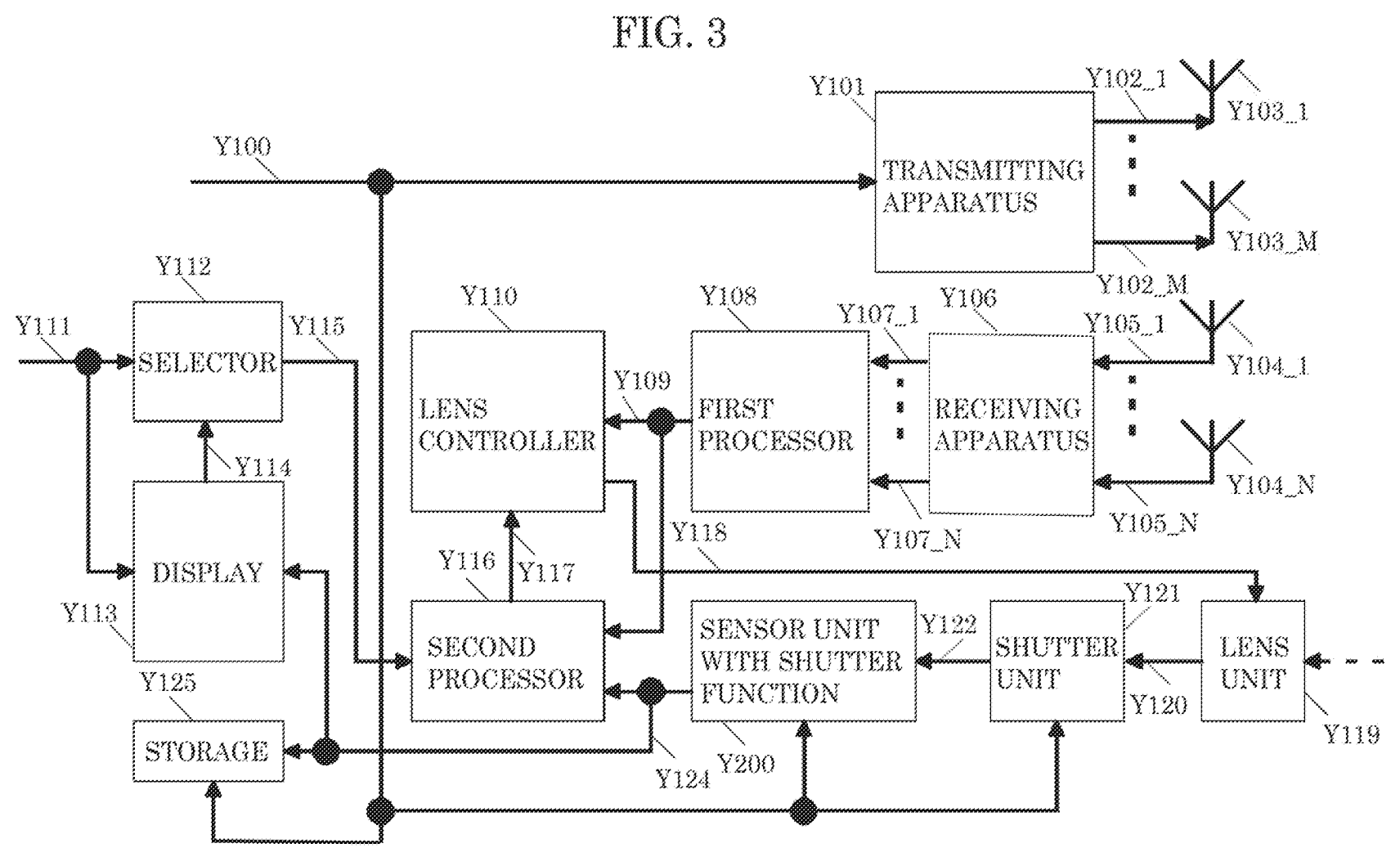

FIG. 3 illustrates an example of a configuration of a detecting apparatus that differs from FIG. 1 and FIG. 2. In FIG. 3, elements that operate the same as in FIG. 1 and FIG. 2 have the same reference signs, and repeated description will be omitted.

One characterizing feature of the configuration in FIG. 3 is that the detecting apparatus includes both shutter unit Y121 and sensor unit with shutter function Y200.

For example, shutter unit Y121 includes a mechanical shutter such as a focal-plane shutter. Sensor unit with shutter function Y200 includes an electronic shutter or a global shutter.

Sensor unit with shutter function Y200 receives an input of control signal Y100, and when the operation information included in control signal Y100 indicates video mode, the shutter function of sensor unit with shutter function Y200 operates. In contrast, shutter unit Y121 receives an input of control signal Y100, and when the operation information included in control signal Y100 indicates video mode, shutter unit Y121 does not operate the shutter, that is to say, keeps the shutter open.

Sensor unit with shutter function Y200 receives an input of control signal Y100, and when the operation information included in control signal Y100 indicates still image mode, control signal Y100 includes, for example, shutter speed information. In still image mode, sensor unit with shutter function Y200 operates the shutter function of sensor unit with shutter function Y200 in accordance with the shutter speed information.

Shutter unit Y121 receives an input of control signal Y100, and when the operation information included in control signal Y100 indicates still image mode, control signal Y100 includes, for example, shutter speed information. In still image mode, shutter unit Y121 operates the shutter function in accordance with the shutter speed information.

Note that in the still image mode, when the shutter function of sensor unit with shutter function Y200 is operating, the shutter function of shutter unit Y121 does not operate. Conversely, when the shutter function of shutter unit Y121 is operating, the shutter function of sensor unit with shutter function Y200 does not operate.

In FIG. 3, operations performed by elements other than those described above are the same as described with reference to FIG. 1.

With the detecting apparatus configured as described above, it is possible to estimate distance to an object using radio waves. Moreover, with the detecting apparatus configured as described above, by controlling a lens used to capture the object based on the estimated distance to the object, it is possible to control the lens according to purpose, such as clearly capturing the target object to be captured. Moreover, with the detecting apparatus configured as described above, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Figure 4:
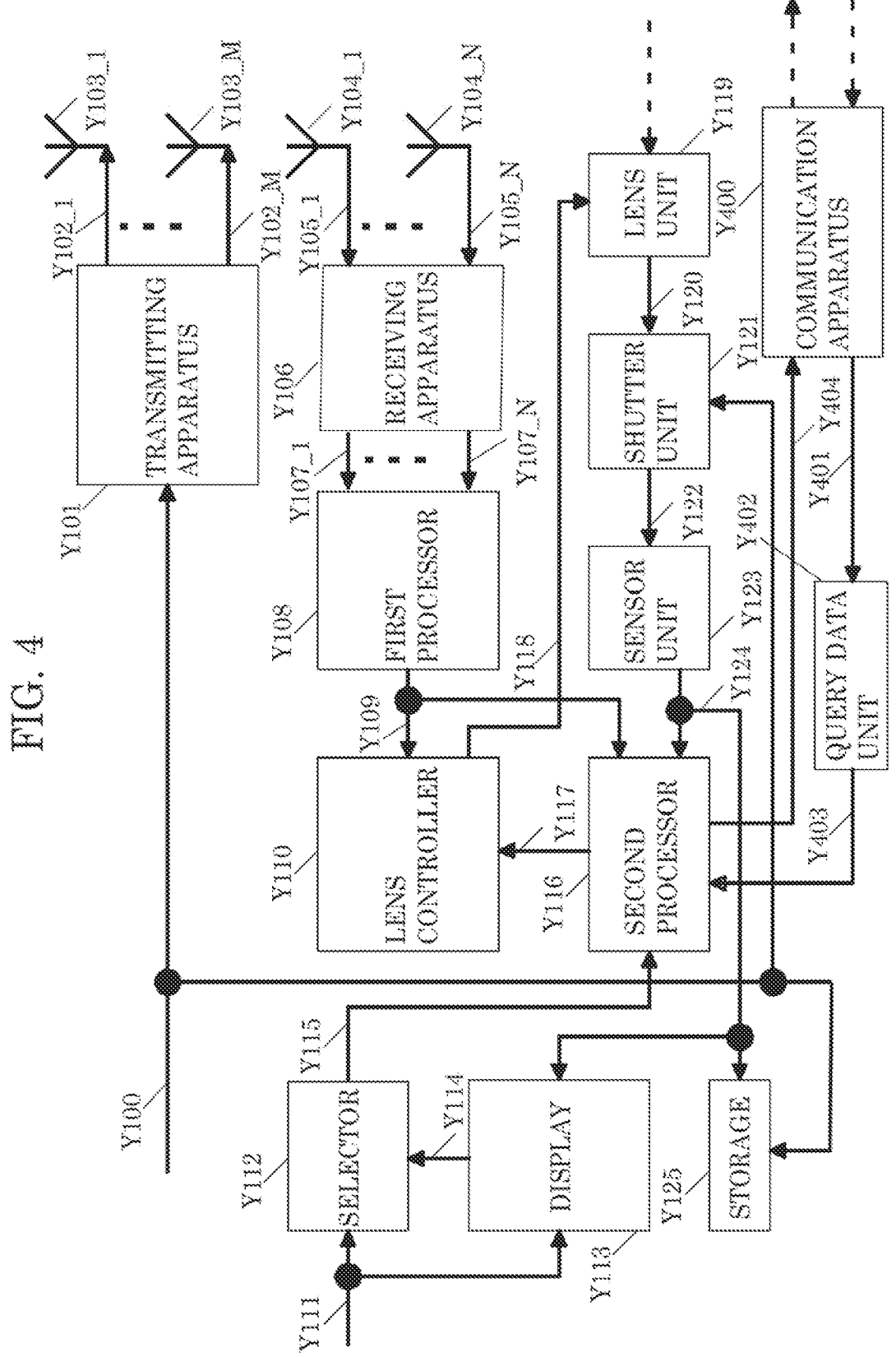
FIG. 4 illustrates a variation of a configuration of the detecting apparatus according to Embodiment 1.

FIG. 4 illustrates a variation of FIG. 1.

In FIG. 4, elements that operate the same as in FIG. 1 have the same reference signs, and repeated description will be omitted.

Second processor Y116 receives inputs of object estimation signal Y109, selected area signal Y115, image information Y124, and data group Y403. In this example, second processor Y116 performs object recognition from image information Y124, based on data group Y403. Second processor Y116 estimates the distance between each object recognized and the detecting apparatus illustrated in the figure based on recognition information for the object and object estimation signal Y109, and outputs estimated distance information Y117. Second processor Y116 may restrict which objects to perform distance estimation on, using selected area signal Y115.

Examples of signal processing used when performing object recognition using image information Y124 include processing of detecting a person or part of the person such as their face, processing of identifying a person, processing of detecting a target object such as a vehicle or a drone, processing of identifying a target object such as a vehicle or a drone, processing of detecting activity or movement of a detected person or target object, and processing of tracking a detected person or target object. In this example, image information Y124 may be one or more still images, and may be a video of a plurality of frames successively obtained at a predetermined time.

For example, at least one feature amount obtained by performing a predetermined calculation process determined based on the purpose of the signal processing is extracted from image information Y124, and the signal processing is performed based on a comparison result of the extracted feature amount and a known feature amount corresponding to the target object or an activity thereof. Moreover, the signal processing may be performed based on a determination of whether the extracted feature amount exceeds a predetermined threshold or not. Moreover, the signal processing may be performed based on some other signal processing not described above. For example, the signal processing may be performed using a model created via machine learning using a multi-layer neural network. When a model created via machine learning using a multi-layer neural network is used, preprocessing may be performed on video image data, and the preprocessed data may be input into the model created via machine learning using a multi-layer neural network.

In FIG. 4, second processor Y116 may output data to query data unit Y402. For example, based on this information, query data unit Y402 may reduce the output data amount of data group Y403.

In the above description, second processor Y116 is exemplified as performing object recognition using image information Y124, but second processor Y116 may perform object recognition using object estimation signal Y109 in addition to image information Y124. In this example, object estimation signal Y109 need not comprise only distance information; for example, object estimation signal Y109 may include information such as reflectance, which is obtained by analyzing reception signal group Y105_i.

Second processor Y116 may output object recognition information Y404.

Communication apparatus Y400 receives an input of object recognition information Y404, generates a modulated signal including this data, and transmits the modulated signal to a communication apparatus that is a communication partner. In this example, the communication apparatus that is a communication partner is, for example, connected to a server, and the server obtains object recognition information Y404 from the modulated signal transmitted by communication apparatus Y400, generates an object recognition database, generates a modulated signal including this data base via the communication apparatus, and transmits the generated modulated signal to communication apparatus Y400.

Communication apparatus Y400 receives the modulated signal, obtains object recognition database Y401, and outputs object recognition database Y401 to query data unit Y402. Query data unit Y402 receives an input of object recognition database Y401, and updates data group Y403 that second processor Y116 uses to perform object recognition.

With the detecting apparatus configured as described above, it is possible to estimate distance to an object using radio waves. Moreover, with the detecting apparatus configured as described above, by controlling a lens used to capture the object based on the estimated distance to the object, it is possible to control the lens according to purpose, such as clearly capturing the target object to be captured. Moreover, with the detecting apparatus configured as described above, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Furthermore, with the detecting apparatus configured as described above, the mechanism for updating the database used for object recognition makes it possible to improve the accuracy and reliability of the object recognition, which resultantly contributes to an improvement in the accuracy and reliability of distance estimation. Moreover, when object recognition is performed using information obtained using radio waves in addition to using image information, there is a possibility that the accuracy and reliability of the object recognition will improve.

Figure 5:
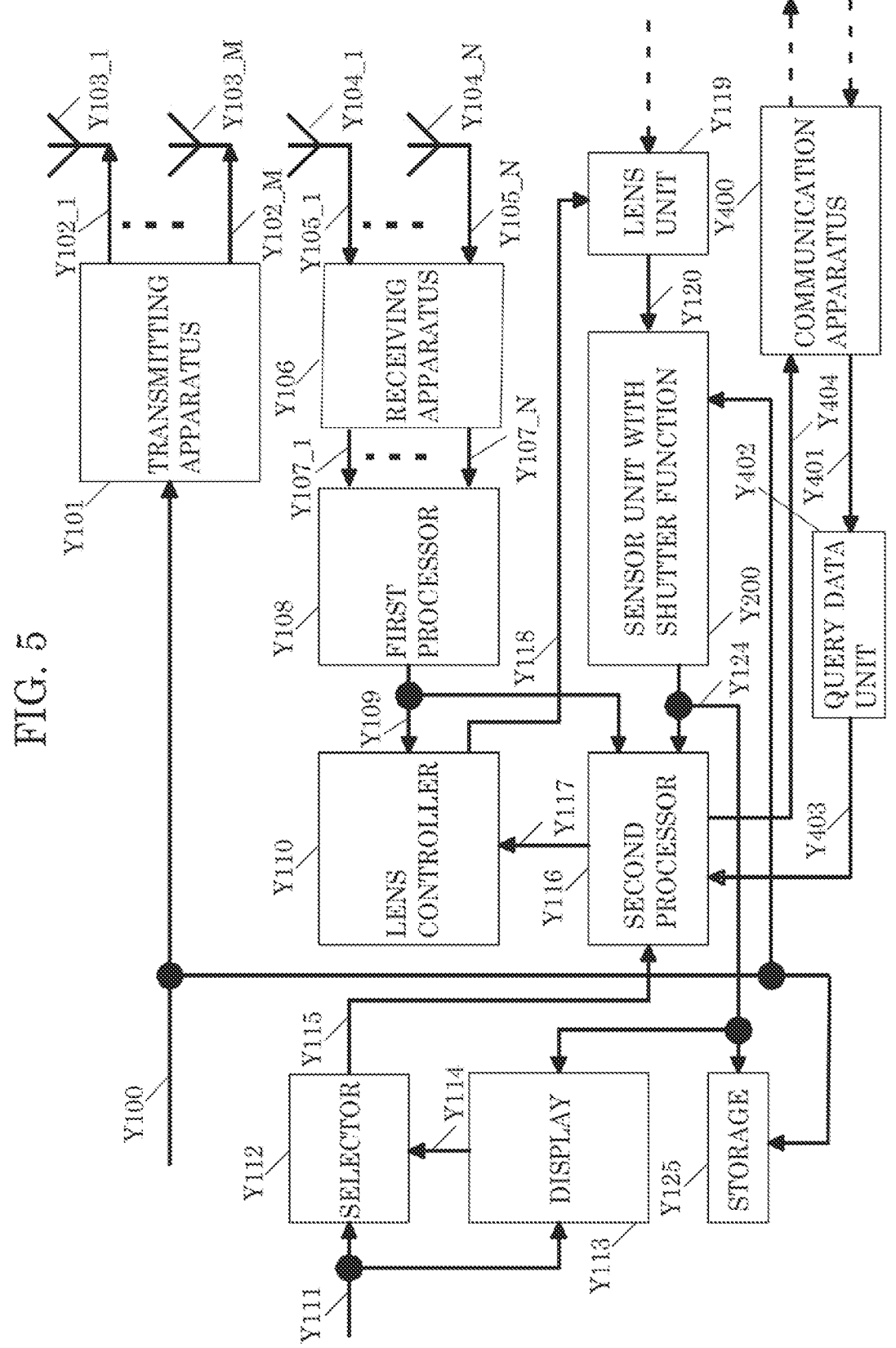
FIG. 5 illustrates a variation of a configuration of the detecting apparatus according to Embodiment 1.

FIG. 5 illustrates a variation of FIG. 2. In FIG. 5, elements that operate the same as in FIG. 1, FIG. 2, and FIG. 4 have the same reference signs, and repeated description will be omitted. As operations performed by each element illustrated in FIG. 5 have already been described, repeated description thereof will be omitted.

Figure 6:
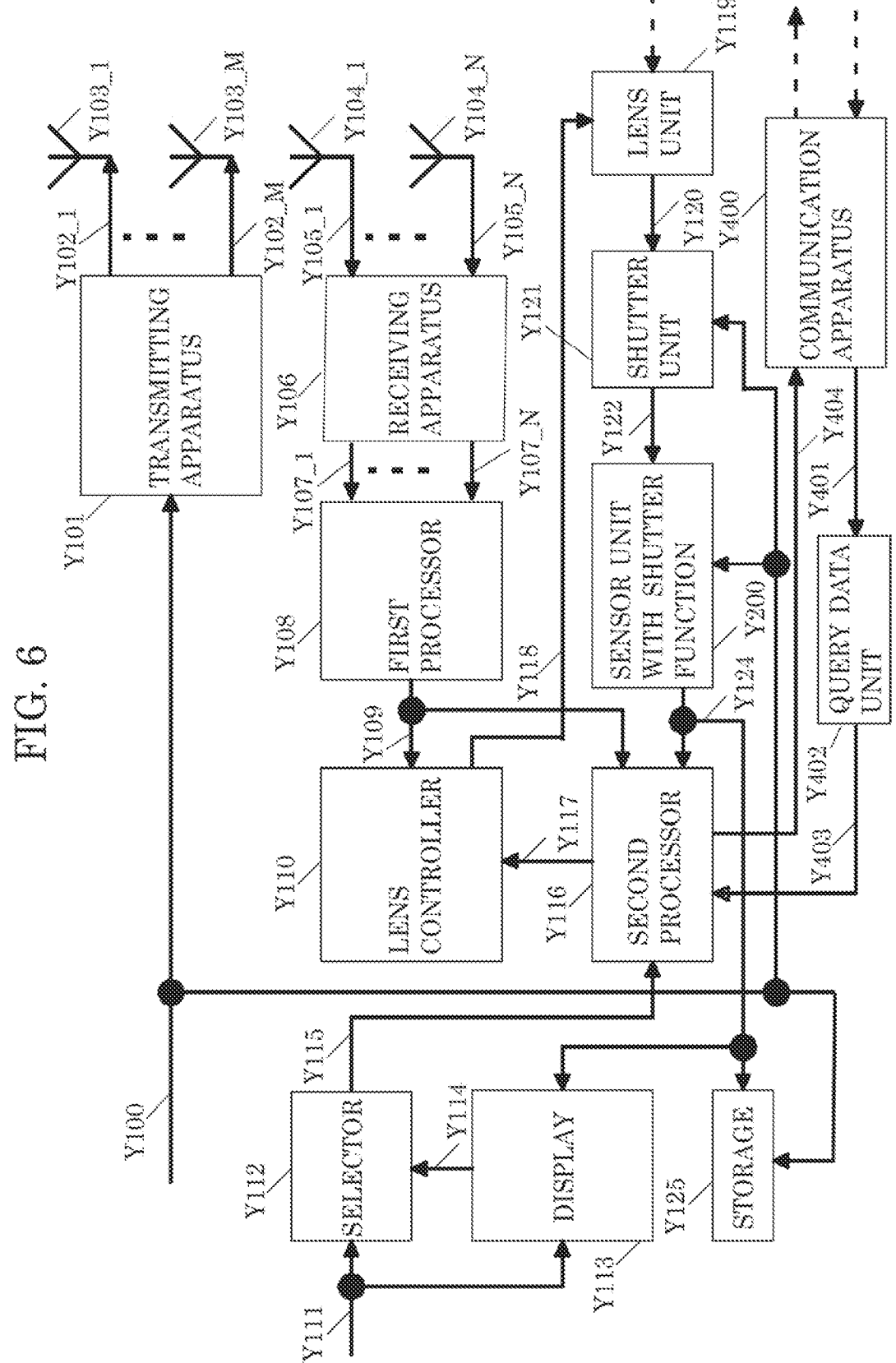
FIG. 6 illustrates a variation of a configuration of the detecting apparatus according to Embodiment 1.

FIG. 6 illustrates a variation of FIG. 3. In FIG. 6, elements that operate the same as in FIG. 1, FIG. 2, and FIG. 4 have the same reference signs, and repeated description will be omitted. As operations performed by each element illustrated in FIG. 6 have already been described, repeated description thereof will be omitted.

With the detecting apparatus configured as described above, it is possible to estimate distance to an object using radio waves. Moreover, with the detecting apparatus configured as described above, by controlling a lens used to capture the object based on the estimated distance to the object, it is possible to control the lens according to purpose, such as clearly capturing the target object to be captured. Moreover, with the detecting apparatus configured as described above, the distance to the object can be estimated even when the surrounding area is dark, for example, which makes it possible to improve the reliability of the estimation of the distance to the object. Moreover, by both estimating the distance to the object using radio waves and estimating the distance to the object based on an optical signal (image), there is a possibility that the advantageous effect that more accurate or more reliable distance estimation can be performed can be achieved.

Furthermore, with the detecting apparatus configured as described above, the mechanism for updating the database used for object recognition makes it possible to improve the accuracy and reliability of the object recognition, which resultantly contributes to an improvement in the accuracy and reliability of distance estimation. Moreover, when object recognition is performed using information obtained using radio waves in addition to using image information, there is a possibility that the accuracy and reliability of the object recognition will improve.

In the present embodiment, although an apparatus exemplified as having one of the configurations illustrated in FIG. 1 through FIG. 6 is referred to as a "detecting apparatus", the naming of the apparatus is not limited to a "detecting apparatus". For example, since the apparatus according to the present embodiment includes storage, this element may be referred to as a "storage apparatus", and since the apparatus includes a sensor unit, this element may be referred to as a camera, a video camera, a monitoring camera, a security camera, a recording apparatus, or a still image capturing apparatus. Moreover, this element may simply be referred to as an "apparatus". The naming of this element is not limited to the above examples.

The configurations of FIG. 1, FIG. 2, FIG. 3, FIG. 4, FIG. 5, and FIG. 6 may be realized as a system of a combination of separate apparatuses. Hereinafter, an example in which a configuration is realized as a plurality of separate apparatuses will be given.

Figure 7:
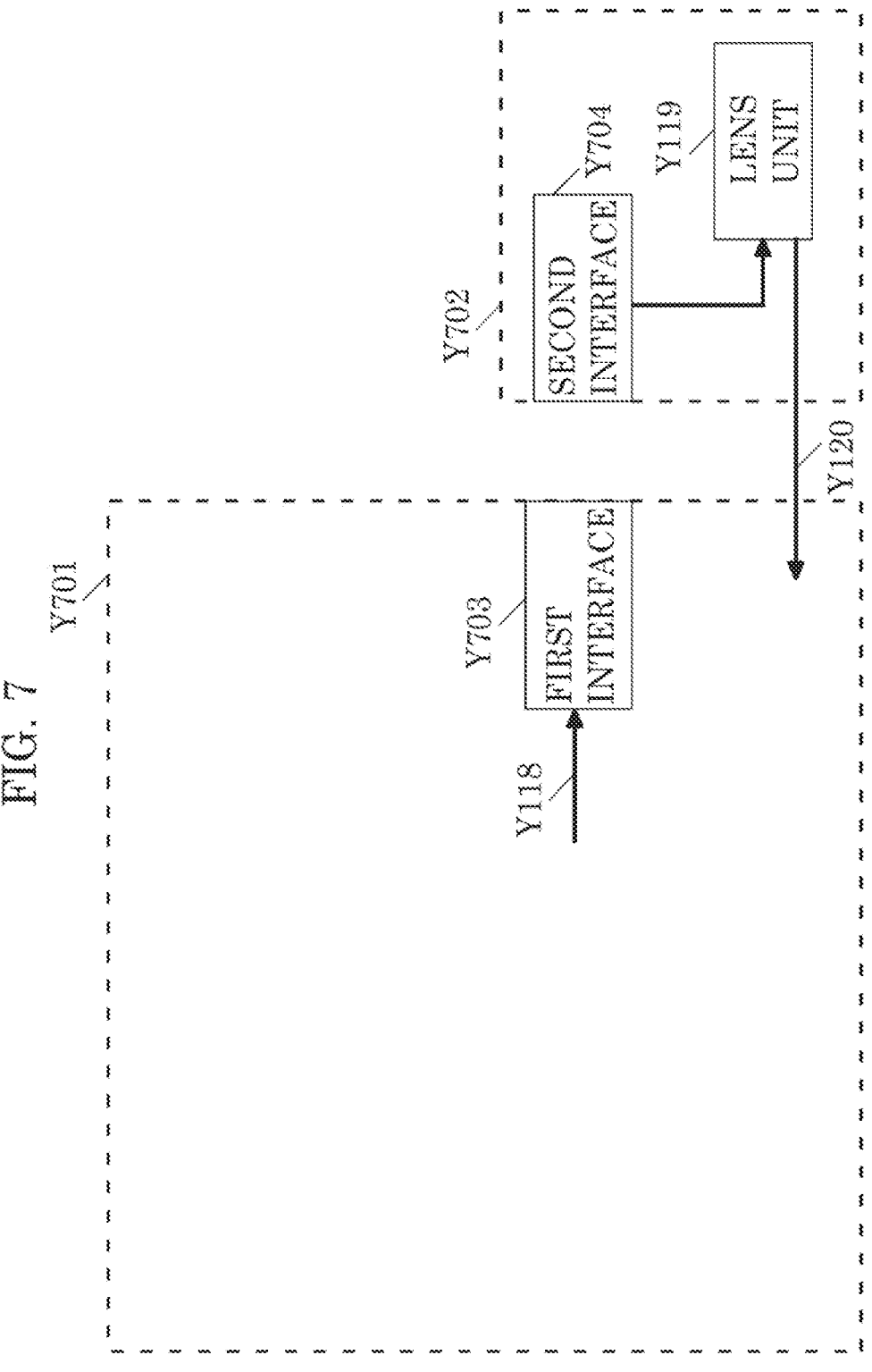
FIG. 7 illustrates one example of a separated configuration of the detecting apparatus according to Embodiment 1.

FIG. 7 illustrates a first example of separation of apparatuses.

Second apparatus Y702 is an apparatus that includes lens unit Y119 that is included in the apparatuses illustrated in FIG. 1, FIG. 2, FIG. 3, FIG. 4, FIG. 5, and FIG. 6. First apparatus Y701 is an apparatus that includes elements other than lens unit Y119 that are included in the apparatuses illustrated in FIG. 1, FIG. 2, FIG. 3, FIG. 4, FIG. 5, and FIG. 6.

First apparatus Y701 includes first interface Y703 for connecting to second apparatus Y702, and second apparatus Y702 includes second interface Y704 for connecting to first apparatus Y701.

Accordingly, first interface Y703 receives an input of operation control signal Y118. Second interface Y704 then outputs a signal to lens unit Y119. By connecting first interface Y703 and second interface Y704, lens unit Y119 can obtain a signal that corresponds to operation control signal Y118. Note that first interface Y703 and second interface Y704 may be connected in any manner. For example, first interface Y703 and second interface Y704 may be directly connected, and, alternatively, may be connected via a connection cable, for example. However, the connection method is not limited to the above examples.

Figure 8:
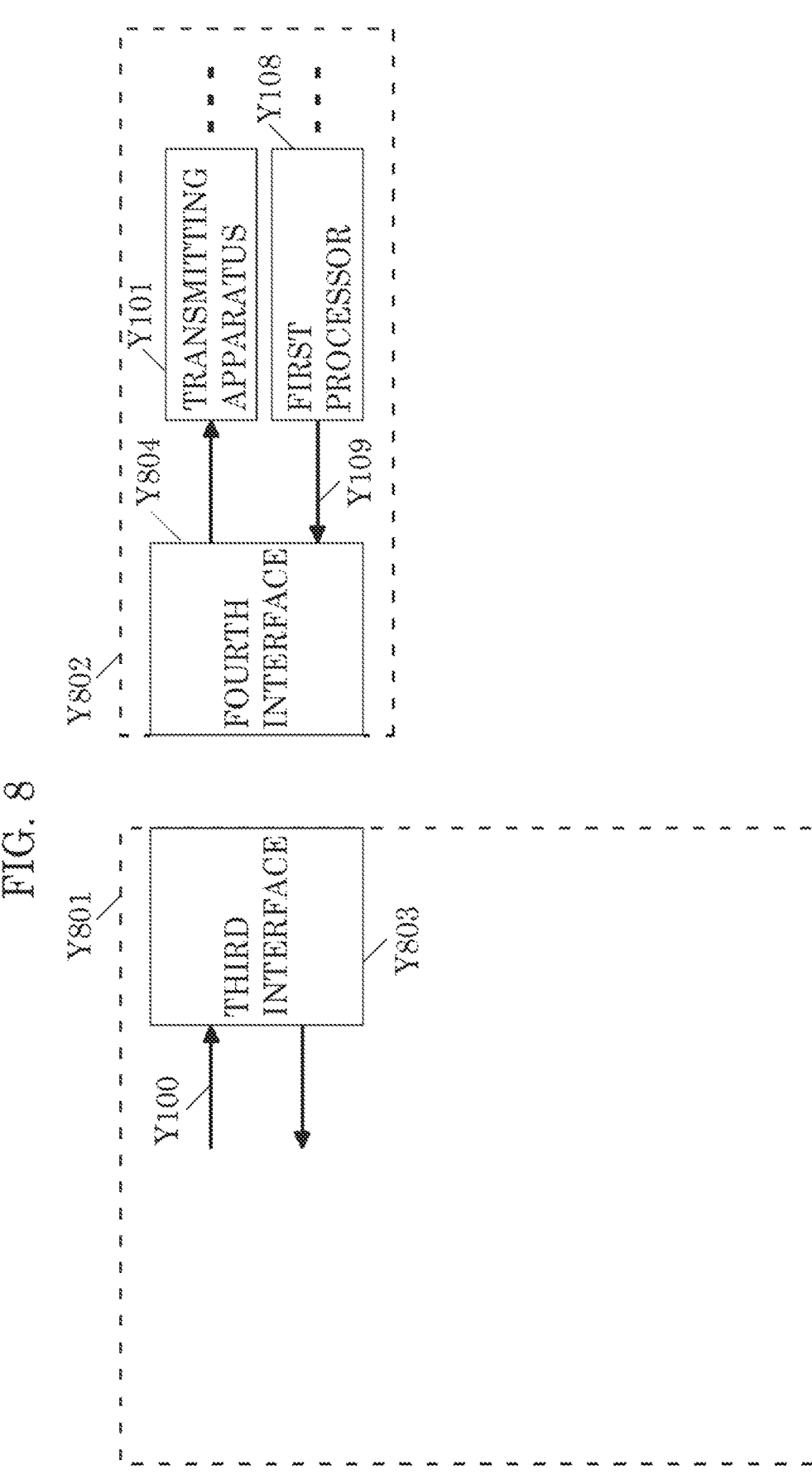
FIG. 8 illustrates one example of a separated configuration of the detecting apparatus according to Embodiment 1.

FIG. 8 illustrates a second example of separation of apparatuses.

Third apparatus Y802 includes transmitting apparatus Y101, antennas Y103_1 to Y103_M, antennas Y104_1 to Y104_N, receiving apparatus Y106, and first processor Y108 that are included in the apparatuses illustrated in FIG. 1, FIG. 2, FIG. 3, FIG. 4, FIG. 5, and FIG. 6. First variant Y801 of first apparatus Y701 is an apparatus that includes elements other than transmitting apparatus Y101, antennas Y103_1 to Y103_M, antennas Y104_1 to Y104_N, receiving apparatus Y106, and first processor Y108 that are included in the apparatuses illustrated in FIG. 1, FIG. 2, FIG. 3, FIG. 4, FIG. 5, and FIG. 6.

First variant Y801 of first apparatus Y701 includes third interface Y803 for connecting to third apparatus Y802, and third apparatus Y802 includes fourth interface Y804 for connecting to first variant Y801 of first apparatus Y701.

Accordingly, third interface Y803 receives an input of control signal Y100. Fourth interface Y804 then outputs a signal to transmitting apparatus Y101. By connecting third interface Y803 and fourth interface Y804, transmitting apparatus Y101 can obtain a signal that corresponds to control signal Y100.

Fourth interface Y804 receives an input of object estimation signal Y109. Third interface Y803 then outputs a signal. Accordingly, by connecting third interface Y803 and fourth interface Y804, third interface Y803 outputs a signal corresponding to object estimation signal Y109.

Note that third interface Y803 and fourth interface Y804 may be connected in any manner. For example, third interface Y803 and fourth interface Y804 may be directly connected, and, alternatively, may be connected via a connection cable, for example. However, the connection method is not limited to the above examples.

FIG. 9 illustrates a third example of separation of apparatuses. In FIG. 9, elements that operate the same as in FIG. 7 and FIG. 8 have the same reference signs, and repeated description will be omitted.

Second variant Y901 of first apparatus Y701 includes the elements that are included in the apparatuses illustrated in FIG. 1, FIG. 2, FIG. 3, FIG. 4, FIG. 5, and FIG. 6 except for transmitting apparatus Y101, antennas Y103_1 to Y103_M, antennas Y104_1 to Y104_N, receiving apparatus Y106, first processor Y108, and lens unit Y119. Second variant Y901 of first apparatus Y701 also includes first interface Y703 and third interface Y803.

Note that first interface Y703, second interface Y704, third interface Y803, and fourth interface Y804 illustrated in FIG. 9 operate as described above.

FIG. 9 illustrates a third example of separation of apparatuses. In FIG. 9, elements that operate the same as in FIG. 7 and FIG. 8 have the same reference signs, and repeated description will be omitted.

Second variant Y901 of first apparatus Y701 includes the elements that are included in the apparatuses illustrated in FIG. 1, FIG. 2, FIG. 3, FIG. 4, FIG. 5, and FIG. 6 except for transmitting apparatus Y101, antennas Y103_1 to Y103_M, antennas Y104_1 to Y104_N, receiving apparatus Y106, first processor Y108, and lens unit Y119. Second variant Y901 of first apparatus Y701 also includes first interface Y703 and third interface Y803.

Note that first interface Y703, second interface Y704, third interface Y803, and fourth interface Y804 illustrated in FIG. 9 operate as described above.

FIG. 10 illustrates a fourth example of separation of apparatuses. In FIG. 10, elements that operate the same as in FIG. 7, FIG. 8, and FIG. 9 have the same reference signs, and repeated description will be omitted.

Fourth apparatus Y1002 includes transmitting apparatus Y101, antennas Y103_1 through Y103_M, antennas Y104_1 through Y104_N, receiving apparatus Y106, first processor Y108, and lens unit Y119 that are included in the configurations illustrated in FIG. 1, FIG. 2, FIG. 3, FIG. 4, FIG. 5, and FIG. 6, and further includes second interface Y704 and fourth interface Y804. As operations performed by each element illustrated in FIG. 10 have already been described, repeated description thereof will be omitted.

Although examples of operations performed by the present embodiment have been described with reference to FIG. 1 through FIG. 10, the configurations illustrated in FIG. 1 through FIG. 10 are merely non-limiting examples.

Transmitting apparatus Y101 and receiving apparatus Y106 illustrated in FIG. 1 through FIG. 10 transmit and receive radio waves, and operations performed when doing so have been described. In contrast, if transmitting apparatus Y101 illustrated in FIG. 1 through FIG. 10 is configured to generate an optical modulated signal such as a visible light modulated signal and receiving apparatus Y106 illustrated in FIG. 1 through FIG. 10 is configured to receive optical modulated signals, the embodiment can still be carried out. If such a configuration is adopted, light emitting diodes (LEDs) or electroluminescent (EL) elements are used instead of antennas Y103_1 through Y103_M, and photodiodes or image sensors or the like are used instead of antennas Y104_1 through Y104_N.

In the apparatuses illustrated from FIG. 1 to FIG. 10 and the like, object recognition may be performed using information obtained using radio waves. In FIG. 1 through FIG. 10, one characterizing feature is that object recognition or estimation of distance to an object is performed and a still image or video is recorded (stored), but the configuration of an apparatus having such a characterizing feature is not limited to the configurations illustrated in FIG. 1 through FIG. 10.

Note that transmission power needs to be increased to increase sensing distance. For example, transmission power can be increased by narrowing the transmission band. Sensing using polarized waves is also possible.

Embodiment 2

In the present embodiment, a configuration method of the modulated signal transmitted by the apparatus described with reference to FIG. 1 through FIG. 10 and the like according to Embodiment 1 that performs distance estimation using radio waves or performs object recognition using radio waves will be described.

FIG. 11 illustrates one example of states of apparatus Y1101 that performs distance estimation using radio waves or performs object recognition using radio waves described in Embodiment 1, object Y1102 that is a target for the distance estimation or object recognition, and other apparatuses. Hereinafter, "apparatus Y1101 that performs distance estimation using radio waves or performs object recognition using radio waves" will be referred to simply as "apparatus Y1101".

FIG. 11 illustrates terminal Y1103 and access point (AP) Y1104 in addition to apparatus Y1101 and object Y1102.

Terminal Y1103 and AP Y1104 use a first frequency band when they communicate. Apparatus Y1101 uses the first frequency band when performing distance estimation or object recognition on object Y1102.

In this example, when communication between terminal Y1103 and AP Y1104 and distance estimation or object recognition of object Y1102 by apparatus Y1101 are performed at the same time, radio waves from one will interfere with radio waves from the other, which decreases communication quality and may contribute to a decrease in accuracy of the distance estimation or object recognition.

In the present embodiment, a method for improving these decreases will be described.

FIG. 12 illustrates an example of a frame configuration used when terminal Y1103 and access point (AP) Y1104 transmit modulated signals for communication as illustrated in FIG. 11. In FIG. 12, time is represented on the horizontal axis.

Reference symbol for communication Y1201 is a symbol for a communication partner to perform signal detection, time synchronization, frequency synchronization, channel estimation, etc. Reference symbol for communication Y1201 may be control information or a media access control (MAC) frame required for a procedure to perform data communication.

Control information symbol for communication Y1202 is a symbol for notifying of the communication method or the like of data symbol for communication Y1203. Accordingly, control information symbol for communication Y1202 includes information such as information indicating the error correction coding method (information indicating coding rate, block length (code length), error correction code), information indicating the modulation method, information indicating the transmitting method (for example, information indicating whether single stream transmission or multistream transmission is used) (information indicating modulation and coding scheme (MCS)), information indicating data length, etc.

Data symbol for communication Y1203 is a symbol for transmitting data to a communication partner.

The frame configuration illustrated in FIG. 12 is merely one example; the frame configuration may include other symbols. A single carrier transmission method or a multicarrier transmission method, such as orthogonal frequency division multiplexing (OFDM) may be used to transmit the frame illustrated in FIG. 12.

Reference symbol for communication Y1201 may include a region for transmitting data. The region for transmitting data may include data for identifying whether the transmission signal is transmitting a signal for communication or transmitting a signal for object detection.

Although the naming "reference symbol for communication" Y1201 is used, the naming of such a symbol is not limited to this example. Reference symbol for communication Y1201 may be referred to as a pilot symbol, training symbol, training field, preamble, control information symbol, mid-amble, etc.

FIG. 13 illustrates one example of a frame configuration of a modulated signal transmitted by apparatus Y1101. In FIG. 13, elements that operate the same as in FIG. 12 have the same reference signs, and as they have already been described above, repeated description will be omitted.

As described in Embodiment 1, based on information indicating to start operations for object detection or information indicating to start recording a still image or video included in control signal Y100, apparatus Y1101 first transmits reference symbol for communication Y1201.

Note that information indicating to start operations for object detection or information indicating to start recording a still image or video may be implemented by a user pressing a button included in apparatus Y1101, a user touching a touch panel included in apparatus Y1101, a user pressing a shutter button included in apparatus Y1101, or a user pressing a record start button included in apparatus Y1101.

Apparatus Y1101 then transmits "modulated signal for object detection or modulated signal for estimating distance to object" Y1302.

As a result of apparatus Y1101 transmitting a modulated signal like in FIG. 13, terminal Y1103 and AP Y1104 in FIG. 11 detect reference symbol for communication Y1201 illustrated in FIG. 13, whereby they know that a modulated signal is present in the first frequency band. Accordingly, when terminal Y1103 and AP Y1104 detect reference symbol for communication Y1201, they temporarily suspend modulated signal transmission. When terminal Y1103 and AP Y1104 cease to detect reference symbol for communication Y1201, they can resume modulated signal transmission.

By implementing the above, a situation in which a modulated signal transmitted by apparatus Y1101 and a modulated signal transmitted by terminal Y1103 or AP Y1104 interfere with one another can be inhibited from occurring, which makes it possible to achieve the advantageous effects of an improvement in data reception quality in communication between terminal Y1103 and AP Y1104 and an improvement in accuracy of distance estimation and object recognition performed by apparatus Y1101.

The frame configuration illustrated in FIG. 13 is merely one example; the frame configuration may include other modulated signals.

Hereinafter, a sensing method that uses radio waves will be described by way of examples. An apparatus that implements the sensing method that uses radio waves to be described in the following embodiment may use the sensing method in combination with processing that uses sensing data obtained from a sensor having an image capturing function such as a camera as described in Embodiments 1 and 2. Conversely, an apparatus that implements the sensing method that uses radio waves to be described in the following embodiment need not use the sensing method in combination with processing that uses sensing data obtained from a sensor having an image capturing function such as a camera.

As used herein, implementation of a sensing method that uses radio waves without being combined with processing that uses sensing data obtained from a sensor having an image capturing function such as a camera does not refer only to a case in which an apparatus that does not include a camera performs sensing using radio waves. For example, an apparatus that includes a camera, such as a smartphone, may capture an image or perform sensing for distance measuring using one or more cameras, and may separately perform sensing that uses radio waves using, for example, a wireless communication unit or wireless communication radar. In order for an apparatus that includes a camera, such as a smartphone, to control the capturing of an image or the performing of sensing for distance measuring using one or more cameras, the apparatus may refrain from using the sensing result of the sensing that uses radio waves using, for example, a wireless communication unit or wireless communication radar, and in order for the apparatus to control the sensing that uses radio waves using, for example, a wireless communication unit or wireless communication radar, the apparatus may refrain from using the sensing result of the capturing of an image or the performing of sensing for distance measuring using one or more cameras, and on the other hand, the apparatus may use a combination of both sensing results in a single application.

Embodiment 3

In the present embodiment, for example, a system includes one or more of an apparatus that performs communication, an apparatus that performs sensing, and an apparatus that performs communication and sensing. First, configurations of, for example, an apparatus that performs sensing and an apparatus that performs communication and sensing will be described.

FIG. 14 illustrates one example of a configuration of apparatus X100 that performs sensing that transmits a signal for sensing and receives a signal for sensing that has reflected off an object in the surrounding area and returned.

Transmitting apparatus X101 generates transmission signals X102_1 through X102_M as signals for sensing, and transmits transmission signals X102_1 through X102_M from antennas X103_1 through X103_M, respectively. In this example, the number of antennas used for transmission is M, where M is an integer that is greater than or equal to 1 or greater than or equal to 2.

For example, transmitting apparatus X101 may generate transmission signals X102_1 through X102_M by multiplying the same sensing signal by coefficients determined for each antenna, and transmit transmission signals X102_1 through X102_M from antennas X103_1 through X103_M to perform directionality control for the sensing signals. Moreover, for example, transmitting apparatus X101 may generate transmission signals X102_1 through X102_M by multiplying a plurality of sensing signals with coefficients determined for each of the sensing signals and each of the antennas, and combining them, and transmit the generated transmission signals X102_1 through X102_M from antennas X103_1 through X103_M. This makes it possible to perform directionality control for each sensing signal. Coefficients determined for each antenna or coefficients determined for each sensing signal and each antenna are expressed as complex numbers or integers. Depending on the value of the coefficient, the amplitude and/or phase of the sensing signal transmitted from each antenna differs. However, the coefficient may be 1, and in this case, a sensing signal generated by transmitting apparatus X101 is transmitted as-is from the antenna whose coefficient value is 1.

Note that transmitting apparatus X101 may transmit transmission signals without performing directionality control. For example, transmission signals of antennas corresponding to each of the plurality of sensing signals may be output by transmitting apparatus X101 as-is from antennas X103_1 through X103_M. Although there are a plurality of sensing signals and a plurality of antennas in the above example, the number of sensing signals generated by transmitting apparatus X101 and the number of antennas that transmit sensing signals may be one.

Sensing signals transmitted from antennas X103_1 through X103_M are reflected off object #1 X110_1 and object #2 X110_2, and the reflected sensing signals are received by antennas X104_1 through X104_N included in apparatus X100. In this example, the number of antennas that receive sensing signals is N, where N is an integer that is greater than or equal to 1 or greater than or equal to 2. The number of antennas used for transmission, M, may be the same as or different than the number of antennas used for reception, N.

Reception signals X105_1 through X105_N received by antennas X104_1 through X104_N are input into receiving apparatus X106. For example, receiving apparatus X106 implements, on reception signals X105_1 through X105_N, filter processing of extracting only a frequency range or channel components in a frequency range in which the sensing signals are transmitted, frequency conversion processing of conversion from a wireless communication frequency band to an intermediate frequency band (IF band) or frequency band of a baseband signal, and/or weighting synthesis processing on N reception signals, and outputs estimation signal X107.

Coefficients used in the weighting synthesis performed on the N reception signals can be set for each of reception signals X105_1 through X105_N, and reception directionality control can be performed by changing the coefficient values. The coefficients may be estimated in advance, and, alternatively, using reception signals X105_1 through X105_N, the coefficients may be set so as yield an amplitude or signal-to-noise power ratio (SNR) of weighting-synthesized sensing signal components that are larger than when a different coefficient is used, or set so as to exceed a predetermined threshold. Moreover, by using a plurality of groups of N coefficients corresponding to reception signals X105_1 through X105_N, receiving apparatus X106 may simultaneously obtain signals having a directionality that corresponds to each group of coefficients. However, it is possible to carry out the above without performing weighting synthesis.

Estimator X108 performs estimation processing related to the sensing environment, i.e., the surrounding environment, using estimation signal X107. The estimation processing performed by estimator X108 will be described in greater detail later.

Control signal X109 is input into transmitting apparatus X101, receiving apparatus X106, and estimator X108, and instructs transmitting apparatus X101, receiving apparatus X106, and estimator X108 in regard to the implementation of sensing, control of the sensing area, and control of sensing timing.

This concludes the description related to one example of a configuration of apparatus X100 according to the present embodiment.

Although FIG. 14 illustrates an example in which signals generated by apparatus X100 are transmitted from M antennas and signals received by N antennas are signal processed by receiving apparatus X106, the configuration of an apparatus that implements the sensing method described in the present embodiment is not limited to this example.

For example, a transmit antenna unit for transmitting signals may be configured of a plurality of antenna units each of which includes a plurality of antennas. Here, the plurality of antenna units may have the same directionality and directionality control function, and, alternatively, the range in which directionality control can be performed may differ from antenna unit to antenna unit. In such cases, a single transmitting apparatus X101 may be configured to select, from among the plurality of antenna units, an antenna unit for transmitting sensing signals, and, alternatively, sensing signals may be transmitted simultaneously from the plurality of antenna units. Moreover, transmitting apparatus X101 may be configured to switch between transmitting a single sensing signal from a single antenna unit and transmitting sensing signals simultaneously from a plurality of antenna units. Moreover, apparatus X100 may include a plurality of transmitting apparatuses X101, and may include a transmitting apparatus X101 for each antenna unit.

Reception signals X105_1 through X105_N received by antennas X104_1 through X104_N are input into receiving apparatus X106. For example, receiving apparatus X106 implements, on reception signals X105_1 through X105_N, filter processing of extracting only a frequency range or channel components in a frequency range in which the sensing signals are transmitted, frequency conversion processing of conversion from a wireless communication frequency band to an intermediate frequency band (IF band) or frequency band of a baseband signal, and/or weighting synthesis processing on N reception signals, and outputs estimation signal X107.

Coefficients used in the weighting synthesis performed on the N reception signals can be set for each of reception signals X105_1 through X105_N, and reception directionality control can be performed by changing the coefficient values. Coefficients may be estimated in advance, and, alternatively, using reception signals X105_1 through X105_N, coefficients may be set so as yield an amplitude or SNR of weighting-synthesized sensing signal components that are larger than when a different coefficient is used, or set so as to exceed a predetermined threshold. Moreover, by using a plurality of groups of N coefficients corresponding to reception signals X105_1 through X105_N, receiving apparatus X106 may simultaneously obtain signals having a directionality that corresponds to each group of coefficients. However, it is possible to carry out the above without performing weighting synthesis.

Estimator X108 performs estimation processing related to the sensing environment, i.e., the surrounding environment, using estimation signal X107. The estimation processing performed by estimator X108 will be described in greater detail later.

Control signal X109 is input into transmitting apparatus X101, receiving apparatus X106, and estimator X108, and instructs transmitting apparatus X101, receiving apparatus X106, and estimator X108 in regard to the implementation of sensing, control of the sensing area, and control of sensing timing.

This concludes the description related to one example of a configuration of apparatus X100 according to the present embodiment.

Although FIG. 14 illustrates an example in which signals generated by apparatus X100 are transmitted from M antennas and signals received by N antennas are signal processed by receiving apparatus X106, the configuration of an apparatus that implements the sensing method described in the present embodiment is not limited to this example.

For example, a transmit antenna unit for transmitting signals may be configured of a plurality of antenna units each of which includes a plurality of antennas. Here, the plurality of antenna units may have the same directionality and directionality control function, and, alternatively, the range in which directionality control can be performed may differ from antenna unit to antenna unit. In such cases, a single transmitting apparatus X101 may be configured to select, from among the plurality of antenna units, an antenna unit for transmitting sensing signals, and, alternatively, sensing signals may be transmitted simultaneously from the plurality of antenna units. Moreover, transmitting apparatus X101 may be configured to switch between transmitting a single sensing signal from a single antenna unit and transmitting sensing signals simultaneously from a plurality of antenna units. Moreover, apparatus X100 may include a plurality of transmitting apparatuses X101, and may include a transmitting apparatus X101 for each antenna unit.

Similarly, a receive antenna unit transmitting signals may be configured of a plurality of antenna units each of which includes a plurality of antennas. Here, the plurality of antenna units may have the same directionality control capabilities such as directionality control range and directionality control accuracy, and, alternatively, directionality control capabilities may differ from antenna unit to antenna unit. Moreover, the plurality of antenna units may be disposed so as to have the same directionality control capabilities such as directionality control range and directionality control accuracy, but so that the spatial area in which directionality control can be performed differs. Here, a configuration in which a single receiving apparatus X106 selects and uses an antenna unit for obtaining reception signals from among a plurality of antenna units may be implemented, and, alternatively, a configuration in which signals received from a plurality of antenna units are signal processed simultaneously may be implemented. Moreover, receiving apparatus X106 may be configured to switch between whether to signal process only a reception signal received from a single antenna unit or whether to simultaneously signal process reception signals received from a plurality of antenna units. Moreover, apparatus X100 may include a plurality of receiving apparatus X106, and may include a receiving apparatus X106 for each antenna unit.

Apparatus X100 may include a plurality of antennas that can be used for both transmission and reception of signals, rather than a plurality of transmit antennas and a plurality of receive antennas. In such cases, apparatus X100 may be capable of selectively switching each antenna between transmission use and reception use, and may switch a plurality of antennas between transmission use and reception use over time.

Apparatus X100 may include a transmission and reception antenna unit that can be used commonly for both signal transmission and reception. Here, the transmission and reception antenna unit may include a plurality of antenna units, and each antenna unit may be switched between transmission use and a reception use. Apparatus X100 may include a selector that selects and switches antenna units to be used to transmit a signal generated by transmitting apparatus X101 and antenna units to be used to receive a signal applied with signal processing by receiving apparatus X106.

Note that when sensing signals are transmitting simultaneously using a plurality of antenna units, the directionalities of the signals transmitted from each antenna unit may be the same and, alternatively, may be different. When apparatus X100 transmits sensing signals using the same directionality from a plurality of antenna units, there is a possibility that the distance that the sensing signals can reach or the distance to a reflection point at which the reflected sensing signals are receivable can be increased.

Note that the number of antennas included in the antenna unit in the above description may be the same across all antenna units and may differ from antenna unit to antenna unit.

Next, the estimation processing performed by estimator X108 will be described by way of example.

For example, estimator X108 estimates the distance between the apparatus it is included in (hereinafter also referred to as a host apparatus) and an object that reflected a sensing signal. The estimation of the distance between the host apparatus and an object that reflected a sensing signal can be calculated by, for example, detecting an amount of delay between the time of transmission and time of reception of the sensing signal, and multiplying the amount of delay by a propagation speed of electromagnetic waves. Estimator X108 may estimate the direction of arrival of a reception signal, that is to say, the direction in which an object that reflected a sensing signal is present, using a direction of arrival estimation method such as multiple signal classification (MUSIC). In addition to the distance between the host apparatus and an object, estimator X108 is capable of estimating the position of an object that reflected a transmitted signal by estimating the direction. Estimator X108 is capable of estimating the position of an object by triangulation using, for example, a direction of arrival estimation method such as MUSIC, the position of the transmit antenna, the position of the receive antenna, and the direction of transmission directionality control. Using the reception signal, estimator X108 may detect, for example, the object, movement of the object, material properties of the object, etc.

The position of the object may be expressed using a polar coordinate system, and may be expressed using a three-dimensional Cartesian coordinate system. The origin of the coordinate system may be, for example, an arbitrary position in apparatus X100, and the axes in the coordinate system may be oriented arbitrarily. When a device including apparatus X100 includes a plurality of wireless communication sensors or other distance sensors having the same or different configuration as apparatus X100 in addition to apparatus X100, the origin and axes of the coordinate system of the data obtained by each sensor may be the same across all sensors and may be unique to each sensor. Estimator X108 may output position information expressed in the unique coordinate system described above as-is, and, alternatively, may convert the coordinate system to the coordinate system used in common by all devices. The converted coordinate system may be a coordinate system unique to the devices, and, alternatively, may be a common coordinate system used by other devices such as a coordinate system used by three-dimensional map data used by a device.

Estimator X108 may estimate, in each of a plurality of directions, distance to an object that reflected a signal, and obtain three-dimensional coordinates for the plurality of estimated reflection positions as a point cloud. The data format of the plurality of distance measuring results obtained by estimator X108 need not be a point cloud format including three-dimensional coordinate values, and may be, for example, a distance image or some other format. When a distance image format is used, a position (the coordinates) in a two-dimensional plane in the distance image corresponds to the direction of arrival of the reception signal from the perspective of the host apparatus, and distances to an object in directions corresponding to each pixel position in the image are stored as pixel sample values.

Estimator X108 may further perform recognition processing such as estimating the shape of the object using the above-described point cloud data or distance image data. For example, estimator X108 can estimate the shape of the object based on one or more close points that are distanced within a predetermined range, or by extracting a plurality of points or image regions determined to be of the same object, and estimating the shape of the object based on the one point, the positional relationship of the plurality of points, or the shapes of the image regions. Estimator X108 may perform identification of the sensed object as the recognition processing that uses the result of the estimation of the shape of the object. In such cases, estimator X108 may identify whether the object in the sensing range is a person or some other animal, and may perform identification that classifies the object. Note that the recognition processing performed by estimator X108 may be processing performed for purposes other than object identification. For example, as the recognition processing, estimator X108 may detect the number of people or number of vehicles, etc., in the sensing range, and, for example, may estimate the position or orientation of the face of a detected person. As an example of recognition processing that differs from the above-described recognition processing, estimator X108 may perform processing such as face authentication that determines whether the shape of a detected person's face matches a person registered in advance, or determines who the detected person is.

Estimator X108 may measure the distance between the host apparatus and an object a plurality of times at different points in time, and obtain a temporal change in the distance between the host apparatus and the object or a temporal change in the position of a detected point. In such cases, estimator X108 may estimate the speed or acceleration or the like of a moving object, as recognition processing that uses temporal change in the distance between the host apparatus and the object or a temporal change in the position of a detected point. For example, estimator X108 may estimate the speed or direction of movement of a vehicle driving in the sensing range. Note that recognition processing that is performed by estimator X108 using the temporal change in distance or position of a detected point may be used for the purpose of something other than estimation of the speed or acceleration or the like of the object. For example, by estimator X108 detecting whether a detected person performed a specific action based on change in posture of the person, apparatus X100 may be used as a gesture input device for an electronic device such as a smartphone, tablet, or personal computer.

The above-described estimation of the speed of a moving object may be derived by comparing the frequency of the transmitted sensing signal to the frequency of the received reflected signal, and estimating a change in frequency caused by the Doppler effect on the reflected signal.

Next, the sensing signal used by transmitting apparatus X101 and receiving apparatus X106 will be described by way of example.

Apparatus X100 may transmit the pulse signal disclosed in S. Schuster, S. Scheiblhofer, R. Feger, and A. Stelzer, "Signal model and statistical analysis for the sequential sampling pulse radar technique," in Proc. IEEE Radar Conf, 2008, pp. 1-6, 2008 and D. Cao, T. Li, P. Kang, H. Liu, S. Zhou, H. Su, "Single-Pulse Multi-Beams Operation of Phased Array Radar", 2016 CIE International Conference on Radar (RADAR), pp. 1-4, 2016 as the signal for sensing. Apparatus X100 transmits the pulse signal in a frequency range used for sensing, and measures the distance to an object that reflected the sensing signal based on the amount of delay between the transmission time of the pulse signal and the reception time of the reflected signal.

As another example of the signal for sensing, apparatus X100 may use a signal conforming to a frequency modulated continuous wave (FMCW) scheme or a phase modulated continuous wave (PMCW) scheme disclosed in A. Bourdoux, K. Parashar, and M. Bauduin, "Phenomenology of mutual interference of FMCW and PMCW automotive radars," in 2017 IEEE Radar Conference (Radar Conf.), pp. 1709-1714, 2017. A FMCW signal is a signal obtained by converting a chirp signal in which the frequency changes with time, to a wireless communication frequency. As estimation processing that uses a FMCW signal, estimator X108 superimposes a signal transmitted from apparatus X100 and a signal received by receiving apparatus X106 using a mixer. As a result, the superimposed signal becomes a signal having an intermediate frequency relative to the frequency of the reception signal, which is dependent on the time of flight of the reception signal, and as such, distance to the object that reflected the FMCW signal is measured by detecting a frequency component included in the superimposed signal.

As another example of the signal for sensing, apparatus X100 may use a signal obtained by frequency converting a modulated signal having a predetermined frequency to a signal of a frequency range used in sensing. In such cases, estimator X108 can, for example, estimate the distance to an object that reflected a signal for sensing, based on a difference between the phase of the modulation component of the signal transmitted from apparatus X100 and the phase of the modulation component of the signal received by receiving apparatus X106. Moreover, estimator X108 may detect variations in frequency caused by the Doppler effect up until the sensing signal is received after being reflected and estimating the movement speed and direction of a moving object by comparing the frequency of the transmitted modulated signal and the frequency of the received modulated signal. Note that there may be a plurality of frequency components included in the modulated signal, and for example, an OFDM signal including a plurality of frequency components may be used as the modulated signal disclosed in J. Fink, F. K. Jondral, "Comparison of OFDM radar and chirp sequence radar," in 2015 16th International Radar Symposium (IRS), pp. 315-320, 2015.

Note that examples of the signal for sensing are not limited to the above examples. The signal for sensing may be a signal modulated using a modulation method, may be an unmodulated carrier, or some other signal.

As described above, apparatus X100 may simultaneously transmit a plurality of sensing signals using a plurality of antennas, and may simultaneously transmit a plurality of sensing signals using a plurality of antenna units each of which includes a plurality of antennas.

The present embodiment describes an example in which distance is measured from the difference between the transmission time of the sensing signal and the reception time of the reflected signal, as the estimation processing performed by estimator X108. However, the estimation processing performed by estimator X108 is not limited to the above example. For example, estimator X108 may estimate a transmission path state from the received reflected signal, and perform recognition processing based on a temporal change in estimated transmission path state, an average value of past estimated transmission path states, or comparison with a feature amount, to determine whether an object is present in the sensing range or detect the presence or absence of movement of an object. Moreover, estimator X108 may detect, for example, the presence or absence of rainfall based on an attenuation status of the reception signal.

The present embodiment also described an example in which reflected waves of a transmitted sensing signal are used in sensing. However, performing sensing using a sensing signal is not limited to the apparatus that transmits the sensing signal. For example, receiving apparatus X106 included in apparatus X100 may receive a sensing signal transmitted from another apparatus, and estimator X108 may determine whether the other apparatus is in a range in which the sensing signal will reach based on the reception signal, and estimate the direction in which the other apparatus is present. Estimator X108 may also estimate the distance to the other apparatus based on the signal strength of the received sensing signal. Moreover, transmitting apparatus X101 included in apparatus X100 may transmit a sensing signal so that another apparatus can use it in performing sensing. The sensing signal transmitted in such cases may be a sensing signal transmitted for sensing by the host apparatus using reflected waves and may be a sensing signal cyclically transmitted for use in sensing by another apparatus. When apparatus X100 receives a sensing signal transmitted from another apparatus, apparatus X100 may use transmitting apparatus X101 to transmit a sensing signal in the direction in which the reception signal was received. Note that the sensing signal transmitted to another apparatus may be transmitted without performing directionality control.

Although FIG. 14 illustrates an example in which apparatus X100 that performs sensing receives signals reflected off object #1 and object #2, signals obtained after reflecting off object #1 and object #2 and further reflecting off some other object(s) or matter may be obtained by apparatus X100 that performs sensing and object detection may be performed, distance to the object may be estimated, and the position of the object may be estimated, etc.

Next, an example of a sensing method that uses radio waves that differs from the example illustrated in FIG. 14 will be given.

FIG. 15 illustrates one example of a configuration of apparatus X200 that performs sensing using, for example, radio waves. Elements in FIG. 15 that have the same function as in FIG. 14 have the same reference signs, and detailed description thereof will be omitted.

Apparatus X200 differs from apparatus X100 in that apparatus X200 performs sensing using a modulated signal for sensing and/or a modulated signal for communication. One feature is that, for example, apparatus X200 transmits a signal, and as a result of a terminal, which is a communication partner, observing changes in the signal transmitted by apparatus X200, estimates the position of, size of, and distance to an object (for example, object #1 in FIG. 15). Note that when apparatus X200 is transmitting a modulated signal for communication, data communication with the terminal is also possible. Hereinafter, a case in which sensing is performed using a modulated signal for communication will be described.

Transmitting apparatus X201 receives inputs of control signal X109 and transmission data X210, and generates transmission signals for communication X202_1 through X202_M by implementing error correction coding processing, modulation processing, precoding, multiplexing processing, etc. Apparatus X200 respectively transmits transmission signals X202_1 through X202_M from antennas X103_1 through X103_M.

The number of transmission signals and the number of antennas used to transmit the transmission signals is the same as described with reference to FIG. 14, that is to say, may be two or more and, alternatively, may be one. The example in FIG. 15 differs from the example in FIG. 14 in that while the transmission signal in FIG. 14 includes a sensing signal component, the transmission signal in FIG. 15 includes a component of a signal of modulated transmission data, but the aspect that directionality control can be performed using coefficients used by transmitting apparatus X201 in weighting synthesis processing for generating the transmission signal is the same as with the example illustrated in FIG. 14. Moreover, just like apparatus X100, apparatus X200 may include a single antenna unit that includes a plurality of antennas, and, alternatively, may include a plurality of antenna units.

Note that when directionality control is performed, transmitting apparatus X101 described with reference to FIG. 14 performs transmission directionality control in the direction in which sensing is to be performed, but transmitting apparatus X201 in FIG. 15 performs transmission directionality control to improve communication quality with the terminal that is the communication partner. However, transmitting apparatus X201 may perform transmission signal directionality control toward the direction in which sensing is to be performed, and the terminal that is the communication partner may use the signal transmitted by apparatus X200 to perform sensing and further perform directionality control so as to achieve a desired sensing result. When transmitting apparatus X201 performs directionality control for sensing to be performed by the terminal, transmitting apparatus X201 transmits a signal using a coefficient specified by the terminal. The signal transmitted in such cases may include a signal component modulated using transmission data, and, alternatively, need not include a signal component modulated using transmission data. A signal that does not include a signal component modulated using transmission data is, for example, a signal modulated using a value known by the terminal such as a preamble or reference signal. Moreover, transmitting apparatus X201 may use different directionality control when transmitting a signal including a signal component modulated using transmission data and when transmitting a signal that does not include a signal component modulated using transmission data.

Note that the terminal both obtains data and performs sensing by receiving the modulated signal transmitted by apparatus X200.

Moreover, the terminal transmits a signal, and by apparatus X200, which is the communication partner, observing changes in the signal transmitted by the terminal, apparatus X200 may estimate, for example, the position of, size of, distance to, classification of, and material property of an object (for example, object #1 in FIG. 15). Note that when the terminal is transmitting a modulated signal for communication, data communication with apparatus X200 is also possible.

For example, apparatus X200 receives modulated signals transmitted by terminal using antennas X104_1 through X104_N. Receiving apparatus X206 receives control signal X109 and reception signals X205_1 through X205_N as inputs, and obtains reception data by performing demodulation processing and error correction decoding processing, etc. Receiving apparatus X206 outputs, as estimation signal X207, transmission path characteristics and the like obtained via the reception processing.

Coefficients used in the weighting synthesis performed on the N reception signals can be set for each of reception signals X105_1 through X105_N, and reception directionality control can be performed by changing the coefficient values. The coefficients may be estimated in advance, and, alternatively, using reception signals X105_1 through X105_N, the coefficients may be set so as yield an amplitude or SNR of weighting-synthesized sensing signal components that are larger than when a different coefficient is used, or set so as to exceed a predetermined threshold. Moreover, by using a plurality of groups of N coefficients corresponding to reception signals X105_1 through X105_N, receiving apparatus X206 may simultaneously obtain signals having a directionality that corresponds to each group of coefficients.

Estimator X208 receives inputs of control signal X109 and estimation signal X207, and performs estimation processing using estimation signal X207. Estimator X208 estimates the surrounding environment, such as whether an object is present or not in the surrounding area, based on, for example, transmission path characteristics included in estimation signal X207. Estimator X208 may detect the movement of an object or the approach of an object or the like based on change in the transmission path characteristics with time. Estimator X208 may estimate the direction of arrival of a reception signal, that is to say, estimate the direction in which an object that reflected the sensing signal is present using a direction of arrival estimation method such as MUSIC. Estimator X208 may estimate the position of an object by performing triangulation using a direction of arrival estimation method such as MUSIC, antenna position (for example, the position of the transmitting apparatus and the position of the receiving apparatus), and the direction of the transmission directionality control. Using the reception signal, estimator X208 may detect, for example, the object, movement of the object, material properties of the object, etc.

Estimator X208 implements the above-described estimation processing by implementing, on estimation signal X207, signal processing in accordance with what is to be detected, such as the presence or absence of the above-described object or the presence or absence of movement of the object. Here, the estimation processing is performed based on a determination result of whether a feature amount extracted via the signal processing exceeds a predetermined threshold or not. The estimation processing may be performed based on signal processing other than the signal processing described in the above example. For example, the estimation processing may be performed using a model created via machine learning using a multi-layer neural network. When a model created via machine learning using a multi-layer neural network is used in the estimation processing, estimator X208 may perform predetermined preprocessing on estimation signal X207, and the preprocessed data may be input into the model created via machine learning using a multi-layer neural network. Moreover, estimator X208 may use information such as the frequency range or channel number in the frequency range that is used for communication. Moreover, estimator X208 may use the address of the communication apparatus that transmitted the reception signal for communication or the address of the communication apparatus that is a destination of the signal. In this way, by using information related to the reception signal for communication, such as the frequency range or the address of the communication apparatus, it is possible to compare positions of communication apparatuses that transmitted the signals or signals for communication having the same or similar conditions in regard to, for example, the directionality used when transmitting the signals, and thus there is a possibility that estimation accuracy can be improved.

The above described a case in which sensing is performed using a signal for communication transmitted by a communication partner. Although FIG. 15 illustrates an example in which, in apparatus X200, the configuration for implementing transmission processing, i.e., transmitting apparatus X201 and antennas X103_1 through X103_M differs from the configuration for implementing reception processing, i.e., receiving apparatus X206 and antennas X104_1 through X104_N, the configuration of apparatus X200 is not limited to this example. For example, transmitting apparatus X201 and receiving apparatus X206 may be implemented as a single element, and a plurality of antennas may be used for both transmission and reception. Moreover, just like with the description made with reference to FIG. 14, the plurality of antennas for transmission in apparatus X200 may be configured of a plurality of antenna units, and the plurality of antennas for reception in apparatus X200 may be configured of a plurality of antenna units. Moreover, the plurality of antennas for transmission and the plurality of antennas for reception may be configured as a transmission and reception antenna unit.

Moreover, a signal for sensing may be used instead of a signal for communication. In other words, a first apparatus may use a signal for sensing transmitted by another apparatus to estimate, for example, the position of, size of, distance to, classification of, and material property of an object (for example, object #1 in FIG. 15).

The sensing method that uses a signal for communication may also be used for the same purpose as the example described with reference to FIG. 14 in which a sensing signal is transmitted to another apparatus. In other words, apparatus X200 may use a signal for communication transmitted from another apparatus such as a terminal for not only sensing the surrounding environment from transmission path characteristics and the like of the signal, but for determining whether the other apparatus is in a range in which the signal for communication will reach or estimating the direction in which the other apparatus is present as well.

Note that apparatus X200 may perform only demodulation operations without performing sensing operations when receiving a modulated signal for communication transmitted by a, for example, terminal that is a communication partner.

Next, the apparatus that performs communication and sensing will be described.

FIG. 16 illustrates one example of a configuration of an apparatus that performs communication and sensing. Elements in FIG. 16 that have the same function as in FIG. 14 and FIG. 15 have the same reference signs, and detailed description thereof will be omitted.

Apparatus X300 both performs sensing using a modulated signal for sensing and sensing using a modulated signal for communication. Accordingly, transmitting apparatus X301 included in X300 includes a function for transmitting a signal for sensing, just like transmitting apparatus X101, and a function for transmitting a signal for communication to another communication apparatus, just like transmitting apparatus X201. Moreover, receiving apparatus X306 included in apparatus X300 includes a function for receiving a signal for sensing, just like receiving apparatus X106, and a function for receiving a signal for communication transmitted by another communication apparatus, just like receiving apparatus X206. Moreover, estimator X308 performs both estimation processing that uses a signal for sensing, just like estimator X108, and estimation processing that uses a signal for communication, just like estimator X208.

When transmitting and/or receiving signals for sensing, processes performed by each element included in apparatus X300 are the same as apparatus X100 illustrated in FIG. 14, and when transmitting and/or receiving signals for communication, processes performed by each element included in apparatus X300 are the same as apparatus X200 illustrated in FIG. 15.

Although FIG. 16 illustrates an example in which, in apparatus X300, the configuration for implementing transmission processing, i.e., transmitting apparatus X301 and antennas X103_1 through X103_M differs from the configuration for implementing reception processing, i.e., receiving apparatus X306 and antennas X104_1 through X104_N, the configuration of apparatus X300 is not limited to this example. For example, transmitting apparatus X301 and receiving apparatus X306 may be implemented as a single element, and one or more or a plurality of antennas may be used for both transmission and reception.

Moreover, apparatus X300 may include a transmitting apparatus for sensing that is separate from a transmitting apparatus for communication. In such cases, the transmitting apparatus for communication and the transmitting apparatus for sensing may switchedly use the same one or more or a plurality of antennas, and, alternatively, may include one or more or a plurality of dedicated communication antennas and one or more or a plurality of dedicated sensing antennas. Note that transmitting apparatus X301 that transmits both signals for communication and signals for sensing may switch between transmitting a signal for sensing and transmitting a modulated signal for communication based on mode information included in control signal X309 and transmit the signals from an antenna, that is to say, may include a mode for transmitting signals for sensing and a mode for transmitting modulated signals for communication. Moreover, transmitting apparatus X301 that transmits both signals for communication and signals for sensing may transmit a signal that is a combination of a signal for sensing and a modulated signal for communication.

Moreover, apparatus X300 may include a receiving apparatus for sensing that is separate from a receiving apparatus for communication. In such cases, the receiving apparatus for communication and the receiving apparatus for sensing may switchedly use the same one or more or a plurality of antennas, and, alternatively, may include one or more or a plurality of dedicated communication antennas and one or more or a plurality of dedicated sensing antennas. Moreover, apparatus X300 may include a transmitting apparatus for communication, a transmitting apparatus for sensing, a receiving apparatus for communication and a receiving apparatus for sensing that are separate from one another. Moreover, apparatus X300 may include a transceiver apparatus for communication and a transceiver apparatus for sensing. Moreover, apparatus X300 may include a transceiver apparatus for communication, a transmitting apparatus for sensing, and a receiving apparatus for sensing.

In the present embodiment as well, just as described with reference to FIG. 14 and FIG. 15, one or more or a plurality of transmit antennas may be configured of one or more or a plurality of antenna units, and one or more or a plurality of receive antennas may be configured of one or more or a plurality of antenna units. Moreover, one or more or a plurality of transmit antennas and one or more or a plurality of receive antennas may be configured as a common transmission and reception antenna unit.

Using the above-described apparatus configuration makes it possible to implement embodiments to be described hereinafter, which in turn makes it possible to achieve the advantageous effects described in each embodiment. Hereinafter, implementation methods will be described in more detail by way of examples.

Embodiment 4

The present embodiment will give one example of a sensing method used when sensing is performed by an access point (AP) or terminal having a wireless communication function.

FIG. 17 illustrates one example of a system configuration according to the present embodiment. In FIG. 17, Z100 indicates an access point (AP), and Z101_1, Z101_2, and Z101_3 each indicate a terminal that wirelessly communicates with the AP. Although each terminal is exemplified as communicating with the AP in FIG. 17, each terminal may also have a function for communicating with other terminals.

FIG. 18 illustrates one example of a configuration of an apparatus capable of communication and sensing that AP Z100 and terminals Z101_1, Z101_2, and Z101_3 include. The apparatus illustrated in FIG. 18 performs sensing using one or a plurality of frequency ranges that can be used for communication, just like apparatus X300 illustrated in FIG. 16 and described in Embodiment 3, and one or a plurality of channels included in each of the one or a plurality of frequency ranges.

The apparatus illustrated in FIG. 18 includes transceiver Z201, sensing unit Z202, transmission and reception antenna unit Z203, transmission signal selector Z204, reception signal selector Z205, and controller Z206.

Transceiver Z201 transmits and receives signals for communication. Processing for transmitting and receiving signals for communication performed by the transceiver is the same as the transmission processing performed by transmitting apparatus X201 and the reception processing performed by receiving apparatus X206 that are described in Embodiment 3.

Sensing unit Z202 performs sensing based on a reception signal. Sensing unit Z202 may implement a sensing method in which the signal for sensing described in Embodiment 3 is transmitted and a received reflected signal is used for sensing, and may implement a sensing method in which a signal for communication received from another communication apparatus such as a terminal or AP is used for sensing, which is also described in Embodiment 3. Moreover, sensing unit Z202 may implement both a sensing method that transmits a sensing signal and a sensing method that transmits a received signal for communication. When a sensing method that transmits a sensing signal is implemented, sensing unit Z202 performs the same processing as transmitting apparatus X101 described in Embodiment 1, and generates and outputs a signal for sensing. On the other hand, when sensing unit Z202 does not implement a sensing method that transmits a sensing signal and implements a sensing method that uses a signal for communication, sensing unit Z202 need not transmit a signal.

Transmission and reception antenna unit Z203 transmits and receives signals. Transmission signal selector Z204 transmits, from transmission and reception antenna unit Z203, signals generated by transceiver Z201 and sensing unit Z202. Reception signal selector Z205 inputs signals received by transmission and reception antenna unit Z203 into transceiver Z201 and sensing unit Z202. Controller Z206 generates a control signal for controlling operations of transceiver Z201, sensing unit Z202, transmission signal selector Z204, and reception signal selector Z205, and controls the frequency and period to be used for communication and the frequency and period to be used for sensing. Note that transmission signal selector Z204 generates and outputs a signal in accordance with a frame including a combination of a signal for sensing and a signal for communication. Moreover, reception signal selector Z205 generates a signal for communication and a signal for sensing from a reception signal, and outputs both.

FIG. 19 through FIG. 37 illustrate examples of configurations of frames that are transmitted and received by an apparatus according to the present embodiment. In FIG. 19 through FIG. 37, time is represented on the horizontal axis, and in FIG. 19, FIG. 20, and FIG. 22 through FIG. 37, frequency is represented on the vertical axis. The frequency on the vertical axis may be frequency in a single channel in a single frequency range such as a subcarrier of an orthogonal frequency division multiplexing (OFDM) signal, and, alternatively, may be frequency in a plurality of channels in one or more frequency ranges. Moreover, the frequency on the vertical axis may be in a plurality of subcarriers of an OFDM signal that straddles a plurality of channels. Accordingly, a single carrier transmission scheme may be used, and, alternatively, a multicarrier transmission scheme such as OFDM may be used. Moreover, when the frame is used for sensing or when the signal is used for sensing, for example, a pulse signal that is bandlimited may be used, and a tone signal or carrier may be used. Accordingly, when the frames illustrated in FIG. 19 through FIG. 37 are used for communication and/or sensing, the frame illustrated in FIG. 19 need not be a signal that conforms to a single carrier transmission scheme or a signal that conforms to a multicarrier transmission scheme.

The reference symbol illustrated in FIG. 19 through FIG. 37 is a symbol for the apparatus according to the present embodiment to implement sensing. Note that the reference symbol may include a function for the communication partner to perform, for example, signal detection, time synchronization, frequency synchronization, channel estimation, etc. Moreover, the reference symbol may be control information or a media access control (MAC) frame required for procedures to perform data communication.

The control information symbol is, for example, a symbol for notifying of the communication method of the data symbol. Accordingly, the control information symbol includes information such as information indicating the error correction coding method (information indicating coding rate, block length (code length), error correction code), information indicating the modulation method, information indicating the transmitting method (for example, information indicating whether single stream transmission or multi-stream transmission is used) (information indicating modulation and coding scheme (MCS)), information indicating data length, etc.

The data symbol is a symbol for transmitting data to the communication partner.

The guard interval is an interval disposed directly after the reference signal, and is for assisting sensing. For example, the guard interval is provided to avoid interference between signals or symbols disposed before and after the guard interval, or for changing the transmission directionality and/or reception directionality of the symbol before the guard interval and the symbol after the guard interval. For example, a signal need not be present in the guard interval. Note that a guard interval need not be provided in a frame. For example, sensing unit Z202 is used to obtain a reception state of a signal in a state in which the communication apparatus in which sensing unit Z202 is included or another communication apparatus is not transmitting a signal for sensing or a signal for communication in the guard interval.

Note that the frame configurations illustrated in FIG. 19 through FIG. 37 are merely non-limiting examples. For example, some other symbol may be included in the frame. Moreover, a single carrier transmission scheme or a multi-carrier transmission scheme such as OFDM may be used when transmitting the frame.

The reference symbol may include a region for transmitting data. The region for transmitting data may include data for identifying whether the transmission signal is transmitting a signal for communication or transmitting a signal for object detection.

Although the naming "reference symbol" is used herein, the naming is not limited to this example. The reference symbol may be referred to as a pilot symbol, a training symbol, and training field, a preamble, a control information symbol, or a mid-amble or the like. For example, sensing may be implemented using a pilot symbol, training symbol, training field, preamble, control information symbol, mid-amble, etc.

FIG. 19 illustrates a frame configuration when the apparatus according to the present embodiment is performing communication.

The frame illustrated in FIG. 19 includes a preamble, a control information symbol, and a data symbol.

FIG. 20 illustrates a frame configuration when the apparatus according to the present embodiment is performing sensing.

A frame configuration when a reference symbol is transmitted for sensing is shown on the left hand side of FIG. 20. The frame on the left hand side of FIG. 20 includes a reference symbol.

The frame configuration on the right hand side of FIG. 20 includes a preamble and a control information symbol in addition to the reference symbol for sensing. The frame shown on the right hand side of FIG. 20 includes a preamble, a control information symbol, and a reference signal.

Even if the apparatus that receives the frame illustrated on the right hand side of FIG. 20 includes only a communication function, by receiving the preamble and the control information symbol, the apparatus can know that a signal for sensing is present, whereby the apparatus can achieve the advantageous effect that it can control the transmission timing of a modulated signal so as not to cause interference. An example of the presence of such a signal is illustrated in FIG. 21.

As illustrated in FIG. 21, it is possible to have a modulated signal for communication and a modulated signal for sensing in a given frequency band.

Note that the apparatus according to the present embodiment may be an apparatus that includes only a communication function that enables for the transmission and reception of the frame illustrated in FIG. 19.

Moreover, the apparatus according to the present embodiment may be an apparatus that includes only a sensing function that enables for the transmission and reception of the frame illustrated in FIG. 20.

The apparatus according to the present embodiment may be an apparatus that performs both processing for communication and processing for sensing in parallel, so as to enable the transmission and reception of the frames illustrated in FIG. 22 through FIG. 37. The frames illustrated in FIG. 22 through FIG. 37 will be described hereinafter. Note that FIG. 22 through FIG. 37 illustrate examples of frames that enable sensing, and there are also cases in which there are frames that enable communication along with sensing. Moreover, in frames FIG. 22 through FIG. 37, there are frames including a guard interval, but the frames may be configured without a guard interval and the embodiment can still be implemented. Consider the state illustrated in FIG. 17 from the viewpoint of the frames illustrated in FIG. 22 through FIG. 37. However, the AP may be considered as a repeater. The frame illustrated in FIG. 22 includes a preamble, a control information symbol, a data symbol, a mid-amble, and a data symbol. In this example, the mid-amble is a symbol for demodulating a data symbol, and/or a symbol for sensing. This applies to other figures as well. Although the preamble is exemplified as being provided for realizing communication, the preamble and/or the control information symbol may be used by the apparatus for sensing. This applies to other figures as well.

The frame illustrated in FIG. 23 includes a preamble, a control information symbol, a data symbol, a mid-amble, and a data symbol. A guard interval is provided between the mid-amble and a data symbol. The symbol before the guard interval and the symbol after the guard interval may have different transmission directionalities. This applies to other figures as well. Moreover, a guard interval may be provided before the mid-amble. Furthermore, the frame need not include a guard interval. This applies to other figures as well.

The frame illustrated in FIG. 24 includes a preamble, a control information symbol, data symbols, and reference signals. The data symbols are disposed in two mutually different frequency bands F81 and F83. The reference signals are disposed in frequency band F82 which differs from the frequency bands in which the data symbols are disposed. More specifically, three reference signals are disposed in frequency band F82, in different time slots. Guard intervals are provided between the reference signals. In other words, three reference signals are disposed with guard intervals provided between adjacent reference signals. Note that the reference signals are used for sensing. This applies to other figures as well. Moreover, the reference signal before a guard interval and the reference signal after the guard interval may have different transmission directionalities. This applies to other figures as well.

When data symbols or reference signals are disposed in two or more frequency bands or two or more channels, multiple access may be employed via orthogonal frequency division multiple access (OFDMA). In such cases, the data symbols or reference signals are disposed in a specified range along the time axis and a specified range along the frequency axis. As used herein, the above-described range is also referred to as a time-frequency resource which is a resource defined by time and frequency. A time-frequency resource in which a symbol including communication data is disposed is also referred to as a resource for communication, and a time-frequency resource in which a symbol for sensing via radio waves is disposed is also referred to as a resource for sensing. This applies hereinafter as well.

The frame illustrated in FIG. 25 includes a preamble, a control information symbol, data symbols, and reference signals. The data symbols are disposed in five mutually different frequency bands F91 through F95. The reference signals are disposed in frequency bands F92 and F94. In frequency bands F92 and F94, a guard interval is provided between the reference signal and a data symbol. Like frequency bands F92 and F94, both data symbols and reference signals may be provided in some frequency resources. Such a configuration makes it possible to achieve the advantageous effect of an improvement in frequency use efficiency. The reference signal and data symbol before and after the guard interval may have different transmission directionalities. This applies to other figures as well.

The frame illustrated in FIG. 26 includes a preamble, a control information symbol, data symbols, and reference signals. The data symbols are disposed in frequency bands F101 and F103 through F105. Three reference signals are disposed in frequency band F102 with guard intervals provided between adjacent reference signals. Moreover, a reference signal is disposed spanning across frequency bands F101 through F105. After that reference signal, data symbols are disposed in frequency bands F101 through F103 and F105, and in frequency band F104, two reference signals are disposed with a guard interval provided therebetween. One characteristic feature is that a high bandwidth reference signal and a low bandwidth reference signal are present. This improves the possibility that highly accurate sensing can be performed.

The frame illustrated in FIG. 27 includes a preamble, a control information symbol, and data symbols destined for different users. The data symbols destined for different users include data symbols destined for user #1, user #2, user #3, and user #4 disposed in frequency bands F111, F112, F113, and F114, respectively. This frame configuration can be considered to be an example of an OFDMA frame. For example, this frame configuration can be considered to be a frame transmitted by an AP or repeater or the like.

The frame illustrated in FIG. 28 includes a preamble, a control information symbol, data symbols destined for different users, and a mid-amble. The data symbols destined for different users include data symbols destined for user #1, user #2, user #3, and user #4 disposed in frequency bands F121, F122, F123, and F124, respectively. The mid-amble is disposed between data symbols destined for users. This frame configuration can be considered to be an example of an OFDMA frame. For example, this frame configuration can be considered to be a frame transmitted by an AP or repeater or the like.

The frame illustrated in FIG. 29 includes a preamble, a control information symbol, data symbols destined for different users, and a mid-amble. The data symbols destined for different users include data symbols destined for user #1, user #2, user #3, and user #4 disposed in frequency bands F131, F132, F133, and F134, respectively. The mid-amble is disposed between data symbols destined for users. A guard interval is provided between the mid-amble and data symbols destined for users. A guard interval may be provided before the mid-amble. This frame configuration can be considered to be an example of an OFDMA frame. For example, this frame configuration can be considered to be a frame transmitted by an AP or repeater or the like.

The frame illustrated in FIG. 30 includes a preamble, a control information symbol, data symbols destined for different users, and reference signals. The data symbols destined for different users include data symbols destined for user #1, user #3, and user #4 disposed in frequency bands F141, F143, and F144, respectively. In frequency band F142, three reference signals are disposed with guard intervals provided between adjacent reference signals. When OFDMA is used, there may be a frequency band that is not used for data symbols destined for users (for example, frequency band F142 in FIG. 30), and in such cases, a reference signal is disposed in the frequency band that is not used for data symbols destined for users. Note that frequency band F142 can be used to transmit a data symbol destined for a given user. For example, this frame configuration can be considered to be a frame transmitted by an AP or repeater or the like. The frame illustrated in FIG. 31 includes a preamble, a control information symbol, data symbols destined for different users, and reference signals. The data symbols destined for different users include data symbols destined for user #1, user #2, user #3, and user #4 disposed in frequency bands F151, F152, F153, and F154, respectively. In frequency band F151, after the data symbol destined for user #1, two reference signals are disposed with a guard interval provided therebetween. In frequency band F152, a reference signal is disposed after the data symbol destined for user #2, and a guard interval is provided after that reference signal.

When OFDMA is used, the length of time that a data symbol destined for a user occupies may differ from user to user, and in such cases, a reference signal is disposed in the frequency band and the span of time that are not used for data symbols destined for users. For example, the length of time that the data symbol destined for user #1 occupies is shorter than the length of time that the data symbol destined for user #4 occupies, so it is possible to use the time after the data symbol destined for user #1 for transmitting a reference symbol. For example, this frame configuration can be considered to be a frame transmitted by an AP or repeater or the like. The frame illustrated in FIG. 32 includes a preamble, a control information symbol, data symbols destined for different users, and reference signals. The data symbols destined for different users include data symbols destined for user #1, user #3, and user #4 disposed in frequency bands F161, F163, and F164, respectively. A reference signal is disposed spanning across frequency bands F161 through F164, and a guard interval is provided after that reference signal. In frequency band F162, a guard interval is provided between reference signals. For example, this frame configuration can be considered to be a frame transmitted by an AP or repeater or the like.

The frame illustrated in FIG. 33 includes a preamble, a control information symbol, data symbols destined for different users, and reference signals. The data symbols destined for different users include data symbols destined for user #1, user #2, user #3, and user #4 disposed in frequency bands F171, F172, F173, and F174, respectively. A reference signal is disposed spanning across frequency bands F171 through F174, and a guard interval is provided after that reference signal. In frequency band F171, a reference signal destined for user #1 is disposed after the guard interval, and another guard interval is disposed after the reference signal. In frequency band F172, a reference signal destined for user #2 is disposed after the guard interval, and another guard interval is disposed after the reference signal. In frequency bands F171 and F172, the length of time that the data symbols destined for users, the reference signals, and the guard intervals occupy are different. For example, this frame configuration can be considered to be a frame transmitted by an AP or repeater or the like.

The frame illustrated in FIG. 34 is an example of a configuration of a frame transmitted by a terminal, such as a configuration of a frame transmitted by a terminal possessed by user #1, and includes a preamble, a control information symbol, and a data symbol (transmitted by the terminal possessed by user #1). The data symbol (transmitted by the terminal possessed by user #1) is disposed in frequency band F181. Frequency band F182 is not assigned to the terminal possessed by user #1. However, frequency band F182 can be used by a terminal possessed by another user (a terminal other than user #1's terminal) to transmit data symbols and reference signals.

The frame illustrated in FIG. 35 is an example of a configuration of a frame transmitted by a terminal, such as a configuration of a frame transmitted by a terminal possessed by user #1, and includes a preamble, a control information symbol, data symbols (transmitted by the terminal possessed by user #1), and reference signals. The data symbols (transmitted by the terminal possessed by user #1) are disposed in frequency band F191. Frequency band F192 is not assigned to the terminal possessed by user #1. A reference signal and a guard interval are provided after a data symbol (transmitted by the terminal possessed by user #1). Another reference signal and another guard interval are also provided after the next data symbol (transmitted by the terminal possessed by user #1). Note that frequency band F192 can be used by a terminal possessed by another user (a terminal other than user #1's terminal) to transmit data symbols and reference signals.

The frame illustrated in FIG. 36 is an example of a configuration of a frame transmitted by a terminal, such as a configuration of a frame transmitted by a terminal possessed by user #1, and includes a preamble, a control information symbol, data symbols (transmitted by the terminal possessed by user #1), and reference signals. Data symbols (transmitted by the terminal possessed by user #1) are disposed in frequency bands F201 and F202. Frequency band F203 is not assigned to the terminal possessed by user #1. In frequency band F201, just like in frequency band F191 illustrated in FIG. 35, a reference signal and a guard interval are provided after a data symbol (transmitted by the terminal possessed by user #1), and another reference signal and another guard interval are also provided after the next data symbol (transmitted by the terminal possessed by user #1). In frequency band F202, just like in frequency band F181 illustrated in FIG. 34, data symbols (transmitted by the terminal possessed by user #1) are disposed, and no reference signal or guard interval is provided. Note that frequency band F203 can be used by a terminal possessed by another user (a terminal other than user #1's terminal) to transmit data symbols and reference signals.

The frame illustrated in FIG. 37 is an example of a configuration of a frame transmitted by a terminal, such as a configuration of a frame transmitted by a terminal possessed by user #1, and includes a preamble, a control information symbol, data symbols (transmitted by the terminal possessed by user #1), and reference signals. Data symbols (transmitted by the terminal possessed by user #1) are disposed in frequency bands F211 and F212. Frequency band F213 is not assigned to the terminal possessed by user #1. In frequency band F211, just like in frequency band F191 illustrated in FIG. 35, a reference signal and a guard interval are provided after a data symbol (transmitted by the terminal possessed by user #1), and another reference signal and another guard interval are also provided after the next data symbol (transmitted by the terminal possessed by user #1). Data symbols (transmitted by the terminal possessed by user #1) and a reference signal are disposed in frequency band F212. Note that frequency band F213 can be used by a terminal possessed by another user (a terminal other than user #1's terminal) to transmit data symbols and reference signals. One characteristic feature is that a high bandwidth reference signal and a low bandwidth reference signal are present. This improves the possibility that highly accurate sensing can be performed.

The apparatus according to the present embodiment may be an apparatus that is capable of performing processing for transmitting and receiving the frame illustrated in FIG. 19 or the frame illustrated in FIG. 20.

The apparatus according to the present embodiment may be an apparatus that is capable of performing processing for transmitting and receiving the frame illustrated in FIG. 19 and the frames illustrated in FIG. 22 through FIG. 37.

The apparatus according to the present embodiment may be an apparatus that is capable of performing processing for transmitting and receiving the frame illustrated in FIG. 20 and the frames illustrated in FIG. 22 through FIG. 37.

The apparatus according to the present embodiment may be an apparatus that is capable of performing processing for transmitting and receiving the frame illustrated in FIG. 19, the frame illustrated in FIG. 20, and the frames illustrated in FIG. 22 through FIG. 37.

Note that when the apparatus according to the present embodiment transmits, for example, the frames illustrated in FIG. 19 through FIG. 37, the apparatus according to the present embodiment may transmit the frames illustrated in FIG. 19 through FIG. 37 from a single antenna, and, alternatively, the apparatus according to the present embodiment may transmit the frames illustrated in FIG. 19 through FIG. 37 from a plurality of antennas.

Moreover, when the apparatus according to the present embodiment receives a modulated signal of the frames from FIG. 19 through FIG. 37, the apparatus according to the present embodiment may receive the signal of the frames from FIG. 19 through FIG. 37 using a single antenna, and alternatively, the apparatus according to the present embodiment may receive the signal of the frames from FIG. 19 through FIG. 37 using a plurality of antennas. Accordingly, the transmission scheme may be any one of single-input single-output (SISO), multiple-input single-output (MISO), single-input multiple-output (SIMO), and multiple-input multiple-output (MIMO).

This achieves the advantageous effect that an AP (or repeater) and terminal can implement sensing and communication.

As described above, the transmitting apparatus includes: a frame configuration unit configured to configure a frame conforming to orthogonal frequency-division multiple access (OFDMA) and including a plurality of time-frequency resources, each being a resource defined by time and frequency; and a transmitter configured to transmit the frame configured by the frame configuration unit over radio waves. The frame configuration unit is configured to configure, as the frame, a frame including a resource for communication and a resource for sensing, the resource for communication being a time-frequency resource in which a symbol including communication data is disposed, and the resource for sensing being a time-frequency resource in which a symbol for sensing via radio waves transmitted by the transmitter is disposed.

For example, the frame may include at least two of the resources for sensing, the at least two resources for sensing being defined by different times and a same frequency, and disposed temporally adjacent to one another with a guard interval therebetween. For example, reference signals in frequency band F142 illustrated in FIG. 30 correspond to the at least two resources for sensing.

For example, the frame may include two guard intervals of different lengths of time and different frequencies. For example, the guard interval in frequency band F171 and the guard interval in frequency band F172 illustrated in FIG. 33 correspond to the two guard intervals.

For example, the frame may include at least two of the resources for sensing, the at least two resources for sensing being of different frequencies and different lengths of time. For example, reference signal in frequency band F171 and the reference signal in frequency band F172 illustrated in FIG. 33 correspond to the at least two resources for sensing.

Furthermore, the sensing processing may include at least one of processing of detecting a position of an object, processing of detecting presence or absence of an object, or processing of detecting a shape of an object, by analyzing the reflected wave received by the receiver.

Embodiment 5

In the present embodiment, a control system that uses the detecting apparatus and the like described in Embodiments 1 through 4 to control operation of a device will be described.

The detecting apparatus according to the present embodiment further includes a controller that controls the driving of an electronic device based on a result of sensing processing performed by a processor. The control system according to the present embodiment includes the detecting apparatus and the electronic device.

FIG. 38 illustrates one example of a configuration of the control system according to the present embodiment.

The control system illustrated in FIG. 38 includes device A11 and detecting apparatus A12. In this example, device A11 is an electronic device that can operate under control from apparatuses included in device A11, and examples of device A11 include an electric motorcycle, an electric kick scooter, a vacuum cleaner, and an electric automobile. Detecting apparatus A12 is an information processing apparatus such as a smartphone or tablet.

Device A11 includes interface #1, interface #2, controller A111, drive unit A112, sensor A113, and communication unit A114.

Interface #1 and interface #2 are interface apparatuses for communicating with detecting apparatus A12. In the example illustrated in FIG. 38, interface #1 and interface #2 are interfaces that communicate without the aid of an intervening apparatus such as a repeater apparatus. Note that the communication in this case may be wireless communication, such as Bluetooth (registered trademark), wireless LAN, or optical communication or the like, and may be wired communication, such as universal serial bus (USB) or power line communication (PLC) or the like. Moreover, unlike the example illustrated in FIG. 38, an intervening device such as a repeater may be provided. Interface #1 receives a signal from interface #3 included in detecting apparatus A12 (this signal is also referred to as a first signal). Interface #2 transmits a signal to interface #4 included in detecting apparatus A12 (this signal is also referred to as a second signal). Note that interface #1 may receive a supply of power from detecting apparatus A12.

Controller A111 is a processor that controls the driving of drive unit A112 and controls sensor A113. Controller A111 receives a signal from detecting apparatus A12 via interface #1, and controls the driving of drive unit A112 and controls sensor A113 based on the received signal. Controller A111 also obtains information indicating, for example, the states of drive unit A112 and sensor A113, and transmits this information to detecting apparatus A12 via interface #2. Note that controller A111 may obtain, via communication unit A114, a software program for operating controller A111.

Drive unit A112 is a processor that drives device A11. For example, drive unit A112 includes a wheel for moving device A11, a steering apparatus for controlling the direction of the wheel, and an acceleration apparatus or a braking device for controlling the rotational speed of the wheel. Drive unit A112 may further include a battery or the like as a power source for driving the wheel. Drive unit A112 increases or decreases the movement speed of, or changes the movement direction of device A11 by operating under control by controller A111. Drive unit A112 also outputs information indicating, for example, the state of drive unit A112 to controller A111.

Sensor A113 is a sensor that performs sensing in the surrounding area of device A11. For example, sensor A113 is a sensor that measures, for example, temperature, humidity, or illuminance, or a distance sensor that measures distance to an object in the surrounding area. Sensor A113 operates under control by controller A111, and outputs a sensor value or the like to controller A111.

Communication unit A114 is a communication interface that wirelessly communicates with an access point (AP). Although an AP is exemplified above, this may be a base station or communication apparatus or the like instead.

Detecting apparatus A12 includes interface #3, interface #4, controller A121, processor A122, image sensor A123, application storage A124, communication unit #1, communication unit #2, and sensing unit A125.

Interface #3 and interface #4 are interface apparatuses for communicating with device A11. In the example illustrated in FIG. 38, interface #3 and interface #4 are interfaces that communicate without the aid of an intervening apparatus such as a repeater apparatus. Note that the communication in this case may be wireless communication, such as Bluetooth (registered trademark), wireless LAN, or optical communication or the like, and may be wired communication, such as USB or PLC or the like. Moreover, unlike the example illustrated in FIG. 38, an intervening device such as a repeater may be provided. Interface #3 transmits a signal to interface #1 of device A11. Interface #4 receives a signal from interface #2 of device A11. Note that interface #3 may supply power to device A11.

Controller A121 is a processor that controls operation of device A11. For example, controller A121 obtains, from device A11 via interface #4, a sensor value obtained from sensor A113 or information indicating, for example, the state of drive unit A112, and based on the obtained sensor value or information, generates a signal for controlling the driving of drive unit A112 and/or controlling controller A111. Controller A121 transmits the generated signal to device A11 via interface #3, and, for example, controls controller A111 and/or controls drive unit A112.

Next, another method will be described. Controller A121 is a processor that controls operation of device A11. Controller A121 obtains, via processor A122, a sensor value obtained by sensing unit A125, and based on the obtained sensor value, generates a signal for controlling the driving of drive unit A112 and/or controlling controller A111. Note that controller A121 may use information obtained from drive unit A112 and/or sensor A113 when generating the signal for controlling the driving of drive unit A112 and/or controlling controller A111. Controller A121 transmits the generated signal to device A11 via interface #3, and, for example, controls controller A111 and/or controls drive unit A112.

Processor A122 is a computing apparatus that performs information processing in detecting apparatus A12. Processor A122 is configured as, for example, a CPU.

Image sensor A123 is a sensor that captures and generates an image of the surrounding area of detecting apparatus A12. Image sensor A123 supplies the data of the generated image to processor A122.

Application storage A124 is a storage apparatus that stores an application (software program) for controlling device A11 or detecting apparatus A12. Application storage A124 obtains the application (software program) via, for example, communication unit #1 or communication unit #2.

Note that when the accuracy of control carried out by controller A121 is improved as a result of an application update, it is possible to achieve the advantageous effect that safety related to the driving of the system of device A11 and detecting apparatus A12 can be improved.

Communication unit #1 is a communication interface that wirelessly communicates with an access point (AP).

Communication unit #2 is a communication interface that wirelessly communicates with a base station of a mobile telephone carrier network.

Sensing unit A125 is a processor that performs sensing using radio waves for communication. Sensing unit A125 recognizes an object in the surrounding area of detecting apparatus A12. More specifically, sensing unit A125 detects a person, vehicle, automobile, or obstacle or the like in the surrounding area of detecting apparatus A12, and recognizes an action made by the object. Sensing unit A125 may be configured to transmit radio waves on the same frequency as communication unit #1.

In the control system illustrated in FIG. 38, detecting apparatus A12 may be mounted to device A11, and, alternatively, device A11 may be disposed in a location distanced from detecting apparatus A12.

When detecting apparatus A12 is mounted to device A11, device A11 is controlled by signals transmitted and received via communication unit A114 or interfaces #1 or #2.

For example, when device A11 is controlled via interface #1 or interface #2, when device A11 is used when the user is outside his or her home, detecting apparatus A12 can be mounted to device A11.

Moreover, for example, when device A11 is controlled via communication unit A114, device A11 is controlled based on a signal transmitted from detecting apparatus A12 via an access point (AP). However, when device A11 is controlled via communication unit A114, there is a possibility of a functionality restriction. Note that when device A11 communicates with detecting apparatus A12 via communication unit A114, device A11 may communicate with communication unit #1 of detecting apparatus A12 directly, without the aid of an intervening access point (AP).

With this configuration, by updating the application on the detecting apparatus A12 side, it is possible to update functionality and update the control algorithm. This achieves the advantageous effect that it is possible to provide new functionality via an application update.

Moreover, by installing a new application in detecting apparatus A12, it is possible to use a device such as a smartphone or tablet which previously could not be used to control a conventional device A11, to control the conventional device A11. This configuration makes it possible use to an already existing device to control device A11. As a result, it is possible to use an unused device that is not being used, which makes it possible to achieve the advantageous effect that it is possible to utilize wasted resources such as the CPU, GPU, memory, storage, modem, and/or display of an unused device.

Note that firmware or an application can be updated on the device A11 side in addition to the detecting apparatus A12 side as well. This configuration makes it possible to provide new functionality that cannot be provided by updating an application on the detecting apparatus A12 side alone, or when a security problem is found on the device A11, quickly address the security problem by providing device A11 with firmware or an application removed of the security problem. An application is obtained from an external apparatus such as a cloud server via communication unit #1 and/or communication unit #2.

Next, an example of a configuration of a control system that controls device A11 when detecting apparatus A12 is mounted to device A11 and the user is outside his or her home will be given.

FIG. 39 illustrates one example of a configuration of the control system according to the present embodiment.

The control system illustrated in FIG. 39 includes device A11, detecting apparatus A12, AP A21, network A22, base station A23, and apparatus A24.

Device A11 and detecting apparatus A12 transmit and receive signals via interface #1, interface #2, interface #3, and interface #4. Details regarding the configuration are as described above.

AP A21 is an access point that can connect to communication unit #1 of detecting apparatus A12.

Network A22 is a network that is connected to AP A21 and base station A23. Network A22 may include part of a mobile phone carrier network or part of the internet. Network A22 may be connected to a cloud including a server that executes information processing.

Base station A23 is, for example, a base station apparatus that is connected to a mobile phone carrier network, and is connected to apparatus A24.

Apparatus A24 is, for example, a portable information processing apparatus possessed by the user, such as a smartphone or tablet.

In the control system, detecting apparatus A12 is communicably connected to apparatus A24 via AP A21, network A22, and base station A23, using communication unit #1.

For example, device A11, one example of which is a vacuum cleaner, detecting apparatus A12 is connected to device A11 via interface #1, interface #2, interface #3, and interface #4. For example, apparatus A24 accesses detecting apparatus A12 mounted to device A11 via one or more networks, and controls device A11 via detecting apparatus A12.

One characterizing feature of the control system is that device A11 is controlled using data obtained by sensing using sensing unit A125 included in detecting apparatus A12. This configuration enables the use of data obtained by sensing using a sensor that is not included in device A11 to control device A11. This makes it possible to realize functionality that could not be realized with device A11 alone.

Moreover, by device A11 obtaining, via interface #1 and/or interface #2, data obtained by sensing using sensing unit A125 included in detecting apparatus A12, security can be improved compared to when data is obtained over a network via communication unit A114, and it is possible to provide functionality that could not be provided if there were security restrictions.

One characterizing feature of the control system is that device A11 is controlled via detecting apparatus A12 mounted to device A11. This configuration allows detecting apparatus A12 to determine whether or not to receive an instruction for control transmitted from apparatus A24. For example, by performing processing for, for example, authentication between apparatus A24 and detecting apparatus A12, security against unauthorized access can be improved.

Furthermore, as described above, when the accuracy of control carried out by controller A121 is improved as a result of an application in application storage A124 being updated, it is possible to achieve the advantageous effect that safety related to the driving of the system of device A11 and detecting apparatus A12 can be improved.

FIG. 40 illustrates one example of an external appearance of the control system according to the present embodiment.

The control system illustrated in FIG. 40 includes detecting apparatus A12 mounted to an electric kick scooter that corresponds to device A11. Detecting apparatus A12 controls, for example, the acceleration and deceleration of device A11 based on a sensing result of sensing unit A125.

The electric kick scooter may be enabled to control drive unit A112 in accordance with an input from the user made using an input unit for operation input on the device A11 (i.e., electric kick scooter) side or the detecting apparatus A12 side.

Controller A121 controls drive unit A112 to perform operations such as increasing the speed of device A11 (i.e., the electric kick scooter) or changing the direction of travel. Controller A121 may control drive unit A112 to reduce the speed of device A11. The speed of device A11 may be reduced by the use of a brake or the use of braking force by a generator or the like.

Here, controller A121 may control drive unit A112 in accordance with an input from the input unit, and may control drive unit A112 based on sensing data obtained from device A11 and/or sensing unit A125.

For example, sensing unit A125 performs sensing using radio waves. Note that the sensing method using radio waves has already been described in another embodiment. For example, assume sensing unit A125 performs sensing, and detects a person. Based on information indicating "person detected" obtained from sensing unit A125, controller A121 transmits a control signal including information indicating to decelerate to device A11 via interface #3 and interface #4. Accordingly, controller A111 and drive unit A112 included in device A11 perform control of decelerating.

Assume sensing unit A125 performs sensing using radio waves and detects that there is no obstacle ahead. Based on information indicating "no obstacle" obtained from sensing unit A125, controller A121 transmits a control signal including information indicating to accelerate and then continue travelling at a constant speed to device A11 via interface #3 and interface #4. Accordingly, controller A111 and drive unit A112 included in device A11 perform control of accelerating and then continuing to travel at a constant speed.

Assume sensing unit A125 performs sensing using radio waves and detects an obstacle to the right. Based on information indicating "obstacle to the right" obtained from sensing unit A125, controller A121 transmits a control signal including information indicating to operate so as to avoid the obstacle to device A11 via interface #3 and interface #4. Accordingly, controller A111 and drive unit A112 included in device A11 perform control of operating so as to avoid an obstacle.

Next, another operation example will be given. Sensing unit A125 may perform sensing using radio waves, and based on information indicating the result of the sensing, controller A121 may estimate its own position or perform obstacle detection, and output a control signal for performing control of accelerating or decelerating. In this example, controller A121 is capable of estimating its own position or performing obstacle detection using image information obtained from image sensor A123 and information obtained from sensor A113. Controller A121 transmits this control signal to device A11 via interface #3 and interface #4. Accordingly, controller A111 and drive unit A112 included in device A11 perform control based on a control signal.

As yet another example of control based on sensing data obtained from sensing unit A125, controller A121 detects an action of a user based on speed or acceleration data obtained by a speed sensor or an acceleration sensor, and performs control of acceleration or deceleration. In this example, the action of the user detected using sensing unit A125 is the act of the user kicking the ground, but the action is not limited to this example. For example, the action may be the user shifting the center of gravity of his or her body, and may be the orientation of the user's face or the user changing the orientation of his or her face. In this example, a sensor that can be used as sensing unit A125 may be a weight sensor or wireless radar.

By performing such control, it is possible to achieve the advantageous effect of an improvement in the safety of the user.

FIG. 41 illustrates one example of processes performed by the control system according to the present embodiment. One example of control in the above examples of control operations performed by controller A121 will be given with reference to this flow chart.

At the point in time that a user instructs start of a control operation via a switch or button, at the point in time that the user turns on the power of device A11, at the point in time that the user attaches detecting apparatus A12 to device A11, or at the point in time of detection of the user mounting the kick scooter that device A11 is embodied as, device A11 starts the control operation depicted in the flow chart.

In step S001, when controller A121 starts the control operation, controller A121 obtains acceleration data from sensor A113 included in device A11 or sensing unit A125 included in detecting apparatus A12.

In step S002, controller A121 performs detection for an acceleration action of device A11 from the acceleration data. When an acceleration action is detected (yes in step S002), processing proceeds to step S003, and when an acceleration action is not detected (no in step S002), processing proceeds to step S004.

In step S003, controller A121 controls drive unit A112, and executes assist processing such as revving the motor and generating an accelerating force in the direction of travel. For example, the generation of acceleration force may be performed across a span of a determined amount of time to further increase acceleration at the point in time of determination that acceleration was performed based on the acceleration data, or may be performed so as to maintain speed across a span of a determined amount of time at the point in time that acceleration is completed after being performed or at the point in time that deceleration begins after acceleration being performed. When the assist processing of step S003 completes, processing returns to step S001.

In step S004, controller A121 determines whether to end control of drive unit A112 or not, ends processing if determining to end control of drive unit A112, and returns to step S001 if determining to not end control of drive unit A112. In regard to the determination of whether to end control of drive unit A112 or not, for example, controller A121 may determine to end control of drive unit A112 when device A11 has come to a complete stop, and may determine to end control of drive unit A112 when the user has powered device A11 off, when the user has detached detecting apparatus A12 from device A11, or when it is detected that the user has gotten off the kick scooter that device A11 is embodied as.

Next, another operation pertaining to FIG. 41 will be described. At the point in time that a user instructs start of a control operation via a switch or button, at the point in time that the user turns on the power of device A11, at the point in time that the user attaches detecting apparatus A12 to device A11, or at the point in time of detection of the user mounting the kick scooter that device A11 is embodied as, device A11 starts the control operation depicted in the flow chart.

In step S001, when controller A111 starts the control operation, controller A121 obtains acceleration data from sensor A113 included in device A11.

In step S002, controller A111 performs detection for an acceleration action of device A11 from the acceleration data. When an acceleration action is detected (yes in step S002), processing proceeds to step S003, and when an acceleration action is not detected (no in step S002), processing proceeds to step S004.

In step S003, controller A111 controls drive unit A112, and executes assist processing such as revving the motor and generating an accelerating force in the direction of travel. For example, the generation of acceleration force may be performed across a span of a determined amount of time to further increase acceleration at the point in time of determination that acceleration was performed based on the acceleration data, or may be performed so as to maintain speed across a span of a determined amount of time at the point in time that acceleration is completed after being performed or at the point in time that deceleration begins after acceleration being performed. When the assist processing of step S003 completes, processing returns to step S001.

In step S004, controller A111 determines whether to end control of drive unit A112 or not, ends processing if determining to end control of drive unit A112, and returns to step S001 if determining to not end control of drive unit A112. In regard to the determination of whether to end control of drive unit A112 or not, for example, controller A111 may determine to end control of drive unit A112 when device A11 has come to a complete stop, and may determine to end control of drive unit A112 when the user has powered device A11 off, when the user has detached detecting apparatus A12 from device A11, or when it is detected that the user has gotten off the kick scooter that device A11 is embodied as.

By assisting acceleration based on an action of the user, it is possible to carry out minute control in accordance with the user's action, which makes it possible to achieve the advantageous effect of improved safety since unintended acceleration can be prevented.

Embodiment 6

In the present embodiment, another aspect of the configuration and processes performed by the transmitting apparatus according to the above embodiment will be described.

FIG. 42 illustrates one example of a configuration of transmitting apparatus A3 according to Embodiment 6.

As illustrated in FIG. 42, transmitting apparatus A3 includes frame configuration unit A31, transmitter A32, receiver A33, and processor A34.

Frame configuration unit A31 configures a frame that conforms to a single carrier scheme, a multi-carrier scheme such as OFDM, or an orthogonal frequency-division multiple access (OFDMA) scheme, and includes a plurality of time-frequency resources which are resources defined by time and frequency.

Frame configuration unit A31 configures, as the frame, a frame including a resource for communication and a resource for sensing, the resource for communication being a time-frequency resource in which a symbol including communication data is disposed, and the resource for sensing being a time-frequency resource in which a symbol for sensing via radio waves transmitted by transmitter A32 is disposed.

Transmitter A32 transmits the frame configured by frame configuration unit A31 over radio waves.

FIG. 43 illustrates one example of processes performed by the transmitting apparatus according to Embodiment 6.

As illustrated in FIG. 43, in step S1 (frame configuration step), a frame is configured that conforms to a single carrier scheme, a multi-carrier scheme such as OFDM, or an OFDMA scheme, and includes a plurality of time-frequency resources which are resources defined by time and/or frequency. Here, in the frame configuration step, the frame that is configured includes a resource for communication and a resource for sensing, the resource for communication being a time-frequency resource in which a symbol including communication data is disposed, and the resource for sensing being a time-frequency resource in which a symbol for sensing via radio waves transmitted in a transmitting step.

In step S2 (transmitting step), the frame configured in the frame configuration step is transmitted over radio waves.

This makes it possible for the transmitting apparatus to perform sensing in the surrounding area.

Embodiment 7

In the present embodiment, a specific implementation example of an apparatus that can perform sensing will be given.

FIG. 44 illustrates one example of a configuration of an apparatus having both a communication function and a sensing function.

Transceiver N102 receives inputs of data N101 and control signal N100. When control signal N100 indicates to implement communication, transceiver N102 performs processing on data N101 such as error correction coding, modulation and the like, and outputs modulated signal N103. When control signal N100 indicates to implement sensing, transceiver N102 does not operate.

Sensing unit N104 receives an input of control signal N100, and when control signal N100 indicates to implement sensing, sensing unit X204 outputs signal for sensing N105. When control signal N100 indicates to implement communication, sensing unit N104, for example, does not operate.

Sensing unit N104 receives an input of signal N181 related to an operation, determines a sensing operation based on signal N181 related to an operation, and performs an operation based on that determination. This will be described in greater detail later.

Transmission signal selector N106 receives inputs of control signal N100, modulated signal N103, and signal for sensing N105. When control signal N100 indicates to implement communication, transmission signal selector N106 outputs modulated signal N103 as selected signal N107. When control signal N100 indicates to implement sensing, transmission signal selector N106 outputs signal for sensing N105 as selected signal N107.

Power adjuster N108 receives inputs of selected signal N107 and control signal N100. When control signal N100 indicates to implement communication, power adjuster N108 performs power adjustment for communication on selected signal N107 (for example, the coefficient that selected signal N107 is multiplied by is α), and outputs transmission signal N109.

When control signal N100 indicates to implement sensing, power adjuster N108 performs power adjustment for communication on selected signal N107 (for example, the coefficient that selected signal N107 is multiplied by is β), and outputs transmission signal N109.

Note that α and β are, for example, real numbers that are greater than or equal to 0. In this example, α>β (α is greater than 8). This makes it possible to achieve the advantageous effects that transmission power can be reduced when sensing is performed, which inhibits sensing through walls for example and increase the probability that privacy can be maintained, and that when communication is performed, high data reception quality can be achieved.

Note that α and β may be complex numbers. In such cases, $|\alpha|>|\beta|$. Here as well, it possible to achieve the advantageous effects that transmission power can be reduced when sensing is performed, which inhibits sensing through walls for example and increase the probability that privacy can be maintained, and that when communication is performed, high data reception quality can be achieved.

Transmission signal N109 is then output from transmission and reception antenna unit N110 as radio waves.

Note that power adjuster N108 may be omitted. In such cases, selected signal N107 is output from transmission and reception antenna unit N110 as radio waves.

Transmission and reception antenna unit N110 outputs reception signal N111. Reception signal selector N112 receives inputs of control signal N100 and reception signal N111. When control signal N100 indicates to implement communication, reception signal selector N112 outputs reception signal N111 as signal N113.

When control signal N100 indicates to implement sensing, reception signal selector N112 outputs reception signal N111 as signal N114.

Transceiver N102 receives inputs of control signal N100 and signal N113. When control signal N100 indicates to implement communication, transceiver N102 performs processing such as demodulation and error correction decoding on signal N113, and outputs reception data N115.

Sensing unit N104 receives inputs of control signal N100 and signal N114. When control signal N100 indicates to implement sensing, sensing unit N104 performs sensing using signal N114 and the like, and outputs sensing result N116.

Controller N151 generates and outputs control signal N100 based on external signal N150 and reception data N115 and the like.

Controller N151 generates and outputs control signal N100 based on external signal N150 and reception data N115 and the like.

Registration unit N180 receives inputs of external signal N150 and sensing result N116. For example, when external signal N150 indicates to perform an operation for registering an operation, registration unit N180 outputs signal N181 related to an operation that includes information indicating to implement the operation registration.

When signal N181 related to an operation includes information indicating to implement the operation registration, sensing unit N104 generates and outputs a signal for sensing N105 for sensing, for example, a target gesture.

This signal for sensing N105 is then transmitted as radio waves. An apparatus capable of sensing then receives the signal, sensing unit N104 performs sensing estimation on the received signal, and outputs sensing result N116.

Registration unit N180 registers sensing result N116.

Hereinafter, detailed examples will be given.

Example 1

In his or her home, a first person takes out a device capable of sensing, or an apparatus capable of sensing that includes communication functionality, and loses it somewhere. Here, "a device capable of sensing, or an apparatus capable of sensing that includes communication functionality" will be referred to as apparatus #A. Detailed examples of apparatus #A have already been given above.

The first person desires an easy way to search for the lost apparatus #A. Hereinafter, an example of an operation that addresses this desire will be given.

FIG. 45 illustrates an example of the relationship between apparatus #A and the first person. As illustrated in FIG. 45, first, apparatus #A determines to register a gesture (N201). Accordingly, apparatus #A transmits a signal for sensing.

In response, the first person performs a movement to be registered in apparatus #A (N202). This gesture is referred to as a first gesture.

Apparatus #A then registers the first gesture (N203). Apparatus #A may be equipped with a function for confirming whether the gesture was correctly registered or not. Apparatus #A may also be equipped with a function for editing a registered gesture. For example, the first person may use these functions to correctly register the first gesture in apparatus #A.

Next, a registered gesture (for example, the first gesture) and an operation of apparatus #A are paired (N211). As one example, when a person who cannot find apparatus #A performs the first gesture, apparatus #A performs an operation of emitting a sound or vibrating. For example, the above operation of emitting a sound or vibrating is referred to as a first operation. Note that apparatus #A registers the content associated (paired) with the first operation.

Thereafter, apparatus #A implements sensing periodically, regularly, or irregularly.

Then, for example, since the first person lost apparatus #A, first person performs the first gesture (N212). Although the person who performs the first gesture is exemplified as the first person, some other person may perform the first gesture.

In response, apparatus #A recognizes the first gesture through sensing, and performs the first operation (N213).

This makes it possible to achieve the advantageous effect that it is possible to easily find apparatus #A. This also has the advantageous effect that the person is not required to have a special device.

Next, a method for preventing false recognition of a gesture will be given.

As described above, apparatus #A can register a gesture performed by a person via steps N201, N202, and N203 illustrated in FIG. 45. Assume apparatus #A registers a plurality of gestures using this method. For example, apparatus #A registers a first gesture, a second gesture, a third gesture, and a fourth gesture.

However, as described above, apparatus #A emits a sound or vibrates as a result of a person merely performing the first gesture, so there is a possibility that apparatus #A will emit a sound or vibrate even when a person inadvertently performs a first gesture (hereinafter this is referred to as a false operation).

To prevent such a false operation, a method of pairing a plurality of gestures with an operation of apparatus #A may be employed.

For example, the first person registers, in apparatus #A, that apparatus #A is to perform an operation of emitting a sound or vibrating when a first gesture and a fourth gesture registered in apparatus #A are performed successively.

With this configuration, when the first person performs the first gesture and the fourth gesture, apparatus #A recognizes these gestures and emits a sound or vibrates.

By using a combination of plurality of gestures, there is a lower probability that a person other than the first person who registered the gestures will perform the combination of gestures by chance, which makes it possible to achieve the advantageous effect that apparatus #A performing false operation can be drastically reduced.

Note that the number of gestures registered in apparatus #A is not limited to the above example; the same advantageous effects can be achieved so long as a plurality of gestures are registered. The number of gestures used in a combination is also not limited to the above example; it is sufficient so long as a combination of a plurality of gestures is paired with an operation of the apparatus #A.

Note that the number of gestures registered in apparatus #A is not limited to the above example; the same advantageous effects can be achieved so long as a plurality of gestures are registered. The number of gestures used in a combination is also not limited to the above example; it is sufficient so long as a combination of a plurality of gestures is paired with an operation of the apparatus #A. In the above example, the operation performed by apparatus #A is exemplified as emitting a sound or vibrating, but the pairing of a plurality of gestures with an operation of an apparatus is not limited to this example. As will be described later, a plurality of gestures may be paired with an operation of an apparatus (terminal) using FIG. 46 through FIG. 49.

Although the above exemplifies the operation performed by apparatus #A when a person performs a plurality of gestures and apparatus #A recognizes these plurality of gestures as emitting sound or vibrating, the operation is not limited to this example; an apparatus (terminal) may operate as will be described later by way of example with reference to FIG. 46 through FIG. 49.

In FIG. 45, a gesture is registered, and then the gesture and an operation of apparatus #A are paired, but the procedure is not limited to this order; an operation of apparatus #A may be specified, and then a gesture to be paired may be registered. Moreover, a gesture to be paired with an operation of apparatus #A may be a gesture that is (already) provided in the apparatus #A. The important point here is that one or a plurality of gestures is paired with an operation of terminal #A.

Example 2

In Example 1, a gesture is paired with an operation performed by apparatus #A such as emitting sound or vibrating, but in this example, a gesture is paired with an operation related to a communication function of apparatus #A (terminal #A).

FIG. 46 illustrates an example of states of first person N301, terminal #A labeled N302 that is capable of sensing and includes communication functionality, and apparatus #B labeled N303. In the example illustrated in FIG. 46, terminal #A labeled N302 and apparatus #B labeled N303 are capable of communicating.

FIG. 47 illustrates an example that differs from FIG. 46. In FIG. 47, elements that operate the same as in FIG. 46 have the same reference signs. In FIG. 47, first person N301, terminal #A labeled N302 that is capable of sensing and includes a communication apparatus, access point (AP) N401, and apparatus #B labeled N303 are present. Network N402 may also be present. In the example illustrated in FIG. 47, terminal #A labeled N302 and AP labeled N401 are capable of communicating, and apparatus #B labeled N303 and AP labeled N401 are capable of communicating.

Operations performed by each of the apparatuses illustrated in FIG. 46 will be described with reference to FIG. 48.

First, terminal #A labeled N302 determines to register a gesture (N501). Accordingly, terminal #A labeled N302 transmits a signal for sensing.

In response, the first person N301 performs a movement to be registered in terminal #A labeled N302 (N502). This gesture is referred to as a second gesture.

Terminal #A labeled N302 then registers the second gesture (N503). As described above, terminal #A labeled N302 may be equipped with a function for confirming whether the gesture was correctly registered or not. Terminal #A labeled N302 may also be equipped with a function for editing a registered gesture. For example, first person N301 may use these functions to correctly register the second gesture in terminal #A labeled N302.

Next, a registered gesture (for example, the second gesture) and an operation of terminal #A labeled N302 are paired (N511). One example of such a pairing is as follows. When a person, including first person N301, performs the second gesture, terminal #A labeled N302 instructs apparatus #B labeled N303 to perform the second operation. Accordingly, terminal #A labeled N302 performs pairing like described above, such as transmitting, to apparatus #B labeled N303, information instructing the second operation to be performed.

Thereafter, terminal #A labeled N302 implements sensing periodically, regularly, or irregularly.

Assume first person N301 performed the second gesture (N512) because they wanted to request apparatus #B labeled N303 to perform the second operation. Although the person who performs the second gesture is exemplified as first person N301, some other person may perform the second gesture.

Terminal labeled N0302 then recognizes the second gesture by performing sensing (N513), and transmits, to apparatus #B labeled N303, information instructing the performing of the second operation (N514).

Apparatus #B labeled N303 then performs the second operation (N515).

This makes it possible to achieve the advantageous effect that apparatus #B can be easily instructed to perform an operation. This also has the advantageous effect that the person is not required to have a special device.

Operations performed by each of the apparatuses illustrated in FIG. 47 will be described with reference to FIG. 49. In FIG. 49, elements that operate the same as in FIG. 48 have the same reference signs, and repeated description will be omitted.

First, terminal #A labeled N302 determines to register a gesture (N501). Accordingly, terminal #A labeled N302 transmits a signal for sensing.

In response, the first person N301 performs a movement to be registered in terminal #A labeled N302 (N502). This gesture is referred to as a second gesture.

Terminal #A labeled N302 then registers the second gesture (N503). As described above, terminal #A labeled N302 may be equipped with a function for confirming whether the gesture was correctly registered or not. Terminal #A labeled N302 may also be equipped with a function for editing a registered gesture. For example, first person N301 may use these functions to correctly register the second gesture in terminal #A labeled N302.

Next, a registered gesture (for example, the second gesture) and an operation of terminal #A labeled N302 are paired (N611). One example of such a pairing is as follows. When a person, including first person N301, performs the second gesture, terminal #A labeled N302 instructs apparatus #B labeled N303 to perform a third operation. Accordingly, terminal #A labeled N302 transmits, to AP labeled N401, information instructing the third operation to be performed. AP labeled N401 then transmits, to apparatus #B labeled N303, a modulated signal including this information (i.e., an instruction to perform the third operation).

Thereafter, terminal #A labeled N302 implements sensing periodically, regularly, or irregularly.

Assume first person N301 performed the second gesture (N612) because they wanted to request apparatus #B labeled N303 to perform the third operation. Although the person who performs the second gesture is exemplified as first person N301, some other person may perform the second gesture.

Terminal #A labeled N302 then recognizes the second gesture by performing sensing (N613), and transmits, to AP labeled N401, information instructing the performing of the third operation (N614).

AP labeled N401 then transmits, to apparatus #B labeled N303, a modulated signal including this information (i.e., an instruction to perform the third operation) (N615).

Apparatus #B labeled N303 then performs the third operation (N616).

In FIG. 47, AP labeled N401 may be communicating with network N402. For example, AP labeled N401 may communicate with a cloud server via network N402. AP labeled N401 may receive instruction from the cloud server.

For example, the cloud server may obtain information related to sensing from, for example, terminal #A labeled N302, apparatus #B labeled N303, and/or AP labeled N401.

In such cases, the cloud server itself may know the registered content of a gesture, and perform computation for recognizing a gesture. However, terminal #A labeled N302 needs to upload information that will serve as a basis for this to the cloud server. Moreover, the cloud server may know the content that is paired to a gesture, and may instruct terminal #A labeled N302, apparatus #B labeled N303, and/or AP labeled N401 based on known content.

This makes it possible to achieve the advantageous effect that apparatus #B can be easily instructed to perform an operation. Here, it is possible to achieve the advantageous effect that a person can instruct a device without the person being required to have a special device.

Although the term "gesture" is used in the above description, instead of a gesture, the following may be used: movement of a person, the shape of part of a body, movement of part of a body, detection of a person, detection of part of a person, authentication of a person, authentication of part of a person, movement of an object, the shape of an object, detection of an object, authentication of an object.

Moreover, for the sensing method, an example described in the present specification may be used, and, alternatively, some other method may be used.

Embodiment 8

In the present embodiment, a specific example of sensing performed in a space in which an apparatus capable of performing sensing is present will be given.

FIG. 50 illustrates one example of states of apparatuses according to the present embodiment. N700 indicates the inside of a home as an example of the space. As illustrated in FIG. 50, for example, access point (AP) N701, audio equipment N702, device N703, which is a terminal such as a smartphone, smart speaker, tablet, computer, or mobile phone or the like, and luminaire N704 are present in-home space N700. Hereinafter, device N703 will be referred to as device #C.

Moreover, in this example, person N705 is living in in-home space N700.

AP labeled N701 is capable of performing sensing and capable of communicating, as described in other embodiments.

For example, AP labeled N701 communicates with audio equipment N702, device #C labeled N703, and luminaire N704. AP labeled N701 may communicate with other apparatuses as well.

AP labeled N701 is communicating with (cloud) server N720 via network N710.

AP labeled N701 is further communicating with base station N730 via network N710.

Base station N730 is communicating with device N731, which is a terminal such as a smartphone, tablet, computer, or mobile phone or the like. Hereinafter, device N731 will be referred to as device #D.

Next, a detailed example of operations performed by AP labeled N701 illustrated in FIG. 50 will be given.

FIG. 51 illustrates a flow chart of an example of operations performed when AP labeled N701 is first set up inside the home.

First, AP labeled N701 performs sensing (N801), and uploads, to a cloud server, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (N802).

With this, AP labeled N701 concludes initial sensing (N803). Although the term "initial sensing" is used, after AP labeled N701 is initially set up, the operations illustrated in FIG. 51 may be performed by AP labeled N701 periodically, aperiodically, regularly, or irregularly.

Next, another example in which device #C labeled N703 performs the operations illustrated in FIG. 51 will be given.

First, device #C labeled N703 performs sensing (N801), and uploads, to a cloud server via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (N802).

With this, device #C labeled N703 concludes initial sensing (N803). Although the term "initial sensing" is used, device #C labeled N703 may perform the operations illustrated in FIG. 51 periodically, aperioclically, regularly, or irregularly.

FIG. 52 illustrates a flow chart of one example of operations performed by AP labeled N701.

AP labeled N701 uploads, to a cloud server, information about in-home devices obtained via sensing, such as information about an appliance (including audio equipment N702 and luminaire N704) and information about an electronic device (including device #C labeled N703) (N901).

Next, information related to the pairing of an operation performed by an in-home device and sensing performed by AP labeled N701 is uploaded to the cloud server (N902). The pairing of an operation performed by an in-home device and sensing performed a device capable of sensing (AP labeled N701 in this example) as well as the registering of the pairing, are exemplified in Embodiment 7. Hereinafter, points of difference from Embodiment 7, in particular in regard to a pairing operation example, will be described.

Next, another example in which device #C labeled N703 performs the operations illustrated in FIG. 52 will be given.

Device #C labeled N703 uploads, to a cloud server via AP labeled N701, information about in-home devices obtained via sensing, such as information about an appliance (including audio equipment N702 and luminaire N704) and information about an electronic device (N901).

Next, information related to the pairing of an operation performed by an in-home device and sensing performed by device #C labeled N703 is uploaded to the cloud server (N902). The pairing of an operation performed by an in-home device and sensing performed a device capable of sensing (device #C labeled N703 in this example) as well as the registering of the pairing, are exemplified in Embodiment 7. Hereinafter, points of difference from Embodiment 7, in particular in regard to a pairing operation example, will be described.

FIG. 53 illustrates a flow chart of an example of operations related to the system. Hereinafter, examples of the pairing of audio equipment N702 and sensing, the pairing of device #C and sensing, and the pairing of luminaire N704 and sensing will be given with reference to FIG. 53.

AP labeled N701 performs sensing (N1001).

As a result of the sensing, AP labeled N701 confirms whether a moving object, including a person, was detected in the home (N1002).

When AP labeled N701 does not detect a moving object, including a person, in the home (no in N1002), the processing returns to the "perform sensing" step N1001.

When AP labeled N701 does detect a moving object, including a person, in the home (yes in N1002), AP labeled N701 uploads, to cloud server N720 via network N710, information related to in-home status (N1003).

In response, cloud server N720 transmits, to AP labeled N701, information related to control of audio equipment N702, information related to control of device #C labeled N703, or information related to control of luminaire N704. AP labeled N701 then obtains information related to control (control information) (yes in N1004).

AP labeled N701 then transmits the control information to the target device (in the example illustrated in FIG. 50, audio equipment N702, device #C labeled N703, or luminaire N704) (N1005).

In response, the target device carries out control based on the control information, and ends control (N1006).

AP labeled N701 then performs the next iteration of sensing (N1001).

On the other hand, consider a case in which AP labeled N701 detects a moving object, including a person, in the home (yes in N1002), uploads, to cloud server N720 via network N710, information related to in-home status (N1003), but does not obtain control information from cloud server N720 (no in N1004). In such cases, AP labeled N701 performs the next iteration of sensing (N1001).

For example, consider a case in which AP labeled N701 transmits control information to audio equipment N702 in step N1005. In such cases, cloud server N720 transmits, to AP labeled N701, information related to directionality control for sound/audio of audio equipment N702, based on information indicating the position of a person obtained by sensing by AP labeled N701. AP labeled N701 transmits information related to directionality control for sound/audio to audio equipment N702, and based on the information related to directionality control for sound/audio, audio equipment N702 performs directionality control for sound/audio.

As another example, consider a case in which AP labeled N701 transmits control information to luminaire N704 in step N1005. In such cases, cloud server N720 transmits, to AP labeled N701, information related to the lighting of luminaire N704, such as ON/OFF or light emission directionality control, based on information indicating the position of a person or moving object obtained by sensing by AP labeled N701. AP labeled N701 then transmits information related to ON/OFF or light emission directionality control to luminaire N704, and luminaire N704 carries out control for turning ON/OFF the lighting or control of the direction of light emission, based on the information related to ON/OFF or light emission directionality control.

As described above, by controlling a device present in the home based on the in-home state, it is possible to achieve the advantageous effect that comfortable, safe living can be provided.

Next, another example of FIG. 53 will be given.

Device #C labeled N703 performs sensing (N1001).

As a result of the sensing, device #C labeled N703 confirms whether a moving object, including a person, was detected in the home (N1002).

When device #C labeled N703 does not detect a moving object, including a person, in the home (no in N1002), the processing returns to the "perform sensing" step N1001.

When device #C labeled N703 detects a moving object, including a person, in the home (yes in N1002), device #C labeled N703 uploads, to cloud server N720 via AP labeled N701 and network N710, information related to in-home status (N1003).

In response, cloud server N720 transmits, to device #C labeled N703 via network N710 and AP labeled N701, information related to control of audio equipment N702 or information related to control of luminaire N704. Device #C labeled N703 then obtains information related to control (control information) (yes in N1004).

Device #C labeled N703 then transmits the control information to the target device (in the example illustrated in FIG. 50, audio equipment N702 or luminaire N704) (N1005). However, this transmission is performed via AP labeled N701.

In response, the target device carries out control based on the control information, and ends control (N1006).

Device #C labeled N703 then performs the next iteration of sensing (N1001).

On the other hand, consider a case in which device #C labeled N703 detects a moving object, including a person, in the home (yes in N1002), uploads, to cloud server N720 via AP labeled N701 and network N710, information related to in-home status (N1003), but does not obtain control information from cloud server N720 (no in N1004). In such cases, device #C labeled N703 performs the next iteration of sensing (N1001).

For example, consider a case in which device #C labeled N703 transmits control information to audio equipment N702 in step N1005. In such cases, cloud server N720 transmits, to device #C labeled N703 via AP labeled N701, information related to directionality control for sound/audio of audio equipment N702, based on information indicating the position of a person obtained by sensing by device #C labeled N703. Device #C labeled N703 transmits information related to directionality control for sound/audio to audio equipment N702 via AP labeled N701, and based on the information related to directionality control for sound/audio, audio equipment N702 performs directionality control for sound/audio.

As another example, consider a case in which device #C labeled N703 transmits control information to luminaire N704 in step N1005. In such cases, cloud server N720 transmits, to device #C labeled N703 via AP labeled N701, information related to the lighting of luminaire N704, such as ON/OFF or light emission directionality control, based on information indicating the position of a person or moving object obtained by sensing by device #C labeled N703. Device #C labeled N703 then transmits information related to ON/OFF or light emission directionality control to luminaire N704 via AP labeled N701, and luminaire N704 carries out control for turning ON/OFF the lighting or control of the direction of light emission, based on the information related to ON/OFF or light emission directionality control.

As described above, by controlling a device present in the home based on the in-home state, it is possible to achieve the advantageous effect that comfortable, safe living can be provided.

FIG. 54 illustrates a flow chart of one example of operations performed by in-home AP labeled N701 and cloud server N720.

AP labeled N701 performs sensing (N1101), and uploads, to a cloud server, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (N1102).

Cloud server N720 compares stored information related to in-home status with the newly obtained information related to in-home status. Cloud server N720 then confirms whether a new state has been detected or not (N1103).

When cloud server N720 confirms that a new state has been detected (yes in N1103), cloud server N720 updates the information related to in-home status (N1104). Then, the next iteration of AP labeled N701 sensing is performed (N1101).

When cloud server N720 does not confirm that a new state has been detected (no in N1103), the next iteration of AP labeled N701 sensing is performed (N1101).

Next, another example in which device #C labeled N703 and cloud server N720 perform the operations illustrated in FIG. 54 will be given.

Device #C labeled N703 performs sensing (N1101), and uploads, to a cloud server via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (N1102).

Cloud server N720 compares stored information related to in-home status with the newly obtained information related to in-home status. Cloud server N720 then confirms whether a new state has been detected or not (N1103).

When cloud server N720 confirms that a new state has been detected (yes in N1103), cloud server N720 updates the information related to in-home status (N1104). Then, the next iteration of device #C labeled N703 sensing is performed (N1101).

When cloud server N720 does not confirm that a new state has been detected (no in N1103), the next iteration of device #C labeled N703 sensing is performed (N1101).

As described above, by controlling a device present in the home based on the in-home state, it is possible to achieve the advantageous effect that comfortable, safe living can be provided. It is also possible to achieve the advantageous effect that more favorable control is possible by updating information obtained via sensing as needed.

Note that in FIG. 53, operations pertaining to the cloud server are indicated via the dashed-line box. Similarly, in FIG. 54, operations pertaining to the cloud server are indicated via the dashed-line box.

Embodiment 9

In the present embodiment, a specific example of sensing performed in a space in which an apparatus capable of performing sensing is present will be given.

FIG. 55 illustrates one example of states of apparatuses according to the present embodiment. In FIG. 55, elements that operate the same as in FIG. 50 have the same reference signs.

N700 indicates the inside of a home as an example of the space. As illustrated in FIG. 55, for example, access point (AP) N701, audio equipment N702, device N703, which is a terminal such as a smartphone, smart speaker, tablet, computer, or mobile phone or the like, and luminaire N704 are present in-home space N700. Hereinafter, device N703 will be referred to as device #C. For example, assume server Q101 is present in in-home space N700.

Moreover, in this example, person N705 is living in in-home space N700.

AP labeled N701 is capable of performing sensing and capable of communicating, as described in other embodiments.

For example, AP labeled N701 communicates with audio equipment N702, device #C labeled N703, and luminaire N704. AP labeled N701 may communicate with other apparatuses as well.

AP labeled N701 is communicating with server Q101 via network Q102.

AP labeled N701 is further communicating with base station N730 via network N710.

Base station N730 is communicating with device N731, which is a terminal such as a smartphone, tablet, computer, or mobile phone or the like. Hereinafter, device N731 will be referred to as device #D.

Next, a detailed example of operations performed by AP labeled N701 illustrated in FIG. 55 will be given.

FIG. 56 illustrates a flow chart of an example of operations performed when AP labeled N701 is first set up inside the home.

First, AP labeled N701 performs sensing (Q201), and uploads, to server Q101, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (Q202).

With this, AP labeled N701 concludes initial sensing (Q203). Although the term "initial sensing" is used, after AP labeled N701 is first set up, the operations illustrated in FIG. 56 may be performed by AP labeled N701 periodically, aperiodically, regularly, or irregularly.

Next, another example in which device #C labeled N703 performs the operations illustrated in FIG. 56 will be given.

First, device #C labeled N703 performs sensing (Q201), and uploads, to server Q101 via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (Q202).

With this, device #C labeled N703 concludes initial sensing (Q203). Although the term "initial sensing" is used, device #C labeled N703 may perform the operations illustrated in FIG. 56 periodically, aperiodically, regularly, or irregularly.

FIG. 57 illustrates a flow chart of one example of operations performed by AP labeled N701.

AP labeled N701 uploads, to server Q101, information about in-home devices obtained via sensing, such as information about an appliance (including audio equipment N702 and luminaire N704) and information about an electronic device (including device #C labeled N703) (Q301).

Next, information related to the pairing of an operation performed by an in-home device and sensing performed by AP labeled N701 is uploaded to server Q101 (Q302). The pairing of an operation performed by an in-home device and sensing performed a device capable of sensing (AP labeled N701 in this example) as well as the registering of the pairing, are exemplified in Embodiment 7. Hereinafter, points of difference from Embodiment 7, in particular in regard to a pairing operation example, will be described.

Next, another example in which device #C labeled N703 performs the operations illustrated in FIG. 57 will be given.

Device #C labeled N703 uploads, to server Q101 via AP labeled N701, information about in-home devices obtained via sensing, such as information about an appliance (including audio equipment N702 and luminaire N704) and information about an electronic device (Q301).

Next, information related to the pairing of an operation performed by an in-home device and sensing performed by device #C labeled N703 is uploaded to server Q101 and/or the cloud server (Q302). The pairing of an operation performed by an in-home device and sensing performed a device capable of sensing (device #C labeled N703 in this example) as well as the registering of the pairing, are exemplified in Embodiment 7. Hereinafter, points of difference from Embodiment 7, in particular in regard to a pairing operation example, will be described.

FIG. 58 illustrates a flow chart of an example of operations related to, for example, the system illustrated in FIG. 55. Hereinafter, examples of the pairing of audio equipment N702 and sensing, the pairing of device #C and sensing, and the pairing of luminaire N704 and sensing will be given with reference to FIG. 58. Note that in FIG. 58, operations pertaining to the server are indicated via the dashed-line box.

AP labeled N701 performs sensing (Q401).

As a result of the sensing, AP labeled N701 confirms whether a moving object, including a person, was detected in the home (Q402).

When AP labeled N701 does not detect a moving object, including a person, in the home (no in Q402), the processing returns to the "perform sensing" step Q401.

When AP labeled N701 does detect a moving object, including a person, in the home (yes in Q402), AP labeled N701 uploads information related to in-home status to server Q101 via network Q102 (Q403).

In response, server Q101 transmits, to AP labeled N701, information related to control of audio equipment N702, information related to control of device #C labeled N703, or information related to control of luminaire N704. AP labeled N701 then obtains information related to control (control information) (yes in Q404).

AP labeled N701 then transmits the control information to the target device (in the example illustrated in FIG. 55, audio equipment N702, device #C labeled N703, or luminaire N704) (Q405).

In response, the target device carries out control based on the control information, and ends control (Q406).

AP labeled N701 then performs the next iteration of sensing (Q401).

On the other hand, consider a case in which AP labeled N701 detects a moving object, including a person, in the home (yes in Q402), uploads, to server Q101 via network Q102, information related to in-home status (Q403), but does not obtain control information from server Q101 (no in Q404). In such cases, AP labeled N701 performs the next iteration of sensing (Q401).

For example, consider a case in which AP labeled N701 transmits control information to audio equipment N702 in step Q405. In such cases, server Q101 transmits, to AP labeled N701, information related to directionality control for sound/audio of audio equipment N702, based on information indicating the position of a person obtained by sensing by AP labeled N701. AP labeled N701 transmits information related to directionality control for sound/audio to audio equipment N702, and based on the information related to directionality control for sound/audio, audio equipment N702 performs directionality control for sound/audio.

As another example, consider a case in which AP labeled N701 transmits control information to luminaire N704 in step Q405. In such cases, server Q101 transmits, to AP labeled N701, information related to the lighting of luminaire N704, such as ON/OFF or light emission directionality control, based on information indicating the position of a person or moving object obtained by sensing by AP labeled N701. AP labeled N701 then transmits information related to ON/OFF or light emission directionality control to luminaire N704, and luminaire N704 carries out control for turning ON/OFF the lighting or control of the direction of light emission, based on the information related to ON/OFF or light emission directionality control.

As described above, by controlling a device present in the home based on the in-home state, it is possible to achieve the advantageous effect that comfortable, safe living can be provided.

Next, another example of FIG. 58 will be given.

Device #C labeled N703 performs sensing (Q401).

As a result of the sensing, device #C labeled N703 confirms whether a moving object, including a person, was detected in the home (Q402).

When device #C labeled N703 does not detect a moving object, including a person, in the home (no in Q402), the processing returns to the "perform sensing" step Q401.

When device #C labeled N703 does detect a moving object, including a person, in the home (yes in Q402), device #C labeled N703 uploads, to server Q101 via AP labeled N701 and network Q102, information related to in-home status (Q403).

In response, server Q101 transmits, to device #C labeled N703 via network Q102 and AP labeled N701, information related to control of audio equipment N702 or information related to control of luminaire N704. Device #C labeled N703 then obtains information related to control (control information) (yes in Q404).

Device #C labeled N703 then transmits the control information to the target device (in the example illustrated in FIG. 55, audio equipment N702 or luminaire N704) (Q405). However, this transmission is performed via AP labeled N701.

In response, the target device carries out control based on the control information, and ends control (Q406).

Device #C labeled N703 then performs the next iteration of sensing (Q401).

On the other hand, consider a case in which device #C labeled N703 detects a moving object, including a person, in the home (yes in Q402), uploads, to server Q101 via AP labeled N701 and network Q102, information related to in-home status (Q403), but does not obtain control information from server Q101 (no in Q404). In such cases, device #C labeled N703 performs the next iteration of sensing (Q401).

For example, consider a case in which device #C labeled N703 transmits control information to audio equipment N702 in step Q405. In such cases, server Q101 transmits, to device #C labeled N703 via AP labeled N701, information related to directionality control for sound/audio of audio equipment N702, based on information indicating the position of a person obtained by sensing by device #C labeled N703. Device #C labeled N703 transmits information related to directionality control for sound/audio to audio equipment N702 via AP labeled N701, and based on the information related to directionality control for sound/audio, audio equipment N702 performs directionality control for sound/audio.

As another example, consider a case in which device #C labeled N703 transmits control information to luminaire N704 in step Q405. In such cases, server Q101 transmits, to device #C labeled N703 via AP labeled N701, information related to the lighting of luminaire N704, such as ON/OFF or light emission directionality control, based on information indicating the position of a person or moving object obtained by sensing by device #C labeled N703. Device #C labeled N703 then transmits information related to ON/OFF or light emission directionality control to luminaire N704 via AP labeled N701, and luminaire N704 carries out control for turning ON/OFF the lighting or control of the direction of light emission, based on the information related to ON/OFF or light emission directionality control.

As described above, by controlling a device present in the home based on the in-home state, it is possible to achieve the advantageous effect that comfortable, safe living can be provided.

FIG. 59 illustrates a flow chart of one example of operations performed by in-home AP labeled N701 and server Q101. Note that in FIG. 59, operations pertaining to the server are indicated via the dashed-line box.

AP labeled N701 performs sensing (Q501), and uploads, to server Q101, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Then, the next iteration of AP labeled N701 sensing is performed (Q501).

When server Q101 does not confirm that a new state has been detected (no in Q503), the next iteration of AP labeled N701 sensing is performed (Q501).

Next, another example in which device #C labeled N703 and server Q101 perform the operations illustrated in FIG. 59 will be given.

Device #C labeled N703 performs sensing (Q501), and uploads, to server Q101 via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Then, the next iteration of device #C labeled N703 sensing is performed (Q501).

When server Q101 does not confirm that a new state has been detected (no in Q503), the next iteration of device #C labeled N703 sensing is performed (Q501).

As described above, by controlling a device present in the home based on the in-home state, it is possible to achieve the advantageous effect that comfortable, safe living can be provided. It is also possible to achieve the advantageous effect that more favorable control is possible by updating information obtained via sensing as needed.

In FIG. 55, AP labeled N701, network labeled Q102, and server Q101 may be configured as a single apparatus. In such cases, network Q102 may be wired or wireless, and thus AP labeled N701 and server Q101 may be connected by wire or wirelessly in the single apparatus.

Embodiment 10

In the present embodiment, examples of specific usage methods of an apparatus having at least sensing functionality will be given.

Example 1

A character is generated based on an object obtained via sensing, and the character is displayed on a screen.

Using the character in an application diversifies the application, and achieves such an advantageous effect.

FIG. 60 illustrates one example of a configuration of a system according to the present embodiment.

In FIG. 60, assume the second apparatus is equipped with a monitor.

The first apparatus at least has sensing functionality. The first apparatus performs sensing, generates, for example, information by capturing a characterizing feature of a first person, and transmits the generated information to the second apparatus.

The second apparatus then generates a first character to be displayed on the monitor included in the second apparatus, based on the information on a characterizing feature of the first person. The first character can then be displayed on the monitor included in the second apparatus. Note that the first character may be customized by being transformed in some way.

As an example of another method, the first apparatus performs sensing, generates, for example, second character information by capturing a characterizing feature of a second object, and transmits the generated information to the second apparatus.

The second apparatus then displays, on the monitor included in the second apparatus, the second character based on the second character information. Note that the second character may be customized by being transformed in some way.

Note that the first apparatus and the second apparatus may be configured as a single apparatus.

FIG. 61 illustrates one example of a system configuration according to the present embodiment that differs from the example illustrated in FIG. 60.

In FIG. 61, assume the second apparatus is connectable to an external monitor.

The first apparatus at least has sensing functionality. The first apparatus performs sensing, generates, for example, information by capturing a characterizing feature of a first person, and transmits the generated information to the second apparatus.

The second apparatus then generates a first character to be displayed on the monitor connected to the second apparatus, based on the information on a characterizing feature of the first person. It is then possible to display the first character on the monitor. Note that the first character may be customized by being transformed in some way.

As an example of another method, the first apparatus performs sensing, generates, for example, second character information by capturing a characterizing feature of a second object, and transmits the generated information to the second apparatus.

The second apparatus then displays the second character based on the second character information on the monitor. Note that the second character may be customized by being transformed in some way.

Example 2

It is possible to reproduce the three-dimensional space that an object occupies by using object estimation information obtained from an image (still image or video) of an object obtained by a sensor capable of capturing an image, such as a camera, and, for example, by performing sensing using wireless technology.

FIG. 62 illustrates one example of a configuration of a system according to the present embodiment.

In FIG. 62, assume the third apparatus is equipped with a monitor.

Assume the third apparatus includes a sensor capable of capturing an image, such as a camera, and a wireless sensing unit.

Three-dimensional space estimation information for the object is obtained by the wireless sensing unit.

Two-dimensional (or three-dimensional) image information and color information of the object are obtained by capturing an image using a sensor capable of capturing an image, such as a camera.

The three-dimensional space estimator generates three-dimensional space (colorized) estimation information for the object from the three-dimensional space estimation information for the object and the two-dimensional (or three-dimensional) image information and color information of the object, and displays the generated information on the monitor.

Note that since three-dimensional information has been obtained, when the three-dimensional space (colorized) estimation information for the object is displayed on the monitor, the viewpoint from which the object is viewed can be changed freely.

FIG. 63 illustrates one example of a system configuration according to the present embodiment that differs from the example illustrated in FIG. 62.

In FIG. 63, assume the third apparatus is connectable to an external monitor.

Basic operations performed by the elements are as described with reference to FIG. 62.

Note that the sensing methods in the embodiments will be described supplementally.

FIG. 64 and FIG. 65 illustrate sensing methods described in the embodiments.

FIG. 64 schematically and three-dimensionally illustrates a space. As illustrated in FIG. 64, an object and a detecting apparatus are present in the space. For example, the detecting apparatus senses an object using wireless technology using, for example, radio waves. Note that the object may be any shape.

FIG. 65 illustrates one example of a plane passing through the object that is parallel to the xy plane in FIG. 64, and illustrates, for example, paths of radio waves transmitted by the detecting apparatus. Here, radio waves obtained by the detecting apparatus from the object may be reflected waves which are radio waves that reach the object and are reflected by the object, and may be radio waves emitted by the object itself.

As illustrated in FIG. 65, the detecting apparatus receives radio wave W1 that reaches the detecting apparatus directly after being reflected or emitted by the object (hereinafter referred to as a direct wave). The detecting apparatus also receives radio waves W2, W3 and W4 which are transmitted by the detecting apparatus, reflect off a wall, reach the object, reflect off the object, once again reflect off a wall, and reach the detecting apparatus (hereinafter referred to as reflected waves).

FIG. 65 illustrates an example of a single two-dimensional xy plane that cuts through the three-dimensional space. Since the above description can be applied to this two-dimensional plane that cuts through the three-dimensional space, the detecting apparatus can detect the position and shape of an object using direct and reflected waves. Stated differently, the detecting apparatus can achieve the advantageous effect that it can detect part of an object that cannot be captured with a sensor capable of capturing an image, such as a camera.

Embodiment 11

In the present embodiment, a specific implementation example that uses sensing will be given.

FIG. 66 illustrates an example of the system configuration according to the present embodiment. First apparatus T101 is communicating with server (cloud server) T103 via network T102. Second apparatus T105 is communicating with server (cloud server) T103 via network T104.

As an example, second apparatus T105 provides (uploads) an application (software) created (developed) by a user to server (cloud server) T103.

Server (cloud server) T103 is a server (cloud server) to which applications (software) are uploaded from apparatuses including the second apparatus and stored. Server (cloud server) T103 may include a plurality of apparatuses, and the plurality of apparatuses may be dispersed and connected by a network.

Server (cloud server) T103 is an apparatus that provides applications to apparatuses including the first apparatus.

Conceivable examples of the first apparatus include, but are not limited to a mobile phone, a cellular phone, a smartphone, a tablet, a tablet personal computer (PC), a personal computer (the personal computer may have a monitor or be able to connect a monitor), a notebook PC, a television, an apparatus connected to a monitor, a game console, a portable game console, augmented reality (AR) glasses, AR goggles, a monitor capable of displaying AR, an apparatus connected to a monitor capable of displaying AR, virtual reality (VR) glasses, VII goggles, a monitor capable of displaying VR, an apparatus connected to a monitor capable of displaying VR, mixed reality (MR) glasses, a monitor capable of displaying MR, an apparatus connected to a monitor capable of displaying MR, a car navigation system, a head mounted display, an apparatus connected to a head mounted display, a monitor, an apparatus connected to a monitor, a projector, an apparatus connected to a projector, etc.

FIG. 67 illustrates a second example of a system configuration according to the present embodiment. In FIG. 67, elements that operate the same as in FIG. 66 have the same reference signs, and repeated description will be omitted. FIG. 67 differs from FIG. 66 in that first apparatus T101 is communicating with computer network T111.

FIG. 68 illustrates one example of a configuration of first apparatus illustrated in FIG. 66 and FIG. 67. Communication unit T201 is communicating with another apparatus as indicated by T211 and T212. For example, communication unit T201 is communicating with computer network T111 and server (cloud server) T103. Communication unit T201 may communicate with other apparatuses as well.

Communication unit T201 is connected to storage T202, monitor T203, position estimator T204, signal processor T205, and camera T206.

Storage T202 is connected to communication unit T201, monitor T203, position estimator T204, signal processor T205, and camera T206.

Monitor T203 is connected to communication unit T201, storage T202, position estimator T204, signal processor T205, and camera T206.

Position estimator T204 is connected to communication unit T201, storage T202, monitor T203, signal processor T205, and camera T206.

Signal processor T205 is connected to communication unit T201, storage T202, monitor T203, position estimator T204, and camera T206.

Camera (image capturer) (image sensor) T206 is connected to communication unit T201, storage T202, monitor T203, position estimator T204, and signal processor T205.

FIG. 69 illustrates one example of a configuration the first apparatus illustrated in FIG. 66 and FIG. 67 that differs from the configuration illustrated in FIG. 68. Communication unit T201 is communicating with another apparatus as indicated by T211 and T212. For example, communication unit T201 is communicating with computer network T111 and server (cloud server) T103. Communication unit T201 may communicate with other apparatuses as well.

Communication unit T201 is connected to storage T202, monitor T203, position estimator T204, signal processor T205, camera T206, and sensing unit T207.

Storage T202 is connected to communication unit T201, monitor T203, position estimator T204, signal processor T205, camera T206, and sensing unit T207.

Monitor T203 is connected to communication unit T201, storage T202, position estimator T204, signal processor T205, camera T206, and sensing unit T207.

Position estimator T204 is connected to communication unit T201, storage T202, monitor T203, signal processor T205, camera T206, and sensing unit T207.

Signal processor T205 is connected to communication unit T201, storage T202, monitor T203, position estimator T204, camera T206, and sensing unit T207.

Camera (image capturer) (image sensor) T206 is connected to communication unit T201, storage T202, monitor T203, position estimator T204, signal processor T205, and sensing unit T207.

Sensing unit T207 is connected to communication unit T201, storage T202, monitor T203, position estimator T204, signal processor T205, and camera T206.

As described in FIG. 66 and FIG. 67, first apparatus T101 illustrated in FIG. 66 and FIG. 67 downloads an application (software) from (cloud) server T103 via network T102.

First apparatus T101 having one of the configurations illustrated in FIG. 68 and FIG. 69 stores the downloaded application (software) in storage T202.

Accordingly, communication unit T201 included in first apparatus T101 having one of the configurations illustrated in FIG. 68 and FIG. 69 obtains the application (software) from (cloud) server T103 via network T102 and stores the application (software) in storage T102.

Signal processor T205 illustrated in FIG. 68 and FIG. 69, for example, starts an application stored in storage T202 based on instructions from the user, and performs execution based on the application. The user's instructions may be implemented, for example, by the user using the touch panel function of monitor T203, or the user may give the instructions from an external device via communication unit T201.

Signal processor T205 in FIG. 68 then accesses communication unit T201, storage T202, monitor T203, position estimator T204, and camera T206 as necessary by executing the application. The configuration of first apparatus T101 is not limited to the configuration illustrated in FIG. 68, and may include other parts accessible by communication unit T201, storage T202, monitor T203, position estimator T204, signal processor T205, and camera T206.

Signal processor T205 in FIG. 69 accesses communication unit T201, storage T202, monitor T203, position estimator T204, camera T206, and sensing unit T207 as necessary by executing the application. The configuration of first apparatus T101 is not limited to the configuration illustrated in FIG. 69, and may include other parts accessible by communication unit T201, storage T202, monitor T203, position estimator T204, signal processor T205, camera T206, and sensing unit T207.

FIG. 70 illustrates one example of a flow of operations when signal processor T205 of first apparatus T101 having the configuration illustrated in FIG. 68 or FIG. 69 implements an application (software).

First, the execution of the application (software) starts.

Next, whether the application that is being executed is within the validity period is checked (see T301).

If "NO" (i.e., if the application is not valid), the application ends or the user is prompted to update the application (for example, a display prompting to update the application is displayed on monitor T203).

If "YES" (i.e., if the application is valid), next, whether position information is obtainable (see T302) is checked (for example, when position information can be obtained by position estimator T204, the position information is determined to be obtainable).

If "NO" (i.e., if position information is unobtainable (for example, when position estimator T204 is not operating or position information is not available)), the application ends or the user is prompted to make a change so as to enable the obtainment of position information (for example, a prompt to enable the obtainment of position information is displayed on monitor T203).

If "YES" (i.e., if position information is obtainable (for example, when position estimator T204 is operating or when position information is available)), the processing proceeds to the next operation.

Examples of methods of obtaining position information include the following:

Position estimator T204 includes a global positioning system (GPS), and obtains position information by operation of the GPS;

Communication unit T201 obtains information from a base station of a cellular system, and position estimator T204 uses the information to estimate the position and obtain position information;

Communication unit T201 obtains information from a wireless LAN access point, and position estimator T204 uses the information to estimate the position and obtain position information;

Communication unit T201 obtains information from a base station or access point or the like of an optical communication system such as a visible light communication system, and position estimator T204 uses the information to estimate the position and obtain position information; and Using information obtained by sensing unit T207 performing sensing, position estimator T204 performs position estimation and obtains position information.

Since the sensing by sensing unit T207 is described in detail in other embodiments of the present specification, description here will be omitted. Sensing can be done using radio waves or light, such as visible light.

If the obtainment of position information is set to off while signal processor T205 is executing the application (software) (i.e., if position information becomes unobtainable), the application ends or the user is prompted to make a change so as to enable the obtainment of position information (for example, a prompt to enable the obtainment of position information is displayed on monitor T203).

FIG. 71 and FIG. 72, which illustrate a first example and a second example, respectively, of processes performed after those in FIG. 70 when signal processor T205 of first apparatus T101 is implementing the application will be described.

First example: Example 1-1 and Example 1-2 will be described as examples of the First Example.

Example 1-1: As illustrated in FIG. 71, after the processing of FIG. 70, first, position estimator T204 illustrated in FIG. 68 and FIG. 69 obtains position information, which signal processor T205 then obtains (see T401).

Camera T206 illustrated in FIG. 68 and FIG. 69 then obtains a still image or a video (in real-time or not in real-time).

Signal processor T205 then performs analysis such as detecting a distinctive object from the still image or video obtained from camera T206 (see T402). As a result, peripheral information based on position information is obtained (see T403).

From the position information, the still image or video, and the peripheral information based on the position information, signal processor T205 displays, on monitor T203, for example, in addition to the still image or video of the vicinity of the position: an advertisement, the first character group, and that the game can be implemented; an advertisement and the first character group; or an advertisement and that the game can be implemented (see T403).

Although the terminology "character group" is used, this refers to one or two or more characters.

Example 1-2: As illustrated in FIG. 71, after the processing of FIG. 70, first, position estimator T204 illustrated in FIG. 68 and FIG. 69 obtains position information, which signal processor T205 then obtains (see T401).

Camera T206 illustrated in FIG. 68 and FIG. 69 then obtains a still image or a video (in real-time or not in real-time).

Signal processor T205 then performs analysis such as detecting a distinctive object from the still image or video obtained from camera T206 (see T402). As a result, peripheral information based on position information is obtained (see T403).

From the position information, the still image or video, and the peripheral information based on the position information, signal processor T205 displays, on monitor T203: an advertisement, the first character group, and that the game can be implemented; an advertisement and the first character group; or an advertisement and that the game can be implemented (see T403).

In Example 1-1, the user sees the peripheral information in the form of a still image or video, but in Example 1-2, the user sees the peripheral information in the form of a view of the real world. Stated differently, the user will see a view of the real world and a display of: an advertisement, the first character group, and that the game can be implemented; an advertisement and the first character group; an advertisement and that the game can be implemented; or an advertisement.

Although the terminology "character group" is used, this refers to one or two or more characters.

Second example: Example 2-1, Example 2-2, and Example 2-3 will be described as examples of the Second Example.

Example 2-1: As illustrated in FIG. 72, after the processing of FIG. 70, first, position estimator T204 illustrated in FIG. 68 and FIG. 69 obtains position information, which signal processor T205 then obtains (see T401).

Camera T206 illustrated in FIG. 68 and FIG. 69 then obtains a still image or a video (in real-time or not in real-time).

Signal processor T205 then obtains peripheral information based on position information from the position information (see T411).

From the position information, the still image or video, and the peripheral information based on the position information, signal processor T205 displays, on monitor T203, for example, in addition to the still image or video of the vicinity of the position: an advertisement, the first character group, and that the game can be implemented; an advertisement and the first character group; or an advertisement and that the game can be implemented (see T411).

Although the terminology "character group" is used, this refers to one or two or more characters.

Example 2-2: As illustrated in FIG. 72, after the processing of FIG. 70, first, position estimator T204 illustrated in FIG. 68 and FIG. 69 obtains position information, which signal processor T205 then obtains (see T401).

Camera T206 illustrated in FIG. 68 and FIG. 69 then obtains a still image or a video (in real-time or not in real-time).

Signal processor T205 then obtains peripheral information based on position information from the position information (see T411).

From the position information, the still image or video, and the peripheral information based on the position information, signal processor T205 displays, on monitor T203: an advertisement, the first character group, and that the game can be implemented; an advertisement and the first character group; or an advertisement and that the game can be implemented (see T411).

In Example 2-1, the user sees the peripheral information in the form of a still image or video, but in Example 2-2, the user sees the peripheral information in the form of a view of the real world. Stated differently, the user will see a view of the real world and a display of: an advertisement, the first character group, and that the game can be implemented; an advertisement and the first character group; an advertisement and that the game can be implemented; or an advertisement.

Although the terminology "character group" is used, this refers to one or two or more characters.

Example 2-3: As illustrated in FIG. 72, after the processing of FIG. 70, first, position estimator T204 illustrated in FIG. 68 and FIG. 69 obtains position information, which signal processor T205 then obtains (see T401).

Signal processor T205 then obtains peripheral information based on position information from the position information (see T411).

From the position information and the peripheral information based on the position information, signal processor T205 displays, on monitor T203: an advertisement, the first character group, and that the game can be implemented; an advertisement and the first character group; or an advertisement and that the game can be implemented (see T411).

In Example 2-1, the user sees the peripheral information in the form of a still image or video, but in Example 2-2, the user sees the peripheral information in the form of a view of the real world. Stated differently, the user will see a view of the real world and a display of: an advertisement, the first character group, and that the game can be implemented; an advertisement and the first character group; an advertisement and that the game can be implemented; or an advertisement.

Although the terminology "character group" is used, this refers to one or two or more characters.

In this case, camera T206 may be omitted from the configurations illustrated in FIG. 68 and FIG. 69.

Next, specific examples of displays displayed by monitor T203 will be given.

The example illustrated in FIG. 73 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (A) a display of a shop advertisement, (B) a display for game implementation, and a display of a character group (named character group C).

Accordingly, monitor T203 illustrated in FIG. 68 and FIG. 69 displays an image or video of the vicinity of, for example, the Tokyo Tower, as well as (A) a display of a shop advertisement, (B) a display for game implementation, and a display of a character group (named character group C) (see T503).

As an example of another method, monitor T203 illustrated in FIG. 68 and FIG. 69 may display (A) a display of a shop advertisement, (B) a display for game implementation, and a display of a character group (named character group C) (see T503), and overlap these displays with a view of the real world in the vicinity of, for example, the Tokyo Tower, in a manner viewable by the user.

Although the above example includes displaying (A) a display of a shop advertisement, (B) a display for game implementation, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, a display of an advertisement for company D, (E) a display for game implementation, and a display of a character group (named character group F).

Accordingly, monitor T203 illustrated in FIG. 68 and FIG. 69 displays an image or video of the vicinity of, for example, the Sky Tree, as well as a display of an advertisement for company D, (E) a display for game implementation, and a display of a character group (named character group F).

As an example of another method, monitor T203 illustrated in FIG. 68 and FIG. 69 may display a display of an advertisement for company D, (E) a display for game implementation, and a display of a character group (named character group F), and overlap these displays with a view of the real world in the vicinity of, for example, the Sky Tree, in a manner viewable by the user.

Although the above example includes displaying a display of an advertisement for company D, (E) a display for game implementation, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, a display of an advertisement for company G, (H) a display for game implementation, and a display of a character group (named character group I).

Accordingly, monitor T203 illustrated in FIG. 68 and FIG. 69 displays an image or video of the vicinity of, for example, the Tokyo Tower, as well as a display of an advertisement for company G, (H) a display for game implementation, and a display of a character group (named character group I).

As an example of another method, monitor T203 illustrated in FIG. 68 and FIG. 69 may display a display of an advertisement for company G, (H) a display for game implementation, and a display of a character group (named character group I), and overlap these displays with a view of the real world in the vicinity of, for example, the Tokyo Tower, in a manner viewable by the user.

Although the above example includes displaying a display of an advertisement for company G, (H) a display for game implementation, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, a display of an advertisement for company J, (K) a display for game implementation, and a display of a character group (named character group L).

Accordingly, monitor T203 illustrated in FIG. 68 and FIG. 69 displays an image or video of the vicinity of, for example, the Tokyo Tower, as well as a display of an advertisement for company J, (K) a display for game implementation, and a display of a character group (named character group L).

As an example of another method, monitor T203 illustrated in FIG. 68 and FIG. 69 may display a display of an advertisement for company J, (K) a display for game implementation, and a display of a character group (named character group L), and overlap these displays with a view of the real world in the vicinity of, for example, the Tokyo Tower, in a manner viewable by the user.

Although the above example includes displaying a display of an advertisement for company J, (K) a display for game implementation, and a display of a character group (named character group L), one or more of these may be displayed.

The example illustrated in FIG. 74 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (A) a display of a shop advertisement, and a display of a character group (named character group C).

Accordingly, monitor T203 illustrated in FIG. 68 and FIG. 69 displays an image or video of the vicinity of, for example, the Tokyo Tower, as well as (A) a display of a shop advertisement, and a display of a character group (named character group C) (see T513).

As an example of another method, monitor T203 illustrated in FIG. 68 and FIG. 69 may display (A) a display of a shop advertisement, and a display of a character group (named character group C) (see T513), and overlap these displays with a view of the real world in the vicinity of, for example, the Tokyo Tower, in a manner viewable by the user.

Although the above example includes displaying (A) a display of a shop advertisement, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, a display of an advertisement for company D, and a display of a character group (named character group F).

Accordingly, monitor T203 illustrated in FIG. 68 and FIG. 69 displays an image or video of the vicinity of, for example, the Sky Tree, as well as a display of an advertisement for company D, and a display of a character group (named character group F).

As an example of another method, monitor T203 illustrated in FIG. 68 and FIG. 69 may display a display of an advertisement for company D, and a display of a character group (named character group F), and overlap these displays with a view of the real world in the vicinity of, for example, the Sky Tree, in a manner viewable by the user.

Although the above example includes displaying a display of an advertisement for company D, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, a display of an advertisement for company G, and a display of a character group (named character group I).

Accordingly, monitor T203 illustrated in FIG. 68 and FIG. 69 displays an image or video of the vicinity of, for example, the Tokyo Tower, as well as a display of an advertisement for company G, and a display of a character group (named character group I).

As an example of another method, monitor T203 illustrated in FIG. 68 and FIG. 69 may display a display of an advertisement for company G, and a display of a character group (named character group I), and overlap these displays with a view of the real world in the vicinity of, for example, the Tokyo Tower, in a manner viewable by the user.

Although the above example includes displaying a display of an advertisement for company G, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, a display of an advertisement for company J, and a display of a character group (named character group L).

Accordingly, monitor T203 illustrated in FIG. 68 and FIG. 69 displays an image or video of the vicinity of, for example, the Tokyo Tower, as well as a display of an advertisement for company J, and a display of a character group (named character group L).

As an example of another method, monitor T203 illustrated in FIG. 68 and FIG. 69 may display a display of an advertisement for company J, and a display of a character group (named character group L), and overlap these displays with a view of the real world in the vicinity of, for example, the Tokyo Tower, in a manner viewable by the user.

Although the above example includes displaying a display of an advertisement for company J, and a display of a character group (named character group L), one or more of these may be displayed.

The example illustrated in FIG. 75 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (A) a display of a shop advertisement, and (B) a display for game implementation.

Accordingly, monitor T203 illustrated in FIG. 68 and FIG. 69 displays an image or video of the vicinity of, for example, the Tokyo Tower, as well as (A) a display of a shop advertisement, and (B) a display for game implementation (see T523).

As an example of another method, monitor T203 illustrated in FIG. 68 and FIG. 69 may display (A) a display of a shop advertisement, and (B) a display for game implementation (see T523), and overlap these displays with a view of the real world in the vicinity of, for example, the Tokyo Tower, in a manner viewable by the user.

Although the above example includes displaying (A) a display of a shop advertisement, and (B) a display for game implementation, one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, a display of an advertisement for company D, and (E) a display for game implementation.

Accordingly, monitor T203 illustrated in FIG. 68 and FIG. 69 displays an image or video of the vicinity of, for example, the Sky Tree, as well as a display of an advertisement for company D, and (E) a display for game implementation.

As an example of another method, monitor T203 illustrated in FIG. 68 and FIG. 69 may display a display of an advertisement for company D, and (E) a display for game implementation, and overlap these displays with a view of the real world in the vicinity of, for example, the Sky Tree, in a manner viewable by the user.

Although the above example includes displaying a display of an advertisement for company D, and (E) a display for game implementation, one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower.

In this case, this different application displays, in the vicinity of the Tokyo Tower, a display of an advertisement for company G, and (H) a display for game implementation. Here, signal processor T205 may perform processing using the position information.

Accordingly, monitor T203 illustrated in FIG. 68 and FIG. 69 displays an image or video of the vicinity of, for example, the Tokyo Tower, as well as a display of an advertisement for company G, and (H) a display for game implementation.

As an example of another method, monitor T203 illustrated in FIG. 68 and FIG. 69 may display a display of an advertisement for company G, and (H) a display for game implementation, and overlap these displays with a view of the real world in the vicinity of, for example, the Tokyo Tower, in a manner viewable by the user.

Although the above example includes displaying a display of an advertisement for company G, and (H) a display for game implementation, one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, a display of an advertisement for company J, and (K) a display for game implementation.

Accordingly, monitor T203 illustrated in FIG. 68 and FIG. 69 displays an image or video of the vicinity of, for example, the Tokyo Tower, as well as a display of an advertisement for company J, and (K) a display for game implementation.

As an example of another method, monitor T203 illustrated in FIG. 68 and FIG. 69 may display a display of an advertisement for company J, and (K) a display for game implementation, and overlap these displays with a view of the real world in the vicinity of, for example, the Tokyo Tower, in a manner viewable by the user.

Although the above example includes displaying a display of an advertisement for company J and (K) a display for game implementation, one or more of these may be displayed.

The example illustrated in FIG. 76 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, (A) a display of a shop advertisement.

Accordingly, monitor T203 illustrated in FIG. 68 and FIG. 69 displays an image or video of the vicinity of, for example, the Tokyo Tower, as well as (A) a display of a shop advertisement (see T533).

As an example of another method, monitor T203 illustrated in FIG. 68 and FIG. 69 may display (A) a display of a shop advertisement (see T533), and overlap this display with a view of the real world in the vicinity of, for example, the Tokyo Tower, in a manner viewable by the user.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, a display of an advertisement for company D.

Accordingly, monitor T203 illustrated in FIG. 68 and FIG. 69 displays an image or video of the vicinity of, for example, the Sky Tree, as well as a display of an advertisement for company D.

As an example of another method, monitor T203 illustrated in FIG. 68 and FIG. 69 may display a display of an advertisement for company D, and overlap this display with a view of the real world in the vicinity of, for example, the Sky Tree, in a manner viewable by the user.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, a display of an advertisement for company G.

Accordingly, monitor T203 illustrated in FIG. 68 and FIG. 69 displays an image or video of the vicinity of, for example, the Tokyo Tower, as well as a display of an advertisement for company G.

As an example of another method, monitor T203 illustrated in FIG. 68 and FIG. 69 may display a display of an advertisement for company G, and overlap this display with a view of the real world in the vicinity of, for example, the Tokyo Tower, in a manner viewable by the user.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, a display of an advertisement for company J.

Accordingly, monitor T203 illustrated in FIG. 68 and FIG. 69 displays an image or video of the vicinity of, for example, the Tokyo Tower, as well as a display of an advertisement for company J.

As an example of another method, monitor T203 illustrated in FIG. 68 and FIG. 69 may display a display of an advertisement for company J, and overlap this display with a view of the real world in the vicinity of, for example, the Tokyo Tower, in a manner viewable by the user.

The example illustrated in FIG. 77 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (A) a display of a shop advertisement, (B) a display for game implementation, and a display of a character group (named character group C).

Accordingly, monitor T203 illustrated in FIG. 68 and FIG. 69 displays an image or video of the vicinity of, for example, the Tokyo Tower, as well as (A) a display of a shop advertisement, (B) a display for game implementation, and a display of a character group (named character group C) (see T603).

As an example of another method, monitor T203 illustrated in FIG. 68 and FIG. 69 may display (A) a display of a shop advertisement, (B) a display for game implementation, and a display of a character group (named character group C) (see T603), and overlap these displays with a view of the real world in the vicinity of, for example, the Tokyo Tower, in a manner viewable by the user.

Although the above example includes displaying (A) a display of a shop advertisement, (B) a display for game implementation, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, a display of an advertisement for company D, (E) a display for game implementation, and a display of a character group (named character group F).

Accordingly, monitor T203 illustrated in FIG. 68 and FIG. 69 displays an image or video of the vicinity of, for example, the Sky Tree, as well as a display of an advertisement for company D, (E) a display for game implementation, and a display of a character group (named character group F).

As an example of another method, monitor T203 illustrated in FIG. 68 and FIG. 69 may display a display of an advertisement for company D, (E) a display for game implementation, and a display of a character group (named character group F), and overlap these displays with a view of the real world in the vicinity of, for example, the Sky Tree, in a manner viewable by the user.

Although the above example includes displaying a display of an advertisement for company D, (E) a display for game implementation, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, a display of an advertisement for company G, (H) a display for game implementation, and a display of a character group (named character group I).

Accordingly, monitor T203 illustrated in FIG. 68 and FIG. 69 displays an image or video of the vicinity of, for example, the Tokyo Tower, as well as a display of an advertisement for company G, (H) a display for game implementation, and a display of a character group (named character group I).

As an example of another method, monitor T203 illustrated in FIG. 68 and FIG. 69 may display a display of an advertisement for company G, (H) a display for game implementation, and a display of a character group (named character group I), and overlap these displays with a view of the real world in the vicinity of, for example, the Tokyo Tower, in a manner viewable by the user.

Although the above example includes displaying a display of an advertisement for company G, (H) a display for game implementation, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, a display of an advertisement for company J, (K) a display for game implementation, and a display of a character group (named character group L).

Accordingly, monitor T203 illustrated in FIG. 68 and FIG. 69 displays an image or video of the vicinity of, for example, the Tokyo Tower, as well as a display of an advertisement for company J, (K) a display for game implementation, and a display of a character group (named character group L).

As an example of another method, monitor T203 illustrated in FIG. 68 and FIG. 69 may display a display of an advertisement for company J, (K) a display for game implementation, and a display of a character group (named character group L), and overlap these displays with a view of the real world in the vicinity of, for example, the Tokyo Tower, in a manner viewable by the user.

Although the above example includes displaying a display of an advertisement for company J, (K) a display for game implementation, and a display of a character group (named character group L), one or more of these may be displayed.

The example illustrated in FIG. 78 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (A) a display of a shop advertisement, and a display of a character group (named character group C).

Accordingly, monitor T203 illustrated in FIG. 68 and FIG. 69 displays an image or video of the vicinity of, for example, the Tokyo Tower, as well as (A) a display of a shop advertisement, and a display of a character group (named character group C) (see T613).

As an example of another method, monitor T203 illustrated in FIG. 68 and FIG. 69 may display (A) a display of a shop advertisement, and a display of a character group (named character group C) (see T613), and overlap these displays with a view of the real world in the vicinity of, for example, the Tokyo Tower, in a manner viewable by the user.

Although the above example includes displaying (A) a display of a shop advertisement, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, a display of an advertisement for company D, and a display of a character group (named character group F).

Accordingly, monitor T203 illustrated in FIG. 68 and FIG. 69 displays an image or video of the vicinity of, for example, the Sky Tree, as well as a display of an advertisement for company D, and a display of a character group (named character group F).

As an example of another method, monitor T203 illustrated in FIG. 68 and FIG. 69 may display a display of an advertisement for company D, and a display of a character group (named character group F), and overlap these displays with a view of the real world in the vicinity of, for example, the Sky Tree, in a manner viewable by the user.

Although the above example includes displaying a display of an advertisement for company D, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, a display of an advertisement for company G, and a display of a character group (named character group I).

Accordingly, monitor T203 illustrated in FIG. 68 and FIG. 69 displays an image or video of the vicinity of, for example, the Tokyo Tower, as well as a display of an advertisement for company G, and a display of a character group (named character group I).

As an example of another method, monitor T203 illustrated in FIG. 68 and FIG. 69 may display a display of an advertisement for company G, and a display of a character group (named character group I), and overlap these displays with a view of the real world in the vicinity of, for example, the Tokyo Tower, in a manner viewable by the user.

Although the above example includes displaying a display of an advertisement for company G, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, a display of an advertisement for company J, and a display of a character group (named character group L).

Accordingly, monitor T203 illustrated in FIG. 68 and FIG. 69 displays an image or video of the vicinity of, for example, the Tokyo Tower, as well as a display of an advertisement for company J, and a display of a character group (named character group L).

As an example of another method, monitor T203 illustrated in FIG. 68 and FIG. 69 may display a display of an advertisement for company J, and a display of a character group (named character group L), and overlap these displays with a view of the real world in the vicinity of, for example, the Tokyo Tower, in a manner viewable by the user.

Although the above example includes displaying a display of an advertisement for company J, and a display of a character group (named character group L), one or more of these may be displayed.

The example illustrated in FIG. 79 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (A) a display of a shop advertisement, and (B) a display for game implementation.

Accordingly, monitor T203 illustrated in FIG. 68 and FIG. 69 displays an image or video of the vicinity of, for example, the Tokyo Tower, as well as (A) a display of a shop advertisement, and (B) a display for game implementation (see T623).

As an example of another method, monitor T203 illustrated in FIG. 68 and FIG. 69 may display (A) a display of a shop advertisement, and (B) a display for game implementation (see T623), and overlap these displays with a view of the real world in the vicinity of, for example, the Tokyo Tower, in a manner viewable by the user.

Although the above example includes displaying (A) a display of a shop advertisement, and (B) a display for game implementation, one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, a display of an advertisement for company D, and (E) a display for game implementation.

Accordingly, monitor T203 illustrated in FIG. 68 and FIG. 69 displays an image or video of the vicinity of, for example, the Sky Tree, as well as a display of an advertisement for company D, and (E) a display for game implementation.

As an example of another method, monitor T203 illustrated in FIG. 68 and FIG. 69 may display a display of an advertisement for company D, and (E) a display for game implementation, and overlap these displays with a view of the real world in the vicinity of, for example, the Sky Tree, in a manner viewable by the user.

Although the above example includes displaying a display of an advertisement for company D, and (E) a display for game implementation, one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, a display of an advertisement for company G, and (H) a display for game implementation. Here, signal processor T205 may perform processing using the position information.

Accordingly, monitor T203 illustrated in FIG. 68 and FIG. 69 displays an image or video of the vicinity of, for example, the Tokyo Tower, as well as a display of an advertisement for company G, and (H) a display for game implementation.

As an example of another method, monitor T203 illustrated in FIG. 68 and FIG. 69 may display a display of an advertisement for company G, and (H) a display for game implementation, and overlap these displays with a view of the real world in the vicinity of, for example, the Tokyo Tower, in a manner viewable by the user.

Although the above example includes displaying a display of an advertisement for company G, and (H) a display for game implementation, one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, a display of an advertisement for company J, and (K) a display for game implementation.

Accordingly, monitor T203 illustrated in FIG. 68 and FIG. 69 displays an image or video of the vicinity of, for example, the Tokyo Tower, as well as a display of an advertisement for company J, and (K) a display for game implementation.

As an example of another method, monitor T203 illustrated in FIG. 68 and FIG. 69 may display a display of an advertisement for company J, and (K) a display for game implementation, and overlap these displays with a view of the real world in the vicinity of, for example, the Tokyo Tower, in a manner viewable by the user.

Although the above example includes displaying a display of an advertisement for company J and (K) a display for game implementation, one or more of these may be displayed.

The example illustrated in FIG. 80 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (A) a display of a shop advertisement.

Accordingly, monitor T203 illustrated in FIG. 68 and FIG. 69 displays an image or video of the vicinity of, for example, the Tokyo Tower, as well as (A) a display of a shop advertisement (see T633).

As an example of another method, monitor T203 illustrated in FIG. 68 and FIG. 69 may display (A) a display of a shop advertisement (see T633), and overlap this display with a view of the real world in the vicinity of, for example, the Tokyo Tower, in a manner viewable by the user.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, a display of an advertisement for company D.

Accordingly, monitor T203 illustrated in FIG. 68 and FIG. 69 displays an image or video of the vicinity of, for example, the Sky Tree, as well as a display of an advertisement for company D.

As an example of another method, monitor T203 illustrated in FIG. 68 and FIG. 69 may display a display of an advertisement for company D, and overlap this display with a view of the real world in the vicinity of, for example, the Sky Tree, in a manner viewable by the user.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, a display of an advertisement for company G.

Accordingly, monitor T203 illustrated in FIG. 68 and FIG. 69 displays an image or video of the vicinity of, for example, the Tokyo Tower, as well as a display of an advertisement for company G.

As an example of another method, monitor T203 illustrated in FIG. 68 and FIG. 69 may display a display of an advertisement for company G, and overlap this display with a view of the real world in the vicinity of, for example, the Tokyo Tower, in a manner viewable by the user.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, a display of an advertisement for company J.

Accordingly, monitor T203 illustrated in FIG. 68 and FIG. 69 displays an image or video of the vicinity of, for example, the Tokyo Tower, as well as a display of an advertisement for company J.

As an example of another method, monitor T203 illustrated in FIG. 68 and FIG. 69 may display a display of an advertisement for company J, and overlap this display with a view of the real world in the vicinity of, for example, the Tokyo Tower, in a manner viewable by the user.

FIG. 81 and FIG. 82, which illustrate a third example and a fourth example, respectively, of processes performed after those in FIG. 70 when signal processor T205 of first apparatus T101 is implementing the application will be described.

Third example: Example 3-1 and Example 3-2 will be described as examples of the Third Example.

Example 3-1: As illustrated in FIG. 81, after the processing of FIG. 70, first, position estimator T204 illustrated in FIG. 68 and FIG. 69 obtains position information, which signal processor T205 then obtains (see T401).

Camera T206 illustrated in FIG. 68 and FIG. 69 then obtains a still image or a video (in real-time or not in real-time).

Signal processor T205 then performs analysis such as detecting a distinctive object from the still image or video obtained from camera T206 (see T402). As a result, peripheral information based on position information is obtained (see T703).

From the position information, the still image or the video, and the peripheral information based on the position information, signal processor T205 displays, on monitor T203, for example, in addition to the still image or video of the vicinity of the position: a store, the first character group, and that the game can be implemented; a store and the first character group; a store and that the game can be implemented; or a store (see T703).

Although the terminology "character group" is used, this refers to one or two or more characters.

Example 3-2: As illustrated in FIG. 81, after the processing of FIG. 70, first, position estimator T204 illustrated in FIG. 68 and FIG. 69 obtains position information, which signal processor T205 then obtains (see T401).

Camera T206 illustrated in FIG. 68 and FIG. 69 then obtains a still image or a video (in real-time or not in real-time).

Signal processor T205 then performs analysis such as detecting a distinctive object from the still image or video obtained from camera T206 (see T402). As a result, peripheral information based on position information is obtained (see T403).

From the position information, the still image or the video, and the peripheral information based on the position information, signal processor T205 displays, on monitor T203, for example: a store, the first character group, and that the game can be implemented; a store and the first character group; a store and that the game can be implemented; or a store (see T703).

In Example 3-1, the user sees the peripheral information in the form of a still image or video, but in Example 3-2, the user sees the peripheral information in the form of a view of the real world. Stated differently, the user will see a view of the real world and a display of: a store, the first character group, and that the game can be implemented; a store and the first character group; a store and that the game can be implemented; or a store.

Although the terminology "character group" is used, this refers to one or two or more characters.

Fourth example: Example 4-1, Example 4-2, and Example 4-3 will be described as examples of the Fourth Example.

Example 4-1: As illustrated in FIG. 82, after the processing of FIG. 70, first, position estimator T204 illustrated in FIG. 68 and FIG. 69 obtains position information, which signal processor T205 then obtains (see T401).

Camera T206 illustrated in FIG. 68 and FIG. 69 then obtains a still image or a video (in real-time or not in real-time).

Signal processor T205 then obtains peripheral information based on position information from the position information (see T711).

From the position information, the still image or the video, and the peripheral information based on the position information, signal processor T205 displays, on monitor T203, for example, in addition to the still image or video of the vicinity of the position: a store, the first character group, and that the game can be implemented; a store and the first character group; a store and that the game can be implemented; or a store (see T711).

Although the terminology "character group" is used, this refers to one or two or more characters.

Example 4-2: As illustrated in FIG. 82, after the processing of FIG. 70, first, position estimator T204 illustrated in FIG. 68 and FIG. 69 obtains position information, which signal processor T205 then obtains (see T401).

Camera T206 illustrated in FIG. 68 and FIG. 69 then obtains a still image or a video (in real-time or not in real-time).

Signal processor T205 then obtains peripheral information based on position information from the position information (see T711).

From the position information, the still image or the video, and the peripheral information based on the position information, signal processor T205 displays, on monitor T203, for example: a store, the first character group, and that the game can be implemented; a store and the first character group; a store and that the game can be implemented; or a store (see T711).

In Example 4-1, the user sees the peripheral information in the form of a still image or video, but in Example 4-2, the user sees the peripheral information in the form of a view of the real world. Stated differently, the user will see a view of the real world and a display of: a store, the first character group, and that the game can be implemented; a store and the first character group; a store and that the game can be implemented; or a store.

Although the terminology "character group" is used, this refers to one or two or more characters.

Example 4-3: As illustrated in FIG. 82, after the processing of FIG. 70, first, position estimator T204 illustrated in FIG. 68 and FIG. 69 obtains position information, which signal processor T205 then obtains (see T401).

Signal processor T205 then obtains peripheral information based on position information from the position information (see T711).

From the position information and the peripheral information based on the position information, signal processor T205 displays, on monitor T203, for example: a store, the first character group, and that the game can be implemented; a store and the first character group; a store and that the game can be implemented; or a store (see T711).

In Example 4-1, the user sees the peripheral information in the form of a still image or video, but in Example 4-2, the user sees the peripheral information in the form of a view of the real world. Stated differently, the user will see a view of the real world and a display of: a store, the first character group, and that the game can be implemented; a store and the first character group; a store and that the game can be implemented; or a store.

Although the terminology "character group" is used, this refers to one or two or more characters.

In this case, camera T206 may be omitted from the configurations illustrated in FIG. 68 and FIG. 69.

Next, specific examples of displays displayed by monitor T203 will be given.

The example illustrated in FIG. 83 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (c) a display of a rice shop, (B) a display for game implementation, and a display of a character group (named character group C).

Accordingly, monitor T203 illustrated in FIG. 68 and FIG. 69 displays an image or video of the vicinity of, for example, the Tokyo Tower, as well as (c) a display of a rice shop, (B) a display for game implementation, and a display of a character group (named character group C) (see T803).

As an example of another method, monitor T203 illustrated in FIG. 68 and FIG. 69 may display (c) a display of a rice shop, (B) a display for game implementation, and a display of a character group (named character group C) (see T803), and overlap these displays with a view of the real world in the vicinity of, for example, the Tokyo Tower, in a manner viewable by the user.

Although the above example includes displaying (c) a display of a rice shop, (B) a display for game implementation, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, (d) a display of a shop, (E) a display for game implementation, and a display of a character group (named character group F).

Accordingly, monitor T203 illustrated in FIG. 68 and FIG. 69 displays an image or video of the vicinity of, for example, the Sky Tree, as well as (d) a display of a shop, (E) a display for game implementation, and a display of a character group (named character group F).

As an example of another method, monitor T203 illustrated in FIG. 68 and FIG. 69 may display (d) a display of a shop, (E) a display for game implementation, and a display of a character group (named character group F), and overlap these displays with a view of the real world in the vicinity of, for example, the Sky Tree, in a manner viewable by the user.

Although the above example includes displaying (d) a display of a shop, (E) a display for game implementation, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, (g) a display of a shop, (H) a display for game implementation, and a display of a character group (named character group I).

Accordingly, monitor T203 illustrated in FIG. 68 and FIG. 69 displays an image or video of the vicinity of, for example, the Tokyo Tower, as well as (g) a display of a shop, (H) a display for game implementation, and a display of a character group (named character group I).

As an example of another method, monitor T203 illustrated in FIG. 68 and FIG. 69 may display (g) a display of a shop, (H) a display for game implementation, and a display of a character group (named character group I), and overlap these displays with a view of the real world in the vicinity of, for example, the Tokyo Tower, in a manner viewable by the user.

Although the above example includes displaying (g) a display of a shop, (H) a display for game implementation, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, (j) a display of a shop, (K) a display for game implementation, and a display of a character group (named character group L).

Accordingly, monitor T203 illustrated in FIG. 68 and FIG. 69 displays an image or video of the vicinity of, for example, the Tokyo Tower, as well as (j) a display of a shop, (K) a display for game implementation, and a display of a character group (named character group L).

As an example of another method, monitor T203 illustrated in FIG. 68 and FIG. 69 may display (j) a display of a shop, (K) a display for game implementation, and a display of a character group (named character group L), and overlap these displays with a view of the real world in the vicinity of, for example, the Tokyo Tower, in a manner viewable by the user.

Although the above example includes displaying (j) a display of a shop, (K) a display for game implementation, and a display of a character group (named character group L), one or more of these may be displayed.

The example illustrated in FIG. 84 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (c) a display of a rice shop, and a display of a character group (named character group C).

Accordingly, monitor T203 illustrated in FIG. 68 and FIG. 69 displays an image or video of the vicinity of, for example, the Tokyo Tower, as well as (c) a display of a rice shop, and a display of a character group (named character group C) (see T813).

As an example of another method, monitor T203 illustrated in FIG. 68 and FIG. 69 may display (c) a display of a rice shop, and a display of a character group (named character group C) (see T813), and overlap these displays with a view of the real world in the vicinity of, for example, the Tokyo Tower, in a manner viewable by the user.

Although the above example includes displaying (c) a display of a rice shop, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, (d) a display of a shop, and a display of a character group (named character group F).

Accordingly, monitor T203 illustrated in FIG. 68 and FIG. 69 displays an image or video of the vicinity of, for example, the Sky Tree, as well as (d) a display of a shop, and a display of a character group (named character group F).

As an example of another method, monitor T203 illustrated in FIG. 68 and FIG. 69 may display (d) a display of a shop, and a display of a character group (named character group F), and overlap these displays with a view of the real world in the vicinity of, for example, the Sky Tree, in a manner viewable by the user.

Although the above example includes displaying (d) a display of a shop, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, (g) a display of a shop, and a display of a character group (named character group I).

Accordingly, monitor T203 illustrated in FIG. 68 and FIG. 69 displays an image or video of the vicinity of, for example, the Tokyo Tower, as well as (g) a display of a shop, and a display of a character group (named character group I).

As an example of another method, monitor T203 illustrated in FIG. 68 and FIG. 69 may display (g) a display of a shop, and a display of a character group (named character group I), and overlap these displays with a view of the real world in the vicinity of, for example, the Tokyo Tower, in a manner viewable by the user.

Although the above example includes displaying (g) a display of a shop, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, (j) a display of a shop, and a display of a character group (named character group L).

Accordingly, monitor T203 illustrated in FIG. 68 and FIG. 69 displays an image or video of the vicinity of, for example, the Tokyo Tower, as well as (j) a display of a shop, and a display of a character group (named character group L).

As an example of another method, monitor T203 illustrated in FIG. 68 and FIG. 69 may display (j) a display of a shop, and a display of a character group (named character group L), and overlap these displays with a view of the real world in the vicinity of, for example, the Tokyo Tower, in a manner viewable by the user.

Although the above example includes displaying (j) a display of a shop, and a display of a character group (named character group L), one or more of these may be displayed.

The example illustrated in FIG. 85 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (c) a display of a rice shop, and (B) a display for game implementation.

Accordingly, monitor T203 illustrated in FIG. 68 and FIG. 69 displays an image or video of the vicinity of, for example, the Tokyo Tower, as well as (c) a display of a rice shop, and (B) a display for game implementation (see T823).

As an example of another method, monitor T203 illustrated in FIG. 68 and FIG. 69 may display (c) a display of a rice shop, and (B) a display for game implementation (see T823), and overlap these displays with a view of the real world in the vicinity of, for example, the Tokyo Tower, in a manner viewable by the user.

Although the above example includes displaying (c) a display of a rice shop, and (B) a display for game implementation, one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, (d) a display of a shop, and (E) a display for game implementation.

Accordingly, monitor T203 illustrated in FIG. 68 and FIG. 69 displays an image or video of the vicinity of, for example, the Sky Tree, as well as (d) a display of a shop, and (E) a display for game implementation.

As an example of another method, monitor T203 illustrated in FIG. 68 and FIG. 69 may display (d) a display of a shop, and (E) a display for game implementation, and overlap these displays with a view of the real world in the vicinity of, for example, the Sky Tree, in a manner viewable by the user.

Although the above example includes displaying (d) a display of a shop, and (E) a display for game implementation, one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower.

In this case, this different application displays, in the vicinity of the Tokyo Tower, (g) a display of a shop, and (H) a display for game implementation. Here, signal processor T205 may perform processing using the position information.

Accordingly, monitor T203 illustrated in FIG. 68 and FIG. 69 displays an image or video of the vicinity of, for example, the Tokyo Tower, as well as (g) a display of a shop, and (H) a display for game implementation.

As an example of another method, monitor T203 illustrated in FIG. 68 and FIG. 69 may display (g) a display of a shop, and (H) a display for game implementation, and overlap these displays with a view of the real world in the vicinity of, for example, the Tokyo Tower, in a manner viewable by the user.

Although the above example includes displaying (g) a display of a shop, and (H) a display for game implementation, one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, (j) a display of a shop, and (K) a display for game implementation.

Accordingly, monitor T203 illustrated in FIG. 68 and FIG. 69 displays an image or video of the vicinity of, for example, the Tokyo Tower, as well as (j) a display of a shop, and (K) a display for game implementation.

As an example of another method, monitor T203 illustrated in FIG. 68 and FIG. 69 may display (j) a display of a shop, and (K) a display for game implementation, and overlap these displays with a view of the real world in the vicinity of, for example, the Tokyo Tower, in a manner viewable by the user.

Although the above example includes displaying (j) a display of a shop, and (K) a display for game implementation, one or more of these may be displayed.

The example illustrated in FIG. 86 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, (c) a display of a rice shop.

Accordingly, monitor T203 illustrated in FIG. 68 and FIG. 69 displays an image or video of the vicinity of, for example, the Tokyo Tower, as well as (c) a display of a rice shop (see T833).

As an example of another method, monitor T203 illustrated in FIG. 68 and FIG. 69 may display (c) a display of a rice shop (see T833), and overlap these displays with a view of the real world in the vicinity of, for example, the Tokyo Tower, in a manner viewable by the user.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, (d) a display of a shop.

Accordingly, monitor T203 illustrated in FIG. 68 and FIG. 69 displays an image or video of the vicinity of, for example, the Sky Tree, as well as (d) a display of a shop.

As an example of another method, monitor T203 illustrated in FIG. 68 and FIG. 69 may display (d) a display of a shop, and overlap this display with a view of the real world in the vicinity of, for example, the Sky Tree, in a manner viewable by the user.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, (g) a display of a shop.

Accordingly, monitor T203 illustrated in FIG. 68 and FIG. 69 displays an image or video of the vicinity of, for example, the Tokyo Tower, as well as (g) a display of a shop.

As an example of another method, monitor T203 illustrated in FIG. 68 and FIG. 69 may display (g) a display of a shop, and overlap this display with a view of the real world in the vicinity of, for example, the Tokyo Tower, in a manner viewable by the user.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, (j) a display of a shop.

Accordingly, monitor T203 illustrated in FIG. 68 and FIG. 69 displays an image or video of the vicinity of, for example, the Tokyo Tower, as well as (j) a display of a shop.

As an example of another method, monitor T203 illustrated in FIG. 68 and FIG. 69 may display (j) a display of a shop, and overlap this display with a view of the real world in the vicinity of, for example, the Tokyo Tower, in a manner viewable by the user.

The example illustrated in FIG. 87 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (c) a display of a rice shop, (B) a display for game implementation, and a display of a character group (named character group C).

Accordingly, monitor T203 illustrated in FIG. 68 and FIG. 69 displays an image or video of the vicinity of, for example, the Tokyo Tower, as well as (c) a display of a rice shop, (B) a display for game implementation, and a display of a character group (named character group C) (see T903).

As an example of another method, monitor T203 illustrated in FIG. 68 and FIG. 69 may display (c) a display of a rice shop, (B) a display for game implementation, and a display of a character group (named character group C) (see T903), and overlap these displays with a view of the real world in the vicinity of, for example, the Tokyo Tower, in a manner viewable by the user.

Although the above example includes displaying (c) a display of a rice shop, (B) a display for game implementation, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, (d) a display of a shop, (E) a display for game implementation, and a display of a character group (named character group F).

Accordingly, monitor T203 illustrated in FIG. 68 and FIG. 69 displays an image or video of the vicinity of, for example, the Sky Tree, as well as (d) a display of a shop, (E) a display for game implementation, and a display of a character group (named character group F).

As an example of another method, monitor T203 illustrated in FIG. 68 and FIG. 69 may display (d) a display of a shop, (E) a display for game implementation, and a display of a character group (named character group F), and overlap these displays with a view of the real world in the vicinity of, for example, the Sky Tree, in a manner viewable by the user.

Although the above example includes displaying (d) a display of a shop, (E) a display for game implementation, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (g) a display of a shop, (H) a display for game implementation, and a display of a character group (named character group I).

Accordingly, monitor T203 illustrated in FIG. 68 and FIG. 69 displays an image or video of the vicinity of, for example, the Tokyo Tower, as well as (g) a display of a shop, (H) a display for game implementation, and a display of a character group (named character group I).

As an example of another method, monitor T203 illustrated in FIG. 68 and FIG. 69 may display (g) a display of a shop, (H) a display for game implementation, and a display of a character group (named character group I), and overlap these displays with a view of the real world in the vicinity of, for example, the Tokyo Tower, in a manner viewable by the user.

Although the above example includes displaying (g) a display of a shop, (H) a display for game implementation, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, (j) a display of a shop, (K) a display for game implementation, and a display of a character group (named character group L).

Accordingly, monitor T203 illustrated in FIG. 68 and FIG. 69 displays an image or video of the vicinity of, for example, the Tokyo Tower, as well as (j) a display of a shop, (K) a display for game implementation, and a display of a character group (named character group L).

As an example of another method, monitor T203 illustrated in FIG. 68 and FIG. 69 may display (j) a display of a shop, (K) a display for game implementation, and a display of a character group (named character group L), and overlap these displays with a view of the real world in the vicinity of, for example, the Tokyo Tower, in a manner viewable by the user.

Although the above example includes displaying (j) a display of a shop, (K) a display for game implementation, and a display of a character group (named character group L), one or more of these may be displayed.

The example illustrated in FIG. 88 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (c) a display of a rice shop, and a display of a character group (named character group C).

Accordingly, monitor T203 illustrated in FIG. 68 and FIG. 69 displays an image or video of the vicinity of, for example, the Tokyo Tower, as well as (c) a display of a rice shop, and a display of a character group (named character group C) (see T913).

As an example of another method, monitor T203 illustrated in FIG. 68 and FIG. 69 may display (c) a display of a rice shop, and a display of a character group (named character group C) (see T913), and overlap these displays with a view of the real world in the vicinity of, for example, the Tokyo Tower, in a manner viewable by the user.

Although the above example includes displaying (c) a display of a rice shop, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, (d) a display of a shop, and a display of a character group (named character group F).

Accordingly, monitor T203 illustrated in FIG. 68 and FIG. 69 displays an image or video of the vicinity of, for example, the Sky Tree, as well as (d) a display of a shop, and a display of a character group (named character group F).

As an example of another method, monitor T203 illustrated in FIG. 68 and FIG. 69 may display (d) a display of a shop, and a display of a character group (named character group F), and overlap these displays with a view of the real world in the vicinity of, for example, the Sky Tree, in a manner viewable by the user.

Although the above example includes displaying (d) a display of a shop, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (g) a display of a shop, and a display of a character group (named character group I).

Accordingly, monitor T203 illustrated in FIG. 68 and FIG. 69 displays an image or video of the vicinity of, for example, the Tokyo Tower, as well as (g) a display of a shop, and a display of a character group (named character group I).

As an example of another method, monitor T203 illustrated in FIG. 68 and FIG. 69 may display (g) a display of a shop, and a display of a character group (named character group I), and overlap these displays with a view of the real world in the vicinity of, for example, the Tokyo Tower, in a manner viewable by the user.

Although the above example includes displaying (g) a display of a shop, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, (j) a display of a shop, and a display of a character group (named character group L).

Accordingly, monitor T203 illustrated in FIG. 68 and FIG. 69 displays an image or video of the vicinity of, for example, the Tokyo Tower, as well as (j) a display of a shop, and a display of a character group (named character group L).

As an example of another method, monitor T203 illustrated in FIG. 68 and FIG. 69 may display (j) a display of a shop, and a display of a character group (named character group L), and overlap these displays with a view of the real world in the vicinity of, for example, the Tokyo Tower, in a manner viewable by the user.

Although the above example includes displaying (j) a display of a shop, and a display of a character group (named character group L), one or more of these may be displayed.

The example illustrated in FIG. 89 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (c) a display of a rice shop, and (B) a display for game implementation.

Accordingly, monitor T203 illustrated in FIG. 68 and FIG. 69 displays an image or video of the vicinity of, for example, the Tokyo Tower, as well as (c) a display of a rice shop, and (B) a display for game implementation (see T923).

As an example of another method, monitor T203 illustrated in FIG. 68 and FIG. 69 may display (c) a display of a rice shop, and (B) a display for game implementation (see T923), and overlap these displays with a view of the real world in the vicinity of, for example, the Tokyo Tower, in a manner viewable by the user.

Although the above example includes displaying (c) a display of a rice shop, and (B) a display for game implementation, one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, (d) a display of a shop, and (E) a display for game implementation.

Accordingly, monitor T203 illustrated in FIG. 68 and FIG. 69 displays an image or video of the vicinity of, for example, the Sky Tree, as well as (d) a display of a shop, and (E) a display for game implementation.

As an example of another method, monitor T203 illustrated in FIG. 68 and FIG. 69 may display (d) a display of a shop, and (E) a display for game implementation, and overlap these displays with a view of the real world in the vicinity of, for example, the Sky Tree, in a manner viewable by the user.

Although the above example includes displaying (d) a display of a shop, and (E) a display for game implementation, one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (g) a display of a shop, and (H) a display for game implementation. Here, signal processor T205 may perform processing using the position information.

Accordingly, monitor T203 illustrated in FIG. 68 and FIG. 69 displays an image or video of the vicinity of, for example, the Tokyo Tower, as well as (g) a display of a shop, and (H) a display for game implementation.

As an example of another method, monitor T203 illustrated in FIG. 68 and FIG. 69 may display (g) a display of a shop, and (H) a display for game implementation, and overlap these displays with a view of the real world in the vicinity of, for example, the Tokyo Tower, in a manner viewable by the user.

Although the above example includes displaying (g) a display of a shop, and (H) a display for game implementation, one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, (j) a display of a shop, and (K) a display for game implementation.

Accordingly, monitor T203 illustrated in FIG. 68 and FIG. 69 displays an image or video of the vicinity of, for example, the Tokyo Tower, as well as (j) a display of a shop, and (K) a display for game implementation.

As an example of another method, monitor T203 illustrated in FIG. 68 and FIG. 69 may display (j) a display of a shop, and (K) a display for game implementation, and overlap these displays with a view of the real world in the vicinity of, for example, the Tokyo Tower, in a manner viewable by the user.

Although the above example includes displaying (j) a display of a shop, and (K) a display for game implementation, one or more of these may be displayed.

The example illustrated in FIG. 90 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (c) a display of a rice shop.

Accordingly, monitor T203 illustrated in FIG. 68 and FIG. 69 displays an image or video of the vicinity of, for example, the Tokyo Tower, as well as (c) a display of a rice shop (see T933).

As an example of another method, monitor T203 illustrated in FIG. 68 and FIG. 69 may display (c) a display of a rice shop (see T933), and overlap this display with a view of the real world in the vicinity of, for example, the Tokyo Tower, in a manner viewable by the user.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, (d) a display of a shop.

Accordingly, monitor T203 illustrated in FIG. 68 and FIG. 69 displays an image or video of the vicinity of, for example, the Sky Tree, as well as (d) a display of a shop.

As an example of another method, monitor T203 illustrated in FIG. 68 and FIG. 69 may display (d) a display of a shop, and overlap this display with a view of the real world in the vicinity of, for example, the Sky Tree, in a manner viewable by the user.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (g) a display of a shop.

Accordingly, monitor T203 illustrated in FIG. 68 and FIG. 69 displays an image or video of the vicinity of, for example, the Tokyo Tower, as well as (g) a display of a shop.

As an example of another method, monitor T203 illustrated in FIG. 68 and FIG. 69 may display (g) a display of a shop, and overlap this display with a view of the real world in the vicinity of, for example, the Tokyo Tower, in a manner viewable by the user.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, (j) a display of a shop.

Accordingly, monitor T203 illustrated in FIG. 68 and FIG. 69 displays an image or video of the vicinity of, for example, the Tokyo Tower, as well as (j) a display of a shop.

As an example of another method, monitor T203 illustrated in FIG. 68 and FIG. 69 may display (j) a display of a shop, and overlap this display with a view of the real world in the vicinity of, for example, the Tokyo Tower, in a manner viewable by the user.

The example illustrated in FIG. 91 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (α) a display of a sales venue entrance, (B) a display for game implementation, and a display of a character group (named character group C).

Accordingly, monitor T203 illustrated in FIG. 68 and FIG. 69 displays an image or video of the vicinity of, for example, the Tokyo Tower, as well as (a) a display of a sales venue entrance, (B) a display for game implementation, and a display of a character group (named character group C) (see T1003).

As an example of another method, monitor T203 illustrated in FIG. 68 and FIG. 69 may display (α) a display of a sales venue entrance, (B) a display for game implementation, and a display of a character group (named character group C) (see T1003), and overlap these displays with a view of the real world in the vicinity of, for example, the Tokyo Tower, in a manner viewable by the user.

Although the above example includes displaying (α) a display of a sales venue entrance, (B) a display for game implementation, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, (β) a display of a sales venue entrance, (E) a display for game implementation, and a display of a character group (named character group F).

Accordingly, monitor T203 illustrated in FIG. 68 and FIG. 69 displays an image or video of the vicinity of, for example, the Sky Tree, as well as (β) a display of a sales venue entrance, (E) a display for game implementation, and a display of a character group (named character group F).

As an example of another method, monitor T203 illustrated in FIG. 68 and FIG. 69 may display (β) a display of a sales venue entrance, (E) a display for game implementation, and a display of a character group (named character group F), and overlap these displays with a view of the real world in the vicinity of, for example, the Sky Tree, in a manner viewable by the user.

Although the above example includes displaying (β) a display of a sales venue entrance, (E) a display for game implementation, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, (γ) a display of a sales venue entrance, (H) a display for game implementation, and a display of a character group (named character group I).

Accordingly, monitor T203 illustrated in FIG. 68 and FIG. 69 displays an image or video of the vicinity of, for example, the Tokyo Tower, as well as (γ) a display of a sales venue entrance, (H) a display for game implementation, and a display of a character group (named character group I).

As an example of another method, monitor T203 illustrated in FIG. 68 and FIG. 69 may display (γ) a display of a sales venue entrance, (H) a display for game implementation, and a display of a character group (named character group I), and overlap these displays with a view of the real world in the vicinity of, for example, the Tokyo Tower, in a manner viewable by the user.

Although the above example includes displaying (γ) a display of a sales venue entrance, (H) a display for game implementation, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, at time #2 in the vicinity of the Tokyo Tower, (δ) a display of a sales venue entrance, (K) a display for game implementation, and a display of a character group (named character group L).

Accordingly, monitor T203 illustrated in FIG. 68 and FIG. 69 displays an image or video of the vicinity of, for example, the Tokyo Tower, as well as (δ) a display of a sales venue entrance, (K) a display for game implementation, and a display of a character group (named character group L).

As an example of another method, monitor T203 illustrated in FIG. 68 and FIG. 69 may display (δ) a display of a sales venue entrance, (K) a display for game implementation, and a display of a character group (named character group L), and overlap these displays with a view of the real world in the vicinity of, for example, the Tokyo Tower, in a manner viewable by the user.

Although the above example includes displaying (δ) a display of a sales venue entrance, (K) a display for game implementation, and a display of a character group (named character group L), one or more of these may be displayed.

The example illustrated in FIG. 92 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (α) a display of a sales venue entrance, and a display of a character group (named character group C).

Accordingly, monitor T203 illustrated in FIG. 68 and FIG. 69 displays an image or video of the vicinity of, for example, the Tokyo Tower, as well as (α) a display of a sales venue entrance, and a display of a character group (named character group C) (see T1013).

As an example of another method, monitor T203 illustrated in FIG. 68 and FIG. 69 may display (α) a display of a sales venue entrance, and a display of a character group (named character group C) (see T1013), and overlap these displays with a view of the real world in the vicinity of, for example, the Tokyo Tower, in a manner viewable by the user.

Although the above example includes displaying (α) a display of a sales venue entrance, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, (β) a display of a sales venue entrance, and a display of a character group (named character group F).

Accordingly, monitor T203 illustrated in FIG. 68 and FIG. 69 displays an image or video of the vicinity of, for example, the Sky Tree, as well as (β) a display of a sales venue entrance, and a display of a character group (named character group F).

As an example of another method, monitor T203 illustrated in FIG. 68 and FIG. 69 may display (β) a display of a sales venue entrance, and a display of a character group (named character group F), and overlap these displays with a view of the real world in the vicinity of, for example, the Sky Tree, in a manner viewable by the user.

Although the above example includes displaying (β) a display of a sales venue entrance, and a display of a character group (named character group F), and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, (γ) a display of a sales venue entrance, and a display of a character group (named character group I).

Accordingly, monitor T203 illustrated in FIG. 68 and FIG. 69 displays an image or video of the vicinity of, for example, the Tokyo Tower, as well as (γ) a display of a sales venue entrance, and a display of a character group (named character group I).

As an example of another method, monitor T203 illustrated in FIG. 68 and FIG. 69 may display (γ) a display of a sales venue entrance, and a display of a character group (named character group I), and overlap these displays with a view of the real world in the vicinity of, for example, the Tokyo Tower, in a manner viewable by the user.

Although the above example includes displaying (γ) a display of a sales venue entrance, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, at time #2 in the vicinity of the Tokyo Tower, (δ) a display of a sales venue entrance, and a display of a character group (named character group L).

Accordingly, monitor T203 illustrated in FIG. 68 and FIG. 69 displays an image or video of the vicinity of, for example, the Tokyo Tower, as well as (δ) a display of a sales venue entrance, and a display of a character group (named character group L).

As an example of another method, monitor T203 illustrated in FIG. 68 and FIG. 69 may display (δ) a display of a sales venue entrance, and a display of a character group (named character group L), and overlap these displays with a view of the real world in the vicinity of, for example, the Tokyo Tower, in a manner viewable by the user.

Although the above example includes displaying (δ) a display of a sales venue entrance, and a display of a character group (named character group L), one or more of these may be displayed.

The example illustrated in FIG. 93 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (α) a display of a sales venue entrance, and (B) a display for game implementation.

Accordingly, monitor T203 illustrated in FIG. 68 and FIG. 69 displays an image or video of the vicinity of, for example, the Tokyo Tower, as well as (α) a display of a sales venue entrance, and (B) a display for game implementation (see T1023).

As an example of another method, monitor T203 illustrated in FIG. 68 and FIG. 69 may display (α) a display of a sales venue entrance, and (B) a display for game implementation (see T1023), and overlap these displays with a view of the real world in the vicinity of, for example, the Tokyo Tower, in a manner viewable by the user.

Although the above example includes displaying (α) a display of a sales venue entrance, and (B) a display for game implementation, one or more of these may be displayed.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, (β) a display of a sales venue entrance, and (E) a display for game implementation.

Accordingly, monitor T203 illustrated in FIG. 68 and FIG. 69 displays an image or video of the vicinity of, for example, the Sky Tree, as well as (β) a display of a sales venue entrance, and (E) a display for game implementation.

As an example of another method, monitor T203 illustrated in FIG. 68 and FIG. 69 may display (β) a display of a sales venue entrance, and (E) a display for game implementation, and overlap these displays with a view of the real world in the vicinity of, for example, the Sky Tree, in a manner viewable by the user.

Although the above example includes displaying (β) a display of a sales venue entrance, and (E) a display for game implementation, one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower.

In this case, this different application displays, in the vicinity of the Tokyo Tower, (γ) a display of a sales venue entrance, and (H) a display for game implementation. Here, signal processor T205 may perform processing using the position information.

Accordingly, monitor T203 illustrated in FIG. 68 and FIG. 69 displays an image or video of the vicinity of, for example, the Tokyo Tower, as well as (γ) a display of a sales venue entrance, and (H) a display for game implementation.

As an example of another method, monitor T203 illustrated in FIG. 68 and FIG. 69 may display (γ) a display of a sales venue entrance, and (H) a display for game implementation, and overlap these displays with a view of the real world in the vicinity of, for example, the Tokyo Tower, in a manner viewable by the user.

Although the above example includes displaying (γ) a display of a sales venue entrance, and (H) a display for game implementation, one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, at time #2 in the vicinity of the Tokyo Tower, (δ) a display of a sales venue entrance, and (K) a display for game implementation.

Accordingly, monitor T203 illustrated in FIG. 68 and FIG. 69 displays an image or video of the vicinity of, for example, the Tokyo Tower, as well as (δ) a display of a sales venue entrance, and (K) a display for game implementation.

As an example of another method, monitor T203 illustrated in FIG. 68 and FIG. 69 may display (δ) a display of a sales venue entrance, and (K) a display for game implementation, and overlap these displays with a view of the real world in the vicinity of, for example, the Tokyo Tower, in a manner viewable by the user.

Although the above example includes displaying (δ) a display of a sales venue entrance, and (K) a display for game implementation, one or more of these may be displayed.

The example illustrated in FIG. 94 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, the application displays, in the vicinity of the Tokyo Tower, (α) a display of a sales venue entrance.

Accordingly, monitor T203 illustrated in FIG. 68 and FIG. 69 displays an image or video of the vicinity of, for example, the Tokyo Tower, as well as (α) a display of a sales venue entrance (see T1033).

As an example of another method, monitor T203 illustrated in FIG. 68 and FIG. 69 may display (α) a display of a sales venue entrance (see T1033), and overlap this display with a view of the real world in the vicinity of, for example, the Tokyo Tower, in a manner viewable by the user.

The following are also permitted.

The display may be set according to the position and a distinctive object.

For example, suppose that signal processor T205 recognizes that the position is in the vicinity of the Sky Tree based on the information obtained by position estimator T204 and/or the information obtained by camera unit T206.

In this case, the application displays, in the vicinity of the Sky Tree, (δ) a display of a sales venue entrance.

Accordingly, monitor T203 illustrated in FIG. 68 and FIG. 69 displays an image or video of the vicinity of, for example, the Sky Tree, as well as (β) a display of a sales venue entrance.

As an example of another method, monitor T203 illustrated in FIG. 68 and FIG. 69 may display (β) a display of a sales venue entrance, and overlap this display with a view of the real world in the vicinity of, for example, the Sky Tree, in a manner viewable by the user.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, this different application displays, in the vicinity of the Tokyo Tower, (γ) a display of a sales venue entrance.

Accordingly, monitor T203 illustrated in FIG. 68 and FIG. 69 displays an image or video of the vicinity of, for example, the Tokyo Tower, as well as (γ) a display of a sales venue entrance.

As an example of another method, monitor T203 illustrated in FIG. 68 and FIG. 69 may display (γ) a display of a sales venue entrance, and overlap this display with a view of the real world in the vicinity of, for example, the Tokyo Tower, in a manner viewable by the user.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 illustrated in FIG. 68 and FIG. 69 analyzes the still image or video obtained by camera unit T206, and recognizes that one of the structures is the Tokyo Tower. Here, signal processor T205 may perform processing using the position information.

In this case, at time #2 the application displays, in the vicinity of the Tokyo Tower, (δ) a display of a sales venue entrance.

Accordingly, monitor T203 illustrated in FIG. 68 and FIG. 69 displays an image or video of the vicinity of, for example, the Tokyo Tower, as well as (δ) a display of a sales venue entrance.

As an example of another method, monitor T203 illustrated in FIG. 68 and FIG. 69 may display (δ) a display of a sales venue entrance, and overlap this display with a view of the real world in the vicinity of, for example, the Tokyo Tower, in a manner viewable by the user.

The example illustrated in FIG. 95 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (α) a display of a sales venue entrance, (B) a display for game implementation, and a display of a character group (named character group C).

Accordingly, monitor T203 illustrated in FIG. 68 and FIG. 69 displays an image or video of the vicinity of, for example, the Tokyo Tower, as well as (α) a display of a sales venue entrance, (B) a display for game implementation, and a display of a character group (named character group C) (see T1103).

As an example of another method, monitor T203 illustrated in FIG. 68 and FIG. 69 may display (α) a display of a sales venue entrance, (B) a display for game implementation, and a display of a character group (named character group C) (see T1103), and overlap these displays with a view of the real world in the vicinity of, for example, the Tokyo Tower, in a manner viewable by the user.

Although the above example includes displaying (α) a display of a sales venue entrance, (B) a display for game implementation, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, (β) a display of a sales venue entrance, (E) a display for game implementation, and a display of a character group (named character group F).

Accordingly, monitor T203 illustrated in FIG. 68 and FIG. 69 displays an image or video of the vicinity of, for example, the Sky Tree, as well as (β) a display of a sales venue entrance, (E) a display for game implementation, and a display of a character group (named character group F).

As an example of another method, monitor T203 illustrated in FIG. 68 and FIG. 69 may display (β) a display of a sales venue entrance, (E) a display for game implementation, and a display of a character group (named character group F), and overlap these displays with a view of the real world in the vicinity of, for example, the Sky Tree, in a manner viewable by the user.

Although the above example includes displaying (β) a display of a sales venue entrance, (E) a display for game implementation, and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (γ) a display of a sales venue entrance, (H) a display for game implementation, and a display of a character group (named character group I).

Accordingly, monitor T203 illustrated in FIG. 68 and FIG. 69 displays an image or video of the vicinity of, for example, the Tokyo Tower, as well as (γ) a display of a sales venue entrance, (H) a display for game implementation, and a display of a character group (named character group I).

As an example of another method, monitor T203 illustrated in FIG. 68 and FIG. 69 may display (γ) a display of a sales venue entrance, (H) a display for game implementation, and a display of a character group (named character group I), and overlap these displays with a view of the real world in the vicinity of, for example, the Tokyo Tower, in a manner viewable by the user.

Although the above example includes displaying (γ) a display of a sales venue entrance, (H) a display for game implementation, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, at time #2 in the vicinity of the Tokyo Tower, (δ) a display of a sales venue entrance, (K) a display for game implementation, and a display of a character group (named character group L).

Accordingly, monitor T203 illustrated in FIG. 68 and FIG. 69 displays an image or video of the vicinity of, for example, the Tokyo Tower, as well as (δ) a display of a sales venue entrance, (K) a display for game implementation, and a display of a character group (named character group L).

As an example of another method, monitor T203 illustrated in FIG. 68 and FIG. 69 may display (δ) a display of a sales venue entrance, (K) a display for game implementation, and a display of a character group (named character group L), and overlap these displays with a view of the real world in the vicinity of, for example, the Tokyo Tower, in a manner viewable by the user.

Although the above example includes displaying (δ) a display of a sales venue entrance, (K) a display for game implementation, and a display of a character group (named character group L), one or more of these may be displayed.

The example illustrated in FIG. 96 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (α) a display of a sales venue entrance, and a display of a character group (named character group C).

Accordingly, monitor T203 illustrated in FIG. 68 and FIG. 69 displays an image or video of the vicinity of, for example, the Tokyo Tower, as well as (α) a display of a sales venue entrance, and a display of a character group (named character group C) (see T1113).

As an example of another method, monitor T203 illustrated in FIG. 68 and FIG. 69 may display (α) a display of a sales venue entrance, and a display of a character group (named character group C) (see T1113), and overlap these displays with a view of the real world in the vicinity of, for example, the Tokyo Tower, in a manner viewable by the user.

Although the above example includes displaying (α) a display of a sales venue entrance, and a display of a character group (named character group C), one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, (β) a display of a sales venue entrance, and a display of a character group (named character group F).

Accordingly, monitor T203 illustrated in FIG. 68 and FIG. 69 displays an image or video of the vicinity of, for example, the Sky Tree, as well as (β) a display of a sales venue entrance, and a display of a character group (named character group F).

As an example of another method, monitor T203 illustrated in FIG. 68 and FIG. 69 may display (β) a display of a sales venue entrance, and a display of a character group (named character group F), and overlap these displays with a view of the real world in the vicinity of, for example, the Sky Tree, in a manner viewable by the user.

Although the above example includes displaying (β) a display of a sales venue entrance, and a display of a character group (named character group F), and a display of a character group (named character group F), one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (γ) a display of a sales venue entrance, and a display of a character group (named character group I).

Accordingly, monitor T203 illustrated in FIG. 68 and FIG. 69 displays an image or video of the vicinity of, for example, the Tokyo Tower, as well as (γ) a display of a sales venue entrance, and a display of a character group (named character group I).

As an example of another method, monitor T203 illustrated in FIG. 68 and FIG. 69 may display (γ) a display of a sales venue entrance, and a display of a character group (named character group I), and overlap these displays with a view of the real world in the vicinity of, for example, the Tokyo Tower, in a manner viewable by the user.

Although the above example includes displaying (γ) a display of a sales venue entrance, and a display of a character group (named character group I), one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information. In this case, the application displays, at time #2 in the vicinity of the Tokyo Tower, (δ) a display of a sales venue entrance, and a display of a character group (named character group L).

Accordingly, monitor T203 illustrated in FIG. 68 and FIG. 69 displays an image or video of the vicinity of, for example, the Tokyo Tower, as well as (δ) a display of a sales venue entrance, and a display of a character group (named character group L).

As an example of another method, monitor T203 illustrated in FIG. 68 and FIG. 69 may display (δ) a display of a sales venue entrance, and a display of a character group (named character group L), and overlap these displays with a view of the real world in the vicinity of, for example, the Tokyo Tower, in a manner viewable by the user.

Although the above example includes displaying (δ) a display of a sales venue entrance, and a display of a character group (named character group L), one or more of these may be displayed.

The example illustrated in FIG. 97 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (α) a display of a sales venue entrance, and (B) a display for game implementation.

Accordingly, monitor T203 illustrated in FIG. 68 and FIG. 69 displays an image or video of the vicinity of, for example, the Tokyo Tower, as well as (α) a display of a sales venue entrance, and (B) a display for game implementation (see T1123).

As an example of another method, monitor T203 illustrated in FIG. 68 and FIG. 69 may display (α) a display of a sales venue entrance, and (B) a display for game implementation (see T1123), and overlap these displays with a view of the real world in the vicinity of, for example, the Tokyo Tower, in a manner viewable by the user.

Although the above example includes displaying (α) a display of a sales venue entrance, and (B) a display for game implementation, one or more of these may be displayed.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, (β) a display of a sales venue entrance, and (E) a display for game implementation.

Accordingly, monitor T203 illustrated in FIG. 68 and FIG. 69 displays an image or video of the vicinity of, for example, the Sky Tree, as well as (β) a display of a sales venue entrance, and (E) a display for game implementation.

As an example of another method, monitor T203 illustrated in FIG. 68 and FIG. 69 may display (β) a display of a sales venue entrance, and (E) a display for game implementation, and overlap these displays with a view of the real world in the vicinity of, for example, the Sky Tree, in a manner viewable by the user.

Although the above example includes displaying (β) a display of a sales venue entrance, and (E) a display for game implementation, one or more of these may be displayed.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (γ) a display of a sales venue entrance, and (H) a display for game implementation. Here, signal processor T205 may perform processing using the position information.

Accordingly, monitor T203 illustrated in FIG. 68 and FIG. 69 displays an image or video of the vicinity of, for example, the Tokyo Tower, as well as (γ) a display of a sales venue entrance, and (H) a display for game implementation.

As an example of another method, monitor T203 illustrated in FIG. 68 and FIG. 69 may display (γ) a display of a sales venue entrance, and (H) a display for game implementation, and overlap these displays with a view of the real world in the vicinity of, for example, the Tokyo Tower, in a manner viewable by the user.

Although the above example includes displaying (γ) a display of a sales venue entrance, and (H) a display for game implementation, one or more of these may be displayed.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, at time #2 in the vicinity of the Tokyo Tower, (δ) a display of a sales venue entrance, and (K) a display for game implementation.

Accordingly, monitor T203 illustrated in FIG. 68 and FIG. 69 displays an image or video of the vicinity of, for example, the Tokyo Tower, as well as (δ) a display of a sales venue entrance, and (K) a display for game implementation.

As an example of another method, monitor T203 illustrated in FIG. 68 and FIG. 69 may display (δ) a display of a sales venue entrance, and (K) a display for game implementation, and overlap these displays with a view of the real world in the vicinity of, for example, the Tokyo Tower, in a manner viewable by the user.

Although the above example includes displaying (δ) a display of a sales venue entrance, and (K) a display for game implementation, one or more of these may be displayed.

The example illustrated in FIG. 98 will be described.

In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, the application displays, in the vicinity of the Tokyo Tower, (α) a display of a sales venue entrance.

Accordingly, monitor T203 illustrated in FIG. 68 and FIG. 69 displays an image or video of the vicinity of, for example, the Tokyo Tower, as well as (α) a display of a sales venue entrance (see T1133).

As an example of another method, monitor T203 illustrated in FIG. 68 and FIG. 69 may display (α) a display of a sales venue entrance (see T1133), and overlap this display with a view of the real world in the vicinity of, for example, the Tokyo Tower, in a manner viewable by the user.

The following are also permitted.

The display may be set according to the position and a distinctive object.

For example, suppose that signal processor T205 recognizes that the position is in the vicinity of the Sky Tree based on the information obtained by position estimator T204.

In this case, the application displays, in the vicinity of the Sky Tree, (β) a display of a sales venue entrance.

Accordingly, monitor T203 illustrated in FIG. 68 and FIG. 69 displays an image or video of the vicinity of, for example, the Sky Tree, as well as (β) a display of a sales venue entrance.

As an example of another method, monitor T203 illustrated in FIG. 68 and FIG. 69 may display (β) a display of a sales venue entrance, and overlap this display with a view of the real world in the vicinity of, for example, the Sky Tree, in a manner viewable by the user.

The display may be different for each application.

For example, suppose that first apparatus T101 having the configuration illustrated in FIG. 68 or FIG. 69 executes an application different from the one described above. In this example, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, this different application displays, in the vicinity of the Tokyo Tower, (γ) a display of a sales venue entrance.

Accordingly, monitor T203 illustrated in FIG. 68 and FIG. 69 displays an image or video of the vicinity of, for example, the Tokyo Tower, as well as (γ) a display of a sales venue entrance.

As an example of another method, monitor T203 illustrated in FIG. 68 and FIG. 69 may display (γ) a display of a sales venue entrance, and overlap this display with a view of the real world in the vicinity of, for example, the Tokyo Tower, in a manner viewable by the user.

The display may be set according to a change in time.

For example, suppose that at time #1, the display of T503 in FIG. 73 is performed as described above.

Similarly, at time #2, in position estimator T204 illustrated in FIG. 68 and FIG. 69, the position is estimated to be in the vicinity of 4-2-8 Shibakouen, Minato-ku, Tokyo (see T501).

A still image or video, such as that indicated by T502, is obtained in camera T206 illustrated in FIG. 68 and FIG. 69.

Accordingly, signal processor T205 in FIG. 68 and FIG. 69 recognizes that this is the vicinity of Tokyo Tower, based on the position information.

In this case, at time #2 the application displays, in the vicinity of the Tokyo Tower, (δ) a display of a sales venue entrance.

Accordingly, monitor T203 illustrated in FIG. 68 and FIG. 69 displays an image or video of the vicinity of, for example, the Tokyo Tower, as well as (δ) a display of a sales venue entrance.

As an example of another method, monitor T203 illustrated in FIG. 68 and FIG. 69 may display (δ) a display of a sales venue entrance, and overlap this display with a view of the real world in the vicinity of, for example, the Tokyo Tower, in a manner viewable by the user.

FIG. 99 illustrates an example of a screen that is displayed when a user, for example, taps or clicks "sales venue entrance" in FIG. 91, FIG. 92, FIG. 93, FIG. 94, FIG. 95, FIG. 96, FIG. 97, or FIG. 98 that is displayed on monitor T203 (included in first apparatus T101 illustrated in FIG. 68 or FIG. 69). The screen illustrated in FIG. 99 may be a screen reached by a user, for example, tapping or clicking on "sales venue entrance" that links to sites to be accessed, for example. However, the screen illustrated in FIG. 99 is not limited to this example. What is important is that one or more or two or more stores are displayed on the screen, as in FIG. 99, and that the user can access each store.

As illustrated in FIG. 99, store A labeled T1201, store B labeled T1202, store C labeled T1203, store D labeled T1204, and store E labeled T1205 are displayed on monitor T203 included in first apparatus T101 illustrated in FIG. 68 or FIG. 69. When the user taps or clicks store A labeled T1201, store B labeled T1202, store C labeled T1203, store D labeled T1204, or store E labeled T1205, the following screen is displayed.

FIG. 100 is an example of a screen that is displayed on monitor T203 included in first apparatus T101 illustrated in FIG. 68 or FIG. 69 when a user taps or clicks a store displayed in FIG. 99, for example. For example, FIG. 100 illustrates a screen that is displayed when a user taps or clicks store A labeled T1201.

FIG. 100 is also an example of a screen that is displayed on monitor T203 included in first apparatus T101 illustrated in FIG. 68 or FIG. 69 when a user taps or clicks "(c) rice shop" displayed in FIG. 83, FIG. 84, FIG. 85, FIG. 86, FIG. 87, FIG. 88, FIG. 89, or FIG. 90, for example.

As illustrated in FIG. 100, prices of rice are displayed in manner that enables the viewer to see that the products have a uniform price of 6000 yen: Koshihikari #1 6000 yen; Koshihikari #2 6000 yen; Koshihikari #3 6000 yen; Sasanishiki #A 6000 yen; and Sasanishiki #B 6000 yen.

Then, when the user taps or clicks "Koshihikari #3 6000 yen", the user's checkout screen, as illustrated in FIG. 101, is displayed on monitor T203 included in first apparatus T101 illustrated in FIG. 68 or FIG. 69.

The screens illustrated in FIG. 99, FIG. 100, and FIG. 101 are only examples; examples of screens that are displayed on monitor T203 are not limited to these examples.

As described above, advertisements, stores, characters, games, and the like can be placed at desired positions in an augmented space or a virtual space without physically placing advertisements, stores, characters, games, and the like in a real-world space, achieving the advantageous effect of being able to provide the user with a wide range of information.

Moreover, by displaying and arranging advertisements, stores, characters, games, etc., in an augmented space or a virtual space by linking them with objects in a real-world space where people gather, such as a tourist attraction, an entertainment facility, and an event venue, it is possible achieve the advantageous effect of an increase in the possibility of providing advertisements, stores, characters, games, etc., in an augmented space or a virtual space to many users. Accordingly, in the above explanation, the Tokyo Tower and the Sky Tree are used as examples of a real-world space where people gather, such as a tourist attraction, an entertainment facility, and an event venue.

Furthermore, by changing and updating the events of advertisements, stores, characters, games, etc., arranged in an augmented space or a virtual space according to the location, time, application, etc., the advantageous effect of providing more information to the user can be achieved.

Embodiment 12

The present embodiment presents an example of operations performed by second apparatus T105 illustrated in FIG. 66 and FIG. 67 described in Embodiment 11.

As described in Embodiment 11, second apparatus T105 is an apparatus for generating and providing an application for use by first apparatus T101.

In the present embodiment, operations related to second apparatus T105 regarding content displayed by the application will be described.

FIG. 102 is a diagram of an apparatus that performs communication with second apparatus T105 illustrated in FIG. 66 and FIG. 67. As illustrated in FIG. 102, second apparatus T105 communicates with third apparatus #1 labeled T1503_1 via network T1501.

Similarly, second apparatus T105 communicates with third apparatus #2 labeled T1503_2 via network T1501.

Second apparatus T105 communicates with third apparatus #N labeled T1503_N via network T1501. Note that N is an integer greater than or equal to 1.

Here, second apparatus T105 obtains the information of the content to be displayed on monitor T203 of first apparatus T101 in the application described in Embodiment 11 from, for example, third apparatus #1 labeled T1503_1, third apparatus #2 labeled T1503_2, . . . , and the third apparatus #N labeled T1503_N. An example will be given below.

Up to three displays can be displayed in the vicinity of the Tokyo Tower, like in FIG. 73, FIG. 74, FIG. 75, FIG. 76, FIG. 77, FIG. 78, FIG. 79, FIG. 80, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, and FIG. 98 of Embodiment 11.

The areas for these three displays displayed on monitor T203 of first apparatus T101 are named displayable area #1 labeled T1611, displayable area #2 labeled T1612, and displayable area #3 labeled T1613, as illustrated in FIG. 103.

In the present embodiment, second apparatus T105 obtains information related to the display of the vicinity of the Tokyo Tower to be displayed on monitor T203 of first apparatus T101 in the application described in Embodiment 11 from, for example, third apparatus #1 labeled T1503_1, third apparatus #2 labeled T1503_2, . . . , and the third apparatus #N labeled T1503_N.

Second apparatus T105 causes third apparatus #1 labeled T1503_1, third apparatus #2 labeled T1503_2, . . . , and third apparatus #N labeled T1503_N to perform solicitation regarding interest in displaying in each of displayable area #1 labeled T1611, displayable area #2 labeled T1612, and displayable area #3 labeled T1613 in the vicinity of the Tokyo Tower, and one example of a result thereof is illustrated in FIG. 104.

In displayable area #1 labeled T1711, as illustrated in FIG. 104, there are 100 bids at this point in time, the amount of money (bid amount) required for display in the application in displayable area #1 labeled T1711 is 50,000 yen at this point in time, and the bid deadline for displayable area #1 labeled T1711 is 0:00:00 on Jul. 1, 2020 (at this point in time, the remaining time is 5 days, 0 hours, 0 minutes).

In displayable area #2 labeled T1712, as illustrated in FIG. 104, there are 50 bids at this point in time, the amount of money (bid amount) required for display in the application in displayable area #2 labeled T1712 is 30,000 yen at this point in time, and the bid deadline for displayable area #2 labeled T1712 is 0:00:00 on Jul. 8, 2020 (at this point, the remaining time is 12 days, 0 hours, 0 minutes).

In displayable area #3 labeled T1713, as illustrated in FIG. 104, there are 80 bids at this point in time, the amount of money (bid amount) required for display in the application in displayable area #3 labeled T1713 is 20,000 yen at this point in time, and the bid deadline for displayable area #3 labeled T1713 is 0:00:00 on Jun. 20, 2020 (at this point, biding is closed).

An application is created in second apparatus T105 so that a display determined by these bids is displayed in displayable area #1, displayable area #2, and displayable area #3, and the created application is uploaded to (cloud) server T103 by second apparatus T105. First apparatus T101 then downloads this application and displays it based on the bids. An example of such a display is as described in Embodiment 11.

Although the above describes an example of bidding related to a display in the vicinity of Tokyo Tower, this example is non-limiting. The bidding may be for a display in any location. However, in order to display, and provide information via the display, to a large number of people, tourist attractions, entertainment facilities, and event venues where people gather can be considered as examples of suitable locations.

As described above, by competitively determining the events to be displayed in an augmented space or a virtual space generated based on the real-world space that is valuable as a place to provide information, it is possible to achieve the advantageous effect of an increase in the possibility of providing more valuable information to the user.

Although the above describes an example in which the display is determined based on bidding, a location there may be places where the display is determined without bidding. The examples of displays used for the bidding or the displays based on location are not limited to the examples described in the present embodiment.

Embodiment 13

A variation of Embodiment 11 will be described in the present embodiment.

For example, suppose that in Embodiment 11, first apparatus T101 performs the display as described in FIG. 73, FIG. 74, FIG. 75, FIG. 76, FIG. 77, FIG. 78, FIG. 79, FIG. 80, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, or FIG. 98 in the vicinity of a certain position at the Tokyo Tower.

At this time, if many users gather around the vicinity of this certain position holding first apparatuses T101 and access, for example, a cellular communication base station to connect to the network, the data transmission speed may decrease whereby the performance of first apparatus T101 may degrade.

A variation of Embodiment 11 for overcoming this issue will be described in the present embodiment.

If, at the certain position in the vicinity of the Tokyo Tower, any one of the displays in FIG. 73, FIG. 74, FIG. 75, FIG. 76, FIG. 77, FIG. 78, FIG. 79, FIG. 80, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, and FIG. 98 described in Embodiment 11 is displayed, and people gather there and use first apparatus T101 to access a site related to FIG. 73, FIG. 74, FIG. 75, FIG. 76, FIG. 77, FIG. 78, FIG. 79, FIG. 80, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, or FIG. 98 via a cellular communication base station or a wireless LAN (local area network) access point, the access may become congested, which may cause difficulty in accessing the site.

Hereinafter, a method for overcoming this issue will be described.

FIG. 105 illustrates a map of the area around Tokyo Tower. The direction is set as indicated by arrow T1800. T1801 indicates the position of Tokyo Tower.

For example, if first apparatus T101 is present at point T1802_1 from 11:00 to 11:15 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. In order to perform this display, first apparatus T101 accesses a cellular communication base station or a wireless LAN access point.

For example, if there are a plurality of users, each user is assumed to possess first apparatus T101. In this case, there is a high possibility that a cellular communication base station and/or a wireless LAN access point in the vicinity of point T1802_1 will be congested.

When first apparatus T101 is located at point T1802_1 after 11:15 and first apparatus T101 is facing toward the Tokyo Tower, if monitor T203 of first apparatus T101 displays (A) a display of a shop advertisement, (B) a display for game implementation, and a display of character group C, as illustrated in T503 in FIG. 73, a cellular communication base station and/or a wireless LAN access point in the vicinity of point T1802_1 are likely to be further congested.

Accordingly, as illustrated in FIG. 105, when first apparatus T101 is at point 1802_2, which is different from point T1802_1, from 11:15 to 11:30, and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. In this way, first apparatus T101 is more likely to access a cellular communication base station or a wireless LAN access point that is different from the cellular communication base station and the wireless LAN access point that first apparatus T101 accesses when it is at point T1802_1, thereby achieving the advantageous effect of reduced access congestion.

Similarly, as illustrated in FIG. 105, when first apparatus T101 is present at point T1802_3 from 11:30 to 11:45 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. This achieves the advantageous effect of reduced access congestion.

In this way, by changing the points (positions) at which (A) a display of a shop advertisement, (B) a display for game implementation, and a display of character group C are implemented in first apparatus T101 depending on the time, for example, the congestion of access to a cellular communication base station and/or a wireless LAN access point can be reduced. For example, the points (positions) at which (A) a display of a shop advertisement, (B) a display for game implementation, and a display of character group C are displayed, as illustrated in FIG. 105, can be changed, for example, with an application obtained by first apparatus T101 from (cloud) server T103. The relationship between time and the points are not limited to the examples in FIG. 105. Although FIG. 105 illustrates an example in the vicinity of the Tokyo Tower, it is possible to implement the above in other locations.

Although the above described an example in which first apparatus T101 displays (A) a display of a shop advertisement, (B) a display for game implementation, and a display of character group C, the content to be displayed are not limited to this example.

FIG. 106 illustrates a different example than FIG. 105, but with the same reference signs. The direction is set as indicated by arrow T1800 in FIG. 106. T1801 indicates the position of Tokyo Tower.

For example, if first apparatus T101 is present at point T1802_1 from 11:00 to 11:15 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. In order to perform this display, first apparatus T101 accesses a cellular communication base station or a wireless LAN access point.

For example, if there are a plurality of users, each user is assumed to possess first apparatus T101. In this case, there is a high possibility that a cellular communication base station or a wireless LAN access point in the vicinity of point T1802_1 will be congested.

When first apparatus T101 is located at point T1802_1 after 11:15 and first apparatus T101 is facing toward the Tokyo Tower, if monitor T203 of first apparatus T101 displays (A) a display of a shop advertisement, (B) a display for game implementation, and a display of character group C, as illustrated in T503 in FIG. 73, a cellular communication base station and/or a wireless LAN access point in the vicinity of point T1802_1 are likely to be further congested.

Accordingly, as illustrated in FIG. 106, from 11:15 to 11:30, there is no point at which first apparatus T101 displays (A) a display of a shop advertisement, (B) a display for game implementation, and a display of character group C. This will reduce the congestion of access to cellular communication base stations and/or wireless LAN access points.

As illustrated in FIG. 106, when first apparatus T101 is at point 1802_2, which is different from point T1802_1, from 11:30 to 11:45, and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. In this way, first apparatus T101 is more likely to access a cellular communication base station or a wireless LAN access point that is different from the cellular communication base station and the wireless LAN access point that first apparatus T101 accesses when it is at point T1802_1, thereby achieving the advantageous effect of reduced access congestion.

As illustrated in FIG. 106, from 11:45 to 12:00, there is no point at which first apparatus T101 displays (A) a display of a shop advertisement, (B) a display for game implementation, and a display of character group C. This will reduce the congestion of access to cellular communication base stations and/or wireless LAN access points.

As illustrated in FIG. 106, when first apparatus T101 is present at point T1802_03 from 12:00 to 12:15 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. This will reduce the congestion of access to cellular communication base stations and/or wireless LAN access points.

In this way, by changing the points (positions) at which (A) a display of a shop advertisement, (B) a display for game implementation, and a display of character group C are implemented in first apparatus T101 depending on the time, or by cancelling implementation of (A) a display of a shop advertisement, (B) a display for game implementation, and a display of character group C in first apparatus T101 depending on the time, for example, the congestion of access to a cellular communication base station and/or a wireless LAN access point can be reduced. For example, the points (positions) at which (A) a display of a shop advertisement, (B) a display for game implementation, and a display of character group C are displayed, or the cancelling of (A) a display of a shop advertisement, (B) a display for game implementation, and a display of character group C illustrated in FIG. 106 can be changed, for example, with an application obtained by first apparatus T101 from (cloud) server T103. The relationship between time and the points are not limited to the examples in FIG. 106. Although FIG.

106 illustrates an example in the vicinity of the Tokyo Tower, it is possible to implement the above in other locations.

Although the above described an example in which first apparatus T101 displays (A) a display of a shop advertisement, (B) a display for game implementation, and a display of character group C, the content to be displayed are not limited to this example.

FIG. 107 illustrates an example of how the display by first apparatus T101 is switched depending on time at point T1802_1 in FIG. 105 and FIG. 106.

If first apparatus T101 is present at point T1802_1 from 11:00 to 11:15 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. "11:00-11:15 Display first display group" in FIG. 107 refers to this.

As illustrated by "11:15-11:30 Display second display group" in FIG. 107, from 11:15 to 11:30, when first apparatus T101 is at point T1802_1 and first apparatus T101 is facing toward the Tokyo Tower, monitor T203 of first apparatus T101 displays a second display group different from the first display group. Conceivable examples of the second display group include, for example, the display examples illustrated in FIG. 73, FIG. 74, FIG. 75, FIG. 76, FIG. 77, FIG. 78, FIG. 79, FIG. 80, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, and FIG. 98 described in Embodiment 11.

As illustrated by "11:30-11:45 Display third display group" in FIG. 107, from 11:30 to 11:45, when first apparatus T101 is at point T1802_1 and first apparatus T101 is facing toward the Tokyo Tower, monitor T203 of first apparatus T101 displays a third display group different from the first display group and the second display group. Conceivable examples of the third display group include, for example, the display examples illustrated in FIG. 73, FIG. 74, FIG. 75, FIG. 76, FIG. 77, FIG. 78, FIG. 79, FIG. 80, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, and FIG. 98 described in Embodiment 11.

In this way, in first apparatus T101, by changing the display content according to the time of day, it may be possible to reduce congestion of access to, for example, a cellular communication base station and/or a wireless LAN access point because user popularity changes depending on the display content. For example, a change of display content depending on time, such as in FIG. 107, can be realized, for example, by an application obtained by first apparatus T101 from (cloud) server T103. The relationship between time and the content to be displayed is not limited to the example in FIG. 107. Although the above describes an example in the vicinity of the Tokyo Tower, it is possible to implement the above in other locations.

FIG. 108 illustrates an example of how the display by first apparatus T101 is switched depending on time at point T1802_1 in FIG. 105 and FIG. 106.

If first apparatus T101 is present at point T1802_1 from 11:00 to 11:15 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. "11:00-11:15 Display first display group" in FIG. 108 refers to this.

Even if first apparatus T101 is present at point T1802_1 from 11:15 to 11:30 and first apparatus T101 is facing toward the Tokyo Tower, monitor T203 of first apparatus T101 does not display (A) a display of a shop advertisement, (B) a display for game implementation, and a display of character group C, as illustrated in T503 in FIG. 73. This will reduce the congestion of access to cellular communication base stations and/or wireless LAN access points.

As illustrated by "11:30-11:45 Display second display group" in FIG. 108, from 11:30 to 11:45, when first apparatus T101 is at point T1802_1 and first apparatus T101 is facing toward the Tokyo Tower, monitor T203 of first apparatus T101 displays a second display group different from the first display group. Conceivable examples of the second display group include, for example, the display examples illustrated in FIG. 73, FIG. 74, FIG. 75, FIG. 76, FIG. 77, FIG. 78, FIG. 79, FIG. 80, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, and FIG. 98 described in Embodiment 11.

Even if first apparatus T101 is present at point T1802_1 from 11:45 to 12:00 and first apparatus T101 is facing toward the Tokyo Tower, monitor T203 of first apparatus T101 does not display (A) a display of a shop advertisement, (B) a display for game implementation, and a display of character group C, as illustrated in T503 in FIG. 73. This will reduce the congestion of access to cellular communication base stations and/or wireless LAN access points.

As illustrated by "12:00-12:15 Display third display group" in FIG. 108, from 12:00 to 12:15, when first apparatus T101 is at point T1802_1 and first apparatus T101 is facing toward the Tokyo Tower, monitor T203 of first apparatus T101 displays a third display group different from the first display group and the second display group. Conceivable examples of the third display group include, for example, the display examples illustrated in FIG. 73, FIG. 74, FIG. 75, FIG. 76, FIG. 77, FIG. 78, FIG. 79, FIG. 80, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, and FIG. 98 described in Embodiment 11.

In this way, in first apparatus T101, by changing the display content according to the time of day, it may be possible to reduce congestion of access to, for example, a cellular communication base station and/or a wireless LAN access point because user popularity changes depending on the display content. Alternatively, by cancelling implementation of (A) a display of a shop advertisement, (B) a display for game implementation, and a display of character group C in first apparatus T101 depending on the time, for example, the congestion of access to a cellular communication base station and/or a wireless LAN access point can be reduced. For example, a change of display content depending on time, such as in FIG. 108, can be realized, for example, by an application obtained by first apparatus T101 from (cloud) server T103. The relationship between time and the content to be displayed is not limited to the example in FIG. 108. Although the above describes an example in the vicinity of the Tokyo Tower, it is possible to implement the above in other locations.

FIG. 109 illustrates an example of how the display by first apparatus T101 is switched depending on time at point T1802_1 in FIG. 105 and FIG. 106.

If first apparatus T101 is present at point T1802_1 from 11:00 to 11:15 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. "11:00-11:15 Display first display group" in FIG. 109 refers to this.

Even if first apparatus T101 is present at point T1802_1 from 11:15 to 11:30 and first apparatus T101 is facing toward the Tokyo Tower, monitor T203 of first apparatus T101 does not display (A) a display of a shop advertisement, (B) a display for game implementation, and a display of character group C, as illustrated in T503 in FIG. 73. This will reduce the congestion of access to cellular communication base stations and/or wireless LAN access points.

If first apparatus T101 is present at point T1802_1 from 11:30 to 11:45 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. "11:30-11:45 Display first display group" in FIG. 109 refers to this.

Even if first apparatus T101 is present at point T1802_1 from 11:45 to 12:00 and first apparatus T101 is facing toward the Tokyo Tower, monitor T203 of first apparatus T101 does not display (A) a display of a shop advertisement, (B) a display for game implementation, and a display of character group C, as illustrated in T503 in FIG. 73. This will reduce the congestion of access to cellular communication base stations and/or wireless LAN access points.

If first apparatus T101 is present at point T1802_1 from 12:00 to 12:15 and first apparatus T101 is facing toward the Tokyo Tower, monitor T203 of first apparatus T101 displays (A) a display of a shop advertisement, (B) a display for game implementation, and a display of character group C, as illustrated in T503 in FIG. 73. "12:00-12:15 Display first display group" in FIG. 109 refers to this.

In this way, by cancelling implementation of (A) a display of a shop advertisement, (B) a display for game implementation, and a display of character group C in first apparatus T101 depending on the time, for example, the congestion of access to a cellular communication base station and/or a wireless LAN access point can be reduced. For example, a change of display content depending on time, such as in FIG. 109, can be realized, for example, by an application obtained by first apparatus T101 from (cloud) server T103. The relationship between time and the content to be displayed is not limited to the example in FIG. 109. Although the above describes an example in the vicinity of the Tokyo Tower, it is possible to implement the above in other locations.

As described above, in first apparatus T101, by changing the display content according to the time of day, it may be possible to reduce congestion of access to, for example, a cellular communication base station and/or a wireless LAN access point because user popularity changes depending on the display content. Alternatively, by cancelling implementation of (A) a display of a shop advertisement, (B) a display for game implementation, and a display of character group C in first apparatus T101 depending on the time, for example, the congestion of access to a cellular communication base station and/or a wireless LAN access point can be reduced.

Note that the descriptions given in the present embodiment are non-limiting examples. For example, the present embodiment may be implemented by combining two or more of the examples. Moreover, although the vicinity of the Tokyo Tower is used as an example, the location is not limited to this example. Moreover, the operations described in the present embodiment may be implemented in a plurality of locations.

Embodiment 14

In the present embodiment, a variation of Embodiments 1 through 4 will be described.

For example, FIG. 21 through FIG. 37 were used to explain the switching and coexistence of modulation signals for communication and sensing modulated signals. The present embodiment describes a variation thereof.

FIG. 110 illustrates an example of the system configuration according to the present embodiment. Base station U101 is communicating with terminal #1 labeled U102_1, terminal #2 labeled U102_2, and terminal #3 labeled U102_3. Target (object) U103 that the base station or a terminal detects by sensing is also present.

FIG. 111 illustrates an example of the transmission state of base station U101 illustrated in FIG. 110. Time is represented on the horizontal axis. FIG. 112 illustrates an example of the transmission state of terminal #1 labeled U102_1, terminal #2 labeled U102_2, and terminal #3 labeled U102_3 illustrated in FIG. 110. Time is represented on the horizontal axis.

As illustrated in FIG. 111 and FIG. 112, first, base station U101 transmits frame B1 labeled U201_1.

Thereafter, terminal #1 labeled U102_1 and/or terminal #2 labeled U102_2 and/or terminal #3 labeled U102_3 transmit(s) frame T1 labeled U202_1.

Next, base station U101 transmits frame B2 labeled U201_2.

Thereafter, terminal #1 labeled U102_1 and/or terminal #2 labeled U102_2 and/or terminal #3 labeled U102_3 transmit(s) frame T2 labeled U202_2.

Base station U101 then transmits frame B3 labeled U201_3.

Thereafter, terminal #1 labeled U102_1 and/or terminal #2 labeled U102_2 and/or terminal #3 labeled U102_3 transmit(s) frame T3 labeled U202_3.

Time division multiplexing (TDM) or carrier sense multiple access with collision avoidance (CSMA/CA) may be implemented, and transmission states other than those illustrated in FIG. 111 and FIG. 112 are possible.

Base station U101 may use a multi-carrier transmission scheme such as OFDM, or a single-carrier transmission scheme. When base station U101 uses a multicarrier transmission scheme, symbols may be present in the frequency axis direction in FIG. 111.

Terminal #1 labeled U102_1, terminal #2 labeled U102_2, and terminal #3 labeled U102_3 may use a multicarrier transmission scheme such as OFDM, or a single-carrier transmission system. When a terminal uses a multicarrier transmission scheme, symbols may be present in the frequency axis direction in FIG. 112.

Hereinafter, description will focus on base station U101 and terminal #1 labeled U102_1 in FIG. 110. Note that in this example, each of base station U101, terminal #1 labeled U102_1, terminal #2 labeled U102_2, and terminal #3 labeled U102_3 uses a multi-carrier transmission scheme such as OFDM.

An example of the frame configuration of frame B1 labeled U201_1 in FIG. 111 is illustrated in FIG. 113. FIG. 113 illustrates an example of the configuration of frame B1 transmitted by base station U101. Time is represented on the horizontal axis and frequency is represented on the vertical axis. In FIG. 113, frame U301_2 destined for terminal #1 is the symbol destined for terminal #1 labeled U102_1 transmitted by base station U101. Other frames U301_1 and U301_3 in FIG. 113 may include, for example, symbols destined for terminal #2 labeled U102_2 and symbols destined for terminal #3 labeled U102_3.

FIG. 114 is an example of the frame configuration of frame T1 labeled U202_1 in FIG. 112. Terminal #1 labeled U102_1 transmits terminal #1 transmission frame U401_2 illustrated in FIG. 114. For example, terminal #2 labeled U102_2 generates a modulated signal using, for example, some time and frequency resources of the other frames U401_1 and U401_3 in FIG. 114, and transmits it to base station U101. Terminal #3 labeled U102_3 generates a modulated signal using, for example, some time and frequency resources of the other frames U401_1 and U401_3 in FIG. 114, and transmits it to base station U101.

Here, terminal #1 transmission frame U401_2 transmitted by terminal #1 labeled U102_1 includes data for requesting sensing to base station U101 (it is the base station that transmits the modulated signal for sensing, and since the sensing has been described in other embodiments, repeated description is omitted).

Sensing methods include the following.

<1> Sensing is performed independently by a base station or a terminal.

<2> Sensing is performed by a plurality of base stations.

<3> Sensing is performed by a plurality of terminals.

<4> Sensing is performed by a base station and a terminal.

Any of these methods may be implemented in the present embodiment.

Frame B1 labeled U201_1 in FIG. 111 includes data requesting retransmission related to data sent to terminal #1 labeled U102_1 by base station U101.

Terminal #1 labeled U102_1 may transmit, to base station U101, a negative acknowledgement (NACK), which indicates that the data transmitted by base station U101 could not be correctly received, instead of the data requesting retransmission. Instead of transmitting the data requesting retransmission, terminal #1 labeled U102_1 may refrain from transmitting an acknowledgement (ACK) to base station U101, which indicates that the data transmitted by base station U101 was correctly received.

Base station U101 then receives the modulated signal containing this data. Base station U101 then transmits frame B2 labeled U201_2, as illustrated in FIG. 111. Taking the data delay at terminal #1 labeled U102_1 and the ease of demodulation by retransmission into consideration, using, for example, the frame illustrated FIG. 113 for frame B2 labeled U201_2, base station U101 transmits the data for retransmission to terminal #1 labeled U102_1.

As another method, base station U101 transmits the frame illustrated in FIG. 115 in frame B2 labeled U201_2 in FIG. 111. In FIG. 115, time is represented on the horizontal axis and frequency is represented on the vertical axis. In FIG. 115, in the frame (for data) destined for terminal #1 labeled U501_2, based on the retransmission request of terminal #1 labeled U102_1, in frame T1 labeled U202_1 in FIG. 112, base station U101 sends the data for retransmission to terminal #1 labeled U102_1.

The frame (for sensing) related to terminal #1 labeled U501_4 is a frame transmitted by base station U101 in response to the request for sensing made by terminal #1 labeled U102_1 to base station U101. Accordingly, base station U101 transmits a modulated signal of the frame (for sensing) related to terminal #1 labeled U501_4, and performs sensing. Base station U101 notifies terminal #1 labeled U102_1 of the result of the sensing.

In this way, by transmitting, in frame B2 labeled U201_2, a frame containing symbols for sensing and retransmission data destined for terminal #1 labeled U102_1, base station U101 can achieve the advantageous effect of a reduced delay and easily performed demodulation, and the advantageous effect that sensing can be implemented with less delay.

By implementing this, a terminal can achieve the advantageous effect of reduced delay and easy demodulation. Note that in the above description, "base station" can be replaced with "terminal" and "terminal" can be replaced with "base station" and the embodiment can be implemented in the same manner to achieve the same advantageous effects.

The configurations of the frames in FIG. 113, FIG. 114, and FIG. 115 are examples; frames other than those illustrated in FIG. 113, FIG. 114, and FIG. 115 may be present, and the method of allocation of each frame in the time and frequency axes is not limited to the examples illustrated in FIG. 113, FIG. 114, and FIG. 115.

For example, a frame including control information, a reference signal, and symbols for time and frequency synchronization may be present in FIG. 113. Here, the frame including control information, the reference signal, and the symbols for time and frequency synchronization may be allocated to a certain time, to a certain frequency, or to a certain time and frequency. Frame U301_2 destined for terminal #1 may be transmitted using multiple frequency resources. Frame U301_2 destined for the terminal #1 may be transmitted using a certain time resource, or using a certain time resource and a certain frequency resource.

The configuration of the frames transmitted by terminal #1 labeled U102_1 is not limited to the configuration illustrated in FIG. 114. For example, terminal #1 labeled U102_1 may transmit a modulated signal including data to base station U101 using multiple frequency resources. Terminal #1 labeled U102_1 may transmit a modulated signal including data to base station U101 using a certain time resource. Terminal #1 labeled U102_1 may transmit a modulated signal including data to base station U101 using a certain time resource and a certain frequency resource.

The configuration of the frames transmitted by base station U101 is not limited to the configuration illustrated in FIG. 115. For example, the frame (for data) destined for terminal #1 labeled U501_2 may be transmitted using multiple frequency resources. The frame (for data) destined for terminal #1 labeled U501_2 may be transmitted using a certain time resource, or using a certain time resource and a certain frequency resource.

Similarly, the frame (for sensing) related to terminal #1 labeled U501_4 may be transmitted using multiple frequency resources. The frame (for sensing) related to terminal #1 labeled U501_4 may be transmitted using a certain time resource, or using a certain time resource and a certain frequency resource. Furthermore, the frame (for sensing) related to terminal #1 labeled U501_4 may be transmitted by base station U101 or a base station other than base station U101 using a different frequency band than the frame (for data) destined for terminal #1 labeled U501_2. In the frequency band used by the frame (for sensing) related to terminal #1 labeled U501_4, a single-carrier transmission scheme may be used, or multi-carrier transmission scheme such as OFDM may be used.

Embodiment 15

In the present embodiment, a variation of Embodiment 9 will be described.

In the present embodiment, a specific example of sensing performed in a space in which an apparatus capable of performing sensing is present will be given.

FIG. 116 illustrates one example of states of apparatuses according to the present embodiment. In FIG. 116, elements that operate the same as in FIG. 50 and FIG. 55 have the same reference signs.

N700 indicates the inside of a home as an example of the space. As illustrated in FIG. 116, for example, access point (AP) N701, audio equipment N702, device N703, which is a terminal such as a smartphone, smart speaker, tablet, computer, or mobile phone or the like, and luminaire N704 are present in-home space N700. Hereinafter, device N703 will be referred to as device #C. For example, assume server Q101 is present in in-home space N700.

Note that server Q101 may be referred to as an edge server or edge computer. This also applies to FIG. 55.

Moreover, in this example, person N705 is living in in-home space N700.

AP labeled N701 is capable of performing sensing and capable of communicating, as described in other embodiments.

For example, AP labeled N701 communicates with audio equipment N702, device #C labeled N703, and luminaire N704. AP labeled N701 may communicate with other apparatuses as well.

AP labeled N701 is communicating with server Q101 via network Q102.

AP labeled N701 is further communicating with base station N730 via network N710.

Base station N730 is communicating with device N731, which is a terminal such as a smartphone, tablet, computer, or mobile phone or the like. Hereinafter, device N731 will be referred to as device #D.

Moreover, just like in FIG. 50, AP labeled N701 is communicating with cloud server N720 via network 710.

Next, a detailed example of operations performed by AP labeled N701 illustrated in FIG. 116 will be given.

FIG. 56 illustrates a flow chart of an example of operations performed when AP labeled N701 is first set up inside the home.

First, AP labeled N701 performs sensing (Q201), and uploads, to server Q101, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (Q202).

With this, AP labeled N701 concludes initial sensing (Q203). Although the term "initial sensing" is used, after AP labeled N701 is first set up, the operations illustrated in FIG. 56 may be performed by AP labeled N701 periodically, aperioclically, regularly, or irregularly.

Next, another example in which device #C labeled N703 performs the operations illustrated in FIG. 56 will be given.

First, device #C labeled N703 performs sensing (Q201), and uploads, to server Q101 via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (Q202).

With this, device #C labeled N703 concludes initial sensing (Q203). Although the term "initial sensing" is used, device #C labeled N703 may perform the operations illustrated in FIG. 56 periodically, aperioclically, regularly, or irregularly.

FIG. 57 illustrates a flow chart of one example of operations performed by AP labeled N701.

AP labeled N701 uploads, to server Q101, information about in-home devices obtained via sensing, such as information about an appliance (including audio equipment N702 and luminaire N704) and information about an electronic device (including device #C labeled N703) (Q301).

Next, information related to the pairing of an operation performed by an in-home device and sensing performed by AP labeled N701 is uploaded to server Q101 (Q302). The pairing of an operation performed by an in-home device and sensing performed a device capable of sensing (AP labeled N701 in this example) as well as the registering of the pairing, are exemplified in Embodiment 7.

Next, server Q101 uploads, to cloud server 720, part or all of information related to the pairing of an operation performed by an in-home device and sensing performed by AP labeled N701. In this way, server Q101 performs some of the signal processing, which can reduce the amount of data to be transmitted, and transmits the data to cloud server N720, thus achieving the advantageous effect of an improvement in data transmission efficiency.

Next, another example in which device #C labeled N703 performs the operations illustrated in FIG. 57 will be given.

Device #C labeled N703 uploads, to server Q101 via AP labeled N701, information about in-home devices obtained via sensing, such as information about an appliance (including audio equipment N702 and luminaire N704) and information about an electronic device (Q301).

Next, information related to the pairing of an operation performed by an in-home device and sensing performed by device #C labeled N703 is uploaded to server Q101 (Q302). The pairing of an operation performed by an in-home device and sensing performed a device capable of sensing (device #C labeled N703 in this example) as well as the registering of the pairing, are exemplified in Embodiment 7. Hereinafter, points of difference from Embodiment 7, in particular in regard to a pairing operation example, will be described.

Next, server Q101 uploads, to cloud server 720, part or all of information related to the pairing of an operation performed by an in-home device and sensing performed by AP labeled N701. In this way, server Q101 performs some of the signal processing, which can reduce the amount of data to be transmitted, and transmits the data to cloud server N720, thus achieving the advantageous effect of an improvement in data transmission efficiency.

FIG. 58 illustrates a flow chart of an example of operations related to, for example, the system illustrated in FIG. 116. Hereinafter, examples of the pairing of audio equipment N702 and sensing, the pairing of device #C and sensing, and the pairing of luminaire N704 and sensing will be given with reference to FIG. 58. Note that in FIG. 58, operations pertaining to the server are indicated via the dashed-line box.

AP labeled N701 performs sensing (Q401).

As a result of the sensing, AP labeled N701 confirms whether a moving object, including a person, was detected in the home (Q402).

When AP labeled N701 does not detect a moving object, including a person, in the home (no in Q402), the processing returns to the "perform sensing" step Q401.

When AP labeled N701 does detect a moving object, including a person, in the home (yes in Q402), AP labeled N701 uploads information related to in-home status to server Q101 via network Q102 (Q403).

In response, server Q101 transmits, to AP labeled N701, information related to control of audio equipment N702, information related to control of device #C labeled N703, or information related to control of luminaire N704. AP 701 labeled N701 then obtains information related to control (control information) (yes in Q404).

AP labeled N701 then transmits the control information to the target device (in the example illustrated in FIG. 116, audio equipment N702, device #C labeled N703, or luminaire N704) (Q405).

AP labeled N701 transmits this control information to cloud server N720 via network 710. This enables cloud server N720 to know the state of each device present in in-home space N700.

In response, the target device carries out control based on the control information, and ends control (Q406).

AP labeled N701 then performs the next iteration of sensing (Q401).

On the other hand, consider a case in which AP labeled N701 detects a moving object, including a person, in the home (yes in Q402), uploads, to server Q101 via network Q102, information related to in-home status (Q403), but does not obtain control information from server Q101 (no in Q404). In such cases, AP labeled N701 performs the next iteration of sensing (Q401).

For example, consider a case in which AP labeled N701 transmits control information to audio equipment N702 in step Q405. In such cases, server Q101 transmits, to AP labeled N701, information related to directionality control for sound/audio of audio equipment N702, based on information indicating the position of a person obtained by sensing by AP labeled N701. AP labeled N701 transmits information related to directionality control for sound/audio to audio equipment N702, and based on the information related to directionality control for sound/audio, audio equipment N702 performs directionality control for sound/audio.

AP labeled N701 transmits the information related to directionality control for the sound/audio to cloud server N720 via network 710. This enables cloud server N720 to know the state of audio equipment N702 in in-home space N700.

As another example, consider a case in which AP labeled N701 transmits control information to luminaire N704 in step Q405. In such cases, server Q101 transmits, to AP labeled N701, information related to the lighting of luminaire N704, such as ON/OFF or light emission directionality control, based on information indicating the position of a person or moving object obtained by sensing by AP labeled N701. AP labeled N701 then transmits information related to ON/OFF or light emission directionality control to luminaire N704, and luminaire N704 carries out control for turning ON/OFF the lighting or control of the direction of light emission, based on the information related to ON/OFF or light emission directionality control.

AP labeled N701 transmits the ON/OFF or light emission directionality control to cloud server N720 via network 710. This enables cloud server N720 to know the state of luminaire N704 in in-home space N700.

As described above, by controlling a device present in the home based on the in-home state, it is possible to achieve the advantageous effect that comfortable, safe living can be provided.

Next, another example of FIG. 58 will be given.

Device #C labeled N703 performs sensing (Q401).

As a result of the sensing, device #C labeled N703 confirms whether a moving object, including a person, was detected in the home (Q402).

When device #C labeled N703 does not detect a moving object, including a person, in the home (no in Q402), the processing returns to the "perform sensing" step Q401.

When device #C labeled N703 does detect a moving object, including a person, in the home (yes in Q402), device #C labeled N703 uploads, to server Q101 via AP labeled N701 and network Q102, information related to in-home status (Q403).

In response, server Q101 transmits, to device #C labeled N703 via network Q102 and AP labeled N701, information related to control of audio equipment N702 or information related to control of luminaire N704. Device #C labeled N703 then obtains information related to control (control information) (yes in Q404).

Device #C labeled N703 then transmits the control information to the target device (in the example illustrated in FIG. 116, audio equipment N702 or luminaire N704) (Q405). However, this transmission is performed via AP labeled N701.

Device #C labeled N703 transmits this control information to cloud server N720. However, this transmission is performed via AP labeled N701. This enables cloud server N720 to know the state of each device present in in-home space N700.

In response, the target device carries out control based on the control information, and ends control (Q406).

Device #C labeled N703 then performs the next iteration of sensing (Q401).

On the other hand, consider a case in which device #C labeled N703 detects a moving object, including a person, in the home (yes in Q402), uploads, to server Q101 via AP labeled N701 and network Q102, information related to in-home status (Q403), but does not obtain control information from server Q101 (no in Q404). In such cases, device #C labeled N703 performs the next iteration of sensing (Q401).

For example, consider a case in which device #C labeled N703 transmits control information to audio equipment N702 in step Q405. In such cases, server Q101 transmits, to device #C labeled N703 via AP labeled N701, information related to directionality control for sound/audio of audio equipment N702, based on information indicating the position of a person obtained by sensing by device #C labeled N703. Device #C labeled N703 transmits information related to directionality control for sound/audio to audio equipment N702 via AP labeled N701, and based on the information related to directionality control for sound/audio, audio equipment N702 performs directionality control for sound/audio.

Device #C labeled N703 transmits information related to directionality control for sound/audio to cloud server N720. However, this transmission is performed via AP labeled N701. This enables cloud server N720 to know the state of audio equipment N702 in in-home space N700.

As another example, consider a case in which device #C labeled N703 transmits control information to luminaire N704 in step Q405. In such cases, server Q101 transmits, to device #C labeled N703 via AP labeled N701, information related to the lighting of luminaire N704, such as ON/OFF or light emission directionality control, based on information indicating the position of a person or moving object obtained by sensing by device #C labeled N703. Device #C labeled N703 then transmits information related to ON/OFF or light emission directionality control to luminaire N704 via AP labeled N701, and luminaire N704 carries out control for turning ON/OFF the lighting or control of the direction of light emission, based on the information related to ON/OFF or light emission directionality control.

Device #C labeled N703 transmits information related to ON/OFF or light emission directionality control to cloud server N720. However, this transmission is performed via AP labeled N701. This enables cloud server N720 to know the state of luminaire N704 in in-home space N700.

As described above, by controlling a device present in the home based on the in-home state, it is possible to achieve the advantageous effect that comfortable, safe living can be provided.

FIG. 59 illustrates a flow chart of one example of operations performed by in-home AP labeled N701 and server Q101. Note that in FIG. 59, operations pertaining to the server are indicated via the dashed-line box.

AP labeled N701 performs sensing (Q501), and uploads, to server Q101, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device (including device #C labeled N703), information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Server Q101 sends the updated information to cloud server N720 via AP labeled N701. This enables cloud server N720 to know the state of in-home space N700 in in-home space N700. Then, the next iteration of AP labeled N701 sensing is performed (Q501).

When server Q101 does not confirm that a new state has been detected (no in Q503), the next iteration of AP labeled N701 sensing is performed (Q501).

Next, another example in which device #C labeled N703 and server Q101 perform the operations illustrated in FIG. 59 will be given.

Device #C labeled N703 performs sensing (Q501), and uploads, to server Q101 via AP labeled N701, for example, information indicating in-home status, such as information indicating the number of rooms, information indicating the shape of a room, information on placed objects, such as information indicating the position of furniture, information indicating the shape of furniture, information indicating the position of an appliance (including audio equipment N702 and luminaire N704), information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Server Q101 sends the updated information to cloud server N720 via AP labeled N701. This enables cloud server N720 to know the state of in-home space N700 in in-home space N700. Then, the next iteration of device #C labeled N703 sensing is performed (Q501).

When server Q101 does not confirm that a new state has been detected (no in Q503), the next iteration of device #C labeled N703 sensing is performed (Q501).

The following is possible.

Smartphone N731 illustrated in FIG. 116 can connect to cloud server N720 via base station N730 and network N710. Accordingly, the user can access cloud server N720 via smartphone N731 and know information on each device present in in-home space N700 (smartphone N731 obtains this information from cloud server N720).

The user accesses cloud server N720 via smartphone N731 and transmits, to cloud server N720, information for implementing some operation with respect to each device present in in-home space N700.

Thereafter, cloud server N720 transmits, for example, information for implementing some operation with respect to each device present in in-home space N700 via AP labeled N701 and server Q101 to each device present in in-home space N700, and each device present in in-home space N700 executes an operation based on this information.

As described above, by controlling a device present in the home based on the in-home state, it is possible to achieve the advantageous effect that comfortable, safe living can be provided. It is also possible to achieve the advantageous effect that more favorable control is possible by updating information obtained via sensing as needed.

In FIG. 116, AP labeled N701, network labeled Q102, and server Q101 may be configured as a single apparatus. In such cases, network Q102 may be wired or wireless, and thus AP labeled N701 and server Q101 may be connected by wire or wirelessly in the single apparatus.

Embodiment 16

A variation of operations described in Embodiment 8, Embodiment 9, and Embodiment 15 will be described.

FIG. 51 describes the uploading of information related to in-home status to a cloud server and FIG. 52 describes the uploading of information about in-home devices to the cloud server, and examples of specific methods thereof are described in Embodiment 8. Here, other methods will be described.

For example, using device #C labeled N703 and smartphone N731 illustrated in FIG. 50 and FIG. 116, a user may register information about appliances (including audio equipment N702 and luminaire N704) that are present in the home labeled N700 to cloud server N720. Using a device other than these devices, the user may register the information about the appliances (including audio equipment N702 and luminaire N704) present in the home labeled N700 to cloud server N720 via AP labeled N701. In this way, information about appliances present in the home labeled N700 can be registered in cloud server N720 without performing sensing. Appliances (including audio equipment N702 and luminaire N704) present in the home labeled N700 may transmit radio waves and register the information about the appliances present in the home labeled N700 in cloud server N720 via AP labeled N701.

In FIG. 50 and FIG. 116, the appliances (for example, including audio equipment N702, luminaire N704, and device #C labeled N703) may perform sensing.

For example, although the terminology "in-home status sensing N801" is used in FIG. 51, the sensing of the in-home status may be performed by appliances. In this case, one of the devices that uploads information related to in-home status to cloud server N720 (N802) is an appliance.

In FIG. 53, the device that performs the sensing (N1001) may be an appliance. Thereafter, the appliance determines whether a moving object, including a person, was detected in the home (N1002), and uploads information related to the in-home status to cloud server N720 (N1003).

Furthermore, in FIG. 54, the device that performs the sensing (N1101) may be an appliance. Thereafter, the appliance uploads information related to the in-home status to cloud server N720 (N1102).

FIG. 56 describes the uploading of information related to in-home status to a server and FIG. 57 describes the uploading of information about in-home devices to the server, and examples of specific examples thereof are described in Embodiment 9 and Embodiment 15. Next, another method will be described.

For example, using device #C labeled N703 and smartphone N731 illustrated in FIG. 55 and FIG. 116, a user may register information about appliances (including audio equipment N702 and luminaire N704) that are present in the home labeled N700 to server Q101. Using a device other than these devices, the user may register the information about the appliances (including audio equipment N702 and luminaire N704) present in the home labeled N700 to server Q101 via AP labeled N701. In this way, information about appliances present in the home labeled N700 can be registered in server Q101 without performing sensing. Appliances (including audio equipment N702 and luminaire N704) present in the home labeled N700 may transmit radio waves and register the information about the appliances present in the home labeled N700 in server Q101 via AP labeled N701.

In FIG. 55 and FIG. 116, the appliances (for example, including audio equipment N702, luminaire N704, and device #C labeled N703) may perform sensing.

For example, although the terminology "in-home status sensing Q201" is used in FIG. 56, the sensing of the in-home status may be performed by appliances. In this case, one of the devices that uploads information related to in-home status to server Q101 (Q202) is an appliance.

In FIG. 58, the device that performs the sensing (Q401) may be an appliance. Thereafter, the appliance determines whether a moving object, including a person, was detected in the home (Q402), and uploads information related to the in-home status to server Q101 (Q403).

In FIG. 59, the device that performs the sensing (Q501) may be an appliance. Thereafter, the appliance uploads information related to the in-home status to server Q101 (Q502).

Embodiment 17

In the present embodiment, a variation of Embodiment 8 will be described.

FIG. 117 illustrates one example of states of apparatuses according to the present embodiment. In FIG. 117, elements that operate the same as in FIG. 50 have the same reference signs. Repeated description of configurations that have already been described in Embodiment 8 will be omitted.

One characterizing feature in FIG. 117 is that a repeater is present in in-home space N700. Hereinafter this will be described in greater detail.

Repeater #1 labeled V201_1 is communicating with devices that have a communication function (excluding a repeater). Here, a device having this communication function communicates with AP labeled N701 via repeater #1 labeled V201_1.

Repeater #2 labeled V201_2 is communicating with devices that have a communication function (excluding a repeater). Here, a device having this communication function communicates with AP labeled N701 via repeater #2 labeled V201_2 and repeater #1 labeled V201_1.

Repeater #3 labeled V201_3 is communicating with devices that have a communication function (excluding a repeater). Here, a device having this communication function communicates with AP labeled N701 via repeater #3 labeled V201_3.

Additionally, repeater #1 labeled V201_1, repeater #2 labeled V201_2, and repeater #3 labeled V201_3 may include a sensing function.

For example, repeater #1 labeled V201_1 performs the operations illustrated in FIG. 51.

First, repeater #1 labeled V201_1 performs sensing (N801), and uploads, to a cloud server via AP labeled N701, for example, information indicating in-home status, such as information indicating the number of rooms, information indicating the shape of a room, information on placed objects, such as information indicating the position of furniture, information indicating the shape of furniture, information indicating the position of an appliance (for example, luminaire V202_1), information indicating the shape of an appliance, information indicating the position of an electronic device, information indicating the shape of an electronic device, etc. (N802).

With this, repeater #1 labeled V201_1 concludes initial sensing (N803). Although the term "initial sensing" is used, after repeater #1 labeled V201_1 is first set up, the operations illustrated in FIG. 51 may be performed by repeater #1 labeled V201_1 periodically, aperiodically, regularly, or irregularly.

Repeater #2 labeled V201_2 also performs the operations illustrated in FIG. 51.

First, repeater #2 labeled V201_2 performs sensing (N801), and uploads, to a cloud server via repeater #1 labeled V201_1 and AP labeled N701, for example, information indicating in-home status, such as information indicating the number of rooms, information indicating the shape of a room, information on placed objects, such as information indicating the position of furniture, information indicating the shape of furniture, information indicating the position of an appliance (for example, luminaire V202_2, smartphone or tablet or computer or video device V203, display apparatus V204 such as a display, projector, television, head mounted display, AR glasses, AR goggles, VR glasses, VR goggles, etc.), information indicating the shape of an appliance, information indicating the position of an electronic device, information indicating the shape of an electronic device, etc. (N802).

With this, repeater #2 labeled V201_2 concludes initial sensing (N803). Although the term "initial sensing" is used, after repeater #2 labeled V201_2 is first set up, the operations illustrated in FIG. 51 may be performed by repeater #2 labeled V201_2 periodically, aperiodically, regularly, or irregularly.

Repeater #3 labeled V201_3 also performs the operations illustrated in FIG. 51.

First, repeater #3 labeled V201_3 performs sensing (N801), and uploads, to a cloud server via AP labeled N701, for example, information indicating in-home status, such as information indicating the number of rooms, information indicating the shape of a room, information on placed objects, such as information indicating the position of furniture, information indicating the shape of furniture, information indicating the position of an appliance (for example, luminaire V202_3), information indicating the shape of an appliance, information indicating the position of an electronic device, information indicating the shape of an electronic device, etc. (N802).

With this, repeater #3 labeled V201_3 concludes initial sensing (N803). Although the term "initial sensing" is used, after repeater #3 labeled V201_3 is first set up, the operations illustrated in FIG. 51 may be performed by repeater #3 labeled V201_3 periodically, aperiodically, regularly, or irregularly.

For example, repeater #1 labeled V201_1 performs the operations illustrated in FIG. 52.

Repeater #1 labeled V201_1 uploads, to a cloud server via AP labeled N701, information about in-home devices obtained via sensing, such as information about an appliance (including, for example, luminaire V202_1) and information about an electronic device (N901).

Next, information related to the pairing of an operation performed by an in-home device and sensing performed by repeater #1 labeled V201_1 is uploaded to the cloud server (N902). The pairing of an operation performed by an in-home device and sensing performed a device capable of sensing (repeater #1 labeled V201_1 in this example) as well as the registering of the pairing, are exemplified in Embodiment 7 and Embodiment 8, and repeated description thereof will be omitted.

Repeater #2 labeled V201_2 also performs the operations illustrated in FIG. 52.

Repeater #2 labeled V201_2 uploads, to a cloud server via repeater #1 labeled V201_1 and AP labeled N701, information about in-home devices obtained via sensing, such as information about an appliance (including, for example, luminaire V202_2, smartphone or tablet or computer or video device V203, display apparatus V204 such as a display, projector, television, head mounted display, AR glasses, AR goggles, VII glasses, VII goggles, etc.) and information about an electronic device (N901).

Next, information related to the pairing of an operation performed by an in-home device and sensing performed by repeater #2 labeled V201_2 is uploaded to the cloud server (N902). The pairing of an operation performed by an in-home device and sensing performed a device capable of sensing (repeater #2 labeled V201_2 in this example) as well as the registering of the pairing, are exemplified in Embodiment 7 and Embodiment 8, and repeated description thereof will be omitted in part.

Repeater #3 labeled V201_3 also performs the operations illustrated in FIG. 52.

Repeater #3 labeled V201_3 uploads, to a cloud server via AP labeled N701, information about in-home devices obtained via sensing, such as information about an appliance (including, for example, luminaire V202_3) and information about an electronic device (N901).

Next, information related to the pairing of an operation performed by an in-home device and sensing performed by repeater #3 labeled V201_3 is uploaded to the cloud server (N902). The pairing of an operation performed by an in-home device and sensing performed a device capable of sensing (repeater #3 labeled V201_3 in this example) as well as the registering of the pairing, are exemplified in Embodiment 7 and Embodiment 8, and repeated description thereof will be omitted.

FIG. 53 illustrates a flow chart of an example of operations related to the system. Hereinafter, an example of the pairing of luminaire V202_1 and sensing will be given with reference to FIG. 53.

Repeater #1 labeled V201_1 performs sensing (N1001).

As a result of the sensing, repeater #1 labeled V201_1 confirms whether a moving object, including a person, was detected in the home (N1002).

When repeater #1 labeled V201_1 does not detect a moving object, including a person, in the home (no in N1002), the processing returns to the "perform sensing" step N1001.

When repeater #1 labeled V201_1 detects a moving object, including a person, in the home (yes in N1002), repeater #1 labeled V201_1 uploads, to cloud server N720 via AP labeled N701 and network N710, information related to in-home status (N1003).

In response, cloud server N720 transmits, to repeater #1 labeled V201_1 via network N710 and AP labeled N701, information related to control of luminaire V202_1. Repeater #1 labeled V201_1 then obtains information related to control (control information) (yes in N1004).

Repeater #1 labeled V201_1 then transmits the control information to the target device (in the example illustrated in FIG. 117, luminaire V202_1) (N1005).

In response, the target device carries out control based on the control information, and ends control (N1006).

Repeater #1 labeled V201_1 then performs the next iteration of sensing (N1001).

On the other hand, consider a case in which repeater #1 labeled V201_1 detects a moving object, including a person, in the home (yes in N1002), uploads, to cloud server N720 via AP labeled N701 and network N710, information related to in-home status (N1003), but does not obtain control information from cloud server N720 via network N710 and AP labeled N701 (no in N1004). In such cases, repeater #1 labeled V201_1 then performs the next iteration of sensing (N1001).

For example, consider a case in which repeater #1 labeled V201_1 transmits control information to luminaire V202_1 in step N1005. In such cases, cloud server N720 transmits, to repeater #1 labeled V201_1 via network N710 and AP labeled N701, information related to the lighting of luminaire V202_1, such as ON/OFF or light emission directionality control, based on information indicating the position of a person or moving object obtained by sensing by repeater #1 labeled V201_1. Repeater #1 labeled V201_1 then transmits information related to ON/OFF or light emission directionality control to luminaire V202_1, and luminaire V202_1 carries out control for turning ON/OFF the lighting or control of the direction of light emission, based on the information related to ON/OFF or light emission directionality control.

FIG. 53 illustrates a flow chart of an example of operations related to the system. Hereinafter, an example of the pairing of luminaire V202_3 and sensing will be given with reference to FIG. 53.

Repeater #3 labeled V201_3 performs sensing (N1001).

As a result of the sensing, repeater #3 labeled V201_3 confirms whether a moving object, including a person, was detected in the home (N1002).

When repeater #3 labeled V201_3 does not detect a moving object, including a person, in the home (no in N1002), the processing returns to the "perform sensing" step N1001.

When repeater #3 labeled V201_3 detects a moving object, including a person, in the home (yes in N1002), repeater #3 labeled V201_3 uploads, to cloud server N720 via AP labeled N701 and network N710, information related to in-home status (N1003).

In response, cloud server N720 transmits, to repeater #3 labeled V201_3 via network N710 and AP labeled N701, information related to control of luminaire V202_3. Repeater #3 labeled V201_3 then obtains information related to control (control information) (yes in N1004).

Repeater #3 labeled V201_3 then transmits the control information to the target device (in the example illustrated in FIG. 117, luminaire V202_3) (N1005).

In response, the target device carries out control based on the control information, and ends control (N1006).

Repeater #3 labeled V201_3 then performs the next iteration of sensing (N1001).

On the other hand, consider a case in which repeater #3 labeled V201_3 detects a moving object, including a person, in the home (yes in N1002), uploads, to cloud server N720 via AP labeled N701 and network N710, information related to in-home status (N1003), but does not obtain control information from cloud server N720 via network N710 and AP labeled N701 (no in N1004). In such cases, repeater #3 labeled V201_3 then performs the next iteration of sensing (N1001).

For example, consider a case in which repeater #3 labeled V201_3 transmits control information to luminaire V202_3 in step N1005. In such cases, cloud server N720 transmits, to repeater #3 labeled V201_3 via network N710 and AP labeled N701, information related to the lighting of luminaire V202_3, such as ON/OFF or light emission directionality control, based on information indicating the position of a person or moving object obtained by sensing by repeater #3 labeled V201_3. Repeater #3 labeled V201_3 then transmits information related to ON/OFF or light emission directionality control to luminaire V202_3, and luminaire V202_3 carries out control for turning ON/OFF the lighting or control of the direction of light emission, based on the information related to ON/OFF or light emission directionality control.

FIG. 53 illustrates a flow chart of an example of operations related to the system. Hereinafter, with reference to FIG. 53, an example of pairing of luminaire V202_2 and sensing, an example of pairing of smartphone or tablet or computer or video device V203 and sensing, an example of pairing of display apparatus V204 such as a display, projector, television, head mounted display, AR glasses, AR goggles, VII glasses, VII goggles, etc., and sensing will be given.

Repeater #2 labeled V201_2 performs sensing (N1001).

As a result of the sensing, repeater #2 labeled V201_2 confirms whether a moving object, including a person, was detected in the home (N1002).

When repeater #2 labeled V201_2 does not detect a moving object, including a person, in the home (no in N1002), the processing returns to the "perform sensing" step N1001.

When repeater #2 labeled V201_2 detects a moving object, including a person, in the home (yes in N1002), repeater #2 labeled V201_2 uploads, to cloud server N720 via AP labeled N701, repeater #1 labeled V201_1, and network N710, information related to in-home status (N1003).

In response, cloud server N720 transmits, to repeater #2 labeled V201_2 via network N710, AP labeled N701, and repeater #1 labeled V201_1, information related to control of smartphone or tablet or computer or video device V203, or information related to control of display apparatus V204 such as a display, projector, television, head mounted display, AR glasses, AR goggles, VR glasses, VR goggles, etc., or information related to control of luminaire V202_2. Repeater #2 labeled V201_2 then obtains information related to control (control information) (yes in N1004).

Repeater #2 labeled V201_2 then transmits the control information to the target device (in the example illustrated in FIG. 117, luminaire V202_2, or smartphone or tablet or computer or video device V203, or display apparatus V204 such as a display, projector, television, head mounted display, AR glasses, AR goggles, VR glasses, VR goggles, etc.) (N1005).

In response, the target device carries out control based on the control information, and ends control (N1006).

Repeater #2 labeled V201_2 then performs the next iteration of sensing (N1001).

On the other hand, consider a case in which repeater #2 labeled V201_2 detects a moving object, including a person, in the home (yes in N1002), uploads, to cloud server N720 via repeater #1 labeled V201_1, AP labeled N701, and network N710, information related to in-home status (N1003), but does not obtain control information from cloud server N720 via network N710, AP labeled N701, and repeater #1 labeled V201_1 (no in N1004). In such cases, repeater #2 labeled V201_2 then performs the next iteration of sensing (N1001).

For example, consider a case in which repeater #2 labeled V201_2 transmits control information to luminaire V202_2 in step N1005. In such cases, cloud server N720 transmits, to repeater #2 labeled V201_2 via network N710, AP labeled N701, and repeater #1 labeled V201_1, information related to the lighting of luminaire V202_2, such as ON/OFF or light emission directionality control, based on information indicating the position of a person or moving object obtained by sensing by repeater #2 labeled V201_2. Repeater #2 labeled V201_2 then transmits information related to ON/OFF or light emission directionality control to luminaire V202_2, and luminaire V202_2 carries out control for turning ON/OFF the lighting or control of the direction of light emission, based on the information related to ON/OFF or light emission directionality control.

For example, consider a case in which repeater #2 labeled V201_2 transmits control information to smartphone or tablet or computer or video device V203 in step N1005. In such cases, cloud server N720 transmits, to repeater #2 labeled V201_2 via network N710, AP labeled N701, and repeater #1 labeled V201_1, information related to, for example, the ON/OFF control of smartphone or tablet or computer or video device V203, based on information indicating the position of a person obtained by sensing by repeater #2 labeled V201_2. Repeater #2 labeled V201_2 transmits information related to, for example, the ON/OFF control of smartphone or tablet or computer or video device V203 to smartphone or tablet or computer or video device V203, and smartphone or tablet or computer or video device V203 performs ON/OFF control based on the information related to, for example, the ON/OFF control of smartphone or tablet or computer or video device V203. Although ON/OFF control is used in this example, other control may be performed instead.

Consider a case in which repeater #2 labeled V201_2 transmits control information to display apparatus V204 such as a display, projector, television, head mounted display, AR glasses, AR goggles, VR glasses, VR goggles, etc., in N1005. In such cases, cloud server N720 transmits, to repeater #2 labeled V201_2 via network N710, AP labeled N701, and repeater #1 labeled V201_1, information related to, for example, the ON/OFF control of display apparatus V204 such as a display, projector, television, head mounted display, AR glasses, AR goggles, VR glasses, VR goggles, etc., based on information indicating the position of a person obtained by sensing by repeater #2 labeled V201_2. Repeater #2 labeled V201_2 transmits information related to, for example, the ON/OFF control of display apparatus V204 such as a display, projector, television, head mounted display, AR glasses, AR goggles, VR glasses, VR goggles, etc., to display apparatus V204 such as a display, projector, television, head mounted display, AR glasses, AR goggles, VR glasses, VR goggles, etc., and display apparatus V204 such as a display, projector, television, head mounted display, AR glasses, AR goggles, VR glasses, VR goggles, etc., performs ON/OFF control based on the information related to, for example, the ON/OFF control of display apparatus V204 such as a display, projector, television, head mounted display, AR glasses, AR goggles, VR glasses, VR goggles, etc. Although ON/OFF control is used in this example, other control may be performed instead.

As described above, by controlling a device present in the home based on the in-home state, it is possible to achieve the advantageous effect that comfortable, safe living can be provided.

Next, other operations will be described with reference to FIG. 53.

For example, repeater #2 labeled V201_2 performs sensing (N1001).

As a result of the sensing, repeater #2 labeled V201_2 confirms whether a moving object, including a person, was detected in the home (N1002). In particular, the detection of a person and smartphone or tablet or computer or video device V203 is performed. In this example, a stationary appliance may be detected.

When repeater #2 labeled V201_2 does not detect a moving object, including a person, in the home (no in N1002), the processing returns to the "perform sensing" step N1001. In particular, in this example, the detection of a person and smartphone or tablet or computer or video device V203 is not performed.

When repeater #2 labeled V201_2 detects a moving object, including a person, in the home (yes in N1002), repeater #2 labeled V201_2 uploads, to cloud server N720 via AP labeled N701, repeater #1 labeled V201_1, and network N710, information related to in-home status (N1003). In particular, in this example, repeater #2 labeled V201_2 has detected a person and smartphone or tablet or computer or video device V203 in the home. Repeater #2 labeled V201_2 uploads information related to the in-home status (indicating that a person and smartphone or tablet or computer or video device V203 have been detected) to cloud server N720 via AP labeled N701, repeater #1 labeled V201_1, and network N710 (N1003).

In response, cloud server N720 transmits, to repeater #2 labeled V201_2 via network N710, AP labeled N701, and repeater #1 labeled V201_1, information related to control of smartphone or tablet or computer or video device V203, or information related to control of display apparatus V204 such as a display, projector, television, head mounted display, AR glasses, AR goggles, VR glasses, VR goggles, etc., or information related to control of luminaire V202_2. Repeater #2 labeled V201_2 then obtains information related to control (control information) (yes in N1004).

In particular, in this example, since a person and smartphone or tablet or computer or video device V203 were detected, cloud server N720 transmits, to repeater #2 labeled V201_2 via network N710, AP labeled N701, and repeater

1 labeled V201_1, information related to control of display apparatus V204 such as a display, projector, television, head mounted display, AR glasses, AR goggles, VR glasses, VR goggles, etc., or information related to control of luminaire V202_2.

The information related to control of luminaire V202_2 is as described above.

As information related to control of display apparatus V204 such as a display, projector, television, head mounted display, AR glasses, AR goggles, VR glasses, VR goggles, etc., since smartphone or tablet or computer or video device V203 was detected, in order to enable smartphone or tablet or computer or video device V203 to connect to display apparatus V204 such as a display, projector, television, head mounted display, AR glasses, AR goggles, VR glasses, VR goggles, etc., as information related to control of display apparatus V204 such as a display, projector, television, head mounted display, AR glasses, AR goggles, VR glasses, VR goggles, etc., information for turning display apparatus V204 such as a display, projector, television, head mounted display, AR glasses, AR goggles, VR glasses, VR goggles, etc., ON is transmitted by cloud server N720. As information related to control of display apparatus V204 such as a display, projector, television, head mounted display, AR glasses, AR goggles, VR glasses, VR goggles, etc., control information related to the implementation of start-up for connecting to smartphone or tablet or computer or video device V203 may be transmitted by cloud server N720.

Repeater #2 labeled V201_2 then obtains information related to control (control information) (yes in N1004).

Repeater #2 labeled V201_2 then transmits the control information to the target device (in the example illustrated in FIG. 117, luminaire V202_2, or smartphone or tablet or computer or video device V203, or display apparatus V204 such as a display, projector, television, head mounted display, AR glasses, AR goggles, VR glasses, VR goggles, etc.) (N1005). In particular, in this example, repeater #2 labeled V201_2 transmits the above-described control information to luminaire V202_2 and display apparatus V204 such as a display, projector, television, head mounted display, AR glasses, AR goggles, VR glasses, VR goggles, etc.

In response, the target device carries out control based on the control information, and ends control (N1006).

Repeater #2 labeled V201_2 then performs the next iteration of sensing (N1001).

On the other hand, consider a case in which repeater #2 labeled V201_2 detects a moving object, including a person, in the home (yes in N1002), uploads, to cloud server N720 via repeater #1 labeled V201_1, AP labeled N701, and network N710, information related to in-home status (N1003), but does not obtain control information from cloud server N720 via network N710, AP labeled N701, and repeater #1 labeled V201_1 (no in N1004). In such cases, repeater #2 labeled V201_2 then performs the next iteration of sensing (N1001).

As described above, by controlling a device present in the home based on the in-home state, it is possible to achieve the advantageous effect that comfortable, safe living can be provided. Moreover, as a result of a plurality of devices being controlled in coordination with one another in accordance with the sensing, it is possible to achieve the advantageous effect of further improvement in user convenience.

FIG. 54 illustrates a flow chart of one example of operations performed by repeater #1 labeled V201_1 and cloud server N720.

Repeater #1 labeled V201_1 performs sensing (N1101), and uploads, to a cloud server via AP labeled N701 and network N710, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (N1102).

Cloud server N720 compares stored information related to in-home status with the newly obtained information related to in-home status. Cloud server N720 then confirms whether a new state has been detected or not (N1103).

When cloud server N720 confirms that a new state has been detected (yes in N1103), cloud server N720 updates the information related to in-home status (N1104). Then, the next iteration of repeater #1 labeled V201_1 sensing is performed (N1101).

When cloud server N720 does not confirm that a new state has been detected (no in N1103), the next iteration of repeater #1 labeled V201_1 sensing is performed (N1101).

FIG. 54 may be considered as a flow chart of one example of operations performed by repeater #2 labeled V201_2 and cloud server N720.

Repeater #2 labeled V201_2 performs sensing (N1101), and uploads, to a cloud server via repeater #1 labeled V201_1, AP labeled N701, and network N710, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (N1102).

Cloud server N720 compares stored information related to in-home status with the newly obtained information related to in-home status. Cloud server N720 then confirms whether a new state has been detected or not (N1103).

When cloud server N720 confirms that a new state has been detected (yes in N1103), cloud server N720 updates the information related to in-home status (N1104). Then, the next iteration of repeater #2 labeled V201_2 sensing is performed (N1101).

When cloud server N720 does not confirm that a new state has been detected (no in N1103), the next iteration of repeater #2 labeled V201_2 sensing is performed (N1101).

FIG. 54 may be considered as a flow chart of one example of operations performed by repeater #3 labeled V201_3 and cloud server N720.

Repeater #3 labeled V201_3 performs sensing (N1101), and uploads, to a cloud server via repeater #1 labeled V201_1, AP labeled N701, and network N710, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (N1102).

Cloud server N720 compares stored information related to in-home status with the newly obtained information related to in-home status. Cloud server N720 then confirms whether a new state has been detected or not (N1103).

When cloud server N720 confirms that a new state has been detected (yes in N1103), cloud server N720 updates the information related to in-home status (N1104). Then, the next iteration of repeater #3 labeled V201_3 sensing is performed (N1101).

When cloud server N720 does not confirm that a new state has been detected (no in N1103), the next iteration of repeater #3 labeled V201_3 sensing is performed (N1101).

As described above, by controlling a device present in the home based on the in-home state, it is possible to achieve the advantageous effect that comfortable, safe living can be provided. It is also possible to achieve the advantageous effect that more favorable control is possible by updating information obtained via sensing as needed.

For example, using device #C labeled N703 and smartphone N731 illustrated in FIG. 117, a user may register information about appliances (including audio equipment N702, luminaire N704, luminaires V202_1, V202_2, and V202_3, smartphone or tablet or computer or video device V203, and display apparatus V204) that are present in the home labeled N700 to cloud server N720. Moreover, using a device other than these device, a user may register, at least via AP labeled N701, information about appliances (including audio equipment N702, luminaire N704, luminaires V202_1, V202_2, and V202_3, smartphone or tablet or computer or video device V203, and display apparatus V204) that are present in the home labeled N700 to cloud server N720. In this way, information about appliances present in the home labeled N700 can be registered in cloud server N720 without performing sensing. Appliances (including audio equipment N702, luminaire N704, luminaires V202_1, V202_2, and V202_3, smartphone or tablet or computer or video device V203, and display apparatus V204) present in the home labeled N700 may transmit radio waves and register the information about the appliances present in the home labeled N700 in cloud server N720 via AP labeled N701.

Moreover, in FIG. 117, appliances (including audio equipment N702, luminaire N704, device #C labeled N703, luminaires V202_1, V202_2, and V202_3, smartphone or tablet or computer or video device V203, and display apparatus V204) may implement the sensing.

For example, although the terminology "in-home status sensing N801" is used in FIG. 51, the sensing of the in-home status may be performed by appliances. In this case, one of the devices that uploads information related to in-home status to cloud server N720 (N802) is an appliance.

In FIG. 53, the device that performs the sensing (N1001) may be an appliance. Thereafter, the appliance determines whether a moving object, including a person, was detected in the home (N1002), and uploads information related to the in-home status to cloud server N720 (N1003).

Furthermore, in FIG. 54, the device that performs the sensing (N1101) may be an appliance. Thereafter, the appliance uploads information related to the in-home status to cloud server N720 (N1102).

It is also possible to implement the following.

As one example, we will focus on luminaire V202_3 illustrated in FIG. 117.

As described above, repeater #3 labeled V201_3 obtains information related to the sensing of luminaire V203_3, by performing sensing. Then, repeater #3 labeled V201_3 transmits the information related to the sensing of luminaire V203_3 to repeater #1 labeled V201_1 and/or repeater #2 labeled V201_2 and/or AP labeled N701 and/or cloud server N720.

Then, for example, repeater #1 labeled V201_1 also performs sensing to transmit the information related to the sensing of luminaire V203_3 to repeater #2 labeled V201_2 and/or repeater #3 labeled V201_3 and/or AP labeled N701 and/or cloud server N720.

For example, cloud server N702 obtains information related to the sensing of luminaire V203_3 transmitted by repeater #3 labeled V201_3 and information related to the sensing of luminaire V203_3 transmitted by repeater #1 labeled V201_1. Cloud server N702 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable.

Similarly, AP labeled N701 obtains information related to the sensing of luminaire V203_3 transmitted by repeater #3 labeled V201_3 and information related to the sensing of luminaire V203_3 transmitted by repeater #1 labeled V201_1. AP labeled N701 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable. AP labeled N701 may transmit information indicating the triangulation result to cloud server N720.

Assume repeater #2 labeled V201_2 has obtained the information related to the sensing of luminaire V203_3 transmitted by repeater #3 labeled V201_3 and the information related to the sensing of luminaire V203_3 transmitted by repeater #1 labeled V201_1. Repeater #2 labeled V201_2 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable. Repeater #2 labeled V201_2 may transmit information indicating the triangulation result to cloud server N720.

Repeater #1 labeled V201_1 obtains the information related to the sensing of luminaire V203_3 transmitted by repeater #3 labeled V201_3, and obtains information related to the sensing of luminaire V203_3 generated by itself. Repeater #1 labeled V201_1 can then use the information related to the sensing of luminaire V203_3 transmitted by repeater #3 labeled V201_3 and the information related to the sensing of luminaire V203_3 generated by itself to perform triangulation as described in other embodiments to achieve the advantageous effect that more accurate position information and the like is obtainable. Repeater #1 labeled V201_1 may transmit information indicating the triangulation result to cloud server N720.

Repeater #3 labeled V201_3 obtains the information related to the sensing of luminaire V203_3 transmitted by repeater #1 labeled V201_1, and obtains information related to the sensing of luminaire V203_3 generated by itself. Repeater #3 labeled V201_3 can then use the information related to the sensing of luminaire V203_3 transmitted by repeater #1 labeled V201_1 and the information related to the sensing of luminaire V203_3 generated by itself to perform triangulation as described in other embodiments to achieve the advantageous effect that more accurate position information and the like is obtainable. Repeater #3 labeled V201_3 may transmit information indicating the triangulation result to cloud server N720.

Although the above describes an example of obtaining information related to the sensing of luminaire V203_3 by sensing, this is only an example; the AP and repeater can transmit, to an AP, a repeater, and a cloud server, information related to the sensing of appliances, information related to the sensing of people, and information related to the sensing of objects present in the home by sensing, may share this information, and as a result of the AP, the repeater, and the cloud server performing triangulation, an advantageous effect whereby a more accurate location of the target object can be obtained.

Although the present embodiment is described using the system configuration illustrated in FIG. 117 as an example, this example is not limiting. For example, a system in which a plurality of APs are present in the home, a system in which no repeaters are present in the home, and a system in which one or more repeaters are present in the home are acceptable. The target objects to be detected and measured by the APs, repeaters, and the like by sensing are not limited to those described in the present embodiment. In FIG. 117, the location where the APs and repeaters are placed is described as inside a home, but this example is not limiting. For example, it is possible to implement the content described in the present embodiment by placing APs and repeaters in a convenience store, a supermarket, a parking lot, a stadium, a hall, a building, inside a building, a station, an airport, a factory, inside an aircraft, inside a ship, inside a car, inside railroads, and the like. Even in such cases, the present embodiment can be carried out in the same manner.

Embodiment 18

In the present embodiment, a variation of Embodiment 9 will be described.

FIG. 118 illustrates one example of states of apparatuses according to the present embodiment. In FIG. 118, elements that operate the same as in FIG. 55 and FIG. 117 have the same reference signs. Repeated description of configurations that have already been described in Embodiment 9 will be omitted.

One characterizing feature in FIG. 118 is that a repeater is present in in-home space N700. Hereinafter this will be described in greater detail.

Repeater #1 labeled V201_1 is communicating with devices that have a communication function (excluding a repeater). Here, a device having this communication function communicates with AP labeled N701 via repeater #1 labeled V201_1.

Repeater #2 labeled V201_2 is communicating with devices that have a communication function (excluding a repeater). Here, a device having this communication function communicates with AP labeled N701 via repeater #2 labeled V201_2 and repeater #1 labeled V201_1.

Repeater #3 labeled V201_3 is communicating with devices that have a communication function (excluding a repeater). Here, a device having this communication function communicates with AP labeled N701 via repeater #3 labeled V201_3.

Additionally, repeater #1 labeled V201_1, repeater #2 labeled V201_2, and repeater #3 labeled V201_3 may include a sensing function.

For example, repeater #1 labeled V201_1 performs the operations illustrated in FIG. 56.

First, repeater #1 labeled V201_1 performs sensing (Q201), and uploads, to server Q101 via AP labeled N701, for example, information indicating in-home status, such as information indicating the number of rooms, information indicating the shape of a room, information on placed objects, such as information indicating the position of furniture, information indicating the shape of furniture, information indicating the position of an appliance (for example, luminaire V202_1), information indicating the shape of an appliance, information indicating the position of an electronic device, information indicating the shape of an electronic device, etc. (Q202).

With this, repeater #1 labeled V201_1 concludes initial sensing (Q203). Although the term "initial sensing" is used, after repeater #1 labeled V201_1 is first set up, the operations illustrated in FIG. 56 may be performed by repeater #1 labeled V201_1 periodically, aperiodically, regularly, or irregularly.

Repeater #2 labeled V201_2 also performs the operations illustrated in FIG. 56.

First, repeater #2 labeled V201_2 performs sensing (Q201), and uploads, to server Q101 via repeater #1 labeled V201_1 and AP labeled N701, for example, information indicating in-home status, such as information indicating the number of rooms, information indicating the shape of a room, information on placed objects, such as information indicating the position of furniture, information indicating the shape of furniture, information indicating the position of an appliance (for example, luminaire V202_2, smartphone or tablet or computer or video device V203, display apparatus V204 such as a display, projector, television, head mounted display, AR glasses, AR goggles, VR glasses, VR goggles, etc.), information indicating the shape of an appliance, information indicating the position of an electronic device, information indicating the shape of an electronic device, etc. (Q202).

With this, repeater #2 labeled V201_2 concludes initial sensing (Q203). Although the term "initial sensing" is used, after repeater #2 labeled V201_2 is first set up, the operations illustrated in FIG. 56 may be performed by repeater #2 labeled V201_2 periodically, aperiodically, regularly, or irregularly.

Repeater #3 labeled V201_3 also performs the operations illustrated in FIG. 56.

First, repeater #3 labeled V201_3 performs sensing (Q201), and uploads, to server Q101 via AP labeled N701, for example, information indicating in-home status, such as information indicating the number of rooms, information indicating the shape of a room, information on placed objects, such as information indicating the position of furniture, information indicating the shape of furniture, information indicating the position of an appliance (for example, luminaire V202_3), information indicating the shape of an appliance, information indicating the position of an electronic device, information indicating the shape of an electronic device, etc. (Q202).

With this, repeater #3 labeled V201_3 concludes initial sensing (Q203). Although the term "initial sensing" is used, after repeater #3 labeled V201_3 is first set up, the operations illustrated in FIG. 56 may be performed by repeater #3 labeled V201_3 periodically, aperiodically, regularly, or irregularly.

For example, repeater #1 labeled V201_1 performs the operations illustrated in FIG. 57.

Repeater #1 labeled V201_1 uploads, to server Q101 via AP labeled N701, information about in-home devices obtained via sensing, such as information about an appliance (including, for example, luminaire V202_1) and information about an electronic device (Q301).

Next, information related to the pairing of an operation performed by an in-home device and sensing performed by repeater #1 labeled V201_1 is uploaded to server Q101 (Q302). The pairing of an operation performed by an in-home device and sensing performed a device capable of sensing (repeater #1 labeled V201_1 in this example) as well as the registering of the pairing, are exemplified in Embodiment 7 and Embodiment 9, and repeated description thereof will be omitted.

Repeater #2 labeled V201_2 also performs the operations illustrated in FIG. 57.

Repeater #2 labeled V201_2 uploads, to server Q101 via repeater #1 labeled V201_1 and AP labeled N701, information about in-home devices obtained via sensing, such as information about an appliance (including, for example, luminaire V202_2, smartphone or tablet or computer or video device V203, display apparatus V204 such as a display, projector, television, head mounted display, AR glasses, AR goggles, VII glasses, VII goggles, etc.) and information about an electronic device (Q301).

Next, information related to the pairing of an operation performed by an in-home device and sensing performed by repeater #2 labeled V201_2 is uploaded to server Q101 (Q302). The pairing of an operation performed by an in-home device and sensing performed a device capable of sensing (repeater #2 labeled V201_2 in this example) as well as the registering of the pairing, are exemplified in Embodiment 7 and Embodiment 9, and repeated description thereof will be omitted in part.

Repeater #3 labeled V201_3 also performs the operations illustrated in FIG. 57.

Repeater #3 labeled V201_3 uploads, to server Q101 via AP labeled N701, information about in-home devices obtained via sensing, such as information about an appliance (including, for example, luminaire V202_3) and information about an electronic device (Q301).

Next, information related to the pairing of an operation performed by an in-home device and sensing performed by repeater #3 labeled V201_3 is uploaded to server Q101 (Q302). The pairing of an operation performed by an in-home device and sensing performed a device capable of sensing (repeater #3 labeled V201_3 in this example) as well as the registering of the pairing, are exemplified in Embodiment 7 and Embodiment 9, and repeated description thereof will be omitted.

FIG. 58 illustrates a flow chart of an example of operations related to the system. Hereinafter, an example of the pairing of luminaire V202_1 and sensing will be given with reference to FIG. 58.

Repeater #1 labeled V201_1 performs sensing (Q401).

As a result of the sensing, repeater #1 labeled V201_1 confirms whether a moving object, including a person, was detected in the home (Q402).

When repeater #1 labeled V201_1 does not detect a moving object, including a person, in the home (no in Q402), the processing returns to the "perform sensing" step Q401.

When repeater #1 labeled V201_1 does detect a moving object, including a person, in the home (yes in Q402), repeater #1 labeled V201_1 uploads, to server Q101 via AP labeled N701 and network Q102, information related to in-home status (Q403).

In response, server Q101 transmits, to repeater #1 labeled V201_1 via AP labeled N701 and network Q102, information related to control of luminaire V202_1. Repeater #1 labeled V201_1 then obtains information related to control (control information) (yes in Q404).

Repeater #1 labeled V201_1 then transmits the control information to the target device (in the example illustrated in FIG. 118, luminaire V202_1) (Q405).

In response, the target device carries out control based on the control information, and ends control (Q406).

Repeater #1 labeled V201_1 then performs the next iteration of sensing (Q401).

On the other hand, consider a case in which repeater #1 labeled V201_1 detects a moving object, including a person, in the home (yes in Q402), uploads, to server Q101 via AP labeled N701 and network Q102, information related to in-home status (Q403), but does not obtain control information from server Q101 (no in Q404). Repeater #1 labeled V201_1 then performs the next iteration of sensing (Q401).

For example, consider a case in which repeater #1 labeled V201_1 transmits control information to luminaire V202_1 in step Q405. In such cases, server Q101 transmits, to AP labeled N701, information related to the lighting of luminaire V202_1, such as ON/OFF or light emission directionality control, based on information indicating the position of a person or moving object obtained by sensing by repeater #1 labeled V201_1. Via repeater #1 labeled V201_1, AP labeled N701 then transmits information related to ON/OFF or light emission directionality control to luminaire V202_1, and luminaire V202_1 carries out control for turning ON/OFF the lighting or control of the direction of light emission, based on the information related to ON/OFF or light emission directionality control.

FIG. 58 illustrates a flow chart of an example of operations related to the system. Hereinafter, an example of the pairing of luminaire V202_3 and sensing will be given with reference to FIG. 58.

Repeater #3 labeled V201_3 performs sensing (Q401).

As a result of the sensing, repeater #3 labeled V201_3 confirms whether a moving object, including a person, was detected in the home (Q402).

When repeater #3 labeled V201_3 does not detect a moving object, including a person, in the home (no in Q402), the processing returns to the "perform sensing" step Q401.

When repeater #3 labeled V201_3 does detect a moving object, including a person, in the home (yes in Q402), repeater #3 labeled V201_3 uploads, to server Q101 via AP labeled N701 and network Q102, information related to in-home status (Q403).

In response, server Q101 transmits, to repeater #3 labeled V201_3 via AP labeled N701 and network Q102, information related to control of luminaire V202_3. Repeater #3 labeled V201_3 then obtains information related to control (control information) (yes in Q404).

Repeater #3 labeled V201_3 then transmits the control information to the target device (in the example illustrated in FIG. 118, luminaire V202_3) (Q405).

In response, the target device carries out control based on the control information, and ends control (Q406).

Repeater #3 labeled V201_3 then performs the next iteration of sensing (Q401).

On the other hand, consider a case in which repeater #3 labeled V201_3 detects a moving object, including a person, in the home (yes in Q402), uploads, to server Q101 via AP labeled N701 and network Q102, information related to in-home status (Q403), but does not obtain control information from server Q101 (no in Q404). Repeater #3 labeled V201_3 then performs the next iteration of sensing (Q401).

For example, consider a case in which repeater #3 labeled V201_3 transmits control information to luminaire V202_3 in step Q405. In such cases, server Q101 transmits, to AP labeled N701, information related to the lighting of luminaire V202_3, such as ON/OFF or light emission directionality control, based on information indicating the position of a person or moving object obtained by sensing by repeater #3 labeled V201_3. Via repeater #3 labeled V201_3, AP labeled N701 then transmits information related to ON/OFF or light emission directionality control to luminaire V202_3, and luminaire V202_3 carries out control for turning ON/OFF the lighting or control of the direction of light emission, based on the information related to ON/OFF or light emission directionality control.

FIG. 58 illustrates a flow chart of an example of operations related to the system. Hereinafter, with reference to FIG. 58, an example of pairing of luminaire V202_2 and sensing, an example of pairing of smartphone or tablet or computer or video device V203 and sensing, an example of pairing of display apparatus V204 such as a display, projector, television, head mounted display, AR glasses, AR goggles, VII glasses, VII goggles, etc., and sensing will be given.

Repeater #2 labeled V201_2 performs sensing (Q401).

As a result of the sensing, repeater #2 labeled V201_2 confirms whether a moving object, including a person, was detected in the home (Q402).

When repeater #2 labeled V201_2 does not detect a moving object, including a person, in the home (no in Q402), the processing returns to the "perform sensing" step Q401.

When repeater #2 labeled V201_2 does detect a moving object, including a person, in the home (yes in Q402), repeater #2 labeled V201_2 uploads, to server Q101 via AP labeled N701, repeater #1 labeled V201_1, and network Q102, information related to in-home status (Q403).

In response, server Q101 transmits, to repeater #2 labeled V201_2 via AP labeled N701, network Q102, and repeater #1 labeled V201_1, information related to control of smartphone or tablet or computer or video device V203, or information related to control of display apparatus V204 such as a display, projector, television, head mounted display, AR glasses, AR goggles, VR glasses, VR goggles, etc., or information related to control of luminaire V202_2. Repeater #2 labeled V201_2 then obtains information related to control (control information) (yes in Q404).

Repeater #2 labeled V201_2 then transmits the control information to the target device (in the example illustrated in FIG. 118, luminaire V202_2, or smartphone or tablet or computer or video device V203, or display apparatus V204 such as a display, projector, television, head mounted display, AR glasses, AR goggles, VR glasses, VR goggles, etc.) (Q405).

In response, the target device carries out control based on the control information, and ends control (Q406).

Repeater #2 labeled V201_2 then performs the next iteration of sensing (Q401).

On the other hand, consider a case in which repeater #2 labeled V201_2 detects a moving object, including a person, in the home (yes in Q402), uploads, to server Q101 via repeater #1 labeled V201_1, AP labeled N701, and network Q102, information related to in-home status (Q403), but does not obtain control information from server Q101 (no in Q404). Repeater #2 labeled V201_2 then performs the next iteration of sensing (Q401).

For example, consider a case in which repeater #2 labeled V201_2 transmits control information to luminaire V202_2 in step Q405. In such cases, server Q101 transmits, to AP labeled N701, information related to the lighting of luminaire V202_2, such as ON/OFF or light emission directionality control, based on information indicating the position of a person or moving object obtained by sensing by repeater #2 labeled V201_2. Via repeater #1 labeled V201_1 and repeater #2 labeled V201_2, AP labeled N701 then transmits information related to ON/OFF or light emission directionality control to luminaire V202_2, and luminaire V202_2 carries out control for turning ON/OFF the lighting or control of the direction of light emission, based on the information related to ON/OFF or light emission directionality control.

For example, consider a case in which repeater #2 labeled V201_2 transmits control information to smartphone or tablet or computer or video device V203 in step Q405. In such cases, server Q101 transmits, to AP labeled N701, information related to, for example, the ON/OFF control of smartphone or tablet or computer or video device V203, based on information indicating the position of a person or moving object obtained by sensing by repeater #2 labeled V201_2. AP labeled N701 transmits, to smartphone or tablet or computer or video device V203 via repeater #1 labeled V201_1 and repeater #2 labeled V201_2, information related to, for example, the ON/OFF control of smartphone or tablet or computer or video device V203, and smartphone or tablet or computer or video device V203 performs ON/OFF control. Although ON/OFF control is used in this example, other control may be performed instead.

Consider a case in which repeater #2 labeled V201_2 transmits control information to display apparatus V204 such as a display, projector, television, head mounted display, AR glasses, AR goggles, VR glasses, VR goggles, etc., in Q405. In such cases, server Q101 transmits, to AP labeled N701, information related to, for example, the ON/OFF control of display apparatus V204 such as a display, projector, television, head mounted display, AR glasses, AR goggles, VR glasses, VR goggles, etc., based on information indicating the position of a person or moving object obtained by sensing by repeater #2 labeled V201_2. AP labeled N701 transmits, to display apparatus V204 such as a display, projector, television, head mounted display, AR glasses, AR goggles, VR glasses, VR goggles, etc., via repeater #1 labeled V201_1 and repeater #2 labeled V201_2, information related to, for example, the ON/OFF control of display apparatus V204 such as a display, projector, television, head mounted display, AR glasses, AR goggles, VR glasses, VR goggles, etc., and display apparatus V204 such as a display, projector, television, head mounted display, AR glasses, AR goggles, VR glasses, VR goggles, etc., performs ON/OFF control. Although ON/OFF control is used in this example, other control may be performed instead.

As described above, by controlling a device present in the home based on the in-home state, it is possible to achieve the advantageous effect that comfortable, safe living can be provided.

Next, other operations will be described with reference to FIG. 58.

For example, repeater #2 labeled V201_2 performs sensing (Q401).

As a result of the sensing, repeater #2 labeled V201_2 confirms whether a moving object, including a person, was detected in the home (Q402).

When repeater #2 labeled V201_2 does not detect a moving object, including a person, in the home (no in Q402), the processing returns to the "perform sensing" step Q401. In particular, the detection of a person and smartphone or tablet or computer or video device V203 is performed. In this example, a stationary appliance is not detected.

When repeater #2 labeled V201_2 does detect a moving object, including a person, in the home (yes in Q402), repeater #2 labeled V201_2 uploads, to server Q101 via AP labeled N701, repeater #1 labeled V201_1, and network Q102, information related to in-home status (Q403). In particular, in this example, repeater #2 labeled V201_2 has detected a person and smartphone or tablet or computer or video device V203 in the home.

In response, server Q101 transmits, to repeater #2 labeled V201_2 via AP labeled N701, network Q102, and repeater #1 labeled V201_1, information related to control of smartphone or tablet or computer or video device V203, or information related to control of display apparatus V204 such as a display, projector, television, head mounted display, AR glasses, AR goggles, VR glasses, VR goggles, etc., or information related to control of luminaire V202_2. Repeater #2 labeled V201_2 then obtains information related to control (control information) (yes in Q404).

In particular, in this example, since a person and smartphone or tablet or computer or video device V203 were detected, server Q101 transmits, to repeater #2 labeled V201_2 via network Q102, AP labeled N701, and repeater #1 labeled V201_1, information related to control of display apparatus V204 such as a display, projector, television, head mounted display, AR glasses, AR goggles, VR glasses, VR goggles, etc., or information related to control of luminaire V202_2.

The information related to control of luminaire V202_2 is as described above.

As information related to control of display apparatus V204 such as a display, projector, television, head mounted display, AR glasses, AR goggles, VR glasses, VR goggles, etc., since smartphone or tablet or computer or video device V203 was detected, in order to enable smartphone or tablet or computer or video device V203 to connect to display apparatus V204 such as a display, projector, television, head mounted display, AR glasses, AR goggles, VR glasses, VR goggles, etc., as information related to control of display apparatus V204 such as a display, projector, television, head mounted display, AR glasses, AR goggles, VR glasses, VR goggles, etc., information for turning display apparatus V204 such as a display, projector, television, head mounted display, AR glasses, AR goggles, VR glasses, VR goggles, etc., ON is transmitted by server Q101. As information related to control of display apparatus V204 such as a display, projector, television, head mounted display, AR glasses, AR goggles, VR glasses, VR goggles, etc., control information related to the implementation of start-up for connecting to smartphone or tablet or computer or video device V203 may be transmitted by cloud server N720.

Repeater #2 labeled V201_2 then transmits the control information to the target device (in the example illustrated in FIG. 118, luminaire V202_2, or smartphone or tablet or computer or video device V203, or display apparatus V204 such as a display, projector, television, head mounted display, AR glasses, AR goggles, VR glasses, VR goggles, etc.) (Q405). In particular, in this example, repeater #2 labeled V201_2 transmits the above-described control information to luminaire V202_2 and display apparatus V204 such as a display, projector, television, head mounted display, AR glasses, AR goggles, VR glasses, VR goggles, etc.

In response, the target device carries out control based on the control information, and ends control (Q406).

Repeater #2 labeled V201_2 then performs the next iteration of sensing (Q401).

On the other hand, consider a case in which repeater #2 labeled V201_2 detects a moving object, including a person, in the home (yes in Q402), uploads, to server Q101 via repeater #1 labeled V201_1, AP labeled N701, and network Q102, information related to in-home status (Q403), but does not obtain control information from server Q101 (no in Q404). Repeater #2 labeled V201_2 then performs the next iteration of sensing (Q401).

As described above, by controlling a device present in the home based on the in-home state, it is possible to achieve the advantageous effect that comfortable, safe living can be provided. Moreover, as a result of a plurality of devices being controlled in coordination with one another in accordance with the sensing, it is possible to achieve the advantageous effect of further improvement in user convenience.

FIG. 59 illustrates a flow chart of one example of operations performed by repeater #1 labeled V201_1 and server Q101.

Repeater #1 labeled V201_1 performs sensing (Q501), and uploads, to server Q101 via AP labeled N701 and network Q102, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Then, the next iteration of repeater #1 labeled V201_1 sensing is performed (Q501).

When server Q101 does not confirm that a new state has been detected (no in Q503), the next iteration of repeater #1 labeled V201_1 sensing is performed (Q501).

FIG. 59 may be considered as a flow chart of one example of operations performed by repeater #2 labeled V201_2 and server Q101.

Repeater #2 labeled V201_2 performs sensing (Q501), and uploads, to server Q101 via AP labeled N701, network Q102, and repeater #1 labeled V201_1, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Then, the next iteration of repeater #2 labeled V201_2 sensing is performed (Q501).

When server Q101 does not confirm that a new state has been detected (no in Q503), the next iteration of repeater #2 labeled V201_2 sensing is performed (Q501).

FIG. 59 may be considered as a flow chart of one example of operations performed by repeater #3 labeled V201_3 and server Q101.

Repeater #3 labeled V201_3 performs sensing (Q501), and uploads, to server Q101 via AP labeled N701 and network Q102, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Then, the next iteration of repeater #3 labeled V201_3 sensing is performed (Q501).

When server Q101 does not confirm that a new state has been detected (no in Q503), the next iteration of repeater #3 labeled V201_3 sensing is performed (Q501).

As described above, by controlling a device present in the home based on the in-home state, it is possible to achieve the advantageous effect that comfortable, safe living can be provided. It is also possible to achieve the advantageous effect that more favorable control is possible by updating information obtained via sensing as needed.

In FIG. 118, AP labeled N701, network labeled Q102, and server Q101 may be configured as a single apparatus. In such cases, network Q102 may be wired or wireless, and thus AP labeled N701 and server Q101 may be connected by wire or wirelessly in the single apparatus.

For example, using device #C labeled N703 and smartphone N731 illustrated in FIG. 118, a user may register information about appliances (including audio equipment N702, luminaire N704, luminaires V202_1, V202_2, and V202_3, smartphone or tablet or computer or video device V203, and display apparatus V204) that are present in the home labeled N700 to server Q101. Moreover, using a device other than these device, a user may register, at least via AP labeled N701, information about appliances (including audio equipment N702, luminaire N704, luminaires V202_1, V202_2, and V202_3, smartphone or tablet or computer or video device V203, and display apparatus V204) that are present in the home labeled N700 to server Q101. In this way, information about appliances present in the home labeled N700 can be registered in server Q101 without performing sensing. Appliances (including audio equipment N702, luminaire N704, luminaires V202_1, V202_2, and V202_3, smartphone or tablet or computer or video device V203, and display apparatus V204) present in the home labeled N700 may transmit radio waves and register the information about the appliances present in the home labeled N700 in server Q101 via AP labeled N701.

Moreover, in FIG. 118, appliances (including audio equipment N702, luminaire N704, device #C labeled N703, luminaires V202_1, V202_2, and V202_3, smartphone or tablet or computer or video device V203, and display apparatus V204) may implement the sensing.

For example, although the terminology "in-home status sensing Q201" is used in FIG. 56, the sensing of the in-home status may be performed by appliances. In this case, one of the devices that uploads information related to in-home status to server Q101 (Q202) is an appliance.

In FIG. 58, the device that performs the sensing (Q401) may be an appliance. Thereafter, the appliance determines whether a moving object, including a person, was detected in the home (Q402), and uploads information related to the in-home status to server Q101 (Q403).

In FIG. 59, the device that performs the sensing (Q501) may be an appliance. Thereafter, the appliance uploads information related to the in-home status to server Q101 (Q502).

It is also possible to implement the following.

As one example, we will focus on luminaire V202_3 illustrated in FIG. 118.

As described above, repeater #3 labeled V201_3 obtains information related to the sensing of luminaire V203_3, by performing sensing. Then, repeater #3 labeled V201_3 transmits the information related to the sensing of luminaire V203_3 to repeater #1 labeled V201_1 and/or repeater #2 labeled V201_2 and/or AP labeled N701 and/or server Q101.

Then, for example, repeater #1 labeled V201_1 also performs sensing to transmit the information related to the sensing of luminaire V203_3 to repeater #2 labeled V201_2 and/or repeater #3 labeled V201_3 and/or AP labeled N701 and/or server Q101.

For example, server Q101 obtains information related to the sensing of luminaire V203_3 transmitted by repeater #3 labeled V201_3 and information related to the sensing of luminaire V203_3 transmitted by repeater #1 labeled V201_1. Cloud server N702 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable.

Similarly, AP labeled N701 obtains information related to the sensing of luminaire V203_3 transmitted by repeater #3 labeled V201_3 and information related to the sensing of luminaire V203_3 transmitted by repeater #1 labeled V201_1. AP labeled N701 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable. AP labeled N701 may transmit information indicating the triangulation result to server Q101.

Assume repeater #2 labeled V201_2 has obtained the information related to the sensing of luminaire V203_3 transmitted by repeater #3 labeled V201_3 and the information related to the sensing of luminaire V203_3 transmitted by repeater #1 labeled V201_1. Repeater #2 labeled V201_2 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable. Repeater #2 labeled V201_2 may transmit information indicating the triangulation result to server Q101.

Repeater #1 labeled V201_1 obtains the information related to the sensing of luminaire V203_3 transmitted by repeater #3 labeled V201_3, and obtains information related to the sensing of luminaire V203_3 generated by itself. Repeater #1 labeled V201_1 can then use the information related to the sensing of luminaire V203_3 transmitted by repeater #3 labeled V201_3 and the information related to the sensing of luminaire V203_3 generated by itself to perform triangulation as described in other embodiments to achieve the advantageous effect that more accurate position information and the like is obtainable. Repeater #1 labeled V201_1 may transmit information indicating the triangulation result to server Q101.

Repeater #3 labeled V201_3 obtains the information related to the sensing of luminaire V203_3 transmitted by repeater #1 labeled V201_1, and obtains information related to the sensing of luminaire V203_3 generated by itself. Repeater #3 labeled V201_3 can then use the information related to the sensing of luminaire V203_3 transmitted by repeater #1 labeled V201_1 and the information related to the sensing of luminaire V203_3 generated by itself to perform triangulation as described in other embodiments to achieve the advantageous effect that more accurate position information and the like is obtainable. Repeater #3 labeled V201_3 may transmit information indicating the triangulation result to server Q101.

Although the above describes an example of obtaining information related to the sensing of luminaire V203_3 by sensing, this is only an example; the AP and repeater can transmit, to an AP, a repeater, and a server, information related to the sensing of appliances, information related to the sensing of people, and information related to the sensing of objects present in the home by sensing, may share this information, and as a result of the AP, the repeater, and the server performing triangulation, an advantageous effect whereby a more accurate location of the target object can be obtained.

Although the present embodiment is described using the system configuration illustrated in FIG. 118 as an example, this example is not limiting. For example, a system in which a plurality of APs are present in the home, a system in which no repeaters are present in the home, and a system in which one or more repeaters are present in the home are acceptable. The target objects to be detected and measured by the APs, repeaters, and the like by sensing are not limited to those described in the present embodiment. In FIG. 118, the location where the APs and repeaters are placed is described as inside a home, but this example is not limiting. For example, it is possible to implement the content described in the present embodiment by placing APs and repeaters in a convenience store, a supermarket, a parking lot, a stadium, a hall, a building, inside a building, a station, an airport, a factory, inside an aircraft, inside a ship, inside a car, inside railroads, and the like. Even in such cases, the present embodiment can be carried out in the same manner.

Embodiment 19

In the present embodiment, a variation of Embodiment 18 will be described.

In the present embodiment, a specific example of sensing performed in a space in which an apparatus capable of performing sensing is present will be given.

FIG. 119 illustrates one example of states of apparatuses according to the present embodiment. In FIG. 119, elements that operate the same as in FIG. 117 and FIG. 118 have the same reference signs.

N700 indicates the inside of a home as an example of the space. As illustrated in FIG. 116, for example, access point (AP) N701, audio equipment N702, device N703, which is a terminal such as a smartphone, smart speaker, tablet, computer, or mobile phone or the like, luminaire N704, luminaires V202_1, V202_2, and V202_3, smartphone or tablet or computer or video device V203, and display apparatus V204 such as a display, projector, television, head mounted display, AR glasses, AR goggles, VR glasses, VR goggles, etc., are present in-home space N700. Hereinafter, device N703 will be referred to as device #C. For example, assume server Q101 is present in in-home space N700.

Note that server Q101 may be referred to as an edge server or edge computer. This also applies to FIG. 117.

One characterizing feature in FIG. 119 is that a repeater is present in in-home space N700.

Repeater #1 labeled V201_1 is communicating with devices that have a communication function (excluding a repeater). Here, a device having this communication function communicates with AP labeled N701 via repeater #1 labeled V201_1.

Repeater #2 labeled V201_2 is communicating with devices that have a communication function (excluding a repeater). Here, a device having this communication function communicates with AP labeled N701 via repeater #2 labeled V201_2 and repeater #1 labeled V201_1.

Repeater #3 labeled V201_3 is communicating with devices that have a communication function (excluding a repeater). Here, a device having this communication function communicates with AP labeled N701 via repeater #3 labeled V201_3.

Additionally, repeater #1 labeled V201_1, repeater #2 labeled V201_2, and repeater #3 labeled V201_3 may include a sensing function.

Moreover, in this example, person N705 is living in in-home space N700.

AP labeled N701 is capable of performing sensing and capable of communicating, as described in other embodiments.

For example, AP labeled N701 communicates with audio equipment N702, device #C labeled N703, luminaire N704, repeater #1 labeled V201_1, and repeater #3 labeled V201_3. AP labeled N701 may communicate with other apparatuses as well.

AP labeled N701 is communicating with server Q101 via network Q102.

AP labeled N701 is further communicating with base station N730 via network N710.

Base station N730 is communicating with device N731, which is a terminal such as a smartphone, tablet, computer, or mobile phone or the like. Hereinafter, device N731 will be referred to as device #D.

Moreover, just like in FIG. 117, AP labeled N701 is communicating with cloud server N720 via network 710.

Hereinafter, content that has already been described in other embodiments will be omitted. Accordingly, hereinafter, operations pertaining to repeater #1 labeled V201_1, repeater #2 labeled V201_2, and repeater #3 labeled V201_3 in particular will be described.

Repeater #1 labeled V201_1, repeater #2 labeled V201_2, and repeater #3 labeled V201_3 perform the operations illustrated in FIG. 56. As these operations have already been described, repeated description thereof will be omitted.

For example, repeater #1 labeled V201_1 performs the operations illustrated in FIG. 57.

Repeater #1 labeled V201_1 uploads, to server Q101 via AP labeled N701, information about in-home devices obtained via sensing, such as information about an appliance (including, for example, luminaire V202_1) and information about an electronic device (Q301).

Next, information related to the pairing of an operation performed by an in-home device and sensing performed by repeater #1 labeled V201_1 is uploaded to server Q101 (Q302). The pairing of an operation performed by an in-home device and sensing performed a device capable of sensing (repeater #1 labeled V201_1 in this example) as well as the registering of the pairing, are exemplified in Embodiment 7 and Embodiment 9, and repeated description thereof will be omitted.

Next, server Q101 uploads, to cloud server 720, part or all of information related to the pairing of an operation performed by an in-home device and sensing performed by repeater #1 labeled V201_1. In this way, server Q101 performs some of the signal processing, which can reduce the amount of data to be transmitted, and transmits the data to cloud server N720, thus achieving the advantageous effect of an improvement in data transmission efficiency.

Repeater #2 labeled V201_2 also performs the operations illustrated in FIG. 57.

Repeater #2 labeled V201_2 uploads, to server Q101 via repeater #1 labeled V201_1 and AP labeled N701, information about in-home devices obtained via sensing, such as information about an appliance (including, for example, luminaire V202_2, smartphone or tablet or computer or video device V203, display apparatus V204 such as a display, projector, television, head mounted display, AR glasses, AR goggles, VII glasses, VII goggles, etc.) and information about an electronic device (Q301).

Next, information related to the pairing of an operation performed by an in-home device and sensing performed by repeater #2 labeled V201_2 is uploaded to server Q101 (Q302). The pairing of an operation performed by an in-home device and sensing performed a device capable of sensing (repeater #2 labeled V201_2 in this example) as well as the registering of the pairing, are exemplified in Embodiment 7 and Embodiment 9, and repeated description thereof will be omitted in part.

Next, server Q101 uploads, to cloud server 720, part or all of information related to the pairing of an operation performed by an in-home device and sensing performed by repeater #2 labeled V201_2. In this way, server Q101 performs some of the signal processing, which can reduce the amount of data to be transmitted, and transmits the data to cloud server N720, thus achieving the advantageous effect of an improvement in data transmission efficiency.

Repeater #3 labeled V201_3 also performs the operations illustrated in FIG. 57.

Repeater #3 labeled V201_3 uploads, to server Q101 via AP labeled N701, information about in-home devices obtained via sensing, such as information about an appliance (including, for example, luminaire V202_3) and information about an electronic device (Q301).

Next, information related to the pairing of an operation performed by an in-home device and sensing performed by repeater #3 labeled V201_3 is uploaded to server Q101 (Q302). The pairing of an operation performed by an in-home device and sensing performed a device capable of sensing (repeater #3 labeled V201_3 in this example) as well as the registering of the pairing, are exemplified in Embodiment 7 and Embodiment 9, and repeated description thereof will be omitted.

Next, server Q101 uploads, to cloud server 720, part or all of information related to the pairing of an operation performed by an in-home device and sensing performed by repeater #3 labeled V201_3. In this way, server Q101 performs some of the signal processing, which can reduce the amount of data to be transmitted, and transmits the data to cloud server N720, thus achieving the advantageous effect of an improvement in data transmission efficiency.

FIG. 58 illustrates a flow chart of an example of operations related to the system. Hereinafter, an example of the pairing of luminaire V202_1 and sensing will be given with reference to FIG. 58.

Repeater #1 labeled V201_1 performs sensing (Q401).

As a result of the sensing, repeater #1 labeled V201_1 confirms whether a moving object, including a person, was detected in the home (Q402).

When repeater #1 labeled V201_1 does not detect a moving object, including a person, in the home (no in Q402), the processing returns to the "perform sensing" step Q401.

When repeater #1 labeled V201_1 does detect a moving object, including a person, in the home (yes in Q402), repeater #1 labeled V201_1 uploads, to server Q101 via AP labeled N701 and network Q102, information related to in-home status (Q403).

In response, server Q101 transmits, to repeater #1 labeled V201_1 via AP labeled N701 and network Q102, information related to control of luminaire V202_1. Repeater #1 labeled V201_1 then obtains information related to control (control information) (yes in Q404).

Repeater #1 labeled V201_1 then transmits the control information to the target device (in the example illustrated in FIG. 119, luminaire V202_1) (Q405).

Repeater #1 labeled V201_1 transmits this control information to cloud server N720 via AP labeled N701 and network 710. This enables cloud server N720 to know the state of each device present in in-home space N700.

In response, the target device carries out control based on the control information, and ends control (Q406).

Repeater #1 labeled V201_1 then performs the next iteration of sensing (Q401).

On the other hand, consider a case in which repeater #1 labeled V201_1 detects a moving object, including a person, in the home (yes in Q402), uploads, to server Q101 via AP labeled N701 and network Q102, information related to in-home status (Q403), but does not obtain control information from server Q101 (no in Q404). Repeater #1 labeled V201_1 then performs the next iteration of sensing (Q401).

For example, consider a case in which repeater #1 labeled V201_1 transmits control information to luminaire V202_1 in step Q405. In such cases, server Q101 transmits, to AP labeled N701, information related to the lighting of luminaire V202_1, such as ON/OFF or light emission directionality control, based on information indicating the position of a person or moving object obtained by sensing by repeater #1 labeled V201_1. Via repeater #1 labeled V201_1, AP labeled N701 then transmits information related to ON/OFF or light emission directionality control to luminaire V202_1, and luminaire V202_1 carries out control for turning ON/OFF the lighting or control of the direction of light emission, based on the information related to ON/OFF or light emission directionality control.

Repeater #1 labeled V201_1 transmits, to cloud server N720 via AP labeled N701 and network 710, information related to the lighting of luminaire V202_1, such as ON/OFF or light emission directionality control. This enables cloud server N720 to know the state of each device present in in-home space N700.

FIG. 58 illustrates a flow chart of an example of operations related to the system. Hereinafter, an example of the pairing of luminaire V202_3 and sensing will be given with reference to FIG. 58.

Repeater #3 labeled V201_3 performs sensing (Q401).

As a result of the sensing, repeater #3 labeled V201_3 confirms whether a moving object, including a person, was detected in the home (Q402).

When repeater #3 labeled V201_3 does not detect a moving object, including a person, in the home (no in Q402), the processing returns to the "perform sensing" step Q401.

When repeater #3 labeled V201_3 does detect a moving object, including a person, in the home (yes in Q402), repeater #3 labeled V201_3 uploads, to server Q101 via AP labeled N701 and network Q102, information related to in-home status (Q403).

In response, server Q101 transmits, to repeater #3 labeled V201_3 via AP labeled N701 and network Q102, information related to control of luminaire V202_3. Repeater #3 labeled V201_3 then obtains information related to control (control information) (yes in Q404).

Repeater #3 labeled V201_3 then transmits the control information to the target device (in the example illustrated in FIG. 119, luminaire V202_3) (Q405).

Repeater #3 labeled V201_3 transmits this control information to cloud server N720 via AP labeled N701 and network 710. This enables cloud server N720 to know the state of each device present in in-home space N700.

In response, the target device carries out control based on the control information, and ends control (Q406).

Repeater #3 labeled V201_3 then performs the next iteration of sensing (Q401).

On the other hand, consider a case in which repeater #3 labeled V201_3 detects a moving object, including a person, in the home (yes in Q402), uploads, to server Q101 via AP labeled N701 and network Q102, information related to in-home status (Q403), but does not obtain control information from server Q101 (no in Q404). Repeater #3 labeled V201_3 then performs the next iteration of sensing (Q401).

For example, consider a case in which repeater #3 labeled V201_3 transmits control information to luminaire V202_3 in step Q405. In such cases, server Q101 transmits, to AP labeled N701, information related to the lighting of luminaire V202_3, such as ON/OFF or light emission directionality control, based on information indicating the position of a person or moving object obtained by sensing by repeater #3 labeled V201_3. Via repeater #3 labeled V201_3, AP labeled N701 then transmits information related to ON/OFF or light emission directionality control to luminaire V202_3, and luminaire V202_3 carries out control for turning ON/OFF the lighting or control of the direction of light emission, based on the information related to ON/OFF or light emission directionality control.

Repeater #3 labeled V201_3 transmits, to cloud server N720 via AP labeled N701 and network 710, information related to the lighting of luminaire V202_1, such as ON/OFF or light emission directionality control. This enables cloud server N720 to know the state of each device present in in-home space N700.

FIG. 58 illustrates a flow chart of an example of operations related to the system. Hereinafter, with reference to FIG. 58, an example of pairing of luminaire V202_2 and sensing, an example of pairing of smartphone or tablet or computer or video device V203 and sensing, an example of pairing of display apparatus V204 such as a display, projector, television, head mounted display, AR glasses, AR goggles, VII glasses, VII goggles, etc., and sensing will be given.

Repeater #2 labeled V201_2 performs sensing (Q401).

As a result of the sensing, repeater #2 labeled V201_2 confirms whether a moving object, including a person, was detected in the home (Q402).

When repeater #2 labeled V201_2 does not detect a moving object, including a person, in the home (no in Q402), the processing returns to the "perform sensing" step Q401.

When repeater #2 labeled V201_2 does detect a moving object, including a person, in the home (yes in Q402), repeater #2 labeled V201_2 uploads, to server Q101 via AP labeled N701, repeater #1 labeled V201_1, and network Q102, information related to in-home status (Q403).

In response, server Q101 transmits, to repeater #2 labeled V201_2 via AP labeled N701, network Q102, and repeater #1 labeled V201_1, information related to control of smartphone or tablet or computer or video device V203, or information related to control of display apparatus V204 such as a display, projector, television, head mounted display, AR glasses, AR goggles, VR glasses, VR goggles, etc., or information related to control of luminaire V202_2. Repeater #2 labeled V201_2 then obtains information related to control (control information) (yes in Q404).

Repeater #2 labeled V201_2 then transmits the control information to the target device (in the example illustrated in FIG. 119, luminaire V202_2, or smartphone or tablet or computer or video device V203, or display apparatus V204 such as a display, projector, television, head mounted display, AR glasses, AR goggles, VR glasses, VR goggles, etc.) (Q405).

Repeater #2 labeled V201_2 transmits this control information to cloud server N720 via repeater #1 labeled V201_1, AP labeled N701, and network 710. This enables cloud server N720 to know the state of each device present in in-home space N700.

In response, the target device carries out control based on the control information, and ends control (Q406).

Repeater #2 labeled V201_2 then performs the next iteration of sensing (Q401).

On the other hand, consider a case in which repeater #2 labeled V201_2 detects a moving object, including a person, in the home (yes in Q402), uploads, to server Q101 via repeater #1 labeled V201_1, AP labeled N701, and network Q102, information related to in-home status (Q403), but does not obtain control information from server Q101 (no in Q404). Repeater #2 labeled V201_2 then performs the next iteration of sensing (Q401).

For example, consider a case in which repeater #2 labeled V201_2 transmits control information to luminaire V202_2 in step Q405. In such cases, server Q101 transmits, to AP labeled N701, information related to the lighting of luminaire V202_2, such as ON/OFF or light emission directionality control, based on information indicating the position of a person or moving object obtained by sensing by repeater #2 labeled V201_2. Via repeater #1 labeled V201_1 and repeater #2 labeled V201_2, AP labeled N701 then transmits information related to ON/OFF or light emission directionality control to luminaire V202_2, and luminaire V202_2 carries out control for turning ON/OFF the lighting or control of the direction of light emission, based on the information related to ON/OFF or light emission directionality control.

Repeater #2 labeled V201_2 transmits, to cloud server N720 via repeater #1 labeled V201_1, AP labeled N701, and network 710, information related to the lighting of luminaire V202_2, such as ON/OFF or light emission directionality control. This enables cloud server N720 to know the state of each device present in in-home space N700.

For example, consider a case in which repeater #2 labeled V201_2 transmits control information to smartphone or tablet or computer or video device V203 in step Q405. In such cases, server Q101 transmits, to AP labeled N701, information related to, for example, the ON/OFF control of smartphone or tablet or computer or video device V203, based on information indicating the position of a person or moving object obtained by sensing by repeater #2 labeled V201_2. AP labeled N701 transmits, to smartphone or tablet or computer or video device V203 via repeater #1 labeled V201_1 and repeater #2 labeled V201_2, information related to, for example, the ON/OFF control of smartphone or tablet or computer or video device V203, and smartphone or tablet or computer or video device V203 performs ON/OFF control. Although ON/OFF control is used in this example, other control may be performed instead.

Repeater #2 labeled V201_2 transmits the information related to, for example, the ON/OFF control of smartphone or tablet or computer or video device V203 to cloud server N720 via repeater #1 labeled V201_1, AP labeled N701, and network 710. This enables cloud server N720 to know the state of each device present in in-home space N700.

Consider a case in which repeater #2 labeled V201_2 transmits control information to display apparatus V204 such as a display, projector, television, head mounted display, AR glasses, AR goggles, VR glasses, VR goggles, etc., in Q405. In such cases, server Q101 transmits, to AP labeled N701, information related to, for example, the ON/OFF control of display apparatus V204 such as a display, projector, television, head mounted display, AR glasses, AR goggles, VR glasses, VR goggles, etc., based on information indicating the position of a person or moving object obtained by sensing by repeater #2 labeled V201_2. AP labeled N701 transmits, to display apparatus V204 such as a display, projector, television, head mounted display, AR glasses, AR goggles, VR glasses, VR goggles, etc., via repeater #1 labeled V201_1 and repeater #2 labeled V201_2, information related to, for example, the ON/OFF control of display apparatus V204 such as a display, projector, television, head mounted display, AR glasses, AR goggles, VR glasses, VR goggles, etc., and display apparatus V204 such as a display, projector, television, head mounted display, AR glasses, AR goggles, VR glasses, VR goggles, etc., performs ON/OFF control. Although ON/OFF control is used in this example, other control may be performed instead.

Repeater #2 labeled V201_2 transmits the information related to, for example, the ON/OFF control of display apparatus V204 such as a display, projector, television, head mounted display, AR glasses, AR goggles, VR glasses, VR goggles, etc., to cloud server N720 via repeater #1 labeled V201_1, AP labeled N701, and network 710. This enables cloud server N720 to know the state of each device present in in-home space N700.

As described above, by controlling a device present in the home based on the in-home state, it is possible to achieve the advantageous effect that comfortable, safe living can be provided.

Next, other operations will be described with reference to FIG. 58.

For example, repeater #2 labeled V201_2 performs sensing (Q401).

As a result of the sensing, repeater #2 labeled V201_2 confirms whether a moving object, including a person, was detected in the home (Q402).

When repeater #2 labeled V201_2 does not detect a moving object, including a person, in the home (no in Q402), the processing returns to the "perform sensing" step Q401. In particular, the detection of a person and smartphone or tablet or computer or video device V203 is performed. In this example, a stationary appliance is not detected.

When repeater #2 labeled V201_2 does detect a moving object, including a person, in the home (yes in Q402), repeater #2 labeled V201_2 uploads, to server Q101 via AP labeled N701, repeater #1 labeled V201_1, and network Q102, information related to in-home status (Q403). In particular, in this example, repeater #2 labeled V201_2 has detected a person and smartphone or tablet or computer or video device V203 in the home.

In response, server Q101 transmits, to repeater #2 labeled V201_2 via AP labeled N701, network Q102, and repeater #1 labeled V201_1, information related to control of smartphone or tablet or computer or video device V203, or information related to control of display apparatus V204 such as a display, projector, television, head mounted display, AR glasses, AR goggles, VR glasses, VR goggles, etc., or information related to control of luminaire V202_2. Repeater #2 labeled V201_2 then obtains information related to control (control information) (yes in Q404).

In particular, in this example, since a person and smartphone or tablet or computer or video device V203 were detected, server Q101 transmits, to repeater #2 labeled V201_2 via network Q102, AP labeled N701, and repeater #1 labeled V201_1, information related to control of display apparatus V204 such as a display, projector, television, head mounted display, AR glasses, AR goggles, VR glasses, VR goggles, etc., or information related to control of luminaire V202_2.

The information related to control of luminaire V202_2 is as described above.

As information related to control of display apparatus V204 such as a display, projector, television, head mounted display, AR glasses, AR goggles, VR glasses, VR goggles, etc., since smartphone or tablet or computer or video device V203 was detected, in order to enable smartphone or tablet or computer or video device V203 to connect to display apparatus V204 such as a display, projector, television, head mounted display, AR glasses, AR goggles, VR glasses, VR goggles, etc., as information related to control of display apparatus V204 such as a display, projector, television, head mounted display, AR glasses, AR goggles, VR glasses, VR goggles, etc., information for turning display apparatus V204 such as a display, projector, television, head mounted display, AR glasses, AR goggles, VR glasses, VR goggles, etc., ON is transmitted by server Q101. As information related to control of display apparatus V204 such as a display, projector, television, head mounted display, AR glasses, AR goggles, VR glasses, VR goggles, etc., control information related to the implementation of start-up for connecting to smartphone or tablet or computer or video device V203 may be transmitted by cloud server N720.

Repeater #2 labeled V201_2 then transmits the control information to the target device (in the example illustrated in FIG. 119, luminaire V202_2, or smartphone or tablet or computer or video device V203, or display apparatus V204 such as a display, projector, television, head mounted display, AR glasses, AR goggles, VR glasses, VR goggles, etc.) (Q405). In particular, in this example, repeater #2 labeled V201_2 transmits the above-described control information to luminaire V202_2 and display apparatus V204 such as a display, projector, television, head mounted display, AR glasses, AR goggles, VR glasses, VR goggles, etc.

Repeater #2 labeled V201_2 transmits this control information to cloud server N720 via repeater #1 labeled V201_1, AP labeled N701, and network 710. This enables cloud server N720 to know the state of each device present in in-home space N700.

In response, the target device carries out control based on the control information, and ends control (Q406).

Repeater #2 labeled V201_2 then performs the next iteration of sensing (Q401).

On the other hand, consider a case in which repeater #2 labeled V201_2 detects a moving object, including a person, in the home (yes in Q402), uploads, to server Q101 via repeater #1 labeled V201_1, AP labeled N701, and network Q102, information related to in-home status (Q403), but does not obtain control information from server Q101 (no in Q404). Repeater #2 labeled V201_2 then performs the next iteration of sensing (Q401).

As described above, by controlling a device present in the home based on the in-home state, it is possible to achieve the advantageous effect that comfortable, safe living can be provided. Moreover, as a result of a plurality of devices being controlled in coordination with one another in accordance with the sensing, it is possible to achieve the advantageous effect of further improvement in user convenience.

FIG. 59 illustrates a flow chart of one example of operations performed by repeater #1 labeled V201_1 and server Q101.

Repeater #1 labeled V201_1 performs sensing (Q501), and uploads, to server Q101 via AP labeled N701 and network Q102, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Server Q101 sends the updated information to cloud server N720 via AP labeled N701. This enables cloud server N720 to know the state of in-home space N700 in in-home space N700. Then, the next iteration of repeater #1 labeled V201_1 sensing is performed (Q501).

When server Q101 does not confirm that a new state has been detected (no in Q503), the next iteration of repeater #1 labeled V201_1 sensing is performed (Q501).

FIG. 59 may be considered as a flow chart of one example of operations performed by repeater #2 labeled V201_2 and server Q101.

Repeater #2 labeled V201_2 performs sensing (Q501), and uploads, to server Q101 via AP labeled N701, network Q102, and repeater #1 labeled V201_1, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Server Q101 sends the updated information to cloud server N720 via AP labeled N701. This enables cloud server N720 to know the state of in-home space N700 in in-home space N700. Then, the next iteration of repeater #2 labeled V201_2 sensing is performed (Q501).

When server Q101 does not confirm that a new state has been detected (no in Q503), the next iteration of repeater #2 labeled V201_2 sensing is performed (Q501).

FIG. 59 may be considered as a flow chart of one example of operations performed by repeater #3 labeled V201_3 and server Q101.

Repeater #3 labeled V201_3 performs sensing (Q501), and uploads, to server Q101 via AP labeled N701 and network Q102, for example, information indicating in-home status, such as information indicating the number of rooms, information indicating the shape of a room, information on placed objects, such as information indicating the position of furniture, information indicating the shape of furniture, information indicating the position of an appliance, information indicating the shape of an appliance, information indicating the position of an electronic device, information indicating the shape of an electronic device, etc. (Q502).

Server Q101 compares stored information related to in-home status with the newly obtained information related to in-home status. Server Q101 then confirms whether a new state has been detected or not (Q503).

When server Q101 confirms that a new state has been detected (yes in Q503), server Q101 updates the information related to in-home status (Q504). Server Q101 sends the updated information to cloud server N720 via AP labeled N701. This enables cloud server N720 to know the state of in-home space N700 in in-home space N700. Then, the next iteration of repeater #3 labeled V201_3 sensing is performed (Q501).

When server Q101 does not confirm that a new state has been detected (no in Q503), the next iteration of repeater #3 labeled V201_3 sensing is performed (Q501).

The following is possible.

Smartphone N731 illustrated in FIG. 119 can connect to cloud server N720 via base station N730 and network N710. Accordingly, the user can access cloud server N720 via smartphone N731 and know information on each device present in in-home space N700 (smartphone N731 obtains this information from cloud server N720).

The user accesses cloud server N720 via smartphone N731 and transmits, to cloud server N720, information for implementing some operation with respect to each device present in in-home space N700.

Thereafter, cloud server N720 transmits, for example, information for implementing some operation with respect to each device present in in-home space N700 via, for example, AP labeled N701, repeater #1 labeled V201_1, repeater #2 labeled V201_2, repeater #3 labeled V201_3, and server Q101 to each device present in in-home space N700, and each device present in in-home space N700 executes an operation based on this information.

As described above, by controlling a device present in the home based on the in-home state, it is possible to achieve the advantageous effect that comfortable, safe living can be provided. It is also possible to achieve the advantageous effect that more favorable control is possible by updating information obtained via sensing as needed.

In FIG. 119, AP labeled N701, network labeled Q102, and server Q101 may be configured as a single apparatus. In such cases, network Q102 may be wired or wireless, and thus AP labeled N701 and server Q101 may be connected by wire or wirelessly in the single apparatus.

For example, using device #C labeled N703 and smartphone N731 illustrated in FIG. 119, a user may register information about appliances (including audio equipment N702, luminaire N704, luminaires V202_1, V202_2, and V202_3, smartphone or tablet or computer or video device V203, and display apparatus V204) that are present in the home labeled N700 to server Q101. Moreover, using a device other than these device, a user may register, at least via AP labeled N701, information about appliances (including audio equipment N702, luminaire N704, luminaires V202_1, V202_2, and V202_3, smartphone or tablet or computer or video device V203, and display apparatus V204) that are present in the home labeled N700 to server Q101. In this way, information about appliances present in the home labeled N700 can be registered in server Q101 without performing sensing. Appliances (including audio equipment N702, luminaire N704, luminaires V202_1, V202_2, and V202_3, smartphone or tablet or computer or video device V203, and display apparatus V204) present in the home labeled N700 may transmit radio waves and register the information about the appliances present in the home labeled N700 in server Q101 via AP labeled N701.

Moreover, in FIG. 119, appliances (including audio equipment N702, luminaire N704, device #C labeled N703, luminaires V202_1, V202_2, and V202_3, smartphone or tablet or computer or video device V203, and display apparatus V204) may implement the sensing.

For example, although the terminology "in-home status sensing Q201" is used in FIG. 56, the sensing of the in-home status may be performed by appliances. In this case, one of the devices that uploads information related to in-home status to server Q101 (Q202) is an appliance.

In FIG. 58, the device that performs the sensing (Q401) may be an appliance. Thereafter, the appliance determines whether a moving object, including a person, was detected in the home (Q402), and uploads information related to the in-home status to server Q101 (Q403).

In FIG. 59, the device that performs the sensing (Q501) may be an appliance. Thereafter, the appliance uploads information related to the in-home status to server Q101 (Q502).

It is also possible to implement the following.

As one example, we will focus on luminaire V202_3 illustrated in FIG. 119.

As described above, repeater #3 labeled V201_3 obtains information related to the sensing of luminaire V203_3, by performing sensing. Then, repeater #3 labeled V201_3 transmits the information related to the sensing of luminaire V203_3 to repeater #1 labeled V201_1 and/or repeater #2 labeled V201_2 and/or AP labeled N701 and/or server Q101 and/or cloud server N720.

Then, for example, repeater #1 labeled V201_1 also performs sensing to transmit the information related to the sensing of luminaire V203_3 to repeater #2 labeled V201_2 and/or repeater #3 labeled V201_3 and/or AP labeled N701 and/or server Q101 and/or cloud server N720.

For example, server Q101 obtains information related to the sensing of luminaire V203_3 transmitted by repeater #3 labeled V201_3 and information related to the sensing of luminaire V203_3 transmitted by repeater #1 labeled V201_1. Cloud server N702 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable. Server Q101 may transmit information indicating the triangulation result to cloud server N720.

Similarly, cloud server N720 obtains information related to the sensing of luminaire V203_3 transmitted by repeater #3 labeled V201_3 and information related to the sensing of luminaire V203_3 transmitted by repeater #1 labeled V201_1. Cloud server N702 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable. Note that cloud server N720 may transmit information indicating the triangulation result to server Q101.

AP labeled N701 obtains information related to the sensing of luminaire V203_3 transmitted by repeater #3 labeled V201_3 and information related to the sensing of luminaire V203_3 transmitted by repeater #1 labeled V201_1. AP labeled N701 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable. AP labeled N701 may transmit information indicating the triangulation result to server Q101 and cloud server N720.

Assume repeater #2 labeled V201_2 has obtained the information related to the sensing of luminaire V203_3 transmitted by repeater #3 labeled V201_3 and the information related to the sensing of luminaire V203_3 transmitted by repeater #1 labeled V201_1. Repeater #2 labeled V201_2 can then use the information related to the sensing of luminaire V203_3 transmitted by repeater #3 labeled V201_3 and the information related to the sensing of luminaire V203_3 transmitted by repeater #1 labeled V201_1 to perform triangulation as described in other embodiments to achieve the advantageous effect that more accurate position information and the like is obtainable. Repeater #2 labeled V201_2 may transmit information indicating the triangulation result to server Q101 and cloud server N720.

Repeater #1 labeled V201_1 obtains the information related to the sensing of luminaire V203_3 transmitted by repeater #3 labeled V201_3, and obtains information related to the sensing of luminaire V203_3 generated by itself. Repeater #1 labeled V201_1 can then use the information related to the sensing of luminaire V203_3 transmitted by repeater #3 labeled V201_3 and the information related to the sensing of luminaire V203_3 generated by itself to perform triangulation as described in other embodiments to achieve the advantageous effect that more accurate position information and the like is obtainable. Repeater #1 labeled V201_1 may transmit information indicating the triangulation result to server Q101 and cloud server N720.

Repeater #3 labeled V201_3 obtains the information related to the sensing of luminaire V203_3 transmitted by repeater #1 labeled V201_1, and obtains information related to the sensing of luminaire V203_3 generated by itself. Repeater #3 labeled V201_3 can then use the information related to the sensing of luminaire V203_3 transmitted by repeater #1 labeled V201_1 and the information related to the sensing of luminaire V203_3 generated by itself to perform triangulation as described in other embodiments to achieve the advantageous effect that more accurate position information and the like is obtainable. Repeater #3 labeled V201_3 may transmit information indicating the triangulation result to server Q101 and cloud server N720.

Although the above describes an example of obtaining information related to the sensing of luminaire V203_3 by sensing, this is only an example; the AP and repeater can transmit, to an AP, a repeater, a server, and a cloud server, information related to the sensing of appliances, information related to the sensing of people, and information related to the sensing of objects present in the home by sensing, may share this information, and as a result of the AP, the repeater, the server, and the cloud server performing triangulation, an advantageous effect whereby a more accurate location of the target object can be obtained.

Although the present embodiment is described using the system configuration illustrated in FIG. 119 as an example, this example is not limiting. For example, a system in which a plurality of APs are present in the home, a system in which no repeaters are present in the home, and a system in which one or more repeaters are present in the home are acceptable. The target objects to be detected and measured by the APs, repeaters, and the like by sensing are not limited to those described in the present embodiment. In FIG. 119, the location where the APs and repeaters are placed is described as inside a home, but this example is not limiting. For example, it is possible to implement the content described in the present embodiment by placing APs and repeaters in a convenience store, a supermarket, a parking lot, a stadium, a hall, a building, inside a building, a station, an airport, a factory, inside an aircraft, inside a ship, inside a car, inside railroads, and the like. Even in such cases, the present embodiment can be carried out in the same manner.

Embodiment 20

In other embodiments, apparatuses that transmit signals for sensing are described. Here, modulated signals transmitted by such apparatuses will be described.

FIG. 120 illustrates an example of a sensing system or a sensing and communication system in the present embodiment.

1_1$^{th}$ apparatus W101_1 and 1_2$^{th}$ apparatus W101_2 are apparatuses that can perform sensing and (wireless) communication.

Second apparatus W102 requests either 1_1$^{th}$ apparatus W101_1 or 1_2$^{th}$ apparatus W101_2 to sense target (object) W103.

For example, consider a case in which second apparatus W102 requests 1_1$^{th}$ apparatus W101_1 to sense target (object) W103.

FIG. 121 illustrates an example of the configuration of information W201 related to sensing capability transmitted by 1_1$^{th}$ apparatus W101_1 and 1_2$^{th}$ apparatus W101_2 in FIG. 120. The base station may transmit control information including information W201 related to sensing capability using, for example, a physical broadcast channel (PBCH), a physical downlink shared channel (PDSCH), and a physical downlink control channel (PDCCH), for example. The channel used to transmit this control information is not limited these examples.

As illustrated in FIG. 121, information W201 related to sensing capability includes at least one of information W211 related to whether sensing can be performed or not, information W212 related to whether the sensing request from second apparatus W102 can be implemented or not, or information W213 related to whether the sensing request from second apparatus W102 can be accepted or not.

Next, specific examples will be given of information W211 related to whether sensing can be performed or not, information W212 related to whether the sensing request from second apparatus W102 can be implemented or not, and information W213 related to whether the sensing request from second apparatus W102 can be accepted or not. Information W211 Related to Whether Sensing can be Performed or not Information W211 related to whether sensing can be performed or not is information for a base station to notify, for example, a terminal, a repeater, or another base station (in the example illustrated in FIG. 120, for example, second apparatus W102; 1_Xth apparatus W101_1 is also acceptable, where X=1 or 2) of whether sensing can be implemented or not.

Accordingly, when information W211 related to whether sensing can be performed or not includes at least information indicating that sensing can be implemented, this indicates that 1_1$^{th}$ apparatus W101_1 and 1_2$^{th}$ apparatus W101_2 include a sensing function. This also indicates that 1_1$^{th}$ apparatus W101_1 and 1_2$^{th}$ apparatus W101_2 include a communication function. Since the relevant configurations have already been described in detail in other embodiments, repeated description will be omitted. Information W212 Related to Whether the Sensing Request from Second Apparatus W102 can be Implemented or not Information W212 related to whether the sensing request from second apparatus W102 can be implemented or not is information for notifying, for example, second apparatus W102, of information indicating whether 1_X$^{th}$ apparatus can implement sensing or not, when 1_X$^{th}$ apparatus receives a sensing request (a request from a terminal for 1_X$^{th}$ apparatus to perform sensing) from second apparatus W102.

Although this information is named "information W212 related to whether the sensing request from second apparatus W102 can be implemented or not" here, information W212 related to whether the sensing request from second apparatus W102 can be implemented or not may be information related to whether the sensing request from an apparatus other than second apparatus W102, such as a repeater or another base station, can be implemented or not. Information W213 Related to Whether the Sensing Request from Second Apparatus W102 can be Accepted or not Information W213 related to whether the sensing request from second apparatus W102 can be accepted or not is information for notifying, for example, second apparatus W102, of information indicating whether 1_X$^{th}$ apparatus can accept the sensing request from second apparatus W102 or not, when 1_X$^{th}$ apparatus receives a sensing request (a request from second apparatus W102 for 1_X$^{th}$ apparatus to perform sensing) from second apparatus W102.

Accordingly, even when $1\_X^{th}$ apparatus is requested to perform sensing by second apparatus W102, $1\_X^{th}$ apparatus is equipped with modes for when $1\_X^{th}$ apparatus can accept the request and cannot accept the request.

Although this information is named "information W213 related to whether the sensing request from second apparatus W102 can be accepted or not", information W213 related to whether the sensing request from second apparatus W102 can be accepted or not may be information related to whether the sensing request from an apparatus other than second apparatus W102, such as a repeater or another base station, can be accepted or not.

By doing the above, $1\_X^{th}$ apparatus and second apparatus W102 and the like can know the capability of sensing of the $1\_X^{th}$ apparatus and the state of the sensing request, and can thus achieve the advantageous effect of being able to perform suitable control related to sensing and communication with the $1\_X^{th}$ apparatus.

Although the apparatus that transmits information W201 related to sensing capability illustrated in FIG. 121 is exemplified as the $1\_X^{th}$ apparatus, this example is not limiting. For example, information W201 related to sensing capability may be transmitted by a communication apparatus such as a base station, a repeater, a terminal, or an access point.

Moreover, although the terminology "the sensing request from second apparatus W102" is used in "information W212 related to whether the sensing request from second apparatus W102 can be implemented or not" and "information W213 related to whether the sensing request from second apparatus W102 can be accepted or not", which are transmitted by an apparatus that transmits information W201 related to sensing capability illustrated in FIG. 121, the sensing request may be from a communication apparatus other than second apparatus W102, such as a base station, a repeater, an access point, or a terminal. Accordingly, W212 can be implemented as "information related to whether the sensing request from a communication apparatus can be implemented or not" and W213 can be implemented as "information related to whether the sensing request from a communication apparatus can be accepted or not".

Next, a method of estimating the position of target W103 in FIG. 120 will be described.

Second apparatus W102 obtains information W201 related to sensing capability illustrated in FIG. 121 transmitted by $1\_1^{th}$ apparatus W101_1 and $1\_2^{th}$ apparatus W101_2, and thus knows whether $1\_1^{th}$ apparatus W101_1 and $1\_2^{th}$ apparatus W101_2 supports sensing or not. Hereinafter, as one example, it is assumed that both $1\_1^{th}$ apparatus W101_1 and $1\_2^{th}$ apparatus W101_2 are capable of implementing sensing, and when there is a sensing request from second apparatus W102, both $1\_1^{th}$ apparatus W101_1 and $1\_2^{th}$ apparatus W101_2 are capable of implementing sensing operations in response to the request to implement sensing.

FIG. 122 illustrates an example of operations performed by $1\_1^{th}$ apparatus W101_1 and second apparatus W102. In this example, second apparatus W102 is requesting $1\_1^{th}$ apparatus W101_1 to implement estimation of the position and the like of target (object) W103.

As illustrated in FIG. 122, second apparatus W102 transmits, to $1\_1^{th}$ apparatus W101_1, a request to sense target (object) W103 (W301).

$1\_1^{th}$ apparatus W101_1 receives this information. $1\_1^{th}$ apparatus W101_1 then transmits information indicating whether $1\_1^{th}$ apparatus W101_1 will sense target (object)

W103 or not (W311). This example will assume that $1\_1^{th}$ apparatus W101_1 accepts the sensing request.

To sense target (object) W103, $1\_1^{th}$ apparatus W101_1 transmits a signal for sensing (W312).

$1\_1^{th}$ apparatus W101_1 receives the signal for sensing and, for example, estimates the position of target (object) W103 (W313).

Although $1\_1^{th}$ apparatus W101_1 is exemplified as estimating a position, $1\_1^{th}$ apparatus W101_1 may estimate something other than a position, such as the shape of target (object) W103, a solid substance composing target (object) W103, a group of points of target (object) W103, an extracted part of target (object) W103, movement of target (object) W103, movement of a group of points of target (object) W103, and movement of an extracted part of target (object) W103. Since estimation methods used in such cases have already been described in other embodiments, repeated description will be omitted.

$1\_1^{th}$ apparatus W101_1 transmits information indicating the estimation result obtained in W313 to second apparatus W102.

Second apparatus W102 receives this information indicating the estimation result (W303).

When it is not necessary for the information indicating the estimation result obtained in W313 to be shared with second apparatus W102, $1\_1^{th}$ apparatus W101_1 need not transmit the information indicating the estimation result obtained in W313 to second apparatus W102.

By implementing the above, each apparatus can obtain information obtained by sensing, which makes it possible to achieve the advantageous effect that it is possible to control another apparatus using information obtained by sensing.

FIG. 123 illustrates an example of operations performed by $1\_1^{th}$ apparatus W101_1, second apparatus W102, and target (object) W103 that differs from the example in FIG. 122. In this example, second apparatus W102 is requesting $1\_1^{th}$ apparatus W101_1 to implement estimation of the position and the like of target (object) W103.

As illustrated in FIG. 123, second apparatus W102 transmits, to $1\_1^{th}$ apparatus W101_1, a request to sense target (object) W103 (W401).

$1\_1^{th}$ apparatus W101_1 receives this information. $1\_1^{th}$ apparatus W101_1 then transmits information indicating whether $1\_1^{th}$ apparatus W101_1 will sense target (object) W103 or not (W411). This example will assume that $1\_1^{th}$ apparatus W101_1 accepts the sensing request. Target (object) W103 transmits a signal for sensing for allowing the $1\_1^{th}$ apparatus to perform sensing (W421).

$1\_1^{th}$ apparatus W101_1 receives the signal for sensing and, for example, estimates the position of target (object) W103 (W412).

Although $1\_1^{th}$ apparatus W101_1 is exemplified as estimating a position, $1\_1^{th}$ apparatus W101_1 may estimate something other than a position, such as the shape of target (object) W103, a solid substance composing target (object) W103, a group of points of target (object) W103, an extracted part of target (object) W103, movement of target (object) W103, movement of group of points of target (object) W103, and movement of an extracted part of target (object) W103. Since estimation methods used in such cases have already been described in other embodiments, repeated description will be omitted.

$1\_1^{th}$ apparatus W101_1 transmits information indicating the estimation result obtained in W412 to second apparatus W102.

Second apparatus W102 receives this information indicating the estimation result (W403).

When it is not necessary for the information indicating the estimation result obtained in W412 to be shared with second apparatus W102, 1_1$^{th}$ apparatus W101_1 need not transmit the information indicating the estimation result obtained in W412 to second apparatus W102.

By implementing the above, each apparatus can obtain information obtained by sensing, which makes it possible to achieve the advantageous effect that it is possible to control another apparatus using information obtained by sensing.

Although 1 lth apparatus W101_1, 1_2$^{th}$ apparatus W101_2, and target (object) W103 transmit a signal for sensing in the above description, this signal may be referred to as a reference signal, a reference symbol, a pilot symbol, a pilot signal, or a preamble. However, the naming is not limited to the above examples.

Hereinafter, configuration examples of apparatuses, namely 1_1$^{th}$ apparatus W101_1, 1_2$^{th}$ apparatus W101_2, and target (object) W103 will be given.

FIG. 124A and FIG. 124B illustrates configuration examples of 1_1$^{th}$ apparatus W101_1, 1_2$^{th}$ apparatus W101_2, and target (object) W103.

Signal generator W502 receives an input of control signal W500 and generates and outputs a signal based on information in control signal W500. Next, specific examples will be given.

First example: for example, when control signal W500 indicates to transmit a modulated signal for communication, signal generator W502 performs processing on data W501 such as error correction coding, modulation (mapping), and processing based on the transmitting method, and transmits a modulated signal as radio waves using at least one antenna port from among antenna ports W505_1 through W505_N. Note that N is an integer greater than or equal to 1.

When control signal W500 indicates to transmit a modulated signal for communication and a signal for sensing, signal generator W502 performs processing data W501 such as error correction coding, modulation (mapping), and processing based on the transmitting method, and transmits a modulated signal as radio waves using at least one antenna port from among antenna ports W505_1 through W505_N, and signal generator W502 generates a signal for sensing and transmits it from antenna port W506 as radio waves.

When control signal W500 indicates to transmit a signal for sensing, signal generator W502 generates a signal for sensing and transmits it from antenna port W506 as radio waves.

When a signal for sensing is transmitted from antenna port 2106, the signal for sensing, for example, reflects off target W510, and the reflected wave reaches antenna port W512 (FIG. 124A).

In the example illustrated in FIG. 124B, the signal for sensing transmitted by W510 reaches antenna port W512.

For example, when control signal W500 indicates to perform demodulation for communication, the modulated signal is received using at least one antenna port from among antenna ports W511_1 through W511_M, and signal processor W515 receives an input of this modulated signal, performs processing such as demodulation, and outputs received data W516. Note that M is an integer greater than or equal to 1.

When control signal W500 indicates to perform demodulation for communication or processing for sensing, the modulated signal is received using at least one antenna port from among antenna ports W511_1 through W511_M, and signal processor W515 receives an input of this modulated signal, performs processing such as demodulation, and outputs received data W516, and signal processor W515 also receives an input of the signal received at antenna port W512, performs processing for sensing, and outputs, for example, target distance information etc., W517.

When control signal W500 indicates to perform processing for sensing, signal processor W515 receives an input of the signal received at antenna port W512, performs processing for sensing, and outputs, for example, target distance information etc., W517.

Although the terminology "outputs, for example, target distance information etc." is used above, something other than distance, such as the shape of the target, a solid substance composing the target, a group of points of the target, an extracted part of the target, movement of the target, movement of a group of points of the target, and movement of an extracted part of the target may be estimated, and estimation information thereof may be output.

In the above example, antenna ports W505_1 through W505_N are transmit antenna ports for communication, and antenna port W506 is a transmit antenna port for sensing. Antenna ports W511_1 through W511_M are receive antenna ports for communication, and antenna port W512 is a receive antenna port for sensing.

FIG. 125A and FIG. 125B illustrate examples of states when 1_1$^{th}$ apparatus W101_1 and 1_2$^{th}$ apparatus W101_2 having the configuration illustrated in FIG. 124A are performing operations for sensing. For example, as illustrated in FIG. 125A, regarding 1_1$^{th}$ apparatus W101_1 and 1_2$^{th}$ apparatus W101_2 having the configuration illustrated in FIG. 124A, the interval for transmission of the signal for sensing is signal transmission interval W601 between time v1 and time v2.

1_1$^{th}$ apparatus W101_1 and 1_2$^{th}$ apparatus W101_2 having the configuration illustrated in FIG. 124A receives a signal in signal transmission interval W601 between time v1 and time v2, performs signal processing, and senses the target. Accordingly, as illustrated in FIG. 125B, in reception-related operations W602 between time v1 and time v2, 1_1$^{th}$ apparatus W101_1 and 1_2$^{th}$ apparatus W101_2 having the configuration illustrated in FIG. 124A perform reception operations related to sensing.

In other words, upon implementing sensing, 1_1$^{th}$ apparatus W101_1 and 1_2$^{th}$ apparatus W101_2 may have time intervals for performing both signal transmission interval operations and signal reception-related operations. Accordingly, it is a possibility that the configuration should include separate antenna ports for communication and for sensing.

Note that an antenna port may be a logical antenna of one or more physical antennas (i.e., an antenna group). Stated differently, an "antenna port" does not necessarily refer to a single physical antenna, and may refer to, for example, an antenna array of a plurality of antennas. For example, whether an antenna port includes a number of physical antennas or not is not stipulated, but the minimum unit that a terminal station can transmit a reference signal may be stipulated. Moreover, regarding the antenna port, a unit or minimum unit of precoding vector or precoding matrix weighting may be stipulated. Note that the above information regarding the antenna port is information related to the entire present specification.

For example, a transmit antenna is provided, and this transmit antenna may be used by a plurality of transmit antenna ports. For example, a receive antenna is provided, and this receive antenna may be used by a plurality of receive antenna ports. Moreover, for example, an antenna may be provided, and this antenna may be used by a plurality of antenna ports. Note that the above information regarding the antenna port is information related to the entire present specification.

Second example: A first mode and a second mode are defined as follows.

First mode (for example, a mode conforming to a first release standard): The first mode is a mode that supports a first communication scheme.

Second mode (for example, a mode conforming to a second release standard): The second mode is a mode that supports a second communication scheme and sensing.

First Case:

In FIG. 124A and FIG. 124B, for example, when control signal W500 indicates to transmit a modulated signal in accordance with the first mode, signal generator W502 performs processing on data W501 such as error correction coding, modulation (mapping), and processing based on the transmitting method, and transmits a modulated signal in accordance with the first mode as radio waves using at least one antenna port from among antenna ports W505_1 through W505_N. Note that N is an integer greater than or equal to 1.

When control signal W500 indicates to transmit a modulated signal and/or a signal for sensing in accordance with the second mode, signal generator W502 performs processing on data W501 such as error correction coding, modulation (mapping), and processing based on the transmitting method, and transmits a modulated signal in accordance with the second mode as radio waves using antenna port W506. Alternatively or additionally, signal generator W502 generates a signal for sensing and transmits it as radio waves from antenna port W506.

When control signal W500 indicates to transmit a modulated signal in accordance with the first mode and transmit a modulated signal and/or a signal for sensing in accordance with the second mode, the following two operations are performed.

(1) Signal generator W502 performs processing on data W501 such as error correction coding, modulation (mapping), and processing based on the transmitting method, and transmits a modulated signal in accordance with the first mode as radio waves using at least one antenna port from among antenna ports W505_1 through 2105_N. Note that N is an integer greater than or equal to 1.

(2) Signal generator W502 performs processing on data W501 such as error correction coding, modulation (mapping), and processing based on the transmitting method, and transmits a modulated signal in accordance with the second mode as radio waves using antenna port W506. Alternatively or additionally, signal generator W502 generates a signal for sensing and transmits it as radio waves from antenna port W506.

In FIG. 124A and FIG. 124B, for example, when control signal W500 indicates to perform demodulation in accordance with the first mode, the modulated signal is received using at least one antenna port from among antenna ports W511_1 through W511_M, and signal processor W515 receives an input of this modulated signal, performs processing such as demodulation, and outputs received data W516 in accordance with the first mode. Note that M is an integer greater than or equal to 1.

When control signal W500 indicates to perform processing in the second mode, signal processor W515 receives an input of the signal received at antenna port W512, performs processing for sensing, and, for example, output target distance information etc., W517. Alternatively or additionally, a modulated signal is received using antenna port W512, and signal processor W515 receives an input of this modulated signal, performs processing such as demodulation, and outputs received data W516 in accordance with the second mode.

When control signal W500 indicates to perform demodulation in the first mode and perform processing in the second mode, the following two operations are performed.

(3) A modulated signal is received using at least one antenna port from among antenna ports W511_1 through W511_M, and signal processor W515 receives an input of this modulated signal, performs processing such as demodulation, and outputs received data W516 in accordance with the first mode.

(4) Signal processor W515 receives an input of a signal received at antenna port W512, performs processing for sensing, and, for example, outputs target distance information etc., W517. Alternatively or additionally, a modulated signal is received using antenna port W512, and signal processor W515 receives an input of this modulated signal, performs processing such as demodulation, and outputs received data W516 in accordance with the second mode.

In the above example, antenna ports W505_1 through W505_N are transmit antenna ports for the first mode, and antenna port W506 is a transmit antenna port for the second mode. Antenna ports W511_1 through W511_M are receive antenna ports for the first mode, and antenna port W512 is a receive antenna port for the second mode.

Second Case:

In FIG. 124A and FIG. 124B, for example, when control signal W500 indicates at least to transmit a modulated signal in accordance with the first mode, signal generator W502 performs processing on data W501 such as error correction coding, modulation (mapping), and processing based on the transmitting method, and transmits a modulated signal in accordance with the first mode as radio waves using at least one antenna port from among antenna ports W505_1 through W505_(N−1). Note that N is an integer greater than or equal to 2.

When control signal W500 indicates to transmit at least a modulated signal for communication in accordance with the second mode, signal generator W502 performs processing on data W501 such as error correction coding, modulation (mapping), and processing based on the transmitting method, and transmits a modulated signal in accordance with the second mode as radio waves using antenna port W505_N.

When control signal W500 indicates to transmit at least a signal for sensing in accordance with the second mode, signal generator W502 generates a signal for sensing and transmits it from antenna port W506 as radio waves.

In FIG. 124A and FIG. 124B, for example, when control signal W500 indicates at least to perform demodulation in accordance with the first mode, the modulated signal is received using at least one antenna port from among antenna ports W511_1 through W511_(M−1), and signal processor W515 receives an input of this modulated signal, performs processing such as demodulation, and outputs received data W516 in accordance with the first mode. Note that M is an integer greater than or equal to 2.

When control signal W500 indicates at least to perform demodulation in the second mode, a modulated signal is received using antenna port W511_M, and signal processor W515 receives an input of this modulated signal, performs processing such as demodulation, and outputs received data W516 in accordance with the second mode.

When control signal W500 indicates at least to perform processing for sensing in the second mode, signal processor W515 receives an input of the signal received at antenna port W512, performs processing for sensing, and outputs, for example, target distance information etc., W517.

In the above example, antenna ports W505_1 through W505_(N-1) are transmit antenna ports for the first mode, antenna port W505_N is a transmit antenna for communication for the second mode, and antenna port W506 is a transmit antenna port for sensing for the second mode. Antenna ports W511_1 through W511_(M-1) are receive antenna ports for the first mode, antenna port W511_M is a receive antenna for communication for the second mode, and antenna port W512 is a receive antenna port for sensing for the second mode.

Third Case:

In FIG. 124A and FIG. 124B, for example, when control signal W500 indicates at least to transmit a modulated signal in accordance with the first mode, signal generator W502 performs processing on data W501 such as error correction coding, modulation (mapping), and processing based on the transmitting method, and transmits a modulated signal in accordance with the first mode as radio waves using at least one antenna port from among antenna ports W505_1 through W505_N. Note that N is an integer greater than or equal to 1.

When control signal W500 indicates to transmit at least a modulated signal for communication in accordance with the second mode, signal generator W502 performs processing on data W501 such as error correction coding, modulation (mapping), and processing based on the transmitting method, and transmits a modulated signal in accordance with the second mode as radio waves using at least one antenna port from among antenna ports W505_1 through W505_N.

When control signal W500 indicates to transmit at least a signal for sensing in accordance with the second mode, signal generator W502 generates a signal for sensing and transmits it from antenna port W506 as radio waves.

In FIG. 124A and FIG. 124B, for example, when control signal W500 indicates at least to perform demodulation in accordance with the first mode, the modulated signal is received using at least one antenna port from among antenna ports W511_1 through W511_M, and signal processor W515 receives an input of this modulated signal, performs processing such as demodulation, and outputs received data W516 in accordance with the first mode. Note that M is an integer greater than or equal to 1.

When control signal W500 indicates at least to perform demodulation in accordance with the second mode, the modulated signal is received using at least one antenna port from among antenna ports W511_1 through W511_M, and signal processor W515 receives an input of this modulated signal, performs processing such as demodulation, and outputs received data W516 in accordance with the second mode.

When control signal W500 indicates at least to perform processing for sensing in the second mode, signal processor W515 receives an input of the signal received at antenna port W512, performs processing for sensing, and outputs, for example, target distance information etc., W517.

In the above example, antenna ports W505_1 through W505_N are transmit antenna ports for the first mode and transmit antenna ports for communication for the second mode, and antenna port W506 is a transmit antenna port for sensing for the second mode. Antenna ports W511_1 through W511_M are receive antenna ports for the first mode and receive antenna ports for communication for the second mode, and antenna port W512 is a receive antenna port for sensing for the second mode.

As described above, by using different antenna ports for communication and sensing, it is possible to achieve the advantageous effect wherein it is possible to achieve both high-quality communication and high-precision sensing.

As described above, configurations of $1\_1^{th}$ apparatus W101_1, $1\_2^{th}$ apparatus W101_2, and target (object) W103 are illustrated in FIG. 124A and FIG. 124B, the method of using the antenna ports thereof have been described above. It goes without saying that the configurations of $1\_1^{th}$ apparatus W101_1, $1\_2^{th}$ apparatus W101_2, and target (object) W103, as well as the method of using the antenna ports thereof can be applied to other embodiments as well.

Although an example of the flow of operations performed by the $1\_1^{th}$ apparatus and the second apparatus is given in FIG. 122, this is merely one example. The order of the operations may differ from the order illustrated in FIG. 122. Although an example of the flow of operations performed by the $1\_1^{th}$ apparatus, the second apparatus, and the target is given in FIG. 123, this is merely one example. The order of the operations may differ from the order illustrated in FIG. 123.

Embodiment 21

In other embodiments, apparatuses that transmit signals for sensing are described. Here, a transmitting method of a signal related to the signal for sensing will be described.

FIG. 126 illustrates one example of the status of sensing and the communication system. $3\_1^{th}$ apparatus W701_1, $3\_2^{th}$ apparatus W701_2, and $3\_3^{th}$ apparatus W701_3 are apparatuses that can transmit a signal for sensing and can perform communication. Target (object) W702 is a target object to be measured by sensing.

An example of the configuration of a signal transmitted by apparatuses that transmit a signal for sensing, which is described in other embodiments, namely $3\_1^{th}$ apparatus W701_1, $3\_2^{th}$ apparatus W701_2, and $3\_3^{th}$ apparatus W701_3 in FIG. 126, is illustrated in FIG. 127. In FIG. 127, frequency is represented on the vertical axis and time is represented on the horizontal axis.

For example, $3\_1^{th}$ apparatus W701_1 illustrated in FIG. 126 measures and estimates target (object) W702 via sensing. Here, as illustrated in FIG. 127, $3\_1^{th}$ apparatus W701_1 transmits control information symbol (control information signal) W801 and symbol for sensing (signal for sensing) W802 using a first frequency region.

FIG. 128A illustrates one example of a configuration of control information symbol W801 illustrated in FIG. 127, and FIG. 128B illustrates one example of a configuration of sensing symbol W802 illustrated in FIG. 127.

As illustrated in FIG. 128A, for example, control information symbol W801 includes information W901 related to signal type, information W902 related to sensing method, and information W903 related to frequency.

Note that control information symbol W801 may be configured to include any one of information W901 related to signal type, information W902 related to sensing method, and information W903 related to frequency.

Specific examples of information W901 related to signal type, information W902 related to sensing method, and information W903 related to frequency are given below.

Information W901 Related to Signal Type:

Information W901 related to signal type is information for $3\_X^{th}$ apparatus W701_X that transmits this information to notify other apparatuses of whether to implement data transmission or implement sensing. In FIG. 126, X is 1 or 2 or 3.

Information W902 Related to Sensing Method:

Information W902 related to sensing method is information for 3_X$^{th}$ apparatus W701_X that transmits this information to notify other apparatuses of whether itself is to implement sensing or it is requesting another apparatus to implement sensing. In FIG. 126, X is 1 or 2 or 3.

Information W903 Related to Frequency:

Information W903 related to frequency is information for 3_X$^{th}$ apparatus W701_X that transmits this information to notify other apparatuses of the frequency range to be used for signal transmission (the number of channels to be used is also acceptable). In FIG. 126, X is 1 or 2 or 3.

As described above, by transmitting the control information described above to another device, it is possible to achieve the advantageous effect that communication and sensing can be performed under suitable conditions by the other device performing suitable control, for example, control of the transmission operation to inhibit signal interference.

Moreover, as illustrated in FIG. 128B, for example, symbol for sensing W802 includes information W911 on an apparatus that transmitted the signal, and reference signal (reference symbol) W912.

Note that symbol for sensing W802 includes at least reference signal (reference symbol) W912.

Specific examples of information W911 on an apparatus that transmitted the signal and reference signal (reference symbol) W912 are given below.

Information W911 on an Apparatus that Transmitted the Signal:

Information W911 on an apparatus that transmitted the signal is a region for transmitting information indicating, for example, a unique number (identification (ID)), that allows another apparatus to identify 3_X$^{th}$ apparatus W701_X that transmitted this information. In FIG. 126, X is 1 or 2 or 3.

For example, assume 3_X$^{th}$ apparatus W701_X transmits a signal including symbol for sensing W802, this signal hits and reflects off a target, and 3_X$^{th}$ apparatus W701_X receives the signal including symbol for sensing W802. Here, by 3_X$^{th}$ apparatus W701_X receiving information W911 on an apparatus that transmitted the signal, it can be determined whether the signal including symbol for sensing W802 is a desired signal or not, which makes it possible to implement accurate sensing.

Reference Signal (Reference Symbol) W912:

Reference signal (reference symbol) W912 is a signal (symbol) that is used by 3_X$^{th}$ apparatus W701_X or another apparatus that transmits this information to implement measurement in sensing.

An example, which differs from the example illustrated in FIG. 127, of the configuration of a signal transmitted by apparatuses that transmit a signal for sensing, which is described in other embodiments, namely 3_1$^{th}$ apparatus W701_1, 3_2$^{th}$ apparatus W701_2, and 3_3$^{th}$ apparatus W701_3 in FIG. 126, is illustrated in FIG. 129. In FIG. 129, frequency is represented on the vertical axis and time is represented on the horizontal axis.

For example, 3_1$^{th}$ apparatus W701_1 illustrated in FIG. 126 measures and estimates target (object) W702 via sensing. Here, as illustrated in FIG. 129, 3_1$^{th}$ apparatus W701_1 uses a first frequency region to transmit control information symbol #1 (control information signal #1) W1001_1 and symbol for sensing #1 (signal for sensing #1) W1002_1.

3_1$^{th}$ apparatus W701_1 illustrated in FIG. 126 measures and estimates another target via sensing. Here, as illustrated in FIG. 129, 3_1$^{th}$ apparatus W701_1 uses a second frequency region to transmit control information symbol #2 (control information signal #2) W1001_2 and symbol for sensing #2 (signal for sensing #2) W1002_2.

Here, the configuration method used for control information symbol #1 (control information signal #1) W1001_1 and control information symbol #2 (control information signal #2) W1001_2 is the same as the configuration method used for control information symbol W801 described with reference to FIG. 128A.

Moreover, the configuration method used for symbol for sensing #1 (signal for sensing #1) W1002_1 and symbol for sensing #2 (signal for sensing #2) W1002_2 is the same as the configuration method used for symbol for sensing W802 described with reference to FIG. 128B.

FIG. 129 illustrates an example of the time intervals in which control information symbol #1 (control information signal #1) W1001_1 and control information symbol #2 (control information signal #2) W1001_2 are present, and the time intervals in which symbol for sensing #1 (signal for sensing #1) W1002_1 and symbol for sensing #2 (signal for sensing #2) W1002_2 are present.

Note that the temporal timing at which control information symbol #1 (control information signal #1) W1001_1 and symbol for sensing #1 (signal for sensing #1) W1002_1 are transmitted and the temporal timing at which control information symbol #2 (control information signal #2) W1001_2 and symbol for sensing #2 (signal for sensing #2) W1002_2 are transmitted are not limited to the example illustrated in FIG. 129. For example, time division may be performed.

Although the first frequency region and the second frequency region are exemplified as adjacent frequency regions in FIG. 129, first frequency region and second frequency region may be arranged discretely on the frequency axis.

An example, which differs from the examples illustrated in FIG. 127 and FIG. 129, of the configuration of a signal transmitted by apparatuses that transmit a signal for sensing, which is described in other embodiments, namely 3_1$^{th}$ apparatus W701_1, 3_2$^{th}$ apparatus W701_2, and 3_3$^{th}$ apparatus W701_3 in FIG. 126, is illustrated in FIG. 130. In FIG. 130, frequency is represented on the vertical axis and time is represented on the horizontal axis.

For example, 3 1th apparatus W701_1 illustrated in FIG. 126 measures and estimates target (object) W702 via sensing. Here, as illustrated in FIG. 130, 3_1$^{th}$ apparatus W701_1 transmits control information symbol #1 (control information signal #1) W1001_1 using the first frequency region and transmits control information symbol #2 (control information signal #2) W1001_2 using the second frequency region, and transmits symbol for sensing W1102 using the first frequency region and the second frequency region.

Here, the configuration method used for control information symbol #1 (control information signal #1) W1001_1 and control information symbol #2 (control information signal #2) W1001_2 is the same as the configuration method used for control information symbol W801 described with reference to FIG. 128A.

Here, the configuration method of symbol for sensing W1102 is the same as the configuration method of symbol for sensing W802 described with reference to FIG. 128B.

FIG. 130 illustrates an example of the time intervals in which control information symbol #1 (control information signal #1) W1001_1 and control information symbol #2 (control information signal #2) W1001_2 are present.

Note that the temporal timing at which control information symbol #1 (control information signal #1) W1001_1 is transmitted and the temporal timing at which control information symbol #2 (control information signal #2) W1001_2 is transmitted are not limited to the example illustrated in FIG. 130. For example, time division may be performed.

Although the first frequency region and the second frequency region are exemplified as adjacent frequency regions in FIG. 130, first frequency region and second frequency region may be arranged discretely on the frequency axis.

Moreover, control information symbol #1 (control information signal #1) W1001_1 and control information symbol #2 (control information signal #2) W1001_2 may include the same data content.

For example, the information related to signal type that is included in control information symbol #1 (control information signal #1) W1001_1 may have the same data content as the information related to signal type that is included in control information symbol #2 (control information signal #2) W1001_2.

Moreover, the information related to sensing method that is included in control information symbol #1 (control information signal #1) W1001_1 may have the same data content as the information related to sensing method that is included in control information symbol #2 (control information signal #2) W1001_2.

Moreover, the information related to frequency that is included in control information symbol #1 (control information signal #1) W1001_1 may have the same data content as the information related to frequency that is included in control information symbol #2 (control information signal #2) W1001_2.

The control information symbol illustrated in FIG. 127, FIG. 128A, FIG. 129, and FIG. 130 may be transmitted from the apparatus using, for example, a physical broadcast channel (PBCH), a physical downlink shared channel (PDSCH), a physical downlink control channel (PDCCH), a physical uplink shared channel (PUSCH), a physical uplink control channel (PUCCH), or a beacon or a preamble.

Next, examples of operations pertaining to the direction of arrival estimation described in other embodiments will be given.

FIG. 131 illustrates one example of the configuration of $1\_1^{th}$ apparatus W101_1, $1\_2^{th}$ apparatus W101_2, and target (object) W103, and operations that are the same as in FIG. 124 have the same reference numbers, and repeated description thereof will be omitted. As illustrated in FIG. 131, $1\_1^{th}$ apparatus W101_1, $1\_2^{th}$ apparatus W101_2, and target (object) W103 include transmit antennas 1202_1 through 1202_L. Note that L is an integer greater than or equal to 1.

A configuration example pertaining to transmit antenna 1202_$i$ ($i$ is an integer greater than or equal to 1 and less than or equal to L) is illustrated in FIG. 132.

As illustrated in FIG. 132, transmit antenna W1302_$i$ includes, for example, four antennas W1304_1, W1304_2, W1304_3, and W1305_4. Although transmit antenna W1302_$i$ is exemplified as including four antennas here, transmit antenna W1302_$i$ is not limited to four antennas, and may include two or more antennas.

Processor W1302 receives inputs of signal W1301 (corresponding to signal W1201_$i$ in FIG. 131) and control signal W1300 (corresponding to control signal W500 in FIG. 131), and when control signal W1300 indicates to transmit a signal for sensing, processor W1302 performs processing for transmission directionality control on signal W1301, and outputs transmission directionality control processed signal W1303_$i$. Note that $i$ is an integer that is greater than or equal to 1 and less than or equal to 4. Moreover, transmission directionality control processed signal W1303_$i$ is output as radio waves from antenna W1304_$i$.

Next, a specific configuration example of the signal for sensing transmitted by $1\_1^{th}$ apparatus W101_1, $1\_2^{th}$ apparatus W101_2, and target (object) W103 will be given.

FIG. 133 illustrates a specific example of frame W1401 included in the signal for sensing that is transmitted by $1\_1^{th}$ apparatus W101_1, $1\_2^{th}$ apparatus W101_2, and target (object) W103.

Frame W1401 included in the signal for sensing includes, for example, signal for sensing W1411_1 transmitted using a first antenna, signal for sensing W1411_2 transmitted using a second antenna, . . . , and signal for sensing W1411_L transmitted using an Lth antenna.

Signal for sensing W1411_1 transmitted using a first antenna is a signal transmitted from transmit antenna W1202_1 of $1\_1^{th}$ apparatus W101_1, $1\_2^{th}$ apparatus W101_2, and target (object) W103.

Signal for sensing W1411_L transmitted using an Lth antenna is a signal transmitted from transmit antenna W1202_L of $1\_1^{th}$ apparatus W101_1, $1\_2^{th}$ apparatus W101_2, and target (object) W103.

In other words, signal for sensing W1411_$i$ transmitted using an $i^{th}$ antenna is a signal transmitted from transmit antenna W1202_$i$ of $1\_1^{th}$ apparatus W101_1, $1\_2^{th}$ apparatus W101_2, and target (object) W103. Note that $i$ is an integer that is greater than or equal to 1 and less than or equal to L.

FIG. 134 illustrates one example of a configuration of signal for sensing W1411_$i$ transmitted using an $i^{th}$ antenna that is illustrated in FIG. 133.

As illustrated in FIG. 134, signal for sensing W1411_$i$ transmitted using the $i^{th}$ antenna includes signal for sensing W1501_1 transmitted using the $i^{th}$ antenna and a first parameter, signal for sensing W1501_2 transmitted using the $i^{th}$ antenna and a second parameter, . . . , and signal for sensing W1501_$z$ transmitted using the $i^{th}$ antenna and a $z^{th}$ parameter. Note that $z$ is an integer greater than or equal to 1 or an integer greater than or equal to 2.

At transmit antenna W1202_$i$ illustrated in FIG. 131 of $1\_1^{th}$ apparatus W101_1, $1\_2^{th}$ apparatus W101_2, and target (object) W103, processor W1302 illustrated in FIG. 132 performs transmission directionality control using the first parameter, generates signal for sensing W1501_1 to be transmitted using the $i^{th}$ antenna and the first parameter, and sensing W1501_1 to be transmitted using the $i^{th}$ antenna and the first parameter is transmitted from antennas W1304_1 through W1304_4 illustrated in FIG. 132. Note that sensing W1501_1 to be transmitted using the $i^{th}$ antenna and the first parameter includes four signals W1303_1, W1303_2, W1303_3, and W13503_4.

At transmit antenna W1202_$i$ illustrated in FIG. 131 of $1\_1^{th}$ apparatus W101_1, $1\_2^{th}$ apparatus W101_2, and target (object) W103, processor W1302 illustrated in FIG. 132 performs transmission directionality control using the second parameter, generates signal for sensing W1501_2 to be transmitted using the $i^{th}$ antenna and the second parameter, and sensing W1501_2 to be transmitted using the $i^{th}$ antenna and the second parameter is transmitted from antennas W1304_1 through W1304_4 illustrated in FIG. 132. Note that sensing W1501_2 to be transmitted using the $i^{th}$ antenna and the second parameter includes four signals W1303_1, W1303_2, W1303_3, and W1303_4.

At transmit antenna W1202_i illustrated in FIG. 131 of 1_1<sup>th</sup> apparatus W101_1, 1_2<sup>th</sup> apparatus W101_2, and target (object) W103, processor W1302 illustrated in FIG. 132 performs transmission directionality control using the z<sup>th</sup> parameter, generates signal for sensing W1501_z to be transmitted using the i<sup>th</sup> antenna and the z<sup>th</sup> parameter, and sensing W1501_z to be transmitted using the i<sup>th</sup> antenna and the z<sup>th</sup> parameter is transmitted from antennas W1304_1 through W1304_4 illustrated in FIG. 132. Note that sensing W1501_z to be transmitted using the i<sup>th</sup> antenna and the z<sup>th</sup> parameter includes four signals W1303_1, W1303_2, W1303_3, and W1303_4.

A configuration example of signal for sensing W1501_j transmitted using the i<sup>th</sup> antenna and a j<sup>th</sup> parameter in FIG. 134 is illustrated in FIG. 135. Note that j is an integer that is greater than or equal to 1 and less than or equal to z.

As illustrated in FIG. 135, signal for sensing 2701_j transmitted using the i<sup>th</sup> antenna and a j<sup>th</sup> parameter includes, for example, antenna information W1601 and parameter information W1602. Although not illustrated in FIG. 135, signal for sensing W1501_j transmitted using the i<sup>th</sup> antenna and the j<sup>th</sup> parameter includes a signal for performing sensing.

Antenna information W1601 includes information that can specify that the i<sup>th</sup> antenna is used (for example, information such as antenna identification (ID) information). Accordingly, an apparatus that receives signal for sensing W1501_j transmitted using the i<sup>th</sup> antenna and the j<sup>th</sup> parameter (this may be the apparatus that transmitted this signal or some other apparatus), can obtain information on the antenna used when 1_1<sup>th</sup> apparatus W101_1, 1_2<sup>th</sup> apparatus W101_2, and/or target (object) W103 transmitted the signal for sensing.

Parameter information W1602 includes information that can specify the parameter used in the transmission directionality control (for example, information such as parameter identification (ID) information). Accordingly, an apparatus that receives signal for sensing W1501_j transmitted using the i<sup>th</sup> antenna and the j<sup>th</sup> parameter (this may be the apparatus that transmitted this signal or some other apparatus), can obtain information on the transmission directionality control parameter used when 1_1<sup>th</sup> apparatus W101_1, 1_2<sup>th</sup> apparatus W101_2, and/or target (object) W103 transmitted the signal for sensing.

1_1<sup>th</sup> apparatus W101_1, 1_2<sup>th</sup> apparatus W101_2, and target (object) W103 may transmit, along with the above information, reference signal (for sensing) W1699 illustrated in FIG. 135. Reference signal W1699 is transmitted using the i<sup>th</sup> antenna and the j<sup>th</sup> parameter.

When another apparatus receives this signal, that apparatus receives any one of signals included in signal for sensing W1501_j transmitted using the i<sup>th</sup> antenna and the j<sup>th</sup> parameter in frame W1401 for sensing that is transmitted by 1_1<sup>th</sup> apparatus W101_1, 1_2<sup>th</sup> apparatus W101_2, and target (object) W103. This apparatus then transmits, as feedback information, antenna information W1601 and parameter information W1602 included in signal for sensing W1501_j transmitted using the i<sup>th</sup> antenna and the j<sup>th</sup> parameter, to 1_1<sup>th</sup> apparatus W101_1, 1_2<sup>th</sup> apparatus W101_2, and target (object) W103.

1_1<sup>th</sup> apparatus W101_1, 1_2<sup>th</sup> apparatus W101_2, and target (object) W103 receive and obtain this feedback information, and thus know the transmission directionality of the signal, i.e., the direction of the signal. Accordingly, it is possible to estimate the direction (of arrival), which makes it possible to achieve the advantageous effect that sensing can be easily implemented based on the direction (of arrival).

Although antenna information W1601 and parameter information W1602 are described separately in FIG. 135, the information may be generated without differentiating between them.

For example, ID ♭1 is assigned to "first antenna, first parameter", ID ♭2 is assigned to "first antenna, second parameter", ID ♭3 is assigned to "second antenna, first parameter", ID ♭4 is assigned to "second antenna, second parameter", . . . , etc.

For example, ID ♭1 information is included in the case of a signal for sensing transmitted using the first antenna and the first parameter, and this signal for sensing transmitted using the first antenna and the first parameter is transmitted from 1_1<sup>th</sup> apparatus W101_1, 1_2<sup>th</sup> apparatus W101_2, and target (object) W103.

For example, ID ♭2 information is included in the case of a signal for sensing transmitted using the first antenna and the second parameter, and this signal for sensing transmitted using the first antenna and the second parameter is transmitted from 1_1<sup>th</sup> apparatus W101_1, 1_2<sup>th</sup> apparatus W101_2, and target (object) W103.

For example, ID ♭3 information is included in the case of a signal for sensing transmitted using the second antenna and the first parameter, and this signal for sensing transmitted using the second antenna and the first parameter is transmitted from 1_1<sup>th</sup> apparatus W101_1, 1_2<sup>th</sup> apparatus W101_2, and target (object) W103.

For example, ID ♭4 information is included in the case of a signal for sensing transmitted using the second antenna and the second parameter, and this signal for sensing transmitted using the second antenna and the second parameter is transmitted from 1_1<sup>th</sup> apparatus W101_1, 1_2<sup>th</sup> apparatus W101_2, and target (object) W103.

This apparatus then transmits, as feedback information, ID information (for example, ID ♭1, ID ♭2, etc.) of signal for sensing W1501_j transmitted using the i<sup>th</sup> antenna and the j<sup>th</sup> parameter, to 1_1<sup>th</sup> apparatus W101_1, 1_2<sup>th</sup> apparatus W101_2, and target (object) W103.

Embodiment 22

In the present embodiment, a variation of Embodiment 9, Embodiment 15, Embodiment 16, Embodiment 17, Embodiment 18, and Embodiment 19 will be described.

FIG. 136 illustrates one example of the system configuration according to the present embodiment. In FIG. 136, operations that are the same as those in FIG. 50, FIG. 55, FIG. 116, FIG. 117, FIG. 118, FIG. 119, etc., have the same reference numbers and have already been described. Accordingly, repeated description thereof will be omitted.

N700 indicates a space, such as a space in a home. However, N700 may be some indoor space other than an in-home space. This also applies to the other embodiments as well. For example, assume server Q101 is present in in-home space N700. Note that server Q101 may be referred to as an edge server or edge computer. Moreover, in this example, person N705 is living in in-home space N700.

In-home system (indoor system) W1700 is present in in-home space N700. In-home system (indoor system) W1700 is configured as a network of, for example, audio equipment, a luminaire, a smartphone, a smart speaker, a tablet, a computer, a video device, a display apparatus, a repeater such as illustrated in, for example, FIG. 50, FIG. 55, FIG. 116, FIG. 117, FIG. 118, and FIG. 119. As specific configuration and operation examples of the network have already been given with reference to, for example, FIG. 50, FIG. 55, FIG. 116, FIG. 117, FIG. 118, and FIG. 119, repeated description thereof will be omitted. Note that in-home system (indoor system) W1700 may include apparatuses and devices other than audio equipment, a luminaire, a smartphone, a smart speaker, a tablet, a computer, a video device, a display apparatus, a repeater such as illustrated in, for example, FIG. 50, FIG. 55, FIG. 116, FIG. 117, FIG. 118, and FIG. 119. For example, in-home system (indoor system) W1700 may include a gateway, a communication apparatus, and an AP.

For example, in-home system W1700 is performing wireless communication with AP (gateway) N701. For example, in-home system W1700 may be performing power line communication (PLC) with AP (gateway) N701.

Communication apparatus W1701, switch #1 labeled W1711, and switch #2 labeled W1712 are present in in-home (indoor) space N700.

For example, communication apparatus W1701 is performing wireless communication with AP (gateway) N701. For example, communication apparatus W1701 may be performing power line communication with AP (gateway) N701. Furthermore, communication apparatus W1701 may be performing wireless communication or power line communication with in-home system W1700.

For example, switch #1 labeled W1711 is performing wireless communication with AP (gateway) N701. For example, switch #1 labeled W1711 may be performing power line communication with AP (gateway) N701. Furthermore, switch #1 labeled W1711 may perform wireless communication or power line communication with in-home system W1700.

Switch #1 labeled W1711 can be controlled to supply or not to supply power to connector (outlet) W1713. Operations for this control will be described in greater detail later.

For example, switch #2 labeled W1712 is performing wireless communication with AP (gateway) N701. For example, switch #2 labeled W1712 may be performing power line communication with AP (gateway) N701. Furthermore, switch #2 labeled W1712 may be performing wireless communication or power line communication with in-home system W1700.

Switch #2 labeled W1712 can be controlled to supply or not supply power to power transmission apparatus W1714. Operations for this control will be described in greater detail later.

Vehicle W1750 is present outside or in a garage. Although a vehicle is used as an example here, instead of a vehicle (automobile), an electric motorcycle (e-motorcycle), an electric kick scooter, a vacuum cleaner, an electric automobile, an electric power-assisted automobile, an electric power-assisted kick scooter, a motorcycle, an automobile, a boat, an airplane, a drone, a baby carriage, an electronic consumer product, an appliance (a household appliance) a computer, a server, a tablet, or a smartphone may be used.

Hereinafter, operations performed when charging the battery included in vehicle W1750 will be described. Charging of the battery included in vehicle W1750 may be performed by connecting the vehicle to connector W1713, or, for example, by proximity to or contact with power transmission apparatus W1714 when wireless power transfer is used.

In the case of the present embodiment, switch #1 labeled W1711 does not supply power to the power line and connector W1713 on the right side of switch #1 labeled W1711, except during the relevant charging operation of vehicle W1750. Similarly, switch #2 labeled W1712 does not supply power to the power line and power transmission apparatus W1714 on the right side of switch #2 labeled W1712, except during the relevant charging operation of vehicle W1750. This achieves the advantageous effect whereby theft of electricity can be prevented. It goes without saying that the power line on the left side of switch #1 labeled W1711 and the power line on the left side of switch #2 labeled W1712 are supplied with power.

Next, operations performed when charging vehicle W1750 will be described.

FIG. 137A illustrates an example of operations performed when charging vehicle W1750 illustrated in FIG. 136. The "sensing apparatus" in FIG. 137A is an apparatus present in in-home space N700, and may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "apparatus" in FIG. 137A may be the sensing apparatus itself, and may be AP (gateway) N701, server Q101, switch #1 labeled W1711, or switch #2 labeled W1712.

The "switch #1" in FIG. 137A is switch #1 labeled W1711 illustrated in FIG. 136, and the "switch #2" in FIG. 137A is switch #2 labeled W1712 illustrated in FIG. 136.

As illustrated in FIG. 137A, the sensing apparatus detects an operation related to person W1799 (that is, for example, outside) who is attempting to charge vehicle W1750 (W1801). What the sensing apparatus detects may be a characterizing feature of the person or a gesture made by the person. What the sensing apparatus detects may be as described in other embodiments.

The sensing apparatus then transmits, to the apparatus, information obtained in the detecting of an operation related to person W1799 in step W1801 (W1802). Note that the communication between the sensing apparatus and the apparatus may be wireless communication, and may be wired communication such as power line communication (however, this example is non-limiting). Moreover, both wired and wireless communication may be used.

The apparatus obtains this information, and implements authentication as to whether the charging of the vehicle being attempted by person W1799 is unauthorized or not (W1811). Examples of the authentication method include extracting a characterizing feature of person W1799 and determining whether the characterizing feature is unauthorized or not, and detecting an action or gesture performed by person W1799 and determining whether the action or gesture is unauthorized or not. Note that the authentication method is not limited to these examples; methods described in other embodiments may be used. Accordingly, the extraction of an operation or characterizing feature related to a person is used as a code or key. The apparatus then transmits information indicating the result of the authentication to switch #1 labeled W1711 and/or switch #2 labeled W1712 (W1812). Note that the communication between the apparatus and the switch may be wireless or wired. Moreover, both wired and wireless communication may be used.

Switch #1 labeled W1711 and/or switch #2 labeled W1712 receive this information indicating the result of the authentication.

When switch #1 labeled W1711 determines to supply power based on the result of the authentication, switch #1 labeled W1711 supplies power to connector (outlet) W1713. When switch #1 labeled W1711 determines to not supply power based on the result of the authentication, switch #1 labeled W1711 does not supply power to connector (outlet) W1713 (W1821).

Similarly, when switch #2 labeled W1712 determines to supply power based on the result of the authentication, switch #2 labeled W1712 supplies power to power transmission apparatus W1714. When switch #2 labeled W1712 determines to not supply power based on the result of the authentication, switch #2 labeled W1712 does not supply power to power transmission apparatus W1714 (W1821).

Next, another method will be described. Assume the default state of switch #1 labeled W1711 is to not supply power to connector (outlet) W1713. Assume the default state of switch #2 labeled W1712 is to not supply power to connector (outlet) W1713.

Assume the apparatus in FIG. 137A determines that the supply of power is not unauthorized as a result of the authentication. In this case, the apparatus transmits, to switch #1 labeled W1711 and/or switch #2 labeled W1712, information indicating to start supplying power as information indicating the result of the authentication (W1812).

Switch #1 labeled W1711 determines to supply power based on the result of the authentication, and supplies power to connector (outlet) W1713 (W1821).

Similarly, switch #2 labeled W1712 determines to supply power based on the result of the authentication, and supplies power to power transmission apparatus W1714 (W1821).

FIG. 137B illustrates an example that differs from the example of FIG. 137A of operations performed when charging vehicle W1750 in FIG. 136.

The sensing apparatus in FIG. 137B is an apparatus present in in-home space N700, and may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "switch #1" in FIG. 137B is switch #1 labeled W1711 illustrated in FIG. 136, and the "switch #2" in FIG. 137B is switch #2 labeled W1712 illustrated in FIG. 136.

As illustrated in FIG. 137B, the sensing apparatus detects an operation related to person W1799 (that is, for example, outside) who is attempting to charge vehicle W1750 (W1801). What the sensing apparatus detects may be a characterizing feature of the person or a gesture made by the person. What the sensing apparatus detects may be as described in other embodiments.

The sensing apparatus then transmits, to switch #1 labeled W1711 and/or switch #2 labeled W1712, information obtained in the detecting of an operation related to person W1799 in step W1801 (W1802). Note that the communication between the sensing apparatus and the switch may be wireless or wired. Moreover, both wired and wireless communication may be used.

Switch #1 labeled W1711 and/or switch #2 labeled W1712 receive this information obtained in the detecting of an operation related to person W1799 in step W1801.

When switch #1 labeled W1711 determines to supply power based on this information obtained in the detecting of an operation related to person W1799 in step W1801, switch #1 labeled W1711 supplies power to connector (outlet) W1713. When switch #1 labeled W1711 determines to not supply power based on this information obtained in the detecting of an operation related to person W1799 in step W1801, switch #1 labeled W1711 does not supply power to connector (outlet) W1713 (W1821).

Similarly, when switch #2 labeled W1712 determines to supply power based on this information obtained in the detecting of an operation related to person W1799 in step W1801, switch #2 labeled W1712 supplies power to power transmission apparatus W1714. When switch #2 labeled W1712 determines to not supply power based on this information obtained in the detecting of an operation related to person W1799 in step W1801, switch #2 labeled W1712 does not supply power to power transmission apparatus W1714 (W1821).

As another method, the sensing apparatus may perform the authentication. For example, the sensing apparatus may determine whether to supply power or not based on the information obtained in the detecting of an operation related to person W1799 in step W1801. The sensing apparatus then transmits information indicating the determination result to switch #1 labeled W1711 and/or switch #2 labeled W1712.

Switch #1 labeled W1711 then determines whether to supply power or not based on this information indicating the determination result.

Similarly, switch #2 labeled W1712 determines whether to supply power or not based on this information indicating the determination result.

Next, another method will be described. Assume the default state of switch #1 labeled W1711 is to not supply power to connector (outlet) W1713. Assume the default state of switch #2 labeled W1712 is to not supply power to connector (outlet) W1713.

Assume the sensing apparatus in FIG. 137B determines that the supply of power is not unauthorized as a result of the authentication. In this case, the sensing apparatus transmits, to switch #1 labeled W1711 and/or switch #2 labeled W1712, information indicating to start supplying power as information indicating the result of the authentication (W1812).

Switch #1 labeled W1711 determines to supply power based on the result of the authentication, and supplies power to connector (outlet) W1713.

Similarly, switch #2 labeled W1712 determines to supply power based on the result of the authentication, and supplies power to power transmission apparatus W1714.

FIG. 137C illustrates an example that differs from the examples of FIG. 137A and FIG. 137B of operations performed when charging vehicle W1750 in FIG. 136.

The sensing apparatus in FIG. 137C is an apparatus present in in-home space N700, and may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "apparatus" in FIG. 137C may be the sensing apparatus itself, and may be AP (gateway) N701, server Q101, switch #1 labeled W1711, or switch #2 labeled W1712.

The "switch #1" in FIG. 137C is switch #1 labeled W1711 illustrated in FIG. 136, and the "switch #2" in FIG. 137C is switch #2 labeled W1712 illustrated in FIG. 136.

FIG. 137C differs from the example illustrated in FIG. 137A in that switch #1 labeled W1711 and/or switch #2 labeled W1712 perform primary authentication W1851. Accordingly, the following will focus on the description of primary authentication W1851, and description of other operations will be omitted as they are the same as described with reference to FIG. 137A.

For example, vehicle W1750 in FIG. 136 is connected to connector (outlet) W1713 via a cable, and vehicle W1750 transmits, to switch #1 labeled W1711 via the cable, connector (outlet) W1719, and the power line, information indicating an identifier (ID) of vehicle W1750 or a key for connection. As illustrated in FIG. 137C, switch #1 labeled W1711 obtains this information and performs authentication for connecting to vehicle W1750 (W1851). If a positive authentication is made, the operation proceeds to the next step.

For example, vehicle W1750 in FIG. 136 transmits, to switch #2 labeled W1712 via power transmission apparatus W1714 and the power line, information indicating an identifier (ID) of vehicle W1750 or a key for connection. As illustrated in FIG. 137C, switch #2 labeled W1712 obtains this information and performs authentication for connecting to vehicle W1750 (W1851). If a positive authentication is made, the operation proceeds to the next step.

As another method, vehicle W1750 includes a communication apparatus, and the communication apparatus included in vehicle W1750 transmits, to a communication apparatus such as base station N730, AP (gateway) N701, communication apparatus W1701, a communication apparatus included in in-home system (indoor system) W1700, switch #1 labeled W1711, or switch #2 labeled W1712, information indicating an identifier (ID) of vehicle W1750 or a key for connection. Then, the communication apparatus such as base station N730, AP (gateway) N701, communication apparatus W1701, a communication apparatus included in in-home system (indoor system) W1700, switch #1 labeled W1711, or switch #2 labeled W1712 forwards, to an authentication apparatus such as AP (gateway) N701, communication apparatus W1701, a communication apparatus included in in-home system (indoor system) W1700, switch #1 labeled W1711, switch #2 labeled W1712, or server Q101, information indicating an identifier (ID) of vehicle W1750 or a key for connection, and the authentication apparatus such as AP (gateway) N701, communication apparatus W1701, a communication apparatus included in in-home system (indoor system) W1700, switch #1 labeled W1711, switch #2 labeled W1712, or server Q101 performs authentication for the connection between vehicle W1750 and connector (outlet) W1713 and/or power transmission apparatus W1714, using the information indicating an identifier (ID) of vehicle W1750 or a key for connection. The authentication apparatus such as AP (gateway) N701, communication apparatus W1701, a communication apparatus included in in-home system (indoor system) W1700, switch #1 labeled W1711, switch #2 labeled W1712, or server Q101 then transmits the result of the authentication to switch #1 labeled W1711 and/or switch #2 labeled W1712, and performs primary authentication (W1851). If a positive authentication is made, the operation proceeds to the next step.

Performing a primary authentication in this way further achieves the advantageous effect that charging of an unauthorized vehicle can be inhibited by performing authentication.

FIG. 137D illustrates an example that differs from the examples of FIG. 137A, FIG. 137B, and FIG. 137C of operations performed when charging vehicle W1750 in FIG. 136.

The sensing apparatus in FIG. 137D is an apparatus present in in-home space N700, and may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "switch #1" in FIG. 137D is switch #1 labeled W1711 illustrated in FIG. 136, and the "switch #2" in FIG. 137D is switch #2 labeled W1712 illustrated in FIG. 136.

FIG. 137D differs from the example illustrated in FIG. 137B in that switch #1 labeled W1711 and/or switch #2 labeled W1712 perform primary authentication W1851. Accordingly, the following will focus on the description of primary authentication W1851, and description of other operations will be omitted as they are the same as described with reference to FIG. 137B.

For example, vehicle W1750 in FIG. 136 is connected to connector (outlet) W1713 via a cable, and vehicle W1750 transmits, to switch #1 labeled W1711 via the cable, connector (outlet) W1719, and power line, information indicating an identifier (ID) of vehicle W1750 or a key for connection. As illustrated in FIG. 137D, switch #1 labeled W1711 obtains this information and performs authentication for connecting to vehicle W1750 (W1851). If a positive authentication is made, the operation proceeds to the next step.

For example, vehicle W1750 in FIG. 136 transmits, to switch #2 labeled W1712 via power transmission apparatus W1714 and the power line, information indicating an identifier (ID) of vehicle W1750 or a key for connection. As illustrated in FIG. 137D, switch #2 labeled W1712 obtains this information and performs authentication for connecting to vehicle W1750 (W1851). If a positive authentication is made, the operation proceeds to the next step.

As another method, vehicle W1750 includes a communication apparatus, and the communication apparatus included in vehicle W1750 transmits, to a communication apparatus such as a communication apparatus, switch #1 labeled W1711, or switch #2 labeled W1712 included in base station N730, AP (gateway) N701, communication apparatus W1701, and in-home system (indoor system) W1700, information indicating an identifier (ID) of vehicle W1750 or a key for connection. Then, the communication apparatus such as base station N730, AP (gateway) N701, communication apparatus W1701, a communication apparatus included in in-home system (indoor system) W1700, switch #1 labeled W1711, or switch #2 labeled W1712 forwards, to an authentication apparatus such as AP (gateway) N701, communication apparatus W1701, a communication apparatus included in in-home system (indoor system) W1700, switch #1 labeled W1711, switch #2 labeled W1712, or server Q101, information indicating an identifier (ID) of vehicle W1750 or a key for connection, and the authentication apparatus such as AP (gateway) N701, communication apparatus W1701, a communication apparatus included in in-home system (indoor system) W1700, switch #1 labeled W1711, switch #2 labeled W1712, or server Q101 performs authentication for the connection between vehicle W1750 and connector (outlet) W1713 and/or power transmission apparatus W1714, using the information indicating an identifier (ID) of vehicle W1750 or a key for connection. The authentication apparatus such as AP (gateway) N701, communication apparatus W1701, a communication apparatus included in in-home system (indoor system) W1700, switch #1 labeled W1711, switch #2 labeled W1712, or server Q101 then transmits the result of the authentication to switch #1 labeled W1711 and/or switch #2 labeled W1712, and performs primary authentication (W1851). If a positive authentication is made, the operation proceeds to the next step.

Performing a primary authentication in this way achieves the advantageous effect that charging of an unauthorized vehicle can be inhibited by performing authentication.

As described with reference to FIG. 137A, FIG. 137B, FIG. 137C, and FIG. 137D, by detecting a characterizing feature of person W1799 in FIG. 136 and/or a gesture made by person W1799 using a sensing apparatus present in an in-home (indoor) space, there is no need to provide an apparatus such as a sensing apparatus that uses electricity outdoors, whereby it is possible to achieve the advantageous effect that the possibility of electricity theft can be reduced. Furthermore, since the apparatus such as a sensing apparatus that uses electricity is in an in-home (indoor) space, sealing for protecting against dust and water is not necessary for the apparatus and the power system, which achieves the advantageous effect that it is possible to reduce the cost of the apparatus.

Next, an example of operations for ending charging when vehicle W1750 illustrated in FIG. 136 starts the charging process described above will be given.

FIG. 138A illustrates an example of operations performed when ending the charging of vehicle W1750 illustrated in FIG. 136.

The sensing apparatus in FIG. 138A is an apparatus present in in-home space N700, and may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "apparatus" in FIG. 138A may be the sensing apparatus itself, and may be AP (gateway) N701, server Q101, switch #1 labeled W1711, or switch #2 labeled W1712.

The "switch #1" in FIG. 138A is switch #1 labeled W1711 illustrated in FIG. 136, and the "switch #2" in FIG. 138A is switch #2 labeled W1712 illustrated in FIG. 136.

As illustrated in FIG. 138A, the sensing apparatus ends the charging of vehicle W1750. The sensing apparatus then detects an operation related to person W1799 (who is outside, for example) (W1901). What the sensing apparatus detects may be a characterizing feature of the person or a gesture made by the person. What the sensing apparatus detects may be as described in other embodiments.

The sensing apparatus then transmits, to the apparatus, information obtained in the detecting of an operation related to person W1799 in step W1901 (W1902). Note that the communication between the sensing apparatus and the apparatus may be wireless communication, and may be wired communication such as power line communication (however, this example is non-limiting). Moreover, both wired and wireless communication may be used.

The apparatus obtains this information, and implements authentication as to whether the completion of the charging of the vehicle being attempted by person W1799 is correct work or not (W1911). Examples of the authentication method include extracting a characterizing feature of person W1799 and determining, and detecting an action or gesture performed by person W1799 and determining. Note that the authentication method is not limited to these examples; methods described in other embodiments may be used. Accordingly, the extraction of an operation or characterizing feature related to a person is used as a code or key.

The apparatus then transmits information indicating the result of the authentication to switch #1 labeled W1711 and/or switch #2 labeled W1712 (W1912). Note that the communication between the apparatus and the switch may be wireless or wired. Moreover, both wired and wireless communication may be used.

Switch #1 labeled W1711 and/or switch #2 labeled W1712 receive this information indicating the result of the authentication.

When switch #1 labeled W1711 determines to stop the supply of power based on the result of the authentication, switch #1 labeled W1711 stops the supply of power to connector (outlet) W1713 (W1921).

Similarly, when switch #2 labeled W1712 determines to stop the supply of power based on the result of the authentication, switch #2 labeled W1712 stops the supply of power to power transmission apparatus W1714 (W1921).

FIG. 138B illustrates an example that differs from the example of FIG. 138A of operations for ending charging vehicle W1750 in FIG. 136.

The sensing apparatus in FIG. 138B is an apparatus present in in-home space N700, and may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "switch #1" in FIG. 138B is switch #1 labeled W1711 illustrated in FIG. 136, and the "switch #2" in FIG. 138B is switch #2 labeled W1712 illustrated in FIG. 136.

As illustrated in FIG. 138B, the sensing apparatus ends the charging of vehicle W1750. The sensing apparatus then detects an operation related to person W1799 (who is outside, for example) (W1901). What the sensing apparatus detects may be a characterizing feature of the person or a gesture made by the person. What the sensing apparatus detects may be as described in other embodiments.

The sensing apparatus then transmits, to switch #1 labeled W1711 and/or switch #2 labeled W1712, information obtained in the detecting of an operation related to person W1799 in step W1901 (W1902). Note that the communication between the sensing apparatus and the switch may be wireless or wired. Moreover, both wired and wireless communication may be used.

Switch #1 labeled W1711 and/or switch #2 labeled W1712 receive this information obtained in the detecting of an operation related to person W1799 in step W1901.

When switch #1 labeled W1711 determines to stop the supply of power based on this information obtained in the detecting of an operation related to person W1799 in step W1901, switch #1 labeled W1711 stops supplying power to connector (outlet) W1713 (W1921).

Similarly, when switch #2 labeled W1712 determines to stop the supply of power based on this information obtained in the detecting of an operation related to person W1799 in step W1901, switch #2 labeled W1712 stops supplying power to power transmission apparatus W1714 (W1921).

As another method, the sensing apparatus may perform the authentication. For example, the sensing apparatus may determine whether to stop the supply of power or not based on the information obtained in the detecting of an operation related to person W1799 in step W1901. The sensing apparatus then transmits information indicating the determination result to switch #1 labeled W1711 and/or switch #2 labeled W1712.

Switch #1 labeled W1711 then determines whether to stop the supply of power or not based on this information indicating the determination result.

Similarly, switch #2 labeled W1712 determines whether to stop the supply of power or not based on this information indicating the determination result.

Methods of stopping the supply of power other than the methods described with reference to FIG. 138A and FIG. 138B include, for example, switch #1 labeled W1711 stopping the supply of power when a power supply time set by a timer is exceeded. Similarly, switch #2 labeled W1712 may stop the supply of power when a power supply time set by a timer is exceeded. Note that switch #1 labeled W1711 and switch #2 labeled W1712 may include the timer, a device other than switch #1 labeled W1711 and switch #2 labeled W1712 may include the timer and this device may notify switch #1 labeled W1711 and switch #2 labeled W1712 of time information and control information and the like.

Moreover, vehicle W1750 may recognize that the charging is complete and transmit information related to the completion of the charging to switch #1 labeled W1711, and switch #1 labeled W1711 may stop the supply of power. Similarly, vehicle W1750 may recognize that the charging is complete and transmit information related to the completion of the charging to switch #2 labeled W1712, and switch #2 labeled W1712 may stop the supply of power.

Note that vehicle W1750 may recognize that the charging is complete and transmit information related to the completion of the charging to a communication apparatus other than switch #1 labeled W1711 and switch #2 labeled W1712. This communication apparatus may transmit the information related to the completion of the charging to switch #1 labeled W1711 and switch #2 labeled W1712 over a network and switch #1 labeled W1711 and switch #2 labeled W1712 may stop the supply of power.

Stopping the charging as described above makes it possible to interrupt power as desired by a user (person) and makes it possible to achieve the advantageous effect that theft of electricity can be prevented by producing a state in which power is interrupted.

FIG. 139 illustrates an example that differs from FIG. 136 of the system configuration according to the present embodiment. In FIG. 139, operations that are the same as those in FIG. 50, FIG. 55, FIG. 116, FIG. 117, FIG. 118, FIG. 119, etc., have the same reference numbers and have already been described. Accordingly, repeated description thereof will be omitted.

N700 indicates a space, such as a space in a home. However, N700 may be some indoor space other than an in-home space. This also applies to the other embodiments as well. For example, assume server Q101 is present in in-home space N700. Note that server Q101 may be referred to as an edge server or edge computer. Moreover, in this example, person N705 is living in in-home space N700.

In-home system (indoor system) W1700 is present in in-home space N700. In-home system (indoor system) W1700 is configured as a network of, for example, audio equipment, a luminaire, a smartphone, a smart speaker, a tablet, a computer, a video device, a display apparatus, a repeater such as illustrated in, for example, FIG. 50, FIG. 55, FIG. 116, FIG. 117, FIG. 118, and FIG. 119. As specific configuration and operation examples of the network have already been given with reference to, for example, FIG. 50, FIG. 55, FIG. 116, FIG. 117, FIG. 118, and FIG. 119, repeated description thereof will be omitted. Note that in-home system (indoor system) W1700 may include apparatuses and devices other than audio equipment, a luminaire, a smartphone, a smart speaker, a tablet, a computer, a video device, a display apparatus, a repeater such as illustrated in, for example, FIG. 50, FIG. 55, FIG. 116, FIG. 117, FIG. 118, and FIG. 119. For example, in-home system (indoor system) W1700 may include a gateway, a communication apparatus, and an AP.

One characterizing feature of FIG. 139 is that the devices and systems in in-home space N700 in FIG. 139 are communicating with cloud server N720 via AP (gateway) N701 and via network N710. Here, "devices and systems in in-home space N700" include, for example, server Q101, in-home system W1700, AP (gateway) N701, communication apparatus W1701, switch #1 labeled W1711, and switch #2 labeled W1712.

Moreover, connector (outlet) W1713, power transmission apparatus W1714, and vehicle W1750 in FIG. 139 may also be communicating with cloud server N720 via, for example, server Q101 and AP (gateway) N701.

For example, in-home system W1700 is performing wireless communication with AP (gateway) N701. For example, in-home system W1700 may be performing power line communication (PLC) with AP (gateway) N701.

Communication apparatus W1701, switch #1 labeled W1711, and switch #2 labeled W1712 are present in in-home (indoor) space N700.

For example, communication apparatus W1701 is performing wireless communication with AP (gateway) N701. For example, communication apparatus W1701 may be performing power line communication with AP (gateway) N701. Furthermore, communication apparatus W1701 may be performing wireless communication or power line communication with in-home system W1700.

For example, switch #1 labeled W1711 is performing wireless communication with AP (gateway) N701. For example, switch #1 labeled W1711 may be performing power line communication with AP (gateway) N701. Furthermore, switch #1 labeled W1711 may be performing wireless communication or power line communication with in-home system W1700.

Switch #1 labeled W1711 may communicate with cloud server N720 via another apparatus and/or network N710 or the like.

Switch #1 labeled W1711 can be controlled to supply or not to supply power to connector (outlet) W1713. Operations for this control will be described in greater detail later.

For example, switch #2 labeled W1712 is performing wireless communication with AP (gateway) N701. For example, switch #2 labeled W1712 may be performing power line communication with AP (gateway) N701. Furthermore, switch #2 labeled W1712 may be performing wireless communication or power line communication with in-home system W1700.

Switch #2 labeled W1712 may communicate with cloud server N720 via another apparatus and/or network N710 or the like.

Switch #2 labeled W1712 can be controlled to supply or not supply power to power transmission apparatus W1714. Operations for this control will be described in greater detail later.

Vehicle W1750 is present outside or in a garage. Although a vehicle is used as an example here, instead of a vehicle (automobile), an electric motorcycle (e-motorcycle), an electric kick scooter, a vacuum cleaner, an electric automobile, an electric power-assisted automobile, an electric power-assisted kick scooter, a motorcycle, an automobile, a boat, an airplane, a drone, a baby carriage, an electronic consumer product, an appliance (a household appliance) a computer, a server, a tablet, or a smartphone may be used.

Hereinafter, operations performed when charging the battery included in vehicle W1750 will be described. Charging of the battery included in vehicle W1750 may be performed by connecting the vehicle to connector W1713, or, for example, by proximity to or contact with power transmission apparatus W1714 when wireless power transfer is used.

In the case of the present embodiment, switch #1 labeled W1711 does not supply power to the power line and connector W1713 on the right side of switch #1 labeled W1711, except during the relevant charging operation of vehicle W1750. Similarly, switch #2 labeled W1712 does not supply power to the power line and power transmission apparatus W1714 on the right side of switch #2 labeled W1712, except during the relevant charging operation of vehicle W1750. This achieves the advantageous effect whereby theft of electricity can be prevented. It goes without saying that the power line on the left side of switch #1 labeled W1711 and the power line on the left side of switch #2 labeled W1712 are supplied with power.

Next, operations performed when charging vehicle W1750 will be described.

FIG. 137A illustrates an example of operations performed when charging vehicle W1750 illustrated in FIG. 139. The sensing apparatus in FIG. 137A may be an apparatus that is present in in-home space N700, and may be cloud server N720. The sensing apparatus in FIG. 137A may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "apparatus" in FIG. 137A may be the sensing apparatus itself, and may be AP (gateway) N701, server Q101, switch #1 labeled W1711, switch #2 labeled W1712, or cloud server N720.

The "switch #1" in FIG. 137A is switch #1 labeled W1711 illustrated in FIG. 139, and the "switch #2" in FIG. 137A is switch #2 labeled W1712 illustrated in FIG. 139.

As illustrated in FIG. 137A, the sensing apparatus detects an operation related to person W1799 (that is, for example, outside) who is attempting to charge vehicle W1750 (W1801). What the sensing apparatus detects may be a characterizing feature of the person or a gesture made by the person. What the sensing apparatus detects may be as described in other embodiments.

The sensing apparatus then transmits, to the apparatus, information obtained in the detecting of an operation related to person W1799 in step W1801 (W1802). Note that the communication between the sensing apparatus and the apparatus may be wireless communication, and may be wired communication such as power line communication (however, this example is non-limiting). Moreover, both wired and wireless communication may be used.

The apparatus obtains this information, and implements authentication as to whether the charging of the vehicle being attempted by person W1799 is unauthorized or not (W1811). Examples of the authentication method include extracting a characterizing feature of person W1799 and determining whether the characterizing feature is unauthorized or not, and detecting an action or gesture performed by person W1799 and determining whether the action or gesture is unauthorized or not. Note that the authentication method is not limited to these examples; methods described in other embodiments may be used. Accordingly, the extraction of an operation or characterizing feature related to a person is used as a code or key. The apparatus then transmits information indicating the result of the authentication to switch #1 labeled W1711 and/or switch #2 labeled W1712 (W1812). Note that the communication between the apparatus and the switch may be wireless or wired. Moreover, both wired and wireless communication may be used.

Switch #1 labeled W1711 and/or switch #2 labeled W1712 receive this information indicating the result of the authentication.

When switch #1 labeled W1711 determines to supply power based on the result of the authentication, switch #1 labeled W1711 supplies power to connector (outlet) W1713. When switch #1 labeled W1711 determines to not supply power based on the result of the authentication, switch #1 labeled W1711 does not supply power to connector (outlet) W1713 (W1821).

Similarly, when switch #2 labeled W1712 determines to supply power based on the result of the authentication, switch #2 labeled W1712 supplies power to power transmission apparatus W1714. When switch #2 labeled W1712 determines to not supply power based on the result of the authentication, switch #2 labeled W1712 does not supply power to power transmission apparatus W1714 (W1821).

Next, another method will be described. Assume the default state of switch #1 labeled W1711 is to not supply power to connector (outlet) W1713. Assume the default state of switch #2 labeled W1712 is to not supply power to connector (outlet) W1713.

Assume the apparatus in FIG. 137A determines that the supply of power is not unauthorized as a result of the authentication. In this case, the apparatus transmits, to switch #1 labeled W1711 and/or switch #2 labeled W1712, information indicating to start supplying power as information indicating the result of the authentication (W1812).

Switch #1 labeled W1711 determines to supply power based on the result of the authentication, and supplies power to connector (outlet) W1713 (W1821).

Similarly, switch #2 labeled W1712 determines to supply power based on the result of the authentication, and supplies power to power transmission apparatus W1714 (W1821).

Note that the apparatus, the sensing apparatus, switch #1, and switch #2 illustrated in FIG. 137A may transmit, to cloud server N720 via another apparatus, information related to its own state and information obtained by implementing an operation.

FIG. 137B illustrates an example that differs from the example of FIG. 137A of operations performed when charging vehicle W1750 in FIG. 139.

The sensing apparatus in FIG. 137B may be an apparatus that is present in in-home space N700, and may be cloud server N720. The sensing apparatus in FIG. 137A may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "switch #1" in FIG. 137B is switch #1 labeled W1711 illustrated in FIG. 139, and the "switch #2" in FIG. 137B is switch #2 labeled W1712 illustrated in FIG. 139.

As illustrated in FIG. 137B, the sensing apparatus detects an operation related to person W1799 (that is, for example, outside) who is attempting to charge vehicle W1750 (W1801). What the sensing apparatus detects may be a characterizing feature of the person or a gesture made by the person. What the sensing apparatus detects may be as described in other embodiments.

The sensing apparatus then transmits, to switch #1 labeled W1711 and/or switch #2 labeled W1712, information obtained in the detecting of an operation related to person W1799 in step W1801 (W1802). Note that the communication between the sensing apparatus and the switch may be wireless or wired. Moreover, both wired and wireless communication may be used.

Switch #1 labeled W1711 and/or switch #2 labeled W1712 receive this information obtained in the detecting of an operation related to person W1799 in step W1801.

When switch #1 labeled W1711 determines to supply power based on this information obtained in the detecting of an operation related to person W1799 in step W1801, switch #1 labeled W1711 supplies power to connector (outlet) W1713. When switch #1 labeled W1711 determines to not supply power based on this information obtained in the detecting of an operation related to person W1799 in step W1801, switch #1 labeled W1711 does not supply power to connector (outlet) W1713 (W1821).

Similarly, when switch #2 labeled W1712 determines to supply power based on this information obtained in the detecting of an operation related to person W1799 in step W1801, switch #2 labeled W1712 supplies power to power transmission apparatus W1714. When switch #2 labeled W1712 determines to not supply power based on this information obtained in the detecting of an operation related to person W1799 in step W1801, switch #2 labeled W1712 does not supply power to power transmission apparatus W1714 (W1821).

As another method, the sensing apparatus may perform the authentication. For example, the sensing apparatus may determine whether to supply power or not based on the information obtained in the detecting of an operation related to person W1799 in step W1801. The sensing apparatus then transmits information indicating the determination result to switch #1 labeled W1711 and/or switch #2 labeled W1712.

Switch #1 labeled W1711 then determines whether to supply power or not based on this information indicating the determination result.

Similarly, switch #2 labeled W1712 determines whether to supply power or not based on this information indicating the determination result.

Next, another method will be described. Assume the default state of switch #1 labeled W1711 is to not supply power to connector (outlet) W1713. Assume the default state of switch #2 labeled W1712 is to not supply power to connector (outlet) W1713.

Assume the sensing apparatus in FIG. 137B determines that the supply of power is not unauthorized as a result of the authentication. In this case, the sensing apparatus transmits, to switch #1 labeled W1711 and/or switch #2 labeled W1712, information indicating to start supplying power as information indicating the result of the authentication (W1812).

Switch #1 labeled W1711 determines to supply power based on the result of the authentication, and supplies power to connector (outlet) W1713.

Similarly, switch #2 labeled W1712 determines to supply power based on the result of the authentication, and supplies power to power transmission apparatus W1714.

Note that the sensing apparatus, switch #1, and switch #2 illustrated in FIG. 137B may transmit, to cloud server N720 via another apparatus, information related to its own state and information obtained by implementing an operation.

FIG. 137C illustrates an example that differs from the examples of FIG. 137A and FIG. 137B of operations performed when charging vehicle W1750 in FIG. 139.

The sensing apparatus in FIG. 137C may be an apparatus that is present in in-home space N700, and may be cloud server N720. The sensing apparatus in FIG. 137A may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "apparatus" in FIG. 137C may be the sensing apparatus itself, and may be AP (gateway) N701, server Q101, switch #1 labeled W1711, switch #2 labeled W1712, or cloud server N720.

The "switch #1" in FIG. 137C is switch #1 labeled W1711 illustrated in FIG. 136, and the "switch #2" in FIG. 137C is switch #2 labeled W1712 illustrated in FIG. 136.

FIG. 137C differs from the example illustrated in FIG. 137A in that switch #1 labeled W1711 and/or switch #2 labeled W1712 perform primary authentication W1851. Accordingly, the following will focus on the description of primary authentication W1851, and description of other operations will be omitted as they are the same as described with reference to FIG. 137A.

For example, vehicle W1750 in FIG. 139 is connected to connector (outlet) W1713 via a cable, and vehicle W1750 transmits, to switch #1 labeled W1711 via the cable, connector (outlet) W1719, and power line, information indicating an identifier (ID) of vehicle W1750 or a key for connection. As illustrated in FIG. 137C, switch #1 labeled W1711 obtains this information and performs authentication for connecting to vehicle W1750 (W1851). If a positive authentication is made, the operation proceeds to the next step.

For example, vehicle W1750 in FIG. 139 transmits, to switch #2 labeled W1712 via power transmission apparatus W1714 and the power line, information indicating an identifier (ID) of vehicle W1750 or a key for connection. As illustrated in FIG. 137C, switch #2 labeled W1712 obtains this information and performs authentication for connecting to vehicle W1750 (W1851). If a positive authentication is made, the operation proceeds to the next step.

As another method, vehicle W1750 includes a communication apparatus, and the communication apparatus included in vehicle W1750 transmits, to a communication apparatus such as a communication apparatus, switch #1 labeled W1711, or switch #2 labeled W1712 included in base station N730, AP (gateway) N701, communication apparatus W1701, and in-home system (indoor system) W1700, information indicating an identifier (ID) of vehicle W1750 or a key for connection. Then, the communication apparatus such as base station N730, AP (gateway) N701, communication apparatus W1701, a communication apparatus included in in-home system (indoor system) W1700, switch #1 labeled W1711, or switch #2 labeled W1712 forwards, to an authentication apparatus such as AP (gateway) N701, communication apparatus W1701, a communication apparatus included in in-home system (indoor system) W1700, switch #1 labeled W1711, switch #2 labeled W1712, or server Q101, information indicating an identifier (ID) of vehicle W1750 or a key for connection, and the authentication apparatus such as AP (gateway) N701, communication apparatus W1701, a communication apparatus included in in-home system (indoor system) W1700, switch #1 labeled W1711, switch #2 labeled W1712, or server Q101 performs authentication for the connection between vehicle W1750 and connector (outlet) W1713 and/or power transmission apparatus W1714, using the information indicating an identifier (ID) of vehicle W1750 or a key for connection. The authentication apparatus such as AP (gateway) N701, communication apparatus W1701, a communication apparatus included in in-home system (indoor system) W1700, switch #1 labeled W1711, switch #2 labeled W1712, or server Q101 then transmits the result of the authentication to switch #1 labeled W1711 and/or switch #2 labeled W1712, and performs primary authentication (W1851). If a positive authentication is made, the operation proceeds to the next step.

Note that the apparatus, the sensing apparatus, switch #1, and switch #2 illustrated in FIG. 137C may transmit, to cloud server N720 via another apparatus, information related to its own state and information obtained by implementing an operation.

Performing a primary authentication in this way achieves the advantageous effect that charging of an unauthorized vehicle can be inhibited by performing authentication.

FIG. 137D illustrates an example that differs from the examples of FIG. 137A, FIG. 137B, and FIG. 137C of operations performed when charging vehicle W1750 in FIG. 139.

The sensing apparatus in FIG. 137D may be an apparatus that is present in in-home space N700, and may be cloud server N720. The sensing apparatus in FIG. 137A may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "switch #1" in FIG. 137D is switch #1 labeled W1711 illustrated in FIG. 139, and the "switch #2" in FIG. 137D is switch #2 labeled W1712 illustrated in FIG. 139.

FIG. 137D differs from the example illustrated in FIG. 137B in that switch #1 labeled W1711 and/or switch #2 labeled W1712 perform primary authentication W1851. Accordingly, the following will focus on the description of primary authentication W1851, and description of other operations will be omitted as they are the same as described with reference to FIG. 137B.

For example, vehicle W1750 in FIG. 139 is connected to connector (outlet) W1713 via a cable, and vehicle W1750 transmits, to switch #1 labeled W1711 via the cable, connector (outlet) W1719, and power line, information indicating an identifier (ID) of vehicle W1750 or a key for connection. As illustrated in FIG. 137D, switch #1 labeled W1711 obtains this information and performs authentication for connecting to vehicle W1750 (W1851). If a positive authentication is made, the operation proceeds to the next step.

For example, vehicle W1750 in FIG. 139 transmits, to switch #2 labeled W1712 via power transmission apparatus W1714 and the power line, information indicating an identifier (ID) of vehicle W1750 or a key for connection. As illustrated in FIG. 137D, switch #2 labeled W1712 obtains this information and performs authentication for connecting to vehicle W1750 (W1851). If a positive authentication is made, the operation proceeds to the next step.

As another method, vehicle W1750 includes a communication apparatus, and the communication apparatus included in vehicle W1750 transmits, to a communication apparatus such as a communication apparatus, switch #1 labeled W1711, or switch #2 labeled W1712 included in base station N730, AP (gateway) N701, communication apparatus W1701, and in-home system (indoor system) W1700, information indicating an identifier (ID) of vehicle W1750 or a key for connection. Then, the communication apparatus such as base station N730, AP (gateway) N701, communication apparatus W1701, a communication apparatus included in in-home system (indoor system) W1700, switch #1 labeled W1711, or switch #2 labeled W1712 forwards, to an authentication apparatus such as AP (gateway) N701, communication apparatus W1701, a communication apparatus included in in-home system (indoor system) W1700, switch #1 labeled W1711, switch #2 labeled W1712, or server Q101, information indicating an identifier (ID) of vehicle W1750 or a key for connection, and the authentication apparatus such as AP (gateway) N701, communication apparatus W1701, a communication apparatus included in in-home system (indoor system) W1700, switch #1 labeled W1711, switch #2 labeled W1712, or server Q101 performs authentication for the connection between vehicle W1750 and connector (outlet) W1713 and/or power transmission apparatus W1714, using the information indicating an identifier (ID) of vehicle W1750 or a key for connection. The authentication apparatus such as AP (gateway) N701, communication apparatus W1701, a communication apparatus included in in-home system (indoor system) W1700, switch #1 labeled W1711, switch #2 labeled W1712, or server Q101 then transmits the result of the authentication to switch #1 labeled W1711 and/or switch #2 labeled W1712, and performs primary authentication (W1851). If a positive authentication is made, the operation proceeds to the next step.

Note that the apparatus, the sensing apparatus, switch #1, and switch #2 illustrated in FIG. 137D may transmit, to cloud server N720 via another apparatus, information related to its own state and information obtained by implementing an operation.

Performing a primary authentication in this way achieves the advantageous effect that charging of an unauthorized vehicle can be inhibited by performing authentication.

As described with reference to FIG. 137A, FIG. 137B, FIG. 137C, and FIG. 137D, by detecting a characterizing feature of person W1799 in FIG. 139 and/or a gesture made by person W1799 using a sensing apparatus present in an in-home (indoor) space, there is no need to provide an apparatus such as a sensing apparatus that uses electricity outdoors, whereby it is possible to achieve the advantageous effect that the possibility of electricity theft can be reduced. Furthermore, since the apparatus such as a sensing apparatus that uses electricity is in an in-home (indoor) space, sealing for protecting against dust and water is not necessary for the apparatus and the power system, which achieves the advantageous effect that it is possible to reduce the cost of the apparatus.

Next, an example of operations for ending charging when vehicle W1750 illustrated in FIG. 139 starts the charging process described above will be given.

FIG. 138A illustrates an example of operations performed when ending the charging of vehicle W1750 illustrated in FIG. 139.

The sensing apparatus in FIG. 138A may be an apparatus that is present in in-home space N700, and may be cloud server N720. The sensing apparatus in FIG. 137A may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "apparatus" in FIG. 138A may be the sensing apparatus itself, and may be AP (gateway) N701, server Q101, switch #1 labeled W1711, switch #2 labeled W1712, or cloud server N720.

The "switch #1" in FIG. 138A is switch #1 labeled W1711 illustrated in FIG. 139, and the "switch #2" in FIG. 138A is switch #2 labeled W1712 illustrated in FIG. 139.

As illustrated in FIG. 138A, the sensing apparatus ends the charging of vehicle W1750. The sensing apparatus then detects an operation related to person W1799 (who is outside, for example) (W1901). What the sensing apparatus detects may be a characterizing feature of the person or a gesture made by the person. What the sensing apparatus detects may be as described in other embodiments.

The sensing apparatus then transmits, to the apparatus, information obtained in the detecting of an operation related to person W1799 in step W1901 (W1902). Note that the communication between the sensing apparatus and the apparatus may be wireless communication, and may be wired communication such as power line communication (however, this example is non-limiting). Moreover, both wired and wireless communication may be used.

The apparatus obtains this information, and implements authentication as to whether the completion of the charging of the vehicle being attempted by person W1799 is correct work or not (W1911). Examples of the authentication method include extracting a characterizing feature of person W1799 and determining, and detecting an action or gesture performed by person W1799 and determining. Note that the authentication method is not limited to these examples; methods described in other embodiments may be used. Accordingly, the extraction of an operation or characterizing feature related to a person is used as a code or key.

The apparatus then transmits information indicating the result of the authentication to switch #1 labeled W1711 and/or switch #2 labeled W1712 (W1912). Note that the communication between the apparatus and the switch may be wireless or wired. Moreover, both wired and wireless communication may be used.

Switch #1 labeled W1711 and/or switch #2 labeled W1712 receive this information indicating the result of the authentication.

When switch #1 labeled W1711 determines to stop the supply of power based on the result of the authentication, switch #1 labeled W1711 stops the supply of power to connector (outlet) W1713 (W1921).

Similarly, when switch #2 labeled W1712 determines to stop the supply of power based on the result of the authentication, switch #2 labeled W1712 stops the supply of power to power transmission apparatus W1714 (W1921).

FIG. 138B illustrates an example that differs from the example of FIG. 138A of operations for ending charging vehicle W1750 in FIG. 139.

The sensing apparatus in FIG. 138B may be an apparatus that is present in in-home space N700, and may be cloud server N720. The sensing apparatus in FIG. 137A may be AP labeled N701, communication apparatus W1701, or server Q101, and may be present in in-home system (indoor system) W1700. The sensing apparatus may be switch #1 labeled W1711 or switch #2 labeled W1712, for example. Note that the sensing apparatus is an apparatus that performs sensing like described in other embodiments.

The "switch #1" in FIG. 138B is switch #1 labeled W1711 illustrated in FIG. 139, and the "switch #2" in FIG. 138B is switch #2 labeled W1712 illustrated in FIG. 139.

As illustrated in FIG. 138B, the sensing apparatus ends the charging of vehicle W1750. The sensing apparatus then detects an operation related to person W1799 (who is outside, for example) (W1901). What the sensing apparatus detects may be a characterizing feature of the person or a gesture made by the person. What the sensing apparatus detects may be as described in other embodiments.

The sensing apparatus then transmits, to switch #1 labeled W1711 and/or switch #2 labeled W1712, information obtained in the detecting of an operation related to person W1799 in step W1901 (W1902). Note that the communication between the sensing apparatus and the switch may be wireless or wired. Moreover, both wired and wireless communication may be used.

Switch #1 labeled W1711 and/or switch #2 labeled W1712 receive this information obtained in the detecting of an operation related to person W1799 in step W1901.

When switch #1 labeled W1711 determines to stop the supply of power based on this information obtained in the detecting of an operation related to person W1799 in step W1901, switch #1 labeled W1711 stops supplying power to connector (outlet) W1713 (W1921).

Similarly, when switch #2 labeled W1712 determines to stop the supply of power based on this information obtained in the detecting of an operation related to person W1799 in step W1901, switch #2 labeled W1712 stops supplying power to power transmission apparatus W1714 (W1921).

As another method, the sensing apparatus may perform the authentication. For example, the sensing apparatus may determine whether to stop the supply of power or not based on the information obtained in the detecting of an operation related to person W1799 in step W1901. The sensing apparatus then transmits information indicating the determination result to switch #1 labeled W1711 and/or switch #2 labeled W1712.

Switch #1 labeled W1711 then determines whether to stop the supply of power or not based on this information indicating the determination result.

Similarly, switch #2 labeled W1712 determines whether to stop the supply of power or not based on this information indicating the determination result.

Methods of stopping the supply of power other than the methods described with reference to FIG. 138A and FIG. 138B include, for example, switch #1 labeled W1711 stopping the supply of power when a power supply time set by a timer is exceeded. Similarly, switch #2 labeled W1712 may stop the supply of power when a power supply time set by a timer is exceeded. Note that switch #1 labeled W1711 and switch #2 labeled W1712 may include the timer, a device other than switch #1 labeled W1711 and switch #2 labeled W1712 may include the timer and this device may notify switch #1 labeled W1711 and switch #2 labeled W1712 of time information and control information and the like.

Moreover, vehicle W1750 may recognize that the charging is complete and transmit information related to the completion of the charging to switch #1 labeled W1711, and switch #1 labeled W1711 may stop the supply of power. Similarly, vehicle W1750 may recognize that the charging is complete and transmit information related to the completion of the charging to switch #2 labeled W1712, and switch #2 labeled W1712 may stop the supply of power.

Note that vehicle W1750 may recognize that the charging is complete and transmit information related to the completion of the charging to a communication apparatus other than switch #1 labeled W1711 and switch #2 labeled W1712. This communication apparatus may transmit the information related to the completion of the charging to switch #1 labeled W1711 and switch #2 labeled W1712 over a network and switch #1 labeled W1711 and switch #2 labeled W1712 may stop the supply of power.

Stopping the charging as described above makes it possible to interrupt power as desired by a user (person) and makes it possible to achieve the advantageous effect that theft of electricity can be prevented by producing a state in which power is interrupted.

Although FIG. 136 and FIG. 139 illustrate examples in which both the pair of switch #1 labeled W1711 and connector (outlet) W1713 and the pair of switch #2 labeled W1712 and power transmission apparatus W1714 are present in in-home space N700, in-home space N700 may include only the pair of switch #1 labeled W1711 and connector (outlet) W1713, and may include only the pair of switch #2 labeled W1712 and power transmission apparatus W1714.

In FIG. 136 and FIG. 139, a single apparatus may include switch #1 labeled W1711 and switch #2 labeled W1712. Accordingly, a configuration in which a single apparatus includes a plurality of switches is possible.

Although configuration examples of the system according to the present embodiment were given based on FIG. 136 and FIG. 139, the configuration method of the system is not limited to the examples in FIG. 136 and FIG. 139. For example, although FIG. 136 and FIG. 139 pertain to methods for charging a vehicle, connector (outlet) W1713 and power transmission apparatus W1714 may supply power to any apparatus that requires power. In such cases, the descriptions given above with reference to FIG. 137A, FIG. 137B, FIG. 137C, FIG. 137D, FIG. 138A, and FIG. 138B can be applied to the method of power supply and the method of stopping the supply of power.

Embodiment 23

In the present embodiment, a variation of Embodiment 22 and the like will be described.

FIG. 140 illustrates one example of the system configuration according to the present embodiment. Vehicle W2100 and person W2199 are present. Cabin W2101 is present in vehicle W2100.

At least AP (access point) W2111, door lock system (door management system) W2112, and drive system W2113 are present in cabin W2101.

AP labeled W2111 includes a communication function and a sensing function. Since the relevant configurations have already been described in detail in other embodiments, repeated description will be omitted. The communication function of the AP labeled W2111 may be wireless or wired communication.

Door lock system (door management system) W2112 is a system for locking and unlocking the doors and trunk of the vehicle.

Drive system W2113 is a system for managing the starting and stopping of the driving of the vehicle.

Here, AP labeled W2111 may directly communicate with door lock system (door management system) W2112 or communicate with door lock system W2112 via another apparatus or a network.

Moreover, AP labeled W2111 may directly communicate with drive system W2113 or communicate with drive system W2113 via another apparatus or a network.

Although W2111 is referred to as an AP, this apparatus may be referred to as a terminal, a gateway, a communication apparatus, a sensing apparatus, a computer, or a server or the like. Moreover, alternatives for the "vehicle" include a truck, a hybrid car, an electric automobile, a vehicle that runs on diesel oil, gasoline, hydrogen, or gas, an electric motorcycle (an e-motorcycle), an electric kick scooter, an electric power-assisted automobile, an electric power-assisted kick scooter, a motorcycle, a boat, and an airplane. Moreover, although a vehicle and the cabin of a vehicle are used in this example, a home and the inside of the home, a building and the inside of the building, an office and the inside of the office, and a warehouse and the inside of the warehouse are acceptable.

Hereinafter, an example of operations performed by the system will be given.

FIG. 141A illustrates one example of operations for unlocking the doors in cabin W2101 of vehicle W2100 in FIG. 140. The "AP" in FIG. 141A indicates AP labeled W2111 in FIG. 140. The "apparatus" in FIG. 141A may be AP labeled W2111, may be door lock system (door management system) W2112, and may be some other apparatus. The "door lock system" in FIG. 141A indicates door lock system (door management system) W2112.

In the description of FIG. 141A, it is assumed that the doors of vehicle W2100 in FIG. 140 are locked. It is also assumed that person W2199 is going to unlock the doors of vehicle W2100.

In FIG. 141A, the apparatus implements primary authentication (W2210). More specifically, in FIG. 140, person W2199 possesses an apparatus for performing authentication. The apparatus for performing authentication then transmits information acting as a key, and, for example, AP labeled W2111 or the apparatus in FIG. 141A receives this information and performs authentication for unlocking the doors. When the primary authentication in FIG. 141A completes, processing proceeds to the next step. The apparatus that implements the primary authentication need not be the apparatus described above, and may be some other apparatus.

As illustrated in FIG. 141A, the AP then detects an operation related to person W2199 (W2201). What the AP detects may be a characterizing feature of the person or a gesture made by the person. What the AP detects may be as described in other embodiments.

The AP in FIG. 141A then transmits, to the apparatus, information obtained in the detecting of an operation related to person W2199 in step W2101 (W2102). Note that the communication between the AP and the apparatus may be wireless communication, and may be wired communication such as power line communication (however, this example is non-limiting). Moreover, both wired and wireless communication may be used.

The apparatus in FIG. 141A obtains this information, and implements authentication as to whether the unlocking of the doors of the vehicle by person W2199 is unauthorized or not (W2211). Examples of the authentication method include extracting a characterizing feature of person W2199 and determining authorization, and detecting an action or gesture performed by person W2199 and determining authorization. Note that the authentication method is not limited to these examples; methods described in other embodiments may be used. Accordingly, the extraction of an operation or characterizing feature related to a person is used as a code or key. The apparatus transmits information indicating the result of the authentication to door lock system (door management system) W2112 (W2212). Note that the communication between the apparatus and door lock system (door management system) W2112 may be wireless or wired. Moreover, both wired and wireless communication may be used.

As illustrated in FIG. 141A, door lock system (door management system) W2112 then receives this information indicating the result of the authentication. When door lock system (door management system) W2112 determines to unlock the doors based on the information indicating the result of the authentication, door lock system (door management system) W2112 unlocks the doors of vehicle W2100. When door lock system (door management system) W2112 determines to not unlock the doors based on the information indicating the result of the authentication, door lock system (door management system) W2112 does not unlock the doors of vehicle W2100 (W2221).

FIG. 141B illustrates one example, that differs from FIG. 141A, of operations for unlocking the doors in cabin W2101 of vehicle W2100 in FIG. 140.

The "AP" in FIG. 141B indicates AP labeled W2111 in FIG. 140. The "door lock system" in FIG. 141B indicates door lock system (door management system) W2112.

In the description of FIG. 141B, it is assumed that the doors of vehicle W2100 in FIG. 140 are locked. It is also assumed that person W2199 is going to unlock the doors of vehicle W2100.

In FIG. 141B, the AP implements primary authentication (W2200). More specifically, in FIG. 140, person W2199 possesses an apparatus for performing authentication. The apparatus for performing authentication then transmits information acting as a key, and, for example, AP labeled W2111 or another apparatus in FIG. 140 receives this information and performs authentication for unlocking the doors. When the primary authentication in FIG. 141B completes, processing proceeds to the next step. The apparatus that implements the primary authentication need not be the apparatus described above, and may be some other apparatus.

As illustrated in FIG. 141B, the AP then detects an operation related to person W2199 (W2201). What the AP detects may be a characterizing feature of the person or a gesture made by the person. What the AP detects may be as described in other embodiments.

The AP in FIG. 141B transmits information obtained in the detecting of an operation related to person W2199 in step W2101 to the door lock system (door management system) (W2102). Note that the communication between the AP and the door lock system (door management system) may be wireless communication, and may be wired communication such as power line communication (however, this example is non-limiting). Moreover, both wired and wireless communication may be used.

Door lock system (door management system) W2112 in FIG. 141B obtains this information, and implements authentication as to whether the unlocking of the doors of the vehicle by person W2199 is unauthorized or not (W2222).

Examples of the authentication method include extracting a characterizing feature of person W2199 and determining authorization, and detecting an action or gesture performed by person W2199 and determining authorization. Note that the authentication method is not limited to these examples; methods described in other embodiments may be used. Accordingly, the extraction of an operation or characterizing feature related to a person is used as a code or key. When door lock system (door management system) W2112 determines to unlock the doors based on the information indicating the result of the authentication, door lock system (door management system) W2112 unlocks the doors of vehicle W2100. When door lock system (door management system) W2112 determines to not unlock the doors based on the information indicating the result of the authentication, door lock system (door management system) W2112 does not unlock the doors of vehicle W2100 (W2221).

As described above with reference to FIG. 141A and FIG. 141B, by detecting a characterizing feature of person W2199 in FIG. 140 or detecting a gesture made by person W2199 in FIG. 140 using an AP present in the cabin (indoors), the locking of the doors can be controlled using a desired operation, which makes it possible to achieve the advantageous effect that it is possible to reduce the chance of theft or mischievous activity in the cabin (indoors). Furthermore, since the apparatus such as an AP that uses electricity is in a cabin of a vehicle (indoors), sealing for protecting against dust and water is not necessary for the apparatus and the power system, which achieves the advantageous effect that it is possible to reduce the cost of the apparatus.

FIG. 142 illustrates one example of the system configuration according to the present embodiment. In FIG. 142, elements that operate the same as in FIG. 140 have the same reference signs. Vehicle W2100 and person W2199 are present. Cabin W2101 is present in vehicle W2100.

At least AP (access point) W2111, door lock system (door management system) W2112, and drive system W2113 are present in cabin W2101.

AP labeled W2111 includes a communication function and a sensing function. Since the relevant configurations have already been described in detail in other embodiments, repeated description will be omitted. The communication function of the AP labeled W2111 may be wireless or wired communication.

Door lock system (door management system) W2112 is a system for locking and unlocking the doors and trunk of the vehicle.

Drive system W2113 is a system for managing the starting and stopping of the driving of the vehicle.

Here, AP labeled W2111 may directly communicate with door lock system (door management system) W2112 or communicate with door lock system W2112 via another apparatus or a network.

Moreover, AP labeled W2111 may directly communicate with drive system W2113 or communicate with drive system W2113 via another apparatus or a network.

Although W2111 is referred to as an AP, this apparatus may be referred to as a terminal, a gateway, a communication apparatus, a sensing apparatus, a computer, or a server or the like. Moreover, alternatives for the "vehicle" include a truck, a hybrid car, an electric automobile, a vehicle that runs on diesel oil, gasoline, hydrogen, or gas, an electric motorcycle (an e-motorcycle), an electric kick scooter, an electric power-assisted automobile, an electric power-assisted kick scooter, a motorcycle, a boat, and an airplane. Moreover, although a vehicle and the cabin of a vehicle are used in this example, a home and the inside of the home, a building and the inside of the building, an office and the inside of the office, and a warehouse and the inside of the warehouse are acceptable.

Hereinafter, an example of operations performed by the system will be given.

FIG. 143A illustrates one example of operating drive system W2113 in cabin W2101 of vehicle W2100 illustrated in FIG. 142. The "AP" in FIG. 143A indicates AP labeled W2111 in FIG. 142. The "apparatus" in FIG. 143A may be AP labeled W2111 or drive system W2113, and may be some other apparatus. The "drive system" in FIG. 143A indicates drive system W2113.

In the following description of FIG. 143A, it will be assumed that the drive system of vehicle W2100 in FIG. 142 is not operating. It will also be assumed that person W2199 inside the cabin of the vehicle is going to operate the drive system of vehicle W2100.

In FIG. 143A, the apparatus implements primary authentication (W2410). More specifically, in FIG. 142, person W2199 possesses an apparatus for performing authentication. The apparatus for performing authentication then transmits information acting as a key, and, for example, AP labeled W2111 or the apparatus in FIG. 143A receives this information and performs authentication for operating the drive system. When the primary authentication in FIG. 143A completes, processing proceeds to the next step. The apparatus that implements the primary authentication need not be the apparatus described above, and may be some other apparatus.

As illustrated in FIG. 143A, the AP then detects an operation related to person W2199 (W2401). What the AP detects may be a characterizing feature of the person or a gesture made by the person. What the AP detects may be as described in other embodiments.

The AP in FIG. 143A then transmits, to the apparatus, information obtained in the detecting of an operation related to person W2199 in step W2401 (W2402). Note that the communication between the AP and the apparatus may be wireless communication, and may be wired communication such as power line communication (however, this example is non-limiting). Moreover, both wired and wireless communication may be used.

The apparatus in FIG. 143A obtains this information, and implements authentication as to whether the operating of the drive system by person W2199 is unauthorized or not (W2411). Examples of the authentication method include extracting a characterizing feature of person W2199 and determining authorization, and detecting an action or gesture performed by person W2199 and determining authorization. Note that the authentication method is not limited to these examples; methods described in other embodiments may be used. Accordingly, the extraction of an operation or characterizing feature related to a person is used as a code or key. The apparatus transmits information indicating the result of the authentication to drive system W2113 (W2412). Note that the communication between the apparatus and drive system W2113 may be wireless or wired. Moreover, both wired and wireless communication may be used.

As illustrated in FIG. 143A, drive system W2113 receives this information indicating the result of the authentication. When drive system W2112 determines to operate the drive system based on the information indicating the result of the authentication, drive system W2112 operates the drive system of vehicle W2100. When drive system W2113 determines to not operate the drive system based on the information indicating the result of the authentication, drive system W2112 does not operate the drive system of vehicle W2100 (W2421).

FIG. 143B illustrates one example, which differs from FIG. 143A, of operating drive system W2113 in cabin W2101 of vehicle W2100 illustrated in FIG. 142.

The "AP" in FIG. 143B indicates AP labeled W2111 in FIG. 142. The "drive system" in FIG. 143B indicates drive system W2113.

In the description of FIG. 143B, it will be assumed that the drive system of vehicle W2100 in FIG. 142 is not operating. It will also be assumed that person W2199 inside the cabin of the vehicle is going to operate the drive system of vehicle W2100.

In FIG. 143B, the AP implements primary authentication (W2400). More specifically, in FIG. 142, person W2199 possesses an apparatus for performing authentication. The apparatus for performing authentication then transmits information acting as a key, and, for example, AP labeled W2111 or another apparatus in FIG. 142 receives this information and performs authentication for operating the drive system. When the primary authentication in FIG. 143B completes, processing proceeds to the next step. The apparatus that implements the primary authentication need not be the apparatus described above, and may be some other apparatus.

As illustrated in FIG. 143B, the AP then detects an operation related to person W2199 (W2401). What the AP detects may be a characterizing feature of the person or a gesture made by the person. What the AP detects may be as described in other embodiments.

The AP in FIG. 143B then transmits, to the drive system, information obtained in the detecting of an operation related to person W2199 in step W2401 (W2402). Note that the communication between the AP and the drive system may be wireless communication, and may be wired communication such as power line communication (however, this example is non-limiting). Moreover, both wired and wireless communication may be used.

The drive system in FIG. 143B obtains this information, and implements authentication as to whether the operating of the drive system of the vehicle by person W2199 is unauthorized or not (W2422). Examples of the authentication method include extracting a characterizing feature of person W2199 and determining authorization, and detecting an action or gesture performed by person W2199 and determining authorization. Note that the authentication method is not limited to these examples; methods described in other embodiments may be used. Accordingly, the extraction of an operation or characterizing feature related to a person is used as a code or key. When the drive system determines to operate the drive system based on the information indicating the result of the authentication, the drive system operates the drive system of vehicle W2100. When the drive system determines to not operate the drive system based on the information indicating the result of the authentication, the drive system does not operate the drive system of vehicle W2100 (W2421).

As described above with reference to FIG. 143A and FIG. 143B, by detecting a characterizing feature of person W2199 in FIG. 142 or detecting a gesture made by person W2199 in FIG. 142 using an AP present in the cabin (indoors), the drive system be controlled using a desired operation, which makes it possible to achieve the advantageous effect that it is possible to reduce the chance of theft or mischievous activity of the vehicle. Furthermore, since the apparatus such as an AP that uses electricity is in a cabin of a vehicle (indoors), sealing for protecting against dust and water is not necessary for the apparatus and the power system, which achieves the advantageous effect that it is possible to reduce the cost of the apparatus.

Although configuration examples of the system according to the present embodiment were given based on FIG. 140 and FIG. 142, the configuration method of the system is not limited to the examples in FIG. 140 and FIG. 142. For example, in FIG. 140 and FIG. 142, a single apparatus may include AP labeled W2111 and door lock system (door management system) W2112. Moreover, a single apparatus may include AP labeled W2111 and drive system W2113. Moreover, a single apparatus may include door lock system (door management system) W2112 and drive system W2113. Moreover, a single apparatus may include AP labeled W2111, door lock system (door management system) W2112 and the drive system.

Embodiment 24

In the present embodiment, a variation of Embodiment 1 and Embodiment 2 will be described.

FIG. 144 illustrates an example of a configuration of a system according to the present embodiment.

Control apparatus W2500 receives inputs of signal W2501, received data W2514, sensing estimation signal W2523, and image data W2531, generates control signal W2502 based on these signals, and outputs the generated control signal W2502.

Communication apparatus W2510 receives inputs of data W2511 and control signal W2502, and when control signal W2502 indicates "communication mode", performs signal processing such as error correction coding and modulation (mapping) on data W2511, and generates and outputs a transmission signal (W2512). The transmission signal is transmitted from antenna W2513 as radio waves.

Communication apparatus W2510 receives an input of control signal W2502, and when control signal W2502 indicates "communication mode", receives an input of a received signal (W2512) received at antenna W2513, performs signal processing such as demodulation and error correction decoding to obtain received data W2514, and outputs received data W2514.

When control signal W2502 indicates "sensing mode", sensing apparatus W2520 generates and outputs a signal for sensing (W2522). The signal for sensing is transmitted from antenna W2521 as radio waves.

Sensing apparatus W2520 receives an input of control signal W2502, and when control signal W2502 indicates "sensing mode", receives an input of the received signal (W2522) received at antenna W2521, performs signal processing for sensing, outputs sensing estimation signal W2523, and when necessary, outputs sensing estimation signal W2524 to video/still image capturing apparatus W2530.

Sensing apparatus W2520 receives an input of signal W2532, and may perform sensing based on signal W2532.

Note that antennas W2513 and W2521 are shared and may be implemented as a single antenna.

Video/still image capturing apparatus W2530 receives an input of control signal W2502, and when control signal W2502 indicates "capturing mode", captures a video or still image of target object W2599, and outputs video or still image information W2531.

Note that video/still image capturing apparatus W2530 includes one or more of the lens controller, the sensor unit, the shutter unit, the lens unit, and the sensor unit with shutter function illustrated in FIG. 1 through FIG. 6.

Next, a characterizing feature of the present embodiment will be described by way of examples.

Example 1

Control apparatus W2500 receives inputs of signal W2501, received data W2514, sensing estimation signal W2523, and image data W2531, generates control signal W2502 based on these signals, and outputs the generated control signal W2502. Signal W2501 may include mode information indicating the mode set by the user to be used in FIG. 144.

For example, control signal W2502 includes at least a communication mode, a sensing mode, and a capturing mode. Moreover, control signal W2502 can set at least one or more of the modes.

When control signal W2502 includes information indicating to set the mode to "capturing mode", control signal W2502 does not include information indicating to set the mode to "sensing mode".

In other words, when sensing is to be performed in the capturing mode, the mode is not set to "sensing mode". Note that the sensing mode is a mode for implementing sensing other than the sensing to be performed in the capturing mode. This can also be applied to the descriptions of other present embodiments. Specific examples of operations performed when sensing in the capturing mode are given in Embodiment 1 and Embodiment 2.

In this way, it is possible to reduce the chance of affecting the video/still image operations, which makes it possible to achieve the advantageous effect that high-definition capturing can be performed.

Example 2

For example, control signal W2502 includes at least a communication mode, a sensing mode, and a capturing mode. Moreover, control signal W2502 can set at least one or more of the modes.

The frequency band that communication apparatus W2510 uses and the frequency band that the sensing uses are the same. For example, the frequency band that communication apparatus W2510 uses is the 60 GHz band and the frequency band that the sensing uses is the 60 GHz band. Here, when control signal W2502 includes information indicating to set the mode to "capturing mode", control signal W2502 does not include information indicating to set the mode to "sensing mode" and does not include information indicating to set the mode to "communication mode".

With this, the chance that communication apparatus W2510 will cause radio interference with sensing apparatus W2520 in regard to video/still image operations can be reduce, which makes it possible to achieve the advantageous effect that high-definition capturing can be performed.

Example 3

For example, control signal W2502 includes at least a communication mode, a sensing mode, and a capturing mode. Moreover, control signal W2502 can set at least one or more of the modes.

The frequency band that communication apparatus W2510 uses and the frequency band that the sensing uses are the same. For example, the frequency band that communication apparatus W2510 uses is the 60 GHz band and the frequency band that the sensing uses is the 60 GHz band.

Here, when control signal W2502 includes information indicating to set the mode to "communication mode", control signal W2502 may include information indicating to set the mode to "sensing mode". As described in other embodiments, this is because it is possible to perform control so that a signal indicating "communication mode" and a signal indicating "sensing mode" do not interfere with each other. However, when the signal indicates "capturing mode", since sensing apparatus W2520 prioritizes capturing, it is preferable to avoid configure the settings to allow communication apparatus to W2520.

When control signal W2502 includes information indicating to set the mode to "sensing mode", control signal W2502 may include information indicating to set the mode to "communication mode". As described in other embodiments, this is because it is possible to perform control so that a signal indicating "communication mode" and a signal indicating "sensing mode" do not interfere with each other.

With this, the chance that communication apparatus W2510 will cause radio interference with sensing apparatus W2520 in regard to video/still image operations can be reduce, which makes it possible to achieve the advantageous effect that high-definition capturing can be performed.

Although sensing apparatus W2520 is exemplified as performing sensing using radio waves in FIG. 144, sensing apparatus W2520 may be an apparatus for performing sensing using light, and may be an apparatus equipped with functions for both sensing using radio waves and sensing using light. When performing sensing using light, a photo-diode or an image sensor may be used, and an LED or an organic EL element or the like may be used. This is described in other embodiments.

Embodiment 25

A variation of Embodiment 20 will be described in the present embodiment.

In FIG. 120, $1\_1^{th}$ apparatus W101_1, $1\_2^{th}$ apparatus W101_2, and second apparatus W102 may be referred to as an initiator, a responder, a sensing initiator, and a sensing responder. This also applies to the other embodiments.

When two communication apparatuses are present, the first communication apparatus may be referred to as an initiator or a sensing initiator and the second communication apparatus may be referred to as a responder or a sensing responder. In such cases, at least one of the first communication apparatus and the second communication apparatus performs sensing.

When three or more communication apparatuses are present, these communication apparatuses fall into the category of initiator or sensing initiator or the category of responder or sensing responder.

Moreover, Embodiment 20 may be operated as one function of the wireless LAN system. This is applicable to the other embodiments as well.

Next, a variation of Embodiment 20 will be described.

Although $1\_1^{th}$ apparatus W101_1 is exemplified as estimating the position or the like of target W103 in FIG. 122, $1\_1^{th}$ apparatus W101_1 may estimate the position or the like of second apparatus W102 instead of target W103.

In such cases, $1\_1^{th}$ apparatus W101_1 may transmit a sensing signal (W312) and estimate the position or the like of second apparatus W102 (W313).

$1\_1^{th}$ apparatus W101_1 then transmits estimation information of the position or the like of second apparatus W102 to second apparatus W102 (W314).

The second apparatus receives this information (W303). Although $1\_1^{th}$ apparatus W101_1 is exemplified as receiving a sensing request (W301) from second apparatus W102 in FIG. 122, $1\_1^{th}$ apparatus W101_1 may receive a sensing request from second apparatus W102.

Accordingly, $1\_1^{th}$ apparatus W101_1 may be equipped with a mode for receiving a sensing request from another apparatus and implementing sensing and a mode for implementing sensing without a sensing request from another apparatus, and may switch between these modes to implement sensing.

Although $1\_1^{th}$ apparatus W101_1 is exemplified as estimating the position or the like of target W103 in FIG. 123, $1\_1^{th}$ apparatus W101_1 may estimate the position or the like of second apparatus W102 instead of target W103.

In such cases, $1\_1^{th}$ apparatus W101_1 may transmit a signal for sensing (W412) and estimate the position or the like of second apparatus W102 (W412).

$1\_1^{th}$ apparatus W101_1 then transmits estimation information of the position or the like of second apparatus W102 to second apparatus W102 (W413).

The second apparatus receives this information (W403). Although $1\_1^{th}$ apparatus W101_1 is exemplified as receiving a sensing request (W401) from second apparatus W102 in FIG. 123, $1\_1^{th}$ apparatus W101_1 may receive a sensing request from second apparatus W102.

Accordingly, $1\_1^{th}$ apparatus W101_1 may be equipped with a mode for receiving a sensing request from another apparatus and implementing sensing and a mode for implementing sensing without a sensing request from another apparatus, and may switch between these modes to implement sensing.

Next, an example in which sensing using triangulation described in other embodiments is applied to Embodiment 20 will be given.

FIG. 145A illustrates an example of operations performed by $1\_1^{th}$ apparatus W101_1, $1\_2^{th}$ apparatus W101_2, and second apparatus W102.

Here, an example will be used in which second apparatus W102 is requesting $1\_1^{th}$ apparatus W101_1 to implement estimation of the position and the like of target (object) W103.

As illustrated in FIG. 145A, second apparatus W102 transmits, to $1\_1^{th}$ apparatus W101_1, a request to sense target (object) W103 (W2601).

$1\_1^{th}$ apparatus W101_1 receives this information. $1\_1^{th}$ apparatus W101_1 then transmits information indicating whether $1\_1^{th}$ apparatus W101_1 will sense target (object) W103 or not (W2611). Second apparatus W102 receives the information indicating whether $1\_1^{th}$ apparatus W101_1 will sense target (object) W103 or not (W2602).

This example will assume that $1\_1^{th}$ apparatus W101_1 accepts the sensing request.

$1\_1^{th}$ apparatus W101_1 transmits information indicating a triangulation request and indicating an information sharing request to $1\_2^{th}$ apparatus W101_2 in order to sense target (object) W103 (W2612).

Here, the triangulation is performed using $1\_1^{th}$ apparatus W101_1 and $1\_2^{th}$ apparatus W101_2. Accordingly, the information sharing request requests the sharing of, for example, information indicating the distance between $11^{th}$ apparatus W101_1 and $1\_2^{th}$ apparatus W101_2, and other information required for triangulation, such as information indicating other distances, transmission signal emission angle, reception direction of arrival, etc.

Here, $1\_1^{th}$ apparatus W101_1 has $1\_2^{th}$ apparatus W101_2 perform the request to implement estimation using sensing, i.e., the request to receive the signal for sensing transmitted by $1\_1^{th}$ apparatus W101_1.

$1\_2^{th}$ apparatus W101_2 receives the information indicating the triangulation request and the information sharing request transmitted by $1\_1^{th}$ apparatus W101_1. $1\_2^{th}$ apparatus W101_2 transmits information indicating whether to receive the triangulation request and if there is information that needs to be shared, transmits that information (W2621). $1\_1^{th}$ apparatus W101_1 receives this information. In this example, $1\_2^{th}$ apparatus W101_2 is exemplified as receiving a triangulation request. However, $1\_2^{th}$ apparatus W101_2 need not receive a triangulation request.

1_1$^{th}$ apparatus W101_1 then transmits a signal for sensing (W2613). 1_2$^{th}$ apparatus W101_2 receives this signal, and then implements triangulation for estimating the position of target W103 (W2622). Since a method of triangulation has already been described in detail in other embodiments, repeated description will be omitted.

1_2$^{th}$ apparatus W101_2 transmits information indicating the result of the estimation obtained in W2622 to 1_1$^{th}$ apparatus W101_1 (W2623).

1_1$^{th}$ apparatus W101_1 receives the information indicating the result of the estimation obtained in W2622, and transmits this information to second apparatus W102 (W2614).

Second apparatus W102 receives this information indicating the estimation result (W2603).

When it is not necessary for the information indicating the estimation result obtained in W2614 to be shared with second apparatus W102, 1_1$^{th}$ apparatus W101_1 need not transmit the information indicating the estimation result obtained in W2614 to second apparatus W102.

By implementing the above, each apparatus can obtain information obtained by sensing, which makes it possible to achieve the advantageous effect that it is possible to control another apparatus using information obtained by sensing.

Although 1_1$^{th}$ apparatus W101_1 and 1_2$^{th}$ apparatus W101_2 are exemplified as estimating the position or the like of target W103 in FIG. 145A, 1_1$^{th}$ apparatus W101_1 and 1_2$^{th}$ apparatus W101_2 may estimate the position or the like of second apparatus W102 instead of target W103.

In such cases, 1_1$^{th}$ apparatus W101_1 may transmit a sensing signal (W2612), and 1_2$^{th}$ apparatus W101_2 may estimate the position or the like of second apparatus W102 (W2622).

Although 1_1$^{th}$ apparatus W101_1 is exemplified as receiving a sensing request (W2601) from second apparatus W102 in FIG. 145A, 1_1$^{th}$ apparatus W101_1 may receive a sensing request from second apparatus W102.

Accordingly, 1_1$^{th}$ apparatus W101_1 may be equipped with a mode for receiving a sensing request from another apparatus and implementing sensing and a mode for implementing sensing without a sensing request from another apparatus, and may switch between these modes to implement sensing.

FIG. 145B illustrates an example, which differs from FIG. 145A, of operations performed by 1_1$^{th}$ apparatus W101_1, 1_2$^{th}$ apparatus W101_2, and second apparatus W102.

Here, an example will be used in which second apparatus W102 is requesting 1_1$^{th}$ apparatus W101_1 to implement estimation of the position and the like of target (object) W103. In FIG. 145B, elements that operate the same as in FIG. 145A have the same reference signs, and repeated description will be omitted. Accordingly, only the aspects of FIG. 145B that differ from FIG. 145A will be described.

In FIG. 145B, 1_2$^{th}$ apparatus W101_2 transmits information indicating the estimation result obtained in W2622 to second apparatus W102 (W2623).

Accordingly, 1_1$^{th}$ apparatus W101_1 transmits, to 1_2$^{th}$ apparatus W101_2 in W2612, information indicating that a sensing request was made by second apparatus W102.

Second apparatus W102 receives this information indicating the estimation result (W2603).

When it is not necessary for the information indicating the estimation result obtained in W2622 to be shared with second apparatus W102, 1_2$^{th}$ apparatus W101_2 need not transmit the information indicating the estimation result obtained in W2622 to second apparatus W102.

By implementing the above, each apparatus can obtain information obtained by sensing, which makes it possible to achieve the advantageous effect that it is possible to control another apparatus using information obtained by sensing.

Although 1_1$^{th}$ apparatus W101_1 and 1_2$^{th}$ apparatus W101_2 are exemplified as estimating the position or the like of target W103 in FIG. 145B, 1_1$^{th}$ apparatus W101_1 and 1_2$^{th}$ apparatus W101_2 may estimate the position or the like of second apparatus W102 instead of target W103.

In such cases, 1_1$^{th}$ apparatus W101_1 may transmit a sensing signal (W2612), and 1_2$^{th}$ apparatus W101_2 may estimate the position or the like of second apparatus W102 (W2622).

Although 1_1$^{th}$ apparatus W101_1 is exemplified as receiving a sensing request (W2601) from second apparatus W102 in FIG. 145B, 1_1$^{th}$ apparatus W101_1 may receive a sensing request from second apparatus W102.

Accordingly, 1_1$^{th}$ apparatus W101_1 may be equipped with a mode for receiving a sensing request from another apparatus and implementing sensing and a mode for implementing sensing without a sensing request from another apparatus, and may switch between these modes to implement sensing.

FIG. 146 illustrates an example of operations performed by 1_1$^{th}$ apparatus W101_1, 1_2$^{th}$ apparatus W101_2, and second apparatus W102. In FIG. 146, operations that are the same as in FIG. 145A and FIG. 145B have the same reference signs.

Here, an example will be used in which second apparatus W102 is requesting 1_1$^{th}$ apparatus W101_1 to implement estimation of the position and the like of target (object) W103.

As illustrated in FIG. 146, second apparatus W102 transmits, to 1_1$^{th}$ apparatus W101_1, a request to sense target (object) W103 (W2601).

1_1$^{th}$ apparatus W101_1 receives this information. 1_1$^{th}$ apparatus W101_1 then transmits information indicating whether 1_1$^{th}$ apparatus W101_1 will sense target (object) W103 or not (W2611). This example will assume that 1_1$^{th}$ apparatus W101_1 accepts the sensing request.

1_1$^{th}$ apparatus W101_1 transmits information indicating, for example, a triangulation request and an information sharing request to 1_2$^{th}$ apparatus W101_2 in order to sense target (object) W103 (W2711).

Here, the triangulation is performed using 1_1$^{th}$ apparatus W101_1 and 1_2$^{th}$ apparatus W101_2. Accordingly, the information sharing request requests the sharing of, for example, information indicating the distance between 1_1$^{th}$ apparatus W101_1 and 1_2$^{th}$ apparatus W101_2, and other information required for triangulation, such as information indicating other distances, transmission signal emission angle, reception direction of arrival, etc.

Here, 1_1$^{th}$ apparatus W101_1 has 1_2$^{th}$ apparatus W101_2 perform the request to transmit the signal for sensing.

1_2$^{th}$ apparatus W101_2 receives the information indicating, for example, the triangulation request and the information sharing request transmitted by 1_1$^{th}$ apparatus W101_1. 1_2$^{th}$ apparatus W101_2 transmits information indicating whether to receive the triangulation request and if there is information that needs to be shared, transmits that information (W2621). 1_1$^{th}$ apparatus W101_1 receives this information (W2712).

In this example, 1_2$^{th}$ apparatus W101_2 is exemplified as receiving a triangulation request. However, 1_2$^{th}$ apparatus W101_2 need not receive a triangulation request. 1_2<sup>th</sup> apparatus W101_2 receives the request to transmit a signal for sensing.

1_2<sup>th</sup> apparatus W101_2 transmits the signal for sensing (W2721). 1_1<sup>th</sup> apparatus W101_1 receives this signal, and then implements triangulation for estimating the position of target W103 (W2713). Since a method of triangulation has already been described in detail in other embodiments, repeated description will be omitted.

1_1<sup>th</sup> apparatus W101_1 transmits the information indicating the result of the estimation obtained in W2713 to second apparatus W102 (W2714).

Second apparatus W102 receives this information indicating the estimation result (W2701).

When it is not necessary for the information indicating the estimation result obtained in W2713 to be shared with second apparatus W102, 1_1<sup>th</sup> apparatus W101_1 need not transmit the information indicating the estimation result obtained in W2713 to second apparatus W102.

By implementing the above, each apparatus can obtain information obtained by sensing, which makes it possible to achieve the advantageous effect that it is possible to control another apparatus using information obtained by sensing.

Although 1_1<sup>th</sup> apparatus W101_1 and 1_2<sup>th</sup> apparatus W101_2 are exemplified as estimating the position or the like of target W103 in FIG. 146, 1_1<sup>th</sup> apparatus W101_1 and 1_2<sup>th</sup> apparatus W101_2 may estimate the position or the like of second apparatus W102 instead of target W103.

In such cases, 1_2<sup>th</sup> apparatus W101_2 may transmit a sensing signal (W2712), and 1_1<sup>th</sup> apparatus W101_1 may estimate the position or the like of second apparatus W102 (W2713).

Although 1_1<sup>th</sup> apparatus W101_1 is exemplified as receiving a sensing request (W2601) from second apparatus W102 in FIG. 146, 1_1<sup>th</sup> apparatus W101_1 may receive a sensing request from second apparatus W102.

Accordingly, 1_1<sup>th</sup> apparatus W101_1 may be equipped with a mode for receiving a sensing request from another apparatus and implementing sensing and a mode for implementing sensing without a sensing request from another apparatus, and may switch between these modes to implement sensing.

Note that in FIG. 145A, FIG. 145B, and FIG. 146, when 1_1<sup>th</sup> apparatus W101_1, 1_2<sup>th</sup> apparatus W101_2, and second apparatus W102 estimate target W103, any one of 1_1<sup>th</sup> apparatus W101_1, 1_2<sup>th</sup> apparatus W101_2, and second apparatus W102 may transmit, for example, information about the position to be measured and/or information about the target to be measured, to another apparatus.

For example, target W103 may include a global positioning system (GPS), and target W103 may use GPS to measure the position and notify another apparatus of this position information. This enables 1_1<sup>th</sup> apparatus W101_1, 1_2<sup>th</sup> apparatus W101_2, and second apparatus W102 to share information about target W103. Target W103 may transmit its own information (for example, information indicating the ID of target W103, peripheral information for the location of target W103, information about the user of target W103, etc.) to another apparatus such as 1_1<sup>th</sup> apparatus W101_1, 1_2<sup>th</sup> apparatus W101_2, or second apparatus W102.

Next, an example of information transmitted by 1_1<sup>th</sup> apparatus W101_1, 1_2<sup>th</sup> apparatus W101_2, and second apparatus W102 will be given.

FIG. 147 illustrates an example of a configuration of sensing-related information W2801 transmitted by 1_1<sup>th</sup> apparatus W101_1, 1_2<sup>th</sup> apparatus W101_2, and second apparatus W102.

Sensing-related information W2801 includes, for example, sensing request information W2811, sensing request response information W2812, information W2813 related to the sensing result, triangulation request information W2814, triangulation request response information W2815, information W2816 related to the triangulation result, information W2817 related to the sensing method, and information W2818 related to frame type.

FIG. 148A illustrates an example of a frame used when transmitting data symbol W2903 and communicating.

Preamble W2901 is a signal for the communication partner to perform signal detection, time synchronization, frequency synchronization, frequency offset estimation, phase noise estimation, etc.

Control information symbol W2902 is a symbol for transmitting control information. For example, control information symbol W2902 includes sensing-related information W2801 illustrated in FIG. 147.

Control information symbol W2902 also includes information related to the transmitting method of data symbol W2903, information indicating the modulation method of data symbol W2903, information related to the error correction coding method of data symbol W2903, information related to the data amount of data symbol W2903, etc.

Data symbol W2903 is a symbol for transmitting data to the communication partner.

Note that the configuration of the frame used when communicating is not limited to the example illustrated in FIG. 148A. Control information symbol W2902 may include part of sensing-related information W2801 illustrated in FIG. 147.

FIG. 148B illustrates an example of a frame used when transmitting a signal for sensing. In FIG. 148B, elements that operate the same as in FIG. 148A have the same reference signs, and repeated description will be omitted.

Symbol for sensing W2913 is a symbol transmitted for itself or another apparatus to perform estimation via sensing.

Control information symbol W2902 includes sensing-related information W2801 illustrated in FIG. 147. Control information symbol W2902 may include information on the transmitting apparatus. With this, for example, it is possible to achieve the advantageous effect that, when implementing triangulation, the apparatus that receives this frame can identify the transmitting apparatus.

Control information symbol W2902 may include part of sensing-related information W2801 illustrated in FIG. 147.

Hereinafter, sensing request information W2811, sensing request response information W2812, information W2813 related to the sensing result, triangulation request information W2814, triangulation request response information W2815, information W2816 related to the triangulation result, information W2817 related to the sensing method, and information W2818 related to frame type will be described by way of example.

Information W2818 related to frame type is, for example, information for discerning between a frame used when transmitting a signal for sensing and a frame used when performing the communication illustrated in FIG. 148A.

Accordingly, for example, when the apparatus transmits a frame used when performing communication, information W2818 related to frame type includes information indicating that the frame is a frame used when performing the communication illustrated in FIG. 148A.

When the apparatus transmits a frame used when transmitting a signal for sensing, information W2818 related to frame type includes information indicating that the frame is a frame used when transmitting a signal for sensing.

The information included in information W2818 related to frame type is not limited to these examples. For example, information indicating that the frame is a frame for transmitting information required to implement sensing may be included in information W2818 related to frame type.

As illustrated in the example in FIG. 122, one example of a sensing method is one in which an apparatus transmits a signal for sensing and that same apparatus receives the transmitted signal and performs sensing (hereinafter referred to as a "first method").

As illustrated in the example in FIG. 123, one example of a sensing method is one in which a second apparatus transmits a signal, a first apparatus receives the transmitted signal, and the second apparatus performs sensing (hereinafter referred to as a "second method").

As illustrated in FIG. 145A and FIG. 145B, another example of a sensing method is one in which triangulation is performed (hereinafter referred to as a "third method").

Information W2817 related to the sensing method in FIG. 147 is information for identifying which sensing method is used.

For example, when an apparatus transmits a sensing frame for implementing the first method, information W2817 related to the sensing method includes information indicating that the frame is a frame for sensing according to the first method.

When an apparatus transmits a sensing frame for the second method, information W2817 related to the sensing method includes information indicating that the frame is a frame for sensing according to the second method.

When an apparatus transmits a sensing frame for the third method, information W2817 related to the sensing method includes information indicating that the frame is a frame for sensing according to the third method.

The sensing method is not limited to the first through third methods. When an apparatus transmits a sensing frame for another method, information W2817 related to the sensing method includes information indicating the sensing method, and the apparatus transmits this sensing frame.

As illustrated in FIG. 122, FIG. 123, FIG. 145A, FIG. 145B, and FIG. 146, when second apparatus W102 requests 1_1$^{th}$ apparatus W101_1 to perform sensing, second apparatus W102 inserts information indicating that it is requesting sensing into sensing request information W2811 in FIG. 147, and second apparatus W102 transmits control information symbol W2902 including sensing-related information W2801 including sensing request information W2811.

When an apparatus is not requesting sensing, the apparatus may transmit control information symbol W2902 including sensing-related information W2801 including sensing request information W2811 including information indicating that it is not requesting sensing, and, alternatively, may not transmit sensing request information W2811.

As illustrated in FIG. 122, FIG. 123, FIG. 145A, FIG. 145B, and FIG. 146, when 1_1$^{th}$ apparatus W101_1 receives the sensing request from second apparatus W102, 1_1$^{th}$ apparatus W101_1 transmits response information. This response information is sensing request response information W2812 illustrated in FIG. 147. Accordingly, sensing request response information W2812 includes information indicating whether the sensing request is accepted or not.

As illustrated in FIG. 122, FIG. 123, FIG. 145A, FIG. 145B, and FIG. 146, when second apparatus W102 requests 1_1$^{th}$ apparatus W101_1 to perform sensing, for example, as illustrated in FIG. 122, 1_1$^{th}$ apparatus W101_1 transmits information indicating the result of the target estimation (W314). In this way, when transmitting the result of the target estimation, information indicating that the target estimation result is included is transmitted via information W2813 related to the sensing result illustrated in FIG. 147.

As illustrated in FIG. 145A, FIG. 145B, and FIG. 146, when 1_1$^{th}$ apparatus W101_1 makes a triangulation request to 1_2$^{th}$ apparatus W101_2, 1_1$^{th}$ apparatus W101_1 inserts information indicating that a triangulation request is being made into triangulation request information W2814 illustrated in FIG. 147, and 1_1$^{th}$ apparatus W101_1 transmits control information symbol W2902 including sensing-related information W2801 including triangulation request information W2814.

When an apparatus such as 1_1$^{th}$ apparatus W101_1 is not requesting triangulation, that apparatus may transmit control information symbol W2902 including sensing-related information W2801 including triangulation request information W2814 including information indicating that it is not requesting triangulation, and, alternatively, may not transmit triangulation request information W2814.

As illustrated in FIG. 145A, FIG. 145B, and FIG. 146, when 1_2$^{th}$ apparatus W101_2 receives the triangulation request from 1_1$^{th}$ apparatus W101_1, 1_2$^{th}$ apparatus W101_2 transmits response information. This response information is triangulation request response information W2815 illustrated in FIG. 147. Accordingly, triangulation request response information W2815 includes information indicating whether the triangulation request is accepted or not.

As illustrated in FIG. 145A, FIG. 145B, and FIG. 146, when 1_2$^{th}$ apparatus W101_2 transmits a triangulation result to 1_1$^{th}$ apparatus W101_1 or second apparatus W102 (W2623), 1_2$^{th}$ apparatus W101_2 transmits information indicating that the triangulation result is included via information W2816 related to the triangulation result illustrated in FIG. 147.

By performing sensing and communication as described above, each apparatus can obtain information obtained by sensing, which makes it possible to achieve the advantageous effect that it is possible to control another apparatus using information obtained by sensing.

As illustrated in FIG. 147, by transmitting sensing-related information W2801, an advantageous effect whereby control related to sensing can be implemented more accurately and the sensing result can be shared among a plurality of apparatuses can be achieved. Note that the naming of the information illustrated in FIG. 147 is not limited to the naming used in the example illustrated in FIG. 147; other names may be used. In other words, the information included in each of these items of information performs an important role.

Embodiment 26

In the present embodiment, improvement of the accuracy of the sensing result will be discussed.

FIG. 149 illustrates an example of a system configuration according to the present embodiment.

1_1$^{th}$ apparatus, 1_2$^{th}$ apparatus, . . . , and 1_M$^{th}$ apparatus perform target sensing. For example, the sensing method may be the first method, the second method, or the third method described in Embodiment 25, or another sensing method described in another embodiment.

However, when the second method is used, the target needs to transmit a signal for sensing.

When performing triangulation using the third method, a 1_i$^{th}$ apparatus (i is an integer greater than or equal to 1 and less than or equal to M) may implement triangulation itself, the $1\_i^{th}$ apparatus may implement triangulation with a $1\_j^{th}$ apparatus ($i \neq j$), and the $1\_i^{th}$ apparatus may implement triangulation with some other apparatus. The $1\_i^{th}$ apparatus then implements triangulation a plurality of time using a plurality of apparatuses. When triangulation is implemented using the $1\_i^{th}$ apparatus and the $1\_j^{th}$ apparatus, various combinations of i and j are used to implement the triangulation using the $1\_i^{th}$ apparatus and the $1\_j^{th}$ apparatus.

The $1\_i^{th}$ apparatus transmits information indicating the sensing result to a (cloud) server via, for example, a $2\_k^{th}$ apparatus (k is an integer greater than or equal to 1 and less than or equal to N) and/or a network. Note that the $1\_i^{th}$ apparatus may transmit information other than the information indicating the sensing result to the (cloud) server (for example, the position information of the $1\_i^{th}$ apparatus or the position information of the target). The (cloud) server may obtain the information indicating the sensing result from some other apparatus.

This enables the (cloud) server to obtain sensing results of a plurality of targets. The (cloud) server then calculates a target sensing result from the plurality of sensing results. This makes it possible to achieve the advantageous effect that target sensing result accuracy can be improved. For example, the target sensing result accuracy can be improved by the (cloud) server performing statistical processing (for example, averaging processing) on sensing results obtained from a plurality of $1\_i^{th}$ apparatuses and other apparatuses.

The sensing result calculated by the (cloud) server may be transmitted to the $2\_k^{th}$ apparatus and the $1\_i^{th}$ apparatus.

The communication between the $1\_i^{th}$ apparatus and the $2\_k^{th}$ apparatus may be wireless or wired.

The target sensing by the $1\_i^{th}$ apparatus may be performed wirelessly via radio waves or performed using light such as visible light.

In FIG. 149 and the like, when the $1\_i^{th}$ apparatus and the $2\_k^{th}$ apparatus, for example, measure the target, either the $1\_i^{th}$ apparatus or the $2\_k^{th}$ apparatus may transmit information indicating the position to be measured and information indicating the target to be measured, for example, to the other apparatus.

For example, the target may include a GPS, and the target may use GPS to measure the position and notify another apparatus of this position information. This enables the $1\_i^{th}$ apparatus and the $2\_j^{th}$ apparatus to share information about the target. The target may transmit its own information (for example, information indicating the ID of the target, peripheral information for the location of the target, information about the user of the target, etc.) to another apparatus such as the $1\_i^{th}$ apparatus or the $2\_k^{th}$ apparatus.

Embodiment 27

In the present embodiment, an example of a method for switching signals for sensing will be given.

FIG. 150 illustrates one example of a configuration of first apparatus ay301 and second apparatus ay302. First sensing apparatus ay201 receives an input of first control signal ay231, and when first control signal ay231 instructs to transmit a signal for sensing, first sensing apparatus ay201 outputs a transmission signal including a signal for sensing (ay202), and the transmission signal including the signal for sensing is output from antenna ay203 as radio waves.

When first control signal ay231 instructs to receive a signal for sensing, first sensing apparatus ay201 receives an input of a received signal (ay202) received at antenna ay203, and performs processing for sensing based on, for example, the received signal, and outputs information ay234 including first sensing result information.

Note that the frequency used by first sensing apparatus ay201 is a first frequency (band).

Second sensing apparatus ay211 receives an input of second control signal ay232, and when second control signal ay232 instructs to transmit a signal for sensing, second sensing apparatus ay211 outputs a transmission signal including a signal for sensing (ay212), and the transmission signal including the signal for sensing is output from antenna ay213 as radio waves.

When second control signal ay232 instructs to receive a signal for sensing, second sensing apparatus ay211 receives an input of a received signal (ay212) received at antenna ay213, and performs processing for sensing based on, for example, the received signal, and outputs information ay235 including second sensing result information.

Note that the frequency used by second sensing apparatus ay211 is a second frequency (band).

Communication apparatus ay221 receives inputs of third control signal ay233 and data ay242, and when the third control signal ay233 instructs to implement communication, implements, for example, error correction coding, modulation, and processing for communication on data ay242, generates and outputs a transmission signal (ay222), and the transmission signal is output from antenna ay223 as radio waves. Note that when it is necessary to transmit information ay234 including the first sensing result information and information ay235 including the second sensing result information to another apparatus, communication apparatus ay221 may receive an input of information ay234 including the first sensing result information and information ay235 including the second sensing result information, and generate and output a transmission signal including information ay234 including the first sensing result information and information ay235 including the second sensing result information.

When third control signal ay233 instructs to implement communication, communication apparatus ay221 receives an input of a received signal (ay222) received at antenna ay223, implements processing such as demodulation and error correction decoding, and outputs received data ay241.

Controller ay230 receives inputs of signal ay251, information ay234 including the first sensing result information, information ay235 including the second sensing result information, and received data ay241, outputs first control signal ay231, second control signal ay232, and third control signal ay233 for controlling first sensing apparatus ay201, second sensing apparatus ay211, and communication apparatus ay221, and also outputs control information ay252. The control of first sensing apparatus ay201, second sensing apparatus ay211, and communication apparatus ay221 is described in greater detail below.

FIG. 151A illustrates an example of a state of first apparatus ay301 having the configuration illustrated in FIG. 150 and second apparatus ay302 having the configuration illustrated in FIG. 150. Here, second apparatus ay302 transmits a signal for sensing using the first frequency (band).

First apparatus ay301 receives the signal for sensing of the first frequency (band) transmitted by second apparatus ay302, and performs sensing on the second apparatus ay302.

Note that as the procedures up through first apparatus ay301 sensing second apparatus ay302 using the signal for sensing transmitted by second apparatus ay302 have already been described in other embodiments, repeated description will be omitted here.

Hereinafter, the range in which sensing is possible of the signal for sensing of the first frequency (band) is greater than the range in which sensing is possible of the signal for sensing of the second frequency (band).

As one example, the first frequency (band) is an unlicensed band in the 60 GHz band, and the second frequency (band) is an unlicensed band in 2.4 GHz band (or a licensed band in the 5 GHz or 6 GHz band). Here, the frequency range of the signal for sensing of the second frequency (band) is likely to be wider than the frequency range of the signal for sensing of the first frequency (band), and in such cases, when sensing is performed in the second frequency (band), it is possible to perform highly accurate sensing estimation.

As another example, the first frequency (band) is the 5 GHz band (or 6 GHz band), and the second frequency (band) is the 2.4 GHz band.

First apparatus ay301 processes the signal for sensing of the first frequency (band) transmitted by second apparatus ay302 at first sensing apparatus ay201 illustrated in FIG. 150. Here, information ay234 included in the first sensing result information includes information indicating that the reception quality of the signal for sensing of the first frequency (band) has decreased.

Controller ay230 illustrated in FIG. 150 that is included in first apparatus ay301 receives an input of information ay234 including first sensing result information that includes the information indicating that the reception quality of the signal for sensing of the first frequency (band) has decreased, and based on the information indicating that the reception quality of the signal for sensing of the first frequency (band) has decreased, determines to change the frequency of the signal for sensing to the second frequency (band). Accordingly, controller ay230 illustrated in FIG. 150 that is included in first apparatus ay301 outputs, as control information ay252, information indicating that the frequency of the signal for sensing is to be changed to the second frequency (band). Controller ay230 illustrated in FIG. 150 that is included in first apparatus ay301 also outputs, as third control signal ay233, information instructing implementation of communication.

With this, as illustrated in FIG. 151B, communication apparatus ay221 of first apparatus ay301 having the configuration illustrated in FIG. 150 generates, in accordance with the instruction to implement communication made via third control signal ay233, a modulated signal including information related to a request to change the frequency of the signal for sensing to the second frequency (band) that is included in control information ay252, and transmits this modulated signal to second apparatus ay302.

Communication apparatus ay221 of second apparatus ay302 having the configuration illustrated in FIG. 150 receives this modulated signal, and performs processing such as demodulation and error correction decoding to obtain received data ay242. Here, received data ay242 includes the information related to the request to change the frequency of the signal for sensing to the second frequency (band).

Controller ay230 of second apparatus ay302 receives an input of received data ay242, and based on the information related to the request to change the frequency of the signal for sensing to the second frequency (band), outputs second control signal ay232 including information instructing the transmission of the signal for sensing.

Accordingly, as illustrated in FIG. 151C, second sensing apparatus ay211 of second apparatus ay302 having the configuration illustrated in FIG. 150 receives an input of second control signal ay232, and generates and outputs a signal for sensing based on the information instructing the transmission of the signal for sensing that is included in second control signal ay232. This signal for sensing is then output from antenna ay213 as radio waves. Note that this signal for sensing is a signal of the second frequency (band).

In the above description, taking into consideration ensuring communication distance, one suitable method is to use the second frequency in the communication between first apparatus ay301 and second apparatus ay302. Moreover, a frequency other than the first frequency (band) and the second frequency (band) may be used in the communication between first apparatus ay301 and second apparatus ay302. However, the frequency (band) used in the communication between first apparatus ay301 and second apparatus ay302 is not limited to these examples.

First apparatus ay301 may communicate with second apparatus ay302 via some other apparatus (for example, an access point, a repeater, or a base station or the like). Second apparatus ay302 may communicate with first apparatus ay301 via some other apparatus (for example, an access point, a repeater, or a base station or the like).

First apparatus ay301 and second apparatus ay302 illustrated in FIG. 151A, FIG. 151B, and FIG. 151C may be expressed as follows.

FIG. 151D illustrates another example of first apparatus ay301 and second apparatus ay302 having the configuration of FIG. 150 (i.e., first apparatus ay311 and second apparatus ay312).

First apparatus ay311 includes communication unit ay315 and controller ay316.

Communication unit ay315 receives frames transmitted via radio waves by second apparatus ay312 and senses second apparatus ay312 using the received frames.

Controller ay316 selects a frequency of the radio waves to be transmitted by second apparatus ay312 from among predetermined frequencies, notifies second apparatus ay312 of the selected frequency, and controls communication unit ay315 to perform sensing using this frequency. The notification of the frequency may be a request to change the frequency.

Here, when selecting a frequency, controller ay316 may do so independent of the frequency that communication unit ay315 uses for communication.

The sensing may include at least one of processing of detecting a position of an object, processing of detecting presence or absence of an object, or processing of detecting a shape of an object, by analyzing the radio waves received by communication unit ay315.

Second apparatus ay312 includes communication unit ay317 and controller ay318.

Communication unit ay317 transmits a frame for sensing via radio waves.

Controller ay318 receives the notification of the frequency from first apparatus ay311, and controls communication unit ay317 to transmit a frame via radio waves using the frequency indicated in the notification.

Here, communication unit ay317 may transmit, as this frame, a frame that includes a preamble and does not include a data field.

By switching the frequency band used by the signal for sensing as described above, the advantageous effect whereby first apparatus ay301 can continuously perform sensing of second apparatus ay302 can be achieved.

Although communication apparatus ay221 of second apparatus ay302 transmits information related to a request to change the frequency of the signal for sensing to the second frequency (band) (or the first frequency (band)), communication apparatus ay221 in first apparatus ay301 may, after receiving the information related to a request to change the frequency of the signal for sensing to the second frequency (band) (or the first frequency (band)), transmits, to second apparatus ay302, response information as to whether to change the frequency of the signal for sensing to the second frequency (band) (or the first frequency (band)).

Next, another operation example will be given.

FIG. 151A illustrates an example of a state of first apparatus ay301 having the configuration illustrated in FIG. 150 and second apparatus ay302 having the configuration illustrated in FIG. 150. Here, second apparatus ay302 transmits a signal for sensing using the second frequency (band).

First apparatus ay301 receives the signal for sensing of the second frequency (band) transmitted by second apparatus ay302, and performs sensing on the second apparatus ay302.

Note that as the procedures up through first apparatus ay301 sensing second apparatus ay302 using the signal for sensing transmitted by second apparatus ay302 have already been described in other embodiments, repeated description will be omitted here.

Hereinafter, the range in which sensing is possible of the signal for sensing of the first frequency (band) is greater than the range in which sensing is possible of the signal for sensing of the second frequency (band).

As one example, the first frequency (band) is an unlicensed band in the 60 GHz band, and the second frequency (band) is an unlicensed band in 2.4 GHz band (or a licensed band in the 5 GHz or 6 GHz band). Here, the frequency range of the signal for sensing of the second frequency (band) is likely to be wider than the frequency range of the signal for sensing of the first frequency (band), and in such cases, when sensing is performed in the second frequency (band), it is possible to perform highly accurate sensing estimation.

First apparatus ay301 processes the signal for sensing of the second frequency (band) transmitted by second apparatus ay302 at second sensing apparatus ay211 illustrated in FIG. 150. Here, information ay235 included in the second sensing result information includes information indicating that the reception quality of the signal for sensing of the second frequency (band) has improved.

Controller ay230 illustrated in FIG. 150 that is included in first apparatus ay301 receives an input of information ay235 including second sensing result information that includes the information indicating that the reception quality of the signal for sensing of the second frequency (band) has improved, and based on the information indicating that the reception quality of the signal for sensing of the second frequency (band) has improved, determines to change the frequency of the signal for sensing to the first frequency (band). Accordingly, controller ay230 illustrated in FIG. 150 that is included in first apparatus ay301 outputs, as control information ay252, information indicating that the frequency of the signal for sensing is to be changed to the first frequency (band). Controller ay230 illustrated in FIG. 150 that is included in first apparatus ay301 also outputs, as third control signal ay233, information instructing implementation of communication.

With this, as illustrated in FIG. 151B, communication apparatus ay221 of first apparatus ay301 having the configuration illustrated in FIG. 150 generates, in accordance with the instruction to implement communication made via third control signal ay233, a modulated signal including information related to a request to change the frequency of the signal for sensing to the first frequency (band) that is included in control information ay252, and transmits this modulated signal to second apparatus ay302.

Communication apparatus ay221 of second apparatus ay302 having the configuration illustrated in FIG. 150 receives this modulated signal, and performs processing such as demodulation and error correction decoding to obtain received data ay242. Here, received data ay242 includes the information related to the request to change the frequency of the signal for sensing to the first frequency (band).

Controller ay230 of second apparatus ay302 receives an input of received data ay242, and based on the information related to the request to change the frequency of the signal for sensing to the first frequency (band), outputs second control signal ay232 including information instructing the transmission of the signal for sensing.

Accordingly, as illustrated in FIG. 151A, second sensing apparatus ay211 of second apparatus ay302 having the configuration illustrated in FIG. 150 receives an input of second control signal ay232, and generates and outputs a signal for sensing based on the information instructing the transmission of the signal for sensing that is included in second control signal ay232. This signal for sensing is then output from antenna ay213 as radio waves. Note that this signal for sensing is a signal of the first frequency (band).

FIG. 152A illustrates one example of a configuration of first apparatus ay301 and second apparatus ay302, and first apparatus ay301 and second apparatus ay302 include, for example, sensing and communication apparatus ay401, capturing apparatus ay402, display ay403, and signal processor ay404. Note that sensing and communication apparatus ay401 for example includes the configuration illustrated in FIG. 150 (but may have a configuration that does not include a communication apparatus).

FIG. 152B illustrates an example of a configuration of first apparatus ay301 and second apparatus ay302 that differs from FIG. 152A, and elements that operate in the same manner as in FIG. 152A have the same reference signs and repeated description will be omitted. First apparatus ay301 and second apparatus ay302 include position estimator ay405 such as a global positioning system (GPS). First apparatus ay301 and second apparatus ay302 may include elements other than those illustrated in the examples of FIG. 152A and FIG. 152B.

For example, in FIG. 151A and FIG. 151C, first apparatus ay301 receives a signal for sensing transmitted by second apparatus ay302, and estimates, for example, position. When first apparatus ay301 has the configuration illustrated in FIG. 152, sensing and communication apparatus ay401 estimates sensing result information.

Capturing apparatus ay402 of first apparatus ay301 obtains image information, such as a still image or video, of the surrounding area, and outputs it.

Signal processor ay404 receives an input of the sensing result information and image information, estimates which position second apparatus ay302 is at in the image, and outputs an image appended with position information of second apparatus ay302. Note that second position information output by position estimator ay405 may be used to calculate the position of second apparatus ay302.

Display ay403 receives an input of the image appended with position information of second apparatus ay302, and displays the image and the position of second apparatus ay302 on the image.

FIG. 153A illustrates an example of the display of the image and the position of second apparatus ay302 on the image by display ay403. For example, screen ay500 includes a person, a building, and road ay503. For example, second apparatus ay302 is located in the direction of double circle ay501, so double circle ay501 is displayed on screen ay500 as illustrated in FIG. 153A. In order to indicate distance, the size of the double circle may be changed.

For example, double circle sizes include a small double circle ay601, a medium double circle ay602, and a large double circle ay603 as illustrated in FIG. 154A. When second apparatus ay302 is within 10 meters, inclusive, of first apparatus ay301, display ay403 displays the large double circle ay603 along with the image. When second apparatus ay302 is between 10 meters and 20 meters, inclusive, of first apparatus ay301, display ay403 displays the medium double circle ay602 along with the image. When second apparatus ay302 is 20 meters or farther away from first apparatus ay301, display ay403 displays the small double circle ay601 along with the image. An estimated value of second apparatus ay302 from first apparatus ay301 may be displayed along with the image.

Although three sizes of double circles are exemplified in FIG. 154A, this is merely one non-limiting example, capability of displaying one or more sizes is sufficient. Moreover, the implementation method is not limited to the above example. A double circle is given as an example, but the above can be implemented in the same manner even if some other symbol, image, or character is used.

FIG. 153B illustrates an example, which differs from FIG. 153A, of the display of the image and the position of second apparatus ay302 on the image by display ay403. For example, screen ay500 includes a person, a building, and road ay503. For example, second apparatus ay302 is located in the direction of arrow ay502, so arrow ay502 is displayed on screen ay500 as illustrated in FIG. 153B. In order to indicate distance, the length of the arrow may be changed.

For example, arrow lengths include a small arrow ay611, a medium arrow ay612, and a large arrow ay613 as illustrated in FIG. 154B.

When second apparatus ay302 is within 10 meters, inclusive, of first apparatus ay301, display ay403 displays the large arrow ay613 along with the image. When second apparatus ay302 is between 10 meters and 20 meters, inclusive, of first apparatus ay301, display ay403 displays the medium arrow ay612 along with the image. When second apparatus ay302 is 20 meters or farther away from first apparatus ay301, display ay403 displays the small arrow ay611 along with the image. An estimated value of second apparatus ay302 from first apparatus ay301 may be displayed along with the image.

Although three sizes of arrows are exemplified in FIG. 154B, this is merely one non-limiting example, capability of displaying one or more sizes is sufficient. Moreover, instead of different lengths of arrows, distance may be expressed using different thicknesses of arrows. Moreover, the implementation method is not limited to the above example. An arrow is given as an example, but the above can be implemented in the same manner even if some other symbol, image, or character is used.

As described above, by enabling the user to determine the distance of the target from him or herself (for example, the distance between first apparatus ay301 and second apparatus ay302) by using different sized characters or symbols such as arrows, it is possible to achieve the advantageous effect that the user can easily know the location of the target.

Note that display ay403 may display a map of the area around its location (for example, the location of first apparatus ay301), and may indicate the location of the target (for example, second apparatus ay302) on the displayed map. Here, information related to the position of first apparatus ay301 is obtained from position estimator ay405 illustrated in FIG. 152B.

In FIG. 152A and FIG. 152B, display unit ay403 may be a separate device, in which case first apparatus ay301 and second apparatus ay302 may include an interface for wireless or wired connection to display unit ay403.

Display ay403 may be a display, AR/VR/MR glasses, or the like.

Although the above describes a method of displaying the position of a target on an image obtained by capturing apparatus ay402 (also referred to as a first display method) and a method of displaying the position of a target on a map of the area around its location (also referred to as a second display method), first apparatus ay301 may, for example, switch between the first display method and the second display method, and, alternatively, may simultaneously use the first and second display methods.

Although an example is given above in which first apparatus ay301 that receives the signal transmitted by second apparatus ay302 senses second apparatus ay302, the application of the first and second display methods can be implemented in the same manner for other sensing methods as well. Note that other sensing methods have already been described in another embodiment.

For example, when the target is sensed by first apparatus ay301 transmitting a signal for sensing and then receiving that signal for sensing, the target's location is displayed on first apparatus ay301 in both the first and second display methods.

For example, when triangulation is implemented using first apparatus ay301 and the third apparatus and the position or the like of the target is sensed by first apparatus ay301, the target's location is displayed on first apparatus ay301 in both the first and second display methods.

When a mobile apparatus that includes a drive unit—such as an electric motorcycle (e-motorcycle), an electric kick scooter, a vacuum cleaner, an electric automobile, an electric power-assisted automobile, an electric power-assisted kick scooter, a motorcycle, an automobile, a robot, or a bicycle—includes first apparatus ay301, first apparatus ay301 senses second apparatus ay302 or a target and estimates the position or the like of second apparatus ay302 or the target. Here, first apparatus ay301 may continuously estimate the position of second apparatus ay302 or the target, and the mobile apparatus that includes first apparatus ay301 may control the drive unit so as to follow the movement of second apparatus ay302 or the target.

Embodiment 28

The method of sensing and the method of estimation using sensing is not limited to the methods described in the present specification. For example, the following methods may be used.

When sensing for detecting recesses and protrusions in an object is used, absolute distance information is not necessarily required. For example, suppose that an apparatus transmits a signal for sensing at regular intervals. An apparatus that receives these signals for sensing then detects delays in the signals for sensing from the regular interval. These delays can be converted into distance to detect recesses and protrusions in an object.

Hereinafter, a specific example of operations will be given.

FIG. 155 illustrates an example of the system configuration according to the present embodiment. First apparatus ay701 transmits a signal for sensing and estimates, for example, the shape or recesses and protrusions of target ay701. More specifically, first apparatus ay701 transmits a signal for sensing toward target ay702, receives the signal for sensing that reflects off the target, and estimates the shape or recesses and protrusions of target ay702. Here, first apparatus ay701 performs transmission directionality control (transmission beamforming), for example. The transmitted beam is changed temporally.

FIG. 156A illustrates target ay702 divided into nine regions. For example, first apparatus ay701 targets region ay801 illustrated in FIG. 156A, performs transmission directionality control (transmission beamforming), and transmits a signal for sensing.

Thereafter, first apparatus ay701 targets region ay802 illustrated in FIG. 156A, performs transmission directionality control (transmission beamforming), and transmits a signal for sensing.

First apparatus ay701 transmits signals for sensing in the following order.

First apparatus ay701 targets region ay803 illustrated in FIG. 156A, performs transmission directionality control (transmission beamforming), and transmits a signal for sensing.

First apparatus ay701 targets region ay804 illustrated in FIG. 156A, performs transmission directionality control (transmission beamforming), and transmits a signal for sensing.

First apparatus ay701 targets region ay805 illustrated in FIG. 156A, performs transmission directionality control (transmission beamforming), and transmits a signal for sensing.

First apparatus ay701 targets region ay806 illustrated in FIG. 156A, performs transmission directionality control (transmission beamforming), and transmits a signal for sensing.

First apparatus ay701 targets region ay807 illustrated in FIG. 156A, performs transmission directionality control (transmission beamforming), and transmits a signal for sensing.

First apparatus ay701 targets region ay808 illustrated in FIG. 156A, performs transmission directionality control (transmission beamforming), and transmits a signal for sensing.

First apparatus ay701 targets region ay809 illustrated in FIG. 156A, performs transmission directionality control (transmission beamforming), and transmits a signal for sensing.

Note that the order in which first apparatus ay701 transmits signals for sensing to the regions is not limited to the above example.

FIG. 156B illustrates an example of the transmission of signals for sensing by first apparatus ay701. Time is represented on the horizontal axis.

As illustrated in FIG. 156B, first apparatus ay701 transmits frame ay811 for region ay801 to region ay801 as a signal for sensing.

Next, first apparatus ay701 transmits frame ay812 for region ay802 to region ay802 as a signal for sensing.

Thereafter, first apparatus ay701 performs the following transmission.

First apparatus ay701 transmits frame ay813 for region ay803 to region ay803 as a signal for sensing.

First apparatus ay701 transmits frame ay814 for region ay804 to region ay804 as a signal for sensing.

First apparatus ay701 transmits frame ay815 for region ay805 to region ay805 as a signal for sensing.

First apparatus ay701 transmits frame ay816 for region ay806 to region ay806 as a signal for sensing.

First apparatus ay701 transmits frame ay817 for region ay807 to region ay807 as a signal for sensing.

First apparatus ay701 transmits frame ay818 for region ay808 to region ay808 as a signal for sensing.

First apparatus ay701 transmits frame ay819 for region ay809 to region ay809 as a signal for sensing.

However, only frame ay811 for region ay801, frame ay812 for region ay802, frame ay813 for region ay803, and frame ay814 for region ay804 are shown in FIG. 156B.

Here, as illustrated in FIG. 156B, the time interval of frame ay811 for region ay801 and frame ay812 for region ay802 is T1. The time intervals span between the starting points of two frames.

The time interval of frame ay812 for region ay802 and frame ay813 for region ay803 is T2.

The time interval of frame ay813 for region ay803 and frame ay814 for region ay804 is T3.

The time intervals are set in a similar manner, but description is omitted here.

First apparatus ay701 receives the signals for sensing transmitted as illustrated in FIG. 156B. FIG. 156C illustrates an example of the reception of these signals for sensing by first apparatus ay701.

As illustrated in FIG. 156C, first apparatus ay701 receives frame ay821_1 for region ay801, frame ay822_1 for region ay802, frame ay823_1 for region ay803, frame ay824_1 for region ay804, and so on.

In FIG. 156B, the time interval of frame ay811 for region ay801 and frame ay812 for region ay802 is T1, and in FIG. 156C, the time interval of frame ay821_1 for region ay801 and frame ay822_1 for region ay802 is T1.

In this case, since there is no change between the transmission time interval (T1) and the reception time interval, we know that there is no change between the distance between first apparatus ay701 and region ay801 and the distance between first apparatus ay701 and region ay802. In other words, as illustrated in FIG. 157A, we know that regions ay801 and ay802 are flat (i.e., have no recesses or protrusions). In FIG. 157A, distance is represented on the vertical axis and regions are represented on the horizontal axis.

In FIG. 156B, the time interval of frame ay812 for region ay802 and frame ay813 for region ay803 is T2, and in FIG. 156C, the time interval of frame ay823_1 for region ay803 and frame ay822_1 for region ay802 is T2.

In this case, since there is no change between the transmission time interval (T2) and the reception time interval, we know that there is no change between the distance between first apparatus ay701 and region ay802 and the distance between first apparatus ay701 and region ay803. In other words, as illustrated in FIG. 157A, we know that regions ay802 and ay803 are flat (i.e., have no recesses or protrusions).

In FIG. 156B, the time interval of frame ay813 for region ay803 and frame ay814 for region ay804 is T3, and in FIG. 156C, the time interval of frame ay823_1 for region ay803 and frame ay824_1 for region ay804 is T3.

In this case, since there is no change between the transmission time interval (T3) and the reception time interval, we know that there is no change between the distance between first apparatus ay701 and region ay803 and the distance between first apparatus ay701 and region ay804. In other words, we know that regions ay803 and ay804 are flat (i.e., have no recesses or protrusions). The relationship between region ay801 and region ay804 will be flat (i.e., have no recesses or protrusions), as in FIG. 157B, considering FIG. 157A. In FIG. 157B, distance is represented on the vertical axis and regions are represented on the horizontal axis.

Next, another example will be given.

First apparatus ay701 receives the signals for sensing transmitted as illustrated in FIG. 156B. FIG. 156D illustrates an example, which differs from FIG. 156C, of the reception of these signals for sensing by first apparatus ay701.

As illustrated in FIG. 156D, first apparatus ay701 receives frame ay821_2 for region ay801, frame ay822_2 for region ay802, frame ay823_2 for region ay803, frame ay824_2 for region ay804, and so on.

In FIG. 156B, the time interval of frame ay811 for region ay801 and frame ay812 for region ay802 is T1, and in FIG. 156D, the time interval of frame ay821_2 for region ay801 and frame ay822_2 for region ay802 is T1−ΔTx1.

In this case, since the reception time interval is T1−ΔTx1 relative to the transmission time interval (T1), we know that there is an amount of change of −ΔTx1, and thus there is a change in the distance between first apparatus ay701 and region ay801 and the distance between first apparatus ay701 and region ay802 that is equivalent to the amount expressed by −ΔTx1. In other words, as illustrated in FIG. 157C, the distance between region ay801 and region ay802 changes by an amount of −ΔTx1, indicating a recess. In FIG. 157C, distance is represented on the vertical axis and regions are represented on the horizontal axis.

In FIG. 156B, the time interval of frame ay812 for region ay802 and frame ay813 for region ay803 is T2, and in FIG. 156D, the time interval of frame ay822_2 for region ay802 and frame ay823_2 for region ay803 is T2+ΔTx2.

In this case, since the reception time interval is T2+ΔTx2 relative to the transmission time interval (T2), we know that there is an amount of change of +ΔTx2, and thus there is a change in the distance between first apparatus ay701 and region ay802 and the distance between first apparatus ay701 and region ay803 that is equivalent to the amount expressed by +ΔTx2. In other words, as illustrated in FIG. 157C, the distance between region ay802 and region ay803 changes by an amount of +ΔTx2, indicating a protrusion.

In FIG. 156B, the time interval of frame ay813 for region ay803 and frame ay814 for region ay804 is T3, and in FIG. 156C, the time interval of frame ay823_1 for region ay803 and frame ay824_1 for region ay804 is T3+ΔTx3.

In this case, since the reception time interval is T3+ΔTx3 relative to the transmission time interval (T3), we know that there is an amount of change of +ΔTx3, and thus there is a change in the distance between first apparatus ay701 and region ay803 and the distance between first apparatus ay701 and region ay804 that is equivalent to the amount expressed by +ΔTx3. In other words, the distance between region ay803 and region ay804 changes by an amount of +ΔTx3, indicating a protrusion. The relationship between region ay801 and region ay804 will be protruding, as in FIG. 157D, considering FIG. 157C. In FIG. 157D, distance is represented on the vertical axis and regions are represented on the horizontal axis.

By implementing the above example, it is possible to achieve the advantageous effect of knowing recesses and protrusions in a plurality of regions, that is, the unevenness of an object, without having to estimate the absolute distances of the regions.

In the above example, when there is a first frame and a frame immediately before the first frame (referred to here as a "second frame"), the difference between distances to the region corresponding to the first frame and the region corresponding to the second frame is calculated. In this example, the difference between the distances to the region corresponding to the first frame is calculated with reference to the second frame, but the frame serving as the reference may be some other frame.

For example, in the above description, the difference between distances to regions ay804 and ay803 is calculated using the frame for region ay804 and the frame for region ay803, but the difference between distances to regions ay804 and ay802 may be calculated using the frame for region ay804 and the frame for region ay802, and the difference between distances to regions ay804 and ay801 may be calculated using the frame for region ay804 and the frame for region ay801. Note that frames used for calculating the difference between distances to two regions are not limited to these examples.

Note that any sort of sensing method may be used when estimating recesses and protrusions as described above.

Moreover, the transmission of the signals for sensing by first apparatus ay701 is not limited to the example illustrated in FIG. 156B. Next, an example will be given.

When first apparatus ay701 senses target ay702 like in FIG. 155, target ay702 may be divided into 16 regions like in FIG. 158A rather than 9 regions like in FIG. 156A, and the signals for sensing may be transmitted by first apparatus ay701 like in FIG. 158B and FIG. 158C.

FIG. 158B and FIG. 158C illustrates an example of the transmission of signals for sensing by first apparatus ay701. Time is represented on the horizontal axis.

As illustrated in FIG. 158B, first apparatus ay701 transmits frame ay1051 for region ay1001 to region ay1001 as a signal for sensing. Note that frame ay1051 for region ay1001 is a frame for first apparatus ay701 to estimate the recess or protrusion of region ay1001.

Thereafter, first apparatus ay701 performs the following transmission.

First apparatus ay701 transmits frame ay1052 for region ay1002 to region ay1002 as a signal for sensing. Note that frame ay1052 for region ay1002 is a frame for first apparatus ay701 to estimate the recess or protrusion of region ay1002.

First apparatus ay701 transmits frame ay1053 for region ay1003 to region ay1003 as a signal for sensing. Note that frame ay1053 for region ay1003 is a frame for first apparatus ay701 to estimate the recess or protrusion of region ay1003.

First apparatus ay701 transmits frame ay1054 for region ay1004 to region ay1004 as a signal for sensing. Note that frame ay1054 for region ay1004 is a frame for first apparatus ay701 to estimate the recess or protrusion of region ay1004.

First apparatus ay701 transmits frame ay1055 for region ay1005 to region ay1005 as a signal for sensing. Note that frame ay1055 for region ay1005 is a frame for first apparatus ay701 to estimate the recess or protrusion of region ay1005.

First apparatus ay701 transmits frame ay1056 for region ay1006 to region ay1006 as a signal for sensing. Note that frame ay1056 for region ay1006 is a frame for first apparatus ay701 to estimate the recess or protrusion of region ay1006.

First apparatus ay701 transmits frame ay1057 for region ay1007 to region ay1007 as a signal for sensing. Note that frame ay1057 for region ay1007 is a frame for first apparatus ay701 to estimate the recess or protrusion of region ay1007.

First apparatus ay701 transmits frame ay1058 for region ay1008 to region ay1008 as a signal for sensing. Note that frame ay1058 for region ay1008 is a frame for first apparatus ay701 to estimate the recess or protrusion of region ay1008.

Here, frame ay1051 for region ay1001, frame ay1052 for region ay1002, frame ay1053 for region ay1003, frame ay1054 for region ay1004, frame ay1055 for region ay1005, frame ay1056 for region ay1006, frame ay1057 for region ay1007, and frame ay1058 for region ay1008 are present in a first time interval.

As illustrated in FIG. 158C, first apparatus ay701 transmits frame ay1079 for region ay1009 to region ay1009 as a signal for sensing. Note that frame ay1079 for region ay1009 is a frame for first apparatus ay701 to estimate the recess or protrusion of region ay1009.

Thereafter, first apparatus ay701 performs the following transmission.

First apparatus ay701 transmits frame ay1080 for region ay1010 to region ay1010 as a signal for sensing. Note that frame ay1080 for region ay1010 is a frame for first apparatus ay701 to estimate the recess or protrusion of region ay1010.

First apparatus ay701 transmits frame ay1081 for region ay1011 to region ay1011 as a signal for sensing. Note that frame ay1081 for region ay1011 is a frame for first apparatus ay701 to estimate the recess or protrusion of region ay1011.

First apparatus ay701 transmits frame ay1082 for region ay1012 to region ay1012 as a signal for sensing. Note that frame ay1082 for region ay1012 is a frame for first apparatus ay701 to estimate the recess or protrusion of region ay1012.

First apparatus ay701 transmits frame ay1083 for region ay1013 to region ay1013 as a signal for sensing. Note that frame ay1083 for region ay1013 is a frame for first apparatus ay701 to estimate the recess or protrusion of region ay1013.

First apparatus ay701 transmits frame ay1084 for region ay1014 to region ay1014 as a signal for sensing. Note that frame ay1084 for region ay1014 is a frame for first apparatus ay701 to estimate the recess or protrusion of region ay1014.

First apparatus ay701 transmits frame ay1085 for region ay1015 to region ay1015 as a signal for sensing. Note that frame ay1085 for region ay1015 is a frame for first apparatus ay701 to estimate the recess or protrusion of region ay1015.

First apparatus ay701 transmits frame ay1086 for region ay1016 to region ay1016 as a signal for sensing. Note that frame ay1086 for region ay1016 is a frame for first apparatus ay701 to estimate the recess or protrusion of region ay1016.

Here, frame ay1079 for region ay1009, frame ay1080 for region ay1010, frame ay1081 for region ay1011, frame ay1082 for region ay1012, frame ay1083 for region ay1013, frame ay1084 for region ay1014, frame ay1085 for region ay1015, and frame ay1086 for region ay1016 are present in a first time interval. The first time interval includes a time interval in which a plurality of frames are transmitted at the same time period.

In this way, the recesses and protrusions of a plurality of regions may be estimated by transmitting a plurality of transmission beams in the same time period.

In FIG. 156B, FIG. 158B, and FIG. 158C, the frame intervals are exemplified as being set as T1, T2, . . . , and so on, but the values of these intervals may be set by first apparatus ay701 (and may be a fixed value). This will be described next.

FIG. 159 illustrates an example of a signal transmitted by first apparatus ay701 illustrated in FIG. 155. In FIG. 159, time is represented on the horizontal axis.

In FIG. 159, frame (1) for recess/protrusion estimation labeled ay1111_1, frame (2) for recess/protrusion estimation labeled ay1111_2, and so on are frames for estimating the regions illustrated in FIG. 156B, FIG. 158B, and FIG. 158C (for example, the frame for region ay801).

Training symbol ay1101 is a symbol for setting "T" (the length between frames) in FIG. 159, that is, a symbol for setting, for example, T1, T2, and T3 in FIG. 156B, and T1, T2, T3, . . . , T9, T10, and T11 in FIG. 158B and FIG. 158C.

First apparatus ay701 illustrated in FIG. 155 transmits training symbol ay1101 illustrated in FIG. 159. Training symbol ay1101 reflects off target ay702 and is received by first apparatus ay701. First apparatus ay701 thus knows the time of transmission and time of reception of training symbol ay1101. The interval between the transmission timing and the reception timing is expressed as X. When X is set greater than T1, T2, and T3 in FIG. 156B, T1, T2, T3, . . . , T9, T10, and T11 in FIG. 158B and FIG. 158C, and T in FIG. 159, it is possible to reduce interference between transmitted and received signals. Thus, T1, T2, and T3 in FIG. 156B, T1, T2, T3, . . . , T9, T10, and T11 in FIG. 158B and FIG. 158C, and T in FIG. 159 are set in this manner.

Moreover, in FIG. 155, assume first apparatus ay701 is estimating the recesses and protrusions of target ay702 in response to a request from a second apparatus. Here, when first apparatus ay701 transmits information indicating the recess/protrusion estimation of target ay702 to the second apparatus, first apparatus ay701 transmits information indicating an amount of change in distance (information indicating a difference in distances) to the second apparatus. Moreover, as described in other embodiments, when it is necessary to transmit the information to another apparatus such as a server or cloud server, first apparatus ay701 transmits information indicating an amount of change in distance (information indicating a difference in distances) to the other apparatus.

Note that the present embodiment may be combined with one or more other embodiments and carried out. For example, when combined with Embodiment 10, it is possible to detect recesses and protrusions of an object in three dimensions, and detect recesses and protrusion of intricate sections that would be difficult to detect with the naked eye such as sections that are dark from being in the shade.

Although the regions are exemplified as quadrilateral regions in FIG. 156A and FIG. 158A, this is merely for the sake of facilitating the explanation, and is a non-limiting example.

By, at any point in time, first apparatus ay791 performs sensing for estimating the distance between any region in FIG. 156A of target ay702 and first apparatus ay791 (or another device), and also estimates the recess or protrusion of each region of target ay702 as described above, first apparatus ay791 can estimate the distance between each region of target ay702 and first apparatus ay791 (or another apparatus).

For example, in FIG. 156B, at any given point in time, first apparatus ay791 implements sensing for estimating the distance between any region of target ay702 in FIG. 156A and first apparatus ay791 (or another apparatus). Examples of sensing methods for estimating distance are described in other embodiments.

Embodiment 29

In the present embodiment, a configuration in which the first apparatus ay701 illustrated in FIG. 155 includes a plurality of sensing units will be described.

FIG. 160A illustrates an example of a configuration of first apparatus ay701.

As illustrated in FIG. 160A, first apparatus ay701 includes a plurality of sensing units, a plurality of processing/control units, and a signal processor.

Each of the plurality of sensing units performs sensing of a target using radio waves. The frequency used for transmission and reception may be settable in each sensing unit. The frequency used for transmission and reception may be different in each sensing unit (alternatively, the frequency may be the same).

For example, the topmost sensing unit may use a first frequency for transmission and reception, and the bottommost sensing unit may use a second frequency for transmission and reception. One or more of the plurality of sensing units may be sensing units that use light such as visible light.

The plurality of processing/control units are provided in one-to-one correspondence with the plurality of sensing units, and are provided at a later stage in the circuit than the sensing units.

Each of the plurality of processing/control units performs object recognition or object recess/protrusion estimation on a sensing result output by the corresponding sensing unit.

The signal processor generates and outputs object recognition information that is a combination of the information on object recognition obtained by the plurality of processing/control units. Alternatively, the signal processor generates and outputs object recess/protrusion information that is a combination of the object recess/protrusion estimation information obtained by the plurality of processing/control units. The signal processor performs scheduling of which specific positions are to be sensed by the plurality of sensing units based on the object recognition information or the object recess/protrusion estimation information obtained by the plurality of processing/control units.

FIG. 160B illustrates another example of a configuration of first apparatus ay701.

With the configuration illustrated in FIG. 160B, just like the configuration illustrated in FIG. 160A, first apparatus ay701 includes a plurality of sensing units, a plurality of processing/control units, and a signal processor. The plurality of processing/control units are connected together and can transmit and receive signals.

With the configuration of FIG. 160B, it is possible for one processing/control unit to instruct the obtainment of estimation information generated by another processing/control unit, and to control which locations are sensed by the sensing unit.

Note this applies to sensing using light such as visible light in addition to sensing using radio waves.

Moreover, a different target may be sensed by each of the plurality of sensing units.

Embodiment 30

While an example of control of audio equipment N702 based on a sensing result was described in Embodiment 8 (see, for example, FIG. 50) and the like, another implementation example will be given in the present embodiment.

FIG. 161 illustrates an example of an arrangement of speakers.

As illustrated in FIG. 161, a plurality of speakers (speaker #1, speaker #2, . . . , speaker #M (M is an integer greater than or equal to 1 or greater than or equal to 2)) are aligned along, for example, an aisle. The location where the loudspeakers are aligned may be, for example, an aisle, a hallway, a room, or stairs.

Speaker #i (i is an integer greater than or equal to 1 and less than or equal to M) may include a plurality of speakers. Each speaker may be equipped with an amplifying function, and each speaker may be audio equipment.

Audio equipment N702 described in other embodiments may include a plurality of speakers.

Each speaker or audio equipment N702 may include one or more microphones or two or more microphones, and may record sound (audio) based on sensing. The recorded sound (audio) information may be uploaded to cloud server N720 and/or server Q101. Cloud server N720 and/or server Q101 may transmit the sound (audio) information to audio equipment N702 and/or a speaker to reproduce the sound.

Each speaker may communicate with an AP, repeater, and/or a terminal. The speakers may also be able to communicate with each other. Note that the communication may be wireless or wired.

Each speaker plays audio such as sound or speech based on instructions from the AP, repeater, terminal, cloud server N702, and/or server Q101.

Each speaker may include a sensing function. The sensing result can be uploaded to cloud server N702 and/or server Q101 via the AP, repeater, terminal, and/or network.

As illustrated in FIG. 161, a plurality of speakers including speaker #1 are arranged along, for example, an aisle, hallway, room or stairs. According to the sensing result, for example, movement of a moving object (such as a person) is detected, and audio such as sound or speech is played in accordance with the movement of the moving object.

As one specific example, the plurality of speakers including speaker #1 are used for broadcasts made in a facility or emergency guidance instructions.

Among the plurality of speakers including speaker #1, the speaker closest to the position of the person detected by the sensing may be controlled to play audio.

When it is desired to guide a person in a particular direction, among the plurality of speakers including speaker #1, the speaker located at a position ahead of the position of the person detected by the sensing in the direction in which it is desired to guide the person may be controlled to play audio. The audio may include, for example, speech related to guidance such as "please move this way", "please turn right", or "please go straight".

By controlling devices present based on the state of the surrounding space as described above, it is possible to achieve the advantageous effect that it is possible to provide comfortable and safe living, and possible to achieve the advantageous effect that the user can listen to high quality sound.

Supplemental Information 1

As a matter of course, the embodiments described in the present description may be combined and carried out with other content such as supplemental information.

In the present disclosure, detecting apparatus A12 is exemplified as being implemented as a camera, but detecting apparatus A12 according to the present disclosure may be implemented as something else. For example, detecting apparatus A12 may be a smartphone or personal computer, and may be a vehicle, robot, or drone.

Supplemental Information 2

As a matter of course, the embodiments described in the present description may be combined and carried out with other content such as supplemental information.

The terminal and access point (AP) may transmit a single modulated signal in order to perform communication, and may transmit a plurality of modulated signals using a plurality of antennas to perform communication. Accordingly, the transmission scheme known as multiple-input multiple-output (MIMO) may be used. Thus, the terminal and AP may be configured so as to include a plurality of receive antennas.

Supplemental Information 3

When an apparatus transmits a signal for sensing, it may also transmit time information and position information to assist in estimation such as position estimation, location estimation, etc. As a result, the apparatus that receives the signal for sensing can use this information to perform sensing, and the apparatus that receives the signal can use these items of information to learn more about the surrounding environment.

When the apparatus includes an antenna, the antenna may include a single antenna or two or more antennas. The antenna may include a single antenna or antenna element, or two or more antennas or antenna elements.

In Embodiment 11, Embodiment 12, Embodiment 13 and the like, display of an amount of money based on a currency and transactions and sales based on a currency are described, but instead of being based on a currency, display of an amount of money based on a virtual currency and transactions and sales based on a virtual currency may be carried out in Embodiment 11, Embodiment 12, Embodiment 13 and the like.

Here, for example, in FIG. 100, FIG. 101, and FIG. 104, the amount of the virtual currency is displayed instead of the amount of money.

In Embodiment 11, Embodiment 12, Embodiment 13 and the like, display of an amount of money based on a currency and transactions and sales based on currency are described, but instead of a display of an amount of money based on a currency, a display of transactions and sales based on points issued by an organization to which the person belongs may be displayed in Embodiment 11, Embodiment 12, Embodiment 13 and the like.

Here, for example, in FIG. 100, FIG. 101, and FIG. 104, points based on points issued by an organization to which the person belongs are displayed instead of the amount of money.

In the description of position estimator T204 included in the first apparatus illustrated in FIG. 68 and FIG. 69, several examples of methods for detecting the position of the first apparatus were described, but it goes without saying that any method capable of detecting the position may be used.

For example, position estimator T204 may estimate a position and a direction in the real-world space by matching three-dimensional map data prepared by a method such as simultaneous localization and mapping (SLAM) using data obtained using a camera or LIDAR, with three-dimensional map data corresponding to the real-world space that is prepared in advance. Position estimator T204 may estimate a position and direction in the real-world space by image matching using the image captured by the camera and a plurality of reference images whose positions and directions in the real-world space are known. Here, position estimator T204 may use, as a reference image, not an image actually captured, but a composite image created from a plurality of captured images or an image generated from three-dimensional map data of a real-world space. The three-dimensional map data corresponding to the real-world space used for the position estimation may be stored in advance in storage T202, or may be data around the first apparatus obtained from a server via communication unit T201 based on the position information estimated from GPS or the like.

The format of the three-dimensional map data used here may be, for example, point cloud data, mesh data, vector data, or modeled object data or the like. The three-dimensional map data may include two or more types of data, such as point cloud data, mesh data, vector data, and object data.

The position information detected by position estimator T204 in Embodiment 11, Embodiment 12, and Embodiment 13, is exemplified as being in the form of an address, but the format of the position information is not limited to this example. For example, the coordinate values may be based on any geodetic system, such as world geodetic system (WGS) 84, or a unique coordinate system set up for use within a specific range, such as within a building.

The above description describes another example of a position estimation method performed by position estimator T204 included in the first apparatus illustrated in FIG. 68 and FIG. 69, but position estimator ay405 included in first apparatus ay301 and second apparatus ay302 illustrated in FIG. 152B may implement the above position estimation method.

In Embodiment 11, Embodiment 12, and Embodiment 13, a case is described in which a superimposing image, such as an image of an advertisement image, an image of a character, or an image of an application such as a game is superimposed on a base image, such as an image captured by a camera, based on the estimated position information.

Here, the image after superimposition generated by signal processor T205 may be an image in which the pixel values of the base image are replaced by the pixel values of the superimposing image, or an image in which the pixel values of the base image are corrected by the pixel values of the superimposing image. Next, an example of the process in which signal processor T205 corrects the pixel values of the base image with the pixel values of the superimposing image will be described. Signal processor T205 may, for example, multiply the pixel values of the base image and the pixel values of the superimposing image by a coefficient set for each of them, and then use the values obtained by adding the two pixel values after the coefficient multiplication as the pixel values of the image after superimposition. Signal processor T205 may multiply the coefficient only for one of the pixel values of the base image or the pixel values of the superimposing image, or it may multiply the coefficient for the sum of the pixel values of the base image and the pixel values of the superimposing image. The coefficients used to generate the image after superimposition may be set in advance, derived based on the base image, or derived based on parameters set in the superimposing image. Signal processor T205 may also correct the pixel values of the superimposing image based on the position of a surrounding light source and the color and intensity of the light estimated from the superimposing image and other sensors. In this way, signal processor T205 generates the image after superimposition using the pixel values of the base image and the pixel values of the superimposing image, thereby enabling the user to be presented with information of the base image captured by a camera or the like even in the area where the superimposing image is displayed. As a result, the possibility that necessary information is hidden by the superimposing image and cannot be seen by the user can be reduced. In the following description, a display method that uses pixel values composted from the pixel values of the superimposing image and the pixel values of the base image is called a "display having transparency", and a display method in which the pixel values of the area in which the superimposing image is displayed do not include components of the pixel values of the base image is called a "display without transparency".

When the superimposing image is displayed on a transmissive display such as AR/MR glasses, signal processor T205 does not need to use the application transmitted to the AR/MR glasses. The image after superimposition can also provide the user with a view of the surrounding scenery in the area where the superimposing image is displayed, if the display is controlled by a control signal so that light incident from the surroundings is transmitted in the area where the superimposing image is displayed. Stated differently, it is possible to provide the user with a display having transparency. As a result, the possibility that necessary information is hidden by the superimposing image and cannot be seen by the user can be reduced.

The image after superimposition generated by signal processor T205 need not include the entire superimposing image. As an example of the process of generating an image after superimposition that does not include the entire superimposing image, the following describes a case in which a position is specified for placing the superimposing image in the space captured by the base image. In this case, signal processor T205 determines whether the area in which the superimposing image is to be displayed on the base image includes an obstructing area corresponding to an obstructing object located in front of the position where the superimposing image is to be placed as seen from the capturing position. If it is determined that the area in which the superimposing image is to be displayed includes an obstructing area, signal processor T205 generates the superimposing image without displaying the superimposing image in the obstructing area. Here, the determination of whether or not the surrounding object photographed in the base image is an obstructing object is achieved by comparing, for example, the distance information of the surrounding object obtained by a distance measurement method such as LIDAR or VSLAM, the distance image generated from the distance information, and the distance to the superimposing image derived from the position in the space where the superimposing image is displayed. With this, it is possible to present a superimposing image to a user in which a part of the superimposing image appears to be hidden by an obstructing object. As a result, for example, it is possible to reduce the possibility of giving a user a sense that something is incorrect caused by the superimposing image, which should be located deeper than the obstructing object, being superimposed on the obstructing object.

When displaying the superimposing image on a transmissive display such as AR/MR glasses, signal processor T205 generates a display image by removing the portion of the superimposing image corresponding to the area in the display located between the user's eye and the obstructing object, and displays the generated image on the AR/MR glasses to make it appear to the user that the superimposing image is hidden by the obstructing object. As a result, for example, it is possible to reduce the possibility of giving a user a sense that something is incorrect caused by the superimposing image, which should be located deeper than the obstructing object, being superimposed on the obstructing object.

Next, an example of a method of specifying the position in the real-world space in which to display the superimposing image will be given.

The position in space to display the superimposing image may be specified using three-dimensional map data. For example, information indicating whether or not the display of a superimposing image is permitted for a three-dimensional object such as a building or other architecture, a structure such as a fence, a utility pole, or a traffic signal, a road, or a plant, or the ground or water surface included in the three-dimensional map data, or an identifier indicating types of superimposing images permitted to be displayed may be added. Control information, such as information indicating whether or not the display of a superimposing image is permitted, and identifiers indicating types of superimposing images permitted to be displayed may be added to some surfaces, such as the surfaces of buildings, structures, roads, ground, water surfaces, and plants included in the three-dimensional map data. Here, the types of superimposing images that are permitted to be displayed are, for example, images of advertisements, images of characters, images of applications such as games, etc., but these classifications are mere examples; the superimposing images may be classified into types other than those given above. The surface to which the control information is added is stored in the three-dimensional map as a single data unit that is grouped together so that it can be distinguished from other surfaces. When point cloud data is used as the three-dimensional map, a unit of processing for point cloud compression, such as slices, tiles, or objects may be used as the data unit.

With the above-described configuration for specifying a position in space where the superimposing image is to be displayed using the three-dimensional map data, it is possible to display the superimposing image on the surface of an object existing in a real-world space based on the control information stored in the three-dimensional map data. Moreover, since the superimposing image is displayed on the surface of an object existing in a real-world space, it is possible to prevent the superimposing image from interfering with the display of objects in the real-world space other than the surface on which the superimposing image is displayed. Therefore, when the surface of an object existing in the real-world space is specified as a position in the space where the superimposing image is displayed, there is an advantageous effect is that it becomes easier to use a display that does not have transparency.

The control information may include information indicating that the display of the superimposing image is prohibited, rather than information indicating whether or not the display of the superimposing image is permitted. With this, even in a system in which a user can add a new area for displaying a superimposing image, the user can prevent the display of the superimposing image by designating in advance an area in which the display of the superimposing image is undesirable.

In addition, a surface or space virtually arranged in the three-dimensional map space may be used to specify the area to display the superimposing image, instead of the surface of the corresponding object in the real-world space. Here, the virtually arranged surface may be represented, for example, by two vectors indicating displacement from the coordinates of one of vertexes of a rectangular plane to two adjacent vertices, or by the coordinates of the center of the rectangular plane or any vertex, the vertical and horizontal lengths of the rectangular plane, and three rotation angles. The shape of the surface does not have to be rectangular, and may be circular. The surface does not have to be flat. For example, the surface may be of any shape represented by a set of points. The virtually arranged surface may be represented, for example, by three vectors indicating displacement from the coordinates of one of vertexes of a cuboid to three adjacent vertices, or by the coordinates of the center of the cuboid or any vertex, the vertical, horizontal, and depthwise lengths of the cuboid, and three rotation angles. The shape of the space does not have to be a cuboid. For example, the space may be a sphere. The space not have to be a space delimited by planes. For example, the space can be a space of any shape in which surface boundaries are represented by a set of points.

A virtual surface or space stored in a three-dimensional map as an area in which to display a superimposing image may include one or more of the following as control information: information indicating that the data is a virtual object, information indicating that display of the superimposing image is permitted, and identifiers indicating types of superimposing images permitted to be displayed. Adding information indicating that the data is a virtual object to a virtual surface or space makes it easy for the user to ascertain that the object is a virtual object. Although a surface or space that does not exist in the real-world space is referred to here as a "virtual object", it may have a different name. For example, a surface or space that does not exist in the real-world space may be referred to as an invisible object or the like, and may be referred to by any name as long as it can be distinguished from an object that exists in the real-world space.

With a configuration in which a surface or space virtually arranged in a three-dimensional map space is used as the area for displaying the superimposing image, it is possible to display the superimposing image in an area where nothing exists in the real-world space. In addition, since it is possible to specify the area where the superimposing image can be displayed, it is possible to prevent the superimposing image from being mistakenly displayed in an area where it is undesirable to display the superimposing image.

The three-dimensional map data may include a space to which control information indicating that the display of the superimposing image is prohibited is added. With this, even in a system in which a user can add a new area for displaying a superimposing image, the user can prevent the display of the superimposing image by designating in advance an area in which the display of the superimposing image is undesirable.

Areas, such as surfaces or spaces, in which the display of superimposing images is permitted may be assigned identifiers that allow the areas to be distinguished from each other, as control information. For example, when displaying an advertisement as described in Embodiment 11, Embodiment 12, and Embodiment 13, signal processor T205 obtains or generates and displays an image of an advertisement corresponding to an identifier of the area. With this configuration, it is possible to display different advertisement images for each area. This enables an advertiser to specify which area to display the advertisement in, for example. Signal processor T205 may switch the advertisement to be obtained or generated according to the combination of the identifier of the area and the identifier of the application being started. With this configuration, it is possible to change the advertisement to be displayed for each application, and thus possible to sell advertisement space for each application. As a result, applications of services that have more users are likely to increase the number of times advertisements are displayed and increase advertising revenue, which is expected to promote improvements in services and applications.

The identifier for each region may be unique for each area. Alternatively, a common identifier may be assigned to a plurality of areas. When a plurality of areas are assigned with a common identifier, it is possible to display the same advertisement by treating the areas with the common identifier as a single group.

Control information added to the area where the advertisement image is being displayed may include information indicating the type of advertisement that can be displayed. Examples of types of advertisements include advertisements for food, advertisements for appliances, advertisements for books, advertisements for game software, and so on. However, these types are mere examples; the advertisements may be classified differently from the above examples. With this configuration, it is possible to limit the types of advertisements that are permitted to be displayed in each area. The specification or restriction of the type of advertisement need not be set for each individual display area; by setting the specification or restriction of the type of advertisement for a larger space corresponding to a specific road or block, the specification or restriction of the type of advertisement set for the larger space may be applied to a plurality of display areas encompassed by the larger space.

The above description describes a case in which information indicating a position in the space in which the superimposing image is to be displayed is included in the three-dimensional map data, but the information indicating a position in the space in which the superimposing image is to be displayed may be provided as additional data to be used together with the three-dimensional map data. The additional data may indicate the position information using the same coordinate system used to indicate the position in the three-dimensional map. In this case, the additional data need only include, as control information, one or both of the information indicating the coordinate system used to specify the position information or the information indicating the three-dimensional map data to be used together. The position information in the additional data may be indicated by a relative position from a reference point set at an arbitrary position in the three-dimensional map space. In this case, the additional data need only include, as control information, information indicating the three-dimensional map data to be used together and information indicating one reference point among a plurality of reference points specified in the three-dimensional locus. However, if only one reference point is included in the three-dimensional map data, the additional data need not include information indicating the reference point as control information.

The area for displaying the superimposing image included in the additional data may be a surface that matches part of a surface of an object existing in the real-world space included in the corresponding three-dimensional map data, or a surface or a space registered as a virtual object that does not match a surface of an object existing in the real-world space. The area for displaying the superimposing image may be included in both the three-dimensional map data and the additional data.

With the configuration in which the area to display the superimposing image is designated using the above-mentioned additional data, the area to display the superimposing image can be created using the additional data, so that even a person who is not an administrator of the three-dimensional map data can create the area to display the superimposing image. Even for plural applications that use common three-dimensional map data, the area in which the superimposing image is displayed can be made different for each application by using different additional data for each application.

As mentioned above, areas such as surfaces and spaces that can display superimposing images provided with three-dimensional map data or additional data may be commonly used across a plurality of mutually different applications. With this configuration, a developer of an application can select an area for displaying a superimposing image from among areas in which the superimposing image can be displayed that have been designated in advance, thereby facilitating the development of applications for displaying the superimposing image. In addition, since the producer of the three-dimensional map data or the additional data can control the setting of areas in which display of a superimposing image is permitted and areas in which display of a superimposing image is prohibited, the occurrence of problems resulting from allowing, without restriction, the display of a superimposing image can be inhibited.

Although the above describes displaying a superimposing image, the superimposing image may be not only a two-dimensional image but also a three-dimensional object. In such cases, the superimposing image and three-dimensional object may be referred to as a superimposing object, and the terminology "superimposing image" in the above description may be replaced by "superimposing object".

In Embodiment 10 and Embodiment 28, a method for detecting the shape of an object in three dimensions and a method for detecting recesses and protrusions of an object and the like was described with reference to FIG. 65, FIG. 66. Here, the apparatus that obtains the information obtained by detecting the shape and recesses/protrusions of the object in three dimensions may have a function to set the viewpoint (each time) and display the shape and recesses/protrusions of the object on a display, AR/VR/MR glasses, or the like, or to set the viewpoint (each time) and transmit the information on the shape and recesses/protrusions of the object to the display device.

Instead of generating and displaying, on the display device, an image representing the shape and recesses/protrusions of the object visible from the set virtual viewpoint based on the obtained data of the shape and recesses/protrusions of the object, an image representing the shape and recesses/protrusions of the object may be displayed superimposed on a portion of the area of the image captured by the camera from the position of the detecting apparatus. For example, a distance image generated from distance data detected by radio waves W2 and W3 transmitted by the detecting apparatus may be superimposed on an area of the image that corresponds to a wall that reflected radio waves W2 and W3. With this configuration, the shape and recesses/protrusions of the object detected by the reflection of the radio waves on the wall is displayed in the area of the image corresponding to the wall where the radio waves were reflected, so that the information can be presented to the user in a manner similar to that of observing an object reflected in a mirror, which may make it easier for the user to ascertain the shape and unevenness of the object.

Embodiment 20 includes a description of FIG. 121, which illustrates a configuration example of information W201 related to sensing capability transmitted by 1_1$^{th}$ apparatus W101_1 and 1_2$^{th}$ apparatus W101_2 in FIG. 120. Here, 1_1$^{th}$ apparatus W101_1 and 1_2$^{th}$ apparatus W101_2 which transmit information W201 related to sensing capability illustrated in FIG. 121 may be terminals. Here, the terminal may transmit control information including information W201 related to sensing capability using, for example, a physical uplink shared channel (PUSCH), a physical random access channel (PRACH), or a physical uplink control channel (PUCCH). The channel used to transmit this control information is not limited these examples.

FIG. 162 illustrates an example, different from that of FIG. 121, of a configuration of information W201 related to sensing capability transmitted by 1_1$^{th}$ apparatus W101_1 and 1_2$^{th}$ apparatus W101_2.

Here, a base station may transmit control information including information W201 related to sensing capability using, for example, PBCH, PDSCH, or PDCCH. The channel used to transmit this control information is not limited these examples.

Moreover, a terminal may transmit control information including information W201 related to sensing capability using, for example, PUSCH, PRACH, or PUCCH. The channel used to transmit this control information is not limited these examples.

Information W201 related to sensing capability can be said to be information for notifying other apparatuses of the sensing capability of the apparatus transmitting this information.

As illustrated in FIG. 162, information W201 related to sensing capability includes at least one of the following: information W16301 related to whether a signal for sensing can be transmitted, information W16302 related to the frequency band of the signal for sensing to be transmitted, and information W16303 related to the frequency band in which sensing is possible.

Next, specific examples will be given of information W16301 related to whether a signal for sensing can be transmitted, information W16302 related to the frequency band of the signal for sensing to be transmitted, and information W16303 related to the frequency band in which sensing is possible.

Information W16301 Related to Whether a Signal for Sensing can be Transmitted:

Information W16301 related to whether a signal for sensing can be transmitted is information that indicates whether the apparatus is capable of transmitting a signal for sensing or not and information that is transmitted (notified) to another apparatus. The sensing method to which the signal for sensing corresponds may be any method.

Information W16302 Related to the Frequency Band of the Signal for Sensing to be Transmitted:

Information W16302 related to the frequency band of the signal for sensing to be transmitted is information related to the frequency band used when the apparatus transmits a signal for sensing. For example, information on whether or not the apparatus supports transmission of a signal for sensing in the 2.4 GHz band, information on whether or not the apparatus supports transmission of a signal for sensing in the 5 GHz band, and information on whether or not the apparatus supports transmission of a signal for sensing in the 60 GHz band may be included in the information W16302 related to the frequency band of the signal for sensing to be transmitted. The sensing method to which the signal for sensing corresponds may be any method.

Information W16303 Related to the Frequency Band in which Sensing is Possible

Information W16303 related to the frequency band in which sensing is possible is information related to the frequency band in which the apparatus can perform sensing. For example, information on whether or not the apparatus supports sensing using signals for sensing in the 2.4 GHz band, information on whether or not the apparatus supports sensing using signals for sensing in the 5 GHz band, and information on whether or not the apparatus supports sensing using signals for sensing in the 60 GHz band may be included in information W16303 related to the frequency band in which sensing is possible. The sensing method to which the signal for sensing corresponds may be any method.

Information W201 related to sensing capability illustrated in FIG. 121 and FIG. 162 and the like may be transmitted by second apparatus W102. Stated differently, information W201 related to sensing capability illustrated in FIG. 121 and FIG. 162 and the like may be transmitted by a base station, a terminal, an AP, a repeater, etc.

The apparatus capable of transmitting and/or receiving sensing-related signals may be an apparatus that is capable of transmitting information W201 related to sensing capability, but is not capable of communicating with other apparatuses. In such cases, the configuration of information W201 related to sensing capability is not limited to the configurations illustrated in FIG. 121 and FIG. 162.

In the present specification, for the sake of simplicity, the terms terminal, AP, base station, apparatus, detecting apparatus, device, etc., are used, but the terms by which these elements are referred are not limited to these examples. For example, the terminal may be referred to as a communication/broadcast device such as a base station, access point, mobile phone, smartphone, or tablet, as a communication device such as a television, radio, or personal computer, or as a communication apparatus, a repeater, or a server. The AP may be referred to as a communication/broadcast device such as a base station, terminal, mobile phone, smartphone, or tablet, as a communication device such as a television, radio, or personal computer, or as a communication apparatus, a repeater, a server, an eNodeB (eNB), or a gNodeB (gNB). The base station may be referred to as a communication/broadcast device such as an AP, terminal, mobile phone, smartphone, or tablet, as a communication device such as a television, radio, or personal computer, or as a communication apparatus, a repeater, or server, an eNodeB (eNB), or a gNodeB (gNB). The device that performs sensing may be referred to as a communication/broadcast device such as an AP, base station, terminal, mobile phone, smartphone, or tablet, as a communication device such as a television, radio, or personal computer, or as a communication apparatus, a repeater, or a server. The apparatus or detecting apparatus may be referred to as a communication/ broadcast device such as an AP, base station, terminal, mobile phone, smartphone, or tablet, as a communication device such as a television, radio, or personal computer, or as a communication apparatus, a repeater, or a server. The device or device A may be referred to as a communication/ broadcast device such as an AP, base station, terminal, mobile phone, smartphone, or tablet, as a communication device such as a television, radio, or personal computer, or as a communication apparatus, a repeater, a server, an electronic motorcycle (e-motorcycle), an electric kick scooter, a vacuum cleaner, an electric automobile, an electric power-assisted automobile, a motorcycle, an automobile, a boat, or airplane.

The embodiments are merely examples. For example, while a "modulation method, an error correction coding method (error correction code, code length, coding rate, etc., to be used), control information, etc." are exemplified, it is possible to carry out the present disclosure with the same configuration even when other types of a "modulation method, an error correction coding method (error correction code, code length, coding rate, etc., to be used), control information, etc." are applied.

Regarding the modulation method, even when a modulation method other than the modulation methods described in the present specification is used, it is possible to carry out the exemplary embodiments and the other contents described herein. For example, APSK (for example, 16APSK, 64APSK, 128APSK, 256APSK, 1024APSK, and 4096APSK), PAM (for example, 4PAM, 8PAM, 16PAM, 64PAM, 128PAM, 256PAM, 1024PAM, and 4096PAM), PSK (for example, BPSK, QPSK, 8PSK, 16PSK, 64PSK, 128PSK, 256PSK, 1024PSK, and 4096PSK), and QAM (for example, 4QAM, 8QAM, 16QAM, 64QAM, 128QAM, 256QAM, 1024QAM, and 4096QAM) may be applied, or in each modulation method, uniform mapping or non-uniform mapping may be performed. Moreover, a method for arranging 2, 4, 8, 16, 64, 128, 256, 1024, etc., signal points on an I-Q plane (a modulation method having 2, 4, 8, 16, 64, 128, 256, 1024, etc., signal points) is not limited to a signal point arrangement method of the modulation methods described herein.

The transmitting apparatus and receiving apparatus according to the present disclosure are devices having a communication function, and the devices may be devices having a communication function, and such devices may be configured to be connectable with devices for running applications such as a television, a radio, a personal computer, and a mobile phone, via a certain interface. Moreover, in the present embodiment, symbols other than data symbols, such as a pilot symbol (preamble, unique word, postamble, reference symbol, mid-amble, etc.), a control information symbol, a null symbol, may be arranged in any order in the frame. Here, the terms "reference symbol" and "control information symbol" are used, but the naming of such symbols is not important; the functions that they perform are.

A reference symbol or reference signal may be a known symbol that is modulated using PSK modulation in a transceiver, and the receiver may use this symbol to perform, for example, frequency synchronization, time synchronization, channel estimation (channel state information (CSI) estimation) for each modulated signal, and signal detection. Alternatively, the reference symbol or reference signal enables a symbol transmitted by a transmitter to be known by a receiver by the receiver being synchronized.

The control information symbol is a symbol for transmitting information required to be transmitted to a communication partner in order to establish communication pertaining to anything other than data (such as application data) (this information is, for example, the modulation method, error correction coding method, coding rate of the error correction encoding method used in the communication, and/or upper layer settings information).

Note that the present disclosure is not limited to the embodiments; various modifications may be made to the embodiments. For example, each embodiment is described as being implemented as a communication device, but this example is not limiting, each embodiment may implement a corresponding communication method as software.

Note that a program for executing the above-described communication method may be stored in read only memory (ROM) in advance to cause a central processing unit (CPU) to operate this program.

Moreover, the program for executing the communication method may be stored in a computer-readable storage medium, the program stored in the recording medium may be recorded in RAM in a computer, and the computer may be caused to operate according to this program.

Each configuration of each of the above-described embodiments, etc., may be realized as a large scale integration (LSI) circuit, which is typically an integrated circuit that includes an input terminal and an output terminal. These integrated circuits may be formed as separate chips, or may be formed as one chip so as to include the entire configuration or part of the configuration of each embodiment. LSI is described here, but the circuit may also be referred to as an IC, a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable FPGA or a reconfigurable processor which is reconfigurable in connection or settings of circuit cells inside the LSI circuit may be used. Further, when development of a semiconductor technology or another derived technology provides a circuit integration technology which replaces LSI, as a matter of course, functional blocks may be integrated by using this technology. Adaption of biotechnology, for example, is a possibility.

The transmitting method supported by the AP and terminal may be a multi-carrier scheme such as OFDM, and may be a single-carrier scheme. The AP and terminal may support both a multi-carrier scheme and a single-carrier scheme. In such cases, a plurality of methods may be used to generate the single-carrier scheme modulated signal, and implementation is possible regardless of which method is used. Examples of single-carrier schemes include discrete Fourier transform (DFT)-spread orthogonal frequency division multiplexing (OFDM), trajectory constrained DFT-Spread OFDM, OFDM based single carrier (SC), single carrier (SC)-frequency division multiple access (FDMA), and guard interval DFT-spread OFDM.

Note that at least one of the field programmable gate array (FPGA) and the central processing unit (CPU) may be configured to download, via wired or wireless communication, some or all of the software required to implement the communication method described in the present disclosure. At least one of the FPGA and the CPU may be further configured to download, via wired or wireless communication, some or all of software required to perform updates. The downloaded software may be stored in storage, and based on the stored software, at least one of the FPGA and the CPU may be operated to implement the digital signal processing described in the present disclosure.

Here, a device including at least one of the FPGA and the CPU may connect to a communications modem over a wired or wireless connection, and the device and the communications modem may implement the communication method described in the present disclosure.

For example, a communication device such as the AP, or the terminal described in the present specification may include at least one of the FPGA and the CPU, and include an interface for obtaining, from an external source, software for operating at least one of the FPGA and the CPU. The communication device may further include storage for storing software obtained from the external source, and implement the signal processing described in the present disclosure by operating the FPGA and the CPU based on the stored software.

The sensing or sensing processing described in the present specification includes at least processing of detecting the position of an object, processing of detecting presence or absence of an object, processing of predicting a material property of an object, processing of detecting movement of an object, processing of estimating the status of a surrounding area of an apparatus capable of performing sensing, processing of estimating a distance between an apparatus capable of performing sensing and an object, or processing of detecting the shape of an object. In the processing of detecting the position of an object, there are instances in which an object and object movement may be detected simultaneously. Moreover, in the processing of detecting presence or absence of an object or processing of detecting the shape of an object, it is possible to specify a target object.

In the above embodiments, upon detecting an object (a person, animal, vehicle, etc.), a shutter may be triggered, that is to say, a still image may be captured. Moreover, upon detecting an object, a video may be captured. What is to be detected may be a predetermined gesture.

The sensing may be sensing performed via wireless technology that uses radio waves or sensing performed via wireless technology that uses a higher frequency, such as light.

An apparatus for sensing like that illustrated in FIG. 14 and an apparatus for communication like that illustrated in FIG. 15 may be connected via an interface or the like to achieve an apparatus capable of both sensing and communication like that in FIG. 16.

Note that the purpose for using spatial sensing, the application of spatial sensing, and the environment in which spatial sensing is used vary. Various factors vary depending on the application or environment of use, such as the object that is a detection target or the distance to an object that is a detection target, desired distance precision, allowable delay time, or information desired to be obtained simultaneously with the detection of an object. Accordingly, depending on the purpose for using spatial sensing, the application of spatial sensing, and the environment in which spatial sensing is used, a transmitting apparatus and a transmitting method that can obtain a purpose-specific sensing result by, for example, switching sensing methods or combining a plurality of sensing methods are required.

With the detecting apparatus according to the above aspect, by performing detection of distance to an object using radio waves and controlling detection position using image information, it is possible to easily specify an object that is a detection target for distance measuring, and detect the distance thereto.

For example, when a user specifies an object as a detection target based on video displayed on an apparatus having a display such as a touch panel and an input unit or inputs a signal to be selected, it is easy for the user to specify a target object for sensing performed using radio waves.

Moreover, for example, when an object that is a detection target is detected via image processing that uses image information obtained by an image capturing unit and distance between the detected object is estimated, it is possible to use a feature amount included in the image information, such as color or shape, in the object detection. Accordingly, compared to when detection is performed using only radio waves, it is possible to improve object detection precision and foster improvement of identification ability of an object.

An example in which triangulation is used is given in the present disclosure. Hereinafter, another method for measuring or estimating position using triangulation will be described with reference to FIG. 163.

Process A:

In FIG. 163, for example, first apparatus 6601 transmits a signal using radio waves. This signal is then reflected by second apparatus 6602, and first apparatus 6601 obtains the reflected signal. With this, first apparatus 6601 knows the distance between first apparatus 6601 and second apparatus 6602. Note that first apparatus 6601 may share with second apparatus 6602 the information of the distance between first apparatus 6601 and second apparatus 6602.

Process B:

For example, first apparatus 6601 transmits a signal using radio waves. This signal is then reflected by target (object) 6603, and first apparatus 6601 obtains the reflected signal. With this, first apparatus 6601 knows the distance between first apparatus 6601 and target (object) 6603. Note that first apparatus 6601 may share with second apparatus 6602 the information of the distance between first apparatus 6601 and target (object) 6603.

Process C:

For example, second apparatus 6602 transmits a signal using radio waves. This signal is then reflected by target (object) 6603, and second apparatus 6602 obtains the reflected signal. With this, second apparatus 6602 knows the distance between second apparatus 6602 and target (object) 6603. Note that second apparatus 6602 may share with first apparatus 6601 the information of the distance between second apparatus 6602 and target (object) 6603.

Process D:

First apparatus 6601 and/or second apparatus 6602 obtains, via Process A, Process B, and Process C, information indicating the distance between first apparatus 6601 and second apparatus 6602, information indicating the distance between first apparatus 6601 and target (object) 6603, and information indicating the distance between second apparatus 6602 and target (object) 6603, and performs triangulation using this information to know the position of target (object) 6603.

Next, another method will be described.

Process E:

For example, first apparatus 6601 and/or second apparatus 6602 store, at the point in time of being initially set up, information indicating the distance between first apparatus 6601 and second apparatus 6602.

Process F:

For example, first apparatus 6601 transmits a signal using radio waves. This signal is then reflected by target (object) 6603, and first apparatus 6601 obtains the reflected signal. With this, first apparatus 6601 knows the distance between first apparatus 6601 and target (object) 6603. Note that first apparatus 6601 may share with second apparatus 6602 the information of the distance between first apparatus 6601 and target (object) 6603.

Process G:

For example, second apparatus 6602 transmits a signal using radio waves. This signal is then reflected by target (object) 6603, and second apparatus 6602 obtains the reflected signal. With this, second apparatus 6602 knows the distance between second apparatus 6602 and target (object) 6603. Note that second apparatus 6602 may share with first apparatus 6601 the information of the distance between second apparatus 6602 and target (object) 6603.

Process H:

First apparatus 6601 and/or second apparatus 6602 obtains, via Process E, Process F, and Process G, information indicating the distance between first apparatus 6601 and second apparatus 6602, information indicating the distance between first apparatus 6601 and target (object) 6603, and information indicating the distance between second apparatus 6602 and target (object) 6603, and performs triangulation using this information to know the position of target (object) 6603. Note that first apparatus 6601 and second apparatus 6602 may be configured as a single apparatus.

In the present disclosure, pairing of a gesture and an operation of an apparatus is described. Hereinafter, an example of registration processing for pairing of a gesture and an operation of an apparatus will be described.

In Embodiment 7 in the present disclosure, an example in which a registered first gesture and a first operation of apparatus #A, such as emitting sound or vibrating, is given. Here, the processing of registering the combination of the first gesture and the operation of apparatus #A as a paired operation may be performed using, for example, a settings screen for setting a paired operation of a device in device #A, for example.

For example, in order to pair a gesture and an operation of a device, the user opens a settings screen on device #A, and one or more candidate gestures are displayed on the settings screen. Here, when the user selects a first gesture from among the one or more candidate gestures displayed on the settings screen, one or more candidate operations that are permitted to be used in apparatus #A are displayed on the settings screen. For example, when the user selects a first operation from among a plurality of candidate operations, a confirmation screen for determining whether or not to pair the first gesture and the first operation as a combination of a gesture and a device operation is displayed, and the registration is completed by the user making an input that confirms the pairing.

Note that the method used to register the pairing of a gesture and a device operation that uses the above-described settings screen is merely one example of a plurality of pairing registration methods; the method used to register the pairing of a gesture and a device operation according to the present disclosure is not limited to the above method.

For example, instead of selecting an operation to be paired after selecting a gesture, a gesture may be selected after selecting an operation to be paired. In such cases, after selecting an operation to be paired, a plurality of gesture candidates that can be paired are displayed on the settings screen.

Note that as with this example, the procedure of processes for pairing a gesture and an operation of an apparatus and the order of the processes are not limited to the examples given in the specification.

Moreover, the method of registering the pairing of a gesture and a device operation may be provided using a graphical user interface (GUI). When a GUI is used, for example, icons or blocks corresponding to each of a plurality of gesture candidates and icons or blocks corresponding to each of a plurality of device operation candidates may be displayed on the screen, the pairing process may be described by moving around the icons or blocks and connecting them using a touch panel or mouse or by connecting the icons or blocks with a connector indicated by a line, for example, and the described pairing process may then be registered.

Although the above describes a case in which a gesture is paired with an operation of a device, in addition to the user selecting a gesture from a settings screen, a surrounding environment or a user movement detectable by another sensor included in device #A, e.g., a voice command, may be selectably presented as a candidate for an input that can be paired with a device operation. Since this configuration enables control of an operation of a device based on, for example, a movement of the user other than a gesture or a place in which the device is used, the probability that a user operation (user input) can be simplified and erroneous user operation can be avoided increases, and there is a possibility that this can contribute to an improvement of operability.

Although the above describes a case in which the pairing of a gesture and a device operation is performed on a settings screen of device #A, the setting may be configured using some device other than device #A. In such cases, on the settings screen of the other device, the user selects, via the other device, a device to be set from among a plurality of candidate devices whose pairable operation settings are configurable.

Moreover, for example, when a combination of an operation of a device and an action of a user, such as a gesture, detected by a device capable of sensing that is placed in the space described in Embodiment 8, such as the inside of a home, is registered in a server as a paired operation, the user selects which device or sensor for the pairing registration from among a plurality of devices capable of sensing or sensors, and selects which device for the pairing registration from among a plurality of devices that provide usable operations.

For example, to perform the pairing registration, the user opens a settings screen on a device such as a smartphone, tablet, computer, or mobile phone or the like, whereby one or more candidate devices or candidate sensors that can be used in the pairing registration are displayed on the settings screen. The user then selects a first device from among the one or more candidate devices or candidate sensors displayed on the settings screen, whereby one or more candidate gestures detectable by the selected first device are displayed. When the user selects a first gesture from among the one or more candidate gestures displayed on the settings screen, one or more candidate apparatuses that can be paired are displayed on the settings screen. The user selects apparatus #A from among the plurality of displayed candidate apparatuses, whereby one or more candidate operations permitted to be used in apparatus #A are displayed on the settings screen. For example, when the user selects a first operation from among a plurality of candidate operations, a confirmation screen for determining whether or not to pair the first gesture and the first operation as a combination of a gesture and a device operation is displayed, and the registration is completed by the user making an input that confirms the pairing.

With this configuration, for example, it is possible to register the pairing of an operation of a given device that is pairable and a gesture detected by a given device or sensor that is pairable and is placed in a target space such as the inside of a home. As a result, for example, it is possible to control an operation based on a gesture even for a device that does not include a gesture detection function, which makes it possible to improve the operability of the device.

Note that the pairing registration method used for the combination of a gesture and a device and device operation that uses the above-described settings screen is merely one example of a plurality of pairing registration methods; the pairing registration method used for the combination of a gesture and a device and device operation according to the present disclosure is not limited to the above method.

For example, instead of, after selecting a device or sensor to be paired, a gesture candidate that is detectable by the selected device or sensor being displayed, one or more detectable gesture candidates for each of a plurality of devices or sensors may be simultaneously displayed on a settings screen. Similarly, instead of, after selecting a device to be paired, an operation candidate of the selected device being displayed, a plurality of selectable operations for each of a plurality of devices may be simultaneously displayed on a settings screen. The above configuration enables selection of a combination of a device and an operation to be paired with a single user input operation which simplifies user operation and makes it possible to improve operability. Additionally, instead of selecting a device operation after selecting a gesture, a gesture may be selected after selecting a device operation. In such cases, after selecting a device operation, a plurality of candidate gestures that can be paired are displayed on the settings screen.

When associating a combination of a plurality of gestures with a device operation, a combination of a plurality of gestures that are detectable by mutually different devices or sensors may be used.

As one example of a paired operation for a combination of gestures that are detectable by a plurality of devices or sensors, a case in which access point (AP) N701 and audio equipment N702 in FIG. 50 or FIG. 55 each include a sensing function will be described.

Access point (AP) N701 detects a first change pattern registered in advance based on a temporal change in first sensing data obtained by a first sensor included in access point (AP) N701. In this example, the first change pattern is a pattern detected when the user performs a first gesture. Although the process of detecting a first change pattern from the first sensing data is exemplified as being performed by access point (AP) N701, the detection process may be performed by some other device, such as cloud server N720 illustrated in FIG. 50, server Q101 illustrated in FIG. 55, or some other device. In such cases, access point (AP) N701 forwards the first sensing data to the other device over a network, and the other device uses the first sensing data to perform the process of detecting one or more change patterns including the first change pattern.

Audio equipment N702 detects a second change pattern registered in advance based on a temporal change in second sensing data obtained by a second sensor included in audio equipment N702. In this example, the second change pattern is a pattern detected when the user performs a first gesture. Although the process of detecting a second change pattern from the second sensing data is exemplified as being performed by audio equipment N702, the detection process may be performed by some other device, such as access point (AP) N701, cloud server N720 illustrated in FIG. 50, server Q101 illustrated in FIG. 55, or some other device. In such cases, audio equipment N702 forwards the first sensing data to the other device over a network, and the other device uses the first sensing data to perform the process of detecting one or more change patterns including the second change pattern. Taking security into consideration, the other device that performs the detection process may be restricted to a device capable of direct wireless communication such as access point (AP) N701 or a device connected to a directly-wired communication cable.

Next, a first example of using a combination of mutually different devices or sensors in the detection of a gesture will be described. In the first example, upon registering the pairing function, when both the first change pattern is detected from the first sensing data and the second change pattern is detected from the second sensing data, the registration associates and registers a fourth operation such as increasing the volume of a speaker included in audio equipment N702, for example, or increasing the amplitude of a voice component transmitted in a voice signal output from an audio output terminal, or decreasing the volume of a speaker included in audio equipment N702, for example, or decreasing the amplitude of a voice component transmitted in a voice signal output from an audio output terminal. In other words, when the first change pattern is detected from the first sensing data and the second change pattern is detected from the second sensing data, the fourth operation is performed in audio equipment N702.

As one example of a paired operation using the above configuration, a case in which the user performs a second gesture different than the first gesture will be described. Assume the user performs the second gesture and a sensing result similar to the first gesture from the position of access point (AP) N701 is obtained, and a sensing result not similar to the first gesture from the position of audio equipment N702 is obtained. In such cases, with a determination that uses only the first sensing data, the first change pattern is detected, and audio equipment N702 performs the fourth operation. This operation is unintended by the user, as the user performed the second gesture. However, with a determination that uses the second sensing data in addition to the first sensing data, the second change pattern is detected from the second sensing data, so the fourth operation is not performed. In other words, with a configuration in which a gesture performed by the user is determined using a plurality of devices that have the above-described sensing function or a plurality of sensors and the determination result is paired with an operation of a given device, it is possible to inhibit a device from performing an operation which is unintended by the user.

Next, a second example of using a combination of mutually different devices or sensors in the detection of a gesture will be described. In the second example, upon registering the pairing function, when the first change pattern and is detected from the first sensing data but the second change pattern is not detected from the second sensing data, the registration associates and registers the fourth operation. In other words, when the first change pattern is detected from the first sensing data but the second change pattern is not detected from the second sensing data, the fourth operation is performed in audio equipment N702.

As one example of a paired operation using the above configuration, a case will be described in which the user is in a position that can be sensed from both access point (AP) N701 and audio equipment N702, such as a position close to audio equipment N702, and performs the first gesture. In such cases, since the first change pattern is detected from the first sensing data and the second change pattern is detected from the second sensing data, audio equipment N702 does not perform the fourth operation. Next, as another example of a paired operation, a case will be described in which the user is in a position that can be sensed from access point (AP) N701 but cannot be sensed from audio equipment N702, such as a position distanced from audio equipment N702, that is to say, is in a position outside the sensing range of audio equipment N702, and performs the first gesture. In such cases, since the first change pattern is detected from the first sensing data but the second change pattern is not detected from the second sensing data, audio equipment N702 performs the fourth operation.

Although the above describes an example in which audio equipment N702 performs the fourth operation when the first gesture is detected from a sensing result of access point (AP) N701 and the first gesture is not detected from a sensing result of audio equipment N702, the configuration according to the present disclosure whereby a determination is made as to whether the user performed a gesture or not using a plurality of devices having a sensing function or a plurality of sensors, and the determination result is paired with an operation of a given device is not limited to this example.

For example, the sensing performed by audio equipment N702 may be sensing that only determines whether an object is present in the surrounding area or not, and not sensing that detects a gesture. In such cases, instead of the condition "the first gesture is not detected from the sensing result of audio equipment N702", for example, the condition "an object is not detected in the surrounding area from the sensing result of audio equipment N702" may be employed. Here, "an object is not detected in the surrounding area from the sensing result of audio equipment N702" is, for example, a situation in which an object other than an object detected in the initial sensing described in Embodiment 8 or 9 is not detected, or a situation in which second sensing data is obtained that is similar to the second sensing data obtained upon performing the initial sensing.

When the first gesture is detected from the sensing result of access point (AP) N701 and the first gesture is detected from the sensing result of audio equipment N702, audio equipment N702 may perform a fifth operation different than the fourth operation, and when the first gesture is detected from the sensing result of access point (AP) N701 but the first gesture is not detected from the sensing result of audio equipment N702, audio equipment N702 may perform the fourth operation.

As described above, with the configuration in which a determination is made as to whether a user has made a gesture or not using a plurality of devices having a sensing function or a plurality of sensors and the determination result is paired with an operation of a given device, whether the paired operation is implemented or not based on, for example, the position, orientation, or posture of the user can be switched, even if the user performs the same gesture, and the device operation to be implemented can be switched based on, for example, the position, orientation, or posture of the user. As a result, it may be possible to improve operability of the device by the user and inhibit the execution of a device operation that the user does not intend to execute.

Moreover, the method of registering the pairing of the above-described event that is detectable from sensing data from a plurality of devices or sensors and a device operation may be provided using a graphical user interface (GUI). When a GUI is used, for example, icons or blocks corresponding to each of a plurality of candidates of events that are detectable from sensing data from a plurality of devices or sensors and icons or blocks corresponding to each of a plurality of device operation candidates may be displayed on the screen, the pairing process may be described by moving around the icons or blocks and connecting them using a touch panel or mouse or by connecting the icons or blocks with a connector indicated by a line, for example, and the described pairing process may then be registered.

The above describes an example of providing a function for describing and registering a pairing process using the above-described settings screen and pairing registration method to determine whether a condition has been met, such as whether a specified gesture has been detected or whether a specified event has been detected using sensing data, and perform a specified device operation when a detection is made or when a detection is not made. However, the registerable pairing process according to the present disclosure is not limited to this example. For example, in order to describe a complicated pairing process, the above-described settings screen and pairing registration method may provide a function that describes a relationship between a plurality of gestures or between a gesture and a device operation, using a given logical operator such as a OR, AND, XOR, or NOT. Moreover, in order to describe a complicated pairing process, the above-described settings screen and pairing registration method may provide a function that can describe a relationship between a plurality of events or between an event and a device operation, using a given logical operator such as a OR, AND, XOR, or NOT. Moreover, in addition to condition determination based on sensing data, a combination of any given condition determinations, such as a condition determination based on time information or a condition determination based on, for example, the number of devices connected to the network or a function included in a device, may be used.

In the present disclosure, the sensor used for sensing is not limited to sensing that uses radio waves. For example, sensing that uses light such as light detection and ranging (LIDAR) may be used. When a combination of a plurality of sensors is used, the sensors that are combined may be any sort of sensors. For example, a camera may be used as a sensor, and captured video may be used as sensing data as-is, or image processing for extracting a feature amount or image processing such as patter recognition may be performed on the video, and the result may be used as sensing data. Moreover, for example, data obtained from any given sensor included in a wearable terminal worn by the user may be used as sensing data. Examples of such a sensor include a microphone, position sensor, acceleration sensor, myoelectric potential sensor, or temperature sensor.

Although the above describes an example of a case in which registration of a paired operation of a combination of events detected using a plurality of sensing data items is performed by a user on a settings screen or GUI, another method may be used for the registration. For example, in the process for registering a gesture to a device that is described in Embodiment 7, it may be created automatically. For example, in the system described in Embodiment 8 or 9, after a user instructs gesture registration to start, while the user is performing the gesture, a first sensor and a second sensor included in a plurality of different or same devices each obtain sensing data, and a temporal change in the sensing data obtained by each of the sensors is stored. Thereafter, determination as to whether or not the registered gesture has been made or not is performed using the sensing data obtained by the first sensor and the sensing data obtained by the second sensor. This configuration achieves the advantageous effect that it is possible to simplify the registration of a paired operation of a combination of events detected using a plurality of sensing data items.

Note that when a sensor that performs sensing using radio waves is used, the sensing data used in the above-described process may be data indicating a three-dimensional position or shape in a given format such as a point cloud or mesh format, and may be data obtained by implementing given signal processing on the reception signal, such as a transmission path characteristic estimated from a pilot or reference signal, a correlation value between a reference signal and the reception signal, or a phase difference between sub-carriers in an OFDM signal. The sensing data may be, for example, data obtained by extracting a difference between a sensing result obtained while a moving target object is not present, such as the sensing result of the initial sensing described above, and a sensing result obtained by normal sensing performed for the purpose of detecting a target object.

In the above embodiments, each element may be configured as dedicated hardware or may be realized by executing a software program suitable for the element. Each of the elements may be realized by means of a program executing unit, such as a central processing unit (CPU) or a processor, reading and executing the software program recorded on a recording medium such as a hard disk or a semiconductor memory. Here, the software program for realizing the transmitting apparatus and the like according to each of the embodiments is the program described below.

The program causes a computer to execute a transmitting method including: configuring a frame conforming to orthogonal frequency-division multiple access (OFDMA) and including a plurality of time-frequency resources, each being a resource defined by time and frequency; and transmitting the frame configured in the configuring over radio waves, wherein in the configuring, a frame including a resource for communication and a resource for sensing is configured as the frame, the resource for communication being a time-frequency resource in which a symbol including communication data is disposed, and the resource for sensing being a time-frequency resource in which a symbol for sensing via radio waves transmitted in the transmitting is disposed.

Hereinbefore, a transmitting apparatus and the like according to one or more aspects has been described based on exemplary embodiments, but the present invention is not limited to the above exemplary embodiments. Various modifications of the exemplary embodiments as well as embodiments resulting from combinations of elements from different exemplary embodiments that may be conceived by those skilled in the art are intended to be included within the scope of the one or more aspects as long as these do not depart from the novel teachings and advantages of the present invention.

INDUSTRIAL APPLICABILITY

The present disclosure includes an invention applicable in, for example, a wireless communication apparatus, a wired communication apparatus, or a terminal or device including such an apparatus.

What is claimed is:

1. A communication apparatus which is a first apparatus that performs sensing via radio waves to sense a second apparatus, the communication apparatus comprising:
  a communication unit configured to receive a frame transmitted via radio waves by the second apparatus and sense the second apparatus using the frame received; and
  a controller that selects, from among predetermined frequency bands, a frequency band for the second apparatus to transmit the radio waves at, notifies the second apparatus of the frequency band selected, and controls the communication unit to perform the sensing using the frequency band, the predetermined frequency bands including a first frequency band and a second frequency band, wherein
  a usable frequency range of a signal for sensing that uses the second frequency band is wider than a usable frequency range of a signal for sensing that uses the first frequency band,
  in response to a decrease in reception quality of the signal for sensing in the first frequency band transmitted by the second apparatus, the controller changes a frequency of the signal for sensing to the second frequency band, and transmits, to the second apparatus, information indicating the change of the frequency of the signal for sensing to the second frequency band, and
  the communication unit is configured to sense the second apparatus in the second frequency band in response to the change of the frequency of the signal for sensing to the second frequency band.

2. The communication apparatus according to claim 1, wherein when selecting the frequency band, the controller selects the frequency band independently of a frequency band used for communication by the communication unit.

3. The communication apparatus according to claim 1, wherein the sensing includes at least one of detecting a position of an object, detecting presence or absence of an object, or detecting a shape of an object, by analyzing the radio waves received by the communication unit.

4. A communication apparatus which is a second apparatus that is sensed via radio waves by sensing performed by a first apparatus, the communication apparatus comprising:

a second communication unit configured to transmit, via radio waves, a frame to be sensed by a first communication unit of the first apparatus; and a controller that receives a notification of a frequency band from the first apparatus, and controls the second communication unit to transmit the frame via radio waves using the frequency band indicated in the notification so that the second apparatus is sensed by the first communication unit of the first apparatus, the frequency band indicated in the notification being a frequency band selected by the first apparatus from among predetermined frequency bands, the predetermined frequency bands including a first frequency band and a second frequency band, wherein a usable frequency range of a signal for sensing that uses the second frequency band is wider than a usable frequency range of a signal for sensing that uses the first frequency band, the controller receives, from the first apparatus, information indicating a change of a frequency of the signal for sensing to the second frequency band, and changes the frequency of the signal for sensing to the second frequency band, and the second communication unit is configured to transmit the frame to be sensed via radio waves using the second frequency band in response to the change of the frequency of the signal for sensing to the second frequency band.

5. The communication apparatus according to claim 4, wherein the second communication unit is configured to transmit, as the frame, a frame that includes a preamble and does not include a data field.

6. A communication method executed by a communication apparatus which is a first apparatus that performs sensing via radio waves to sense a second apparatus, the communication method comprising:

receiving a frame transmitted via radio waves by the second apparatus and sensing the second apparatus using the frame received; and selecting, from among predetermined frequency bands, a frequency band for the second apparatus to transmit the radio waves at, notifying the second apparatus of the frequency band selected, and controlling the sensing to perform the sensing using the frequency band, the predetermined frequency bands including a first frequency band and a second frequency band, wherein a usable frequency range of a signal for sensing that uses the second frequency band is wider than a usable frequency range of a signal for sensing that uses the first frequency band, and the communication method further comprises:

in response to a decrease in reception quality of the signal for sensing in the first frequency band transmitted by the second apparatus, changing a frequency of the signal for sensing to the second frequency band, and transmitting, to the second apparatus, information indicating the change of the frequency of the signal for sensing to the second frequency band, and sensing the second apparatus in the second frequency band in response to the changing of the frequency of the signal for sensing to the second frequency band.

7. A communication method executed by a communication apparatus which is a second apparatus that is sensed via radio waves by sensing performed by a first apparatus, the communication method comprising:

transmitting from a second communication unit, via radio waves, a frame to be sensed by a first communication unit of the first apparatus; and receiving a notification of a frequency band from the first apparatus, and controlling the second communication unit to transmit the frame via radio waves using the frequency band indicated in the notification so that the second apparatus is sensed by the first communication unit of the first apparatus, the frequency band indicated in the notification being a frequency band selected by the first apparatus from among predetermined frequency bands, the predetermined frequency bands including a first frequency band and a second frequency band, wherein a usable frequency range of a signal for sensing that uses the second frequency band is wider than a usable frequency range of a signal for sensing that uses the first frequency band, and the communication method further comprises:

receiving, from the first apparatus, information indicating a change of a frequency of the signal for sensing to the second frequency band, and changing the frequency of the signal for sensing to the second frequency band; and transmitting the frame to be sensed via radio waves using the second frequency band in response to the changing of the frequency of the signal for sensing to the second frequency band.

* * * * *